US011768575B2

(12) United States Patent
Han et al.

(10) Patent No.: US 11,768,575 B2
(45) **Date of Patent: *Sep. 26, 2023**

(54) DEVICE, METHOD, AND GRAPHICAL USER INTERFACE FOR MANIPULATING USER INTERFACES BASED ON UNLOCK INPUTS

(71) Applicant: Apple Inc., Cupertino, CA (US)

(72) Inventors: Byron Han, San Jose, CA (US); Matthew E. Shepherd, Mountain View, CA (US); Imran Chaudhri, San Francisco, CA (US); Gregory N. Christie, San Jose, CA (US); Patrick L. Coffman, San Francisco, CA (US); Craig M. Federighi, Los Altos Hills, CA (US); Matthew H. Gamble, Mill Valley, CA (US); Brittany D. Paine, Park City, UT (US); Brendan J. Langoulant, Saratoga, CA (US); Craig A. Marciniak, San Jose, CA (US); Donald W. Pitschel, San Francisco, CA (US); Daniel O. Schimpf, Menlo Park, CA (US); Andrew R. Whalley, San Francisco, CA (US); Christopher R. Whitney, Boulder, CO (US); Jonathan R. Dascola, San Francisco, CA (US); Lawrence Y. Yang, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,311

(22) Filed: Sep. 28, 2022

(65) Prior Publication Data

US 2023/0021247 A1 Jan. 19, 2023

Related U.S. Application Data

(63) Continuation of application No. 16/369,473, filed on Mar. 29, 2019, now Pat. No. 11,494,046, which is a (Continued)

(51) Int. Cl.
*G06F 3/048* (2013.01)
*G06F 3/0481* (2022.01)

(Continued)

(52) U.S. Cl.
CPC ........ *G06F 3/0481* (2013.01); *G06F 3/04883* (2013.01); *G06F 21/31* (2013.01);

(Continued)

(58) Field of Classification Search
None
See application file for complete search history.

(56) References Cited

U.S. PATENT DOCUMENTS 4,353,056 A 10/1982 Tsikos
5,229,764 A 7/1993 Matchett et al.

(Continued)

FOREIGN PATENT DOCUMENTS

AR 060465 A1 6/2008
AU 2017100556 A4 6/2017

(Continued)

OTHER PUBLICATIONS

1695163 A, CN, Cited by the Chinese Patent Office in an Office Action for related Application No. 201710198190.6 dated Jul. 5, 2022.

(Continued)

*Primary Examiner* — Thanh T Vu
(74) *Attorney, Agent, or Firm* — DLA Piper LLP (US)

(57) ABSTRACT

An electronic device with a display and a fingerprint sensor displays a fingerprint enrollment interface and detects, on (Continued)

the fingerprint sensor, a plurality of finger gestures performed with a finger. The device collects fingerprint information from the plurality of finger gestures performed with the finger. After collecting the fingerprint information, the device determines whether the collected fingerprint information is sufficient to enroll a fingerprint of the finger. When the collected fingerprint information for the finger is sufficient to enroll the fingerprint of the finger, the device enrolls the fingerprint of the finger with the device. When the collected fingerprint information for the finger is not sufficient to enroll the fingerprint of the finger, the device displays a message in the fingerprint enrollment interface prompting a user to perform one or more additional finger gestures on the fingerprint sensor with the finger.

27 Claims, 215 Drawing Sheets

Related U.S. Application Data continuation of application No. 15/900,047, filed on Feb. 20, 2018, now Pat. No. 10,262,182, which is a continuation of application No. 14/612,214, filed on Feb. 2, 2015, now Pat. No. 10,803,281, which is a continuation of application No. 14/480,183, filed on Sep. 8, 2014, now Pat. No. 9,898,642.

(60) Provisional application No. 61/875,669, filed on Sep. 9, 2013.

(51) Int. Cl.

| | |
|---|---|
| ***G06F 3/04883*** | (2022.01) |
| ***G06F 21/31*** | (2013.01) |
| ***G06F 21/32*** | (2013.01) |
| ***H04W 12/06*** | (2021.01) |
| ***H04L 9/40*** | (2022.01) |
| ***H04L 9/32*** | (2006.01) |
| ***G06F 21/41*** | (2013.01) |
| ***G06V 40/12*** | (2022.01) |
| *H04W 88/02* | (2009.01) |
| *H04W 12/68* | (2021.01) |

(52) U.S. Cl.

CPC .............. *G06F 21/32* (2013.01); *G06F 21/41* (2013.01); *G06V 40/1353* (2022.01); *H04L 9/3231* (2013.01); *H04L 63/083* (2013.01); *H04L 63/0815* (2013.01); *H04L 63/0861* (2013.01); *H04L 63/105* (2013.01); *H04W 12/06* (2013.01); *G06F 2221/2113* (2013.01); *H04W 12/68* (2021.01); *H04W 88/02* (2013.01)

(56) References Cited

U.S. PATENT DOCUMENTS

| | | | | |
|---|---|---|---|---|
| 5,237,159 | A | 8/1993 | Stephens et al. | |
| 5,265,007 | A | 11/1993 | Bamhard, Jr. et al. | |
| 5,325,442 | A | 6/1994 | Knapp | |
| 5,420,936 | A | 5/1995 | Fitzpatrick et al. | |
| 5,484,988 | A | 1/1996 | Hills et al. | |
| 5,615,384 | A | 3/1997 | Allard et al. | |
| 5,691,524 | A | 11/1997 | Josephson | |
| 5,717,868 | A | 2/1998 | James | |
| 5,767,457 | A | 6/1998 | Gerpheide et al. | |
| 5,783,808 | A | 7/1998 | Josephson | |
| 5,799,098 | A | 8/1998 | Ort et al. | |
| 5,801,763 | A | 9/1998 | Suzuki | |
| 5,828,773 | A * | 10/1998 | Setlak | G06V 40/1306 382/126 |
| 5,838,306 | A | 11/1998 | O"Connor et al. | |
| 5,852,670 | A | 12/1998 | Setlak | |
| 5,857,028 | A | 1/1999 | Frieling | |
| 5,910,989 | A | 6/1999 | Naccache | |
| 5,933,134 | A | 8/1999 | Shieh | |
| 5,943,043 | A | 8/1999 | Furuhata et al. | |
| 5,952,998 | A | 9/1999 | Clancy et al. | |
| 5,963,679 | A | 10/1999 | Setlak | |
| 5,974,150 | A | 10/1999 | Kaish et al. | |
| 5,983,197 | A | 11/1999 | Enta | |
| 6,016,484 | A | 1/2000 | Williams et al. | |
| 6,028,950 | A | 2/2000 | Merjanian | |
| 6,037,882 | A | 3/2000 | Levy | |
| 6,104,922 | A | 8/2000 | Baumann | |
| 6,111,517 | A | 8/2000 | Atick et al. | |
| 6,141,436 | A | 10/2000 | Srey et al. | |
| 6,151,208 | A | 11/2000 | Bartlett | |
| 6,151,593 | A | 11/2000 | Cho et al. | |
| 6,164,528 | A | 12/2000 | Hills et al. | |
| 6,173,402 | B1 | 1/2001 | Chapman | |
| 6,181,328 | B1 | 1/2001 | Shieh et al. | |
| 6,189,785 | B1 | 2/2001 | Lowery | |
| 6,192,380 | B1 | 2/2001 | Light et al. | |
| 6,193,152 | B1 | 2/2001 | Fernando et al. | |
| 6,193,153 | B1 | 2/2001 | Lambert | |
| 6,219,793 | B1 | 4/2001 | Li et al. | |
| 6,230,148 | B1 | 5/2001 | Pare, Jr. et al. | |
| 6,256,022 | B1 | 7/2001 | Manaresi et al. | |
| 6,260,027 | B1 | 7/2001 | Takahashi et al. | |
| 6,282,304 | B1 | 8/2001 | Novikov et al. | |
| 6,282,655 | B1 | 8/2001 | Given | |
| 6,289,114 | B1 * | 9/2001 | Mainguet | G06V 40/1335 382/284 |
| 6,292,173 | B1 | 9/2001 | Rambaldi et al. | |
| 6,317,835 | B1 | 11/2001 | Bilger et al. | |
| 6,323,846 | B1 | 11/2001 | Westerman et al. | |
| 6,327,376 | B1 | 12/2001 | Harkin | |
| 6,328,207 | B1 | 12/2001 | Gregoire et al. | |
| 6,337,919 | B1 | 1/2002 | Dunton | |
| 6,374,145 | B1 | 4/2002 | Lignoul | |
| 6,398,646 | B1 | 6/2002 | Wei et al. | |
| 6,408,087 | B1 | 6/2002 | Kramer | |
| 6,421,453 | B1 | 7/2002 | Kanevsky et al. | |
| 6,484,260 | B1 | 11/2002 | Scott et al. | |
| 6,487,662 | B1 | 11/2002 | Kharon et al. | |
| 6,498,861 | B1 | 12/2002 | Hamid et al. | |
| 6,560,612 | B1 | 5/2003 | Yamada et al. | |
| 6,560,711 | B1 | 5/2003 | Given et al. | |
| 6,570,557 | B1 | 5/2003 | Westerman et al. | |
| 6,573,883 | B1 | 6/2003 | Bartlett | |
| 6,581,042 | B2 | 6/2003 | Pare, Jr. et al. | |
| 6,603,462 | B2 | 8/2003 | Matusis | |
| 6,618,806 | B1 | 9/2003 | Brown et al. | |
| 6,639,584 | B1 | 10/2003 | Li | |
| 6,644,546 | B2 | 11/2003 | George et al. | |
| 6,662,166 | B2 | 12/2003 | Pare, Jr. et al. | |
| 6,709,333 | B1 | 3/2004 | Bradford et al. | |
| 6,720,860 | B1 | 4/2004 | Narayanaswami | |
| 6,795,569 | B1 * | 9/2004 | Setlak | G06V 40/12 382/125 |
| 6,879,710 | B1 | 4/2005 | Hinoue et al. | |
| 6,941,001 | B1 | 9/2005 | Bolle et al. | |
| 6,950,810 | B2 | 9/2005 | Lapsley et al. | |
| 6,970,855 | B2 | 11/2005 | Das et al. | |
| 6,980,081 | B2 | 12/2005 | Anderson | |
| 7,027,619 | B2 | 4/2006 | Pavlidis et al. | |
| 7,030,860 | B1 | 4/2006 | Hsu et al. | |
| 7,039,221 | B1 | 5/2006 | Tumey et al. | |
| 7,046,838 | B1 | 5/2006 | Sakagawa et al. | |
| 7,057,607 | B2 | 6/2006 | Mayoraz et al. | |
| 7,079,652 | B1 | 7/2006 | Harris | |
| 7,086,085 | B1 | 8/2006 | Brown et al. | |
| 7,099,845 | B2 | 8/2006 | Higgins et al. | |
| 7,099,850 | B1 | 8/2006 | Mann, II et al. | |
| 7,124,300 | B1 | 10/2006 | Lemke | |
| 7,130,454 | B1 | 10/2006 | Berube et al. | |
| 7,190,816 | B2 | 3/2007 | Mitsuyu et al. | |

(56) References Cited

U.S. PATENT DOCUMENTS

| | | | |
|---|---|---|---|
| 7,239,728 | B1 | 7/2007 | Choi et al. |
| 7,346,778 | B1 | 3/2008 | Guiter et al. |
| 7,346,779 | B2 | 3/2008 | Leeper |
| 7,356,516 | B2 | 4/2008 | Richey et al. |
| 7,359,880 | B2 | 4/2008 | Abel et al. |
| 7,414,613 | B2 | 8/2008 | Simelius |
| 7,415,720 | B2 | 8/2008 | Jung |
| 7,420,546 | B2 | 9/2008 | Abdallah et al. |
| 7,430,537 | B2 | 9/2008 | Templeton et al. |
| 7,525,537 | B2 | 4/2009 | Abdallah et al. |
| 7,535,344 | B2 | 5/2009 | Obradovich |
| 7,542,592 | B2 | 6/2009 | Singh et al. |
| 7,546,470 | B2 | 6/2009 | Schultz |
| 7,630,522 | B2 | 12/2009 | Popp et al. |
| 7,633,076 | B2 | 12/2009 | Huppi et al. |
| 7,644,019 | B2 | 1/2010 | Woda et al. |
| 7,657,441 | B2 | 2/2010 | Richey et al. |
| 7,657,849 | B2 | 2/2010 | Chaudhri et al. |
| 7,676,748 | B1 | 3/2010 | Barrus et al. |
| 7,688,314 | B2 | 3/2010 | Abdallah et al. |
| 7,689,013 | B2 | 3/2010 | Shinzaki |
| 7,689,508 | B2 | 3/2010 | Davis et al. |
| 7,697,729 | B2 * | 4/2010 | Howell .................. G06V 40/13 345/173 |
| 7,705,737 | B2 | 4/2010 | Senga |
| 7,730,401 | B2 | 6/2010 | Gillespie et al. |
| 7,734,930 | B2 | 6/2010 | Kirovski et al. |
| 7,738,916 | B2 | 6/2010 | Fukuda |
| 7,860,536 | B2 | 12/2010 | Jobs et al. |
| 7,860,936 | B1 | 12/2010 | Newstadt et al. |
| RE42,038 | E | 1/2011 | Abdallah et al. |
| 7,921,297 | B2 | 4/2011 | Ortiz et al. |
| RE42,574 | E | 7/2011 | Cockayne |
| 8,006,299 | B2 | 8/2011 | Suominen |
| 8,018,440 | B2 | 9/2011 | Townsend et al. |
| 8,042,157 | B2 | 10/2011 | Bennett et al. |
| 8,050,997 | B1 | 11/2011 | Nosek et al. |
| 8,060,571 | B2 | 11/2011 | Rao |
| 8,095,634 | B2 | 1/2012 | Rao et al. |
| 8,131,848 | B1 | 3/2012 | Denise |
| 8,145,912 | B2 | 3/2012 | Mclean |
| 8,157,164 | B1 | 4/2012 | Billman |
| 8,195,507 | B2 | 6/2012 | Postrel |
| 8,195,576 | B1 | 6/2012 | Grigg et al. |
| 8,254,642 | B2 | 8/2012 | Kobayashi et al. |
| 8,254,647 | B1 | 8/2012 | Nechyba et al. |
| 8,311,514 | B2 | 11/2012 | Bandyopadhyay et al. |
| 8,336,086 | B2 | 12/2012 | Seo |
| 8,341,557 | B2 | 12/2012 | Pisula et al. |
| 8,392,259 | B2 | 3/2013 | Macgillivray et al. |
| 8,395,658 | B2 | 3/2013 | Corson |
| 8,396,265 | B1 | 3/2013 | Ross et al. |
| 8,438,400 | B2 | 5/2013 | Hoghaug et al. |
| 8,452,654 | B1 | 5/2013 | Wooters et al. |
| 8,452,978 | B2 | 5/2013 | Alward et al. |
| 8,488,040 | B2 | 7/2013 | Chen et al. |
| 8,526,915 | B2 | 9/2013 | Kakiuchi et al. |
| 8,538,158 | B1 | 9/2013 | Denise |
| 8,543,834 | B1 | 9/2013 | Barra |
| 8,560,004 | B1 | 10/2013 | Tsvetkov et al. |
| 8,571,937 | B2 | 10/2013 | Rose et al. |
| 8,581,877 | B2 | 11/2013 | Yoo |
| 8,583,549 | B1 | 11/2013 | Mohsenzadeh |
| 8,606,512 | B1 | 12/2013 | Bogovich et al. |
| 8,606,640 | B2 | 12/2013 | Brody et al. |
| 8,619,050 | B2 | 12/2013 | Herz et al. |
| 8,638,385 | B2 | 1/2014 | Bhogal |
| 8,639,621 | B1 | 1/2014 | Kennedy et al. |
| 8,679,012 | B1 | 3/2014 | Kayyali |
| 8,762,272 | B1 | 6/2014 | Cozens et al. |
| 8,763,896 | B2 | 7/2014 | Kushevsky et al. |
| 8,769,624 | B2 | 7/2014 | Cotterill |
| 8,782,775 | B2 | 7/2014 | Fadell et al. |
| 8,788,838 | B1 | 7/2014 | Fadell et al. |
| 8,831,677 | B2 | 9/2014 | Villa-real |
| 8,880,055 | B1 | 11/2014 | Clement et al. |
| 8,892,474 | B1 | 11/2014 | Inskeep et al. |
| 8,904,479 | B1 | 12/2014 | Johansson et al. |
| 8,913,801 | B2 | 12/2014 | Han et al. |
| 8,913,802 | B2 | 12/2014 | Han et al. |
| 8,942,420 | B2 | 1/2015 | Kim et al. |
| 8,943,580 | B2 | 1/2015 | Fadell et al. |
| 8,949,618 | B1 | 2/2015 | Lee et al. |
| 8,949,902 | B1 | 2/2015 | Fabian-Isaacs et al. |
| 8,963,806 | B1 | 2/2015 | Starner et al. |
| 8,994,499 | B2 | 3/2015 | Zhao et al. |
| 9,002,322 | B2 | 4/2015 | Cotterill |
| 9,031,847 | B2 | 5/2015 | Sarin et al. |
| 9,038,167 | B2 | 5/2015 | Fadell et al. |
| 9,053,293 | B2 | 6/2015 | Latzina |
| 9,128,601 | B2 | 9/2015 | Fadell et al. |
| 9,134,896 | B2 | 9/2015 | Fadell et al. |
| 9,177,130 | B2 | 11/2015 | Nechyba et al. |
| 9,179,298 | B2 | 11/2015 | Jung et al. |
| 9,250,795 | B2 | 2/2016 | Fadell et al. |
| 9,253,375 | B2 | 2/2016 | Milanfar et al. |
| 9,269,083 | B1 | 2/2016 | Jarajapu et al. |
| 9,269,196 | B1 | 2/2016 | Fan et al. |
| 9,274,647 | B2 | 3/2016 | Fadell et al. |
| 9,294,476 | B1 | 3/2016 | Lurey et al. |
| 9,304,624 | B2 | 4/2016 | Fadell et al. |
| 9,324,067 | B2 | 4/2016 | Van Os et al. |
| 9,329,771 | B2 | 5/2016 | Fadell et al. |
| 9,342,674 | B2 | 5/2016 | Abdallah et al. |
| 9,349,035 | B1 | 5/2016 | Gerber et al. |
| 9,355,393 | B2 | 5/2016 | Purves et al. |
| 9,411,460 | B2 | 8/2016 | Dumont et al. |
| 9,477,872 | B2 | 10/2016 | Sarve et al. |
| 9,483,763 | B2 | 11/2016 | Van Os et al. |
| 9,495,531 | B2 | 11/2016 | Fadell et al. |
| 9,519,771 | B2 | 12/2016 | Fadell et al. |
| 9,519,901 | B1 | 12/2016 | Dorogusker |
| 9,526,127 | B1 | 12/2016 | Taubman et al. |
| 9,558,636 | B1 | 1/2017 | Burdick |
| 9,569,605 | B1 | 2/2017 | Schneider et al. |
| 9,569,655 | B2 * | 2/2017 | Harper ................. G06V 10/771 |
| 9,600,709 | B2 * | 3/2017 | Russo ................ G06V 40/1335 |
| 9,613,245 | B1 | 4/2017 | Eltoft et al. |
| 9,716,825 | B1 | 7/2017 | Manzari et al. |
| 9,817,549 | B2 | 11/2017 | Chandrasekaran |
| 9,847,999 | B2 | 12/2017 | Van Os et al. |
| 9,851,214 | B1 | 12/2017 | Chintakindi |
| 9,881,198 | B2 | 1/2018 | Lee et al. |
| 9,898,642 | B2 | 2/2018 | Han et al. |
| 9,913,246 | B1 | 3/2018 | Carey et al. |
| 9,953,149 | B2 | 4/2018 | Tussy |
| 9,984,270 | B2 | 5/2018 | Yousefpor et al. |
| 10,003,738 | B2 | 6/2018 | Lautenbach et al. |
| 10,019,904 | B1 | 7/2018 | Chan et al. |
| 10,073,541 | B1 | 9/2018 | Baldwin |
| 10,089,607 | B2 | 10/2018 | Ziat et al. |
| 10,334,054 | B2 | 6/2019 | Van Os et al. |
| 10,410,035 | B2 | 9/2019 | Han et al. |
| 10,482,461 | B2 | 11/2019 | Van Os et al. |
| 10,749,967 | B2 | 8/2020 | Van Os et al. |
| 10,805,758 | B2 | 10/2020 | Norris et al. |
| 10,971,171 | B2 * | 4/2021 | Davis ................ H04M 1/72469 |
| 11,100,349 | B2 | 8/2021 | Cohen et al. |
| 2001/0031072 | A1 | 10/2001 | Dobashi et al. |
| 2001/0039497 | A1 | 11/2001 | Hubbard |
| 2001/0044906 | A1 | 11/2001 | Kanevsky et al. |
| 2001/0047365 | A1 | 11/2001 | Yonaitis |
| 2001/0047488 | A1 | 11/2001 | Verplaetse et al. |
| 2002/0004760 | A1 | 1/2002 | Yoshida et al. |
| 2002/0015024 | A1 | 2/2002 | Westerman et al. |
| 2002/0046064 | A1 | 4/2002 | Maury et al. |
| 2002/0059295 | A1 | 5/2002 | Ludtke et al. |
| 2002/0061130 | A1 | 5/2002 | Kirk et al. |
| 2002/0065774 | A1 | 5/2002 | Young et al. |
| 2002/0095588 | A1 | 7/2002 | Shigematsu et al. |
| 2002/0097145 | A1 | 7/2002 | Tumey et al. |
| 2002/0136435 | A1 | 9/2002 | Prokoski |
| 2002/0141586 | A1 | 10/2002 | Margalit et al. |
| 2002/0190960 | A1 | 12/2002 | Kuo et al. |

(56) References Cited

U.S. PATENT DOCUMENTS

| | | | |
|---|---|---|---|
| 2002/0191029 | A1 | 12/2002 | Gillespie et al. |
| 2002/0191817 | A1 | 12/2002 | Sato et al. |
| 2003/0006280 | A1 | 1/2003 | Seita et al. |
| 2003/0028639 | A1 | 2/2003 | Yamamoto et al. |
| 2003/0038754 | A1 | 2/2003 | Goldstein et al. |
| 2003/0046557 | A1 | 3/2003 | Miller et al. |
| 2003/0048173 | A1 | 3/2003 | Shigematsu et al. |
| 2003/0059092 | A1 | 3/2003 | Okubo et al. |
| 2003/0097413 | A1 | 5/2003 | Vishik et al. |
| 2003/0103652 | A1 | 6/2003 | Lee et al. |
| 2003/0115490 | A1 | 6/2003 | Russo et al. |
| 2003/0118217 | A1 | 6/2003 | Kondo et al. |
| 2003/0120934 | A1 | 6/2003 | Ortiz |
| 2003/0132974 | A1 | 7/2003 | Bodin |
| 2003/0138136 | A1 | 7/2003 | Umezaki et al. |
| 2003/0141959 | A1 | 7/2003 | Keogh et al. |
| 2003/0142227 | A1 | 7/2003 | Van Zee |
| 2003/0160815 | A1 | 8/2003 | Muschetto |
| 2003/0163710 | A1 | 8/2003 | Ortiz et al. |
| 2003/0181201 | A1 | 9/2003 | Bomze et al. |
| 2003/0188183 | A1 | 10/2003 | Lee et al. |
| 2003/0195935 | A1 | 10/2003 | Leeper |
| 2003/0200184 | A1 | 10/2003 | Dominguez et al. |
| 2003/0210127 | A1 | 11/2003 | Anderson |
| 2003/0236746 | A1 | 12/2003 | Turner et al. |
| 2004/0010722 | A1 | 1/2004 | Ha |
| 2004/0030934 | A1 | 2/2004 | Mizoguchi et al. |
| 2004/0073432 | A1 | 4/2004 | Stone |
| 2004/0076310 | A1 | 4/2004 | Hersch et al. |
| 2004/0085300 | A1 | 5/2004 | Matusis et al. |
| 2004/0085351 | A1 | 5/2004 | Tokkonen et al. |
| 2004/0088564 | A1 | 5/2004 | Norman |
| 2004/0091136 | A1 | 5/2004 | Dombrowski |
| 2004/0104268 | A1 | 6/2004 | Bailey |
| 2004/0113819 | A1 | 6/2004 | Gauthey et al. |
| 2004/0122685 | A1 | 6/2004 | Bunce |
| 2004/0131237 | A1 | 7/2004 | Machida |
| 2004/0135801 | A1 | 7/2004 | Thompson et al. |
| 2004/0137890 | A1 | 7/2004 | Kalke |
| 2004/0143553 | A1 | 7/2004 | Torget et al. |
| 2004/0169722 | A1 | 9/2004 | Pena |
| 2004/0172562 | A1 | 9/2004 | Berger et al. |
| 2004/0181695 | A1 | 9/2004 | Walker et al. |
| 2004/0196400 | A1 | 10/2004 | Stavely et al. |
| 2004/0210771 | A1 | 10/2004 | Wood et al. |
| 2004/0215572 | A1 | 10/2004 | Uehara et al. |
| 2004/0229560 | A1 | 11/2004 | Maloney |
| 2004/0230843 | A1 | 11/2004 | Jansen |
| 2004/0239648 | A1 | 12/2004 | Abdallah et al. |
| 2004/0239732 | A1 | 12/2004 | Silverbrook |
| 2004/0242200 | A1 | 12/2004 | Maeoka et al. |
| 2004/0250138 | A1 | 12/2004 | Schneider |
| 2004/0252867 | A1 | 12/2004 | Lan et al. |
| 2004/0254891 | A1 | 12/2004 | Blinn et al. |
| 2004/0257196 | A1 | 12/2004 | Kotzin |
| 2004/0260955 | A1 | 12/2004 | Mantyla |
| 2005/0024341 | A1 | 2/2005 | Gillespie et al. |
| 2005/0028082 | A1 | 2/2005 | Topalov et al. |
| 2005/0040962 | A1 | 2/2005 | Funkhouser et al. |
| 2005/0041841 | A1 | 2/2005 | Yoo et al. |
| 2005/0060554 | A1 | 3/2005 | O'donoghue |
| 2005/0071188 | A1 | 3/2005 | Thuerk |
| 2005/0071635 | A1 | 3/2005 | Furuyama |
| 2005/0071647 | A1 | 3/2005 | Fujinuma et al. |
| 2005/0078855 | A1 | 4/2005 | Chandler et al. |
| 2005/0079896 | A1 | 4/2005 | Kokko et al. |
| 2005/0091213 | A1 | 4/2005 | Schutz et al. |
| 2005/0093834 | A1 | 5/2005 | Abdallah et al. |
| 2005/0093868 | A1 | 5/2005 | Hinckley |
| 2005/0096009 | A1 | 5/2005 | Ackley |
| 2005/0097171 | A1 | 5/2005 | Hikichi |
| 2005/0097608 | A1 | 5/2005 | Penke et al. |
| 2005/0100198 | A1 | 5/2005 | Nakano et al. |
| 2005/0105778 | A1 | 5/2005 | Sung et al. |
| 2005/0110801 | A1 | 5/2005 | Lin |
| 2005/0111708 | A1 | 5/2005 | Chou |
| 2005/0113071 | A1 | 5/2005 | Nagata |
| 2005/0114686 | A1 | 5/2005 | Ball et al. |
| 2005/0144452 | A1 | 6/2005 | Lynch et al. |
| 2005/0169503 | A1 | 8/2005 | Howell et al. |
| 2005/0174325 | A1 | 8/2005 | Setlak et al. |
| 2005/0187873 | A1 | 8/2005 | Labrou et al. |
| 2005/0190059 | A1 | 9/2005 | Wehrenberg |
| 2005/0204173 | A1 | 9/2005 | Chang |
| 2005/0206501 | A1 | 9/2005 | Farhat |
| 2005/0220304 | A1 | 10/2005 | Lenoir et al. |
| 2005/0221798 | A1 | 10/2005 | Sengupta et al. |
| 2005/0226472 | A1 | 10/2005 | Komura et al. |
| 2005/0231625 | A1 | 10/2005 | Parulski et al. |
| 2005/0250538 | A1 | 11/2005 | Narasimhan et al. |
| 2005/0253814 | A1 | 11/2005 | Ghassabian |
| 2005/0253817 | A1 | 11/2005 | Rytivaara et al. |
| 2005/0254086 | A1 | 11/2005 | Shouno |
| 2006/0017692 | A1 | 1/2006 | Wehrenberg et al. |
| 2006/0021003 | A1 | 1/2006 | Fisher et al. |
| 2006/0032908 | A1 | 2/2006 | Sines |
| 2006/0039686 | A1 | 2/2006 | Soh et al. |
| 2006/0056664 | A1 | 3/2006 | Iwasaki |
| 2006/0064313 | A1 | 3/2006 | Steinbarth et al. |
| 2006/0075228 | A1 | 4/2006 | Black et al. |
| 2006/0075250 | A1 | 4/2006 | Liao |
| 2006/0078176 | A1 | 4/2006 | Abiko et al. |
| 2006/0080525 | A1 | 4/2006 | Ritter et al. |
| 2006/0093183 | A1 | 5/2006 | Hosoi et al. |
| 2006/0093192 | A1 | 5/2006 | Bechtel |
| 2006/0097172 | A1 | 5/2006 | Park |
| 2006/0102843 | A1 | 5/2006 | Bazakos et al. |
| 2006/0104488 | A1 | 5/2006 | Bazakos et al. |
| 2006/0107067 | A1 | 5/2006 | Safal et al. |
| 2006/0115130 | A1 | 6/2006 | Kozlay |
| 2006/0116555 | A1 | 6/2006 | Pavlidis et al. |
| 2006/0120707 | A1 | 6/2006 | Kusakari et al. |
| 2006/0136087 | A1 | 6/2006 | Higashiura |
| 2006/0136734 | A1 | 6/2006 | Telek et al. |
| 2006/0156028 | A1 | 7/2006 | Aoyama et al. |
| 2006/0165060 | A1 | 7/2006 | Dua et al. |
| 2006/0179404 | A1 | 8/2006 | Yolleck et al. |
| 2006/0192868 | A1 | 8/2006 | Wakamori |
| 2006/0206709 | A1 | 9/2006 | Labrou et al. |
| 2006/0208065 | A1 | 9/2006 | Mendelovich et al. |
| 2006/0214910 | A1 | 9/2006 | Mizuno et al. |
| 2006/0215886 | A1 | 9/2006 | Black |
| 2006/0219776 | A1 | 10/2006 | Finn |
| 2006/0224645 | A1 | 10/2006 | Kadi |
| 2006/0234764 | A1 | 10/2006 | Gamo et al. |
| 2006/0239517 | A1 | 10/2006 | Creasey et al. |
| 2006/0274920 | A1 | 12/2006 | Tochikubo et al. |
| 2006/0282671 | A1 | 12/2006 | Burton |
| 2006/0282682 | A1 | 12/2006 | Masaki et al. |
| 2006/0285663 | A1 | 12/2006 | Rathus et al. |
| 2006/0288226 | A1 | 12/2006 | Kowal |
| 2006/0288234 | A1 | 12/2006 | Azar et al. |
| 2006/0294007 | A1 | 12/2006 | Barthelemy |
| 2006/0294025 | A1 | 12/2006 | Mengerink |
| 2007/0008066 | A1 | 1/2007 | Fukuda |
| 2007/0009139 | A1 | 1/2007 | Landschaft et al. |
| 2007/0014439 | A1 | 1/2007 | Ando et al. |
| 2007/0016958 | A1 | 1/2007 | Bodepudi et al. |
| 2007/0021194 | A1 | 1/2007 | Aida |
| 2007/0025723 | A1 | 2/2007 | Baudisch et al. |
| 2007/0061126 | A1 | 3/2007 | Russo et al. |
| 2007/0061889 | A1 | 3/2007 | Sainaney et al. |
| 2007/0067642 | A1 | 3/2007 | Singhal |
| 2007/0073649 | A1 | 3/2007 | Kikkoji et al. |
| 2007/0079137 | A1 | 4/2007 | Tu |
| 2007/0081081 | A1 | 4/2007 | Cheng |
| 2007/0089164 | A1 | 4/2007 | Gao et al. |
| 2007/0106942 | A1 | 5/2007 | Sanaka et al. |
| 2007/0109274 | A1 | 5/2007 | Reynolds |
| 2007/0110287 | A1 | 5/2007 | Kim et al. |
| 2007/0126859 | A1 | 6/2007 | Choi et al. |
| 2007/0131759 | A1 | 6/2007 | Cox et al. |
| 2007/0143628 | A1 | 6/2007 | Genda |
| 2007/0150842 | A1 | 6/2007 | Chaudhri et al. |

(56) References Cited

U.S. PATENT DOCUMENTS

| | | | |
|---|---|---|---|
| 2007/0180492 | A1 | 8/2007 | Hassan et al. |
| 2007/0186106 | A1 | 8/2007 | Ting et al. |
| 2007/0189583 | A1 | 8/2007 | Shimada et al. |
| 2007/0192168 | A1 | 8/2007 | Van |
| 2007/0194113 | A1 | 8/2007 | Esplin et al. |
| 2007/0200916 | A1 | 8/2007 | Han |
| 2007/0201730 | A1 | 8/2007 | Masaki et al. |
| 2007/0204037 | A1 | 8/2007 | Kunz et al. |
| 2007/0208743 | A1 | 9/2007 | Sainaney et al. |
| 2007/0219901 | A1 | 9/2007 | Garbow et al. |
| 2007/0220273 | A1 | 9/2007 | Campisi |
| 2007/0226778 | A1 | 9/2007 | Pietruszka |
| 2007/0230773 | A1 | 10/2007 | Nagao et al. |
| 2007/0236330 | A1 | 10/2007 | Cho et al. |
| 2007/0236475 | A1 | 10/2007 | Wherry |
| 2007/0239921 | A1 | 10/2007 | Toorians et al. |
| 2007/0250573 | A1 | 10/2007 | Rothschild et al. |
| 2007/0253604 | A1 | 11/2007 | Inoue et al. |
| 2007/0255564 | A1 | 11/2007 | Yee et al. |
| 2007/0259716 | A1 | 11/2007 | Mattice et al. |
| 2007/0260547 | A1 | 11/2007 | Little |
| 2007/0260558 | A1 | 11/2007 | Look |
| 2007/0277224 | A1 | 11/2007 | Osborn et al. |
| 2007/0280515 | A1 | 12/2007 | Goto |
| 2007/0287423 | A1 | 12/2007 | Kakiuchi et al. |
| 2007/0294182 | A1 | 12/2007 | Hammad |
| 2008/0001703 | A1 | 1/2008 | Goto |
| 2008/0027947 | A1 | 1/2008 | Pritchett et al. |
| 2008/0032801 | A1 | 2/2008 | Brunet De Courssou |
| 2008/0040786 | A1 | 2/2008 | Chang et al. |
| 2008/0041936 | A1 | 2/2008 | Vawter |
| 2008/0042866 | A1 | 2/2008 | Morse et al. |
| 2008/0042983 | A1 | 2/2008 | Kim et al. |
| 2008/0048878 | A1 | 2/2008 | Boillot |
| 2008/0049984 | A1 | 2/2008 | Poo et al. |
| 2008/0052181 | A1 | 2/2008 | Devitt-Carolan et al. |
| 2008/0054081 | A1 | 3/2008 | Mullen |
| 2008/0059351 | A1 | 3/2008 | Richey et al. |
| 2008/0069412 | A1 | 3/2008 | Champagne et al. |
| 2008/0072045 | A1 | 3/2008 | Mizrah |
| 2008/0084539 | A1 | 4/2008 | Daniel |
| 2008/0092245 | A1 | 4/2008 | Alward et al. |
| 2008/0114678 | A1 | 5/2008 | Bennett et al. |
| 2008/0114980 | A1 | 5/2008 | Sridhar |
| 2008/0120707 | A1 | 5/2008 | Ramia et al. |
| 2008/0133931 | A1 | 6/2008 | Kosaka |
| 2008/0165255 | A1 | 7/2008 | Christie et al. |
| 2008/0172598 | A1 | 7/2008 | Jacobsen et al. |
| 2008/0178283 | A1 | 7/2008 | Pratt et al. |
| 2008/0208762 | A1 | 8/2008 | Arthur et al. |
| 2008/0212849 | A1 | 9/2008 | Gao |
| 2008/0229409 | A1 | 9/2008 | Miller et al. |
| 2008/0231729 | A1 | 9/2008 | Sato et al. |
| 2008/0244440 | A1 | 10/2008 | Bailey et al. |
| 2008/0246917 | A1 | 10/2008 | Phinney et al. |
| 2008/0250481 | A1 | 10/2008 | Beck et al. |
| 2008/0275779 | A1 | 11/2008 | Lakshminarayanan |
| 2008/0292144 | A1 | 11/2008 | Kim et al. |
| 2008/0309632 | A1 | 12/2008 | Westerman et al. |
| 2008/0314971 | A1 | 12/2008 | Faith et al. |
| 2008/0317292 | A1 | 12/2008 | Baker et al. |
| 2008/0319875 | A1 | 12/2008 | Levchin et al. |
| 2009/0005165 | A1 | 1/2009 | Arezina et al. |
| 2009/0006292 | A1 | 1/2009 | Block |
| 2009/0006991 | A1 | 1/2009 | Lindberg et al. |
| 2009/0031375 | A1 | 1/2009 | Sullivan et al. |
| 2009/0036165 | A1 | 2/2009 | Brede |
| 2009/0037742 | A1 | 2/2009 | Narayanaswami |
| 2009/0054044 | A1 | 2/2009 | Ikemori et al. |
| 2009/0055484 | A1 | 2/2009 | Vuong et al. |
| 2009/0061837 | A1 | 3/2009 | Chaudhri et al. |
| 2009/0063851 | A1 | 3/2009 | Nijdam |
| 2009/0064055 | A1 | 3/2009 | Chaudhri et al. |
| 2009/0067685 | A1 | 3/2009 | Boshra et al. |
| 2009/0074255 | A1 | 3/2009 | Holm |
| 2009/0082066 | A1 | 3/2009 | Katz |
| 2009/0083847 | A1 | 3/2009 | Fadell et al. |
| 2009/0083850 | A1 | 3/2009 | Fadell et al. |
| 2009/0094681 | A1 | 4/2009 | Sadler et al. |
| 2009/0106558 | A1 | 4/2009 | Delgrosso et al. |
| 2009/0119754 | A1 | 5/2009 | Schubert |
| 2009/0122149 | A1 | 5/2009 | Ishii |
| 2009/0144074 | A1 | 6/2009 | Choi |
| 2009/0146779 | A1 | 6/2009 | Kumar et al. |
| 2009/0158390 | A1 | 6/2009 | Guan |
| 2009/0159696 | A1 | 6/2009 | Mullen |
| 2009/0160609 | A1 | 6/2009 | Lin et al. |
| 2009/0164878 | A1 | 6/2009 | Cottrille |
| 2009/0165107 | A1 | 6/2009 | Tojo et al. |
| 2009/0168756 | A1 | 7/2009 | Kurapati et al. |
| 2009/0173784 | A1 | 7/2009 | Yang et al. |
| 2009/0175509 | A1 | 7/2009 | Gonion et al. |
| 2009/0176565 | A1 | 7/2009 | Kelly et al. |
| 2009/0187423 | A1 | 7/2009 | Kim |
| 2009/0193514 | A1 | 7/2009 | Adams et al. |
| 2009/0199188 | A1 | 8/2009 | Fujimaki |
| 2009/0201257 | A1 | 8/2009 | Saitoh et al. |
| 2009/0210308 | A1 | 8/2009 | Toomer et al. |
| 2009/0215533 | A1 | 8/2009 | Zalewski et al. |
| 2009/0224874 | A1 | 9/2009 | Dewar et al. |
| 2009/0228938 | A1 | 9/2009 | White et al. |
| 2009/0241169 | A1 | 9/2009 | Dhand et al. |
| 2009/0258667 | A1 | 10/2009 | Suzuki et al. |
| 2009/0307139 | A1 | 12/2009 | Mardikar et al. |
| 2009/0327744 | A1 | 12/2009 | Hatano et al. |
| 2009/0328162 | A1 | 12/2009 | Kokumai et al. |
| 2010/0008545 | A1 | 1/2010 | Ueki et al. |
| 2010/0023449 | A1 | 1/2010 | Skowronek et al. |
| 2010/0026453 | A1 | 2/2010 | Yamamoto et al. |
| 2010/0026640 | A1 | 2/2010 | Kim et al. |
| 2010/0027854 | A1 | 2/2010 | Chatterjee et al. |
| 2010/0034432 | A1 | 2/2010 | Ono et al. |
| 2010/0042835 | A1 | 2/2010 | Lee et al. |
| 2010/0078471 | A1 | 4/2010 | Lin et al. |
| 2010/0078472 | A1 | 4/2010 | Lin et al. |
| 2010/0082462 | A1 | 4/2010 | Yuan et al. |
| 2010/0082481 | A1 | 4/2010 | Lin et al. |
| 2010/0082485 | A1 | 4/2010 | Lin et al. |
| 2010/0107229 | A1 | 4/2010 | Najafi et al. |
| 2010/0114731 | A1 | 5/2010 | Kingston et al. |
| 2010/0124363 | A1 | 5/2010 | Ek et al. |
| 2010/0131303 | A1 | 5/2010 | Collopy et al. |
| 2010/0146384 | A1 | 6/2010 | Peev et al. |
| 2010/0153265 | A1 | 6/2010 | Hershfield et al. |
| 2010/0158327 | A1 | 6/2010 | Kangas et al. |
| 2010/0164684 | A1 | 7/2010 | Sasa et al. |
| 2010/0164864 | A1 | 7/2010 | Chou et al. |
| 2010/0182125 | A1 | 7/2010 | Abdallah et al. |
| 2010/0185871 | A1 | 7/2010 | Scherrer et al. |
| 2010/0191570 | A1 | 7/2010 | Michaud et al. |
| 2010/0205091 | A1 | 8/2010 | Graziano et al. |
| 2010/0207721 | A1 | 8/2010 | Nakajima et al. |
| 2010/0216425 | A1 | 8/2010 | Smith |
| 2010/0223145 | A1 | 9/2010 | Dragt |
| 2010/0225607 | A1 | 9/2010 | Kim |
| 2010/0231356 | A1 | 9/2010 | Kim |
| 2010/0237991 | A1 | 9/2010 | Prabhu et al. |
| 2010/0240415 | A1 | 9/2010 | Kim et al. |
| 2010/0243741 | A1 | 9/2010 | Eng |
| 2010/0251243 | A1 | 9/2010 | Gill et al. |
| 2010/0265204 | A1 | 10/2010 | Tsuda |
| 2010/0267362 | A1 | 10/2010 | Smith et al. |
| 2010/0269156 | A1 | 10/2010 | Hohlfeld et al. |
| 2010/0273461 | A1 | 10/2010 | Choi |
| 2010/0302016 | A1 | 12/2010 | Zaborowski |
| 2010/0306107 | A1 | 12/2010 | Nahari et al. |
| 2010/0311397 | A1 | 12/2010 | Li |
| 2010/0313263 | A1 | 12/2010 | Uchida et al. |
| 2011/0013813 | A1 | 1/2011 | Yamamoto et al. |
| 2011/0035799 | A1 | 2/2011 | Handler |
| 2011/0050976 | A1 | 3/2011 | Kwon |
| 2011/0052013 | A1 | 3/2011 | Sasahara et al. |
| 2011/0054268 | A1 | 3/2011 | Fidacaro et al. |
| 2011/0055763 | A1 | 3/2011 | Utsuki et al. |

(56) References Cited

U.S. PATENT DOCUMENTS

2011/0065479 A1 3/2011 Nader
2011/0067098 A1 3/2011 Ruggiero et al.
2011/0088086 A1 4/2011 Swink et al.
2011/0099079 A1 4/2011 White et al.
2011/0119610 A1 5/2011 Hackborn et al.
2011/0122294 A1 5/2011 Suh et al.
2011/0138166 A1 6/2011 Peszek et al.
2011/0142234 A1 6/2011 Rogers
2011/0145049 A1 6/2011 Hertel et al.
2011/0149874 A1 6/2011 Reif
2011/0161116 A1 6/2011 Peak et al.
2011/0164269 A1 7/2011 Kamishiro
2011/0175703 A1 7/2011 Benkley, III
2011/0187497 A1 8/2011 Chin
2011/0201306 A1 8/2011 Ali Al-Harbi
2011/0225057 A1 9/2011 Webb et al.
2011/0230769 A1 9/2011 Yamazaki
2011/0231914 A1 9/2011 Hung
2011/0251892 A1 10/2011 Laracey
2011/0254683 A1 10/2011 Soldan et al.
2011/0286640 A1 11/2011 Kwon et al.
2011/0288970 A1 11/2011 Kidron et al.
2011/0296324 A1 12/2011 Goossens et al.
2011/0300829 A1 12/2011 Nurmi et al.
2012/0009896 A1 1/2012 Bandyopadhyay et al.
2012/0023185 A1 1/2012 Holden et al.
2012/0023573 A1 1/2012 Shi
2012/0028609 A1 2/2012 Hruska et al.
2012/0028659 A1 2/2012 Whitney et al.
2012/0028695 A1 2/2012 Walker et al.
2012/0032891 A1 2/2012 Parivar et al.
2012/0036556 A1 2/2012 Lebeau et al.
2012/0069231 A1 3/2012 Chao
2012/0072546 A1 3/2012 Etchegoyen
2012/0078751 A1 3/2012 Macphail et al.
2012/0081282 A1 4/2012 Chin
2012/0089507 A1 4/2012 Zhang et al.
2012/0123806 A1 5/2012 Schumann et al.
2012/0123937 A1 5/2012 Spodak et al.
2012/0139698 A1 6/2012 Tsui et al.
2012/0185397 A1 7/2012 Levovitz
2012/0197740 A1 8/2012 Grigg et al.
2012/0197743 A1 8/2012 Grigg et al.
2012/0200489 A1 8/2012 Miyashita et al.
2012/0215553 A1 8/2012 Leston
2012/0218125 A1 8/2012 Demirdjian et al.
2012/0221464 A1 8/2012 Pasquero et al.
2012/0235790 A1 9/2012 Zhao et al.
2012/0238363 A1 9/2012 Watanabe et al.
2012/0245985 A1 9/2012 Cho et al.
2012/0267432 A1 10/2012 Kuttuva
2012/0271712 A1 10/2012 Katzin et al.
2012/0280917 A1 11/2012 Toksvig et al.
2012/0283871 A1 11/2012 Chai et al.
2012/0284185 A1 11/2012 Mettler et al.
2012/0290449 A1 11/2012 Mullen et al.
2012/0291121 A1 11/2012 Huang et al.
2012/0293438 A1 11/2012 Chaudhri et al.
2012/0295708 A1 11/2012 Hernandez-Abrego et al.
2012/0310760 A1 12/2012 Phillips et al.
2012/0311499 A1 12/2012 Dellinger et al.
2012/0316933 A1 12/2012 Pentland et al.
2012/0322370 A1 12/2012 Lee
2012/0322371 A1 12/2012 Lee
2013/0013499 A1 1/2013 Kalgi
2013/0015946 A1 1/2013 Lau et al.
2013/0030934 A1 1/2013 Bakshi et al.
2013/0031217 A1 1/2013 Rajapakse
2013/0047233 A1 2/2013 Fisk et al.
2013/0047236 A1 2/2013 Singh
2013/0050263 A1 2/2013 Khoe et al.
2013/0054336 A1 2/2013 Graylin
2013/0060678 A1 3/2013 Oskolkov et al.
2013/0067545 A1 3/2013 Hanes
2013/0073321 A1 3/2013 Hofmann et al.
2013/0074194 A1 3/2013 White et al.
2013/0080272 A1 3/2013 Ronca et al.
2013/0080275 A1 3/2013 Ronca et al.
2013/0082819 A1 4/2013 Cotterill
2013/0082974 A1 4/2013 Kerr et al.
2013/0085931 A1 4/2013 Runyan
2013/0085936 A1 4/2013 Law et al.
2013/0086637 A1 4/2013 Cotterill et al.
2013/0102281 A1 4/2013 Kanda et al.
2013/0103519 A1 4/2013 Kountotsis et al.
2013/0110719 A1 5/2013 Carter et al.
2013/0122866 A1 5/2013 Huang
2013/0124423 A1 5/2013 Fisher
2013/0129162 A1 5/2013 Cheng et al.
2013/0136341 A1 5/2013 Yamamoto
2013/0145448 A1 6/2013 Newell
2013/0148867 A1 6/2013 Wang
2013/0151414 A1 6/2013 Zhu et al.
2013/0160110 A1 6/2013 Schechter et al.
2013/0166325 A1 6/2013 Ganapathy et al.
2013/0169549 A1 7/2013 Seymour et al.
2013/0176208 A1 7/2013 Tanaka et al.
2013/0189953 A1 7/2013 Mathews
2013/0198112 A1 8/2013 Bhat et al.
2013/0200146 A1 8/2013 Moghadam et al.
2013/0212655 A1 8/2013 Hoyos et al.
2013/0216108 A1 8/2013 Hwang et al.
2013/0218721 A1 8/2013 Borhan et al.
2013/0222323 A1 8/2013 Mckenzie
2013/0223696 A1 8/2013 Azar et al.
2013/0226792 A1 8/2013 Kushevsky et al.
2013/0232073 A1 9/2013 Sheets et al.
2013/0239202 A1 9/2013 Adams et al.
2013/0243264 A1 9/2013 Aoki
2013/0244615 A1 9/2013 Miller
2013/0247175 A1 9/2013 Nechyba et al.
2013/0262857 A1 10/2013 Neuman et al.
2013/0279768 A1* 10/2013 Boshra .................... G06F 21/32
382/124
2013/0282577 A1 10/2013 Milne
2013/0286161 A1 10/2013 Lv et al.
2013/0290187 A1 10/2013 Itwaru
2013/0297414 A1 11/2013 Goldfarb et al.
2013/0301832 A1 11/2013 Harper
2013/0304514 A1 11/2013 Hyde et al.
2013/0304651 A1 11/2013 Smith et al.
2013/0307771 A1 11/2013 Parker et al.
2013/0312087 A1 11/2013 Latzina
2013/0326563 A1 12/2013 Mulcahy et al.
2013/0332358 A1 12/2013 Zhao
2013/0332364 A1 12/2013 Templeton et al.
2013/0333006 A1 12/2013 Tapling et al.
2013/0336527 A1 12/2013 Nechyba et al.
2013/0336545 A1 12/2013 Pritikin et al.
2013/0342672 A1 12/2013 Gray et al.
2013/0346273 A1 12/2013 Stockton et al.
2013/0346302 A1 12/2013 Purves et al.
2014/0003677 A1 1/2014 Han et al.
2014/0006155 A1 1/2014 Ramirez et al.
2014/0006285 A1 1/2014 Chi et al.
2014/0013422 A1 1/2014 Janus et al.
2014/0019352 A1 1/2014 Shrivastava
2014/0025513 A1 1/2014 Cooke et al.
2014/0025520 A1 1/2014 Mardikar et al.
2014/0036099 A1 2/2014 Balassanian
2014/0040120 A1 2/2014 Cho et al.
2014/0047560 A1 2/2014 Meyer et al.
2014/0052553 A1 2/2014 Uzo
2014/0056491 A1 2/2014 Knight
2014/0058860 A1 2/2014 Roh et al.
2014/0058935 A1 2/2014 Mijares
2014/0058939 A1 2/2014 Savla
2014/0058941 A1 2/2014 Moon et al.
2014/0062853 A1 3/2014 Chaudhri et al.
2014/0068740 A1 3/2014 Lecun et al.
2014/0068751 A1 3/2014 Last
2014/0070957 A1 3/2014 Longinotti-Buitoni et al.
2014/0074635 A1 3/2014 Reese et al.
2014/0074716 A1 3/2014 Ni

(56) References Cited

U.S. PATENT DOCUMENTS

| | | | |
|---|---|---|---|
| 2014/0085191 | A1 | 3/2014 | Gonion et al. |
| 2014/0085460 | A1 | 3/2014 | Park et al. |
| 2014/0094143 | A1 | 4/2014 | Ayotte |
| 2014/0099886 | A1 | 4/2014 | Monroe et al. |
| 2014/0101056 | A1 | 4/2014 | Wendling |
| 2014/0109018 | A1 | 4/2014 | Casey et al. |
| 2014/0112555 | A1 | 4/2014 | Fadell et al. |
| 2014/0115695 | A1 | 4/2014 | Fadell et al. |
| 2014/0118519 | A1 | 5/2014 | Sahin |
| 2014/0119620 | A1 | 5/2014 | Jung et al. |
| 2014/0122331 | A1 | 5/2014 | Vaish et al. |
| 2014/0128035 | A1 | 5/2014 | Sweeney |
| 2014/0129435 | A1 | 5/2014 | Pardo et al. |
| 2014/0129441 | A1 | 5/2014 | Blanco et al. |
| 2014/0135631 | A1 | 5/2014 | Brumback et al. |
| 2014/0140587 | A1 | 5/2014 | Ballard et al. |
| 2014/0143145 | A1 | 5/2014 | Kortina et al. |
| 2014/0143693 | A1 | 5/2014 | Goossens et al. |
| 2014/0155031 | A1 | 6/2014 | Lee et al. |
| 2014/0156531 | A1 | 6/2014 | Poon et al. |
| 2014/0157153 | A1 | 6/2014 | Yuen et al. |
| 2014/0157390 | A1 | 6/2014 | Lurey et al. |
| 2014/0164082 | A1 | 6/2014 | Sun et al. |
| 2014/0165000 | A1 | 6/2014 | Fleizach et al. |
| 2014/0173450 | A1 | 6/2014 | Akula |
| 2014/0187163 | A1 | 7/2014 | Fujita |
| 2014/0187856 | A1 | 7/2014 | Holoien et al. |
| 2014/0188673 | A1 | 7/2014 | Graham et al. |
| 2014/0193783 | A1 | 7/2014 | Jeong et al. |
| 2014/0197234 | A1 | 7/2014 | Hammad |
| 2014/0222436 | A1 | 8/2014 | Binder et al. |
| 2014/0222664 | A1 | 8/2014 | Milne |
| 2014/0244365 | A1 | 8/2014 | Price et al. |
| 2014/0244493 | A1 | 8/2014 | Kenyon et al. |
| 2014/0254891 | A1 | 9/2014 | Lee et al. |
| 2014/0257871 | A1 | 9/2014 | Christensen et al. |
| 2014/0258292 | A1 | 9/2014 | Thramann et al. |
| 2014/0258828 | A1 | 9/2014 | Lymer et al. |
| 2014/0270374 | A1 | 9/2014 | Unzueta |
| 2014/0279442 | A1 | 9/2014 | Luoma et al. |
| 2014/0279497 | A1 | 9/2014 | Qaim-Maqami et al. |
| 2014/0279556 | A1 | 9/2014 | Priebatsch et al. |
| 2014/0282987 | A1 | 9/2014 | Narendra et al. |
| 2014/0283128 | A1 | 9/2014 | Shepherd et al. |
| 2014/0292396 | A1 | 10/2014 | Bruwer et al. |
| 2014/0292641 | A1 | 10/2014 | Cho et al. |
| 2014/0293079 | A1 | 10/2014 | Milanfar et al. |
| 2014/0298432 | A1 | 10/2014 | Brown |
| 2014/0304809 | A1 | 10/2014 | Fadell et al. |
| 2014/0311447 | A1 | 10/2014 | Surnilla et al. |
| 2014/0313307 | A1 | 10/2014 | Oh et al. |
| 2014/0337221 | A1 | 11/2014 | Hoyos |
| 2014/0337931 | A1 | 11/2014 | Cotterill |
| 2014/0344082 | A1 | 11/2014 | Soundararajan |
| 2014/0344896 | A1 | 11/2014 | Pak et al. |
| 2014/0344904 | A1 | 11/2014 | Venkataramani et al. |
| 2014/0350924 | A1 | 11/2014 | Zurek et al. |
| 2014/0354401 | A1 | 12/2014 | Soni et al. |
| 2014/0354538 | A1 | 12/2014 | Lee et al. |
| 2014/0359140 | A1 | 12/2014 | Shankarraman |
| 2014/0366159 | A1 | 12/2014 | Cohen |
| 2014/0375835 | A1 | 12/2014 | Bos |
| 2014/0380465 | A1 | 12/2014 | Fadell et al. |
| 2015/0002696 | A1 | 1/2015 | He et al. |
| 2015/0006207 | A1 | 1/2015 | Jarvis et al. |
| 2015/0012417 | A1 | 1/2015 | Joao et al. |
| 2015/0014141 | A1 | 1/2015 | Myers et al. |
| 2015/0033364 | A1 | 1/2015 | Wong |
| 2015/0043790 | A1 | 2/2015 | Ono et al. |
| 2015/0044965 | A1 | 2/2015 | Kurimoto et al. |
| 2015/0049014 | A1 | 2/2015 | Saito |
| 2015/0051846 | A1 | 2/2015 | Masuya |
| 2015/0054764 | A1 | 2/2015 | Kim et al. |
| 2015/0056957 | A1 | 2/2015 | Mardikar et al. |
| 2015/0058146 | A1 | 2/2015 | Aissi et al. |
| 2015/0074418 | A1 | 3/2015 | Lee et al. |
| 2015/0074615 | A1 | 3/2015 | Han et al. |
| 2015/0077362 | A1 | 3/2015 | Seo |
| 2015/0095174 | A1 | 4/2015 | Dua |
| 2015/0095175 | A1 | 4/2015 | Dua |
| 2015/0109191 | A1 | 4/2015 | Johnson et al. |
| 2015/0121251 | A1 | 4/2015 | Siddhartha et al. |
| 2015/0124053 | A1 | 5/2015 | Tamura et al. |
| 2015/0127539 | A1 | 5/2015 | Ye et al. |
| 2015/0135282 | A1 | 5/2015 | Kong et al. |
| 2015/0146945 | A1 | 5/2015 | Han |
| 2015/0154589 | A1 | 6/2015 | Li |
| 2015/0178548 | A1 | 6/2015 | Abdallah et al. |
| 2015/0186152 | A1 | 7/2015 | Jothiswaran et al. |
| 2015/0186860 | A1 | 7/2015 | Rangarajan |
| 2015/0187019 | A1 | 7/2015 | Fernandes et al. |
| 2015/0195277 | A1 | 7/2015 | Faaborg et al. |
| 2015/0208244 | A1 | 7/2015 | Nakao |
| 2015/0213244 | A1 | 7/2015 | Lymberopoulos et al. |
| 2015/0215128 | A1 | 7/2015 | Pal |
| 2015/0220924 | A1 | 8/2015 | Bakker |
| 2015/0235018 | A1 | 8/2015 | Gupta et al. |
| 2015/0235055 | A1 | 8/2015 | An et al. |
| 2015/0242611 | A1 | 8/2015 | Cotterill |
| 2015/0245159 | A1 | 8/2015 | Osman |
| 2015/0249540 | A1 | 9/2015 | Khalil et al. |
| 2015/0254661 | A1 | 9/2015 | Lanc |
| 2015/0257004 | A1 | 9/2015 | Shanmugam et al. |
| 2015/0261292 | A1 | 9/2015 | Conzola et al. |
| 2015/0261387 | A1 | 9/2015 | Petersen et al. |
| 2015/0295921 | A1 | 10/2015 | Cao |
| 2015/0310259 | A1 | 10/2015 | Lau et al. |
| 2015/0324113 | A1 | 11/2015 | Kapp et al. |
| 2015/0334567 | A1 | 11/2015 | Chen et al. |
| 2015/0339652 | A1 | 11/2015 | Park et al. |
| 2015/0346845 | A1 | 12/2015 | Di Censo et al. |
| 2015/0348001 | A1 | 12/2015 | Van Os et al. |
| 2015/0348002 | A1 | 12/2015 | Van et al. |
| 2015/0348014 | A1 | 12/2015 | Van Os et al. |
| 2015/0348018 | A1 | 12/2015 | Campos et al. |
| 2015/0348029 | A1 | 12/2015 | Van Os et al. |
| 2015/0349959 | A1 | 12/2015 | Marciniak |
| 2015/0363632 | A1 | 12/2015 | Ahn et al. |
| 2015/0365400 | A1 | 12/2015 | Cox |
| 2015/0370323 | A1 | 12/2015 | Cieplinski et al. |
| 2015/0379252 | A1 | 12/2015 | Tang et al. |
| 2016/0005024 | A1 | 1/2016 | Harrell |
| 2016/0012465 | A1 | 1/2016 | Sharp |
| 2016/0019536 | A1 | 1/2016 | Ortiz et al. |
| 2016/0021003 | A1 | 1/2016 | Pan |
| 2016/0026779 | A1 | 1/2016 | Grigg et al. |
| 2016/0042166 | A1 | 2/2016 | Kang et al. |
| 2016/0047666 | A1 | 2/2016 | Fuchs |
| 2016/0048705 | A1 | 2/2016 | Yang |
| 2016/0050199 | A1 | 2/2016 | Ganesan |
| 2016/0063235 | A1 | 3/2016 | Tussy |
| 2016/0063298 | A1 | 3/2016 | Tuneld et al. |
| 2016/0078281 | A1 | 3/2016 | Gongaware et al. |
| 2016/0092665 | A1 | 3/2016 | Cowan et al. |
| 2016/0094705 | A1 | 3/2016 | Vendrow |
| 2016/0100156 | A1 | 4/2016 | Zhou et al. |
| 2016/0104034 | A1 | 4/2016 | Wilder et al. |
| 2016/0134488 | A1 | 5/2016 | Straub et al. |
| 2016/0147987 | A1 | 5/2016 | Jang et al. |
| 2016/0148042 | A1 | 5/2016 | Gonion et al. |
| 2016/0148384 | A1 | 5/2016 | Bud et al. |
| 2016/0154956 | A1 | 6/2016 | Fadell et al. |
| 2016/0165205 | A1 | 6/2016 | Liu et al. |
| 2016/0171192 | A1 | 6/2016 | Holz et al. |
| 2016/0180305 | A1 | 6/2016 | Dresser et al. |
| 2016/0188860 | A1 | 6/2016 | Lee et al. |
| 2016/0192324 | A1 | 6/2016 | Zhang et al. |
| 2016/0217310 | A1 | 7/2016 | Shah et al. |
| 2016/0224966 | A1 | 8/2016 | Van Os et al. |
| 2016/0224973 | A1 | 8/2016 | Van Os et al. |
| 2016/0232513 | A1 | 8/2016 | Purves et al. |
| 2016/0234023 | A1 | 8/2016 | Mozer et al. |
| 2016/0239701 | A1 | 8/2016 | Lee et al. |
| 2016/0241543 | A1 | 8/2016 | Jung et al. |

(56) References Cited

U.S. PATENT DOCUMENTS

2016/0253665 A1 9/2016 Van Os et al.
2016/0267779 A1 9/2016 Kuang
2016/0275281 A1 9/2016 Ranjit et al.
2016/0277396 A1 9/2016 Gardiner et al.
2016/0292525 A1 10/2016 Aoki
2016/0294557 A1 10/2016 Baldwin et al.
2016/0300100 A1 10/2016 Shen et al.
2016/0308859 A1 10/2016 Barry et al.
2016/0314290 A1 10/2016 Baca et al.
2016/0320838 A1 11/2016 Teller et al.
2016/0332025 A1 11/2016 Repka
2016/0335495 A1 11/2016 Kim et al.
2016/0342832 A1 11/2016 Newell et al.
2016/0345172 A1 11/2016 Cotterill
2016/0358180 A1 12/2016 Van Os et al.
2016/0359831 A1 12/2016 Berlin et al.
2016/0364561 A1 12/2016 Lee et al.
2016/0364591 A1 12/2016 El-Khoury et al.
2016/0364600 A1 12/2016 Shah et al.
2016/0378961 A1 12/2016 Park
2016/0378966 A1 12/2016 Alten
2017/0004828 A1 1/2017 Lee et al.
2017/0017834 A1 1/2017 Sabitov et al.
2017/0032375 A1 2/2017 Van Os et al.
2017/0046507 A1 2/2017 Archer et al.
2017/0046508 A1 2/2017 Shin et al.
2017/0054731 A1 2/2017 Cotterill
2017/0063851 A1 3/2017 Kim et al.
2017/0063852 A1 3/2017 Azar et al.
2017/0070680 A1 3/2017 Kobayashi
2017/0076132 A1 3/2017 Sezan et al.
2017/0102916 A1 4/2017 Noble et al.
2017/0147681 A1 5/2017 Tankersley et al.
2017/0147802 A1 5/2017 Li
2017/0163588 A1 6/2017 Devasthali et al.
2017/0169202 A1 6/2017 Duggan et al.
2017/0169204 A1 6/2017 Fadell et al.
2017/0169287 A1 6/2017 Tokunaga et al.
2017/0180637 A1 6/2017 Lautenbach et al.
2017/0185760 A1 6/2017 Wilder
2017/0193214 A1 7/2017 Shim et al.
2017/0193314 A1 7/2017 Kim et al.
2017/0199997 A1 7/2017 Fadell et al.
2017/0235361 A1 8/2017 Rigazio et al.
2017/0244703 A1 8/2017 Lee et al.
2017/0300897 A1 10/2017 Ferenczi et al.
2017/0323141 A1 11/2017 Lee et al.
2017/0329949 A1 11/2017 Civelli
2017/0339151 A1 11/2017 Van Os et al.
2017/0344251 A1 11/2017 Hajimusa et al.
2018/0004924 A1 1/2018 Tieu
2018/0021954 A1 1/2018 Fischer et al.
2018/0063249 A1 3/2018 Nguyen
2018/0088787 A1 3/2018 Bereza et al.
2018/0109629 A1 4/2018 Van Os et al.
2018/0117944 A1 5/2018 Lee
2018/0144178 A1 5/2018 Han et al.
2018/0150627 A1 5/2018 Rodefer
2018/0158066 A1 6/2018 Van Os et al.
2018/0173928 A1 6/2018 Han et al.
2018/0173929 A1 6/2018 Han et al.
2018/0173930 A1 6/2018 Han et al.
2018/0181737 A1 6/2018 Tussy
2018/0211093 A1* 7/2018 Bae .................... G06V 40/1347
2018/0233139 A1 8/2018 Finkelstein et al.
2018/0262834 A1 9/2018 Cho et al.
2018/0268747 A1 9/2018 Braun
2018/0276673 A1 9/2018 Van Os et al.
2018/0302790 A1 10/2018 Cotterill
2018/0321826 A1 11/2018 Bereza et al.
2018/0365898 A1 12/2018 Costa
2019/0050867 A1 2/2019 Van Os et al.
2019/0080066 A1 3/2019 Van Os et al.
2019/0080070 A1 3/2019 Van Os et al.
2019/0080071 A1 3/2019 Van Os et al.
2019/0080072 A1 3/2019 Van Os et al.
2019/0080189 A1 3/2019 Van Os et al.
2019/0124510 A1 4/2019 Cotterill
2019/0156607 A1 5/2019 Tao et al.
2019/0164134 A1 5/2019 Morrow et al.
2019/0180088 A1 6/2019 Norimatsu
2019/0220647 A1 7/2019 Han et al.
2019/0243957 A1 8/2019 Fadell et al.
2019/0289079 A1 9/2019 Van Os et al.
2019/0333508 A1 10/2019 Rao et al.
2019/0347391 A1 11/2019 Kim et al.
2019/0370448 A1 12/2019 Devine et al.
2019/0370583 A1 12/2019 Van Os et al.
2020/0042685 A1 2/2020 Tussy et al.
2020/0065821 A1 2/2020 Van Os et al.
2020/0103963 A1 4/2020 Kelly et al.
2020/0104620 A1 4/2020 Cohen et al.
2020/0120503 A1 4/2020 Cotterill
2020/0234027 A1 7/2020 Han et al.
2020/0311509 A1 10/2020 Benkley et al.
2020/0356761 A1 11/2020 Gonion et al.
2020/0366742 A1 11/2020 Van Os et al.
2020/0372514 A1 11/2020 Van Os et al.
2021/0042549 A1 2/2021 Van Os et al.
2021/0048883 A1 2/2021 Kelly et al.
2021/0073823 A1 3/2021 Van Os
2021/0192530 A1 6/2021 Van Os et al.
2022/0027446 A1 1/2022 Van Os et al.
2022/0058257 A1 2/2022 Cotterill
2022/0067133 A1 3/2022 Fadell et al.
2022/0124254 A1 4/2022 Dellinger et al.
2022/0180667 A1 6/2022 Cohen et al.
2022/0237274 A1 7/2022 Paul et al.
2022/0244838 A1 8/2022 Bereza et al.
2022/0284084 A1 9/2022 Deng
2022/0342972 A1 10/2022 Van Os et al.
2022/0351549 A1 11/2022 Van Os et al.
2023/0019250 A1 1/2023 Lee et al.

FOREIGN PATENT DOCUMENTS

CN 1163669 A 10/1997
CN 1183475 A 6/1998
CN 1220433 A 6/1999
CN 1452739 A 10/2003
CN 1484425 A 3/2004
CN 1183475 C 1/2005
CN 1592914 A 3/2005
CN 1663174 A 8/2005
CN 1685357 A 10/2005
CN 1695163 A 11/2005
CN 1741104 A 3/2006
CN 1742252 A 3/2006
CN 1801708 A 7/2006
CN 1836397 A 9/2006
CN 1846221 A 10/2006
CN 1908981 A 2/2007
CN 1960546 A 5/2007
CN 101005681 A 7/2007
CN 101035335 A 9/2007
CN 101039184 A 9/2007
CN 101171604 A 4/2008
CN 101227359 A 7/2008
CN 101268470 A 9/2008
CN 101299694 A 11/2008
CN 101341718 A 1/2009
CN 101341727 A 1/2009
CN 101485128 A 7/2009
CN 101610155 A 12/2009
CN 101656548 A 2/2010
CN 101719955 A 6/2010
CN 101730907 A 6/2010
CN 101816165 A 8/2010
CN 101833651 A 9/2010
CN 101847139 A 9/2010
CN 101960896 A 1/2011
CN 102004908 A 4/2011
CN 102065148 A 5/2011
CN 102096546 A 6/2011

(56) References Cited

FOREIGN PATENT DOCUMENTS

| | | | |
|---|---|---|---|
| CN | 102164213 | A | 8/2011 |
| CN | 102202192 | A | 9/2011 |
| CN | 102209321 | A | 10/2011 |
| CN | 102244530 | A | 11/2011 |
| CN | 102265586 | A | 11/2011 |
| CN | 102282578 | A | 12/2011 |
| CN | 102394919 | A | 3/2012 |
| CN | 102396205 | A | 3/2012 |
| CN | 102542444 | A | 7/2012 |
| CN | 102591889 | A | 7/2012 |
| CN | 102737313 | A | 10/2012 |
| CN | 102833423 | A | 12/2012 |
| CN | 102841683 | A | 12/2012 |
| CN | 202735894 | U | 2/2013 |
| CN | 103020807 | A | 4/2013 |
| CN | 103092503 | A | 5/2013 |
| CN | 103188280 | A | 7/2013 |
| CN | 103209642 | A | 7/2013 |
| CN | 103294171 | A | 9/2013 |
| CN | 103324909 | A | 9/2013 |
| CN | 103346957 | A | 10/2013 |
| CN | 103413218 | A | 11/2013 |
| CN | 103455913 | A | 12/2013 |
| CN | 103501304 | A | 1/2014 |
| CN | 103577982 | A | 2/2014 |
| CN | 103701605 | A | 4/2014 |
| CN | 103765861 | A | 4/2014 |
| CN | 103778533 | A | 5/2014 |
| CN | 104252675 | A | 12/2014 |
| CN | 104361302 | A | 2/2015 |
| CN | 104539924 | A | 4/2015 |
| CN | 104732396 | A | 6/2015 |
| CN | 104753766 | A | 7/2015 |
| CN | 104935497 | A | 9/2015 |
| CN | 105051651 | A | 11/2015 |
| CN | 105099861 | A | 11/2015 |
| CN | 105389491 | A | 3/2016 |
| CN | 105391843 | A | 3/2016 |
| CN | 105844101 | A | 8/2016 |
| CN | 105868613 | A | 8/2016 |
| CN | 105874405 | A | 8/2016 |
| CN | 105893814 | A | 8/2016 |
| CN | 106020436 | A | 10/2016 |
| CN | 106095247 | A | 11/2016 |
| CN | 106156566 | A | 11/2016 |
| CN | 106164934 | A | 11/2016 |
| CN | 106355058 | A | 1/2017 |
| CN | 106462383 | A | 2/2017 |
| CN | 106485123 | A | 3/2017 |
| CN | 106503514 | A | 3/2017 |
| CN | 106778222 | A | 5/2017 |
| CN | 108574773 | A | 9/2018 |
| CN | 109769397 | A | 5/2019 |
| DE | 10153591 | A1 | 5/2003 |
| EP | 0593386 | A2 | 4/1994 |
| EP | 0923018 | A2 | 6/1999 |
| EP | 1043698 | A2 | 10/2000 |
| EP | 1229496 | A2 | 8/2002 |
| EP | 1257111 | A1 | 11/2002 |
| EP | 1422589 | A1 | 5/2004 |
| EP | 1626330 | A1 | 2/2006 |
| EP | 1645989 | A2 | 4/2006 |
| EP | 1736908 | A2 | 12/2006 |
| EP | 1835697 | A2 | 9/2007 |
| EP | 2180665 | A1 | 4/2010 |
| EP | 1835697 | A3 | 6/2010 |
| EP | 2224348 | A1 | 9/2010 |
| EP | 2309410 | A1 | 4/2011 |
| EP | 1626330 | A4 | 1/2012 |
| EP | 2674889 | A2 | 12/2013 |
| EP | 2713298 | A1 | 4/2014 |
| EP | 2725521 | A2 | 4/2014 |
| EP | 2725537 | A1 | 4/2014 |
| EP | 2960822 | A1 | 12/2015 |
| EP | 2993619 | A1 | 3/2016 |

| | | | |
|---|---|---|---|
| EP | 3057024 | A1 | 8/2016 |
| EP | 3076334 | A1 | 10/2016 |
| EP | 3118761 | A1 | 1/2017 |
| EP | 3190563 | A1 | 7/2017 |
| EP | 2801972 | B1 | 1/2018 |
| EP | 1835697 | B1 | 5/2018 |
| EP | 3373132 | A2 | 9/2018 |
| GB | 2184576 | A | 6/1987 |
| GB | 2312040 | A | 10/1997 |
| GB | 2313460 | A | 11/1997 |
| GB | 2360618 | A | 9/2001 |
| GB | 2466038 | A | 6/2010 |
| GB | 2500321 | A | 9/2013 |
| IN | 201917024374 | A | 9/2020 |
| JP | 4-158434 | A | 6/1992 |
| JP | 6-284182 | A | 10/1994 |
| JP | 7-146942 | A | 6/1995 |
| JP | 7-234837 | A | 9/1995 |
| JP | 9-81309 | A | 3/1997 |
| JP | 9-128208 | A | 5/1997 |
| JP | 9-221950 | A | 8/1997 |
| JP | 9-269930 | A | 10/1997 |
| JP | 10-011216 | A | 1/1998 |
| JP | 10-63424 | A | 3/1998 |
| JP | 10-63427 | A | 3/1998 |
| JP | 10-069346 | A | 3/1998 |
| JP | 10-232934 | A | 9/1998 |
| JP | 10-247936 | A | 9/1998 |
| JP | 10-269358 | A | 10/1998 |
| JP | 11-39385 | A | 2/1999 |
| JP | 11-073530 | A | 3/1999 |
| JP | 11-185016 | A | 7/1999 |
| JP | 11-242745 | A | 9/1999 |
| JP | 2000-090052 | A | 3/2000 |
| JP | 2000-259477 | A | 9/2000 |
| JP | 2000-283720 | A | 10/2000 |
| JP | 2000-293253 | A | 10/2000 |
| JP | 2000-315118 | A | 11/2000 |
| JP | 2000-339097 | A | 12/2000 |
| JP | 2001-14051 | A | 1/2001 |
| JP | 2001-092554 | A | 4/2001 |
| JP | 2001-092783 | A | 4/2001 |
| JP | 2001-103046 | A | 4/2001 |
| JP | 2001-155137 | A | 6/2001 |
| JP | 2001-510579 | A | 7/2001 |
| JP | 2001-331758 | A | 11/2001 |
| JP | 2002-049570 | A | 2/2002 |
| JP | 2002-099854 | A | 4/2002 |
| JP | 2002-149171 | A | 5/2002 |
| JP | 2002-159052 | A | 5/2002 |
| JP | 2002-515145 | A | 5/2002 |
| JP | 2002-183093 | A | 6/2002 |
| JP | 2002-207525 | A | 7/2002 |
| JP | 2002-222412 | A | 8/2002 |
| JP | 2002-525718 | A | 8/2002 |
| JP | 2002-288137 | A | 10/2002 |
| JP | 2002-352234 | A | 12/2002 |
| JP | 2002-358162 | A | 12/2002 |
| JP | 2003-016398 | A | 1/2003 |
| JP | 2003-067343 | A | 3/2003 |
| JP | 2003-141541 | A | 5/2003 |
| JP | 2003-143290 | A | 5/2003 |
| JP | 2003-150550 | A | 5/2003 |
| JP | 2003-178244 | A | 6/2003 |
| JP | 2003-298689 | A | 10/2003 |
| JP | 2003-346059 | A | 12/2003 |
| JP | 2004-086866 | A | 3/2004 |
| JP | 2004-252736 | A | 9/2004 |
| JP | 2004-265353 | A | 9/2004 |
| JP | 2004-532477 | A | 10/2004 |
| JP | 2004-313459 | A | 11/2004 |
| JP | 2004-334788 | A | 11/2004 |
| JP | 2004-348600 | A | 12/2004 |
| JP | 2004-348601 | A | 12/2004 |
| JP | 2004-356816 | A | 12/2004 |
| JP | 2005-4490 | A | 1/2005 |
| JP | 2005-071225 | A | 3/2005 |
| JP | 2005-084991 | A | 3/2005 |
| JP | 2005-115480 | A | 4/2005 |

(56) References Cited

FOREIGN PATENT DOCUMENTS

| | | | |
|---|---|---|---|
| JP | 2005-122700 | A | 5/2005 |
| JP | 2005-202578 | A | 7/2005 |
| JP | 2005-521961 | A | 7/2005 |
| JP | 2005-523505 | A | 8/2005 |
| JP | 2005-317049 | A | 11/2005 |
| JP | 2005-327076 | A | 11/2005 |
| JP | 2005-339425 | A | 12/2005 |
| JP | 2006-012080 | A | 1/2006 |
| JP | 2006-018613 | A | 1/2006 |
| JP | 2006-031182 | A | 2/2006 |
| JP | 2006-085559 | A | 3/2006 |
| JP | 2006-093912 | A | 4/2006 |
| JP | 2006-107288 | A | 4/2006 |
| JP | 2006-114018 | A | 4/2006 |
| JP | 2006-115043 | A | 4/2006 |
| JP | 2006-127502 | A | 5/2006 |
| JP | 2006-163960 | A | 6/2006 |
| JP | 2006-172180 | A | 6/2006 |
| JP | 2006-189999 | A | 7/2006 |
| JP | 2006-191245 | A | 7/2006 |
| JP | 2006-197071 | A | 7/2006 |
| JP | 2006-202278 | A | 8/2006 |
| JP | 2006-203858 | A | 8/2006 |
| JP | 2006-215705 | A | 8/2006 |
| JP | 2006-259930 | A | 9/2006 |
| JP | 2006-259931 | A | 9/2006 |
| JP | 2006-277670 | A | 10/2006 |
| JP | 2006-303701 | A | 11/2006 |
| JP | 2006-308375 | A | 11/2006 |
| JP | 2007-011667 | A | 1/2007 |
| JP | 2007-034637 | A | 2/2007 |
| JP | 2007-052574 | A | 3/2007 |
| JP | 2007-052770 | A | 3/2007 |
| JP | 2007-58397 | A | 3/2007 |
| JP | 2007-071008 | A | 3/2007 |
| JP | 2007-507011 | A | 3/2007 |
| JP | 2007-102278 | A | 4/2007 |
| JP | 2007-128201 | A | 5/2007 |
| JP | 2007-135149 | A | 5/2007 |
| JP | 2007-140696 | A | 6/2007 |
| JP | 2007-148801 | A | 6/2007 |
| JP | 2007-199984 | A | 8/2007 |
| JP | 2007-226293 | A | 9/2007 |
| JP | 2007-226794 | A | 9/2007 |
| JP | 2007-334637 | A | 12/2007 |
| JP | 2008-005180 | A | 1/2008 |
| JP | 2008-015800 | A | 1/2008 |
| JP | 2008-033681 | A | 2/2008 |
| JP | 2008-046692 | A | 2/2008 |
| JP | 2008-070926 | A | 3/2008 |
| JP | 2008-071158 | A | 3/2008 |
| JP | 2008-075424 | A | 4/2008 |
| JP | 2008-250601 | A | 10/2008 |
| JP | 2009-009434 | A | 1/2009 |
| JP | 2009-015543 | A | 1/2009 |
| JP | 2009-049878 | A | 3/2009 |
| JP | 2009-099076 | A | 5/2009 |
| JP | 2009-135770 | A | 6/2009 |
| JP | 2009-211166 | A | 9/2009 |
| JP | 2009-240523 | A | 10/2009 |
| JP | 2009-258991 | A | 11/2009 |
| JP | 2010-009513 | A | 1/2010 |
| JP | 2010-015417 | A | 1/2010 |
| JP | 2010-028404 | A | 2/2010 |
| JP | 2010-102718 | A | 5/2010 |
| JP | 2010-517390 | A | 5/2010 |
| JP | 2010-152506 | A | 7/2010 |
| JP | 2010-165012 | A | 7/2010 |
| JP | 2010-524051 | A | 7/2010 |
| JP | 2010-211577 | A | 9/2010 |
| JP | 2010-211579 | A | 9/2010 |
| JP | 2010-250386 | A | 11/2010 |
| JP | 2010-271779 | A | 12/2010 |
| JP | 2010-541046 | A | 12/2010 |
| JP | 2011-054120 | A | 3/2011 |
| JP | 2011-097287 | A | 5/2011 |
| JP | 2011-519439 | A | 7/2011 |
| JP | 2011-192228 | A | 9/2011 |
| JP | 2011-217146 | A | 10/2011 |
| JP | 2012-008951 | A | 1/2012 |
| JP | 2012-008985 | A | 1/2012 |
| JP | 2012-504273 | A | 2/2012 |
| JP | 2012-073724 | A | 4/2012 |
| JP | 2012-508930 | A | 4/2012 |
| JP | 2012-099025 | A | 5/2012 |
| JP | 2012-164070 | A | 8/2012 |
| JP | 2012-168802 | A | 9/2012 |
| JP | 2012-194661 | A | 10/2012 |
| JP | 2012-208719 | A | 10/2012 |
| JP | 2012-215981 | A | 11/2012 |
| JP | 2012-529699 | A | 11/2012 |
| JP | 2013-020496 | A | 1/2013 |
| JP | 2013-030052 | A | 2/2013 |
| JP | 2013-034322 | A | 2/2013 |
| JP | 2013-058828 | A | 3/2013 |
| JP | 2013-088906 | A | 5/2013 |
| JP | 2013-114317 | A | 6/2013 |
| JP | 2013-114498 | A | 6/2013 |
| JP | 2013-140540 | A | 7/2013 |
| JP | 2013-530445 | A | 7/2013 |
| JP | 2013-149206 | A | 8/2013 |
| JP | 2013-533532 | A | 8/2013 |
| JP | 5267966 | B2 | 8/2013 |
| JP | 2013-534662 | A | 9/2013 |
| JP | 2013-232197 | A | 11/2013 |
| JP | 2014-44719 | A | 3/2014 |
| JP | 2014-044724 | A | 3/2014 |
| JP | 2014-075155 | A | 4/2014 |
| JP | 2014-102845 | A | 6/2014 |
| JP | 2014-110009 | A | 6/2014 |
| JP | 2014-517366 | A | 7/2014 |
| JP | 2014-230061 | A | 12/2014 |
| JP | 2014-239478 | A | 12/2014 |
| JP | 2015-014923 | A | 1/2015 |
| JP | 2015-036925 | A | 2/2015 |
| JP | 2015-056142 | A | 3/2015 |
| JP | 2015-075877 | A | 4/2015 |
| JP | 2015-187783 | A | 10/2015 |
| JP | 2015-207051 | A | 11/2015 |
| JP | 2016-076799 | A | 5/2016 |
| JP | 2016-521403 | A | 7/2016 |
| JP | 2016-162000 | A | 9/2016 |
| JP | 2016-534435 | A | 11/2016 |
| JP | 6023162 | B2 | 11/2016 |
| JP | 2016-224960 | A | 12/2016 |
| JP | 2017-016170 | A | 1/2017 |
| JP | 2017-500656 | A | 1/2017 |
| JP | 2017-091129 | A | 5/2017 |
| JP | 2017-102952 | A | 6/2017 |
| JP | 2017-117159 | A | 6/2017 |
| JP | 2017-138846 | A | 8/2017 |
| JP | 2018-036965 | A | 3/2018 |
| KR | 10-2000-0030544 | A | 6/2000 |
| KR | 10-2001-0019345 | A | 3/2001 |
| KR | 2001-0074059 | A | 8/2001 |
| KR | 2002-0002484 | A | 1/2002 |
| KR | 10-2002-0019031 | A | 3/2002 |
| KR | 10-2002-0022295 | A | 3/2002 |
| KR | 10-2002-0087665 | A | 11/2002 |
| KR | 10-2004-0005505 | A | 1/2004 |
| KR | 10-2004-0049502 | A | 6/2004 |
| KR | 10-2005-0061975 | A | 6/2005 |
| KR | 10-2006-0018063 | A | 2/2006 |
| KR | 10-0652624 | B1 | 12/2006 |
| KR | 10-2007-0026808 | A | 3/2007 |
| KR | 10-2007-0081773 | A | 8/2007 |
| KR | 10-2007-0120125 | A | 12/2007 |
| KR | 10-0805341 | B1 | 2/2008 |
| KR | 10-2008-0064395 | A | 7/2008 |
| KR | 10-2009-0011323 | A | 2/2009 |
| KR | 10-2009-0089472 | A | 8/2009 |
| KR | 10-2010-0074218 | A | 7/2010 |
| KR | 10-1020-110056561 | A | 5/2011 |
| KR | 10-2011-0101683 | A | 9/2011 |

(56) References Cited

FOREIGN PATENT DOCUMENTS

| | | | |
|---|---|---|---|
| KR | 10-2011-0114732 | A | 10/2011 |
| KR | 10-2012-0040693 | A | 4/2012 |
| KR | 10-2012-0087333 | A | 8/2012 |
| KR | 10-2013-0027326 | A | 3/2013 |
| KR | 10-1253392 | B1 | 4/2013 |
| KR | 10-2013-0044292 | A | 5/2013 |
| KR | 10-1312097 | B1 | 9/2013 |
| KR | 10-2013-0116905 | A | 10/2013 |
| KR | 10-1330962 | B1 | 11/2013 |
| KR | 10-1342208 | B1 | 12/2013 |
| KR | 10-2014-0018019 | A | 2/2014 |
| KR | 10-2014-0026263 | A | 3/2014 |
| KR | 10-2014-0055429 | A | 5/2014 |
| KR | 10-2014-0137400 | A | 12/2014 |
| KR | 10-2015-0013264 | A | 2/2015 |
| KR | 10-2015-0068013 | A | 6/2015 |
| KR | 10-2016-0012636 | A | 2/2016 |
| KR | 10-2016-0014623 | A | 2/2016 |
| KR | 10-2016-0026337 | A | 3/2016 |
| KR | 10-2016-0026791 | A | 3/2016 |
| KR | 10-2016-0045633 | A | 4/2016 |
| KR | 10-2016-0048215 | A | 5/2016 |
| KR | 10-2016-0054573 | A | 5/2016 |
| KR | 10-2016-0099432 | A | 8/2016 |
| KR | 10-2017-0023063 | A | 3/2017 |
| KR | 10-1820573 | B1 | 1/2018 |
| TW | 200529636 | A | 9/2005 |
| TW | 200601176 | A | 1/2006 |
| TW | 200642408 | A | 12/2006 |
| TW | 200919255 | A | 5/2009 |
| WO | 1997/41528 | A1 | 11/1997 |
| WO | 1998/58346 | A1 | 12/1998 |
| WO | 1999/28701 | A1 | 6/1999 |
| WO | 1999/44114 | A1 | 9/1999 |
| WO | 2000/16244 | A1 | 3/2000 |
| WO | 00/55812 | A1 | 9/2000 |
| WO | 01/57757 | A1 | 8/2001 |
| WO | 2001/59558 | A1 | 8/2001 |
| WO | 2001/63386 | A1 | 8/2001 |
| WO | 2001/80017 | A1 | 10/2001 |
| WO | 2002/01864 | A1 | 1/2002 |
| WO | 2003/038698 | A1 | 5/2003 |
| WO | 2003/083793 | A2 | 10/2003 |
| WO | 2004/029862 | A1 | 4/2004 |
| WO | 2004/104813 | A1 | 12/2004 |
| WO | 2004/109454 | A2 | 12/2004 |
| WO | 2005/008568 | A1 | 1/2005 |
| WO | 2005/020036 | A2 | 3/2005 |
| WO | 2005/048832 | A1 | 6/2005 |
| WO | 2005/106774 | A2 | 11/2005 |
| WO | 2006/051462 | A1 | 5/2006 |
| WO | 2006/113834 | A2 | 10/2006 |
| WO | 2007/029710 | A1 | 3/2007 |
| WO | 2007/060102 | A1 | 5/2007 |
| WO | 2007/070014 | A1 | 6/2007 |
| WO | 2007/072447 | A2 | 6/2007 |
| WO | 2007/073422 | A1 | 6/2007 |
| WO | 2007/076210 | A1 | 7/2007 |
| WO | 2007/116521 | A1 | 10/2007 |
| WO | 2008/008101 | A2 | 1/2008 |
| WO | 2008/024454 | A1 | 2/2008 |
| WO | 2008/147457 | A1 | 12/2008 |
| WO | 2008/151229 | A1 | 12/2008 |
| WO | 2009/042392 | A2 | 4/2009 |
| WO | 2009/045335 | A2 | 4/2009 |
| WO | 2010/039337 | A2 | 4/2010 |
| WO | 2010/056484 | A2 | 5/2010 |
| WO | 2010/059306 | A2 | 5/2010 |
| WO | 2010/086993 | A1 | 8/2010 |
| WO | 2010/120972 | A1 | 10/2010 |
| WO | 2010/128442 | A2 | 11/2010 |
| WO | 2012/068193 | A2 | 5/2012 |
| WO | 2012/083113 | A2 | 6/2012 |
| WO | 2012/128750 | A1 | 9/2012 |
| WO | 2012/129231 | A1 | 9/2012 |
| WO | 2013/000150 | A1 | 1/2013 |
| WO | 2013/003372 | A1 | 1/2013 |
| WO | 2013/023224 | A2 | 2/2013 |
| WO | 2013/066659 | A1 | 5/2013 |
| WO | 2013/096943 | A1 | 6/2013 |
| WO | 2013/125222 | A1 | 8/2013 |
| WO | 2013/169849 | A2 | 11/2013 |
| WO | 2013/169877 | A2 | 11/2013 |
| WO | 2013/177500 | A1 | 11/2013 |
| WO | 2013/177548 | A1 | 11/2013 |
| WO | 2013/181102 | A1 | 12/2013 |
| WO | 2014/012456 | A1 | 1/2014 |
| WO | 2014/105276 | A1 | 7/2014 |
| WO | 2014/147297 | A1 | 9/2014 |
| WO | 2014/193465 | A1 | 12/2014 |
| WO | 2015/057320 | A1 | 4/2015 |
| WO | 2015/062382 | A1 | 5/2015 |
| WO | 2015/069153 | A1 | 5/2015 |
| WO | 2015/088141 | A1 | 6/2015 |
| WO | 2015/120019 | A1 | 8/2015 |
| WO | 2015/195216 | A1 | 12/2015 |
| WO | 2015/196448 | A1 | 12/2015 |
| WO | 2016/036218 | A1 | 3/2016 |
| WO | 2016/111808 | A1 | 7/2016 |
| WO | 2016/123309 | A1 | 8/2016 |
| WO | 2016/126374 | A1 | 8/2016 |
| WO | 2016/189390 | A2 | 12/2016 |
| WO | 2016/196054 | A1 | 12/2016 |
| WO | 2016/201037 | A1 | 12/2016 |
| WO | 2017/012302 | A1 | 1/2017 |
| WO | 2017/030223 | A1 | 2/2017 |
| WO | 2017/043314 | A1 | 3/2017 |
| WO | 2017/094052 | A1 | 6/2017 |
| WO | 2017/218094 | A1 | 12/2017 |
| WO | 2018/226265 | A1 | 12/2018 |
| WO | 2019/033129 | A2 | 2/2019 |

OTHER PUBLICATIONS 9-81309 A, JP, Cited by Japanese Patent Office in an Office Action for related Patent Application No. 2021-131310 dated Sep. 2, 2022.

9-269930 A, JP, Cited by Chinese Patent Office in an Office Action for related Patent Application No. 201710198190.6 dated Sep. 23, 2022.

2001-103046 A, JP, Cited by the Japanese Patent Office in an Office Action for related Patent Application No. 2021-084065 dated Jun. 24, 2022.

2009-211166 A, JP, Cited by the Japanese Patent Office in an Office Action for related Patent Application No. 2019-563560 dated Jul. 4, 2022.

2010-250386 A, JP, Cited by the Japanese Patent Office in an Office Action for related Patent Application No. 2021-035572 dated Jun. 3, 2022.

2012-168802 A, JP, Cited by the Japanese Patent Office in an Office Action for related Patent Application No. 2019-563560 dated Jul. 4, 2022.

2013-534662 A, JP, Cited by the Japanese Patent Office in an Office Action for related Patent Application No. 2021-035572 dated Jun. 3, 2022.

2014-230061 A, JP, Cited by Japanese Patent Office in an Office Action for related Patent Application No. 2021-131310 dated Sep. 2, 2022.

2016-076799 A, JP, Cited by Japanese Patent Office in an Office Action for related Patent Application No. 2021-131310 dated Sep. 2, 2022.

10-2012-0087333 A, KR, Cited by the Korean Patent Office in an Office Action for related Patent Application No. 10-2022-0010942 dated Aug. 10, 2022.

Liu et al., "PKI Authentication System Combining with Fingerprint", Computer Engineering, vol. 39, No. 09, May 2005, 3 pages, Cited by the Chinese Patent Office in an Office Action for related Apptication No. 201710198190.6 dated Jul. 5, 2022.

Adractas et al., "The road to mobile payments services", McKinsey on Payments, Online available at: https://www.mckinsey.com.br/~/

(56) References Cited

OTHER PUBLICATIONS media/mckinsey/dotcom/client_service/financial%20services/latest%20thinking/reports/the_road_to_mobile_payments_services.pdf, Sep. 2011, pp. 45-52.
Adrianisen, "Samsung Galaxy S8 Face Recognition—Register Your Face Review!", Retrieved from < https://www.youtube.com/watch?v=04KVPaCJq94>, Apr. 27, 2017, 1 page.
Advisory Action received for U.S. Appl. No. 12/207,374, dated Feb. 25, 2013, 3 pages.
Advisory Action received for U.S. Appl. No. 12/207,374, dated May 15, 2014, 3 pages.
Advisory Action received for U.S. Appl. No. 14/311,214, dated Feb. 10, 2015, 4 pages.
Advisory Action received for U.S. Appl. No. 14/503,296, dated Oct. 2, 2015, 3 pages.
Advisory Action received for U.S. Appl. No. 14/980,344, dated Feb. 10, 2020, 5 pages.
Advisory Action received for U.S. Appl. No. 14/980,344, dated Mar. 27, 2019, 5 pages.
Advisory Action received for U.S. Appl. No. 15/137,944, dated May 11, 2017, 6 pages.
Advisory Action received for U.S. Appl. No. 16/164,561, dated Nov. 14, 2019, 2 pages.
Advisory Action received for U.S. Appl. No. 16/369,473, dated May 12, 2022, 4 pages.
Advisory Action received for U.S. Appl. No. 15/250,152, dated Mar. 25, 2019, 5 pages.
Applicant-Initiated Interview Summary received for U.S. Appl. No. 13/243,045, dated Oct. 22, 2019, 3 pages.
Applicant-Initiated Interview Summary received for U.S. Appl. No. 15/714,887, dated Aug. 19, 2020, 4 pages.
Applicant-Initiated Interview Summary received for U.S. Appl. No. 15/714,887, dated Mar. 17, 2020, 5 pages.
Applicant-Initiated Interview Summary received for U.S. Appl. No. 16/147,023, dated Oct. 29, 2019, 3 pages.
Applicant-Initiated Interview Summary received for U.S. Appl. No. 16/553,622, dated Aug. 3, 2020, 3 pages.
Applicant-Initiated Interview Summary received for U.S. Appl. No. 14/612,214, dated Feb. 18, 2020, 3 pages.
Applicant-Initiated Interview Summary received for U.S. Appl. No. 16/125,267, dated Feb. 8, 2021, 3 pages.
Applicant-Initiated Interview Summary received for U.S. Appl. No. 16/125,267, dated Jan. 25, 2022, 5 pages.
Applicant-Initiated Interview Summary received for U.S. Appl. No. 16/125,267, dated Jun. 25, 2021, 5 pages.
Applicant-Initiated Interview Summary received for U.S. Appl. No. 16/125,267, dated Oct. 25, 2021, 4 pages.
Applicant-Initiated Interview Summary received for U.S. Appl. No. 16/125,267, dated Sep. 14, 2020, 5 pages.
Applicant-Initiated Interview Summary received for U.S. Appl. No. 16/369,355, dated Jul. 28, 2021, 2 pages.
Applicant-Initiated Interview Summary received for U.S. Appl. No. 16/369,473, dated Apr. 16, 2021, 2 pages.
Applicant-Initiated Interview Summary received for U.S. Appl. No. 16/369,473, dated Oct. 13, 2020, 5 pages.
Applicant-Initiated Interview Summary received for U.S. Appl. No. 16/369,473, dated Oct. 18, 2021, 2 pages.
Applicant-Initiated Interview Summary received for U.S. Appl. No. 16/369,473, dated Sep. 21, 2020, 5 pages.
Applicant-Initiated Interview Summary received for U.S. Appl. No. 16/667,271, dated Apr. 8, 2020, 3 pages.
Applicant-Initiated Interview Summary received for U.S. Appl. No. 16/670,949, dated Apr. 6, 2021, 2 pages.
Applicant-Initiated Interview Summary received for U.S. Appl. No. 17/087,855, dated Feb. 28, 2022, 2 pages.
Applicant-Initiated Interview Summary received for U.S. Appl. No. 17/087,855, dated Nov. 5, 2021, 2 pages.
Bao et al., "Location-based and Preference-Aware Recommendation Using Sparse Geo-Social Networking Data", ACM SIGSPATIAL GIS '12, Redondo Beach, CA, USA, Online available at: https://www.microsoft.com/en-us/research/wp-content/uploads/2016/02/LocationRecommendation.pdf, Nov. 6-9, 2012, 10 pages.
Board Decision received for Chinese Patent Application No. 201410407626.4, dated Jun. 8, 2020, 17 pages.
Board Decision received for Chinese Patent Application No. 201510284896.5, dated Nov. 19, 2021, 14 pages.
Board Decision received for Chinese Patent Application No. 201710094150.7, dated Dec. 22, 2021, 20 pages.
Board Decision received for Chinese Patent Application No. 201810094316.X, dated Dec. 3, 2021, 18 pages.
Board Opinion received for Chinese Patent Application No. 201610459968.X, dated Mar. 3, 2022, 11 pages.
Board Opinion received for Chinese Patent Application No. 201810094316.X, dated Sep. 30, 2021, 11 pages.
Board Opinion received for Chinese Patent Application No. 201810338826.7, dated Jan. 19, 2022, 18 pages.
Brief Communication Regarding Oral Proceedings received for European Patent Application No. 15727291.5, mailed on Jun. 9, 2020, 12 pages.
Brief Communication Regarding Oral Proceedings received for European Patent Application No. 16201159.7, mailed on Jun. 29, 2021, 13 pages.
Brief Communication regarding Oral Proceedings received for European Patent Application No. 16201205.8, mailed on May 29, 2020, 29 pages.
Brief Communication Regarding Oral Proceedings received for European Patent Application No. 18713408.5, mailed on Sep. 28, 2021, 2 pages.
Brief Communication Regarding Oral Proceedings received for European Patent Application No. 18830326.7, mailed on Jun. 30, 2021, 2 pages.
Brief Communication Regarding Oral Proceedings received for European Patent Application No. 19194828.0, mailed on May 6, 2022, 1 page.
Certificate of Examination received for Australian Patent Application No. 2017100553, dated Jan. 17, 2018, 2 pages.
Corrected Notice of Allowance received for U.S. Appl. No. 12/074,985, dated Oct. 10, 2013, 4 pages.
Corrected Notice of Allowance received for U.S. Appl. No. 14/612,214, dated May 1, 2020, 2 pages.
Corrected Notice of Allowance received for U.S. Appl. No. 15/017,436, dated Sep. 2, 2016, 5 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/269,801, dated Oct. 3, 2017, 4 pages.
Corrected Notice of Allowance received for U.S. Appl. No. 15/294,439, dated Mar. 13, 2019, 4 pages.
Corrected Notice of Allowance received for U.S. Appl. No. 15/357,873, dated Jan. 19, 2018, 2 pages.
Corrected Notice of Allowance received for U.S. Appl. No. 15/357,873, dated Mar. 16, 2018, 2 pages.
Corrected Notice of Allowance received for U.S. Appl. No. 15/845,794, dated Feb. 25, 2019, 2 pages.
Corrected Notice of Allowance received for U.S. Appl. No. 15/866,341, dated Aug. 21, 2019, 3 pages.
Corrected Notice of Allowance received for U.S. Appl. No. 15/866,341, dated Aug. 26, 2019, 3 pages.
Corrected Notice of Allowance received for U.S. Appl. No. 16/125,267, dated Apr. 4, 2022, 2 pages.
Corrected Notice of Allowance received for U.S. Appl. No. 16/125,267, dated Mar. 16, 2022, 2 pages.
Corrected Notice of Allowance received for U.S. Appl. No. 16/125,267, dated May 4, 2022, 3 pages.
Corrected Notice of Allowance received for U.S. Appl. No. 16/369,473, dated Sep. 9, 2022, 2 pages.
Corrected Notice of Allowance received for U.S. Appl. No. 16/386,707, dated Feb. 19, 2021, 2 pages.
Corrected Notice of Allowance received for U.S. Appl. No. 16/386,707, dated Jan. 25, 2021, 2 pages.

(56) References Cited

OTHER PUBLICATIONS

Corrected Notice of Allowance received for U.S. Appl. No. 16/434,865, dated Apr. 28, 2020, 2 pages.
Corrected Notice of Allowance received for U.S. Appl. No. 16/434,865, dated Jun. 4, 2020, 2 pages.
Corrected Notice of Allowance received for U.S. Appl. No. 16/456,839, dated Apr. 29, 2021, 2 pages.
Corrected Notice of Allowance received for U.S. Appl. No. 16/456,839, dated Jul. 20, 2021, 3 pages.
Corrected Notice of Allowance received for U.S. Appl. No. 16/553,622, dated Sep. 23, 2020, 5 pages.
Corrected Notice of Allowance received for U.S. Appl. No. 16/670,949, dated Sep. 8, 2021, 2 pages.
Corrected Notice of Allowance received for U.S. Appl. No. 16/843,638, dated Dec. 22, 2021, 2 pages.
Corrected Notice of Allowance received for U.S. Appl. No. 16/843,638, dated Feb. 16, 2022, 2 pages.
Corrected Notice of Allowance received for U.S. Appl. No. 16/987,003, dated Sep. 1, 2021, 3 pages.
CV Meerkat, "Extracting Face Orientation in Real-time", Available online at: <https://www.youtube.com/watch?v=Ugwfnjx6UYw>, Jul. 22, 2016, 3 pages.
Das et al., "A Security Framework for Mobile-to-Mobile Payment Network", International Conference on Personal Wireless Communications, Jan. 25, 2005, pp. 420-423.
Decision from Intellectual Property Tribunal received for Korean Patent Application No. 10-2011-7023152, dated Feb. 17, 2015, 22 pages.
Decision on Appeal received for Korean Patent Application No. 10-2015-7010262, mailed on Dec. 21, 2018, 16 pages.
Decision on Appeal received for Korean Patent Application No. 10-2016-0152210, mailed on Jun. 23, 2020, 20 pages.
Decision on Appeal received for Korean Patent Application No. 10-2020-7020782, mailed on Jan. 24, 2022, 22 pages.
Decision on Appeal received for U.S. Appl. No. 13/243,045, mailed on Mar. 18, 2019, 10 Pages.
Decision on Appeal received for U.S. Appl. No. 13/243,045, mailed on May 10, 2021, 11 pages.
Decision on Appeal received for U.S. Appl. No. 14/612,214, mailed on Sep. 3, 2019, 10 pages.
Decision on Appeal received for U.S. Appl. No. 15/714,887, mailed on Feb. 18, 2022, 14 pages.
Decision to Grant received for Danish Patent Application No. PA201670628, dated Nov. 20, 2017, 2 pages.
Decision to Grant received for Danish Patent Application No. PA201770418, dated Oct. 25, 2019, 3 pages.
Decision to Grant received for Danish Patent Application No. PA201770419, dated Oct. 25, 2018, 2 pages.
Decision to Grant received for Danish Patent Application No. PA201770715, dated Feb. 15, 2019, 2 pages.
Decision to Grant received for Danish Patent Application No. PA201770782, dated Oct. 25, 2019, 2 pages.
Decision to Grant received for Danish Patent Application No. PA201870370, dated Mar. 29, 2019, 2 pages.
Decision to Grant received for Danish Patent Application No. PA201870371, dated Mar. 29, 2019, 2 pages.
Decision to Grant received for Danish Patent Application No. PA201870855, dated Oct. 20, 2020, 2 pages.
Decision to Grant received for Danish Patent Application No. PA201970127, dated Aug. 20, 2020, 2 pages.
Decision to Grant received for European Patent Application No. 04753978.8, dated Apr. 16, 2015, 2 pages.
Decision to Grant received for European Patent Application No. 12773460.6, dated Jun. 27, 2019, 2 pages.
Decision to Grant received for European Patent Application No. 13171145.9, dated Jul. 11, 2019, 2 pages.
Decision to Grant received for European Patent Application No. 14853215.3, dated Sep. 27, 2018, 2 pages.
Decision to Grant received for European Patent Application No. 15168475.0, dated Sep. 30, 2021, 2 pages.
Decision to Grant received for European Patent Application No. 17853654.6, dated Apr. 15, 2021, 2 pages.
Decision to Grant received for European Patent Application No. 18190250.3, dated Oct. 1, 2020, 2 pages.
Decision to Grant received for European Patent Application No. 18704335.1, dated Sep. 24, 2020, 2 pages.
Decision to Grant received for European Patent Application No. 18830326.7, dated Nov. 11, 2021, 3 pages.
Decision to Grant received for European Patent Application No. 20196476.4, dated Jan. 13, 2022, 2 pages.
Decision to Grant received for Japanese Patent Application No. 2017-075031, dated Jul. 1, 2019, 3 pages.
Decision to Grant received for the European Patent Application No. 12181538.5, dated Jul. 2, 2015, 1 page.
Decision to Refusal received for Japanese Patent Application No. 2013-145795, dated Mar. 4, 2016, 8 pages.
Decision to Refuse received for European Patent Application No. 08834386.8, dated Apr. 8, 2013, 8 pages.
Decision to Refuse received for European Patent Application No. 12770400.5, dated Nov. 8, 2018, 12 pages.
Decision to Refuse received for European Patent Application No. 15727291.5, dated Jun. 30, 2020, 21 pages.
Decision to Refuse received for European Patent Application No. 15728352.4, dated May 28, 2020, 25 pages.
Decision to Refuse received for European Patent Application No. 16201159.7, dated Sep. 27, 2021, 22 pages.
Decision to Refuse received for European Patent Application No. 16201195.1, dated Mar. 4, 2019, 23 pages.
Decision to Refuse received for European Patent Application No. 16201205.8, dated Jun. 30, 2020, 29 pages.
Drareni Jamil, "Face Tracking and Head Pose Estimation with Open CV", Available online at: <https://www.youtube.com/watch?v=Etj_aktbnwM>, Jun. 9, 2013, 3 pages.
European Search Report received for European Patent Application No. 04753978.8, dated Feb. 22, 2010, 3 pages.
Examination Report received for Australian Patent Application No. 2015202397, dated Feb. 29, 2016, 4 pages.
Examiner Interview Summary received for U.S. Appl. No. 12/732,946, dated Jan. 26, 2015, 4 pages.
Examiner's Answer to Appeal Brief received for U.S. Appl. No. 13/243,045, dated Oct. 26, 2020, 17 pages.
Examiner's Answer to Appeal Brief received for U.S. Appl. No. 15/714,887, dated Aug. 27, 2021, 23 pages.
Examiner's Pre-Review Report received for Japanese Patent Application No. 2013-098406, dated Oct. 8, 2015, 7 pages.
Examiner's Pre-Review Report received for Japanese Patent Application No. 2018-113081, dated Apr. 28, 2021, 4 pages.
Examiner's Pre-Review Report received for Japanese Patent Application No. 2019-563560, dated Dec. 27, 2021, 4 pages.
Extended European Search Report (includes Partial European Search Report and European Search Opinion) received for European Patent Application No. 13171145.9, dated Feb. 5, 2014, 6 pages.
Extended European Search Report (includes Partial European Search Report and European Search Opinion) received for European Patent Application No. 15168475.0, dated Oct. 21, 2015, 6 pages.
Extended European Search Report received for European Patent Application No. 12181538.5, dated Oct. 23, 2012, 6 pages.
Extended European Search Report received for European Patent Application No. 14853215.3, dated Sep. 13, 2016, 9 pages.
Extended European Search Report received for European Patent Application No. 16177139.9, dated Nov. 4, 2016, 7 pages.
Extended European Search Report received for European Patent Application No. 16201159.7, dated Mar. 27, 2017, 12 pages.
Extended European Search Report Received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 17799904.2, dated Jul. 30, 2018, 7 pages.
Extended European Search Report received for European Patent Application No. 17853654.6, dated Jul. 8, 2019, 9 pages.
Extended European Search Report received for European Patent Application No. 18190250.3, dated Nov. 9, 2018, 6 pages.

(56) References Cited

OTHER PUBLICATIONS

Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19160344.8, dated Jun. 14, 2019, 7 pages.
Extended European Search Report received for European Patent Application No. 19160348.9, dated Jul. 19, 2019, 6 pages.
Extended European Search Report received for European Patent Application No. 19186538.5, dated Oct. 9, 2019, 10 pages.
Extended European Search Report received for European Patent Application No. 19194828.0, dated Dec. 19, 2019, 7 pages.
Extended European Search Report received for European Patent Application No. 20186286.9, dated Nov. 2, 2020, 9 pages.
Extended European Search Report received for European Patent Application No. 20191533.7, dated Nov. 13, 2020, 8 pages.
Extended European Search Report received for European Patent Application No. 20196476.4, dated Nov. 5, 2020, 5 pages.
Extended European Search Report received for European Patent Application No. 20198076.0, dated Jan. 13, 2021, 8 pages.
Extended European Search Report received for European Patent Application No. 21166287.9, dated Nov. 5, 2021, 10 pages.
Extended European Search Report received for European Patent Application No. 21173988.3, dated Aug. 23, 2021, 6 pages.
Extended European Search Report received for European Patent Application No. 22150595.1, dated Apr. 8, 2022, 6 pages.
Final Office Action received for U.S. Appl. No. 10/997,291, dated Jan. 2, 2008, 5 pages.
Final Office Action received for U.S. Appl. No. 12/074,985, dated Dec. 2, 2011, 19 pages.
Final Office Action received for U.S. Appl. No. 12/207,370, dated Dec. 13, 2011, 15 pages.
Final Office Action received for U.S. Appl. No. 12/207,370, dated Feb. 15, 2013, 17 pages.
Final Office Action received for U.S. Appl. No. 12/207,374, dated Jan. 31, 2014, 12 pages.
Final Office Action received for U.S. Appl. No. 12/207,374, dated Nov. 6, 2012, 25 pages.
Final Office Action received for U.S. Appl. No. 12/207,374, dated Oct. 21, 2011, 16 pages.
Final Office Action received for U.S. Appl. No. 12/732,946, dated Oct. 9, 2014, 34 pages.
Final Office Action received for U.S. Appl. No. 13/243,045, dated Aug. 5, 2015, 10 pages.
Final Office Action received for U.S. Appl. No. 13/243,045, dated Jan. 15, 2020, 12 pages.
Final Office Action received for U.S. Appl. No. 13/248,882, dated Dec. 4, 2013, 22 pages.
Final Office Action received for U.S. Appl. No. 14/142,669, dated Jun. 12, 2015, 14 pages.
Final Office Action received for U.S. Appl. No. 14/285,378, dated Jul. 23, 2015, 19 pages.
Final Office Action received for U.S. Appl. No. 14/311,214, dated Jan. 8, 2015, 12 pages.
Final Office Action received for U.S. Appl. No. 14/311,214, dated Sep. 24, 2015, 15 pages.
Final Office Action received for U.S. Appl. No. 14/479,088, dated Mar. 11, 2015, 10 pages.
Final Office Action received for U.S. Appl. No. 14/480,183, dated Jun. 28, 2017, 14 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Apr. 24, 2019, 5 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/612,214, dated Dec. 7, 2015, 13 pages.
Final Office Action received for U.S. Appl. No. 14/640,020, dated Jul. 16, 2015, 26 pages.
Final Office Action received for U.S. Appl. No. 14/980,344, dated Dec. 5, 2018, 17 pages.
Final Office Action received for U.S. Appl. No. 14/980,344, dated Nov. 25, 2019, 13 pages.
Final Office Action received for U.S. Appl. No. 15/137,944, dated Feb. 27, 2017, 10 pages.
Final Office Action received for U.S. Appl. No. 15/470,752, dated Mar. 13, 2018, 14 pages.
Final Office Action received for U.S. Appl. No. 15/714,887, dated Nov. 13, 2020, 60 pages.
Final Office Action received for U.S. Appl. No. 15/714,887, dated Nov. 15, 2019, 55 pages.
Final Office Action received for U.S. Appl. No. 15/866,341, dated May 14, 2019, 10 pages.
Final Office Action received for U.S. Appl. No. 15/872,685, dated Oct. 26, 2018, 10 pages.
Final Office Action received for U.S. Appl. No. 15/899,966, dated Nov. 5, 2018, 10 Pages.
Final Office Action received for U.S. Appl. No. 16/125,267, dated Aug. 26, 2021, 22 pages.
Final Office Action received for U.S. Appl. No. 16/125,267, dated Dec. 10, 2020, 20 pages.
Final Office Action received for U.S. Appl. No. 16/147,023, dated Jul. 23, 2019, 18 pages.
Final Office Action received for U.S. Appl. No. 16/147,115, dated Jun. 19, 2019, 14 pages.
Final Office Action received for U.S. Appl. No. 16/164,561, dated Sep. 5, 2019, 12 pages.
Final Office Action received for U.S. Appl. No. 16/369,473, dated Dec. 14, 2020, 17 pages.
Final Office Action received for U.S. Appl. No. 16/369,473, dated Jan. 25, 2022, 19 pages.
Final Office Action received for U.S. Appl. No. 17/087,855, dated Mar. 31, 2022, 23 pages.
Final Office Action received for U.S. Appl. No. 15/250,152, dated Aug. 23, 2017, 24 pages.
Final Office Action received for U.S. Appl. No. 15/250,152, dated Nov. 16, 2018, 30 pages.
How to Smartphone,"Samsung Galaxy S7—screen rotation on / off", Available Online at <https://www.youtube.com/watch?v= np54sEEI11E >, see video from 1:10 to 1:30., Dec. 12, 2016, 3 pages.
IDEX,"IDEX Fingerprint Sensor Mobile Glass Display", Youtube, available at <https://www.youtube.com/watch?v=X1dAIP5sFzw>, Apr. 11, 2013, 2 pages.
Intention to Grant received for Danish Patent Application No. PA201670628, dated Aug. 28, 2017, 2 pages.
Intention to Grant received for Danish Patent Application No. PA201770418, dated Aug. 22, 2019, 2 pages.
Intention to Grant received for Danish Patent Application No. PA201770418, dated Nov. 16, 2018, 3 pages.
Intention to Grant received for Danish Patent Application No. PA201770419, dated Mar. 28, 2018, 2 pages.
Intention to Grant received for Danish Patent Application No. PA201770714, dated Feb. 15, 2019, 2 pages.
Intention to Grant received for Danish Patent Application No. PA201770714, dated Nov. 2, 2018, 2 pages.
Intention to Grant received for Danish Patent Application No. PA201770715, dated Nov. 13, 2018, 2 pages.
Intention to Grant received for Danish Patent Application No. PA201770782, dated Aug. 8, 2019, 2 pages.
Intention to Grant received for Danish Patent Application No. PA201870370, dated Jan. 2, 2019, 2 pages.
Intention to Grant received for Danish Patent Application No. PA201870371, dated Jan. 2, 2019, 2 pages.
Intention to Grant received for Danish Patent Application No. PA201870855, dated Jul. 13, 2020, 2 pages.

(56) References Cited

OTHER PUBLICATIONS

Intention to Grant received for Danish Patent Application No. PA201970127, dated Apr. 21, 2020, 2 pages.
Intention to Grant received for European Patent Application No. 04753978.8, dated Dec. 4, 2014, 5 pages.
Intention to Grant received for European Patent Application No. 12181538.5, dated Feb. 20, 2015, 8 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
Intention to Grant received for European Patent Application No. 13171145.9, dated Feb. 21, 2019, 8 pages.
Intention to Grant received for European Patent Application No. 14853215.3, dated Jun. 27, 2018, 9 pages.
Intention to Grant received for European Patent Application No. 15168475.0, dated Feb. 4, 2020, 9 pages.
Intention to Grant received for European Patent Application No. 15168475.0, dated Jan. 22, 2021, 8 pages.
Intention to Grant received for European Patent Application No. 15168475.0, dated Jul. 7, 2021, 8 pages.
Intention to Grant received for European Patent Application No. 17853654.6, dated Nov. 23, 2020, 8 pages.
Intention to Grant received for European Patent Application No. 18190250.3, dated May 15, 2020, 9 pages.
Intention to grant received for European Patent Application No. 18704335.1, dated Apr. 17, 2020, 6 pages.
Intention to Grant received for European Patent Application No. 18713408.5, dated Mar. 17, 2022, 10 pages.
Intention to Grant received for European Patent Application No. 18713408.5, dated May 23, 2022, 10 pages.
Intention to Grant received for European Patent Application No. 18713408.5, dated Oct. 28, 2021, 10 pages.
Intention to Grant received for European Patent Application No. 18830326.7, dated Sep. 15, 2021, 11 pages.
Intention to Grant received for European Patent Application No. 19160344.8, dated May 13, 2022, 10 pages.
Intention to Grant received for European Patent Application No. 20196476.4, dated Aug. 25, 2021, 9 pages.
International Preliminary Report on Patentability received for PCT Patent Application No. PCT/US2018/014658, dated Nov. 28, 2019, 14 pages.
International Preliminary Report on Patentability received for PCT Patent Application No. PCT/US2018/049289, dated Mar. 19, 2020, 9 pages.
International Preliminary Report on Patentability received for PCT Patent Application No. PCT/US2004/017270, dated Jul. 23, 2013, 3 pages.
International Preliminary Report on Patentability received for PCT Patent Application No. PCT/US2008/075738, completed on Jan. 28, 2010, 15 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2014/054800, dated Mar. 31, 2016, 27 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2017/032240, dated Nov. 29, 2018, 29 pages.
International Preliminary Report on Patentability received for PCT Patent Application No. PCT/US2017/049760, dated Apr. 4, 2019, 9 pages.
International Preliminary Report on Patentability received for PCT Patent Application No. PCT/US2018/015603, dated Mar. 19, 2020, 8 pages.
International Preliminary Report on Patentability received for PCT Patent Application No. PCT/US2019/035092, dated Dec. 17, 2020, 10 pages.
International Preliminary Report on Patentability received for PCT Patent Application No. PCT/US2019/049227, dated Apr. 8, 2021, 11 pages.
International Preliminary Report on Patentability received for PCT Patent Application No. PCT/US2019/049239, dated Apr. 8, 2021, 12 pages.
International Search Report and Written Opinion received for PCT Application No. PCT/US2015/033326, dated Aug. 10, 2015, 13 pages.
International Search Report and Written Opinion received for PCT Patent Application No. PCT/US17/49760, dated Jan. 19, 2018, 12 pages.
International Search Report and Written Opinion received for PCT Patent Application No. PCT/US2004/017270, dated Dec. 1, 2004, 6 pages.
International Search Report and Written Opinion received for PCT Patent Application No. PCT/US2008/075738, dated Jul. 2, 2009, 14 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2014/054800, dated Jan. 29, 2015, 33 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2017/032240, dated Sep. 21, 2017, 33 pages.
International Search Report and Written Opinion received for PCT Patent Application No. PCT/US2018/014658, dated Jun. 6, 2018, 20 pages.
International Search Report and Written Opinion received for PCT Patent Application No. PCT/US2018/015603, dated Jun. 22, 2018, 13 pages.
International Search Report and Written Opinion received for PCT Patent Application No. PCT/US2018/049289, dated Feb. 19, 2019, 12 pages.
International Search Report and Written Opinion received for PCT Patent Application No. PCT/US2019/035092, dated Jan. 16, 2020, 16 pages.
International Search Report and Written Opinion received for PCT Patent Application No. PCT/US2019/049227, dated Dec. 12, 2019, 14 pages.
International Search Report and Written Opinion received for PCT Patent Application No. PCT/US2019/049239, dated Jan. 22, 2020, 18 pages.
Invitation to Pay Addition Fees received for PCT Patent Application No. PCT/US2018/014658, dated Apr. 11, 2018, 14 pages.
Invitation to Pay Additional Fee received for PCT Patent Application No. PCT/US17/32240, dated Jul. 12, 2017, 2 pages.
Invitation to Pay Additional Fee received for PCT Patent Application No. PCT/US2019/035092, dated Nov. 20, 2019, 6 pages.
Invitation to pay Additional fees received for PCT Patent Application No. PCT/US17/49760, dated Nov. 21, 2017, 2 pages.
Invitation to Pay Additional Fees received for PCT Patent Application No. PCT/US2014/054800, dated Oct. 31, 2014, 2 pages.
Invitation to Pay Additional Fees received for PCT Patent Application No. PCT/US2019/049239, dated Dec. 4, 2019, 10 pages.

(56) References Cited

OTHER PUBLICATIONS

Invitation to Pay Search Fees received for European Patent Application No. 19731554.2, dated Dec. 16, 2021, 3 pages.
IPhone 4S Tips 'N' Tricks: Access the Camera from the Lock Screen—Phones 4u, Youtube, available at <https://www.youtube.com/watch?v=C8eDN4Vu2mg>, Dec. 9, 2011, 2 pages.
Iphoneblog, "iOS 5.0.1 Security Flaw—Bypass the Passcode—Access Camera Roll", YouTube, available at <https://www.youtube.com/watch?v=qd0Fwgaymb0>, Feb. 24, 2012, 2 pages.
Kawai Yasuhiro, "Resolving anxieties regarding card payment abuse by authentication—overcoming cumbersomeness by cooperation with mobile phones", NiKKei Internet Solutions No. 78, Japan, NiKKei BP, No. 78, Dec. 22, 2003, pp. 28-31.
Komachi Aneem, "Time Attendance—Face Recognition—Biometrics", Available at <https://www.youtube.com/watch?v=ascITiiiSbc>, Feb. 9, 2010, 1 page.
Kurihara Ryo, "Torisetsu of OS X that we want to know", Mac Fan, Japan, Mai Navi Co. Ltd., vol. 21, No. 6, Jun. 1, 2013, 8 pages.
Lu Haiyun, "Recommendations Based on Purchase Patterns", International Journal of Machine Learning and Computing, vol. 4, No. 6, Online available at: http://www.ijmlc.org/papers/462-C015.pdf, Dec. 2014, pp. 501-504.
Managing Windows User Accounts on Your Home Computer, Available online at: https://www.informit.com/articles/article.aspx?p=478948&seqNum=8, Jun. 23, 2006, 2 pages.
Minutes of the Oral Proceedings received for European Application No. 12770400.5, mailed on Nov. 6, 2018, 7 pages.
Minutes of the Oral Proceedings received for European Patent Application No. 15727291.5, mailed on Jun. 29, 2020, 8 pages.
Minutes of the Oral Proceedings received for European Patent Application No. 15728352.4, mailed on May 27, 2020, 3 pages.
Minutes of the Oral Proceedings received for European Patent Application No. 16201159.7, mailed on Sep. 23, 2021, 6 pages.
Minutes of the Oral Proceedings received for European Patent Application No. 16201205.8, mailed on Jun. 29, 2020, 6 pages.
Naver Blog, "How to Use Smart Wallet and Registered Card", Online Available at <http://feena74.blog.me/140185758401>, Mar. 29, 2013, 20 pages.
Nhdanh—Protocol Corp, "How to Enroll Face Enbioaccess T9 Nitgen Korea—Đăng Ký Khuôn Mặt Enbioaccess T9 Nitgen", Available online at <https://www.youtube.com/watch?v=mFn03PD4NIE>, Mar. 30, 2017, 1 page.
Non-Final Office Action received for U.S. Appl. No. 12/207,374, dated Apr. 15, 2011, 13 pages.
Non-Final Office Action received for U.S. Appl. No. 12/207,374, dated Jun. 7, 2013, 26 pages.
Non-Final Office Action received for U.S. Appl. No. 12/207,374, dated May 24, 2012, 20 pages.
Non-Final Office Action received for U.S. Appl. No. 14/311,214, dated Apr. 10, 2015, 12 pages.
Non-Final Office Action received for U.S. Appl. No. 14/503,072, dated Jan. 26, 2015, 12 pages.
Non-Final Office Action received for U.S. Appl. No. 14/503,296, dated Jan. 30, 2015, 16 pages.
Non-Final Office Action received for U.S. Appl. No. 15/899,966, dated May 4, 2018, 10 pages.
Non-Final Office Action received for U.S. Appl. No. 15/900,047, dated May 8, 2018, 7 pages.
Non-Final Office Action received for U.S. Appl. No. 14/503,364, dated Feb. 3, 2016, 16 pages.
Non-Final Office Action received for U.S. Appl. No. 10/858,290, dated Nov. 24, 2004, 10 pages.
Non-Final Office Action received for U.S. Appl. No. 10/997,291, dated Jul. 28, 2005, 6 pages.
Non-Final Office Action received for U.S. Appl. No. 12/074,985, dated Apr. 19, 2011, 24 pages.
Non-Final Office Action received for U.S. Appl. No. 12/074,985, dated Mar. 18, 2013, 19 pages.
Non-Final Office Action received for U.S. Appl. No. 12/201,568, dated Oct. 2, 2008, 6 pages.
Non-Final Office Action received for U.S. Appl. No. 12/207,370, dated Aug. 2, 2012, 16 pages.
Non-Final Office Action received for U.S. Appl. No. 12/207,370, dated May 6, 2011, 15 pages.
Non-Final Office Action received for U.S. Appl. No. 12/207,370, dated Oct. 17, 2013, dated Oct. 17, 2013, 17 pages.
Non-Final Office Action received for U.S. Appl. No. 12/430,702, dated Jun. 24, 2009, 6 pages.
Non-Final Office Action received for U.S. Appl. No. 12/732,946, dated Oct. 17, 2013, dated Oct. 17, 2013, 25 pages.
Non-Final Office Action received for U.S. Appl. No. 13/243,045, dated Jun. 12, 2019, 11 pages.
Non-Final Office Action received for U.S. Appl. No. 13/243,326, dated Feb. 14, 2013, dated Feb. 14, 2013, 13 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 14/090,344, dated Jan. 15, 2015, 13 pages.
Non-Final Office Action received for U.S. Appl. No. 14/142,669, dated Oct. 28, 2015, 14 pages.
Non-Final Office Action received for U.S. Appl. No. 14/142,669, dated Sep. 12, 2014, 11 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/311,214, dated Sep. 18, 2014, 10 pages.
Non-Final Office Action received for U.S. Appl. No. 14/479,088, dated Jul. 6, 2015, 10 pages.
Non-Final Office Action received for U.S. Appl. No. 14/479,088, dated Nov. 18, 2014, 8 pages.
Non-Final Office Action received for U.S. Appl. No. 14/480,183, dated Oct. 18, 2016, 12 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Oct. 5, 2016, 11 pages.
Non-Final Office Action received for U.S. Appl. No. 14/503,296, dated Sep. 18, 2018, 20 pages.
Non-Final Office Action received for U.S. Appl. No. 14/503,381, dated May 13, 2015, 13 pages.
Non-Final Office Action received for U.S. Appl. No. 14/612,214, dated Jul. 29, 2015, 12 pages.
Non-Final Office Action received for U.S. Appl. No. 14/612,214, dated Nov. 20, 2019, 11 pages.
Non-Final Office Action received for U.S. Appl. No. 14/640,020, dated Apr. 29, 2015, 18 pages.
Non-Final Office Action received for U.S. Appl. No. 14/642,366, dated Aug. 24, 2015, 7 pages.
Non-Final Office Action received for U.S. Appl. No. 14/980,344, dated Mar. 14, 2018, 13 pages.
Non-Final Office Action received for U.S. Appl. No. 14/980,344, dated May 14, 2019, 11 pages.
Non-Final Office Action received for U.S. Appl. No. 15/134,638, dated Sep. 20, 2016, 6 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/269,801, dated Dec. 30, 2016, 17 pages.
Non-Final Office Action received for U.S. Appl. No. 15/294,439, dated Jan. 26, 2018, 18 pages.
Non-Final Office Action received for U.S. Appl. No. 15/470,752, dated Aug. 28, 2018, 12 pages.
Non-Final Office Action received for U.S. Appl. No. 15/470,752, dated Jul. 28, 2017, 11 pages.

(56) References Cited

OTHER PUBLICATIONS

Non-Final Office Action received for U.S. Appl. No. 15/714,887, dated May 27, 2020, 48 pages.
Non-Final Office Action received for U.S. Appl. No. 15/714,887, dated May 30, 2019, 47 pages.
Non-Final Office Action received for U.S. Appl. No. 15/845,794, dated Oct. 15, 2018, 8 pages.
Non-Final Office Action received for U.S. Appl. No. 15/866,341, dated Nov. 13, 2018, 11 pages.
Non-Final Office Action received for U.S. Appl. No. 15/872,685, dated Mar. 27, 2018, 9 pages.
Non-Final Office Action received for U.S. Appl. No. 15/894,221, dated Jul. 25, 2018, 21 pages.
Non-Final Office Action received for U.S. Appl. No. 15/903,456, dated Sep. 6, 2018, 20 pages.
Non-Final Office Action received for U.S. Appl. No. 15/992,722, dated Aug. 6, 2020, 7 pages.
Non-Final Office Action received for U.S. Appl. No. 16/035,419, dated Jan. 30, 2019, 24 pages.
Non-Final Office Action received for U.S. Appl. No. 16/125,267, dated Jul. 2, 2020, 20 pages.
Non-Final Office Action received for U.S. Appl. No. 16/125,267, dated Mar. 26, 2021, 20 pages.
Non-Final Office Action received for U.S. Appl. No. 16/125,267, dated Nov. 23, 2021, 21 pages.
Non-Final Office Action received for U.S. Appl. No. 16/147,023, dated Dec. 26, 2018, 17 pages.
Non-Final Office Action received for U.S. Appl. No. 16/147,115, dated Dec. 13, 2018, 12 pages.
Non-Final Office Action received for U.S. Appl. No. 16/164,561, dated Jan. 4, 2019, 14 pages.
Non-Final Office Action received for U.S. Appl. No. 16/369,355, dated Apr. 29, 2021, 16 pages.
Non-Final Office Action received for U.S. Appl. No. 16/369,473, dated Apr. 27, 2020, 12 pages.
Non-Final Office Action received for U.S. Appl. No. 16/369,473, dated Jun. 11, 2021, 19 pages.
Non-Final Office Action received for U.S. Appl. No. 16/434,865, dated Jan. 16, 2020, 9 pages.
Non-Final Office Action received for U.S. Appl. No. 16/542,084, dated Jan. 24, 2020, 21 pages.
Non-Final Office Action received for U.S. Appl. No. 16/553,622, dated May 29, 2020, 11 pages.
Non-Final Office Action received for U.S. Appl. No. 16/667,271, dated Dec. 13, 2019, 8 pages.
Non-Final Office Action received for U.S. Appl. No. 16/670,949, dated Dec. 9, 2020, 11 pages.
Non-Final Office Action received for U.S. Appl. No. 16/987,003, dated May 10, 2021, 20 pages.
Non-Final Office Action received for U.S. Appl. No. 16/990,974, dated Oct. 15, 2020, 6 pages.
Non-Final Office Action received for U.S. Appl. No. 17/087,855, dated Dec. 24, 2021, 21 pages.
Non-Final Office Action received for U.S. Appl. No. 17/087,855, dated Jul. 12, 2021, 17 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/945,610, dated Sep. 20, 2018, 9 pages.
Non-Final Office Action received for U.S. Appl. No. 13/243,045, dated Mar. 17, 2015, 9 pages.
Notice of Acceptance received for Australian Patent Application No. 2008305338, dated Oct. 27, 2011, 1 page.
Notice of Acceptance received for Australian Patent Application No. 2014334869, dated Jan. 3, 2018, 3 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2016201310, dated Feb. 21, 2018, 3 pages.
Notice of Acceptance received for Australian Patent Application No. 2016203896, dated Mar. 2, 2018, 3 pages.
Notice of Acceptance received for Australian Patent Application No. 2016203898 dated Feb. 21, 2018, 3 pages.
Notice of Acceptance received for Australian Patent Application No. 2017201064, dated Feb. 20, 2018, 3 pages.
Notice of Acceptance received for Australian Patent Application No. 2017266867, dated Mar. 6, 2019, 3 pages.
Notice of Acceptance received for Australian Patent Application No. 2017330208, dated Nov. 28, 2019, 3 pages.
Notice of Acceptance received for Australian Patent Application No. 2018202559, dated Oct. 21, 2019, 3 pages.
Notice of Acceptance received for Australian Patent Application No. 2018270420, dated Jul. 21, 2021, 3 pages.
Notice of Acceptance received for Australian Patent Application No. 2018279788, dated Nov. 6, 2019, 3 pages.
Notice of Acceptance received for Australian Patent Application No. 2018312629, dated Nov. 7, 2019, 4 pages.
Notice of Acceptance received for Australian Patent Application No. 2019200360, dated Mar. 15, 2019, 3 pages.
Notice of Acceptance received for Australian Patent Application No. 2019201101, dated May 6, 2019, 3 pages.
Notice of Acceptance received for Australian Patent Application No. 2019203473, dated Nov. 7, 2019, 3 pages.
Notice of Acceptance received for Australian Patent Application No. 2019204387, dated Dec. 4, 2020, 3 pages.
Notice of Acceptance received for Australian Patent Application No. 2019346842, dated Jan. 21, 2021, 3 pages.
Notice of Acceptance received for Australian Patent Application No. 2020200685, dated Oct. 29, 2020, 3 pages.
Notice of Acceptance received for Australian Patent Application No. 2020200795, dated Feb. 28, 2020, 3 pages.
Notice of Acceptance received for Australian Patent Application No. 2020201306, dated Mar. 12, 2020, 3 pages.
Notice of Acceptance received for Australian Patent Application No. 2020201721, dated Jul. 6, 2021, 3 pages.
Notice of Acceptance received for Australian Patent Application No. 2020204256, dated Oct. 9, 2021, 3 pages.
Notice of Acceptance received for Australian Patent Application No. 2020239783, dated Mar. 2, 2021, 3 pages.
Notice of Acceptance received for Australian Patent Application No. 2020289822, dated Dec. 22, 2021, 3 pages.
Notice of Acceptance received for Australian Patent Application No. 2021200415, dated May 9, 2022, 3 pages.
Notice of Acceptance received for Australian Patent Application No. 2022200617, dated May 12, 2022, 3 pages.
Notice of Allowance received for Australian Patent Application No. 2015202397, dated Feb. 15, 2017, 3 pages.
Notice of Allowance received for Canadian Patent Application No. 2,527,829, dated Feb. 1, 2016, 1 page.
Notice of Allowance received for Chinese Patent Application No. 200880108306.1, dated Oct. 28, 2014, 2 pages.
Notice of Allowance received for Chinese Patent Application No. 201280047459.6, dated Jan. 31, 2018, 2 pages.
Notice of Allowance received for Chinese Patent Application No. 201410407626.4, dated Aug. 27, 2020, 2 pages.
Notice of Allowance received for Chinese Patent Application No. 201480058054.1, dated Jul. 8, 2019, 2 pages.
Notice of Allowance received for Chinese Patent Application No. 201520357381.9, dated Jul. 29, 2015, 4 pages.
Notice of Allowance received for Chinese Patent Application No. 201520358683.8, dated Mar. 10, 2016, 5 pages.
Notice of Allowance received for Chinese Patent Application No. 201620480708.6, dated Apr. 20, 2017, 3 pages.
Notice of Allowance received for Chinese Patent Application No. 201620480846.4, dated Apr. 20, 2017, 3 pages.
Notice of Allowance received for Chinese Patent Application No. 201710093861.2, dated Sep. 24, 2019, 4 pages.

(56) References Cited

OTHER PUBLICATIONS

Notice of Allowance received for Chinese Patent Application No. 201710094150.7, dated Feb. 23, 2022, 4 pages.
Notice of Allowance received for Chinese Patent Application No. 201780002398.4, dated Jun. 17, 2019, 2 pages.
Notice of Allowance received for Chinese Patent Application No. 201810338038.8, dated Jun. 30, 2020, 2 pages.
Notice of Allowance received for Chinese Patent Application No. 201810338040.5, dated Mar. 30, 2022, 6 pages.
Notice of Allowance received for Chinese Patent Application No. 201810339290.0, dated Mar. 9, 2022, 2 pages.
Notice of Allowance received for Chinese Patent Application No. 201810954931.3, dated Jun. 23, 2021, 4 pages.
Notice of Allowance received for Chinese Patent Application No. 201810955077.2, dated Jul. 14, 2021, 2 pages.
Notice of Allowance received for Chinese Patent Application No. 201811460172.1, dated Jan. 11, 2021, 2 pages.
Notice of Allowance received for Chinese Patent Application No. 201910278273.5, dated Nov. 19, 2020, 2 pages.
Notice of Allowance received for Chinese Patent Application No. 201910744886.3, dated Jun. 3, 2021, 2 pages.
Notice of Allowance received for Chinese Patent Application No. 201910899698.8, dated Oct. 23, 2020, 4 pages.
Notice of Allowance received for Japanese Patent Application No. 2006-533547, dated May 15, 2015, 2 pages.
Notice of Allowance received for Japanese Patent Application No. 2013-098406, dated Jan. 23, 2017, 18 Pages.
Notice of Allowance received for Japanese Patent Application No. 2015-083696, dated Jan. 6, 2017, 3 pages.
Notice of Allowance received for Japanese Patent Application No. 2016-131998, dated Nov. 30, 2018, 4 pages.
Notice of Allowance received for Japanese Patent Application No. 2016-224506, dated Jan. 24, 2020, 4 pages.
Notice of Allowance received for Japanese Patent Application No. 2016-224507, dated Mar. 26, 2019, 3 pages.
Notice of Allowance received for Japanese Patent Application No. 2016-224508, dated Jun. 20, 2017, 3 pages.
Notice of Allowance received for Japanese Patent Application No. 2016-540927, dated May 14, 2018, 4 pages.
Notice of Allowance received for Japanese Patent Application No. 2016-558332, dated Jan. 11, 2019, 4 pages.
Notice of Allowance received for Japanese Patent Application No. 2016-569665, dated Feb. 22, 2019, 4 pages.
Notice of Allowance received for Japanese Patent Application No. 2017-013383, dated Mar. 31, 2017, 3 pages.
Notice of Allowance received for Japanese Patent Application No. 2017-085582, dated Nov. 30, 2018, 4 pages.
Notice of Allowance received for Japanese Patent Application No. 2018-113081, dated Nov. 8, 2021, 15 pages.
Notice of Allowance received for Japanese Patent Application No. 2018-241505, dated Oct. 4, 2019, 4 pages.
Notice of Allowance received for Japanese Patent Application No. 2018-551159, dated Jun. 15, 2020, 5 pages.
Notice of Allowance received for Japanese Patent Application No. 2018-560107, dated Dec. 6, 2019, 4 pages.
Notice of Allowance received for Japanese Patent Application No. 2019-053379, dated Nov. 16, 2020, 5 pages.
Notice of Allowance received for Japanese Patent Application No. 2019-107235, dated May 15, 2020, 5 pages.
Notice of Allowance received for Japanese Patent Application No. 2019-194603, dated Apr. 19, 2021, 4 pages.
Notice of Allowance received for Japanese Patent Application No. 2019-238894, dated Oct. 5, 2020, 4 pages.
Notice of Allowance received for Japanese Patent Application No. 2019-510416, dated Oct. 12, 2020, 5 pages.
Notice of Allowance received for Japanese Patent Application No. 2019-511975, dated Dec. 14, 2020, 4 pages.
Notice of Allowance received for Japanese Patent Application No. 2020-103213, dated Oct. 25, 2021, 5 pages.
Notice of Allowance received for Japanese Patent Application No. 2020-126751, dated Aug. 16, 2021, 5 pages.
Notice of allowance received for Japanese Patent Application No. 2020-159979, dated Nov. 8, 2021, 5 pages.
Notice of Allowance received for Japanese Patent Application No. 2020-569806, dated Jul. 12, 2021, 4 pages.
Notice of Allowance received for Japanese Patent Application No. 2021-015128, dated Sep. 3, 2021, 4 pages.
Notice of Allowance received for Japanese Patent Application No. 2021-163037, dated Dec. 6, 2021, 4 pages.
Notice of Allowance received for Japanese Patent Application No. 2021-208395, dated Mar. 25, 2022, 4 pages.
Notice of Allowance received for Japanese Patent Application No. 2022-070240, dated Aug. 5, 2022, 4 pages.
Notice of Allowance received for Korean Patent Application No. 10-2010-7008899, dated Feb. 12, 2016, 3 pages.
Notice of Allowance received for Korean Patent Application No. 10-2014-7004771, dated Oct. 29, 2015, 3 pages.
Notice of Allowance received for Korean Patent Application No. 10-2014-7004772, dated Feb. 12, 2016, 4 pages.
Notice of Allowance received for Korean Patent Application No. 10-2014-7004773, dated Jan. 7, 2016, 3 pages.
Notice of Allowance received for Korean Patent Application No. 10-2014-7025441, dated Feb. 26, 2016, 3 pages.
Notice of Allowance received for Korean Patent Application No. 10-2015-7004548, dated Feb. 26, 2016, 3 pages.
Notice of Allowance received for Korean Patent Application No. 10-2016-7009347, dated May 10, 2018, 4 pages.
Notice of Allowance received for Korean Patent Application No. 10-2016-7009632, dated Aug. 17, 2018, 4 pages.
Notice of Allowance received for Korean Patent Application No. 10-2016-7035555, dated Sep. 23, 2019, 3 pages.
Notice of Allowance received for Korean Patent Application No. 10-2017-0022365, dated Mar. 27, 2018, 4 pages.
Notice of Allowance received for Korean Patent Application No. 10-2017-0022546, dated Feb. 27, 2018, 4 pages.
Notice of Allowance received for Korean Patent Application No. 10-2017-0022582, dated Feb. 27, 2020, 5 pages.
Notice of Allowance received for Korean Patent Application No. 10-2017-7012145, dated Oct. 30, 2019, 3 pages.
Notice of Allowance received for Korean Patent Application No. 10-2017-7015582, dated Dec. 27, 2018, 5 pages.
Notice of Allowance received for Korean Patent Application No. 10-2018-7022895, dated Feb. 22, 2019, 4 pages.
Notice of Allowance received for Korean Patent Application No. 10-2018-7028845, dated Apr. 16, 2020, 5 pages.
Notice of Allowance received for Korean Patent Application No. 10-2018-7032467, dated Jan. 28, 2019, 4 pages.
Notice of Allowance received for Korean Patent Application No. 10-2018-7033301, dated Feb. 20, 2019, 5 pages.
Notice of Allowance received for Korean Patent Application No. 10-2019-7003374, dated Oct. 4, 2019, 10 pages.
Notice of Allowance received for Korean Patent Application No. 10-2019-7003836, dated Oct. 4, 2019, 6 pages.
Notice of Allowance received for Korean Patent Application No. 10-2019-7004734, dated Oct. 24, 2019, 7 pages.
Notice of Allowance received for Korean Patent Application No. 10-2019-7005136, dated Feb. 19, 2021, 5 pages.
Notice of Allowance received for Korean Patent Application No. 10-2019-7005925, dated Jan. 21, 2020, 7 pages.
Notice of Allowance received for Korean Patent Application No. 10-2019-7014494, dated Mar. 19, 2020, 4 pages.
Notice of Allowance received for Korean Patent Application No. 10-2019-7014988, dated Jan. 19, 2020, 4 pages.
Notice of Allowance received for Korean Patent Application No. 10-2019-7038021, dated May 2, 2020, 7 pages.
Notice of Allowance received for Korean Patent Application No. 10-2020-0048600, dated Apr. 30, 2020, 5 pages.
Notice of Allowance received for Korean Patent Application No. 10-2020-0097418, dated Apr. 27, 2021, 5 pages.
Notice of Allowance received for Korean Patent Application No. 10-2020-7002929, dated Nov. 26, 2020, 3 pages.

(56) References Cited

OTHER PUBLICATIONS

Notice of Allowance received for Korean Patent Application No. 10-2020-7011172, dated Aug. 25, 2020, 9 pages.
Notice of Allowance received for Korean Patent Application No. 10-2020-7011424, dated Jan. 21, 2021, 4 pages.
Notice of Allowance received for Korean Patent Application No. 10-2020-7017803, dated Nov. 5, 2020, 6 pages.
Notice of Allowance received for Korean Patent Application No. 10-2020-7022596, dated Jan. 27, 2022, 7 pages.
Notice of Allowance received for Korean Patent Application No. 10-2020-7027862, dated Jun. 29, 2021, 7 pages.
Notice of Allowance received for Korean Patent Application No. 10-2020-7034180, dated Feb. 22, 2022, 8 pages.
Notice of Allowance received for Korean Patent Application No. 10-2020-7036748, dated Jan. 25, 2021, 3 pages.
Notice of Allowance received for Korean Patent Application No. 10-2021-0099243, dated Oct. 30, 2021, 4 pages.
Notice of Allowance received for Korean Patent Application No. 10-2021-7005691, dated Mar. 29, 2021, 3 pages.
Notice of Allowance received for Korean Patent Application No. 10-2021-7011888, dated Jan. 27, 2022, 5 pages.
Notice of Allowance received for Korean Patent Application No. 10-2021-7015473, dated Feb. 24, 2022, 5 pages.
Notice of Allowance received for Korean Patent Application No. 10-2021-7020549, dated Jul. 13, 2021, 3 pages.
Notice of Allowance received for Korean Patent Application No. 10-2021-7024020, dated Jan. 14, 2022, 4 pages.
Notice of Allowance received for Korean Patent Application No. 10-2014-7008348, dated Feb. 21, 2019, 5 pages.
Notice of Allowance received for Taiwan Patent Application No. 097134592, dated Aug. 12, 2014, 3 pages.
Notice of Allowance received for Taiwan Patent Application No. 101107082, dated Oct. 22, 2014, 2 pages.
Notice of Allowance received for Taiwanese Patent Application No. 103131074, dated Nov. 17, 2015, 3 pages.
Notice of Allowance received for Taiwanese Patent Application No. 103136545, dated Nov. 27, 2017, 4 pages.
Notice of Allowance received for Taiwanese Patent Application No. 104117508, dated Sep. 18, 2019, 5 pages.
Notice of Allowance received for Taiwanese Patent Application No. 104140890, dated Oct. 25, 2017, 5 pages.
Notice of Allowance received for Taiwanese Patent Application No. 106141250, dated May 24, 2018, 7 pages.
Notice of Allowance received for Taiwanese Patent Application No. 107121719, dated Sep. 27, 2018, 7 pages.
Notice of Allowance received for Taiwanese Patent Application No. 107138003, dated Aug. 30, 2019, 4 pages.
Notice of Allowance received for the U.S. Appl. No. 14/503,381, dated Dec. 16, 2015, 8 pages.
Notice of Allowance received for U.S. Appl. No. 14/142,661, dated Aug. 3, 2015, 10 pages.
Notice of Allowance received for U.S. Appl. No. 14/479,088, dated Nov. 12, 2015, 7 pages.
Notice of Allowance received for U.S. Appl. No. 14/640,020, dated Dec. 15, 2015, 7 pages.
Notice of Allowance received for U.S. Appl. No. 10/997,291, dated Jun. 27, 2008, 16 pages.
Notice of Allowance received for U.S. Appl. No. 12/074,985, dated Jul. 30, 2013, 8 pages.
Notice of Allowance received for U.S. Appl. No. 12/201,568, dated Dec. 17, 2008, 6 pages.
Notice of Allowance received for U.S. Appl. No. 12/207,370, dated Jun. 7, 2013, 9 pages.
Notice of Allowance received for U.S. Appl. No. 12/207,370, dated Mar. 6, 2014, 5 pages.
Notice of Allowance received for U.S. Appl. No. 12/207,374, dated Aug. 29, 2014, 8 pages.
Notice of Allowance received for U.S. Appl. No. 12/207,374, dated Dec. 4, 2014, 8 pages.
Notice of Allowance received for U.S. Appl. No. 12/430,702, dated Nov. 16, 2009, 6 pages.
Notice of Allowance received for U.S. Appl. No. 12/604,814, dated Apr. 26, 2010, 4 pages.
Notice of Allowance received for U.S. Appl. No. 12/604,814, dated Aug. 5, 2010, 4 pages.
Notice of Allowance received for U.S. Appl. No. 12/604,814, dated Nov. 12, 2010, 4 pages.
Notice of Allowance received for U.S. Appl. No. 13/243,045, dated Aug. 4, 2021, 8 pages.
Notice of Allowance received for U.S. Appl. No. 13/243,326, dated Sep. 23, 2013, 11 pages.
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 14/090,344, dated Aug. 26, 2015, 7 pages.
Notice of Allowance received for U.S. Appl. No. 14/142,657, dated Jan. 8, 2015, 5 pages.
Notice of Allowance received for U.S. Appl. No. 14/142,657, dated Jul. 23, 2015, 2 pages.
Notice of Allowance received for U.S. Appl. No. 14/142,657, dated Jun. 29, 2015, 7 pages.
Notice of Allowance received for U.S. Appl. No. 14/142,657, dated Sep. 10, 2014, 9 pages.
Notice of Allowance received for U.S. Appl. No. 14/142,661, dated Sep. 28, 2015, 9 pages.
Notice of Allowance received for U.S. Appl. No. 14/142,669, dated Aug. 25, 2016, 2 pages.
Notice of Allowance received for U.S. Appl. No. 14/142,669, dated Jun. 14, 2016, 5 pages.
Notice of Allowance received for U.S. Appl. No. 14/142,669, dated Sep. 21, 2016, 2 pages.
Notice of Allowance received for U.S. Appl. No. 14/142,674, dated Feb. 18, 2015, 7 pages.
Notice of Allowance received for U.S. Appl. No. 14/142,674, dated Jan. 23, 2015, 7 pages.
Notice of Allowance received for U.S. Appl. No. 14/142,674, dated Sep. 26, 2014, 18 pages.
Notice of Allowance received for U.S. Appl. No. 14/255,765, dated Jun. 12, 2014, 10 pages.
Notice of Allowance received for U.S. Appl. No. 14/285,378, dated May 19, 2016, 10 pages.
Notice of Allowance received for U.S. Appl. No. 14/479,088, dated Mar. 9, 2016, 2 pages.
Notice of Allowance received for U.S. Appl. No. 14/480,183, dated Nov. 29, 2017, 7 pages.
Notice of Allowance received for U.S. Appl. No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,296, dated Aug. 28, 2019, 12 pages.
Notice of Allowance received for U.S. Appl. No. 14/503,364, dated Jun. 16, 2016, 11 pages.
Notice of Allowance received for U.S. Appl. No. 14/612,214, dated Apr. 15, 2020, 8 pages.
Notice of Allowance received for U.S. Appl. No. 14/642,366, dated Jan. 14, 2016, 8 pages.
Notice of Allowance received for U.S. Appl. No. 14/661,796, dated Jul. 7, 2015, 10 pages.
Notice of Allowance received for U.S. Appl. No. 14/661,796, dated Jul. 23, 2015, 2 pages.
Notice of Allowance received for U.S. Appl. No. 14/980,344, dated Mar. 23, 2020, 9 pages.
Notice of allowance received for U.S. Appl. No. 15/017,436, dated May 27, 2016, 17 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.

(56) References Cited

OTHER PUBLICATIONS

Notice of Allowance received for U.S. Appl. No. 15/137,944, dated Dec. 21, 2017, 8 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/294,439, dated Jan. 8, 2019, 8 pages.
Notice of Allowance received for U.S. Appl. No. 15/294,439, dated Sep. 10, 2018, 9 pages.
Notice of Allowance received for U.S. Appl. No. 15/357,873, dated Aug. 23, 2017, 10 pages.
Notice of Allowance received for U.S. Appl. No. 15/357,873, dated Jan. 8, 2018, 9 pages.
Notice of Allowance received for U.S. Appl. No. 15/470,752, dated Feb. 7, 2019, 11 pages.
Notice of Allowance received for U.S. Appl. No. 15/845,794, dated Feb. 14, 2019, 6 pages.
Notice of Allowance received for U.S. Appl. No. 15/866,341, dated Jul. 26, 2019, 8 pages.
Notice of Allowance received for U.S. Appl. No. 15/872,685, dated Mar. 8, 2019, 10 pages.
Notice of Allowance received for U.S. Appl. No. 15/894,221, dated Apr. 11, 2019, 5 pages.
Notice of Allowance received for U.S. Appl. No. 15/894,221, dated Aug. 13, 2019, 2 pages.
Notice of Allowance received for U.S. Appl. No. 15/894,221, dated Feb. 1, 2019, 5 pages.
Notice of Allowance received for U.S. Appl. No. 15/894,221, dated Mar. 4, 2019, 2 pages.
Notice of Allowance received for U.S. Appl. No. 15/899,966, dated Mar. 21, 2019, 7 pages.
Notice of Allowance received for U.S. Appl. No. 15/899,996, dated Apr. 24, 2018, 9 pages.
Notice of Allowance received for U.S. Appl. No. 15/900,047, dated Dec. 5, 2018, 10 pages.
Notice of Allowance received for U.S. Appl. No. 15/903,456, dated May 1, 2019, 6 pages.
Notice of Allowance received for U.S. Appl. No. 15/945,610, dated May 20, 2019, 7 pages.
Notice of Allowance received for U.S. Appl. No. 15/992,722, dated Oct. 19, 2020, 5 pages.
Notice of Allowance received for U.S. Appl. No. 16/035,419, dated May 24, 2019, 14 pages.
Notice of Allowance received for U.S. Appl. No. 16/125,267, dated Mar. 3, 2022, 10 pages.
Notice of Allowance received for U.S. Appl. No. 16/131,767, dated Sep. 6, 2019, 7 pages.
Notice of Allowance received for U.S. Appl. No. 16/147,023, dated Apr. 3, 2020, 2 pages.
Notice of Allowance received for U.S. Appl. No. 16/147,023, dated Aug. 13, 2020, 2 pages.
Notice of Allowance received for U.S. Appl. No. 16/147,023, dated Feb. 27, 2020, 2 pages.
Notice of Allowance received for U.S. Appl. No. 16/147,023, dated Jan. 31, 2020, 7 pages.
Notice of Allowance received for U.S. Appl. No. 16/147,023, dated Jul. 2, 2020, 2 pages.
Notice of Allowance received for U.S. Appl. No. 16/147,023, dated Jul. 21, 2020, 2 pages.
Notice of Allowance received for U.S. Appl. No. 16/147,023, dated Jun. 1, 2020, 2 pages.
Notice of Allowance received for U.S. Appl. No. 16/147,023, dated Jun. 18, 2020, 2 pages.
Notice of Allowance received for U.S. Appl. No. 16/147,023, dated Mar. 27, 2020, 2 pages.
Notice of Allowance received for U.S. Appl. No. 16/147,023, dated May 5, 2020, 2 pages.
Notice of Allowance received for U.S. Appl. No. 16/147,023, dated May 20, 2020, 7 pages.
Notice of Allowance received for U.S. Appl. No. 16/147,115, dated Oct. 30, 2019, 10 pages.
Notice of Allowance received for U.S. Appl. No. 16/164,561, dated Apr. 8, 2020, 5 pages.
Notice of Allowance received for U.S. Appl. No. 16/369,355, dated Sep. 1, 2021, 10 pages.
Notice of Allowance received for U.S. Appl. No. 16/369,473, dated Jun. 8, 2022, 7 pages.
Notice of Allowance received for U.S. Appl. No. 16/386,707, dated Dec. 31, 2020, 18 pages.
Notice of Allowance received for U.S. Appl. No. 16/434,865, dated Apr. 7, 2020, 5 pages.
Notice of Allowance received for U.S. Appl. No. 16/456,839, dated Apr. 15, 2021, 8 pages.
Notice of Allowance received for U.S. Appl. No. 16/456,839, dated Dec. 11, 2020, 10 pages.
Notice of Allowance received for U.S. Appl. No. 16/542,084, dated May 20, 2020, 7 pages.
Notice of Allowance received for U.S. Appl. No. 16/553,622, dated Sep. 11, 2020, 8 pages.
Notice of Allowance received for U.S. Appl. No. 16/667,271, dated May 12, 2020, 11 pages.
Notice of Allowance received for U.S. Appl. No. 16/670,949, dated May 27, 2021, 7 pages.
Notice of Allowance received for U.S. Appl. No. 16/670,949, dated Sep. 14, 2021, 7 pages.
Notice of Allowance received for U.S. Appl. No. 16/843,638, dated Feb. 4, 2022, 7 pages.
Notice of Allowance received for U.S. Appl. No. 16/843,638, dated Oct. 29, 2021, 28 pages.
Notice of Allowance received for U.S. Appl. No. 16/987,003, dated Aug. 18, 2021, 9 pages.
Notice of Allowance received for U.S. Appl. No. 16/990,974, dated Apr. 28, 2021, 5 pages.
Notice of Allowance received for U.S. Appl. No. 16/990,974, dated Jan. 22, 2021, 7 pages.
Notice of Allowance received for U.S. Appl. No. 17/015,429, dated Apr. 4, 2022, 2 pages.
Notice of Allowance received for U.S. Appl. No. 17/015,429, dated Apr. 15, 2022, 2 pages.
Notice of Allowance received for U.S. Appl. No. 17/015,429, dated Dec. 13, 2021, 2 pages.
Notice of Allowance received for U.S. Appl. No. 17/015,429, dated Dec. 24, 2021, 2 pages.
Notice of Allowance received for U.S. Appl. No. 17/015,429, dated Feb. 16, 2022, 5 pages.
Notice of Allowance received for U.S. Appl. No. 17/015,429, dated Jun. 1, 2022, 5 pages.
Notice of Allowance received for U.S. Appl. No. 17/015,429, dated Jun. 17, 2021, 10 pages.
Notice of Allowance received for U.S. Appl. No. 17/015,429, dated Mar. 4, 2022, 2 pages.
Notice of Allowance received for U.S. Appl. No. 17/015,429, dated May 10, 2022, 2 pages.
Notice of Allowance received for U.S. Appl. No. 17/015,429, dated Nov. 24, 2021, 2 pages.
Notice of Allowance received for U.S. Appl. No. 17/015,429, dated Oct. 8, 2021, 5 pages.
Notice of Allowance received for U.S. Appl. No. 17/015,429, dated Oct. 22, 2021, 2 pages.
Notice of Allowance received for U.S. Appl. No. 17/015,429, dated Sep. 22, 2021, 6 pages.
Notice of Allowance received for U.S. Appl. No. 14/311,214, dated Jan. 21, 2016, 7 pages.
Notice of Allowance received for U.S. Appl. No. 14/142,661, dated Dec. 3, 2015, 2 pages.
Notice of Allowance received for U.S. Appl. No. 14/479,088, dated Dec. 23, 2015, 5 pages.

(56) References Cited

OTHER PUBLICATIONS

Notice of Allowance received for U.S. Appl. No. 14/479,088, dated Jan. 11, 2016, 2 pages.
Notice of Allowance received for U.S. Appl. No. 14/873,023, dated Dec. 23, 2015, 10 pages.
Notice of Allowance received for U.S. Appl. No. 14/873,023, dated Jan. 14, 2016, 2 pages.
Notice of Preliminary Rejection received for Korean Patent Application No. 10-2014-7025441, dated Jun. 12, 2015, 9 pages.
Notice of Preliminary Rejection received for Korean Patent Application No. 10-2015-7004548, dated Jun. 12, 2015, 8 pages.
Notice of Preliminary Rejection received from Korean Patent Application No. 10-2015-7010262, dated Jun. 12, 2015, 5 pages.
Office Action received for European Patent Application No. 15168475.0, dated Oct. 5, 2018, 4 pages.
Office Action received for European Patent Application No. 15728352.4, dated Jan. 25, 2018, 10 pages.
Office Action received for Japanese Patent Application No. 2016-224507, dated Dec. 1, 2017, 14 pages.
Office Action received for Australian Patent Application No. 2008305338, dated Mar. 21, 2011, 3 pages.
Office Action received for Australian Patent Application No. 2008305338, dated Oct. 19, 2010, 3 pages.
Office Action received for Australian Patent Application No. 2012200716, dated Jul. 16, 2014, 4 pages.
Office Action received for Australian Patent Application No. 2012200716, dated Nov. 15, 2013, 3 pages.
Office Action received for Australian Patent Application No. 2014204462, dated May 8, 2015, 4 pages.
Office Action received for Australian Patent Application No. 2014204462, dated Apr. 29, 2016, 3 pages.
Office Action received for Australian Patent Application No. 2014334869, dated Jan. 11, 2017, 4 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016201310, dated Feb. 28, 2017, 3 Pages.
Office Action received for Australian Patent Application No. 2016203896, dated Jan. 19, 2018, 4 pages.
Office Action received for Australian Patent Application No. 2016203896, dated Mar. 6, 2017, 3 pages.
Office Action received for Australian Patent Application No. 2016203898, dated Dec. 19, 2017, 4 pages.
Office Action received for Australian Patent Application No. 2016203898, dated Feb. 17, 2017, 3 pages.
Office Action received for Australian Patent Application No. 2017100070, dated Mar. 16, 2017, 6 pages.
Office Action received for Australian Patent Application No. 2017100553, dated Aug. 4, 2017, 5 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2017266867, dated Dec. 6, 2018, 3 pages.
Office Action received for Australian Patent Application No. 2017330208, dated Jul. 25, 2019, 5 pages.
Office Action received for Australian Patent Application No. 2018202559, dated Apr. 8, 2019, 4 pages.
Office Action Received for Australian Patent Application No. 2018202559, dated Jan. 16, 2019, 6 pages.
Office Action received for Australian Patent Application No. 2018202559, dated Jul. 19, 2019, 5 pages.
Office Action received for Australian Patent Application No. 2018202712, dated Mar. 22, 2019, 5 pages.
Office Action received for Australian Patent Application No. 2018202712, dated Nov. 15, 2019, 5 pages.
Office Action received for Australian Patent Application No. 2018202712, dated Nov. 20, 2018, 12 pages.
Office Action received for Australian Patent Application No. 2018202712, dated Sep. 2, 2019, 4 pages.
Office Action received for Australian Patent Application No. 2018203732, dated Feb. 26, 2019, 5 pages.
Office Action received for Australian Patent Application No. 2018203732, dated Jun. 6, 2019, 4 pages.
Office Action received for Australian Patent Application No. 2018203732, dated Jun. 21, 2018, 3 pages.
Office Action Received for Australian Patent Application No. 2018203732, dated Nov. 30, 2018, 3 pages.
Office Action received for Australian Patent Application No. 2018270420, dated Apr. 19, 2021, 4 pages.
Office Action received for Australian Patent Application No. 2018270420, dated Jan. 7, 2021, 5 pages.
Office Action received for Australian Patent Application No. 2018270420, dated Jul. 21, 2020, 5 pages.
Office Action received for Australian Patent Application No. 2018279788, dated Feb. 8, 2019, 4 pages.
Office Action received for Australian Patent Application No. 2018312629, dated Feb. 25, 2019, 4 pages.
Office Action received for Australian Patent Application No. 2019201101, dated Feb. 28, 2019, 3 pages.
Office Action received for Australian Patent Application No. 2019203473, dated Oct. 25, 2019, 2 pages.
Office Action received for Australian Patent Application No. 2019204387, dated Jun. 17, 2020, 7 pages.
Office Action received for Australian Patent Application No. 2019268070, dated Jan. 27, 2022, 3 pages.
Office Action received for Australian Patent Application No. 2019268070, dated Jan. 29, 2021, 6 pages.
Office Action received for Australian Patent Application No. 2019268070, dated Sep. 21, 2021, 4 pages.
Office Action received for Australian Patent Application No. 2019281965, dated May 11, 2022, 5 pages.
Office Action received for Australian Patent Application No. 2019281965, dated Nov. 30, 2021, 3 pages.
Office Action received for Australian Patent Application No. 2020200685, dated Apr. 20, 2020, 3 pages.
Office Action received for Australian Patent Application No. 2020200685, dated Aug. 12, 2020, 3 pages.
Office Action received for Australian Patent Application No. 2020200685, dated Feb. 10, 2020, 4 pages.
Office Action received for Australian Patent Application No. 2020201721, dated Feb. 26, 2021, 7 pages.
Office Action received for Australian Patent Application No. 2020203899, dated May 5, 2021, 10 pages.
Office Action received for Australian Patent Application No. 2020203899, dated May 5, 2022, 4 pages.
Office Action received for Australian Patent Application No. 2020203899, dated Nov. 26, 2021, 4 pages.
Office Action received for Australian Patent Application No. 2020204256, dated Jun. 21, 2021, 2 pages.
Office Action received for Australian Patent Application No. 2020239783, dated Oct. 13, 2020, 4 pages.

(56) References Cited

OTHER PUBLICATIONS

Office Action received for Australian Patent Application No. 2020289822, dated Aug. 24, 2021, 7 pages.
Office Action received for Australian Patent Application No. 2021200415, dated Jan. 18, 2022, 3 pages.
Office Action received for Australian Patent Application No. 2021202352, dated Mar. 15, 2022, 3 pages.
Office Action received for Canadian Patent Application No. 2,527,829, dated Apr. 16, 2014, 3 pages.
Office Action received for Canadian Patent Application No. 2,527,829, dated Apr. 29, 2013, 3 pages.
Office Action received for Canadian Patent Application No. 2,527,829, dated Apr. 29, 2015, 6 pages.
Office Action received for Canadian Patent Application No. 2,527,829, dated Jun. 1, 2011, 3 pages.
Office Action received for Canadian Patent Application No. 2,527,829, dated May 7, 2012, 4 pages.
Office Action received for Chinese Patent Application No. 200880108306.1, dated Aug. 24, 2011, 10 pages.
Office Action received for Chinese Patent Application No. 200880108306.1, dated Mar. 20, 2012, 8 pages.
Office Action received for Chinese Patent Application No. 200880108306.1, dated Mar. 27, 2014, 6 pages.
Office Action received for Chinese Patent Application No. 201410407626.4, dated May 21, 2018, 13 pages.
Office Action received for Chinese Patent Application No. 201410407626.4, dated Oct. 31, 2016, 10 pages.
Office Action received for Chinese Patent Application No. 201410407626.4, dated Sep. 11, 2017, 11 pages.
Office Action received for Chinese Patent Application No. 201480058054.1, dated Jan. 22, 2019, 6 pages.
Office Action received for Chinese Patent Application No. 201480058054.1, dated May 3, 2018, 18 pages.
Office Action received for Chinese Patent Application No. 201510284715.9, dated Apr. 14, 2020, 19 pages.
Office Action received for Chinese Patent Application No. 201510284715.9, dated Dec. 18, 2019, 24 pages.
Office Action received for Chinese Patent Application No. 201510284715.9, dated Dec. 21, 2018, 22 pages.
Office Action received for Chinese Patent Application No. 201510284715.9, dated Jun. 19, 2019, 26 pages.
Office Action received for Chinese Patent Application No. 201510284896.5, dated Jun. 28, 2018, 15 pages.
Office Action received for Chinese Patent Application No. 201510284896.5, dated Mar. 6, 2019, 13 pages.
Office Action received for Chinese Patent Application No. 201510284896.5, dated Mar. 14, 2022, 10 pages.
Office Action received for Chinese Patent Application No. 201510284896.5, dated Sep. 3, 2019, 9 pages.
Office Action received for Chinese Patent Application No. 201520358683.8, dated Sep. 2, 2015, 4 pages.
Office Action received for Chinese Patent Application No. 201610459968.X, dated Aug. 23, 2018, 14 pages.
Office Action received for Chinese Patent Application No. 201610459968.X, dated Aug. 23, 2019, 12 pages.
Office Action received for Chinese Patent Application No. 201610459968.X, dated Feb. 18, 2020, 8 pages.
Office Action received for Chinese Patent Application No. 201610459968.X, dated Feb. 22, 2019, 11 pages.
Office Action received for Chinese Patent Application No. 201620480708.6, dated Jan. 9, 2017, 3 pages.
Office Action received for Chinese Patent Application No. 201620480708.6, dated Sep. 14, 2016, 3 pages.
Office Action received for Chinese Patent Application No. 201620480846.4, dated Jan. 9, 2017, 3 pages.
Office Action received for Chinese Patent Application No. 201620480846.4, dated Sep. 14, 2016, 3 pages.
Office Action received for Chinese Patent Application No. 201710093861.2, dated Mar. 5, 2019, 6 pages.
Office Action received for Chinese Patent Application No. 201710093861.2, dated Sep. 14, 2018, 15 pages.
Office Action received for Chinese Patent Application No. 201710094150.7, dated Dec. 19, 2018, 12 Pages.
Office Action received for Chinese Patent Application No. 201710094150.7, dated Jan. 10, 2022, 6 pages.
Office Action received for Chinese Patent Application No. 201710094150.7, dated Jul. 31, 2019, 6 pages.
Office Action received for Chinese Patent Application No. 201710198190.6, dated Jan. 24, 2022, 16 pages.
Office Action received for Chinese Patent Application No. 201710198190.6, dated May 8, 2021, 22 pages.
Office Action received for Chinese Patent Application No. 201710198190.6, dated Oct. 12, 2020, 18 pages.
Office Action received for Chinese Patent Application No. 201710198190.6, dated Sep. 25, 2019, 27 pages.
Office Action received for Chinese Patent Application No. 201711292804.3, dated Aug. 5, 2020, 26 pages.
Office Action received for Chinese Patent Application No. 201711292804.3, dated Feb. 23, 2021, 17 pages.
Office Action received for Chinese Patent Application No. 201711292804.3, dated Sep. 10, 2021, 19 pages.
Office Action received for Chinese Patent Application No. 201780002398.4, dated Feb. 27, 2019, 6 pages.
Office Action received for Chinese Patent Application No. 201780002398.4, dated Sep. 12, 2018, 17 pages.
Office Action received for Chinese Patent Application No. 201780053143.0, dated Dec. 16, 2021, 19 pages.
Office Action received for Chinese Patent Application No. 201780053143.0, dated Dec. 24, 2020, 21 pages.
Office Action received for Chinese Patent Application No. 201780053143.0, dated Mar. 30, 2022, 12 pages.
Office Action received for Chinese Patent Application No. 201780053143.0, dated May 22, 2020, 21 pages.
Office Action received for Chinese Patent Application No. 201780053143.0, dated Sep. 3, 2021, 24 pages.
Office Action received for Chinese Patent Application No. 201810094316.X, dated Apr. 28, 2019, 9 pages.
Office Action received for Chinese Patent Application No. 201810094316.X, dated Aug. 5, 2019, 9 pages.
Office Action received for Chinese Patent Application No. 201810094316.X, dated Oct. 29, 2018, 12 pages.
Office Action received for Chinese Patent Application No. 201810338038.8, dated Jan. 21, 2020, 26 pages.
Office Action received for Chinese Patent Application No. 201810338038.8, dated May 14, 2019, 26 pages.
Office Action received for Chinese Patent Application No. 201810338040.5, dated Jun. 3, 2021, 25 pages.
Office Action received for Chinese Patent Application No. 201810338040.5, dated Oct. 25, 2021, 22 pages.
Office Action received for Chinese Patent Application No. 201810338826.7, dated Apr. 3, 2019, 21 pages.
Office Action received for Chinese Patent Application No. 201810338826.7, dated Jan. 16, 2020, 16 Pages.
Office Action received for Chinese Patent Application No. 201810338826.7, dated Oct. 21, 2019, 19 pages.
Office Action received for Chinese Patent Application No. 201810339290.0, dated Jun. 4, 2021, 20 pages.
Office Action received for Chinese Patent Application No. 201810339290.0, dated Oct. 18, 2021, 20 pages.
Office Action received for Chinese Patent Application No. 201810954931.3, dated Jan. 15, 2021, 11 pages.
Office Action received for Chinese Patent Application No. 201810955077.2, dated Feb. 20, 2021, 19 pages.
Office Action received for Chinese Patent Application No. 201811460172.1, dated Jan. 21, 2020, 17 pages.
Office Action received for Chinese Patent Application No. 201811460172.1, dated Oct. 14, 2020, 7 pages.
Office Action received for Chinese Patent Application No. 201880000798.6, dated Aug. 5, 2020, 18 pages.
Office Action received for Chinese Patent Application No. 201880000798.6, dated Dec. 30, 2021, 10 pages.

(56) References Cited

OTHER PUBLICATIONS

Office Action received for Chinese Patent Application No. 201880000798.6, dated Jul. 2, 2021, 15 pages.
Office Action received for Chinese Patent Application No. 201910070375.8, dated Dec. 4, 2019, 23 pages.
Office Action received for Chinese Patent Application No. 201910070375.8, dated Sep. 3, 2020, 8 pages.
Office Action received for Chinese Patent Application No. 201910109868.8, dated Jun. 30, 2020, 15 pages.
Office Action received for Chinese Patent Application No. 201910109868.8, dated Mar. 16, 2020, 19 pages.
Office Action received for Chinese Patent Application No. 201910109868.8, dated Sep. 19, 2019, 23 pages.
Office Action received for Chinese Patent Application No. 201910246400.3, dated Apr. 19, 2022, 24 pages.
Office Action received for Chinese Patent Application No. 201910246439.5, dated Apr. 23, 2020, 14 pages.
Office Action received for Chinese Patent Application No. 201910246439.5, dated Oct. 15, 2019, 17 pages.
Office Action received for Chinese Patent Application No. 201910246439.5, dated Sep. 2, 2020, 15 pages.
Office Action received for Chinese Patent Application No. 201910278273.5, dated Jan. 3, 2020, 17 pages.
Office Action received for Chinese Patent Application No. 201910278273.5, dated Jun. 9, 2020, 8 pages.
Office Action received for Chinese Patent Application No. 201910744886.3, dated Jan. 18, 2021, 10 pages.
Office Action received for Chinese Patent Application No. 201910899698.8, dated Mar. 23, 2020, 15 pages.
Office Action received for Chinese Patent Application No. 201910899698.8, dated May 27, 2020, 10 pages.
Office Action received for Chinese Patent Application No. 201911199010.1, dated Mar. 29, 2021, 14 pages.
Office Action received for Chinese Patent Application No. 201911199010.1, dated Nov. 4, 2020, 20 pages.
Office Action received for Chinese Patent Application No. 201911199010.1, dated Sep. 3, 2021, 12 pages.
Office Action received for Chinese Patent Application No. 201980041865.3, dated Apr. 13, 2022, 12 pages.
Office Action received for Chinese Patent Application No. 201980041865.3, dated May 24, 2021, 14 pages.
Office Action received for Chinese Patent Application No. 201410407626.4, dated Feb. 12, 2019, 13 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770418, dated May 8, 2018, 3 pages.
Office Action received for Danish Patent Application No. PA201770419, dated Jan. 10, 2018, 4 pages.
Office Action received for Danish Patent Application No. PA201770712, dated Jul. 20, 2018, 4 pages.
Office Action received for Danish Patent Application No. PA201770712, dated Mar. 1, 2019, 3 pages.
Office Action received for Danish Patent Application No. PA201770713, dated Apr. 18, 2018, 4 pages.
Office Action received for Danish Patent Application No. PA201770713, dated Jun. 7, 2019, 4 pages.
Office Action received for Danish Patent Application No. PA201770713, dated Nov. 13, 2018, 3 pages.
Office Action received for Danish Patent Application No. PA201770714, dated Aug. 17, 2018, 6 pages.
Office Action received for Danish Patent Application No. PA201770714, dated Feb. 21, 2018, 3 pages.
Office Action received for Danish Patent Application No. PA201770714, dated Oct. 13, 2017, 9 pages.
Office Action received for Danish Patent Application No. PA201770715, dated Mar. 8, 2018, 4 pages.
Office Action received for Danish Patent Application No. PA201770715, dated Oct. 29, 2018, 4 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for Danish Patent Application No. PA201870370, dated Nov. 9, 2018, 4 pages.
Office Action received for Danish Patent Application No. PA201870371, dated Nov. 20, 2018, 3 pages.
Office Action received for Danish Patent Application No. PA201870855, dated May 14, 2020, 4 pages.
Office Action received for Danish Patent Application No. PA201870855, dated Nov. 7, 2019, 4 pages.
Office Action received for Danish Patent Application No. PA201970127, dated Dec. 20, 2019, 3 pages.
Office Action received for Danish Patent Application No. PA201970127, dated Feb. 24, 2020, 2 pages.
Office Action received for European Patent Application No. 04753978.8, dated Jan. 31, 2013, 6 pages.
Office Action received for European Patent Application No. 04753978.8, dated Mar. 27, 2012, 7 pages.
Office Action received for European Patent Application No. 08834386.8, dated Aug. 23, 2010, 4 pages.
Office Action received for European Patent Application No. 12181538.5, dated Dec. 16, 2013, 4 pages.
Office Action received for European Patent Application No. 12770400.5, dated Mar. 10, 2015, 5 pages.
Office Action received for European Patent Application No. 12773460.6, dated Feb. 19, 2018, 6 pages.
Office Action Received for European Patent Application No. 13171145.9, dated Apr. 28, 2016, 5 pages.
Office Action Received for European Patent Application No. 13171145.9, dated May 3, 2018, 4 pages.
Office Action received for European Patent Application No. 15168475.0, dated Dec. 19, 2016, 5 pages.
Office Action received for European Patent Application No. 15168475.0, dated May 6, 2020, 5 pages.
Office Action received for European Patent Application No. 15727291.5, dated Jan. 15, 2018, 8 pages.
Office Action received for European Patent Application No. 16201159.7, dated Jun. 12, 2019, 10 pages.
Office Action Received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 17799904.2, dated Oct. 21, 2020, 6 pages.
Office Action received for European Patent Application No. 17853654.6, dated Mar. 23, 2020, 4 pages.
Office Action received for European Patent Application No. 18208881.5, dated Jun. 11, 2019, 5 pages.
Office Action received for European Patent Application No. 18208881.5, dated May 7, 2021, 6 pages.
Office Action received for European Patent Application No. 18704335.1, dated Sep. 23, 2019, 7 pages.
Office Action received for European Patent Application No. 18713408.5, dated May 20, 2019, 5 pages.
Office Action received for European Patent Application No. 18713408.5, dated May 26, 2020, 5 pages.
Office Action received for European Patent Application No. 18713408.5, dated Nov. 4, 2020, 6 pages.
Office Action received for European Patent Application No. 18713408.5, dated Nov. 20, 2019, 4 pages.
Office Action received for European Patent Application No. 18830326.7, dated Apr. 30, 2020, 5 pages.
Office Action received for European Patent Application No. 18830326.7, dated Aug. 13, 2020, 6 pages.
Office Action received for European Patent Application No. 18830326.7, dated Aug. 27, 2019, 6 pages.
Office Action received for European Patent Application No. 18830326.7, dated Nov. 22, 2019, 8 pages.

(56) References Cited

OTHER PUBLICATIONS

Office Action received for European Patent Application No. 18830326.7, dated Sep. 16, 2019, 6 pages.
Office Action received for European Patent Application No. 19150528.8, dated Jul. 1, 2020, 6 pages.
Office Action received for European Patent Application No. 19160344.8, dated Mar. 26, 2021, 7 pages.
Office Action received for European Patent Application No. 19160344.8, dated Oct. 7, 2021, 8 pages.
Office Action received for European Patent Application No. 19160348.9, dated May 14, 2020, 4 pages.
Office Action received for European Patent Application No. 19160348.9, dated Nov. 17, 2020, 6 pages.
Office Action received for European Patent Application No. 19186538.5, dated Oct. 12, 2020, 7 pages.
Office Action received for European Patent Application No. 19186538.5, dated Oct. 22, 2021, 7 pages.
Office Action received for European Patent Application No. 19194828.0, dated May 10, 2021, 6 pages.
Office Action received for European Patent Application No. 19194828.0, dated Oct. 15, 2020, 7 pages.
Office Action received for European Patent Application No. 19731554.2, dated Apr. 19, 2022, 8 pages.
Office Action received for European Patent Application No. 19769336.9, dated Nov. 4, 2021, 6 pages.
Office Action received for European Patent Application No. 20186286.9, dated Jan. 25, 2022, 8 pages.
Office Action received for European Patent Application No. 20186286.9, dated Jul. 29, 2021, 8 pages.
Office Action received for European Patent Application No. 20191533.7, dated May 12, 2022, 5 pages.
Office Action received for European Patent Application No. 20198076.0, dated Mar. 25, 2022, 5 pages.
Office Action received for European Patent Application No. 20198076.0, dated Sep. 22, 2021, 6 pages.
Office Action received for German Patent Application No. 202015004267.8, dated Nov. 4, 2015, 4 pages.
Office Action received for Indian Patent Application No. 201617006865, dated Dec. 11, 2019, 7 pages.
Office Action received for Indian Patent Application No. 201617039493, dated Oct. 21, 2019, 6 pages.
Office Action received for Indian Patent Application No. 201618024020, dated Sep. 14, 2020, 7 pages.
Office Action received for Indian Patent Application No. 201817036875, dated Oct. 29, 2021, 8 pages.
Office Action received for Indian Patent Application No. 201917024374, dated Dec. 30, 2021, 10 pages.
Office Action received for Indian Patent Application No. 201918003782, dated Nov. 18, 2021, 8 pages.
Office Action received for Indian Patent Application No. 201918027146, dated Jan. 4, 2022, 7 pages.
Office Action received for Indian Patent Application No. 202018009834, dated Nov. 12, 2021, 6 pages.
Office Action received for Indian Patent Application No. 202018009906, dated Apr. 29, 2022, 9 pages.
Office Action received for Indian Patent Application No. 202018014786, dated Nov. 9, 2021, 7 pages.
Office Action received for Indian Patent Application No. 202018038351, dated Feb. 25, 2022, 6 pages.
Office Action received for Indian Patent Application No. 202018041558, dated Dec. 3, 2021, 7 pages.
Office Action received for Indian Patent Application No. 202018044420, dated Jan. 31, 2022, 6 pages.
Office Action received for Indian Patent Application No. 202118009403, dated Feb. 21, 2022, 6 pages.
Office Action received for Indian Patent Application No. 202118018461, dated Feb. 23, 2022, 6 pages.
Office Action received for Japanese Patent Application No. 2006-533547, dated Aug. 14, 2008, 1 page.
Office Action received for Japanese Patent Application No. 2006-533547, dated Mar. 22, 2011, 2 pages.
Office Action received for Japanese Patent Application No. 2006-533547, dated Mar. 5, 2012, 13 pages.
Office Action received for Japanese Patent Application No. 2010-525891, dated Jun. 12, 2012, 11 pages.
Office Action received for Japanese Patent Application No. 2013-098406, dated Dec. 9, 2013, 12 pages.
Office Action received for Japanese Patent Application No. 2013-098406, dated Dec. 15, 2014, 12 pages.
Office Action received for Japanese Patent Application No. 2013-098406, dated Jul. 19, 2016, 10 pages.
Office Action received for Japanese Patent Application No. 2013-145795, dated Apr. 14, 2017, 18 pages.
Office Action received for Japanese Patent Application No. 2013-145795, dated Jun. 13, 2014, 6 pages.
Office Action received for Japanese Patent Application No. 2014-242264, dated Feb. 24, 2017, 14 pages.
Office Action received for Japanese Patent Application No. 2014-242264, dated Jul. 17, 2015, 6 pages.
Office Action received for Japanese Patent Application No. 2014-242264, dated May 9, 2016, 10 pages.
Office Action received for Japanese Patent Application No. 2015-083696, dated Jun. 17, 2016, 12 pages.
Office Action received for Japanese Patent Application No. 2016-131998, dated Aug. 10, 2018, 9 pages.
Office Action received for Japanese Patent Application No. 2016-131998, dated Sep. 25, 2017, 10 pages.
Office Action received for Japanese Patent Application No. 2016-224506, dated May 14, 2019, 22 pages.
Office Action received for Japanese Patent Application No. 2016-224507, dated Jun. 16, 2017, 16 pages.
Office Action received for Japanese Patent Application No. 2016-540927, dated Jun. 20, 2017, 12 pages.
Office Action received for Japanese Patent Application No. 2016-558332, dated Dec. 8, 2017, 12 pages.
Office Action received for Japanese Patent Application No. 2016-558332, dated Jul. 27, 2018, 9 pages.
Office Action received for Japanese Patent Application No. 2016-569665, dated Aug. 20, 2018, 9 pages.
Office Action received for Japanese Patent Application No. 2016-569665, dated Jan. 19, 2018, 10 pages.
Office Action received for Japanese Patent Application No. 2017-075031, dated Jul. 30, 2018, 16 pages.
Office Action received for Japanese Patent Application No. 2017-085582, dated Jul. 2, 2018, 11 pages.
Office Action received for Japanese Patent Application No. 2018-113081, dated Apr. 9, 2019, 6 pages.
Office Action received for Japanese Patent Application No. 2018-113081, dated Jan. 10, 2020, 8 pages.
Office Action received for Japanese Patent Application No. 2018-113081, dated Oct. 2, 2020, 7 pages.
Office Action received for Japanese Patent Application No. 2018-551159, dated Jan. 27, 2020, 8 pages.
Office Action received for Japanese Patent Application No. 2018-551159, dated Sep. 30, 2019, 6 pages.
Office Action received for Japanese Patent Application No. 2018-560107, dated Jun. 14, 2019, 26 pages.
Office Action received for Japanese Patent Application No. 2019-053379, dated May 29, 2020, 11 pages.
Office Action received for Japanese Patent Application No. 2019-053379, dated Oct. 18, 2019, 11 pages.
Office Action received for Japanese Patent Application No. 2019-107235, dated Oct. 18, 2019, 8 pages.
Office Action received for Japanese Patent Application No. 2019-194603, dated Jan. 4, 2021, 8 pages.
Office Action received for Japanese Patent Application No. 2019-238894, dated Mar. 6, 2020, 7 pages.
Office Action received for Japanese Patent Application No. 2019-510416, dated May 15, 2020, 4 pages.
Office Action received for Japanese Patent Application No. 2019-510416, dated Oct. 18, 2019, 4 pages.

(56) References Cited

OTHER PUBLICATIONS

Office Action received for Japanese Patent Application No. 2019-511975, dated Apr. 10, 2020, 6 pages.
Office Action received for Japanese Patent Application No. 2019-563560, dated Jun. 14, 2021, 6 pages.
Office Action received for Japanese Patent Application No. 2019-563560, dated Nov. 30, 2020, 7 pages.
Office Action received for Japanese Patent Application No. 2020-028315, dated Feb. 7, 2022, 6 pages.
Office Action received for Japanese Patent Application No. 2020-028315, dated Jul. 6, 2020, 18 pages.
Office Action received for Japanese Patent Application No. 2020-028315, dated Nov. 9, 2020, 11 pages.
Office Action received for Japanese Patent Application No. 2020-126751, dated Jan. 5, 2021, 8 pages.
Office Action received for Japanese Patent Application No. 2020-159979, dated May 10, 2021, 9 pages.
Office Action received for Japanese Patent Application No. 2020-184605, dated Feb. 14, 2022, 24 pages.
Office Action received for Japanese Patent Application No. 2020-566978, dated Feb. 4, 2022, 12 pages.
Office Action received for Japanese Patent Application No. 2021-001028, dated Jan. 31, 2022, 10 pages.
Office Action received for Japanese Patent Application No. 2021-015128, dated Jun. 14, 2021, 4 pages.
Office Action received for Korean Patent Application No. 10-2010-7008899, dated Aug. 17, 2014, 7 pages.
Office Action received for Korean Patent Application No. 10-2010-7008899, dated Feb. 3, 2015, 7 pages.
Office Action received for Korean Patent Application No. 10-2010-7008899, dated Jan. 28, 2013, 5 pages.
Office Action received for Korean Patent Application No. 10-2010-7008899, dated Jun. 12, 2015, 4 pages.
Office Action received for Korean Patent Application No. 10-2010-7008899, dated Mar. 29, 2012, 6 pages.
Office Action received for Korean Patent Application No. 10-2010-7008899, dated May 30, 2011, 4 pages.
Office Action received for Korean Patent Application No. 10-2011-7023152, dated Apr. 22, 2014, 6 pages.
Office Action received for Korean Patent Application No. 10-2014-7004771, dated Jun. 12, 2015, 6 pages.
Office Action received for Korean Patent Application No. 10-2014-7004771, dated Apr. 22, 2014, 5 pages.
Office Action received for Korean Patent Application No. 10-2014-7004771, dated Oct. 21, 2014, 7 pages.
Office Action received for Korean Patent Application No. 10-2014-7004772, dated Apr. 22, 2014, 8 pages.
Office Action received for Korean Patent Application No. 10-2014-7004772, dated Oct. 21, 2014, 5 pages.
Office Action received for Korean Patent Application No. 10-2014-7004773, dated Apr. 22, 2014, 9 pages.
Office Action received for Korean Patent Application No. 10-2014-7004773, dated Jun. 12, 2015, 6 pages.
Office Action received for Korean Patent Application No. 10-2014-7004773, dated Oct. 21, 2014, 9 pages.
Office Action received for Korean Patent Application No. 10-2014-7008348, dated Jan. 22, 2019, 16 pages.
Office Action received for Korean Patent Application No. 10-2014-7025441, dated Oct. 21, 2014, 5 pages.
Office Action received for Korean Patent Application No. 10-2015-7010262, dated Mar. 8, 2017, 6 pages.
Office Action received for Korean Patent Application No. 10-2015-7010262, dated May 24, 2016, 10 pages.
Office Action received for Korean Patent Application No. 10-2016-0152210, dated Jan. 29, 2019, 7 pages.
Office Action received for Korean Patent Application No. 10-2016-0152210, dated May 14, 2018, 13 pages.
Office Action received for Korean Patent Application No. 10-2016-0152210, dated May 30, 2019, 8 pages.
Office Action received for Korean Patent Application No. 10-2016-7009347, dated Feb. 18, 2018, 9 pages.
Office Action received for Korean Patent Application No. 10-2016-7009632, dated Feb. 2, 2018, 11 pages.
Office Action received for Korean Patent Application No. 10-2016-7035555, dated Dec. 26, 2017, 5 pages.
Office Action received for Korean Patent Application No. 10-2016-7035555, dated Jul. 18, 2019, 9 pages.
Office Action received for Korean Patent Application No. 10-2016-7035555, dated Sep. 18, 2018, 9 pages.
Office Action received for Korean Patent Application No. 10-2017-0022365, dated Jun. 26, 2017, 10 pages.
Office Action received for Korean Patent Application No. 10-2017-0022546, dated Jun. 21, 2017, 12 pages.
Office Action received for Korean Patent Application No. 10-2017-0022582, dated Jul. 31, 2019, 5 pages.
Office Action received for Korean Patent Application No. 10-2017-0022582, dated Sep. 19, 2018, 6 pages.
Office Action received for Korean Patent Application No. 10-2017-7012145, dated Jul. 18, 2019, 5 pages.
Office Action received for Korean Patent Application No. 10-2017-7012145, dated Sep. 13, 2018, 6 pages.
Office Action received for Korean Patent Application No. 10-2017-7015582, dated Apr. 5, 2018, 8 pages.
Office Action received for Korean Patent Application No. 10-2017-7015582, dated Jun. 12, 2017, 9 pages.
Office Action received for Korean Patent Application No. 10-2018-7022895, dated Aug. 17, 2018, 8 pages.
Office Action received for Korean Patent Application No. 10-2018-7028845, dated Jun. 19, 2019, 7 pages.
Office Action received for Korean Patent Application No. 10-2018-7033301, dated Dec. 14, 2018, 6 pages.
Office Action received for Korean Patent Application No. 10-2019-7003374, dated Jun. 10, 2019, 7 pages.
Office Action received for Korean Patent Application No. 10-2019-7003836, dated Jun. 14, 2019, 7 pages.
Office Action received for Korean Patent Application No. 10-2019-7004734, dated Jul. 4, 2019, 7 pages.
Office Action received for Korean Patent Application No. 10-2019-7005136, dated Jan. 28, 2020, 5 pages.
Office Action received for Korean Patent Application No. 10-2019-7005925, dated Jul. 4, 2019, 24 pages.
Office Action received for Korean Patent Application No. 10-2019-7014494, dated Jun. 14, 2019, 11 pages.
Office Action received for Korean Patent Application No. 10-2019-7014988, dated Jul. 19, 2019, 9 pages.
Office Action received for Korean Patent Application No. 10-2019-7033799, dated Apr. 27, 2021, 9 pages.
Office Action received for Korean Patent Application No. 10-2019-7033799, dated Nov. 23, 2021, 6 pages.
Office Action received for Korean Patent Application No. 10-2020-0097418, dated Aug. 28, 2020, 6 pages.
Office Action received for Korean Patent Application No. 10-2020-7002929, dated Mar. 22, 2020, 5 pages.
Office Action received for Korean Patent Application No. 10-2020-7011424, dated Jul. 7, 2020, 6 pages.
Office Action received for Korean Patent Application No. 10-2020-7020782, dated Aug. 19, 2020, 8 pages.
Office Action received for Korean Patent Application No. 10-2020-7020782, dated Mar. 29, 2021, 7 pages.
Office Action received for Korean Patent Application No. 10-2020-7022596, dated Jul. 28, 2021, 26 pages.
Office Action received for Korean Patent Application No. 10-2020-7027862, dated Jan. 29, 2021, 8 pages.
Office Action received for Korean Patent Application No. 10-2020-7034180, dated Aug. 17, 2021, 15 pages.
Office Action received for Korean Patent Application No. 10-2020-7034405, dated Dec. 4, 2021, 15 pages.
Office Action received for Korean Patent Application No. 10-2021-7011888, dated Jul. 27, 2021, 11 pages.
Office Action received for Korean Patent Application No. 10-2021-7015473, dated Aug. 25, 2021, 5 pages.

(56) References Cited

OTHER PUBLICATIONS

Office Action received for Korean Patent Application No. 10-2021-7032984, dated Feb. 22, 2022, 8 pages.
Office Action received for Korean Patent Application No. 10-2022-0010942, dated Apr. 27, 2022, 5 pages.
Office Action received for Korean Patent Application No. 10-2022-7004578, dated Mar. 22, 2022, 11 pages.
Office Action received for Korean Patent Application No. 10-2016-7009347, dated Mar. 9, 2017, 15 pages.
Office Action received for Korean Patent Application No. 10-2018-7028845, dated Dec. 10, 2018, 8 pages.
Office Action received for Taiwan Patent Application No. 103136545, dated May 25, 2016, 7 pages.
Office Action received for Taiwan Patent Application No. 103136545, dated Nov. 2, 2015, 39 pages.
Office Action received for Taiwan Patent Application No. 101107082, dated Jul. 7, 2014, 21 pages.
Office Action received for Taiwan Patent Application No. 103131074, dated Jul. 21, 2015, 16 pages.
Office Action received for Taiwanese Patent Application No. 104117508, dated Jul. 14, 2017, 9 pages.
Office Action received for Taiwanese Patent Application No. 104117508, dated Jul. 20, 2016, 19 pages.
Office Action received for Taiwanese Patent Application No. 104117508, dated Mar. 20, 2017, 22 pages.
Office Action received for Taiwanese Patent Application No. 104117508, dated Jan. 25, 2019, 24 pages.
Office Action received for Taiwanese Patent Application No. 104117508, dated May 22, 2019, 7 pages.
Office Action received for Taiwanese Patent Application No. 107138003, dated Mar. 20, 2019, 6 pages.
Office Action received from Japanese Patent Application No. 2013-098406, dated May 8, 2015, 14 pages.
Office Action received from Japanese Patent Application No. 2013-145795, dated May 8, 2015, 12 pages.
Okazolab,"KiNECt Based 3D Head Tracking in Behavioural Research", Available online at: <https://www.youtube.com/watch?v=nigRvT9beQw>, Aug. 8, 2012, 3 pages.
OneFaceIn,"[How It Works] Securing Your Smartphone With OneFaceIn", Biometric Password Manager, Available at <https://www.youtube.com/watch?v=h-JG5SPxBQ0>, Dec. 2, 2016, 1 page.
Page Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/, Sep. 8, 2017, 9 pages.
Phonebuff, "How to Use Face Unlock on Android 4.0 ICS", Retrieved from <https://www.youtube.com/watch?v=0ASf6jkpFKE>, Dec. 15, 2011, 1 page.
Plaisant et al., "Touchscreen Toggle Switches: Push or slide? Design Issues and Usability Study", Technical Report CAR-TR-521, CS-TR-2557, Nov. 1990, pp. 1-10.
PSP Security LTD,"AccuFACE features", Available online at <https://www.youtube.com/watch?v=p3jvGoEbioY>, Oct. 14, 2009, 1 page.
PSP Security LTD,"PSP Security—AccuFACE Step by Step Enrollment Process", Available online at <https://www.youtube.com/watch?v=0IIF5OOdya0>, Oct. 14, 2009, 1 page.
Pu Fang, "Research on Location-aware Service in Pervasive Computing", Issue No. 7, Information Technology Series, China Doctoral Dissertations, Jul. 15, 2008, 140 pages.
Qiye Wang, "Design and Implementation of SAN Device Access Control in Unified Storage Platform", Master's Theses, Huazhong University of Science & Technology, Wuhan, Jun. 2008, 63 pages.
Real Solution of two-step-authentication Password Management for Authentication Enhancement, Fukuda Takao, NiKKei PC, JPN, NiKKei Business Publications, Inc., No. 694, Mar. 24, 2014, 11 pages.
Record of Oral Hearing received for U.S. Appl. No. 13/243,045, mailed on Apr. 1, 2019, 18 pages.
Record of Oral Hearing received for U.S. Appl. No. 13/243,045, mailed on May 7, 2021, 18 pages.
Record of Oral Hearing received for U.S. Appl. No. 15/714,887, mailed on Feb. 15, 2022, 16 pages.
Requirement for Restriction/Election received for U.S. Appl. No. 16/938,362, dated May 4, 2022, 6 pages.
Result of Consultation received for European Patent Application No. 18713408.5, dated Aug. 30, 2021, 5 pages.
Result of Consultation received for European Patent Application No. 18830326.7, dated Jun. 21, 2021, 5 pages.
Result of Consultation received for European Patent Application No. 19160344.8, dated Feb. 4, 2022, 3 pages.
Result of Consultation received for European Patent Application No. 19194828.0, dated May 9, 2022, 4 pages.
Riley et al., "Instruction, Feedback and Biometrics: The User Interface for Fingerprint Authentication System", Interact 2009, Part II, LNCS 5727, IFPI International Federation for Information Processing, 2009, pp. 293-305.
Sawamura Toru, "Emergency Proposal; personal information should be immediately unitarily managed", PC fan, Japan, Mainichi Communications Inc., 11th Edition, vol. 11, No. 240, Jun. 15, 2004, pp. 20-21.
Schofield Tim, "Face Unlock Demonstration on the HTC EVO 4G LTE", Retrieved from <https://www.youtube.com/watch?v=TNL9Or_9SWg>, May 31, 2012, 1 page.
Schürmann et al., "BANDANA—Body Area Network Device-to-Device Authentication Using Natural gAit", Ambient Intelligence, Comnet, Aalto University, DOI: 10.1109/PERCOM.2017.7917865, Dec. 11, 2016, 11 pages.
Search Report and Opinion received for Danish Patent Application No. PA201770418, dated Jun. 23, 2017, 8 pages.
Search Report and Opinion received for Danish Patent Application No. PA201770419, dated Jun. 19, 2017, 6 pages.
Search Report and Opinion received for Danish Patent Application No. PA201770712, dated Oct. 25, 2017, 10 pages.
Search Report and Opinion received for Danish Patent Application No. PA201770713, dated Oct. 31, 2017, 9 pages.
Search Report and Opinion received for Danish Patent Application No. PA201770715, dated Nov. 9, 2017, 10 pages.
Search Report and Opinion received for Danish Patent Application No. PA201870370, dated Sep. 7, 2018, 11 pages.
Search Report and Opinion received for Danish Patent Application No. PA201870371, dated Sep. 14, 2018, 14 pages.
Search Report and Opinion received for Danish Patent Application No. PA201870855, dated Apr. 3, 2019, 12 pages.
Search Report and Opinion received for Danish Patent Application No. PA201970127, dated Oct. 4, 2019, 9 pages.
Sensory Trulysecure,"AppLock Face/Voice Recognition", Available at <https://www.youtube.com/watch?v=odax5O51aT0>, May 27, 2015, 1 page.
Stateoftech, "iPhone 6 Tips—How to Access the Camera from the Lock Screen", Screen captures with generated transcript from YouTube video clip, Online Available at: <https://www.youtube.com/watch?v=frB151RYB7U>, Jul. 2, 2015, 23 pages.
Summons to Attend Oral Proceedings received for European Patent Application No. 04753978.8, mailed on Jul. 3, 2014, 8 pages.
Summons to Attend Oral Proceedings received for European Patent Application No. 08834386.8, mailed on Aug. 24, 2012, 4 pages.
Summons to Attend Oral Proceedings received for European Patent Application No. 12770400.5, mailed on Mar. 19, 2018, 10 pages.
Summons to Attend Oral Proceedings received for European Patent Application No. 15727291.5, mailed on Jan. 28, 2020, 13 pages.
Summons to Attend Oral Proceedings received for European Patent Application No. 15728352.4, mailed on May 12, 2020, 25 pages.
Summons to Attend Oral Proceedings received for European Patent Application No. 15728352.4, mailed on Nov. 18, 2019, 15 pages.
Summons to Attend Oral Proceedings received for European Patent Application No. 16201159.7, mailed on Feb. 4, 2021, 12 pages.
Summons to Attend Oral Proceedings received for European Patent Application No. 16201195.1, mailed on Sep. 4, 2018, 21 pages.
Summons to Attend Oral Proceedings received for European Patent Application No. 16201205.8, mailed on Jan. 28, 2020, 18 pages.
Summons to Attend Oral Proceedings received for European Patent Application No. 17799904.2, mailed on Dec. 20, 2021, 8 pages.

(56) References Cited

OTHER PUBLICATIONS

Summons to Attend Oral Proceedings received for European Patent Application No. 18713408.5, mailed on Apr. 30, 2021, 5 pages.
Summons to Attend Oral Proceedings received for European Patent Application No. 18830326.7, mailed on Feb. 25, 2021, 6 pages.
Summons to Attend Oral Proceedings received for European Patent Application No. 19150528.8, mailed on Mar. 15, 2022, 7 pages.
Summons to Attend Oral Proceedings received for European Patent Application No. 19194828.0, mailed on Feb. 3, 2022, 10 pages.
Summons to Attend Oral Proceedings received for European Patent Application No. 19194828.0, mailed on Feb. 10, 2022, 2 pages.
Supplemental Notice of Allowance received for U.S. Appl. No. 12/207,370, dated Aug. 8, 2013, 2 pages.
Supplemental Notice of Allowance received for U.S. Appl. No. 15/899,996, dated Jul. 25, 2018, 2 pages.
Tanaka et al., "Innovative Mobile Device of Apple Finally Appeared, Mobile Phone + iPod + Internet Terminal, iPhone", Mac Fan, vol. 15, No. 9, Japan, Mainichi Communications Inc., Sep. 1, 2007, 16 pages.
Thanakulmas Thanit, "MasterCard Identity Check Facial Recognition Biometrics", Available at <https://www.youtube.com/watch?v=g4sMbrkt1gl>, Oct. 10, 2016, 1 page.
Third Party Observations received for European Patent Application No. 15168475.0, mailed on Jul. 19, 2016, 4 pages.
Videoreborn, "Motorola Atrix 4g: Wet Fingerprint Scanner Better Than iPhone 5S Fingerprint Scanner!", YouTube, available at <https://www.youtube.com/watch?v=MSJIIG93MPg>, Mar. 16, 2011, 2 pages.
Wang NA, "Research of Face Detection System Based on Mobile Phone Platform", Video Engineering, vol. 36, No. 11, Nov. 2012, 5 pages.
Weiss et al., "Smartphone and Smartwatch-Based Biometrics using Activities of Daily Living", IEEE Access,DOI: 10.1109/ACCESS.2019.2940729, vol. XX, 2017, 13 pages.
Wikipedia,"QR code", Available online at: https://en.wikipedia.org/w/index.php?title=OR_code&oldid=452939488, Sep. 28, 2011, pp. 1-9.
Yongxi et al., "Application of RFID Technology in Mobile Payment", China Academic Journal Electronic Publishing House, 1994-2022, Nov. 25, 2012, pp. 97-99.
Zhang et al., "WristUnlock: Secure and Usable Smartphone Unlocking with Wrist Wearables", IEEE Conference on Communications and Network Security (CNS), 2019, 9 pages.
Applicant-Initiated Interview Summary received for U.S. Appl. No. 17/409,570, dated Dec. 27, 2022, 2 pages.
Decision to Refuse received for European Patent Application No. 18208881.5, dated Dec. 23, 2022, 12 pages.
Final Office Action received for U.S. Appl. No. 17/193,991, dated Dec. 22, 2022, 6 pages.
Final Office Action received for U.S. Appl. No. 17/863,974, dated Dec. 16, 2022, 23 pages.
Minutes of Oral Proceedings received for European Patent Application No. 18208881.5, mailed on Dec. 22, 2022, 4 pages.
Notice of Acceptance received for Australian Patent Application No. 2021254574, dated Dec. 14, 2022, 3 pages.
Notice of Allowance received for Japanese Patent Application No. 2021-131310, dated Dec. 9, 2022, 4 pages (1 pages of English Translation and 3 pages of Official Copy).
Notice of Allowance received for Korean Patent Application No. 10-2022-7012864, dated Dec. 15, 2022, 7 pages (2 pages of English Translation and 5 pages of Official Copy).
Office Action received for Japanese Patent Application No. 2020-184605, dated Dec. 12, 2022, 9 pages (4 pages of English Translation and 5 pages of Official Copy).
Applicant-Initiated Interview Summary received for U.S. Appl. No. 17/087,855, dated Jul. 5, 2022, 2 pages.
Board Decision received for Chinese Patent Application No. 201510284715.9, mailed on Jul. 21, 2022, 22 pages (2 pages of English Translation and 20 pages of Official Copy).
Board Decision received for Chinese Patent Application No. 201710198190.6, mailed on May 23, 2022, 2 pages (1 page of English Translation and 1 page of Official Copy).
Board Decision received for Chinese Patent Application No. 201810338826.7, mailed on May 30, 2022, 20 pages (2 pages of English Translation and 18 pages of Official Copy).
Board Opinion received for Chinese Patent Application No. 201510284715.9, mailed on Jun. 6, 2022, 14 pages (3 pages of English Translation and 11 pages of Official Copy).
Brief Communication Regarding Oral Proceedings received for European Patent Application No. 17799904.2, mailed on Sep. 13, 2022, 1 page.
Brief Communication Regarding Oral Proceedings received for European Patent Application No. 19150528.8, mailed on Sep. 5, 2022, 2 pages.
Corrected Notice of Allowance received for U.S. Appl. No. 17/208,957, dated Jun. 30, 2022, 2 pages.
Decision on Appeal received for Korean Patent Application No. 10-2019-7033799, mailed on Jul. 19, 2022, 23 pages (3 pages of English Translation and 20 pages of Official Copy).
Decision to Grant received for European Patent Application No. 18713408.5, dated Sep. 1, 2022, 3 pages.
Decision to Grant received for European Patent Application No. 19160344.8, dated Sep. 1, 2022, 3 pages.
Decision to Grant received for European Patent Application No. 19769336.9, dated Oct. 7, 2022, 2 pages.
Decision to Refuse received for European Patent Application No. 17799904.2, dated Sep. 19, 2022, 4 pages.
Decision to Refuse received for European Patent Application No. 19150528.8, dated Sep. 9, 2022, 4 pages.
Feng et al., "A Prototype Three-Dimensional Position Sensitive CdZnTe Detector Array", IEEE Transactions on Nuclear Science, vol. 54, No. 4., Aug. 2007, 6 pages.
Hwang et al., "Toward Event-Based Haptics: Rendering Contact Using Open-Loop Force Pulses", 12th International Symposium on Haptic Interfaces for Virtual Environment and Teleoperator Systems, 2004, 8 pages.
Intention to Grant received for European Patent Application No. 19194828.0, dated Jun. 30, 2022, 9 pages.
Intention to Grant received for European Patent Application No. 19769336.9, dated May 31, 2022, 13 pages.
Intention to Grant received for European Patent Application No. 20186286.9, dated Sep. 15, 2022, 9 pages.
International Search Report and Written Opinion received for PCT Patent Application No. PCT/US2022/013730, dated Apr. 8, 2022, 19 pages.
Jianxin et al., "Fingerprint-based Authentication in Networking Environment", Artificial Intelligence Institute of Zhejiang University, Hangzhou Zhejiang 310027, China, Dec. 28, 2001, 4 pages.
Liu et al., "PKI Authentication System Combining with Fingerprint", Computer Engineering, vol. 39, No. 09, May 2005, 3 pages (Official Copy only). {See Communication under 37 CFR § 1.98(a) (3)}.
Minutes of the Oral Proceedings received for European Patent Application No. 19194828.0, mailed on Jun. 28, 2022, 6 pages.
Non-Final Office Action received for U.S. Appl. No. 16/938,362, dated Sep. 14, 2022, 14 pages.
Non-Final Office Action received for U.S. Appl. No. 17/087,855, dated Jul. 21, 2022, 23 pages.
Non-Final Office Action received for U.S. Appl. No. 17/193,991, dated Oct. 6, 2022, 7 pages.
Non-Final Office Action received for U.S. Appl. No. 17/409,570, dated Sep. 21, 2022, 35 pages.
Non-Final Office Action received for U.S. Appl. No. 17/516,495, dated Jul. 6, 2022, 10 pages.
Notice of Acceptance received for Australian Patent Application No. 2021202352, dated Jun. 6, 2022, 3 pages.
Notice of Allowance received for Chinese Patent Application No. 201510284896.5, dated Jun. 6, 2022, 2 pages (1 page of English Translation and 1 page of Official Copy).
Notice of Allowance received for Chinese Patent Application No. 201710198190.6, dated Sep. 23, 2022, 7 pages (3 pages of English Translation and 4 pages of Official Copy).

(56) References Cited

OTHER PUBLICATIONS

Notice of Allowance received for Chinese Patent Application No. 201980041865.3, dated Aug. 16, 2022, 6 pages (3 pages of English Translation and 3 pages of Official Copy).
Notice of Allowance received for Japanese Patent Application No. 2020-028315, dated May 27, 2022, 3 pages (1 page of English Translation and 2 pages of Official Copy).
Notice of Allowance received for Japanese Patent Application No. 2021-001028, dated Sep. 9, 2022, 4 pages (1 page of English Translation and 3 pages of Official Copy).
Notice of Allowance received for Japanese Patent Application No. 2021-035572, dated Jun. 3, 2022, 4 pages (1 page of English Translation and 3 pages of Official Copy).
Notice of Allowance received for Korean Patent Application No. 10-2021-7032984, dated Jun. 29, 2022, 5 pages (2 pages of English Translation and 3 pages of Official Copy).
Notice of Allowance received for Korean Patent Application No. 10-2022-0010942, dated Aug. 10, 2022, 6 pages (2 pages of English Translation and 4 pages of Official Copy).
Notice of Allowance received for Korean Patent Application No. 10-2020-7034405, dated Jun. 20, 2022, 6 pages (2 pages of English Translation and 4 pages of Official Copy).
Notice of Allowance received for U.S. Appl. No. 17/208,957, dated Aug. 17, 2022, 11 pages.
Notice of Allowance received for U.S. Appl. No. 17/208,957, dated Jun. 15, 2022, 12 pages.
Notice of Hearing received for Indian Patent Application No. 201617039493, dated Aug. 10, 2022, 3 pages.
Office Action received for Australian Patent Application No. 2019281965, dated Aug. 31, 2022, 5 pages.
Office Action received for Australian Patent Application No. 2021250944, dated Sep. 16, 2022, 3 pages.
Office Action received for Chinese Patent Application No. 201710198190.6, dated Jul. 5, 2022, 7 pages (3 pages of English Translation and 4 pages of Official Copy).
Office Action received for European Patent Application No. 19160348.9, dated Aug. 4, 2022, 6 pages.
Office Action received for European Patent Application No. 20198076.0, dated Sep. 22, 2022, 7 pages.
Office Action received for Japanese Patent Application No. 2019-563560, dated Jul. 4, 2022, 34 pages (15 pages of English Translation and 19 pages of Official Copy).
Office Action received for Japanese Patent Application No. 2020-566978, dated Sep. 26, 2022, 4 pages (2 pages of English Translation and 2 pages of Official Copy).
Office Action received for Japanese Patent Application No. 2021-084065, dated Jun. 24, 2022, 12 pages (6 pages of English Translation and 6 pages of Official Copy).
Office Action received for Japanese Patent Application No. 2021-131310, dated Sep. 2, 2022, 9 pages (5 pages of English Translation and 4 pages of Official Copy).
Office Action received for Korean Patent Application No. 10-2022-7012864, dated Jun. 27, 2022, 9 pages (4 pages of English Translation and 5 pages of Official Copy).
Office Action received for Korean Patent Application No. 10-2022-7012869, dated Jun. 27, 2022, 11 pages (5 pages of English Translation and 6 pages of Official Copy).
Summons to Attend Oral Proceedings received for European Patent Application No. 15727291.5, mailed on Sep. 12, 2022, 13 pages.
Summons to Attend Oral Proceedings received for European Patent Application No. 16201195.1, mailed on Sep. 12, 2022, 14 pages.
Summons to Attend Oral Proceedings received for European Patent Application No. 18208881.5, mailed on Jun. 29, 2022, 9 pages.
2007-102278 A, JP, Cited by Japanese Patent Office in an Office Action for related Patent Application No. 2021-149549 dated Oct. 21, 2022.
2014-239478 A, JP, Cited by Japanese Patent Office in an Office Action for related Patent Application No. 2021-149549 dated Oct. 21, 2022.
2017-117159 A, JP, Cited by Japanese Patent Office in an Office Action for related Patent Application No. 2021-149549 dated Oct. 21, 2022.
Final Office Action received for U.S. Appl. No. 17/409,570, dated Nov. 9, 2022, 37 pages.
Final Office Action received for U.S. Appl. No. 17/516,495, dated Nov. 15, 2022, 12 pages.
Notice of Acceptance received for Australian Patent Application No. 2021250944, dated Nov. 14, 2022, 3 pages.
Notice of Allowance received for U.S. Appl. No. 17/087,855, dated Nov. 25, 2022, 8 pages.
Office Action received for Australian Patent Application No. 2019281965, dated Nov. 18, 2022, 7 pages.
The Youtube Tech Guy, "How to Setup Face Unlock on Your Android", Available online at: https://www.youtube.com/watch?v=iJYFLYkYvTk, Apr. 12, 2012, 1 page.
Appeal Decision received for Australian Patent Application No. 2019268070, mailed on Dec. 22, 2022, 26 pages.
Office Action received for Chinese Patent Application No. 201910901500.5, dated Nov. 24, 2022, 22 pages (7 pages of English Translation and 15 pages of Official Copy).
101719955 A, CN, Cited by the Chinese Patent Office in an Office Action for related Patent Application No. 201910901500.5, dated Nov. 24, 2022.
Applicant-Initiated Interview Summary received for U.S. Appl. No. 17/409,570, dated Dec. 7, 2022, 4 pages.
Applicant-Initiated Interview Summary received for U.S. Appl. No. 17/409,570, dated Nov. 29, 2022, 4 pages.
Applicant-Initiated Interview Summary received for U.S. Appl. No. 17/863,974, dated Dec. 9, 2022, 2 pages.
Brief Communication Regarding Oral Proceedings received for European Patent Application No. 19160348.9, mailed on Nov. 8, 2022, 3 pages.
Office Action received for Australian Patent Application No. 2022200900, dated Nov. 30, 2022, 6 pages.
Office Action received for Chinese Patent Application No. 201910109868.8, dated Nov. 18, 2022, 32 pages (17 pages of English Translation and 15 pages of Official Copy).
Office Action received for Japanese Patent Application No. 2021-084065, dated Nov. 14, 2022, 10 pages (5 pages of English Translation and 5 pages of Official Copy).
Result of Consultation received for European Patent Application No. 18208881.5, dated Dec. 6, 2022, 10 pages.
2006-259930 A, JP, Cited by the Japanese Patent Office in an Office Action for related Patent Application No. 2019-563560 dated Jan. 20, 2023.
2011-217146 A, JP, Cited by the Japanese Patent Office in an Office Action for related Patent Application No. 2019-563560 dated Jan. 20, 2023.
Applicant-Initiated Interview Summary received for U.S. Appl. No. 16/938,362, dated Nov. 2, 2022, 2 pages.
Applicant-Initiated Interview Summary received for U.S. Appl. No. 17/409,570, dated Nov. 3, 2022, 5 pages.
Decision to Grant received for European Patent Application No. 19194828.0, dated Oct. 27, 2022, 3 pages.
Extended European Search Report received for European Patent Application No. 22188377.0, dated Oct. 27, 2022, 8 pages.
Non-Final Office Action received for U.S. Appl. No. 17/863,974, dated Oct. 24, 2022, 23 pages.
Office Action received for Australian Patent Application No. 2021254574, dated Oct. 15, 2022, 3 pages.
Office Action received for Japanese Patent Application No. 2021-149549, dated Oct. 21, 2022, 4 pages (2 pages of English Translation and 2 pages of Official Copy).
2001-0074059 A, KR, Cited by the European Patent Office in an Office Action for related Patent Application No. 21173988.3, dated Jan. 19, 2023.
Corrected Notice of Allowance received for U.S. Appl. No. 17/087,855, dated Jan. 12, 2023, 6 pages.
Corrected Notice of Allowance received for U.S. Appl. No. 17/087,855, dated Jan. 25, 2023, 4 pages.
Choong et al., "Fingerprint Self-Captures: Usability of a fingerprint system with real-time feedback", IEEE Fifth International Confer-

(56) References Cited

OTHER PUBLICATIONS ence on Biometrics: Theory, Applications and Systems (BTAS). IEEE, 2012. URL: https://ieeexplore.ieee.orgistamp/stamp.jsp?tp.Szar-munber=6374553, 2012, pp. 16-22.
Notice of Allowance received for U.S. Appl. No. 16/938,362, dated Jan. 19, 2023, 8 pages.
Notice of Allowance received for U.S. Appl. No. 17/409,570, dated Jan. 25, 2023, 7 pages.
Office Action received for European Patent Application No. 21173988.3, dated Jan. 19, 2023, 5 pages.
Office Action received for German Patent Application No. 112014004134.3, dated Dec. 21, 2022, 22 pages (8 pages of English Translation and 14 pages of Official Copy).
Advisory Action received for U.S. Appl. No. 17/863,974, dated Feb. 15, 2023, 2 pages.
Extended European Search Report received for European Patent Application No. 22197752.3, dated Feb. 15, 2023, 7 pages.
Intention to Grant received for European Patent Application No. 20186286.9, dated Feb. 17, 2023, 9 pages.
Office Action received for Japanese Patent Application No. 2021-168243, dated Feb. 6, 2023, 8 pages (4 pages of English Translation and 4 pages of Official Copy).
Office Action received for Korean Patent Application No. 10-2022-7004578, dated Jan. 27, 2023, 8 pages (4 pages of English Translation and 4 pages of Official Copy).
Office Action received for Korean Patent Application No. 10-2022-7015289, dated Jan. 28, 2023, 12 pages (5 pages of English translation and 7 pages of Official copy).
Summons to Attend Oral Proceedings received for European Patent Application No. 20198076.0, mailed on Feb. 16, 2023, 8 pages.
Advisory Action received for U.S. Appl. No. 17/193,991, dated Jan. 31, 2023, 3 pages.
Corrected Notice of Allowance received for U.S. Appl. No. 16/938,362, dated Feb. 7, 2023, 4 pages.
Extended European Search Report received for European Patent Application No. 22198902.3, dated Jan. 20, 2023, 9 pages.
Notice of Allowance received for Chinese Patent Application No. 201910246400.3, dated Jan. 28, 2023, 5 pages (1 page of English Translation and 4 pages of Official Copy).
Office Action received for Chinese Patent Application No. 201780053143.0, dated Nov. 30, 2022, 13 pages (6 pages of English Translation and 7 pages of Official Copy).
Office Action received for Japanese Patent Application No. 2019-563560, dated Jan. 20, 2023, 56 pages (25 pages of English Translation and 31 pages of Official Copy).
Office Action received for Korean Patent Application No. 10-2022-7014519, dated Jan. 26, 2023, 9 pages (4 pages of English Translation and 5 pages of Official Copy).
Extended European Search Report received for European Patent Application No. 22197755.6, dated Feb. 20, 2023, 8 pages.
Extended European Search Report received for European Patent Application No. 22212086.7, dated Feb. 21, 2023, 10 pages.
Intention to Grant received for European Patent Application No. 21166287.9, dated Feb. 23, 2023, 9 pages.
Notice of Acceptance received for Australian Patent Application No. 2019268070, dated Feb. 27, 2023, 3 pages.
Notice of Allowance received for U.S. Appl. No. 17/519,025, dated Mar. 2, 2023, 8 pages.
Office Action received for Korean Patent Application No. 10-2021-7010306, dated Feb. 15, 2023, 10 pages (5 pages of English Translation and 5 pages of Official Copy).
Pre-Appeal Review Report received for Japanese Patent Application No. 2020-566978, mailed on Feb. 21, 2023, 4 pages (2 pages of English Translation and 2 pages of Official Copy).
Notice of Allowance received for U.S. Appl. No. 17/193,991, dated Mar. 29, 2023, 9 pages.
2009-135770 A, JP, Cited by the Japanese Patent Office in an Office Action for related Patent Application No. 2021-168243 dated Feb. 6, 2023.
2013-140540 A, JP, Cited by the Japanese Patent Office in an Office Action for related Patent Application No. 2021-168243 dated Feb. 6, 2023.
2014-110009 A, JP, Cited by the Japanese Patent Office in an Office Action for related Patent Application No. 2021-168243 dated Feb. 6, 2023.
2015-207051 A, JP, Cited by the Japanese Patent Office in an Office Action for related Patent Application No. 2021-168243 dated Feb. 6, 2023.
10-2016-0026337 A, KR, Cited by the Japanese Patent Office in an Office Action for related Patent Application No. 2021-168243 dated Feb. 6, 2023.
Non-Final Office Action received for U.S. Appl. No. 17/062,941, dated Mar. 30, 2023, 6 pages.
Non-Final Office Action received for U.S. Appl. No. 17/863,974, dated Apr. 13, 2023, 30 pages.
Notice of Allowance received for U.S. Appl. No. 16/938,362, dated Apr. 10, 2023, 7 pages.
Notice of Allowance received for U.S. Appl. No. 17/409,570, dated Apr. 11, 2023, 7 pages.
Office Action received for Australian Patent Application No. 2022200900, dated Mar. 28, 2023, 3 pages.
Applicant-Initiated Interview Summary received for U.S. Appl. No. 17/062,941, dated Apr. 19, 2023, 2 pages.
Extended European Search Report received for European Patent Application No. 23157906.1, dated Apr. 6, 2023, 10 pages.
Office Action received for Chinese Patent Application No. 201910246439.5, dated Apr. 6, 2023, 14 pages (7 pages of English Translation and 7 pages of Official Copy).
Office Action received for Chinese Patent Application No. 202211283788.2, dated Mar. 22, 2023, 15 pages (7 pages of English Translation and 8 pages of Official Copy).
Office Action received for European Patent Application No. 19769669.3, dated Apr. 18, 2023, 20 pages.
Office Action received for Japanese Patent Application No. 2021-084065, dated Apr. 10, 2023, 6 pages (3 pages of English Translation and 3 pages of Official Copy).
Brief Communication regarding Oral Proceedings received for European Patent Application No. 20198076.0, dated May 2, 2023, 1 page.
Corrected Notice of Allowance received for U.S. Appl. No. 17/409,570, dated May 10, 2023, 2 pages.
Non-Final Office Action received for U.S. Appl. No. 17/725,311, dated May 10, 2023, 54 pages.
Notice of Allowance received for Korean Patent Application No. 10-2022-7012869, dated Apr. 18, 2023, 7 pages (2 pages of English Translation and 5 pages of Official Copy).

* cited by examiner 898-11

Figure 9B:
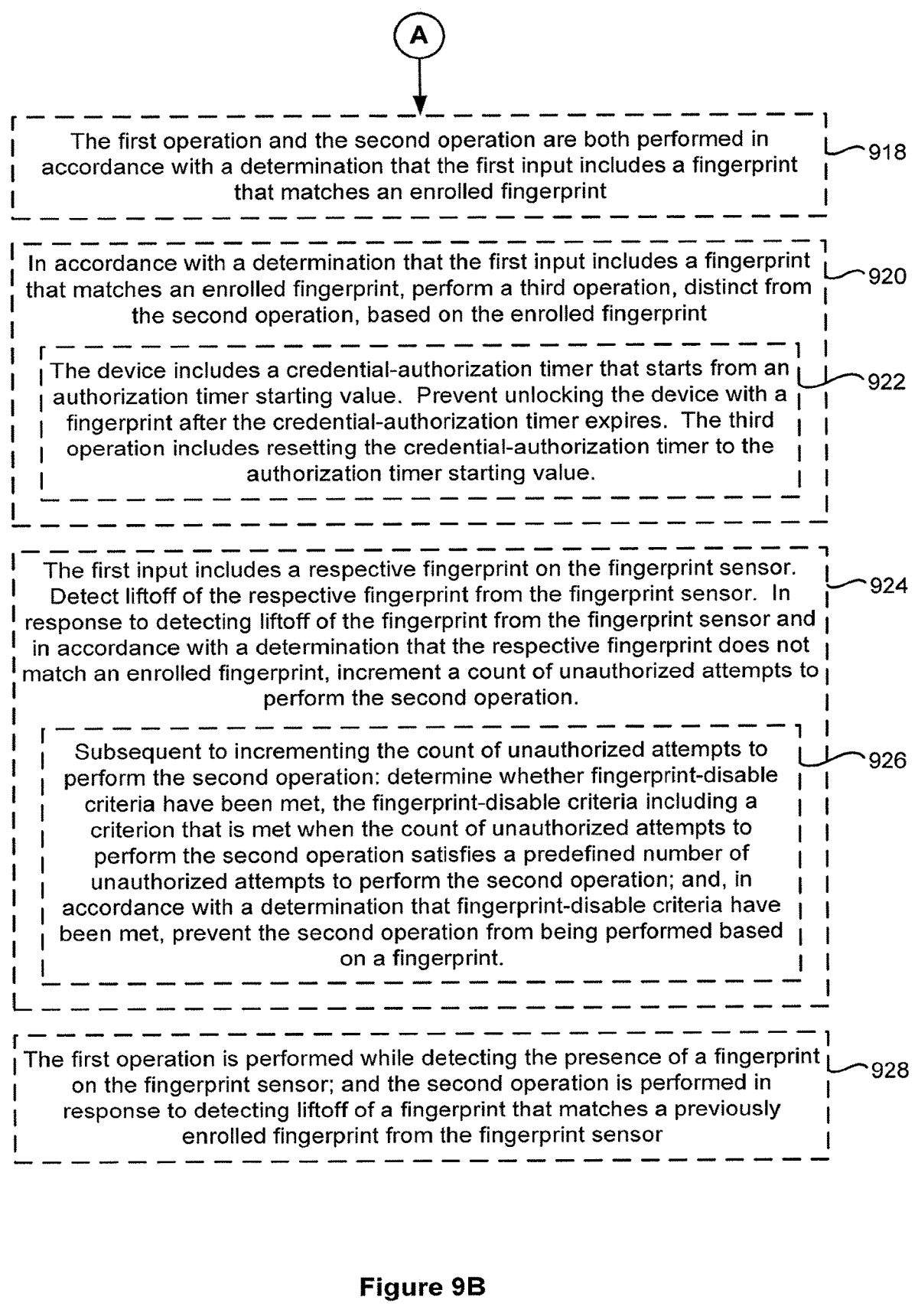

A

The first operation and the second operation are both performed in accordance with a determination that the first input includes a fingerprint that matches an enrolled fingerprint 918

In accordance with a determination that the first input includes a fingerprint that matches an enrolled fingerprint, perform a third operation, distinct from the second operation, based on the enrolled fingerprint 920

The device includes a credential-authorization timer that starts from an authorization timer starting value. Prevent unlocking the device with a fingerprint after the credential-authorization timer expires. The third operation includes resetting the credential-authorization timer to the authorization timer starting value. 922

The first input includes a respective fingerprint on the fingerprint sensor. Detect liftoff of the respective fingerprint from the fingerprint sensor. In response to detecting liftoff of the fingerprint from the fingerprint sensor and in accordance with a determination that the respective fingerprint does not match an enrolled fingerprint, increment a count of unauthorized attempts to perform the second operation. 924

Subsequent to incrementing the count of unauthorized attempts to perform the second operation: determine whether fingerprint-disable criteria have been met, the fingerprint-disable criteria including a criterion that is met when the count of unauthorized attempts to perform the second operation satisfies a predefined number of unauthorized attempts to perform the second operation; and, in accordance with a determination that fingerprint-disable criteria have been met, prevent the second operation from being performed based on a fingerprint. 926

The first operation is performed while detecting the presence of a fingerprint on the fingerprint sensor; and the second operation is performed in response to detecting liftoff of a fingerprint that matches a previously enrolled fingerprint from the fingerprint sensor 928

Figure 20A
Portable Multifunction Device
100
206
208
208
Speaker 111
Optical Sensor 164
Proximity Sensor 166
402
406
11:13
Monday, September 2
> slide to unlock
2001
Touch Screen 112
Microphone 113
169
Accelerometer(s) 168
204

Figure 20M
Portable Multifunction Device
100
206
208
208
Speaker 111
Optical Sensor 164
Proximity Sensor 166
402
406
2040
11:13
Monday, September 2
2042-a
> slide to unlock
Touch Screen 112
Microphone 113
169
Accelerometer(s) 168
204

Figure 23G
Portable Multifunction Device
100
206
208
208
Speaker 111
Optical Sensor 164
Proximity Sensor 166
400
402
406
2302
11:13
Monday, September 2
> try again
2312
Touch Screen 112
Microphone 113
169
Accelerometer(s) 168
204
Fingerprint 2310-2

Figure 23I
Portable Multifunction Device
100
206
208
208
Speaker 111
Optical Sensor 164
Proximity Sensor 166
400
402
406
2302
11:13
Monday, September 2
> try again
2312
Touch Screen 112
Microphone 113
169
Accelerometer(s) 168
204
Fingerprint 2310-3

Figure 23U
Portable Multifunction Device
100
206
208
208
Speaker 111
Optical Sensor 164
Proximity Sensor 166
400
402
406
2302
11:13
Monday, September 2
> slide to unlock
2304
Touch Screen 112
Microphone 113
169
Accelerometer(s) 168
204
Fingerprint 2310-5

Figure 23W
Portable Multifunction Device
100
206
208
208
400
Speaker 111
Optical Sensor 164
Proximity Sensor 166
402
406
2302
11:13
Monday, September 2
Finger gesture 2326-1
Finger gesture 2326-2
> slide to unlock
2304
Touch Screen 112
Microphone 113
169
204
Accelerometer(s) 168

Figure 26F
Portable Multifunction Device 100
206
208
208
Speaker 111
Optical Sensor 164
Proximity Sensor 166
2600
402
406
2606
11:13
2602
Tuesday, January 30
2604
Slide to unlock
2610
2608
Touch Screen 112
Microphone 113
169
Accelerometer(s) 168
204

Figure 29A
Portable Multifunction Device
100
206
208
208
Speaker 111
Optical Sensor 164
Proximity Sensor 166
29000
402
406
29006
11:13
29002
Tuesday, January 30
29004
Slide to unlock
29010
29008
Touch Screen 112
Microphone 113
169
Accelerometer(s) 168
204
29012

Figure 29E
Portable Multifunction Device
100
206
208
208
Speaker 111
Optical Sensor 164
Proximity Sensor 166
29000
402
406
11:13
Tuesday, January 30
29026
Slide to unlock
29010
29024
Touch Screen 112
Microphone 113
169
204
Accelerometer(s) 168

Figure 29I
Portable Multifunction Device
100
206
208
208
Speaker 111
Optical Sensor 164
Proximity Sensor 166
29000
402
406
11:13
Tuesday, January 30
Slide to unlock
Touch Screen 112
Microphone 113
169
Accelerometer(s) 168
204

Figure 29M
Portable Multifunction Device
100
206
208
Speaker 111
Optical Sensor 164
Proximity Sensor 166
29000
402
406
208
11:13
Tuesday, January 30
Slide to unlock
Touch Screen 112
Microphone 113
169
Accelerometer(s) 168
204

Figure 29S
Portable Multifunction Device
100
206
208
Speaker 111
Optical Sensor 164
Proximity Sensor 166
29000
402
406
11:13
Tuesday, January 30
208
Slide to unlock
Touch Screen 112
Microphone 113
169
Accelerometer(s) 168
204

Figure 29T
Portable Multifunction Device
100
206
208
208
Speaker 111
Optical Sensor 164
Proximity Sensor 166
29000
402
406
11:13
Tuesday, January 30
Slide to unlock
Touch Screen 112
Microphone 113
169
Accelerometer(s) 168
204
29106-a

Figure 29Y
Portable Multifunction Device
100
206
208
Speaker 111
Optical Sensor 164
Proximity Sensor 166
29000
402
406
11:13
Tuesday, January 30
Slide to unlock
208
Touch Screen 112
Microphone 113
169
Accelerometer(s) 168
204

Figure 30A:
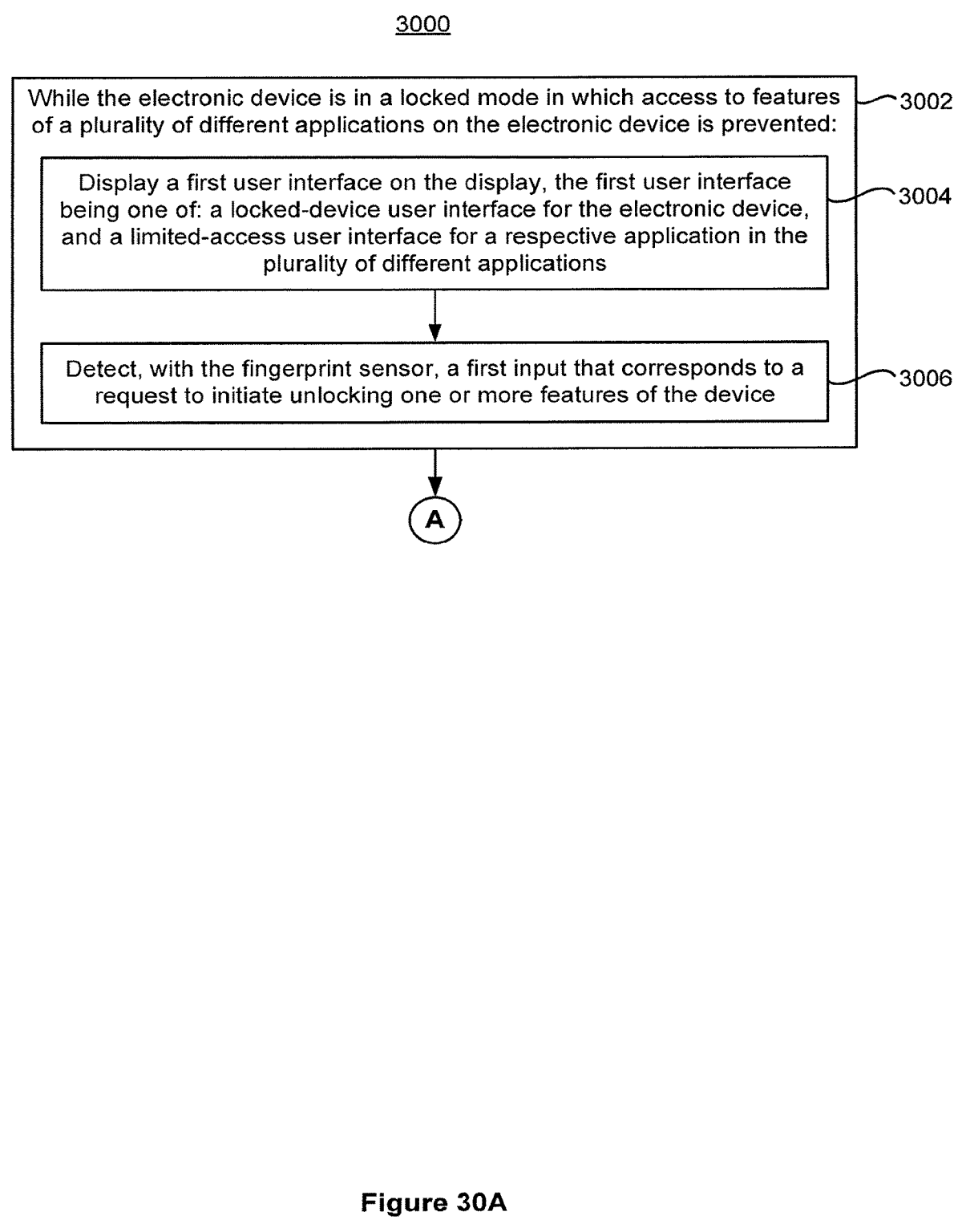

While the electronic device is in a locked mode in which access to features of a plurality of different applications on the electronic device is prevented: 3002

Display a first user interface on the display, the first user interface being one of: a locked-device user interface for the electronic device, and a limited-access user interface for a respective application in the plurality of different applications 3004

Detect, with the fingerprint sensor, a first input that corresponds to a request to initiate unlocking one or more features of the device 3006

DEVICE, METHOD, AND GRAPHICAL USER INTERFACE FOR MANIPULATING USER INTERFACES BASED ON UNLOCK INPUTS

RELATED APPLICATION

This application is a continuation of U.S. patent application Ser. No. 16/369,473, filed Mar. 29, 2019, which is a continuation of U.S. patent application Ser. No. 15/900,047, filed Feb. 20, 2018, which is a continuation of U.S. patent application Ser. No. 14/612,214, filed Feb. 2, 2015, which is a continuation of U.S. patent application Ser. No. 14/480,183, filed Sep. 8, 2014, which claims priority to U.S. Provisional Patent Application No. 61/875,669, filed Sep. 9, 2013. All of these applications are incorporated by reference in their entirety.

TECHNICAL FIELD

This relates generally to electronic devices with fingerprint sensors, including but not limited to electronic devices with fingerprint sensors that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display. Additionally, some electronic devices include fingerprint sensors for authenticating users.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform in such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. In addition, these methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a fingerprint sensor. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface and/or the fingerprint sensor. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for enrolling fingerprints with a device. Such methods and interfaces may complement or replace conventional methods for enrolling fingerprints with a device. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a fingerprint sensor. The method includes: displaying a fingerprint enrollment interface; detecting on the fingerprint sensor a plurality of separate and distinct stationary finger gestures performed with a respective finger; and collecting fingerprint information from the plurality of separate and distinct stationary finger gestures performed with the respective finger. After collecting the fingerprint information, the method includes determining, based on fingerprint information collected for the respective finger, whether the fingerprint information that has been collected is sufficient to enroll a fingerprint of the respective finger with the device. In accordance with a determination that the fingerprint information that has been collected for the respective finger is sufficient to enroll the fingerprint of the respective finger, the method includes enrolling the fingerprint of the respective finger with the device. In accordance with a determination that the fingerprint information that has been collected for the respective finger is not sufficient to enroll the fingerprint of the respective finger, the method includes displaying a message in the fingerprint enrollment interface prompting a user to perform one or more additional stationary finger gestures on the fingerprint sensor with the respective finger.

In accordance with some embodiments, an electronic device includes: a display unit configured to display a fingerprint enrollment interface; a fingerprint sensor unit; and a processing unit coupled to the display unit and the fingerprint sensor unit. The processing unit is configured to: detect on the fingerprint sensor unit a plurality of separate and distinct stationary finger gestures performed with a respective finger; and collect fingerprint information from the plurality of separate and distinct stationary finger gestures performed with the respective finger. After collecting the fingerprint information, the processing unit is also configured to determine, based on the fingerprint information collected for the respective finger, whether the fingerprint information that has been collected is sufficient to enroll a fingerprint of the respective finger with the device. In accordance with a determination that the fingerprint information that has been collected for the respective finger is sufficient to enroll the fingerprint of the respective finger, the processing unit is configured to enroll the fingerprint of the respective finger with the device. In accordance with a determination that the fingerprint information that has been collected for the respective finger is not sufficient to enroll the fingerprint of the respective finger, the processing unit is configured to enable display of a message in the fingerprint enrollment interface prompting a user to perform one or more additional stationary finger gestures on the fingerprint sensor unit with the respective finger.

Thus, electronic devices with displays and fingerprint sensors are provided with faster, more efficient methods and interfaces for enrolling fingerprints with a device, thereby increasing the effectiveness, efficiency, and user satisfaction with such devices. Such methods and interfaces may complement or replace conventional methods of enrolling fingerprints with a device.

There is a need for electronic devices with faster, more efficient methods and interfaces for performing operations based on fingerprints. Such methods and interfaces may complement or replace conventional methods for performing operations. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a fingerprint sensor. The method includes detecting, with the fingerprint sensor, a first input. The method also includes, in response to detecting the first input, determining whether the first input includes a fingerprint. The method further includes, in accordance with a determination that the first input includes a fingerprint: performing a first operation based on the presence of the fingerprint without regard to an identity of the fingerprint; and, in accordance with a determination that the fingerprint in the first input matches an enrolled fingerprint, conditionally performing a second operation based on the enrolled fingerprint.

In accordance with some embodiments, an electronic device includes a fingerprint sensor unit configured to detect a first input and a processing unit coupled to the fingerprint sensor unit. The processing unit is configured to, in response to detecting the first input: determine whether the first input includes a fingerprint. The processing unit is also configured to, in accordance with a determination that the first input includes a fingerprint: perform a first operation based on the presence of the fingerprint without regard to an identity of the fingerprint. The processing unit is further configured to, in accordance with a determination that the fingerprint in the first input matches an enrolled fingerprint, conditionally perform a second operation based on the enrolled fingerprint.

Thus, electronic devices with fingerprint sensors are provided with faster, more efficient methods and interfaces for performing operations based on fingerprints, thereby increasing the effectiveness, efficiency, and user satisfaction with such devices. Such methods and interfaces may complement or replace conventional methods for performing operations based on fingerprints.

There is a need for electronic devices with faster, more efficient methods and interfaces for populating credential fields and revealing redacted credentials, such as passwords, credit card numbers, and the like. Such methods and interfaces may complement or replace conventional methods for populating credential fields and revealing redacted credentials. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a fingerprint sensor. The method includes: storing a set of one or more credentials; displaying a form with fields corresponding to one or more credentials of the set of one or more credentials; receiving a request to automatically fill in the form with one or more credentials of the set of one or more credentials, wherein the request includes a finger input on the fingerprint sensor; in response to receiving the request to automatically fill in the form: in accordance with a determination that the finger input includes a fingerprint that is associated with a user who is authorized to use the set of one or more credentials, filling in the form with the one or more credentials; and in accordance with a determination that the finger input includes a fingerprint that is not associated with a user who is authorized to use the set of one or more credentials, forgoing filling in the form with the one or more credentials.

In accordance with some embodiments, an electronic device includes a display unit configured to display a form with fields corresponding to one or more credentials of the set of one or more credentials; a credential storage unit configured to store a set of one or more credentials; a fingerprint sensor unit; and a processing unit coupled to the display unit, the credential storage unit, and the fingerprint sensor unit. The processing unit is configured to: receive a request to automatically fill in the form with one or more credentials of the set of one or more credentials, wherein the request includes a finger input on the fingerprint sensor; and in response to receiving the request to automatically fill in the form: in accordance with a determination that the finger input includes a fingerprint that is associated with a user who is authorized to use the set of one or more credentials, fill in the form with the one or more credentials; and in accordance with a determination that the finger input includes a fingerprint that is not associated with a user who is authorized to use the set of one or more credentials, forgo filling in the form with the one or more credentials.

In accordance with some embodiments, a method is performed at an electronic device with a display and a fingerprint sensor. The method includes: storing a set of one or more credentials; receiving a request to display the set of one or more credentials; in response to receiving the request to display the set of one or more credentials, displaying redacted versions of the set of one or more credentials; while displaying the redacted versions of the set of one or more credentials, detecting a fingerprint on the fingerprint sensor; and in response to detecting the fingerprint and in accordance with a determination that the fingerprint is associated with a user who is authorized to reveal the set of one or more credentials, displaying a non-redacted version of the set of one or more credentials.

In accordance with some embodiments, an electronic device includes a display unit; a fingerprint sensor unit; and a processing unit coupled to the display unit, the credential storage unit, and the fingerprint sensor unit. The processing unit is configured to: receive a request to display the set of one or more credentials; in response to receiving the request to display the set of one or more credentials, enable display of redacted versions of the set of one or more credentials; and in response to detection of a fingerprint on the fingerprint sensor while the redacted versions of the set of one or more credentials are displayed, and in accordance with a determination that the fingerprint is associated with a user who is authorized to reveal the set of one or more credentials, enable display of a non-redacted version of the set of one or more credentials.

Thus, electronic devices with displays and fingerprint sensors are provided with faster, more efficient methods and interfaces for automatically populating credential fields and revealing redacted credentials, thereby increasing the effectiveness, efficiency, and user satisfaction with such devices. Such methods and interfaces may complement or replace conventional methods for populating credential fields and revealing redacted credentials.

There is a need for electronic devices with more efficient and secure methods and interfaces for managing the automatic usage of saved credentials. Such methods and interfaces may complement or replace conventional methods for managing the automatic usage of saved credentials.

In accordance with some embodiments, a method is performed at an electronic device with a display and a fingerprint sensor. The method includes: storing on the device a respective credential of a user of the device; while executing a software application: (1) receiving a fingerprint at a fingerprint sensor of the device; and (2) in response to receiving the fingerprint and in accordance with a determination that credential-usage criteria have been satisfied, including a determination that the received fingerprint matches at least one of a set of enrolled fingerprints, automatically using the respective credential of the user in the software application. The method also includes: after automatically using the respective credential of the user in response to receiving the fingerprint, receiving a request to enroll an additional fingerprint with the device; in response to the request to enroll the additional fingerprint with the device, adding the additional fingerprint to the set of enrolled fingerprints; and in response to adding the additional fingerprint to the set of enrolled fingerprints, preventing enrolled fingerprints from being used to authorize automatic usage of the respective credential.

In accordance with some embodiments, an electronic device includes a storage unit configured to store on the device a respective credential of a user of the device; and a processing unit coupled to the storage unit. The processing unit is configured to: while executing a software application: (1) receive a fingerprint at a fingerprint sensor of the device; and (2) in response to receiving the fingerprint and in accordance with a determination that credential-usage criteria have been satisfied, including a determination that the received fingerprint matches at least one of a set of enrolled fingerprints, automatically use the respective credential of the user in the software application. The processing unit is further configured to: after automatically using the respective credential of the user in response to receiving the fingerprint, receive a request to enroll an additional fingerprint with the device; in response to the request to enroll the additional fingerprint with the device, add the additional fingerprint to the set of enrolled fingerprints; and in response to adding the additional fingerprint to the set of enrolled fingerprints, prevent enrolled fingerprints from being used to authorize automatic usage of the respective credential.

Thus, electronic devices with displays and fingerprint sensors are provided with more efficient and secure methods and interfaces for managing the automatic usage of credentials, thereby increasing the effectiveness, efficiency, and user satisfaction with such devices. Such methods and interfaces may complement or replace conventional methods for managing the automatic usage of credentials.

There is a need for electronic devices with faster, more efficient methods and interfaces for revealing redacted information. Such methods and interfaces may complement or replace conventional methods for displaying information on a device. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a fingerprint sensor. The method includes: displaying a redacted version of first information on the display, and while displaying the redacted version of the first information on the display, detecting a finger input on the fingerprint sensor. The method further includes, in response to detecting the finger input on the fingerprint sensor: in accordance with a determination that the finger input includes a fingerprint that matches a previously enrolled fingerprint that is authorized to reveal the first information, replacing display of the redacted version of the first information with an unredacted version of the first information; and in accordance with a determination that the finger input does not include a fingerprint that matches a previously enrolled fingerprint that is authorized to reveal the first information, maintaining display of the redacted version of the first information on the display.

In accordance with some embodiments, an electronic device includes a display unit configured to display a redacted version of first information on the display; a fingerprint sensor unit; and a processing unit coupled to the display unit and the fingerprint sensor unit. The processing unit is configured to, while enabling display of the redacted version of the first information on the display unit, detect a finger input on the fingerprint sensor. The processing unit is further configured to, in response to detecting the finger input on the fingerprint sensor: in accordance with a determination that the finger input includes a fingerprint that matches a previously enrolled fingerprint that is authorized to reveal the first information, replace display of the redacted version of the first information with an unredacted version of the first information; and in accordance with a determination that the finger input does not include a fingerprint that matches a previously enrolled fingerprint that is authorized to reveal the first information, maintain display of the redacted version of the first information on the display.

Thus, electronic devices with displays, and fingerprint sensors are provided with faster, more efficient methods and interfaces for revealing redacted information, thereby increasing the effectiveness, efficiency, and user satisfaction with such devices. Such methods and interfaces may complement or replace conventional methods for displaying information on a device.

There is a need for electronic devices with faster, more efficient methods and interfaces for providing different unlock modes of such electronic devices. Such methods and interfaces may complement or replace conventional methods for providing different unlock modes. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a fingerprint sensor and a display. While the device is in a locked mode of operation in which access to a respective set of features of the electronic device is locked, the method includes detecting, with the fingerprint sensor, a first input that corresponds to a request to initiate unlocking the device. In response to detecting the first input with the fingerprint sensor, the method further includes determining whether the first input meets one of unlock criteria, first unlock-failure criteria, or second unlock-failure criteria. In accordance with a determination that the first input meets the unlock criteria, the method includes transitioning the device from the locked mode to an unlocked mode in which the respective set of features of the electronic device is unlocked. In accordance with a determination that the first input meets the first unlock-failure criteria, the method includes maintaining the device in the locked mode and adjusting unlock settings so that the device is enabled to be unlocked via an unlock operation in a first set of one or more unlock operations, and in accordance with a determination that the first input meets the second unlock-failure criteria, maintaining the device in the locked mode and adjusting unlock settings so that the device is enabled to be unlocked via an unlock operation in a second set of one or more unlock operations that is different from the first set of unlock operations.

In accordance with some embodiments, an electronic device includes a display unit configured to display a graphical user interface, a fingerprint sensor unit and a processing unit coupled to the display unit and fingerprint sensor unit. While the device is in a locked mode of operation in which access to a respective set of features of the electronic device is locked, the fingerprint sensor unit detects a first input that corresponds to a request to initiate unlocking the device. In response to detecting the first input with the fingerprint sensor unit, the processing unit is configured to: determine whether the first input meets one of unlock criteria, first unlock-failure criteria, or second unlock-failure criteria. The processing unit is further configured to: in accordance with a determination that the first input meets the unlock criteria, transition the device from the locked mode to an unlocked mode in which the respective set of features of the electronic device is unlocked. The processing unit is further configured to: in accordance with a determination that the first input meets the first unlock-failure criteria, maintain the device in the locked mode and adjust unlock settings so that the device is enabled to be unlocked via an unlock operation in a first set of one or more unlock operations. The processing unit is further configured to: in accordance with a determination that the first input meets the second unlock-failure criteria, maintain the device in the locked mode and adjust unlock settings so that the device is enabled to be unlocked via an unlock operation in a second set of one or more unlock operations that is different from the first set of unlock operations.

Thus, electronic devices with displays, and fingerprint sensors are provided with faster, more efficient methods and interfaces for providing different unlock modes, thereby increasing the effectiveness, efficiency, and user satisfaction with such devices. Such methods and interfaces may complement or replace conventional methods for providing different unlock modes.

There is a need for electronic devices with more efficient and secure methods and interfaces for controlling access to device information and features and unlocking the device. Such methods and interfaces may complement or replace conventional methods for controlling access to device information and features and unlocking the device. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a fingerprint sensor. The method includes: while the device is in a locked mode in which access to a respective set of features of the electronic device is locked, displaying a first user interface on the display and detecting a first input; in response to detecting the first input, displaying a second user interface on the display, where the second user interface is in a limited-access mode in which access to the second user interface is restricted in accordance with restriction criteria; and, while displaying the second user interface in the limited-access mode: detecting a first fingerprint on the fingerprint sensor; in accordance with a determination that the first fingerprint is one of a plurality of enrolled fingerprints that are enrolled with the device, displaying the second user interface in a full-access mode in which access to the second user interface is not restricted in accordance with the restriction criteria and transitioning the device from the locked mode to an unlocked mode in which the respective set of features of the electronic device is unlocked; and in accordance with a determination that the first fingerprint is not one of the plurality of enrolled fingerprints, maintaining display of the second user interface in the limited-access mode and maintaining the device in the locked mode.

In accordance with some embodiments, an electronic device includes a display unit, a fingerprint sensor unit, and a processing unit coupled to the display unit and the fingerprint sensor unit. The processing unit is configured to: while the device is in a locked mode in which access to a respective set of features of the electronic device is locked, enable display of the first user interface on the display unit, and detect a first input; in response to detecting the first input, enable display of a second user interface on the display unit, where the second user interface is in a limited-access mode in which access to the second user interface is restricted in accordance with restriction criteria; and while enabling display of the second user interface in the limited-access mode: detect a first fingerprint on the fingerprint sensor unit; in accordance with a determination that the first fingerprint is one of a plurality of enrolled fingerprints that are enrolled with the device, enable display of the second user interface in a full-access mode in which access to the second user interface is not restricted in accordance with the restriction criteria, and transition the device from the locked mode to an unlocked mode in which the respective set of features of the electronic device is unlocked; and in accordance with a determination that the first fingerprint is not one of the plurality of enrolled fingerprints, maintain display of the second user interface in the limited-access mode and maintain the device in the locked mode.

Thus, electronic devices with displays and fingerprint sensors are provided with more efficient and secure methods and interfaces for controlling access to device information and features and unlocking the device, thereby increasing the effectiveness, efficiency, and user satisfaction with such devices. Such methods and interfaces may complement or replace conventional methods for controlling access to device information and features and unlocking the device.

There is a need for electronic devices with efficient methods and interfaces for unlocking an application or a device depending on context. Such methods and interfaces may complement or replace conventional methods for unlocking. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display and a fingerprint sensor. The method includes: while the electronic device is in a locked mode in which access to features of a plurality of different applications on the electronic device is prevented, displaying a first user interface on the display, the first user interface being one of a locked-device user interface for the electronic device, and a limited-access user interface for a respective application in the plurality of different applications, and detecting, with the fingerprint sensor, a first input that corresponds to a request to initiate unlocking one or more features of the device. The method further includes, in response to detecting, with the fingerprint sensor, the first input that corresponds to the request to initiate unlocking one or more features of the device: in accordance with a determination that the first user interface is the locked-device user interface for the electronic device, transitioning the device from the locked mode to a multi-application unlocked mode in which the features of the plurality of different applications are unlocked. The method also includes, in accordance with a determination that the first user interface is the limited-access user interface for the respective application: transitioning the device from the locked mode to a single-application unlocked mode in which one or more previously-locked features of the respective application are unlocked; and continuing to prevent access to one or more previously-locked features of other applications in the plurality of different applications.

In accordance with some embodiments, an electronic device includes a display unit configured to display a first user interface; a fingerprint sensor unit; and a processing unit coupled to the display unit and the fingerprint sensor unit. The processing unit is configured to: while the electronic device is in a locked mode in which access to features of a plurality of different applications on the electronic device is prevented: enable display of the first user interface on the display unit, the first user interface being one of: a locked-device user interface for the electronic device, and a limited-access user interface for a respective application in the plurality of different applications; and detect, with the fingerprint sensor, a first input that corresponds to a request to initiate unlocking one or more features of the device. The processing unit is further configured to, in response to detecting, with the fingerprint sensor, the first input that corresponds to the request to initiate unlocking one or more features of the device: in accordance with a determination that the first user interface is the locked-device user interface for the electronic device, transition the device from the locked mode to a multi-application unlocked mode in which the features of the plurality of different applications are unlocked. The processing unit is also configured to, in accordance with a determination that the first user interface is the limited-access user interface for the respective application: transition the device from the locked mode to a single-application unlocked mode in which one or more previously-locked features of the respective application are unlocked; and continue to prevent access to one or more previously-locked features of other applications in the plurality of different applications.

Thus, electronic devices with displays and fingerprint sensors are provided with efficient methods and interfaces for unlocking an application or a device depending on context, thereby increasing the effectiveness, efficiency, and user satisfaction with such devices. Such methods and interfaces may complement or replace conventional methods for unlocking.

In accordance with some embodiments, an electronic device includes a fingerprint sensor, a display, and/or a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a fingerprint sensor, a display, optionally a touch-sensitive surface, a memory, and one or more processors to execute one or more programs stored in the memory includes one or more of the elements displayed in any of the methods described above, which are updated in response to inputs, as described in any of the methods described above. In accordance with some embodiments, a computer readable storage medium has stored therein instructions which when executed by an electronic device with a fingerprint sensor and optionally a display and/or, a touch-sensitive surface, cause the device to perform the operations of any of the methods described above. In accordance with some embodiments, an electronic device includes: a fingerprint sensor and optionally, a display and/one or a touch-sensitive surface; and means for performing the operations of any of the methods described above. In accordance with some embodiments, an information processing apparatus, for use in an electronic device with a fingerprint sensor and optionally a display and/or a touch-sensitive surface, includes means for performing the operations of any of the methods described above.

Thus, electronic devices with displays and fingerprint sensors are provided with faster, more efficient methods and interfaces for changing beamforming parameters based on fingerprint orientation, thereby increasing the effectiveness, efficiency, and user satisfaction with such devices. Such methods and interfaces may complement or replace conventional methods for changing beamforming parameters.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9B are flow diagrams illustrating a method of performing operations based on fingerprints in accordance with some embodiments.

FIGS. 30A-30D are flow diagrams illustrating a method of unlocking an application or a device depending on context in accordance with some embodiments.

DESCRIPTION OF EMBODIMENTS

Figure 1A:
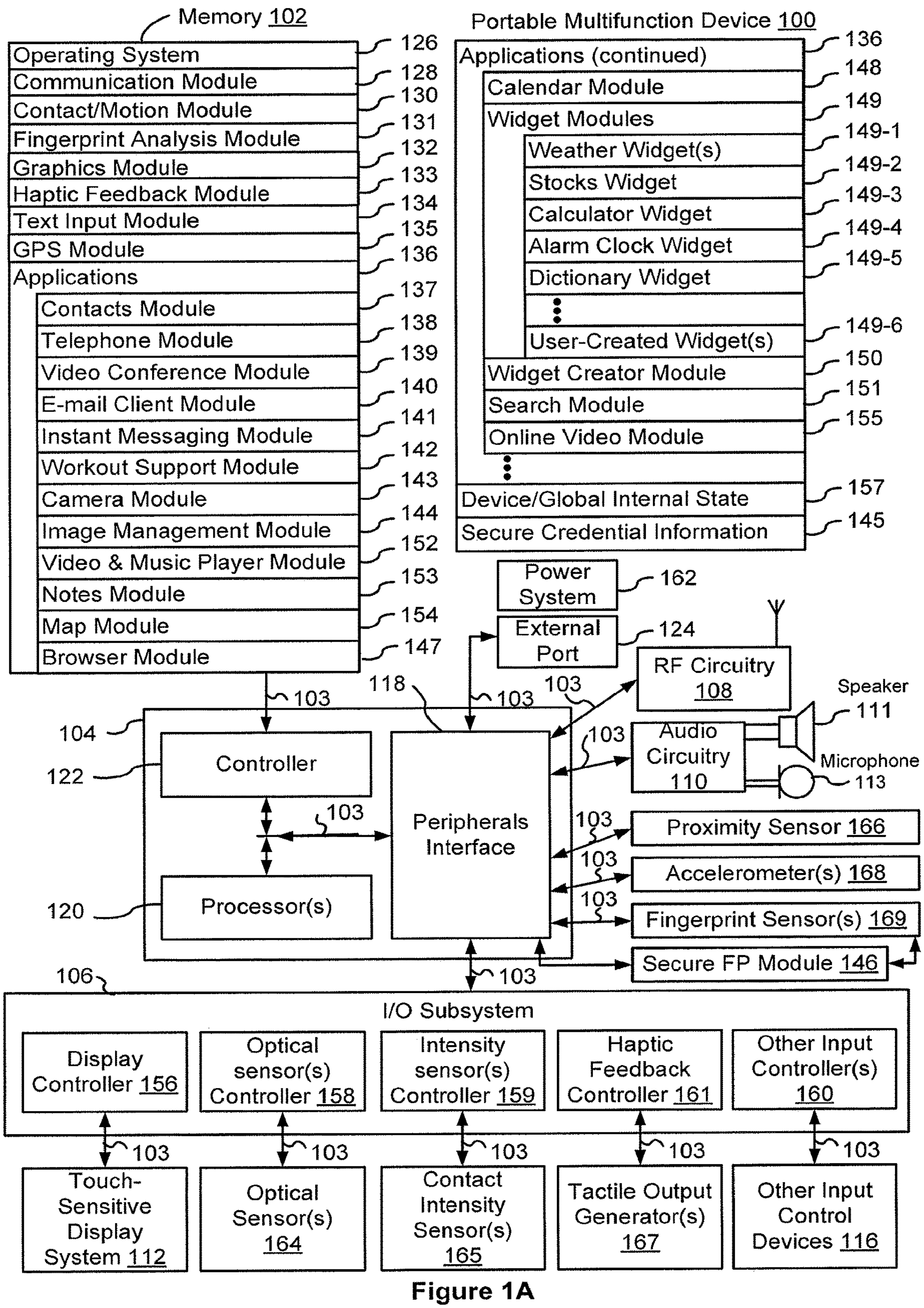
FIG. 1A is a block diagram illustrating a portable multifunction device with a touch-sensitive display and a fingerprint sensor in accordance with some embodiments.

The methods, devices and GUIs described herein respond to inputs on a fingerprint sensor instead of, or in addition to, inputs on a touch-sensitive surface or other input device. In some implementations, a touch-sensitive surface with a spatial resolution that is high enough to detect fingerprint features formed by individual fingerprint ridges is used as a fingerprint sensor. When a fingerprint sensor is used without a separate touch-sensitive surface, the fingerprint sensor can serve as a substitute for many of the functions of the touch-sensitive surface with a much smaller form factor, as the fingerprint sensor can detect movement of a contact over the fingerprint sensor even when the fingerprint has an area that is as large as or larger than the area of the fingerprint sensor. When a fingerprint sensor is used in addition to a separate touch-sensitive surface, the fingerprint sensor can augment the touch-sensitive surface by providing accurate detection of twisting motions of a contact, identifying different fingerprints of fingers that are used to perform gestures on the fingerprint sensor, and identifying a current user of the device. Additionally, when a fingerprint sensor is used in addition to a separate touchscreen display, the fingerprint sensor can detect touch inputs in situations where it is advantageous to avoid having fingers obscuring portions of the display (e.g., while viewing a map, a video or a game). When the touch-sensitive surface is used as a fingerprint sensor, the touch-sensitive surface optionally has spatial resolution settings that can be defined so as to switch the touch-sensitive surface (or regions of the touch-sensitive surface) between a low-resolution mode and a high-resolution mode automatically, without user intervention. In many situations the low-resolution mode consumes less power than the high-resolution mode. An advantage of operating the touch-sensitive surface in a low-resolution mode when fingerprint detection is not needed and switching the touch-sensitive surface, or a region of the touch-sensitive surface, to high-resolution mode on an as-needed basis is that such an approach conserves power while still providing high-resolution fingerprint feature sensing as-needed to improve the user experience of using the device. In implementations where the touch-sensitive surface is used as a fingerprint sensor, the term "fingerprint sensor" is used to refer to the touch-sensitive surface, or a region of the touch-sensitive surface, that is currently in high-resolution mode.

Figure 8A:
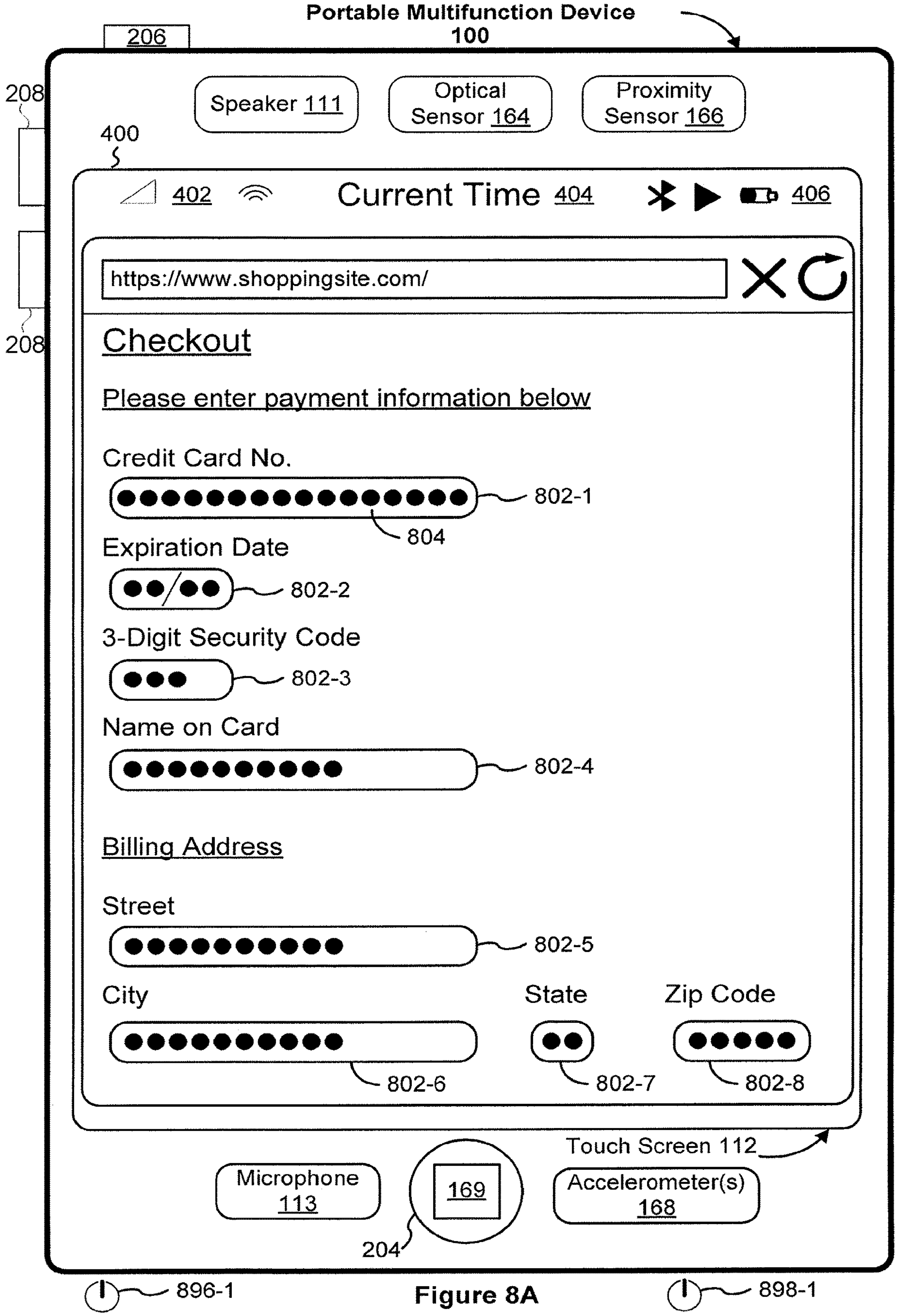
FIGS. 8A-8W illustrate exemplary user interfaces for performing operations based on fingerprints in accordance with some embodiments.
Figure 20A:
FIGS. 20A-20T illustrate exemplary user interfaces for revealing redacted information in accordance with some embodiments.
Figure 26A:
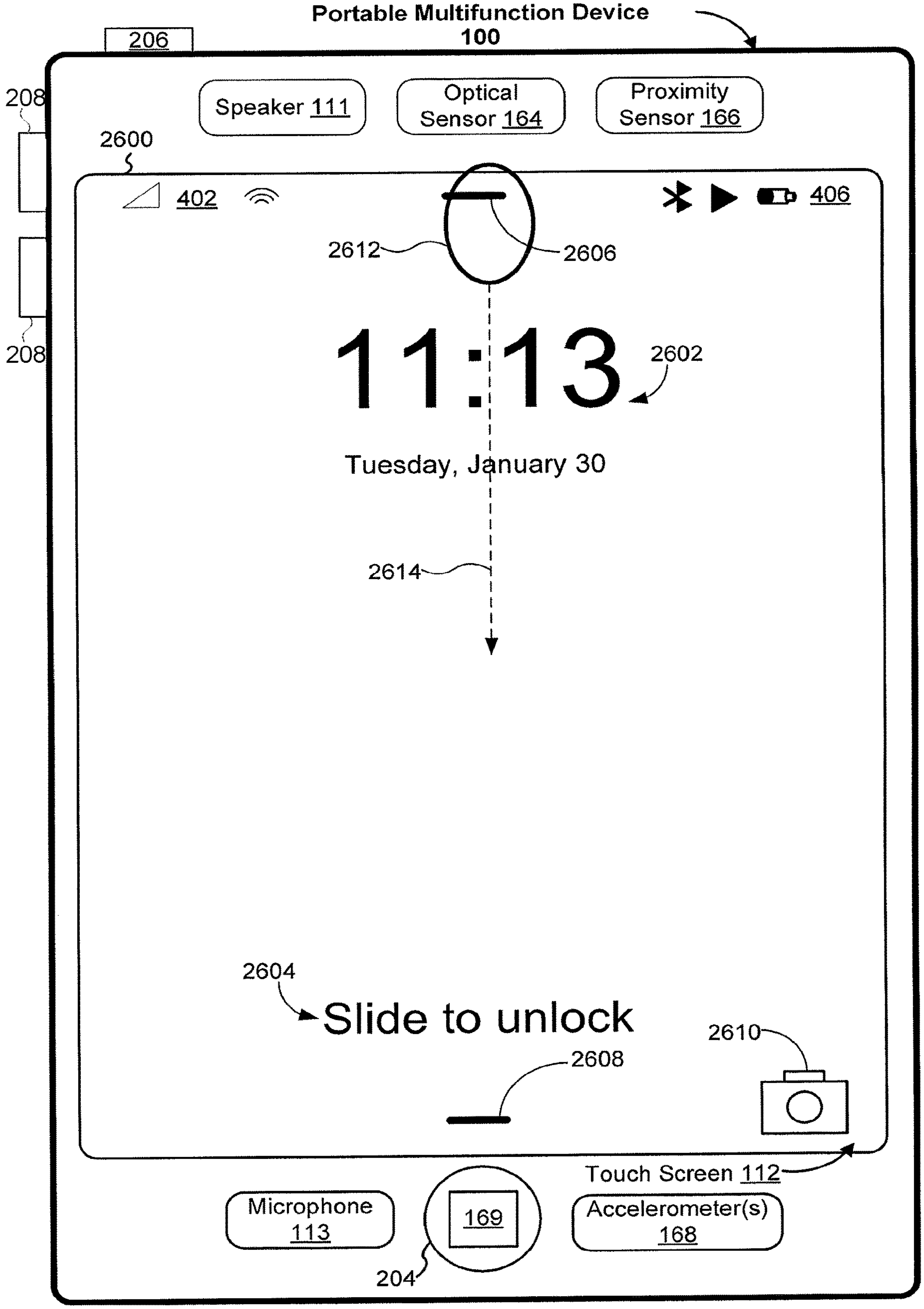
FIGS. 26A-26X illustrate exemplary user interfaces for controlling access to device information and features and unlocking the device in accordance with some embodiments.
Figure 29A:
FIGS. 29A-29Y illustrate exemplary user interfaces for unlocking an application or a device depending on context in accordance with some embodiments.

A number of different approaches to providing an intuitive user interface where inputs from one or more fingerprint sensors are used to manipulate a user interface of an electronic device are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

- Below, FIGS. 5A-5EE illustrate exemplary user interfaces for enrolling fingerprints with a device. FIGS. 6A-6D are flow diagrams illustrating a method of enrolling fingerprints with a device. The user interfaces in FIGS. 5A-5EE are used to illustrate the processes in FIGS. 6A-6D.
- Below, FIGS. 8A-8W illustrate exemplary user interfaces for performing operations based on fingerprints. FIGS. 9A-9B are flow diagrams illustrating a method of performing operations based on fingerprints. The user interfaces in FIGS. 8A-8W are used to illustrate the processes in FIGS. 9A-9B.
- Below, FIGS. 11A-11D and 14A-14C illustrate exemplary user interfaces for populating credential fields with credentials, and for displaying non-redacted versions of credentials, in response to fingerprint-based authentication of a user. FIGS. 12A-12B and 15A-15B are flow diagrams illustrating methods for using fingerprint-based authentication of a user to authorize automatic population of credential fields and/or to authorize display of non-redacted credentials. The user interfaces in FIGS. 11A-11D and 14A-14C are used to illustrate the processes in FIGS. 12A-12B and 15A-15B.
- Below, FIGS. 17A-17J illustrate exemplary user interfaces for managing automatic usage of saved credentials on an electronic device (e.g., device 100 or 300). FIGS. 18A-18C are flow diagrams illustrating a method of managing automatic usage of saved credentials on an electronic device (e.g., device 100 or 300). The user interfaces in FIGS. 17A-17J are used to illustrate the processes in FIGS. 18A-18C.
- Below, FIGS. 20A-20T illustrate exemplary user interfaces for revealing redacted information. FIGS. 21A-21C are flow diagrams illustrating a method of revealing redacted information. The user interfaces in FIGS. 20A-20T are used to illustrate the processes in FIGS. 21A-21C.
- Below, FIGS. 23A-23FF illustrate exemplary user interfaces for providing different unlock modes on an electronic device. FIGS. 24A-24D are flow diagrams illustrating a method of providing different unlock modes on an electronic device. The user interfaces in FIGS. 23A-23FF are used to illustrate the processes in FIGS. 24A-24D.
- Below, FIGS. 26A-26X illustrate exemplary user interfaces for controlling access to device information and features and unlocking the device. FIGS. 27A-27D are flow diagrams illustrating a method of unlocking a device and access to device features. The user interfaces in FIGS. 26A-26X are used to illustrate the processes in FIGS. 27A-27D.
- Below, FIGS. 29A-29Y illustrate exemplary user interfaces for unlocking an application or a device depending on context. FIGS. 30A-30D are flow diagrams illustrating a method of unlocking an application or a device depending on context. The user interfaces in FIGS. 29A-29Y are used to illustrate the processes in FIGS. 30A-30D.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112.

In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, device 100 also includes (or is in communication with) one or more fingerprint sensors 169. FIG. 1A shows fingerprint sensor 169 coupled to peripherals interface 118. Alternately, fingerprint sensors 169 are, optionally, coupled to an input controller 160 in I/O subsystem 106. However, in one common embodiment, fingerprint identification operations are performed using secured dedicated computing hardware (e.g., one or more processors, memory and/or communications busses) that has additional security features so as to enhance security of the fingerprint information determined by the fingerprint sensors. As used herein, a fingerprint sensor is a sensor that is capable of distinguishing fingerprint features (sometimes called "minutia features") of the ridges and valleys of skin such as those found on the fingers and toes of humans. A fingerprint sensor can use any of a variety of techniques to distinguish the fingerprint features, including but not limited to: optical fingerprint imaging, ultrasonic fingerprint imaging, active capacitance fingerprint imaging and passive capacitance fingerprint imaging. In addition to distinguishing fingerprint features in fingerprints, in some embodiments, fingerprint sensor 169 is capable of tracking movement of fingerprint features over time and thereby determining/characterizing movement of the fingerprint over time on the fingerprint sensor. While the fingerprint sensor (e.g., Fingerprint Sensor 169) in FIG. 1A is shown as being separate from the touch-sensitive surface (e.g., Touch-Sensitive Display System 112), it should be understood that in some implementations, the touch-sensitive surface (e.g., Touch-Sensitive Display System 112) has a spatial resolution that is high enough to detect fingerprint features formed by individual fingerprint ridges and is used as a fingerprint sensor instead of, or in addition to, a separate fingerprint sensor (e.g., Fingerprint Sensor 169). In some embodiments, device 100 includes a set of one or more orientation sensors that are used to determine an orientation of a finger or hand on or proximate to the device (e.g., an orientation of a finger that is over fingerprint sensor 169). Additionally, in some embodiments, the set of one or more orientation sensors are used in addition to or instead of a fingerprint sensor to detect rotation of a contact that is interacting with the device (e.g., in one or more of the methods described below, instead of using a fingerprint sensor to detect rotation of a fingerprint/contact, the set of one or more orientation sensors is used to detect rotation of the contact that includes the fingerprint, with or without detecting features of the fingerprint).

In some embodiments, features of fingerprints and comparisons between features of detected fingerprints and features of stored fingerprints are performed by secured dedicated computing hardware (e.g., one or more processors, memory and/or communications busses) that are separate from processors 120, so as to improve security of the fingerprint data generated, stored and processed by fingerprint sensor 169. In some embodiments, features of fingerprints and comparisons between features of detected fingerprints and features of enrolled fingerprints are performed by processors 120 using fingerprint analysis module 131.

In some embodiments, during an enrollment process, the device (e.g., fingerprint analysis module 131 or a separate secure module 146 in communication with fingerprint sensor (s) 169) collects biometric information about one or more fingerprints of the user (e.g., identifying relative location of a plurality of minutia points in a fingerprint of the user). After the enrollment process has been completed the biometric information is stored at the device (e.g., in secure fingerprint module 146) for later use in authenticating detected fingerprints. In some embodiments, the biometric information that is stored at the device excludes images of the fingerprints and also excludes information from which images of the fingerprints could be reconstructed so that images of the fingerprints are not inadvertently made available if the security of the device is compromised. In some embodiments, during an authentication process, the device (e.g., fingerprint analysis module 131 or a separate secure module 146 in communication with fingerprint sensor(s) 169) determines whether a finger input detected by the fingerprint sensor includes a fingerprint that matches a previously enrolled fingerprint by collecting biometric information about a fingerprint detected on the fingerprint sensor (e.g., identifying relative locations of a plurality of minutia points in the fingerprint detected on the fingerprint sensor) and comparing the biometric information that corresponds to the detected fingerprint to biometric information that corresponds to the enrolled fingerprints(s). In some embodiments, comparing the biometric information that corresponds to the detected fingerprint to biometric information that corresponds to the enrolled fingerprints(s) includes comparing a type and location of minutia points in the biometric information that corresponds to the detected fingerprint to a type and location of minutia points in the biometric information that corresponds to the enrolled fingerprints. However the determination as to whether or not a finger input includes a fingerprint that matches a previously enrolled fingerprint that is enrolled with the device is, optionally, performed using any of a number of well known fingerprint authentication techniques for determining whether a detected fingerprint matches an enrolled fingerprint.

Figure 3:
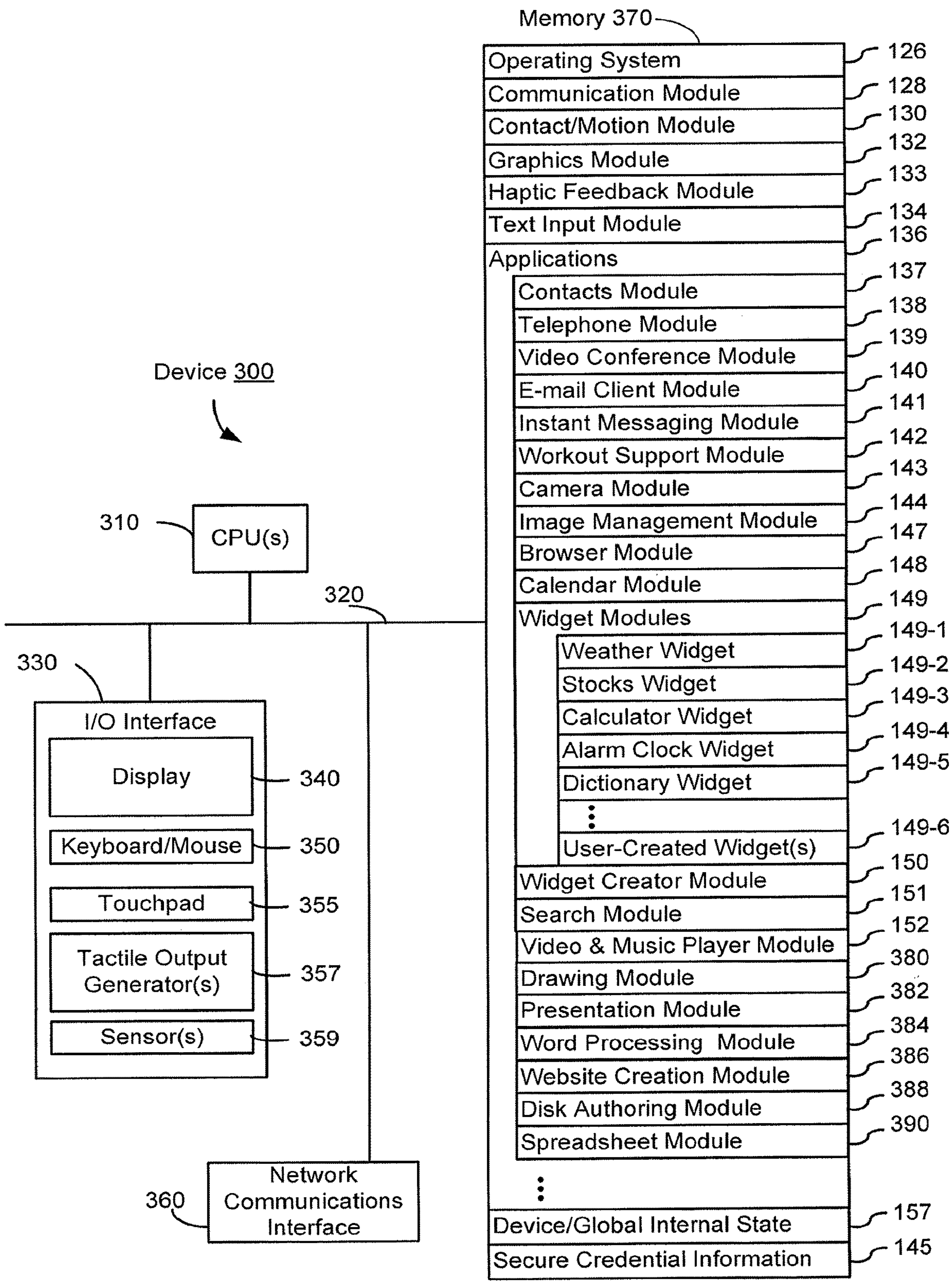
FIG. 3 is a block diagram of an exemplary multifunction device with a display and a plurality of sensors including a fingerprint sensor and, optionally a touch-sensitive surface in accordance with some embodiments.

In some embodiments, the software components stored in memory 102 include operating system 126, communication module (or set of instructions), contact/motion module (or set of instructions) 130, fingerprint analysis module 131, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

In some embodiments credential information is stored as secure credential information 145. Secure credential information, optionally, includes credentials for user accounts (e.g., user names and passwords, billing information, address information). In some embodiments, the credential information for one or more different applications is stored in a secure central location on the device, so that the credential information is accessible to different applications. In some embodiments, credential information that is associated with a particular application (e.g., a user name and password or billing information that has been entered into the particular application) is stored with the particular application (e.g., a user name and password for authorizing purchases in a store application are stored with the store application for ease of access by the store application). In some embodiments other security information (e.g., decryption keys for decrypting encrypted content stored at the device) is stored with secure credential information 145 or at another secure location on the device.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Fingerprint analysis module 131 optionally detects a finger input by a user on a fingerprint sensor and determines whether the finger input includes a fingerprint that corresponds to a previously enrolled fingerprint that is enrolled with the device and/or detects movement of the fingerprint that corresponds to a finger gesture. In some embodiments, the enrollment of fingerprints and the comparison between detected fingerprints and enrolled fingerprints is performed at a secure fingerprint analysis module 146 that is in communication with fingerprint sensor(s) 169 and secure fingerprint analysis module 146 provides fingerprint analysis module 131 with information indicating whether or not the detected fingerprint matches a previously enrolled fingerprint without providing biometric information about the detected fingerprint or the enrolled fingerprint to fingerprint analysis module 131 (e.g., so as to maintain the security of biometric information about detected and enrolled fingerprints). In some embodiments, information about movement of the fingerprint during the finger input and times of finger-up or finger-down events are also provided to fingerprint analysis module 131 by secure fingerprint analysis module 146. In some embodiments, the information about the finger input is used by fingerprint analysis module 131 to respond to the finger inputs (e.g., by unlocking the device, unlocking a function of the device, displaying previously redacted information, or performing an operation based on the movement of a fingerprint on the fingerprint sensor).

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
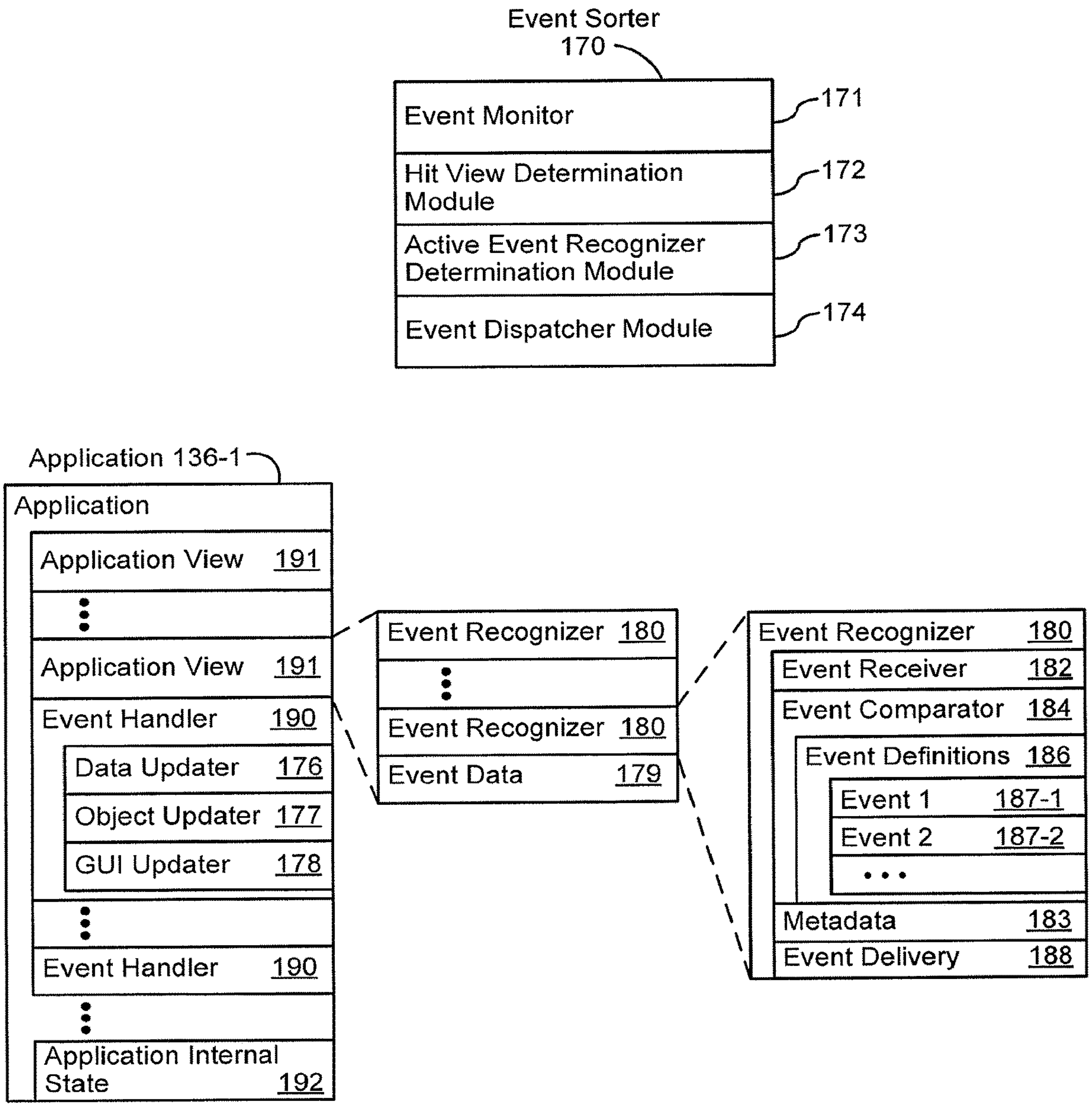
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118 or, optionally, fingerprint analysis module 131. Event information includes information about a sub-event (e.g., a user touch on touch-sensitive display 112, as part of a multi-touch gesture or a finger input on a fingerprint sensor 169). Peripherals interface 118 transmits information it receives from I/O subsystem 106 or a sensor, such as proximity sensor 166, accelerometer(s) 168, fingerprint sensor 169, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement, or a finger input or fingerprint movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, multiple touching, fingerprint begin, fingerprint end, fingerprint movement, fingerprint authenticate, and fingerprint authentication fail. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
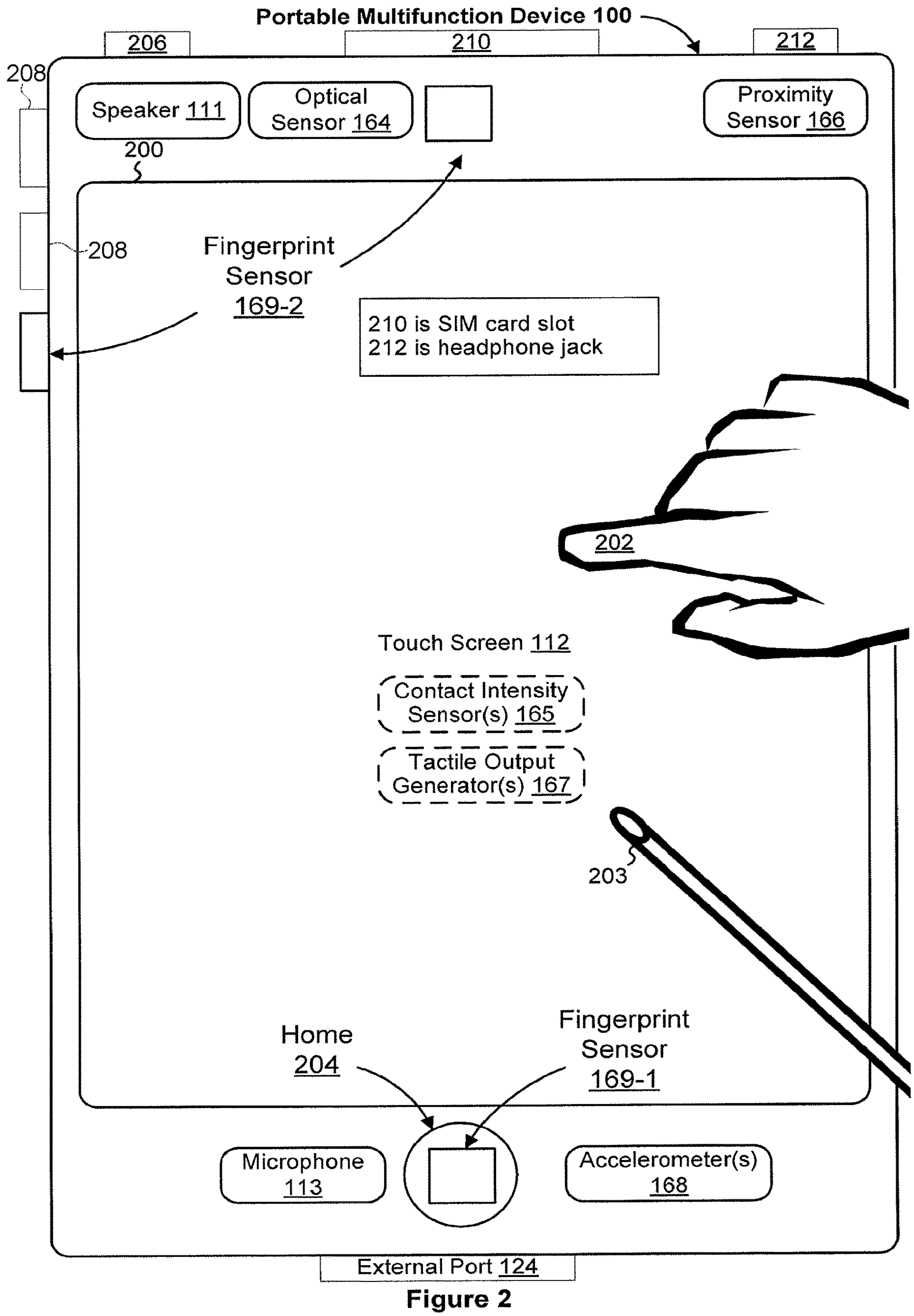
FIG. 2 illustrates a portable multifunction device having a touch screen and a fingerprint sensor in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112. In some embodiments button 204 includes an integrated fingerprint sensor 169-1 for identifying a fingerprint that is interacting with button 204 and/or detecting movement of the fingerprint on button 204. Device also, optionally, includes one or more other fingerprint sensors 169-2 that are separate from button 204 and are used instead of or in conjunction with a fingerprint sensor 169-1 integrated into button 204 to identify a user interacting with the device and/or detect motion of the fingerprint. Additionally, one or more of the other fingerprint sensors 169-2 are optionally associated with a button (e.g., a pressure sensitive region that is activated by detecting an input with an intensity above an activation intensity threshold or a physical actuator that moves in response force applied by a user). In implementations where the touch-sensitive surface (e.g., Touch Screen 112) has a spatial resolution that is high enough to detect fingerprint features formed by individual fingerprint ridges, the touch-sensitive surface (e.g., Touch Screen 112) is optionally used as a fingerprint sensor instead of, or in addition to, a separate fingerprint sensor (e.g., Fingerprint Sensors 169-1 or 169-2). In some embodiments, device 100 includes a set of one or more orientation sensors that are used to determine an orientation of a hand on device 100.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A, and/or fingerprint sensors similar to fingerprint sensor(s) 169 described above with reference to FIG. 1A). Additionally, in implementations where the touch-sensitive surface (e.g., Touchpad 355) has a spatial resolution that is high enough to detect fingerprint features formed by individual fingerprint ridges, the touch-sensitive surface (e.g., Touchpad 355) is optionally used as a fingerprint sensor instead of, or in addition to, a separate fingerprint sensor (e.g., one of sensors 359). In some embodiments, device 300 includes a set of one or more orientation sensors that are used to determine an orientation of a finger or hand on or proximate to the device (e.g., an orientation of a finger that is over fingerprint sensor 169). Additionally, in some embodiments, the set of one or more orientation sensors are used in addition to or instead of a fingerprint sensor to detect rotation of a contact that is interacting with the device. For example, in one or more of the methods described below, instead of using a fingerprint sensor to detect rotation of a fingerprint/contact, the set of one or more orientation sensors is used to detect rotation of the contact that includes the fingerprint, with or without detecting features of the fingerprint.

Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
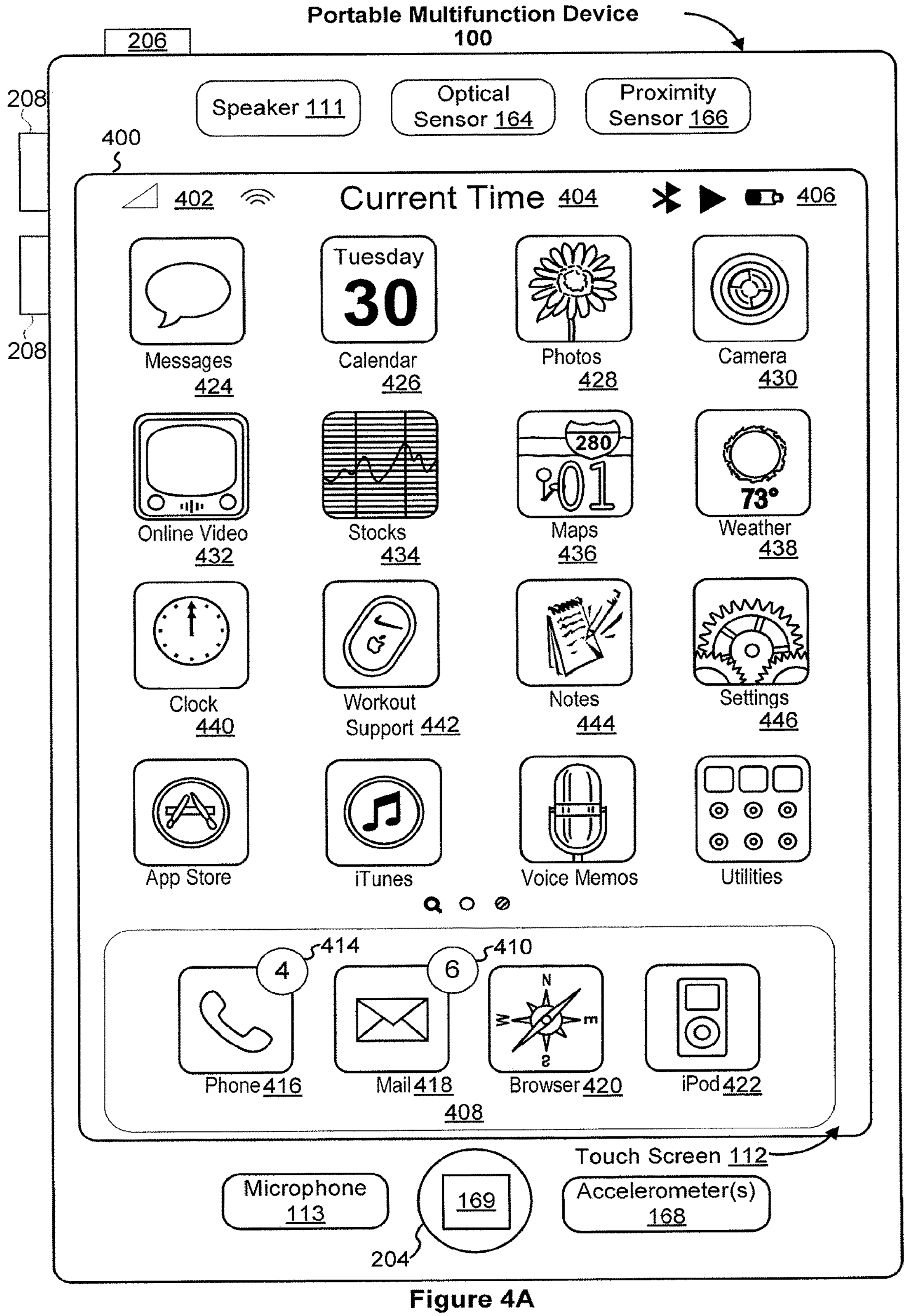
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and Icons for other applications, such as:
Icon 424 for IM module 141, labeled "Text;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video"
Icon 434 for stocks widget 149-2, labeled "Stocks;"
Icon 436 for map module 154, labeled "Map;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
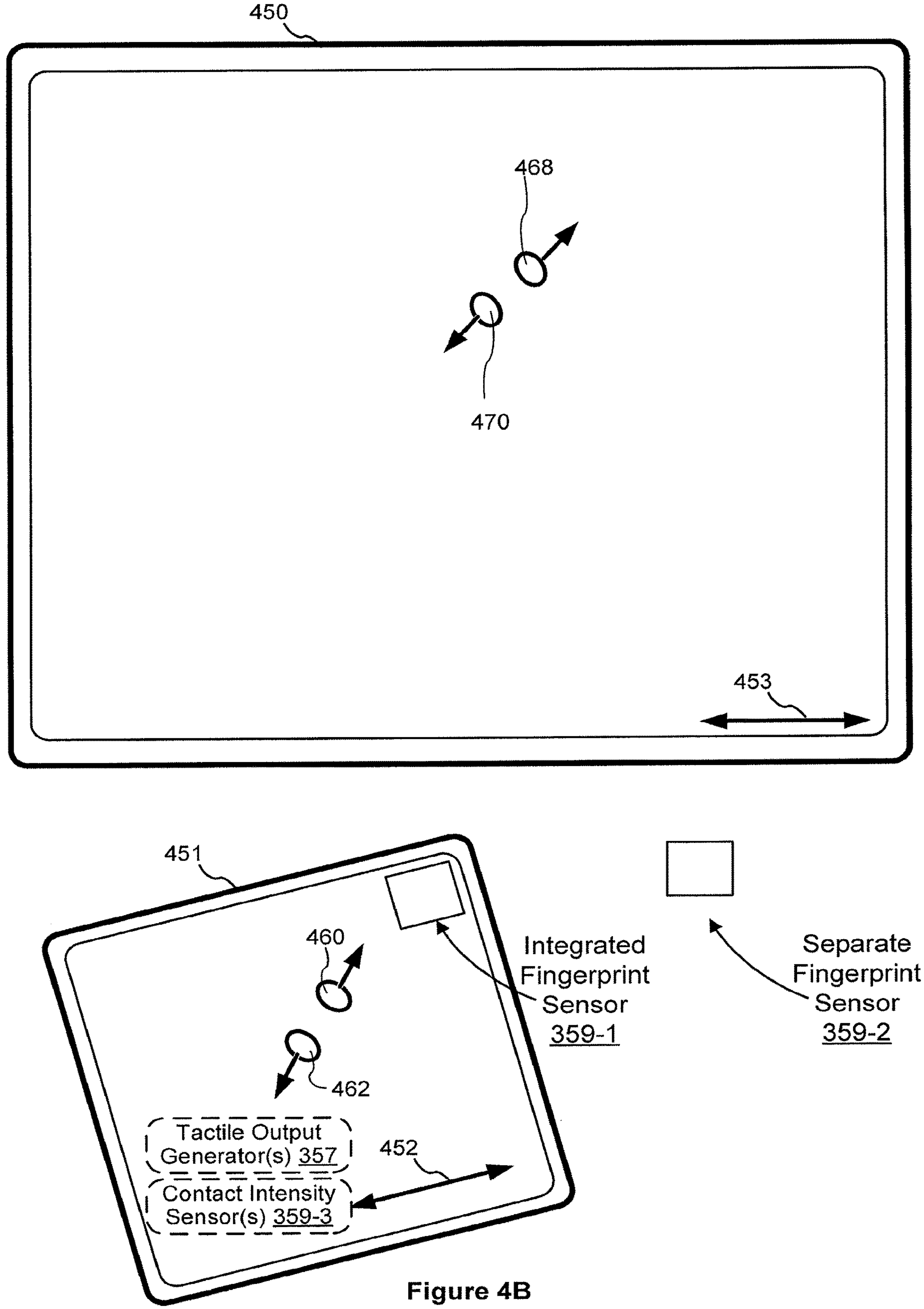
FIG. 4B illustrates an exemplary user interface for a multifunction device with a fingerprint sensor and a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112) with an integrated 359-1 (or separate 359-2) fingerprint sensor (e.g., one or more of sensors 359 that operates in an analogous manner to fingerprint sensor 169 in FIG. 1A). Additionally, in implementations where the touch-sensitive surface 451 has a spatial resolution that is high enough to detect fingerprint features formed by individual fingerprint ridges, the touch-sensitive surface 451 is optionally used as a fingerprint sensor instead of, or in addition to, a distinct fingerprint sensor (e.g., integrated fingerprint sensor 359-1 or separate fingerprint sensor 359-2). Device 300 also, optionally, includes one or more contact intensity sensors (e.g., one or more of sensors 359-3) for detecting intensity of contacts on touch-sensitive surface 451 and/or one or more tactile output generators 357 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

Figure 4C:
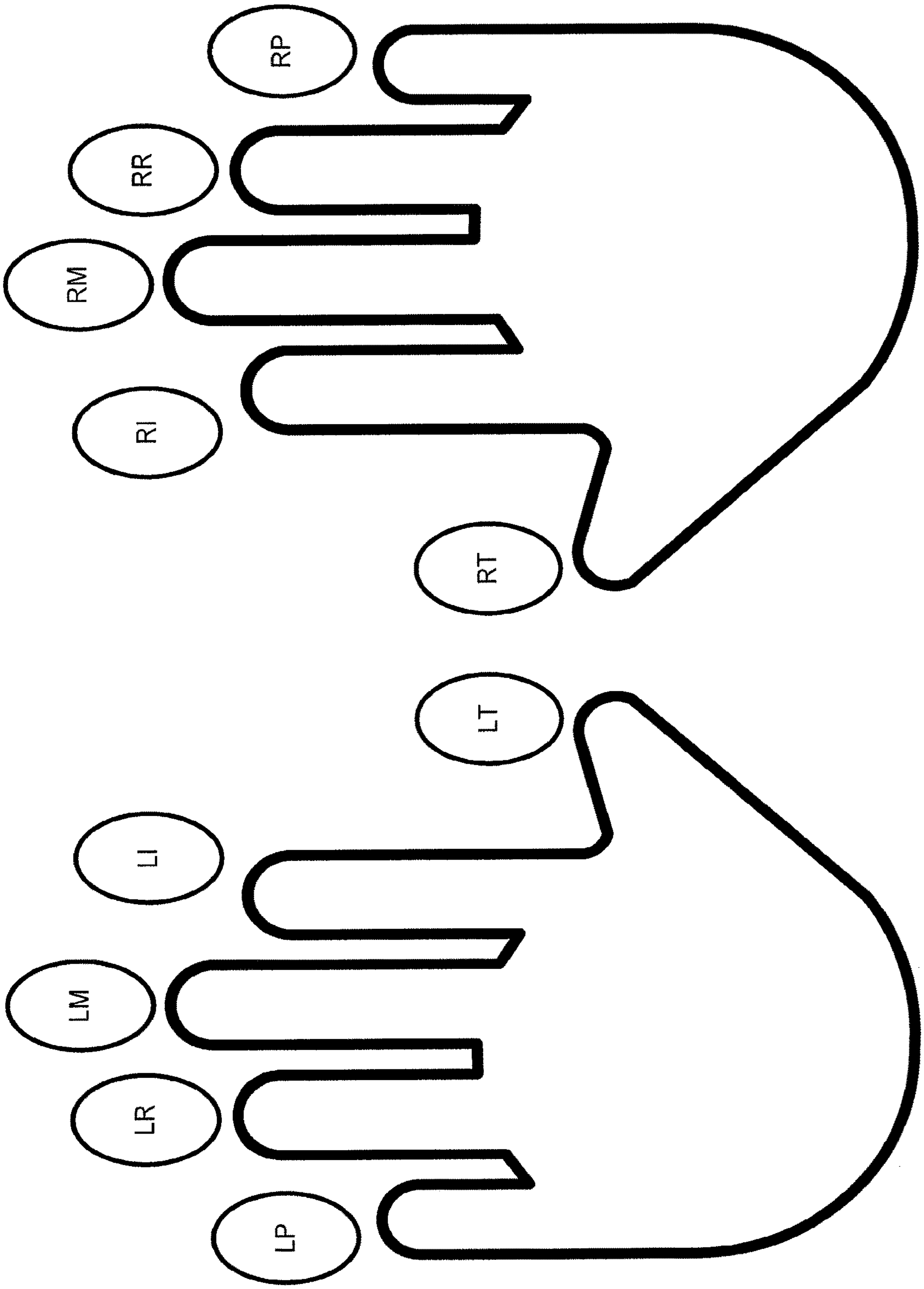
FIG. 4C illustrates a schematic representation of a two hands with associated fingerprints in accordance with some embodiments.

FIG. 4C shows a schematic representation of a two hands with associated fingerprints LP ("left pinky" fingerprint), LR ("left ring" fingerprint), LM ("left middle" fingerprint), LI ("left index" fingerprint), LT ("left thumb" fingerprint), RT ("right thumb" fingerprint), RI ("right index" fingerprint), RM ("right middle" fingerprint), RR ("right ring" fingerprint), RP ("right pinky" fingerprint). These abbreviations will be used with reference to other figures showing examples of interactions with a fingerprint sensor. For some of the methods described herein, one or more fingerprints of a user are registered by collecting information about the fingerprint that would enable the fingerprint to be identified. These registered fingerprints or pre-registered fingerprints are also sometimes referred to as enrolled fingerprints. In many situations described below, fingerprints detected on a fingerprint sensor are compared against previously registered fingerprints (e.g., enrolled fingerprints).

Figure 4D:
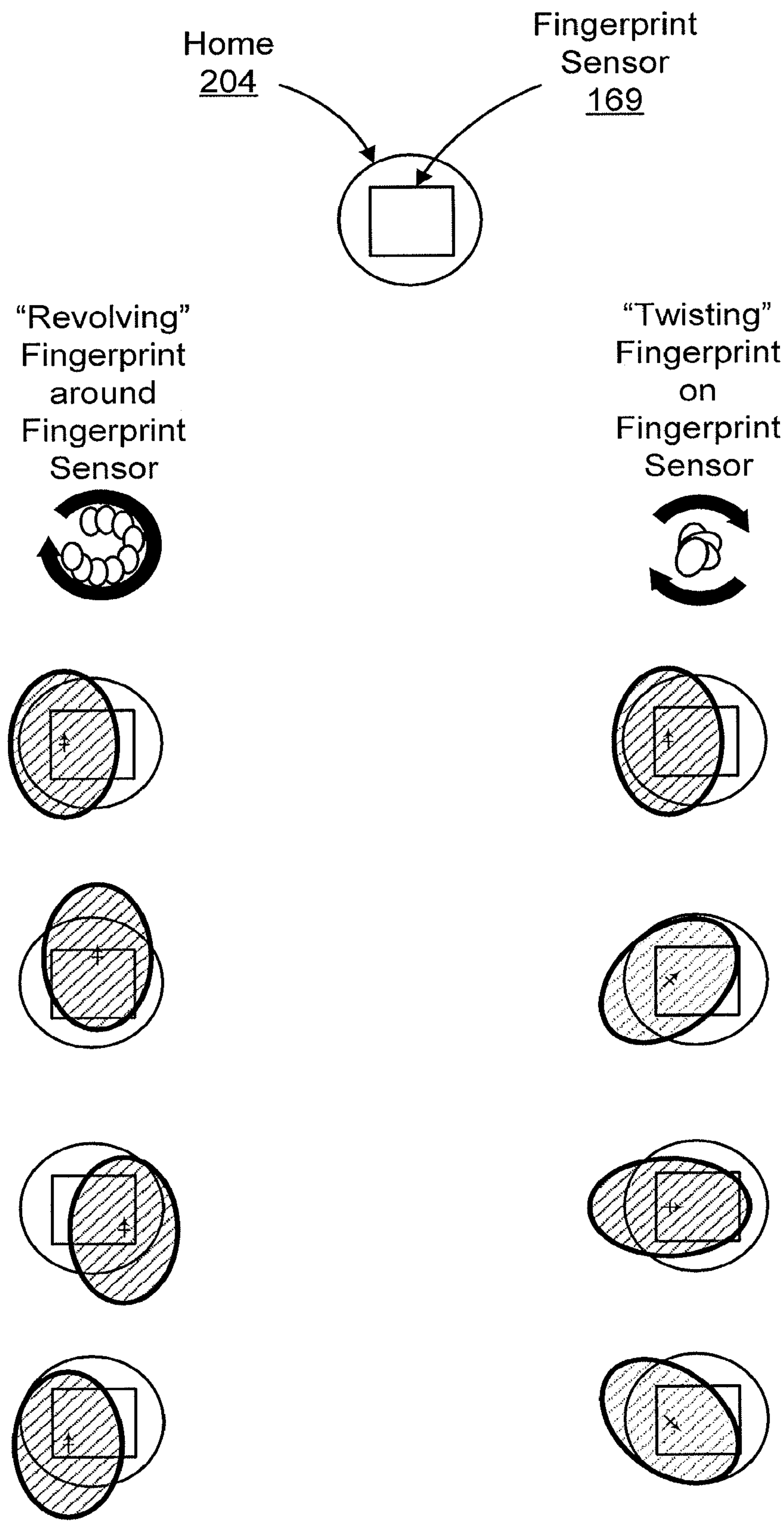
FIG. 4D illustrates different types of rotation of a fingerprint on a fingerprint sensor in accordance with some embodiments.

FIG. 4D shows two different types of rotation of a fingerprint on a fingerprint sensor (e.g., fingerprint sensor 169 that is integrated into button 204). On the left side of FIG. 4D, is an example of a fingerprint "revolving" around a fingerprint sensor, where a centroid of the fingerprint moves in a looping motion (e.g., a circular-type motion) around a center of the fingerprint sensor. On the right side of FIG. 4D, is an example of a fingerprint "twisting" on a fingerprint sensor, where a primary axis of the fingerprint changes orientation relative to the fingerprint sensor. These terms (e.g., "revolving" and "twisting") will be used to described different types of rotation of a fingerprint on a fingerprint sensor with reference to other figures showing examples of interactions with a fingerprint sensor.

As shown in FIG. 4D, in some embodiments, the fingerprint sensor is smaller than, or approximately the same size as, an average fingerprint. Thus, in some embodiments, the fingerprint sensor detects movement of the fingerprint (e.g., fingerprint gestures) by detecting movement of fingerprint features of the fingerprint instead of or in addition to detecting movement of edges of the fingerprint. In other words, in some implementations, the fingerprint sensor detects movement of the fingerprint not by determining movement of an outline of the fingerprint (e.g., a "contact") but by detecting movement of ridges (or specific minutia points in the ridges) of the fingerprint over the fingerprint sensor. Without regard to whether the fingerprint sensor is larger or smaller than the fingerprint, detecting movement of a fingerprint (e.g., fingerprint gestures) based on movement of fingerprint features instead of, or in addition to, detecting movement of the fingerprint based on movement of an edge or outline of the fingerprint enables movement of the fingerprint to be tracked in much greater detail and provides the ability to track fingerprint movement even when a fingerprint is covering all or a large portion of the fingerprint sensor.

User Interfaces and Associated Processes

Enrolling Fingerprints with a Device

Many electronic devices provide a method to unlock the device. For example, a user is required enter a passcode or personal identification number (PIN), perform a swipe gesture in a predefined pattern, or slide an affordance to unlock the device to access private user information and applications. However, with the increased penetration of e-commerce and mobile purchasing, greater security is required to unlock a device. The device described below improves on existing methods by enrolling a fingerprint of a respective finger with a device after collecting fingerprint information from a plurality of separate and distinct stationary finger gestures. In turn, the device performs restricted operations (e.g., unlocking the device or mobile purchasing) when a detected fingerprint matches an enrolled fingerprint.

The device displays a fingerprint enrollment interface and detects on a fingerprint sensor a plurality of separate and distinct stationary finger gestures performed with a respective finger. The device collects fingerprint information from the plurality of separate and distinct stationary finger gestures performed with the respective finger. After collecting the fingerprint information, the device determines, based on fingerprint information collected for the respective finger, whether the fingerprint information that has been collected is sufficient to enroll a fingerprint of the respective finger with the device. In accordance with a determination that the fingerprint information that has been collected for the respective finger is sufficient to enroll the fingerprint of the respective finger, the device enrolls the fingerprint of the respective finger with the device. In accordance with a determination that the fingerprint information that has been collected for the respective finger is not sufficient to enroll the fingerprint of the respective finger, the device displays a message in the fingerprint enrollment interface prompting a user to perform one or more additional stationary finger gestures on the fingerprint sensor with the respective finger.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 5A-5EE and 6A-6D includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 5A-5EE and 6A-6D will be discussed with reference to a device with a touch screen 112 and a separate fingerprint sensor 359-2, however analogous operations are, optionally, performed on a device with an integrated fingerprint sensor 359-1 in response to detecting the inputs described in FIGS. 5A-5EE on the integrated fingerprint sensor 359-1 while displaying the user interfaces shown in FIGS. 5A-5EE on the display 450. Additionally, analogous operations are, optionally, performed on a device with a display 450 and a separate touch-sensitive surface 451 instead of a touch screen 112 in response to detecting the contacts described in FIGS. 5A-5EE on a fingerprint sensor 169 (e.g., an integrated fingerprint sensor 359-1 or a separate fingerprint sensor 359-2) and/or the separate touch-sensitive surface 451 while displaying the user interfaces shown in FIGS. 5A-5EE on the display 450; in such embodiments, the contacts shown in FIGS. 5A-5EE optionally represent both a focus selector that corresponds to a location on the display 450, and a contact that corresponds to a location of a contact or gesture performed on the separate touch-sensitive surface (e.g., touch-sensitive surface 451), where the focus selector is, optionally: a respective contact, a representative point corresponding to a contact (e.g., a centroid of a respective contact or a point associated with a respective contact), or a centroid of two or more contacts detected on the touch screen 112 and is, optionally, replaced with a displayed cursor.

FIGS. 5A-5M illustrate a portion of a device setup process in which a first fingerprint is enrolled with portable multifunction device 100.

Figure 5A:
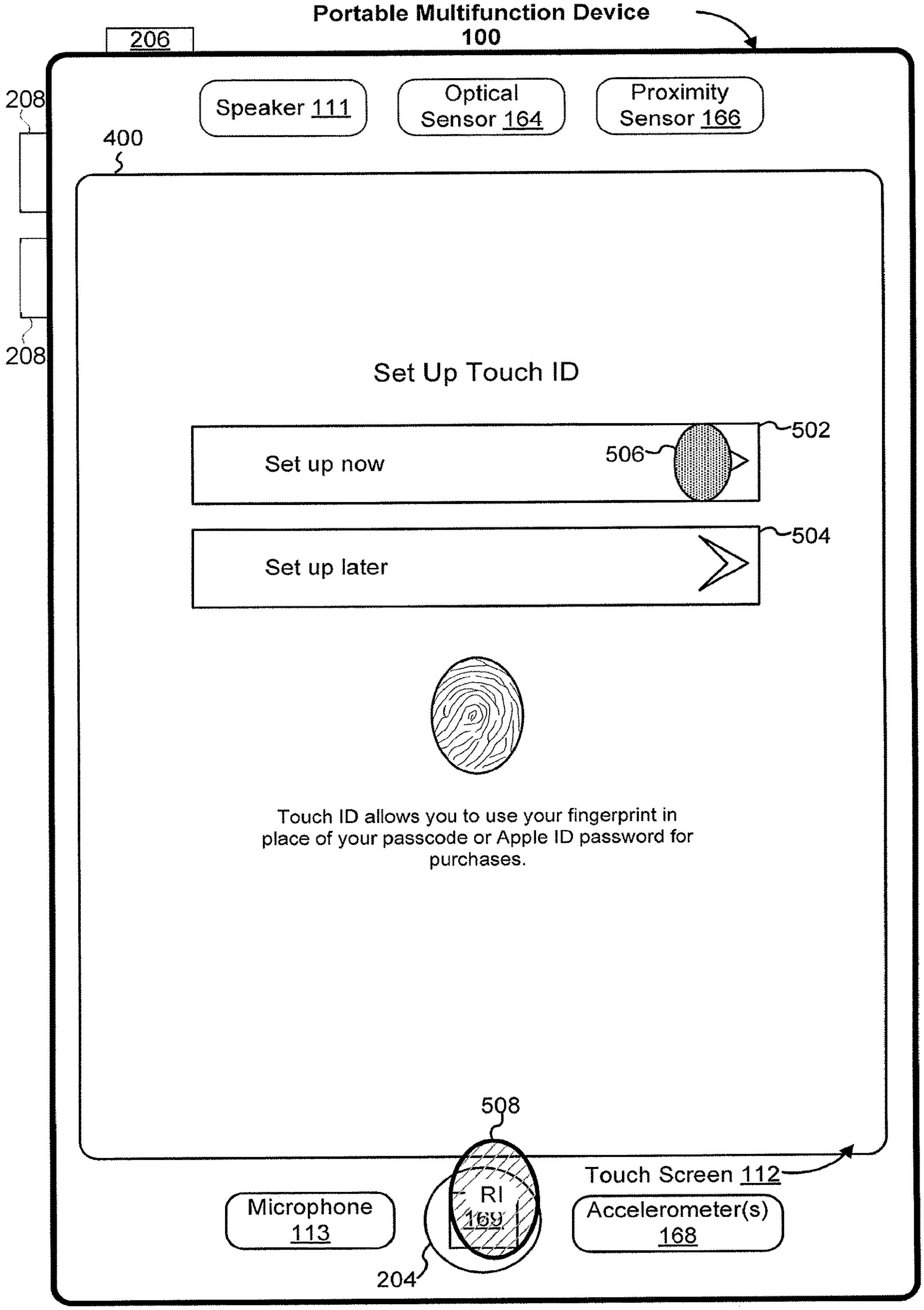
FIGS. 5A-5EE illustrate exemplary user interfaces for enrolling fingerprints with a device in accordance with some embodiments.

FIG. 5A illustrates portable multifunction device 100 (sometimes herein called device 100) displaying user interface 400 on touch screen 112. In FIG. 5A, user interface 400 includes a "Set Up Touch ID" interface prompting a user to enroll a fingerprint to serve as the user's touch ID. The enrolled fingerprint (e.g., touch ID) can be used to unlock the device in place of a passcode or personal identification number (PIN) and, optionally, to purchase goods or services. In FIG. 5A, the "Set Up Touch ID" interface is displayed during a device set up process. For example, the device set up process occurs when a user powers on the device for a first time. For example, the device set up process at least includes an, optional, fingerprint enrollment process (e.g., shown in FIGS. 5B-5K and FIGS. 5N-5T) and a passcode set up process (e.g., shown in FIG. 5M). The "Set Up Touch ID" interface includes "Set up now" box 502, which, when activated, causes device 100 to start a fingerprint enrollment process and a "Set up later" box 504, which, when activated, causes device 100 to skip the fingerprint enrollment process and display a passcode set up interface (e.g., shown in FIG. 5M). For example, "Set up now" box 502 is activated when a contact (e.g., touch input or tap gesture) is detected at a location inside of or on "Set up now" box 502 or a fingerprint is detected on fingerprint sensor 169. For example, "Set up later" box 504 is activated when a touch input is detected at a location inside of or on "Set up later" box 504. FIG. 5A also illustrates device 100 detecting contact 506 (e.g., a tap gesture) at a location on touch screen 112 that corresponds to "Set up now" box 502. Alternatively, FIG. 5A illustrates device 100 detecting fingerprint 508 (e.g., corresponding to a user's right index finger) as part of a first finger gesture (e.g., a first touch and rest gesture) on fingerprint sensor 169 and collecting fingerprint information from the first finger gesture.

Figure 5B:
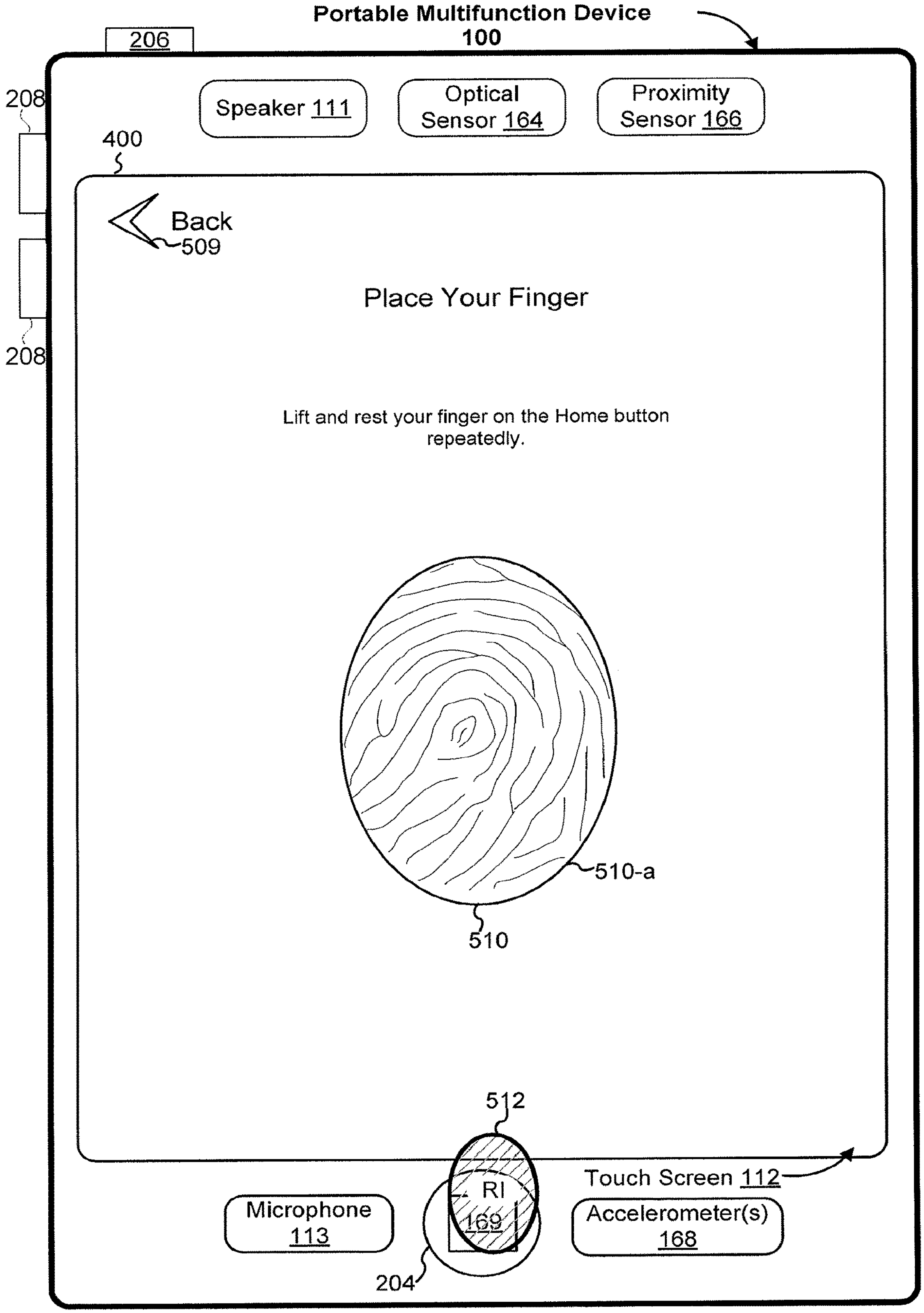

FIG. 5B illustrates device 100 displaying a first fingerprint enrollment interface for the fingerprint enrollment process on touch screen 112 in response to detecting contact 506 in FIG. 5A. In some embodiments, the fingerprint enrollment process includes at least a first fingerprint enrollment interface (e.g., shown in FIGS. 5B-5G and 5O-5Q) and a second fingerprint enrollment interface (e.g., shown in FIGS. 5H-5J and 5R-5S). In FIG. 5B, the first fingerprint enrollment interface includes instructions prompting the user to perform a plurality of separate and distinct stationary finger gestures with a respective finger on fingerprint sensor 169 so as to enroll the fingerprint of the respective finger. In FIG. 5B, the first fingerprint enrollment interface also includes a progress indicator 510 in a first state 510-*a*. For example, in first state 510-*a*, progress indicator 510 resembles a faux fingerprint with narrow ridges. First state 510-*a* indicates that no fingerprint information has been collected. FIG. 5B also illustrates "Back" affordance 509, which, when activated, causes device 100 to redisplay the "Set Up Touch ID" interface in FIG. 5A. FIG. 5B further illustrates device 100 detecting fingerprint 512 (e.g., corresponding to the user's right index finger) as part of a first finger gesture (e.g., a first touch and rest gesture) on fingerprint sensor 169 and collecting fingerprint information from the first finger gesture.

Figure 5C:
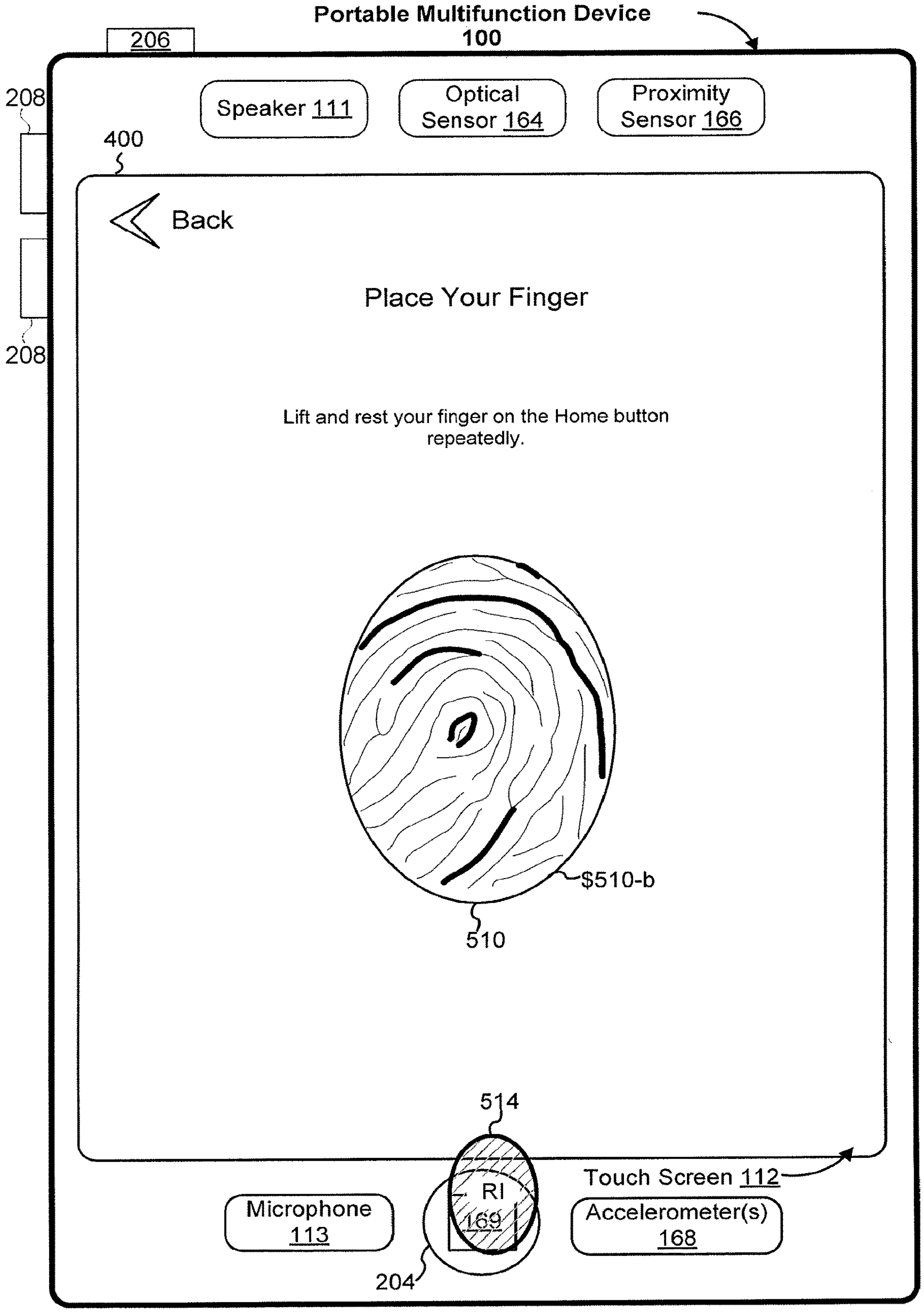

FIG. 5C illustrates device 100 changing an appearance of progress indicator 510 in response to detecting the first finger gesture. For example, the first finger gesture corresponds to fingerprint 508 in FIG. 5A or, alternatively, fingerprint 512 in FIG. 5B. In FIG. 5C, device 100 displays progress indicator 510 in second state 510-*b*. In FIG. 5C, at least a portion of the ridges of progress indicator 510 are thickened (or darkened) in second state 510-*b* as compared to first state 510-*a* in FIG. 5B. Second state 510-*b* of progress indicator 510 indicates that some fingerprint information has been collected but one or more additional finger gestures are required to enroll the first fingerprint (e.g., the fingerprint corresponding to the user's right index finger). FIG. 5C also illustrates device 100 detecting fingerprint 514 (e.g., corresponding to the user's right index finger) as part of a second finger gesture (e.g., a second touch and rest gesture) on fingerprint sensor 169 and collecting fingerprint information from the second finger gesture.

Figure 5D:
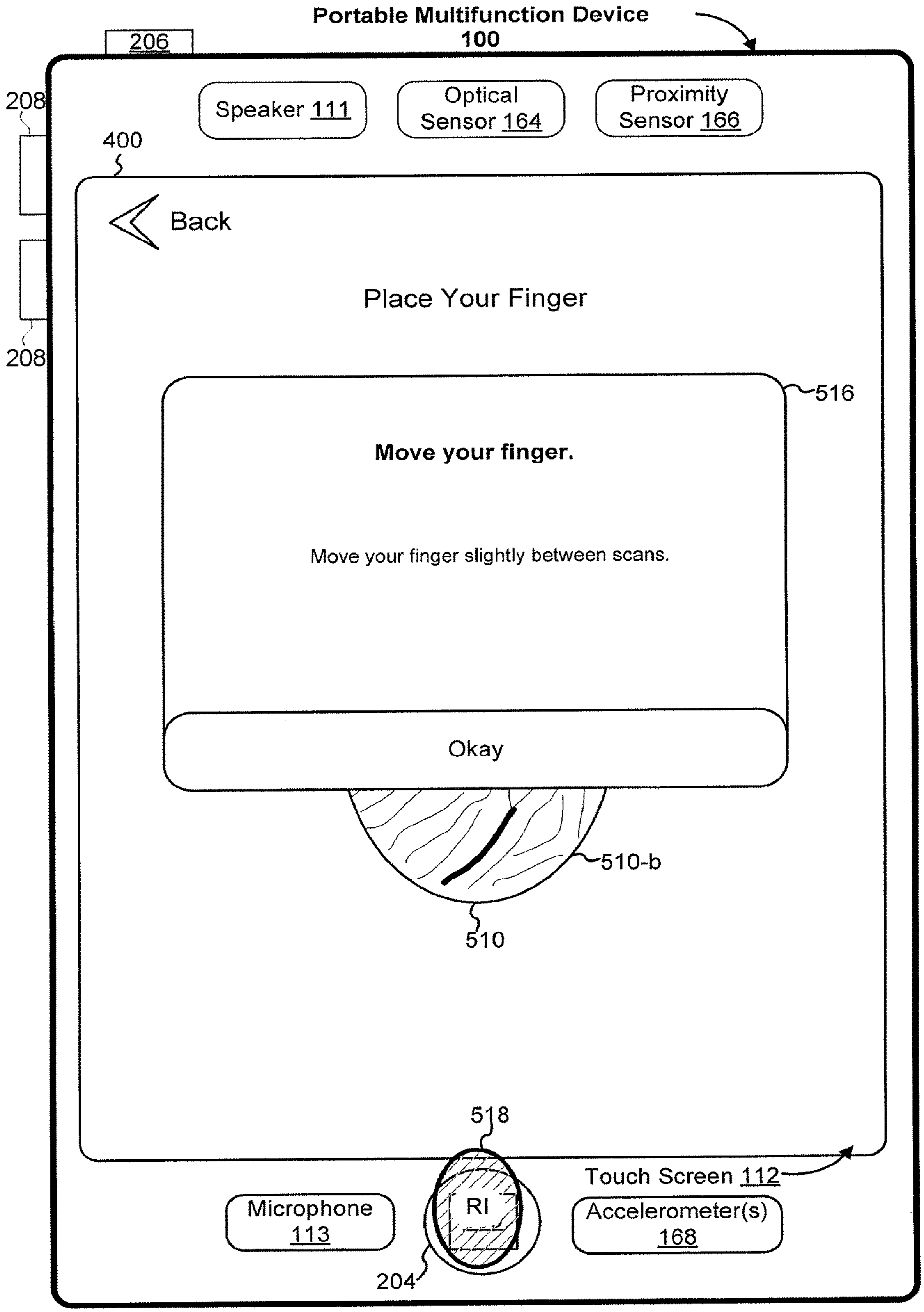

FIG. 5D illustrates device 100 displaying a message on touch screen 112 prompting a user to perform subsequent finger gestures differently from the second finger gesture detected in FIG. 5C. In FIG. 5D, device 100 displays message 516 the first enrollment interface (including progress indicator 510 in second state 510-*b*) on touch screen 112 in response to detecting the second finger gesture in FIG. 5C. In FIG. 5D, message 516 includes instructions directing the user to move the respective finger more between each finger gesture so as to collect fingerprint information corresponding to different regions of the fingerprint of the respective finger. In some embodiments, message 516 is dismissed and the fingerprint enrollment process is resumed when either a contact is detected at a location corresponding to the "Okay" affordance in message 516 or a subsequent finger gesture is detected on fingerprint sensor 169. FIG. 5D also illustrates device 100 detecting fingerprint 518 (e.g., corresponding to the user's right index finger) as part of a third finger gesture (e.g., a third touch and rest gesture) on fingerprint sensor 169 and collecting fingerprint information from the third finger gesture.

Figure 5E:
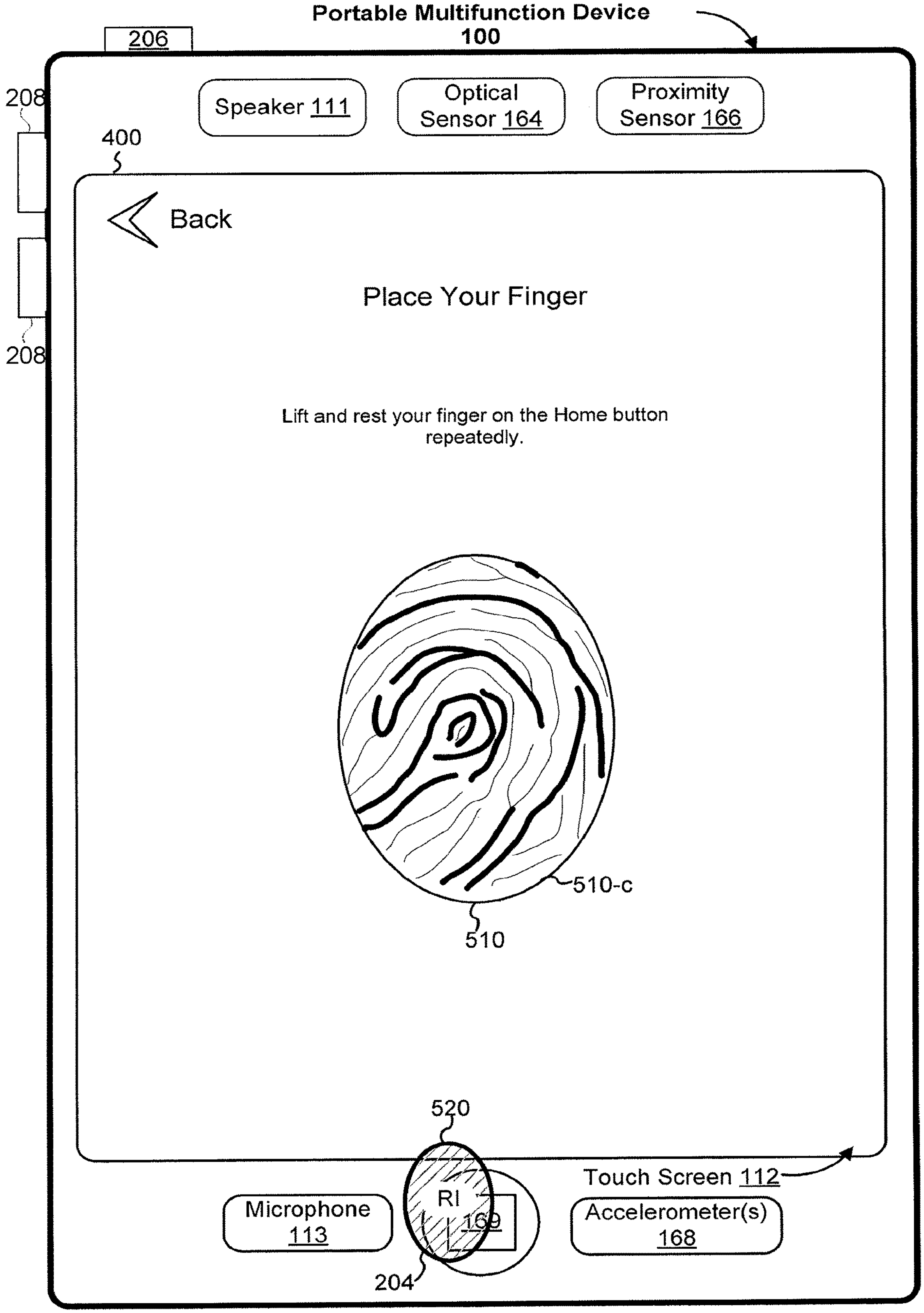

FIG. 5E illustrates device 100 changing an appearance of progress indicator 510 in response to detecting the third finger gesture in FIG. 5D. In FIG. 5E, device 100 displays progress indicator 510 in third state 510-*c*. In FIG. 5E, a greater amount of the ridges of progress indicator 510 are thickened in third state 510-*c* as compared to second state 510-*b* in FIG. 5B. Third state 510-*c* of progress indicator 510 indicates that more fingerprint information has been collected but one or more additional finger gestures are required to enroll the first fingerprint (e.g., the fingerprint corresponding to the user's right index finger). FIG. 5E also illustrates device 100 detecting fingerprint 520 (e.g., corresponding to the user's right index finger) as part of a fourth finger gesture (e.g., a fourth touch and rest gesture) on fingerprint sensor 169 and collecting fingerprint information from the fourth finger gesture.

Figure 5F:
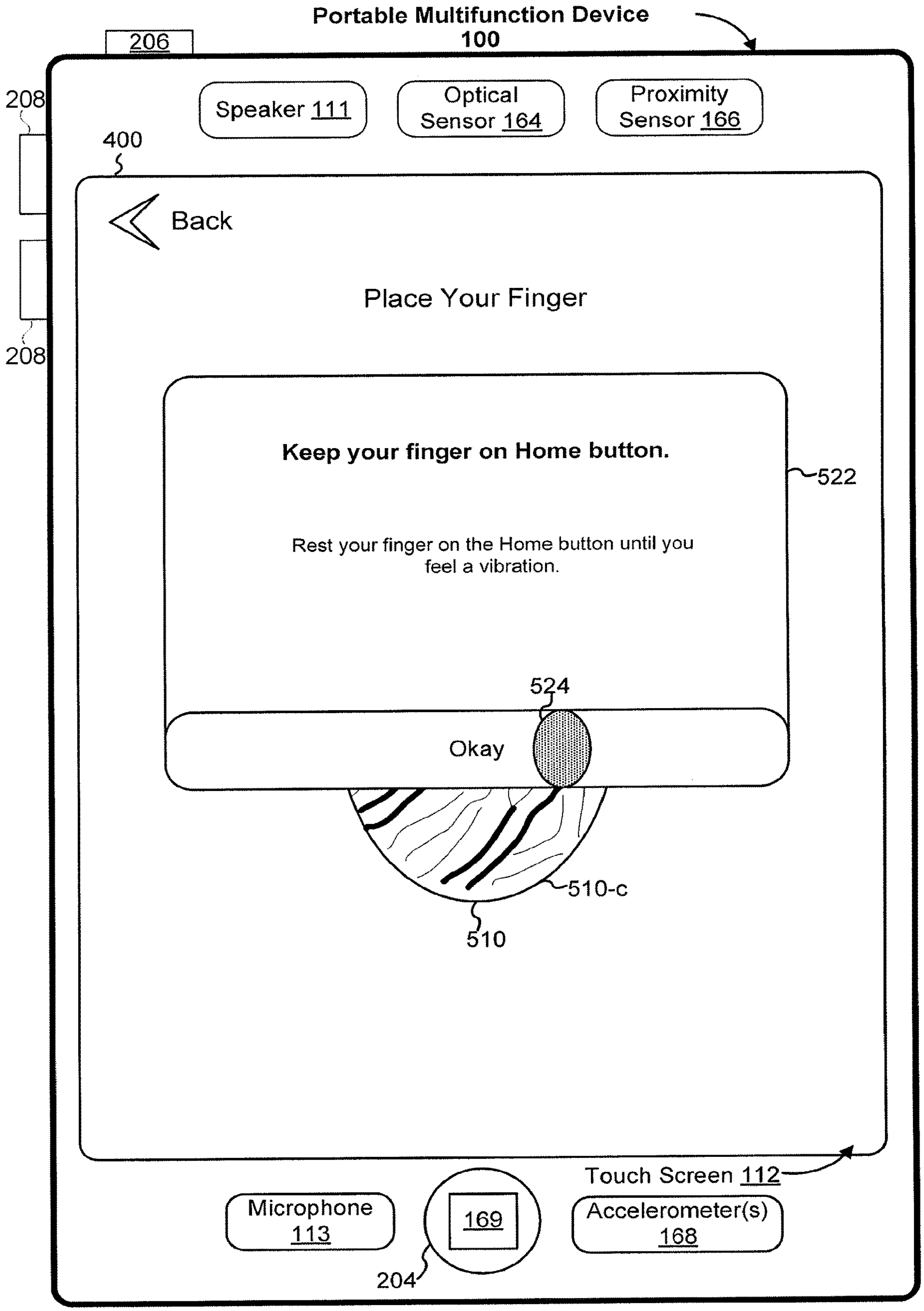

FIG. 5F illustrates device 100 displaying a message on touch screen 112 prompting a user to perform subsequent finger gestures differently from the fourth finger gesture detected in FIG. 5E. In FIG. 5F, device 100 displays message 522 over the first enrollment interface (including progress indicator 510 in third state 510-*c*) on touch screen 112 in response to detecting the fourth finger gesture in FIG. 5E. In FIG. 5F, message 522 includes instructions directing the user keep their finger on fingerprint sensor 169 for a longer period of time so as to collect fingerprint information. In some embodiments, message 522 includes instructions indicating that the user will feel a vibration that signals when the user can lift their finger from fingerprint sensor 169. In some embodiments, message 522 is dismissed and the fingerprint enrollment process is resumed when either a contact is detected at a location corresponding to the "Okay" affordance in message 522 or a subsequent finger gesture is detected on fingerprint sensor 169. FIG. 5F also illustrates device 100 detecting contact 524 at a location on touch screen 112 that corresponds to the -Okay" affordance in message 522.

Figure 5G:
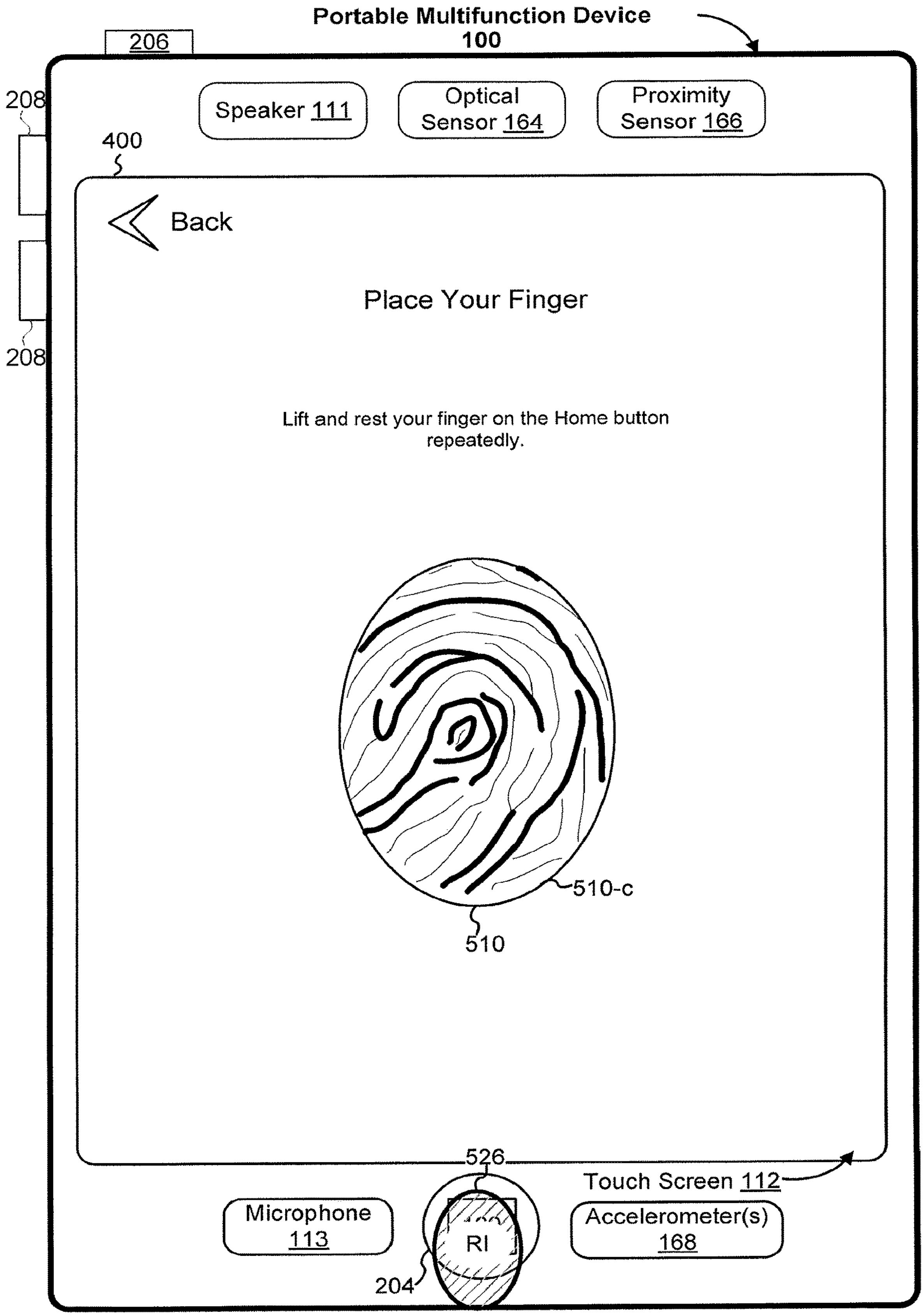

FIG. 5G illustrates device 100 displaying the first fingerprint enrollment interface with progress indicator 510 in third state 510-*c* in response to detecting contact 524 in FIG. 5F. FIG. 5G also illustrates device 100 detecting fingerprint 526 (e.g., corresponding to the user's right index finger) as part of a fifth finger gesture (e.g., a fifth touch and rest gesture) on fingerprint sensor 169 and collecting fingerprint information from the fifth finger gesture.

Figure 5H:
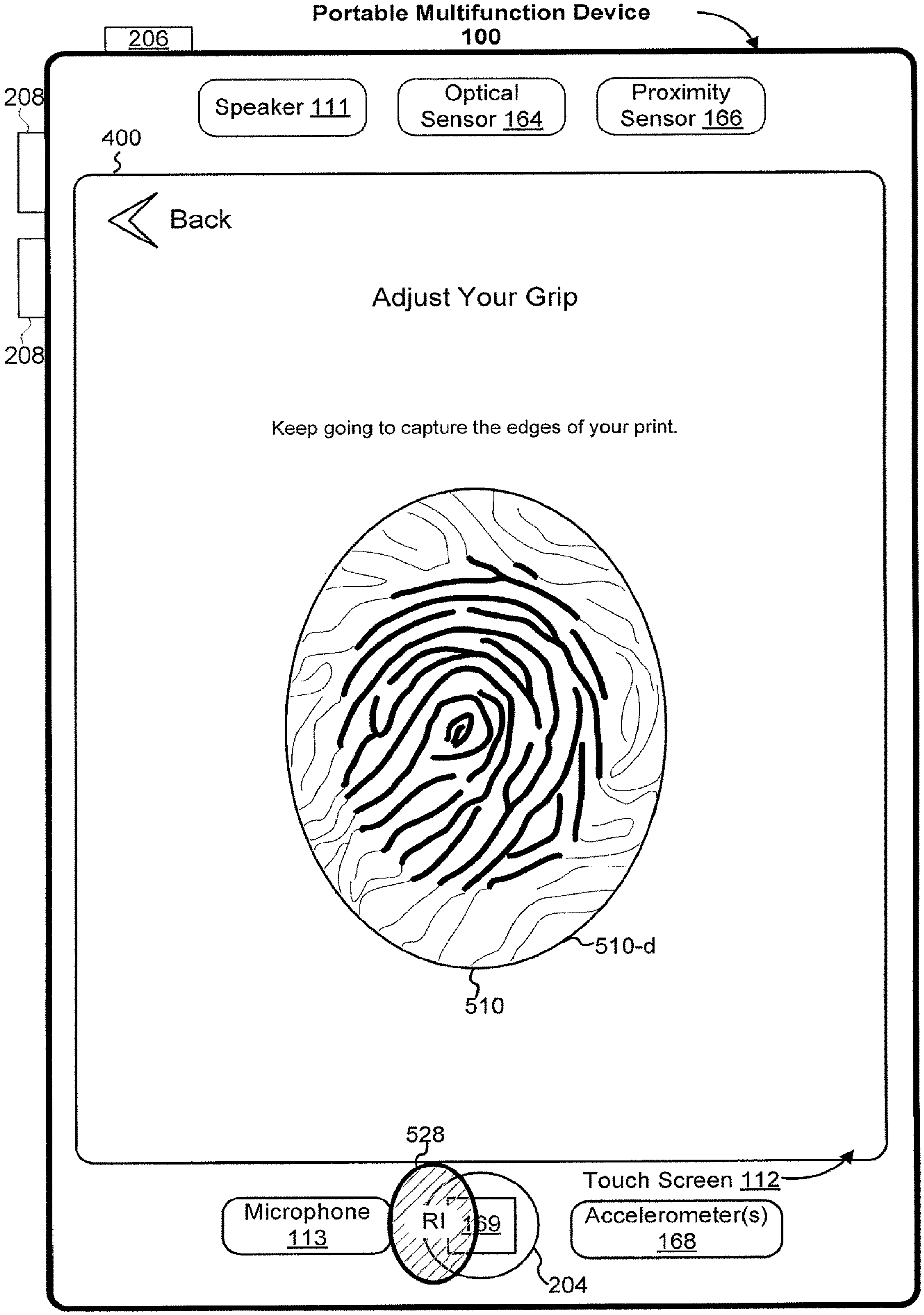

FIG. 5H illustrates device 100 displaying a second fingerprint enrollment interface for the fingerprint enrollment process on touch screen 112 and changing an appearance of progress indicator 510 in response to detecting the fifth finger gesture in FIG. 5G. In FIG. 5H, the second fingerprint enrollment interface includes instructions prompting the user to perform one or more additional separate and distinct stationary finger gestures with the respective finger (e.g., the user's right index finger) on fingerprint sensor 169 so as gather fingerprint information for regions of the fingerprint of the respective finger (e.g., the edges) that are missing from the previously collected fingerprint information in order to complete enrollment of the first fingerprint (e.g., corresponding to the user's right index finger). In FIG. 5H, device 100 displays progress indicator 510 in fourth state 510-*d*. In FIG. 5H, progress indicator 510 is expanded in fourth state 510-*d* to reveal a larger perimeter oval of narrow ridges surrounding an inner region of thickened ridges. In FIG. 5H, the inner region of progress indicator 510 corresponds to un-expanded progress indicator 510 included in the first enrollment interface displayed in FIGS. 5B-5G. In this example, a greater amount of the ridges of the inner region of progress indicator 510 are thickened in fourth state 510-*d* as compared to third state 510-*c* in FIG. 5G. Fourth state 510-*d* of progress indicator 510 indicates that more fingerprint information has been collected but one or more additional finger gestures are required to enroll the first fingerprint (e.g., the fingerprint corresponding to the user's right index finger). FIG. 5H also illustrates device 100 detecting fingerprint 528 (e.g., corresponding to the user's right index finger) as part of a sixth finger gesture (e.g., a sixth touch and rest gesture) on fingerprint sensor 169 and collecting fingerprint information from the sixth finger gesture.

Figure 5I:
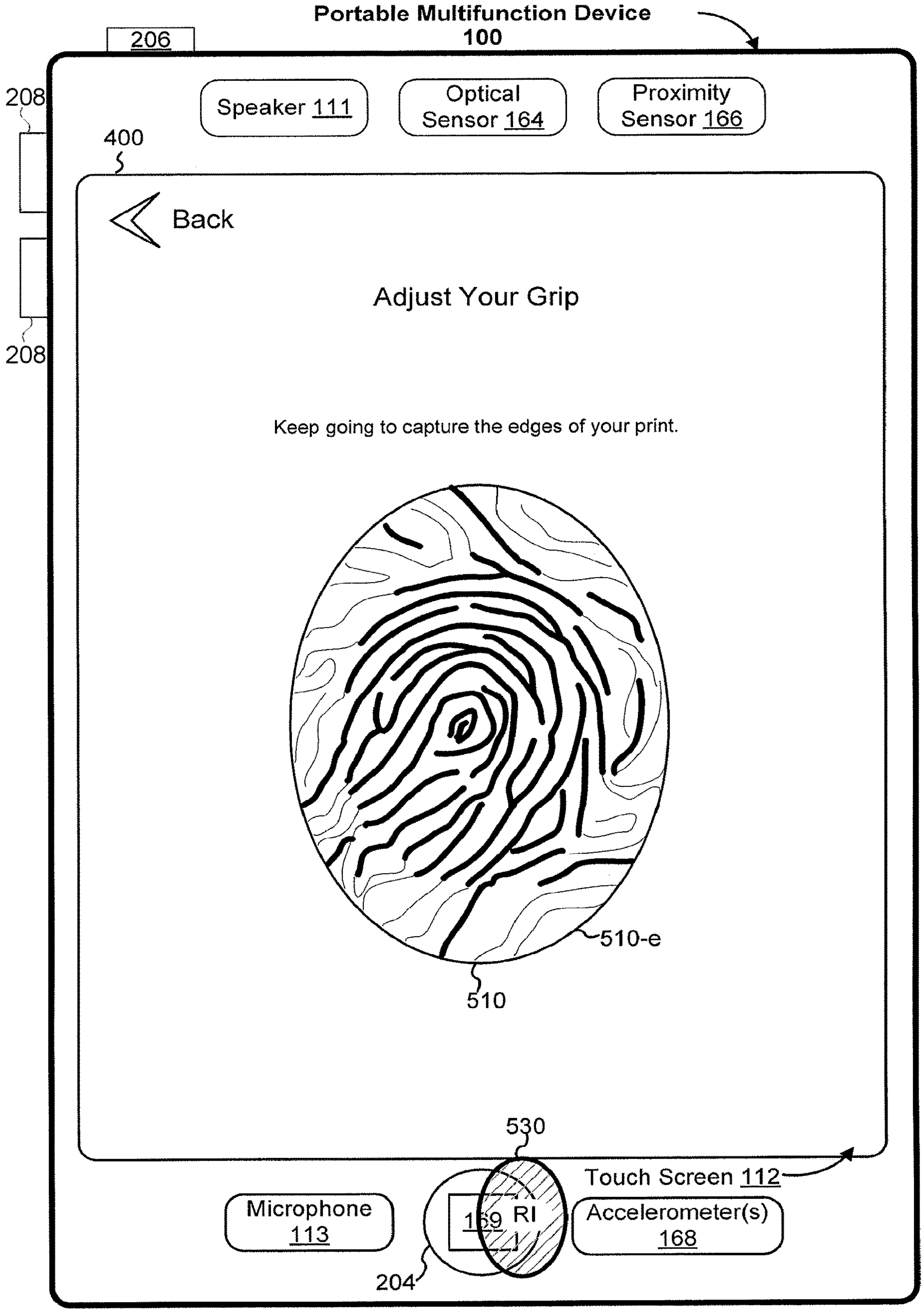

FIG. 5I illustrates device 100 changing an appearance of progress indicator 510 in response to detecting the sixth finger gesture in FIG. 5H. In FIG. 5H, device 100 displays progress indicator 510 in fifth state 510-*e*. In FIG. 5I, a portion of the ridges in the outside perimeter of progress indicator 510 are thickened in fifth state 510-*e* as compared to fourth state 510-*d* in FIG. 5H. Fifth state 510-*e* of progress indicator 510 indicates that more fingerprint information has been collected but one or more additional finger gestures are required to enroll the first fingerprint (e.g., the fingerprint corresponding to the user's right index finger). FIG. 5I also illustrates device 100 detecting fingerprint 530 (e.g., corresponding to the user's right index finger) as part of a seventh finger gesture (e.g., a fourth touch and rest gesture) on fingerprint sensor 169 and collecting fingerprint information from the seventh finger gesture.

Figure 5J:
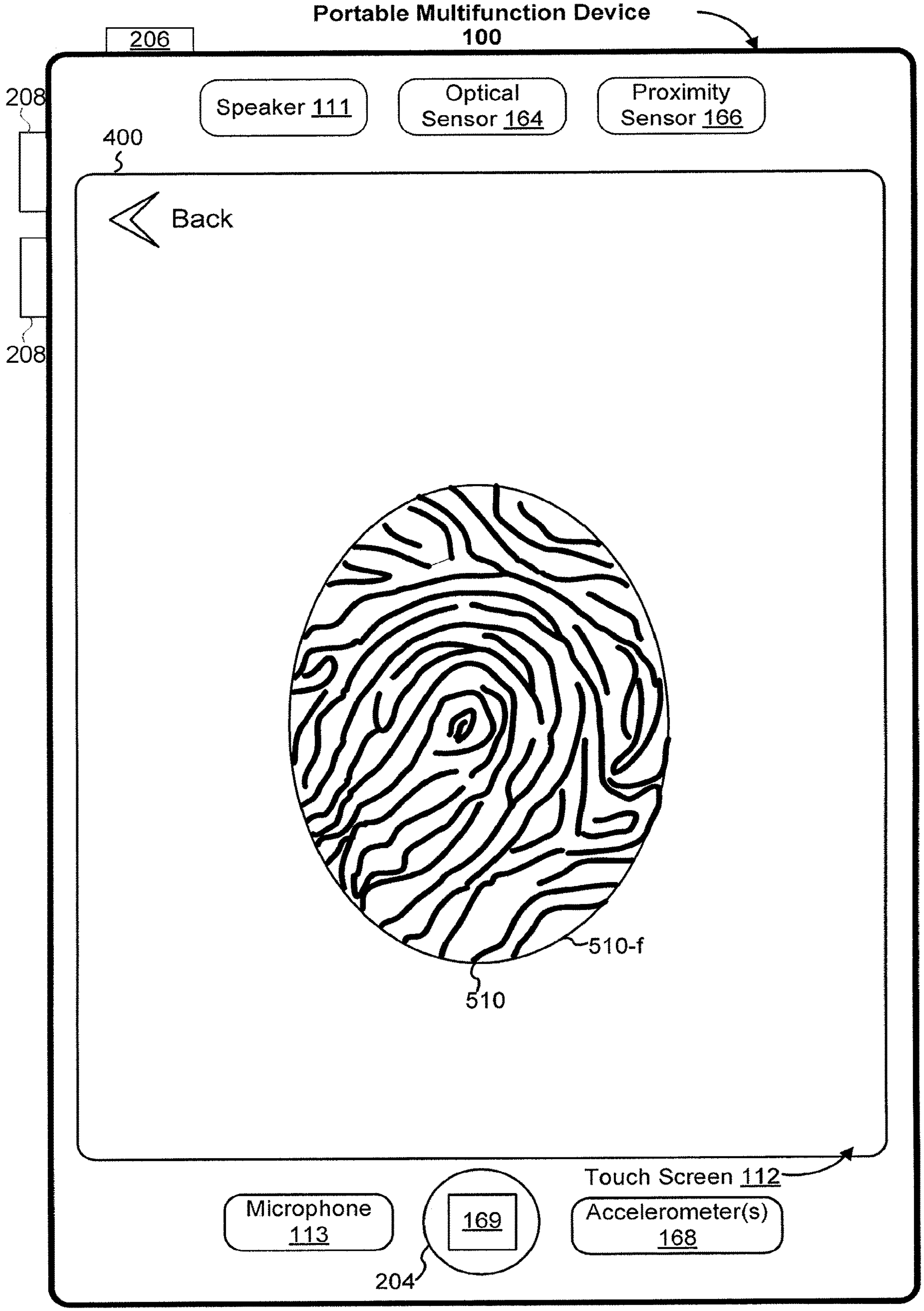

FIG. 5J illustrates device 100 changing an appearance of progress indicator 510 in response to detecting the seventh finger gesture in FIG. 5I. In FIG. 5J, device 100 displays progress indicator 510 in sixth state 510-*f* In FIG. 5J, all of the ridges in the outside perimeter of progress indicator 510 are thickened in sixth state 510-*f*. In this example, sixth state 510-*f* of progress indicator 510 indicates that no additional finger gestures are required to enroll the first fingerprint (e.g., the fingerprint corresponding to the user's right index finger).

Figure 5K:
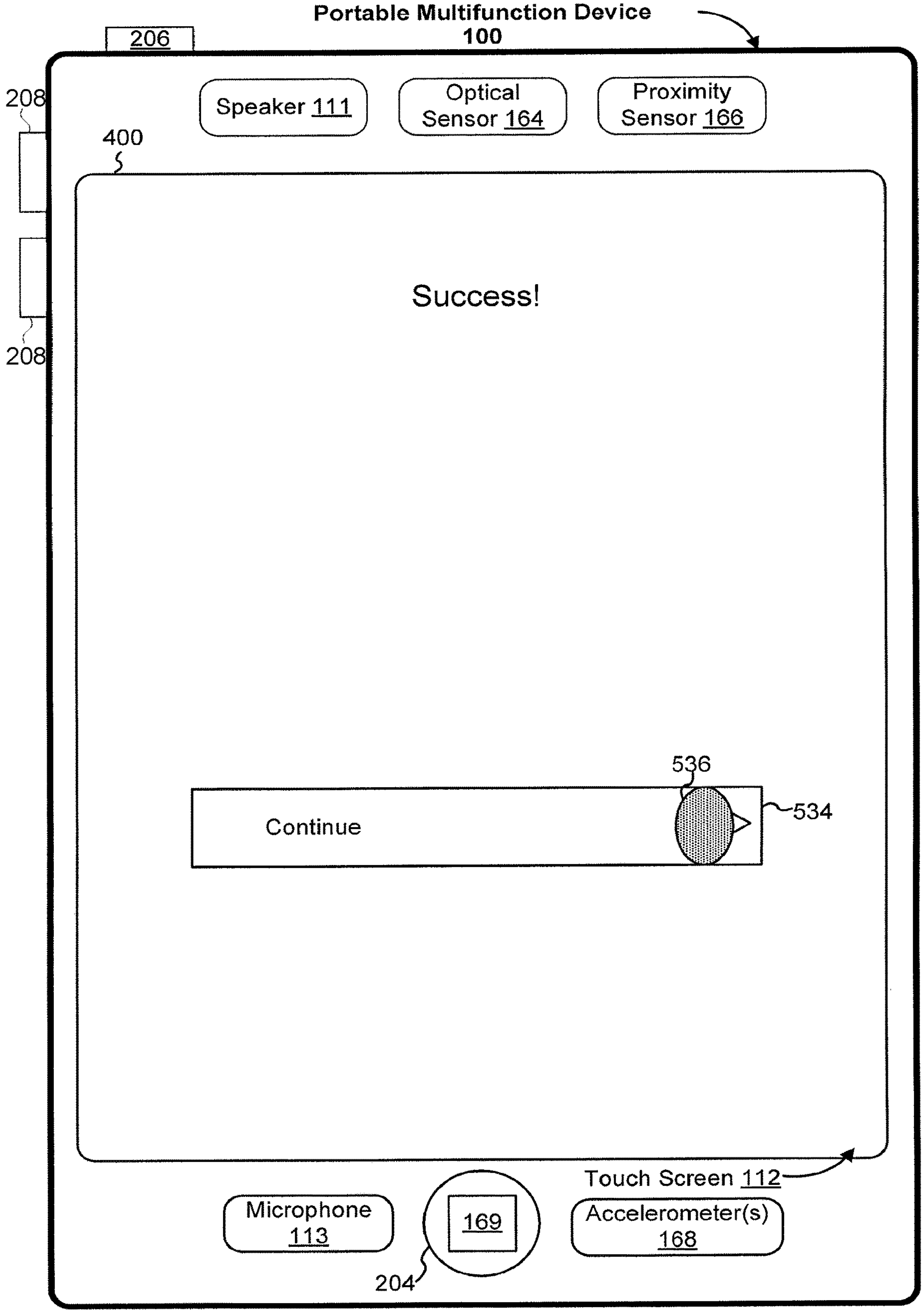

FIG. 5K illustrates device 100 displaying a third fingerprint enrollment interface on touch screen 112 after changing the appearance of progress indicator 510 in FIG. 5J. In FIG. 5K, the third fingerprint enrollment interface indicates that the first fingerprint (e.g., the fingerprint corresponding to the user's right index finger) has been successfully enrolled with device 100. In FIG. 5K, the third fingerprint enrollment interface includes "Continue" box 534, which, when activated, causes device 100 to display an interface for the next step in the device set up process. FIG. 5K also illustrates device 100 detecting contact 536 (e.g., a tap gesture) at a location on touch screen 112 that corresponds to "Continue" box 534.

Figure 5L:
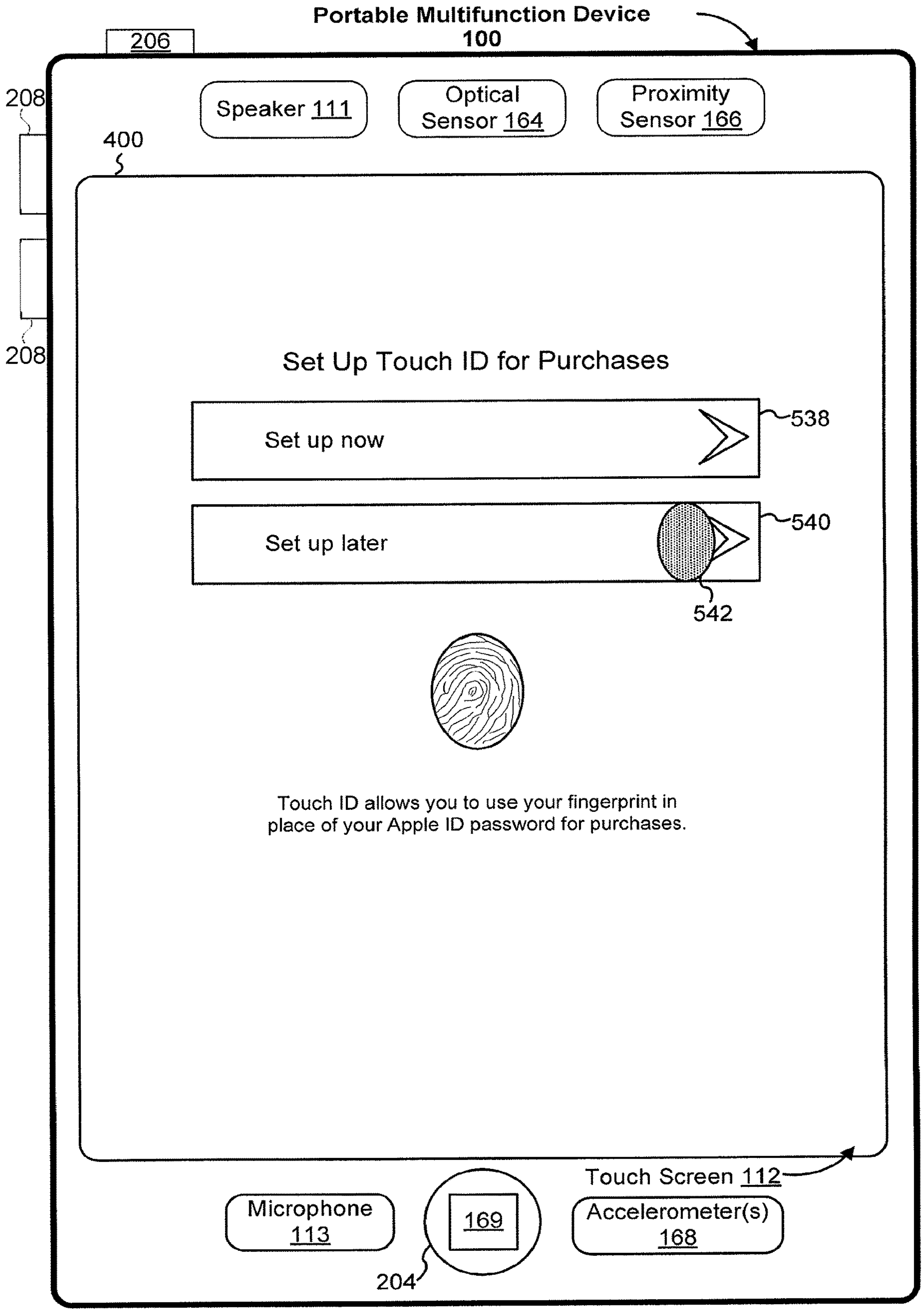

FIG. 5L illustrates device 100 displaying a "Set Up Touch ID for Purchases" interface on touch screen 112 in response to detecting contact 536 in FIG. 5K. The "Set Up Touch ID for Purchases" interface prompts the user to associate the fingerprint enrolled in FIGS. 5B-5K with purchasing credentials (e.g., store login ID and password, credit card information, billing address, etc.). The "Set Up Touch ID for Purchases" interface includes "Set up now" box 538, which, when activated, causes device 100 to start a purchase set up process for associating purchasing credentials with the previously enrolled fingerprint and "Set up later" box 540, which, when activated, causes device 100 to skip the purchase set up process and display a passcode set up interface. For example, "Set up now" box 538 is activated when a touch input is detected at a location inside of or on "Set up later" box 538, and "Set up later" box 540 is activated when a touch input is detected at a location inside of or on "Set up later" box 540. FIG. 5L also illustrates device 100 detecting contact 542 (e.g., a tap gesture) at a location on touch screen 112 that corresponds to "Set up later" box 540.

Figure 5M:
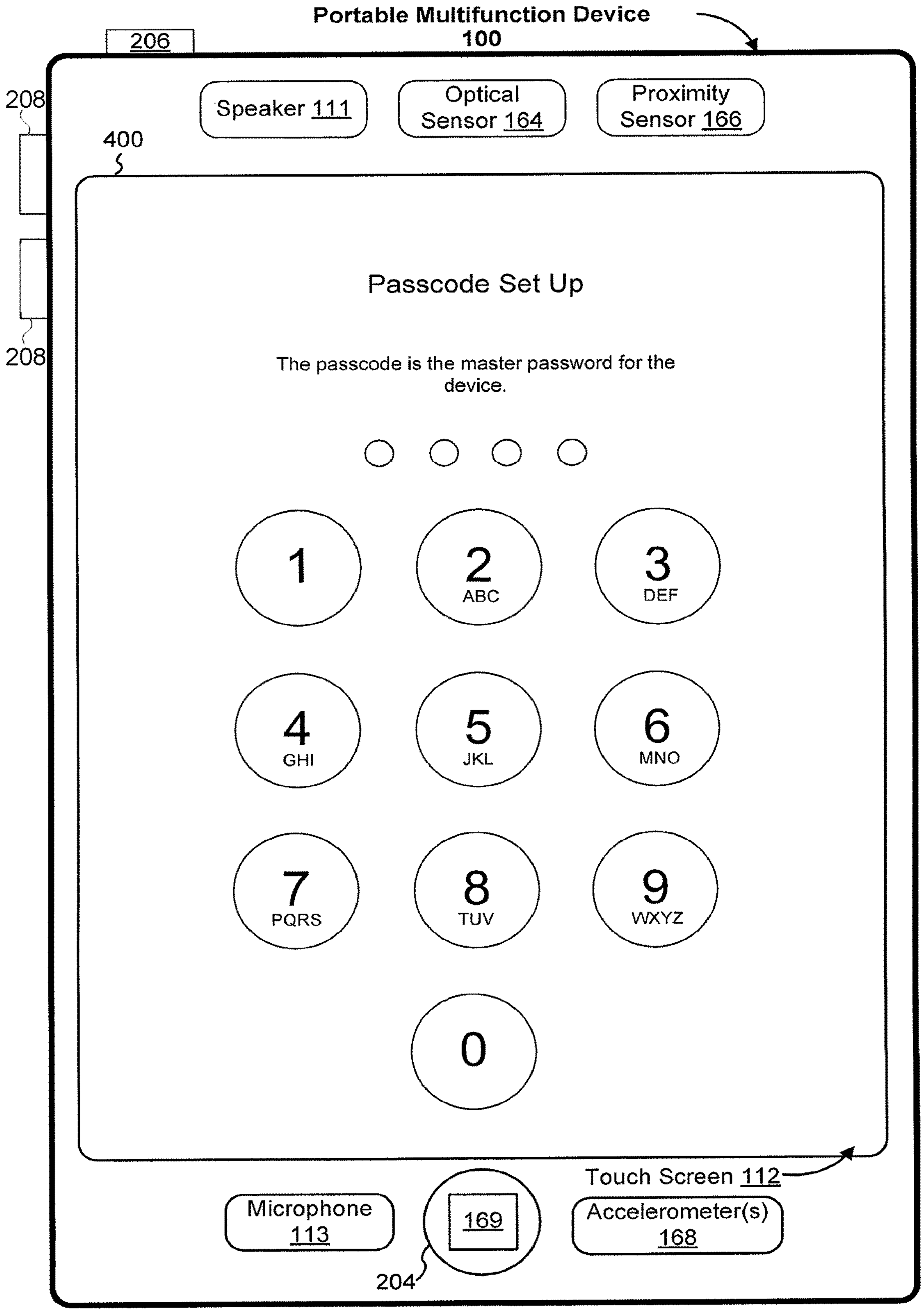

FIG. 5M illustrates device 100 displaying a passcode set up interface on touch screen 112 in response to detecting contact 542 in FIG. 5L. In FIG. 5M, the passcode set up interface includes a plurality of soft keys that enable the user to set up a master passcode or PIN for the device.

FIGS. 5N-5T illustrate enrolling a second fingerprint with portable multifunction device 100 from a settings interface.

Figure 5N:
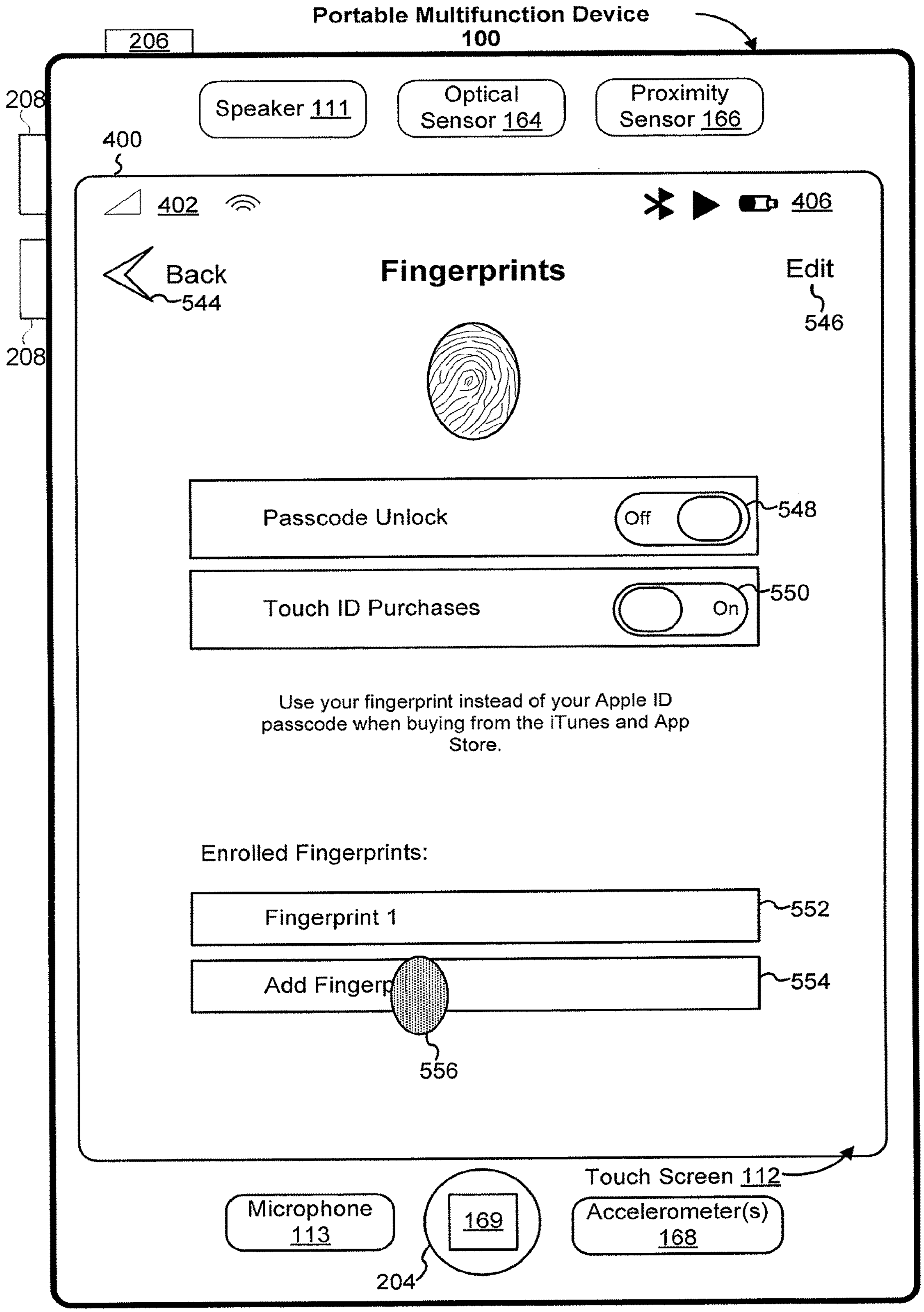

FIG. 5N illustrates device 100 displaying a fingerprint settings interface on touch screen 112. In FIG. 5N, the fingerprint settings interface includes a "Back" affordance 544, which, when activated, causes device 100 to redisplay a previous settings interface different from the fingerprint settings interface and an "Edit" affordance 546, which, when activated, causes device 100 to change an appearance of the fingerprint settings interface and enables the user to delete or edit the names of enrolled fingerprints. In FIG. 5N, the fingerprint settings interface also includes toggle switch 548 configured to turn on/off a passcode unlock function which allows the user to unlock the device with an enrolled fingerprint in place of the passcode, and toggle switch 550 configured to turn on/off the ability to purchase goods and services with an enrolled fingerprint. In FIG. 5N, the passcode unlock function is turned on and the ability to purchase goods and services with an enrolled fingerprint is turned off.

In FIG. 5N, the fingerprint settings interface also includes a list of enrolled fingerprints. In FIG. 5N, the list of enrolled fingerprints includes "Fingerprint 1" box 552, which when activated, causes device 100 to change an appearance of "Fingerprint 1" box 552 and to enable the user to edit the name of the enrolled fingerprint, and "Add Fingerprint" box 554, which when activated, causes device 100 to start the fingerprint enrollment process. For example, enrolled "Fingerprint 1" corresponds to the first fingerprint (e.g., the fingerprint corresponding to the user's right index finger) enrolled during the enrollment process illustrated in FIGS. 5B-5K. FIG. 5N further illustrates device 100 detecting contact 556 (e.g., a tap gesture) at a location on touch screen 112 that corresponds to "Add Fingerprint" box 554.

Figure 5O:
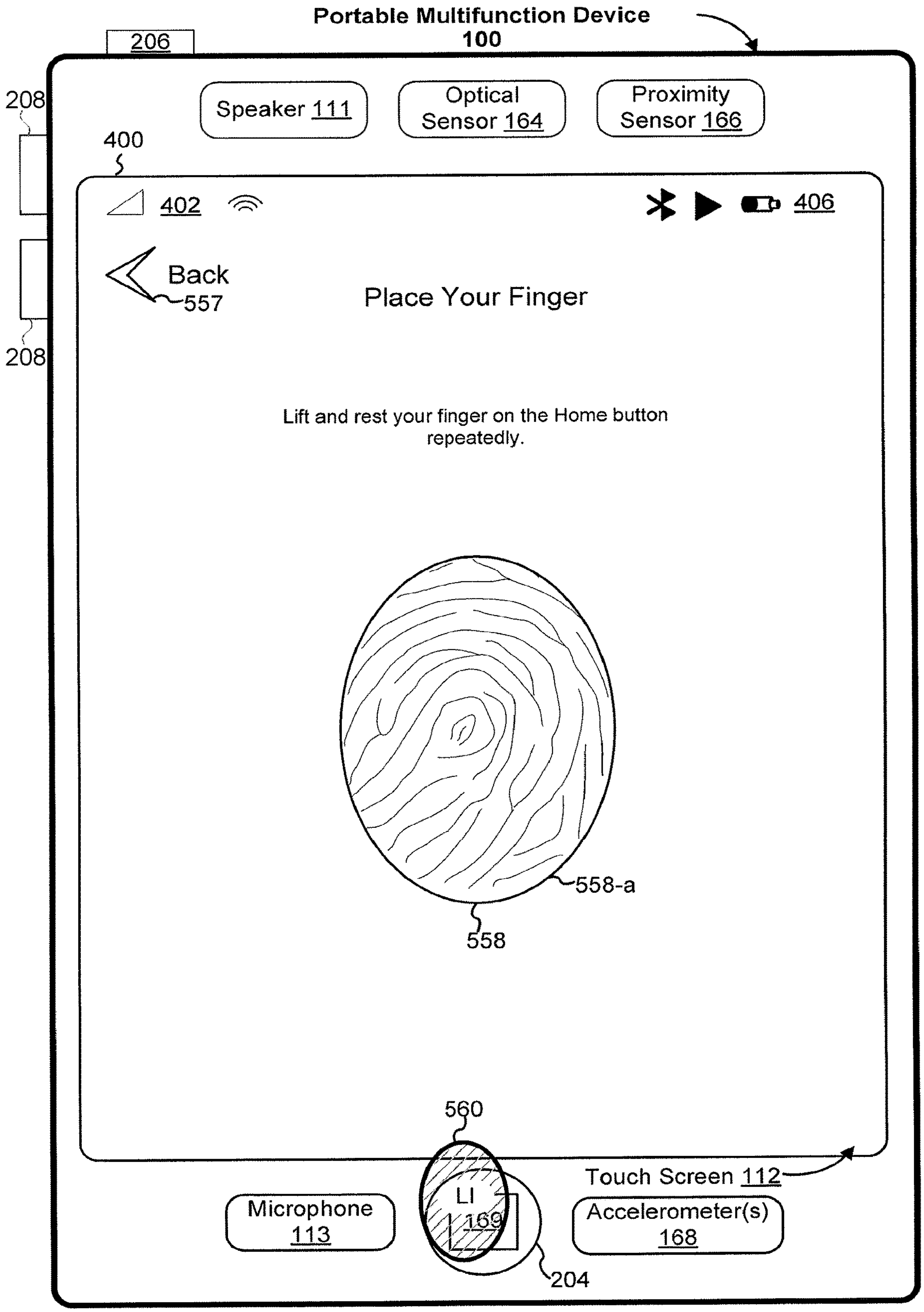

FIG. 5O illustrates device 100 displaying a first fingerprint enrollment interface for the fingerprint enrollment process on touch screen 112 in response to detecting contact 556 in FIG. 5N. In FIG. 5O, the first fingerprint enrollment interface includes instructions prompting the user to perform a plurality of separate and distinct stationary finger gestures with a respective finger on fingerprint sensor 169 so as to enroll the fingerprint of the respective finger. In FIG. 5O, the first fingerprint enrollment interface also includes a progress indicator 558 in first state 558-*a*. For example, in first state 558-*a*, progress indicator 558 resembles a faux fingerprint with narrow ridges. First state 558-*a* indicates that no fingerprint information has been collected. FIG. 5O also illustrates "Back" affordance 557, which, when activated, causes device 100 to redisplay the fingerprint settings interface in FIG. 5N. FIG. 5O further illustrates device 100 detecting fingerprint 560 (e.g., corresponding to the user's left index finger) as part of a first finger gesture (e.g., a first touch and rest gesture) on fingerprint sensor 169 and collecting fingerprint information from the first finger gesture.

Figure 5P:
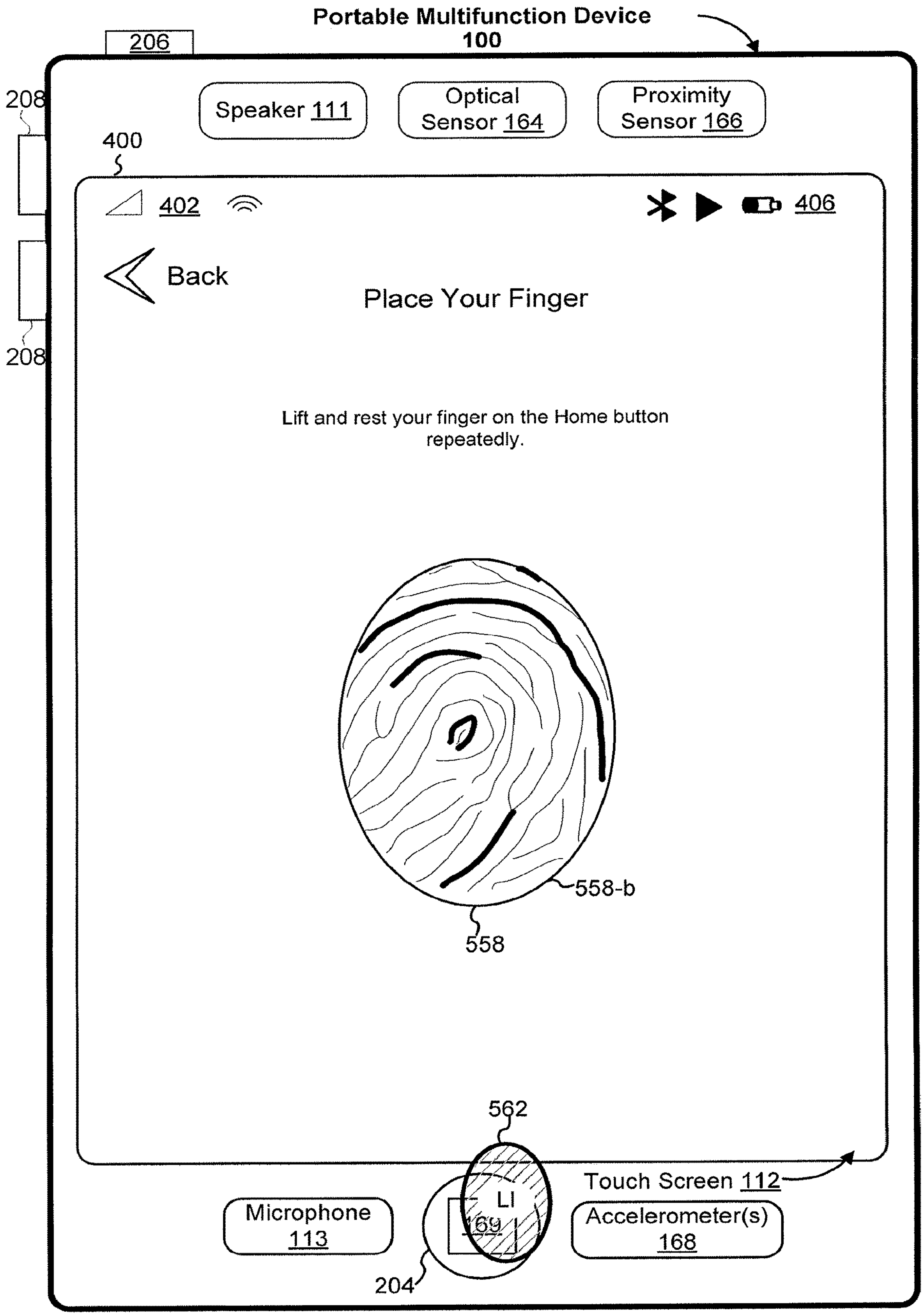

FIG. 5P illustrates device 100 changing an appearance of progress indicator 558 in response to detecting the first finger gesture in FIG. 5O. In FIG. 5P, device 100 displays progress indicator 558 in second state 558-*b*. In FIG. 5P, at least a portion of the ridges of progress indicator 558 are thickened (or darkened) in second state 558-*b* as compared to first state 558-*a* in FIG. 5O. Second state 558-*b* of progress indicator 558 indicates that some fingerprint information has been collected but one or more additional finger gestures are required to enroll the second fingerprint (e.g., the fingerprint corresponding to the user's left index finger). FIG. 5P also illustrates device 100 detecting fingerprint 562 (e.g., corresponding to the user's left index finger) as part of a second finger gesture (e.g., a second touch and rest gesture) on fingerprint sensor 169 and collecting fingerprint information from the second finger gesture.

Figure 5Q:
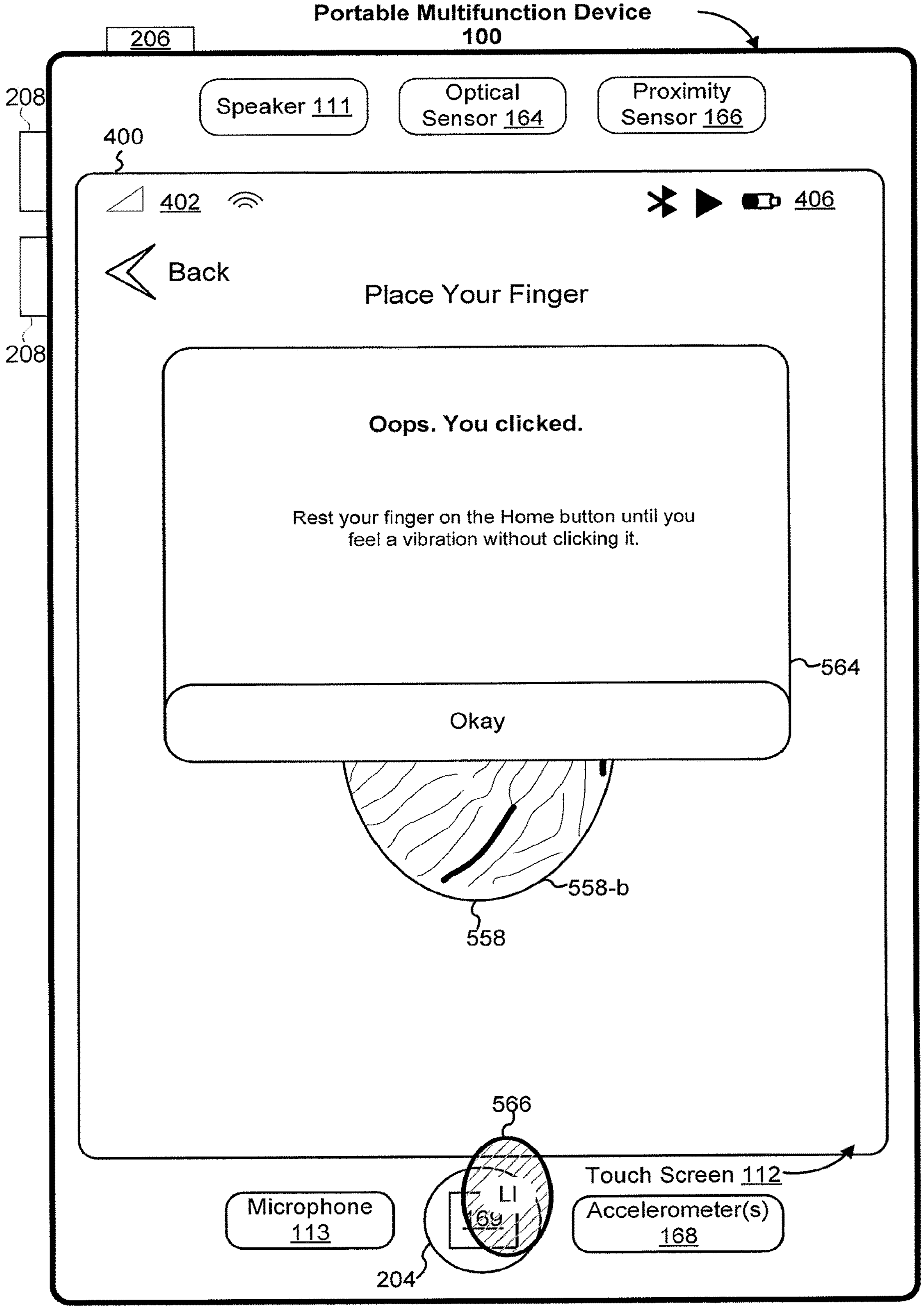

FIG. 5Q illustrates device 100 displaying a message on touch screen 112 prompting a user to perform subsequent finger gestures differently from the second finger gesture detected in FIG. 5P. In FIG. 5Q, device 100 displays message 564 over the first enrollment interface (including progress indicator 558 in second state 558-*b*) on touch screen 112 in response to detecting the second finger gesture in FIG. 5P. In FIG. 5Q, message 564 includes instructions which direct the user to rest their finger on fingerprint sensor 169 (e.g., integrated in home button 204) until a vibration is felt without clicking/depressing home button 204 so as to collect fingerprint information. In some embodiments, message 564 is dismissed and the fingerprint enrollment process is resumed when either a contact is detected at a location corresponding to the "Okay" affordance in message 564 or a subsequent finger gesture is detected on fingerprint sensor 169. FIG. 5Q also illustrates device 100 detecting fingerprint 566 (e.g., corresponding to the user's left index finger) as part of a third finger gesture (e.g., a third touch and rest gesture) on fingerprint sensor 169 and collecting fingerprint information from the third finger gesture.

Figure 5R:
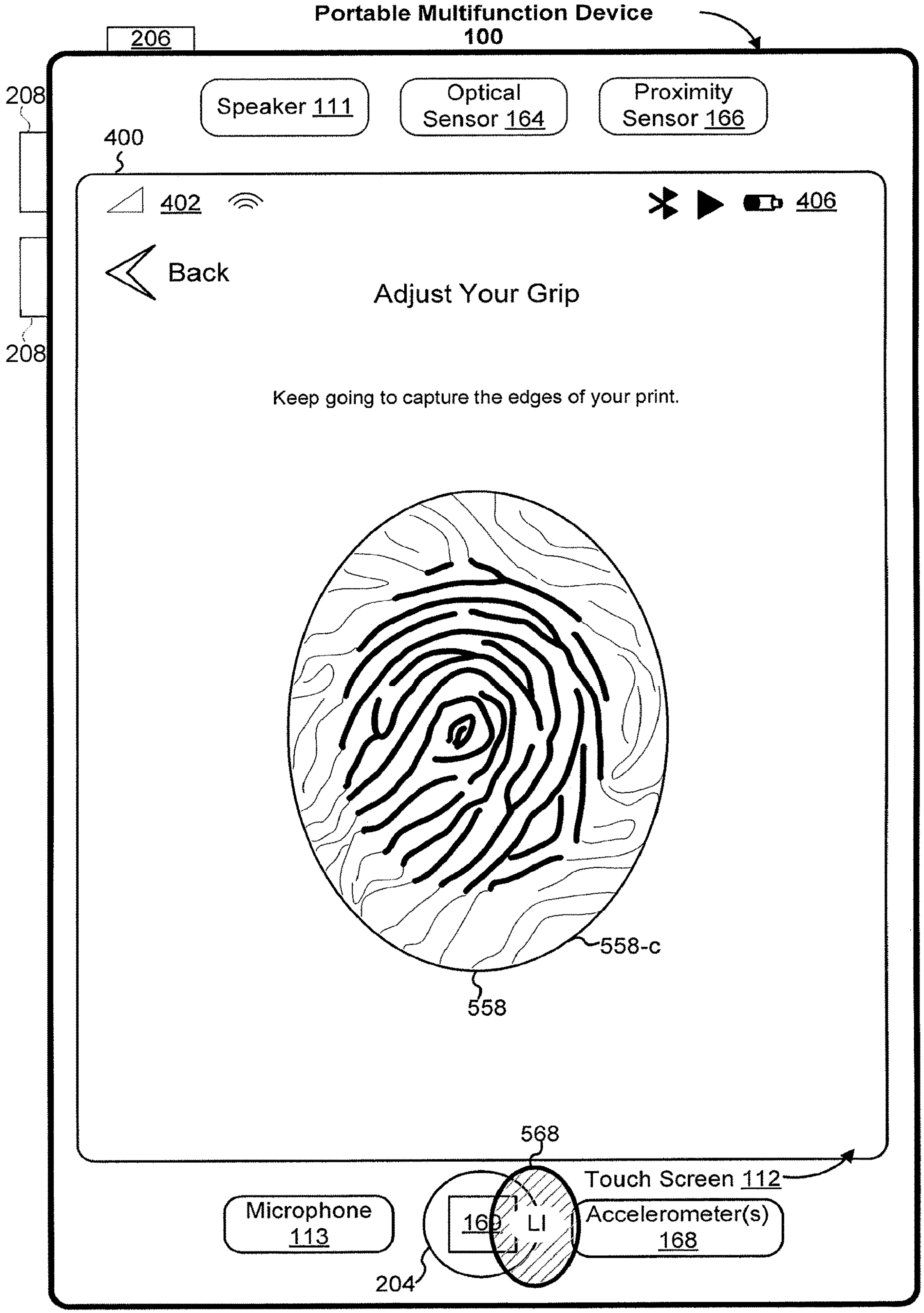

FIG. 5R illustrates device 100 displaying a second fingerprint enrollment interface for the fingerprint enrollment process on touch screen 112 and changing an appearance of progress indicator 558 in response to detecting the third finger gesture in FIG. 5Q. In FIG. 5R, the second fingerprint enrollment interface includes instructions prompting the user to perform one or more additional separate and distinct stationary finger gestures with the respective finger (e.g., the user's left index finger) on fingerprint sensor 169 so as gather fingerprint information on regions of the fingerprint of the respective finger (e.g., the edges) that are missing from the previously collected fingerprint information in order to complete enrollment of the second fingerprint (e.g., corresponding to the user's left index finger). In FIG. 5R, device 100 displays progress indicator 558 in third state 558-*c*. For example, progress indicator 510 is expanded in third state 558-*c* to reveal a larger perimeter oval of narrow ridges surrounding an inner region of thickened ridges. In FIG. 5R, the inner region of progress indicator 558 corresponds to un-expanded progress indicator 558 included in the first enrollment interface displayed in FIGS. 5O-5Q. In this example, a greater amount of the ridges of the inside region of progress indicator 558 are thickened in third state 558-*c* as compared to second state 510-*b* in FIG. 5P. Third state 558-*c* of progress indicator 558 indicates that more fingerprint information has been collected but one or more additional finger gestures are required to enroll the second fingerprint (e.g., the fingerprint corresponding to the user's left index finger). FIG. 5R also illustrates device 100 detecting fingerprint 568 (e.g., corresponding to the user's left index finger) as part of a fourth finger gesture (e.g., a fourth touch and rest gesture) on fingerprint sensor 169 and collecting fingerprint information from the fourth finger gesture.

Figure 5S:
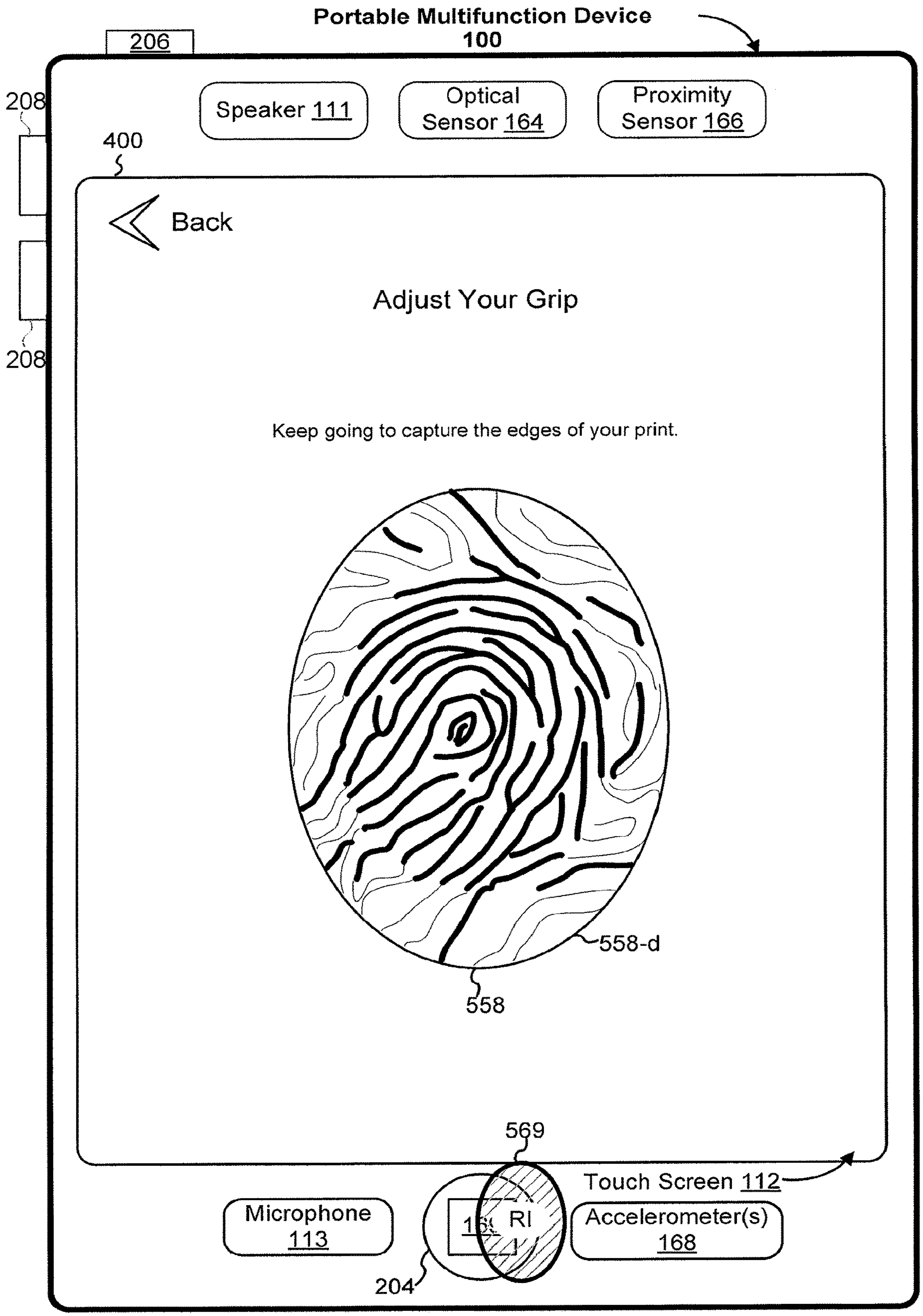

FIG. 5S illustrates device 100 changing an appearance of progress indicator 558 in response to detecting the fourth finger gesture in FIG. 5R. In FIG. 5S, device 100 displays progress indicator 558 in fourth state 510-*d*. In FIG. 5S, a portion of the ridges in the outside perimeter of progress indicator 558 are thickened in fourth state 510-*d* as compared to third state 510-*c* in FIG. 5R. Fourth state 510-*d* of progress indicator 558 indicates that more fingerprint information has been collected but one or more additional finger gestures are required to enroll the second fingerprint (e.g., the fingerprint corresponding to the user's left index finger). Stated another way, fourth state 510-*d* of progress indicator 558 is not full, and does not indicate completion, and thereby indicates that one or more additional finger gestures are required to enroll the second fingerprint. FIG. 5S also illustrates device 100 detecting fingerprint 569 (e.g., corresponding to the user's left index finger) as part of a fifth finger gesture (e.g., a fifth touch and rest gesture) on fingerprint sensor 169 and collecting fingerprint information from the fifth finger gesture.

Figure 5T:
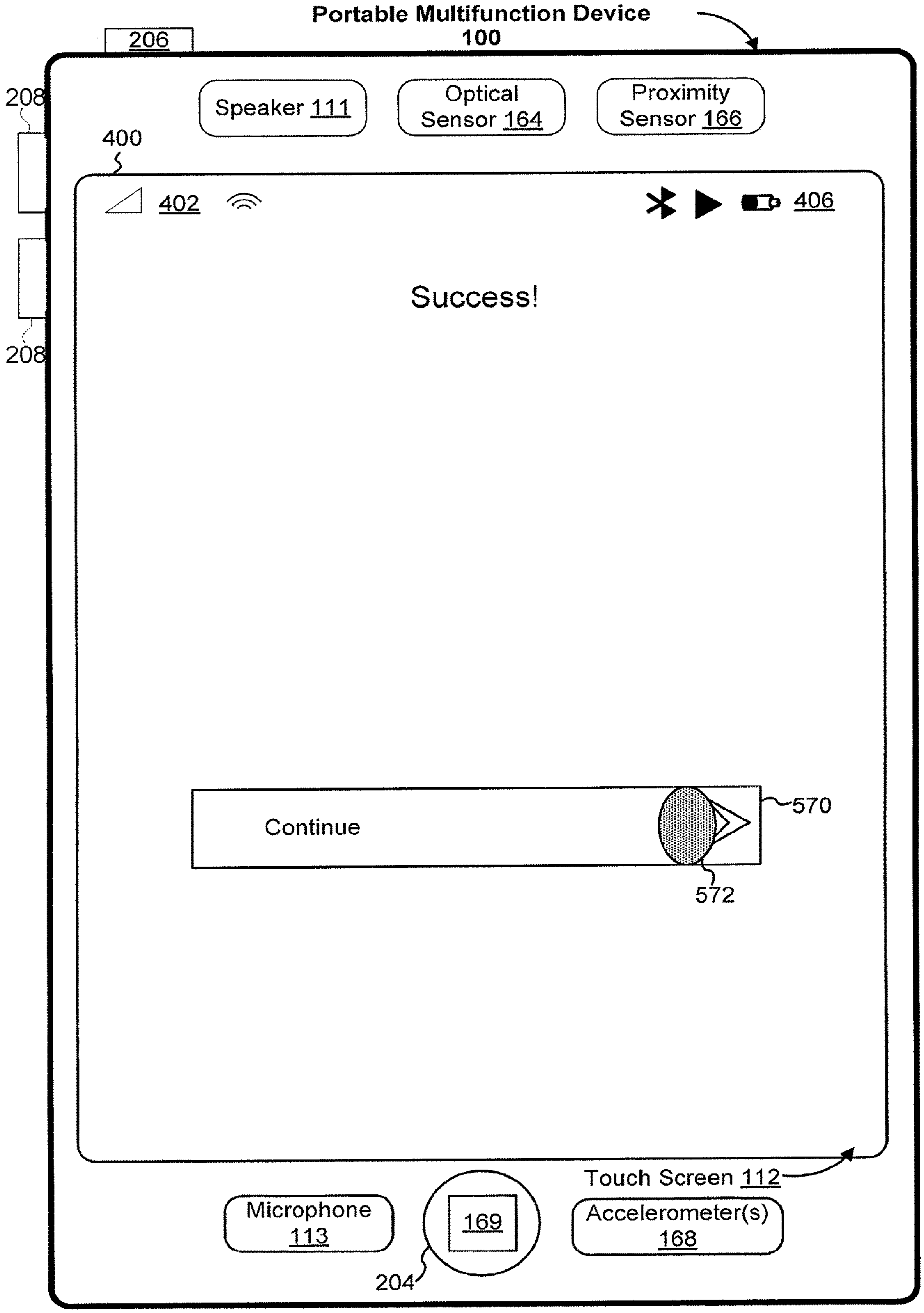

FIG. 5T illustrates device 100 displaying a third fingerprint enrollment interface on touch screen 112 in response to detecting the fifth finger gesture in FIG. 5S. In FIG. 5T, the third fingerprint enrollment interface indicates that the second fingerprint (e.g., the fingerprint corresponding to the user's left index finger) has been successfully enrolled with device 100. In FIG. 5T, the third fingerprint enrollment interface includes "Continue" box 570, which, when activated, causes device 100 to redisplay the fingerprint settings interface. FIG. 5T also illustrates device 100 detecting contact 572 (e.g., a tap gesture) at a location on touch screen 112 that corresponds to "Continue" box 570.

Figure 5U:
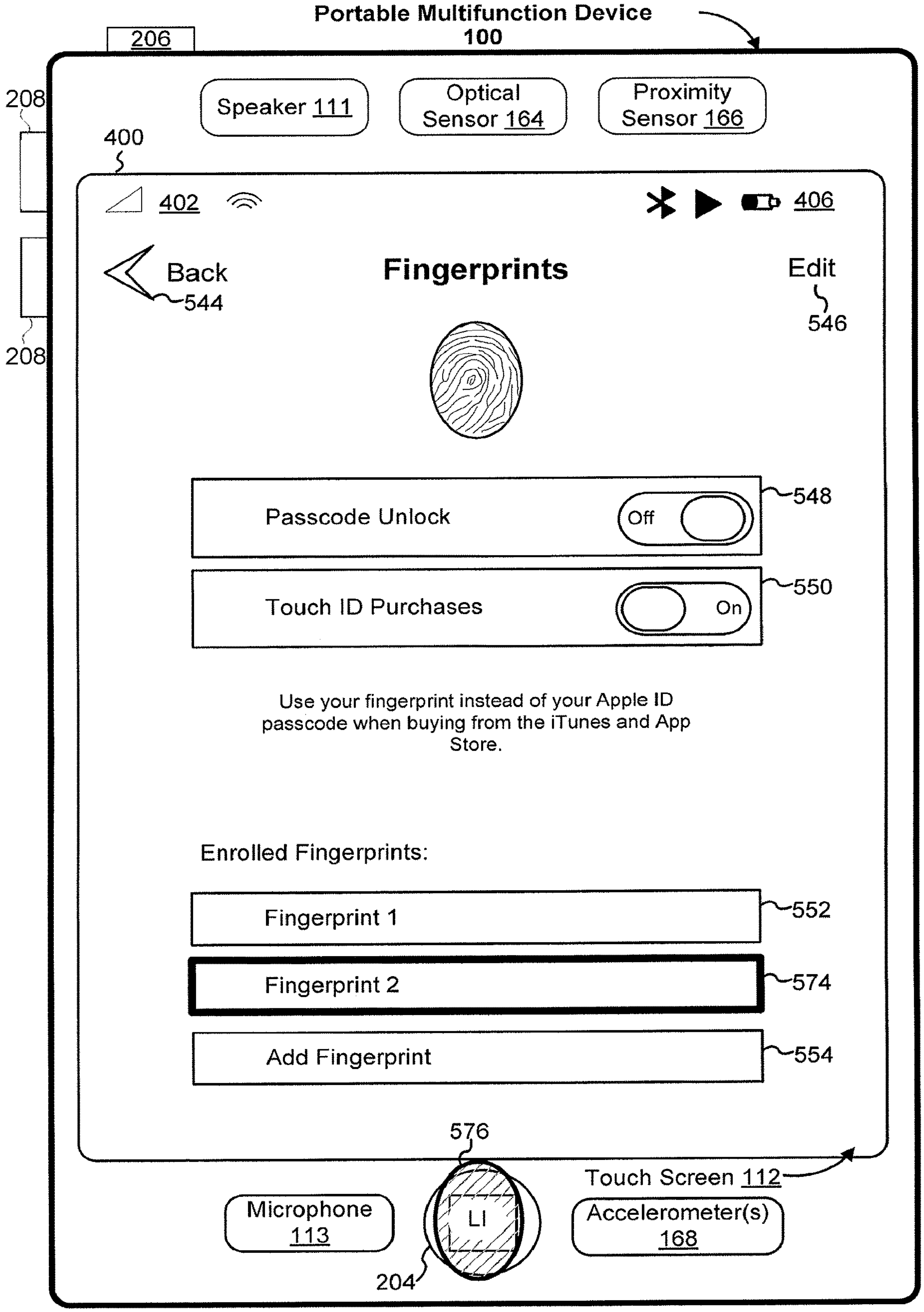
Figure 5V:
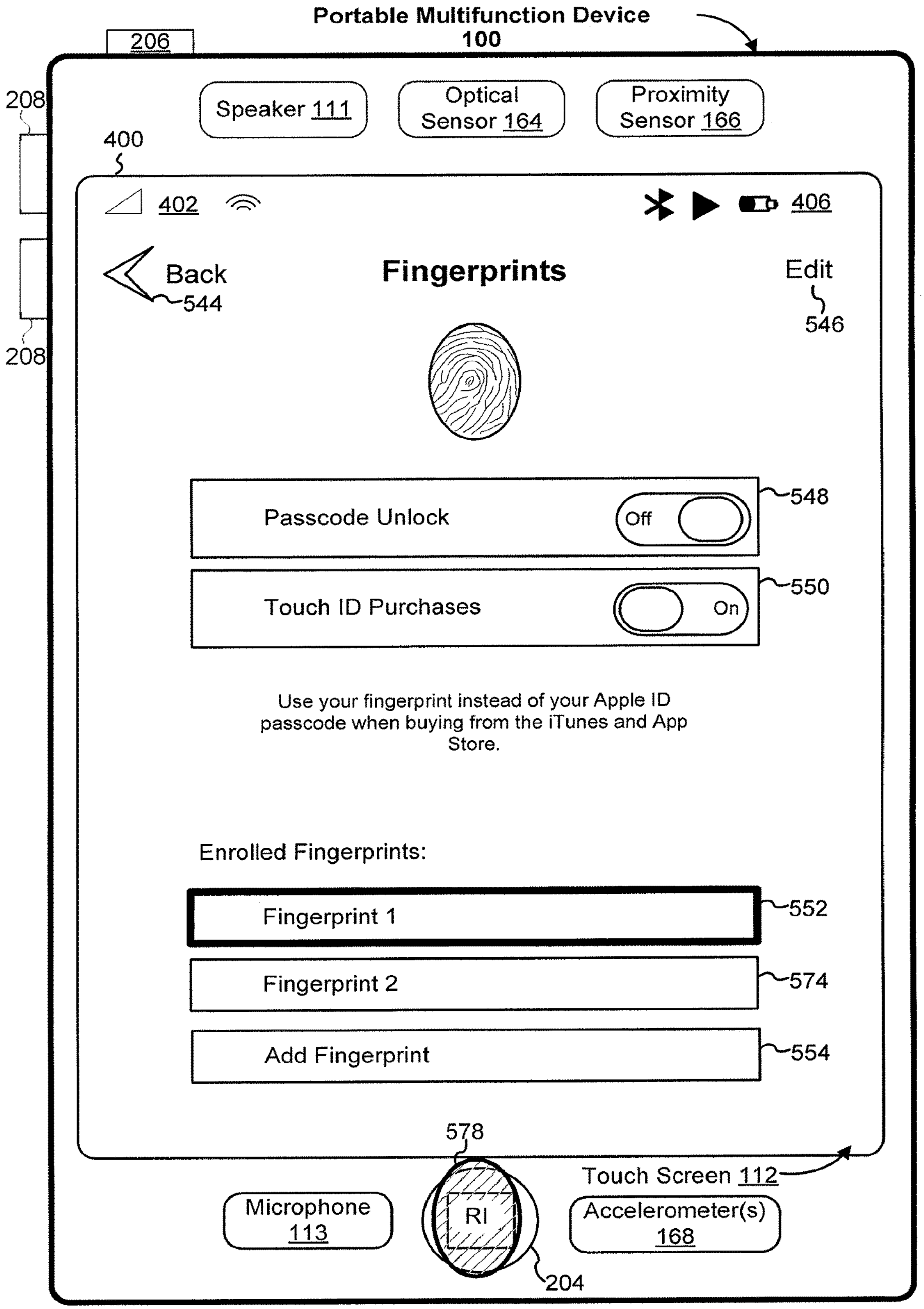
Figure 5W:
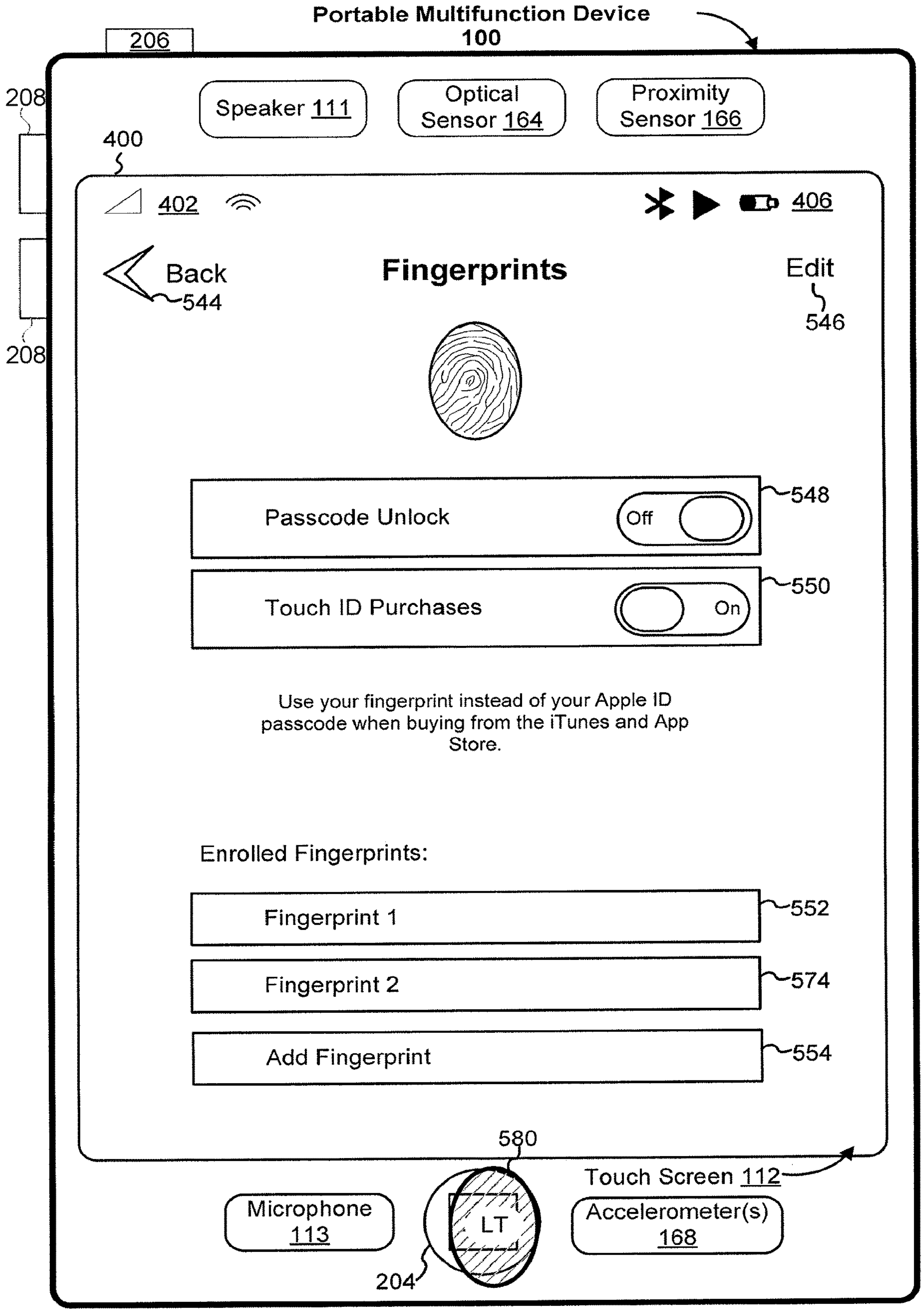

FIGS. 5U-5W illustrate highlighting an enrolled fingerprint in a fingerprint settings interface when the enrolled fingerprint is detected.

FIG. 5U illustrates device 100 displaying the fingerprint settings interface on touch screen 112 in response to detecting contact 570 in FIG. 5T. In FIG. 5U, the list of enrolled fingerprints includes "Fingerprint 1" box 552, which when activated, causes device 100 to change an appearance of "Fingerprint 1" box 552 and to enable the user to edit the name of the enrolled fingerprint, "Fingerprint 2" box 574, which when activated, causes device 100 to change an appearance of "Fingerprint 2" box 574 and to enable the user to edit the name of the enrolled fingerprint, and "Add Fingerprint" box 554, which when activated, causes device 100 to start the fingerprint enrollment process for enrolling an additional fingerprint. For example, enrolled "Fingerprint 1" corresponds to the first fingerprint (e.g., the fingerprint corresponding to the user's right index finger) enrolled during the enrollment process illustrated in FIGS. 5B-5K, and enrolled "Fingerprint 2" corresponds to the second fingerprint (e.g., the fingerprint corresponding to the user's left index finger) enrolled during the enrollment process illustrated in FIGS. 5N-5T.

FIG. 5U also illustrates device 100 detecting fingerprint 576 (e.g., corresponding to the user's left index finger) on fingerprint sensor 169. In response to detecting fingerprint 576, device 100 highlights, in the list of enrolled fingerprints, the enrolled fingerprint corresponding to the detected fingerprint (if any). In FIG. 5U, for example, device 100 increases the thickness of the border of "Fingerprint 2" box 574 to signify to the user that detected fingerprint 576 corresponds to enrolled "Fingerprint 2."

FIG. 5V illustrates device 100 detecting fingerprint 578 (e.g., corresponding to the user's right index finger) on fingerprint sensor 169. In response to detecting fingerprint 578, device 100 highlights, in the list of enrolled fingerprints, the enrolled fingerprint corresponding to the detected fingerprint (if any). In FIG. 5V, for example, device 100 increases the thickness of the border of "Fingerprint 1" box 552 to signify to the user that detected fingerprint 578 corresponds to enrolled "Fingerprint 1."

FIG. 5W illustrates device 100 detecting fingerprint 580 (e.g., corresponding to the user's left thumb). In response to detecting fingerprint 580, device 100 does not highlight any enrolled fingerprint in the list of enrolled fingerprints if it determines that the detected fingerprint 580 does not correspond to any of the enrolled fingerprints. In FIG. 5W, for example, device 100 maintains display of the fingerprint settings interface to signify to the user that detected fingerprint 580 does correspond to any of the enrolled fingerprints.

Figure 5X:
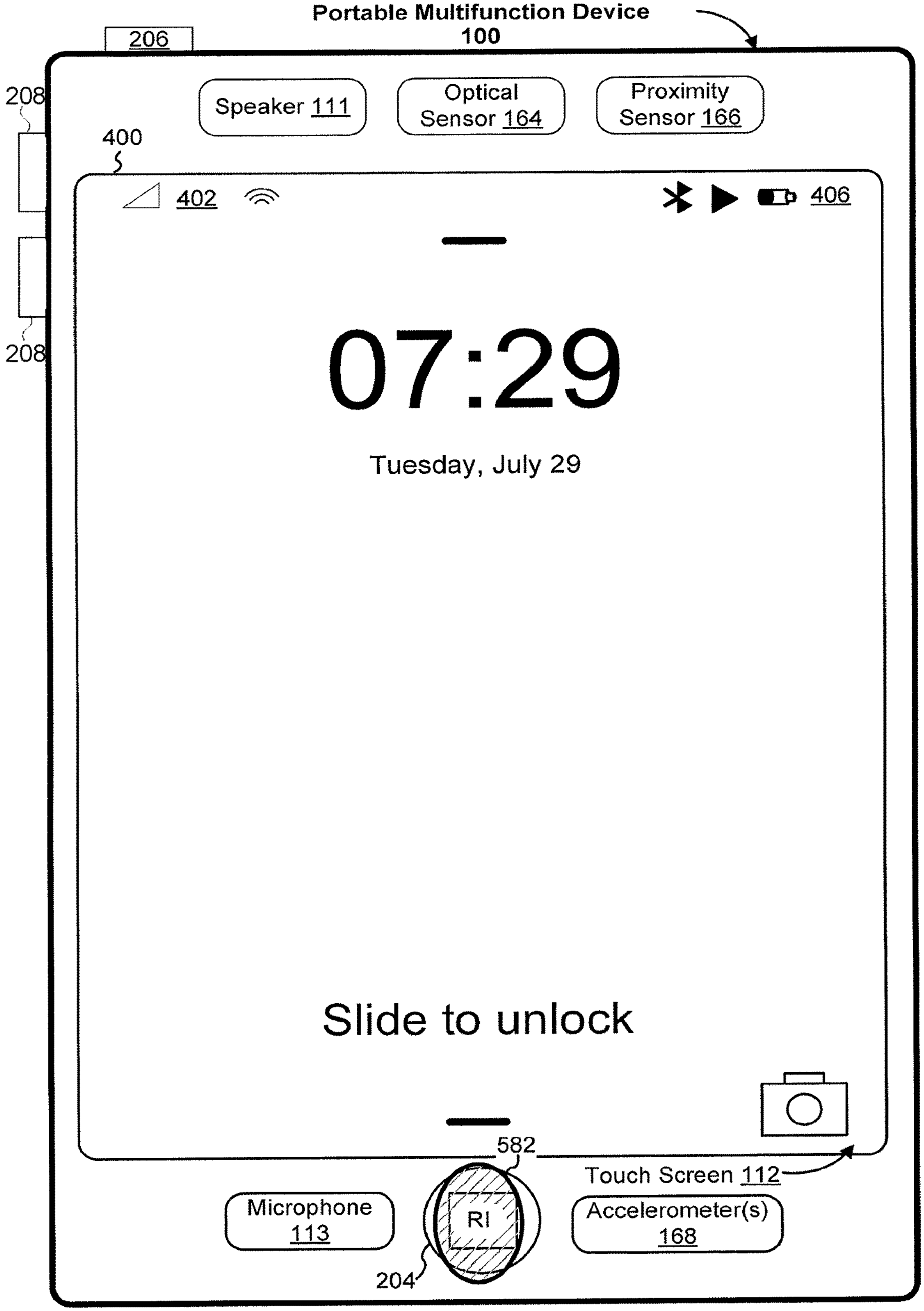

FIGS. 5X-5AA illustrate performing a restricted operation when an enrolled fingerprint is detected.

FIG. 5X illustrates device 100 displaying a lock screen on touch screen 112. In FIG. 5X, for example, device 100 is in a locked or restricted access mode. FIG. 5X also illustrates device 100 detecting fingerprint 582 (e.g., corresponding to the user's right index finger) on fingerprint sensor 169.

Figure 5Y:
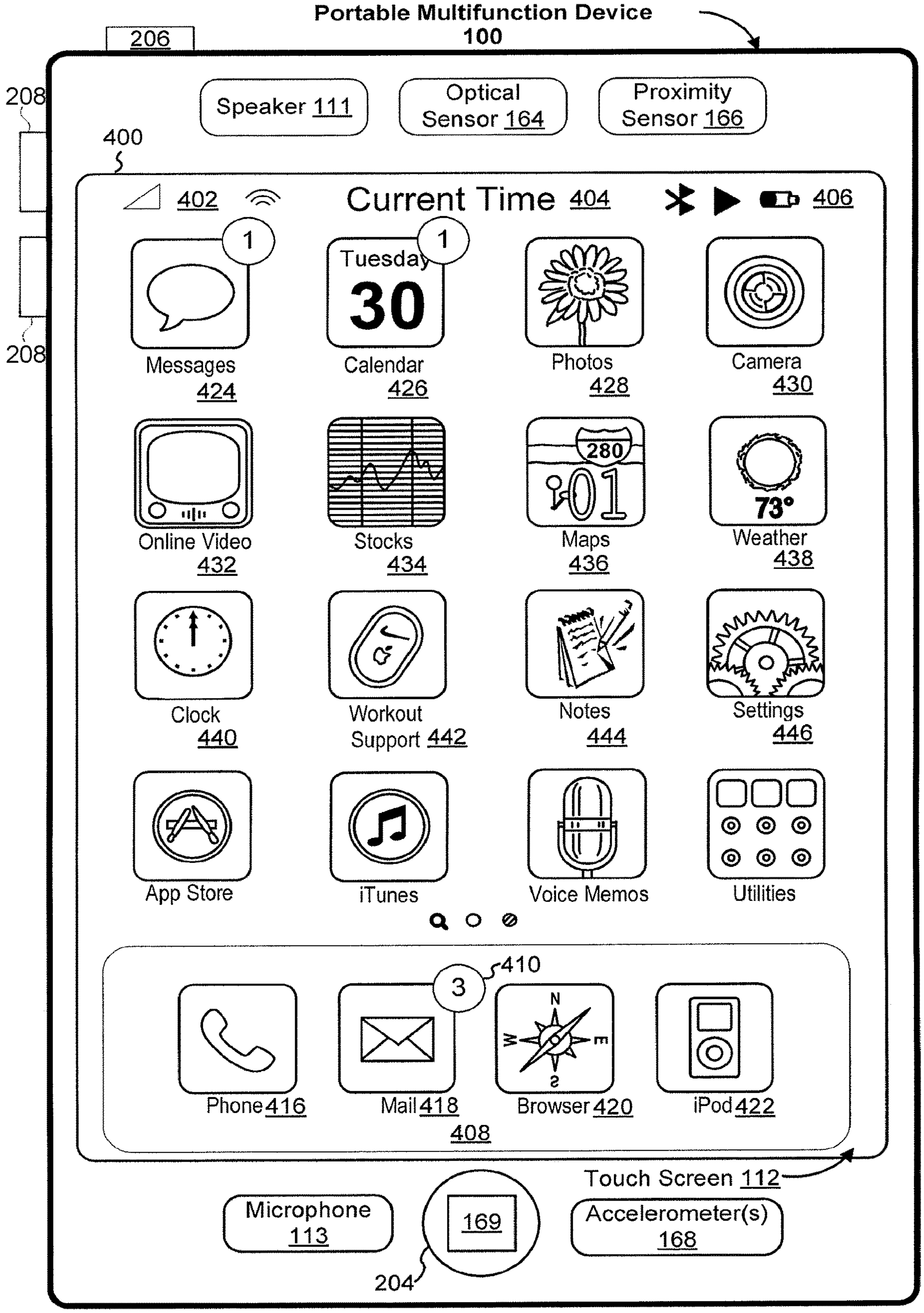

FIG. 5Y illustrates device 100 displaying a home screen on touch screen 112 in response to detecting fingerprint 582 in FIG. 5X and in accordance with a determination that fingerprint 582 corresponds to an enrolled fingerprint. For example, fingerprint 582 corresponds to the user's right index finger which was enrolled as the first fingerprint in FIGS. 5B-5K. In FIG. 5Y, for example, device 100 is in an unlocked or unrestricted access mode.

Figure 5Z:
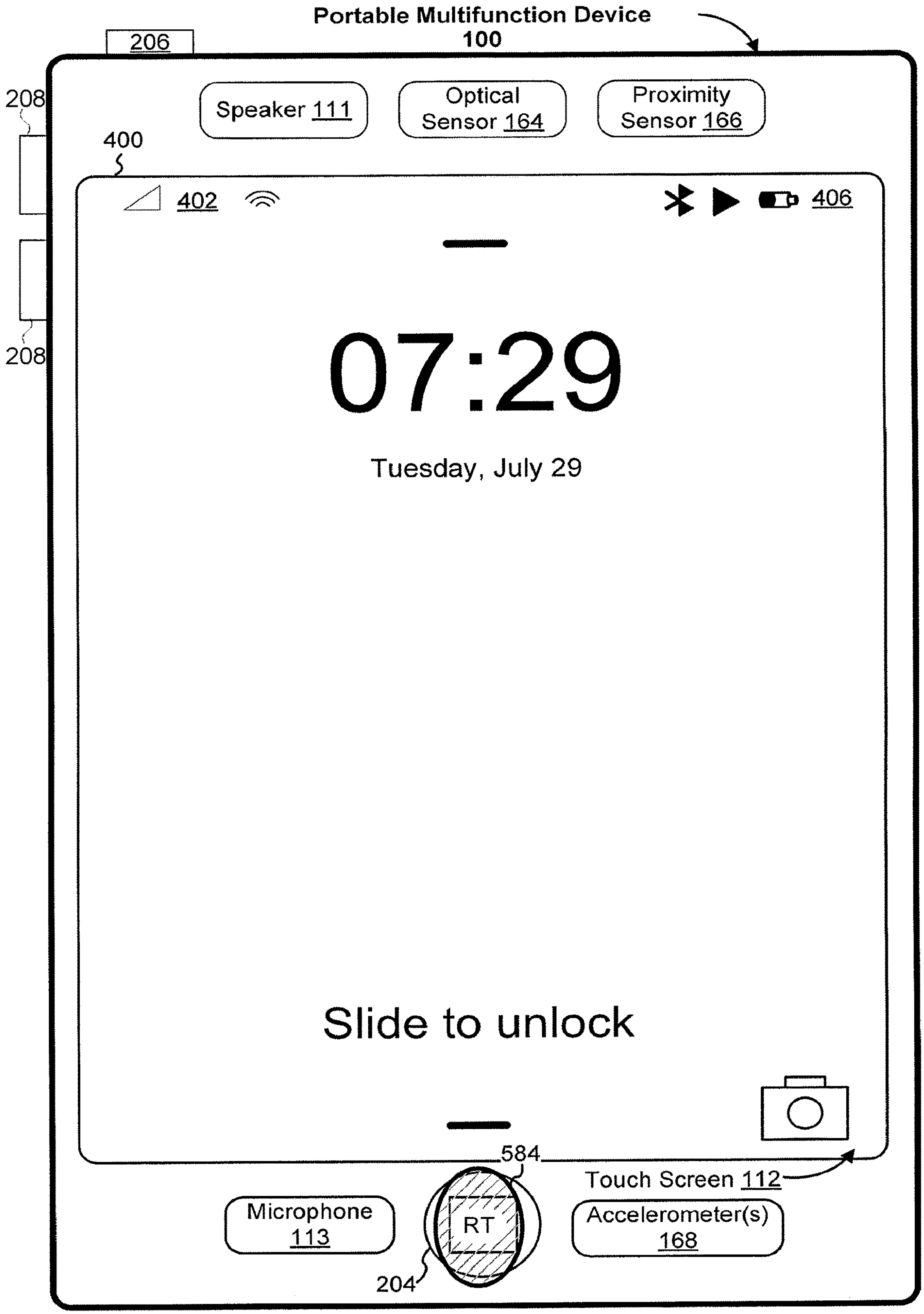
Figure 5A:
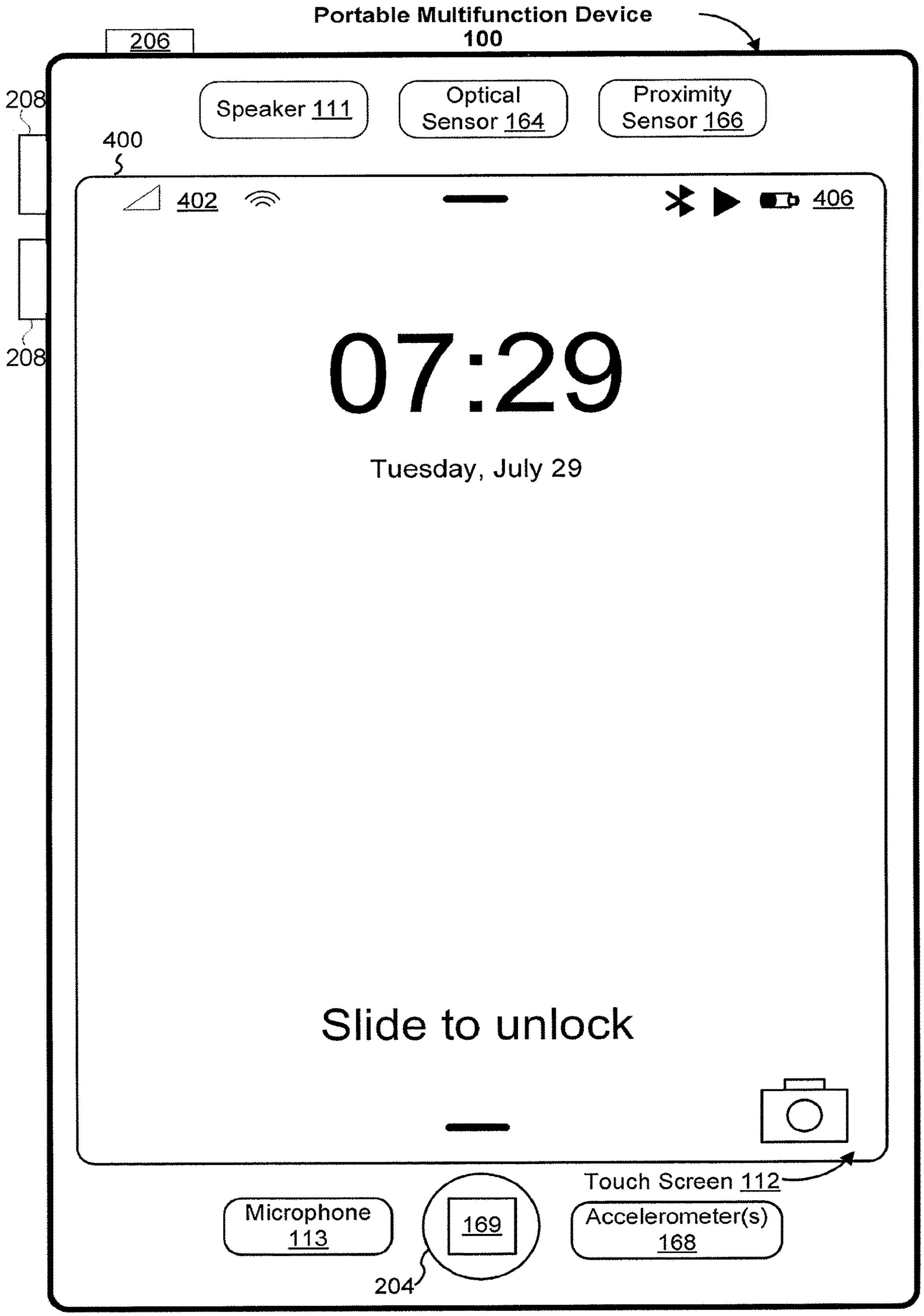
Figure 5B:
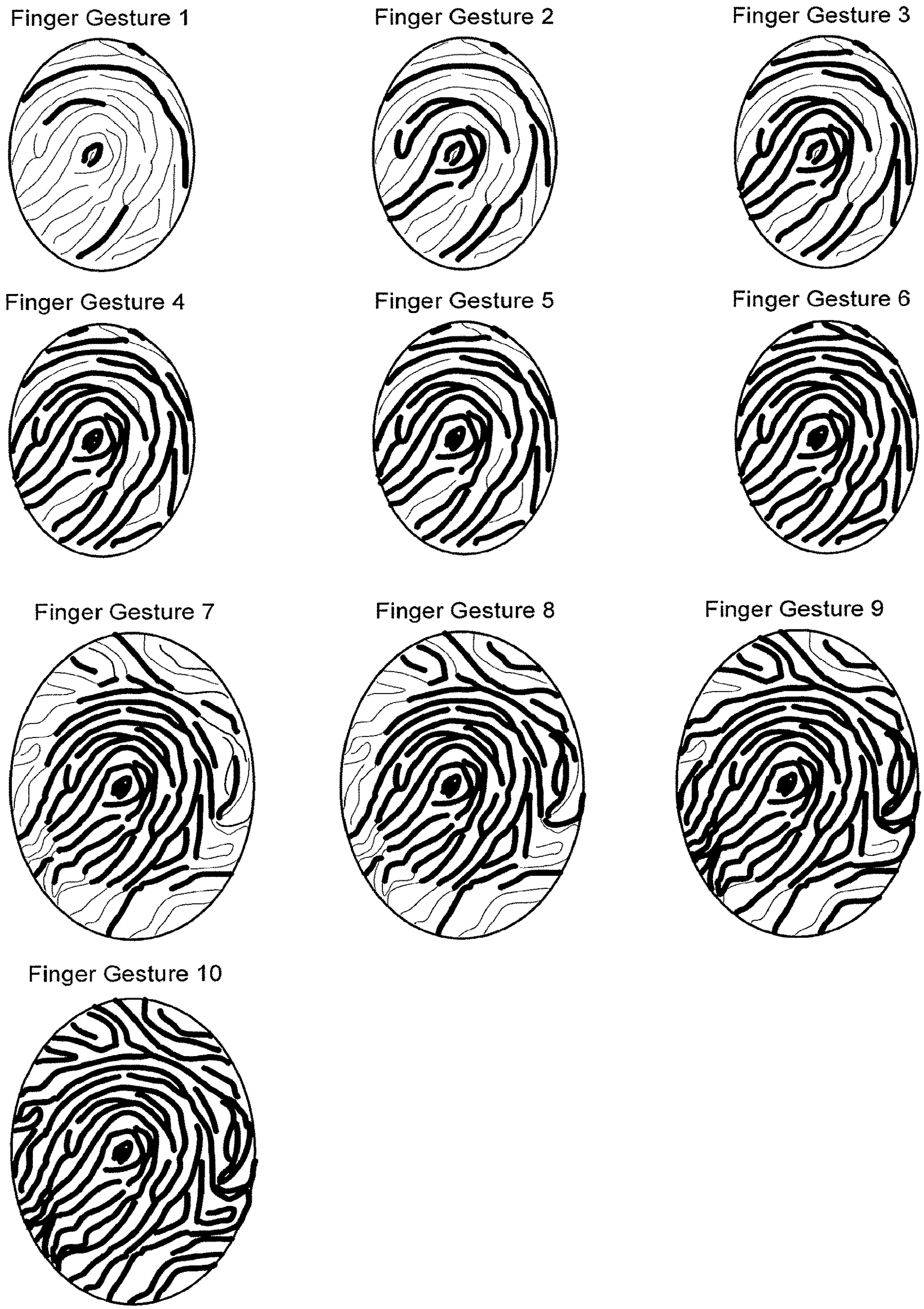
Figure 5C:
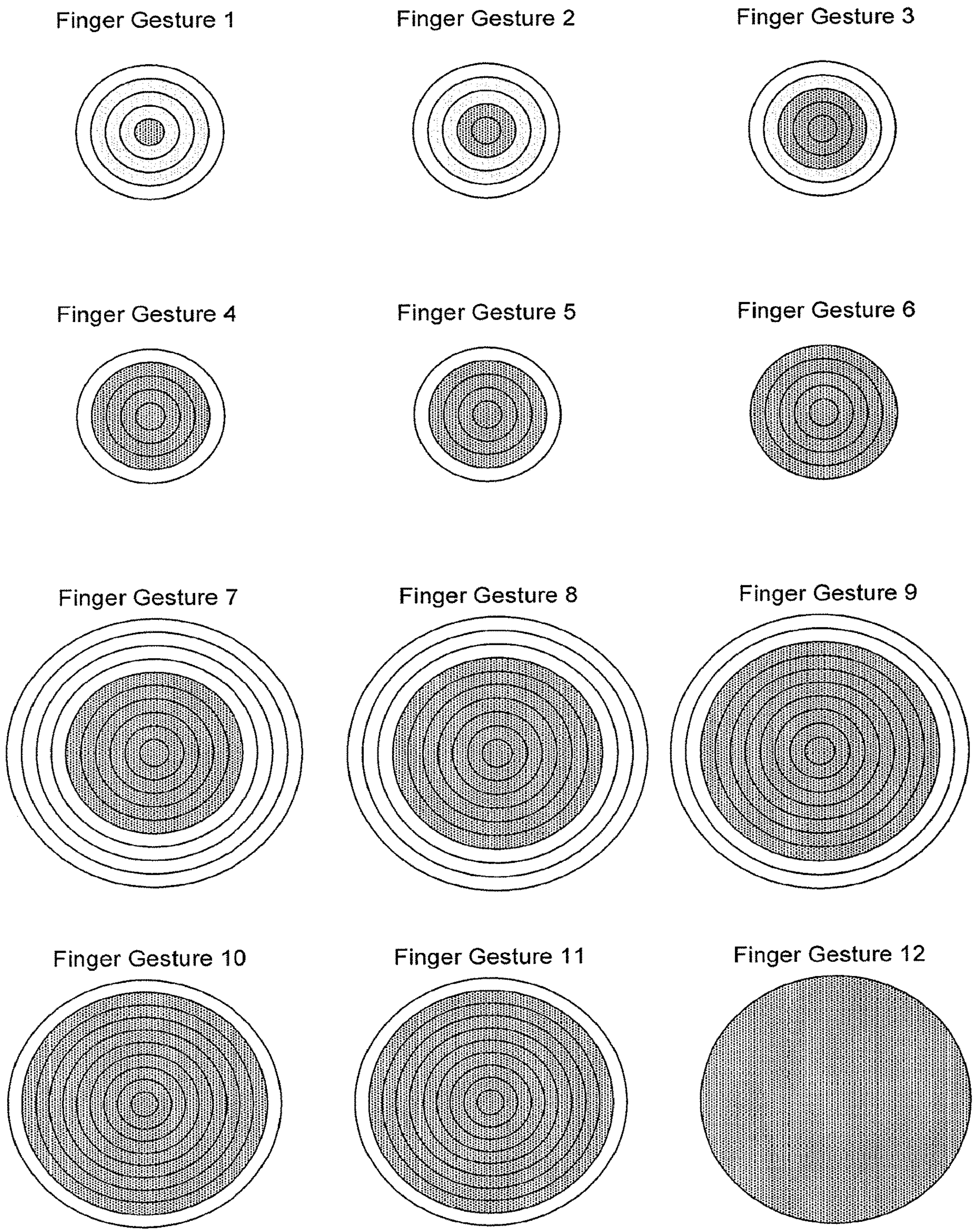
Figure 5D:
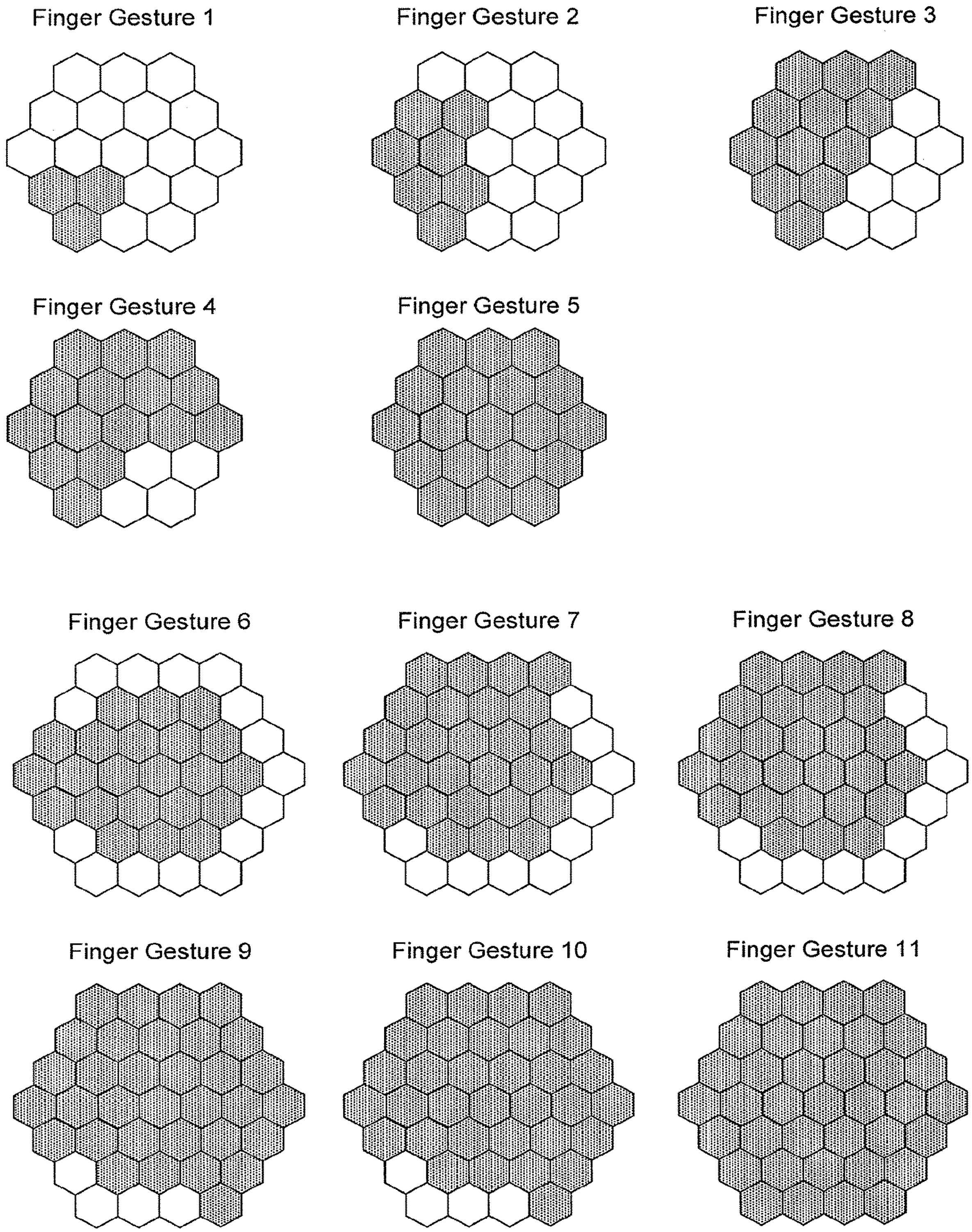
Figure 5E:
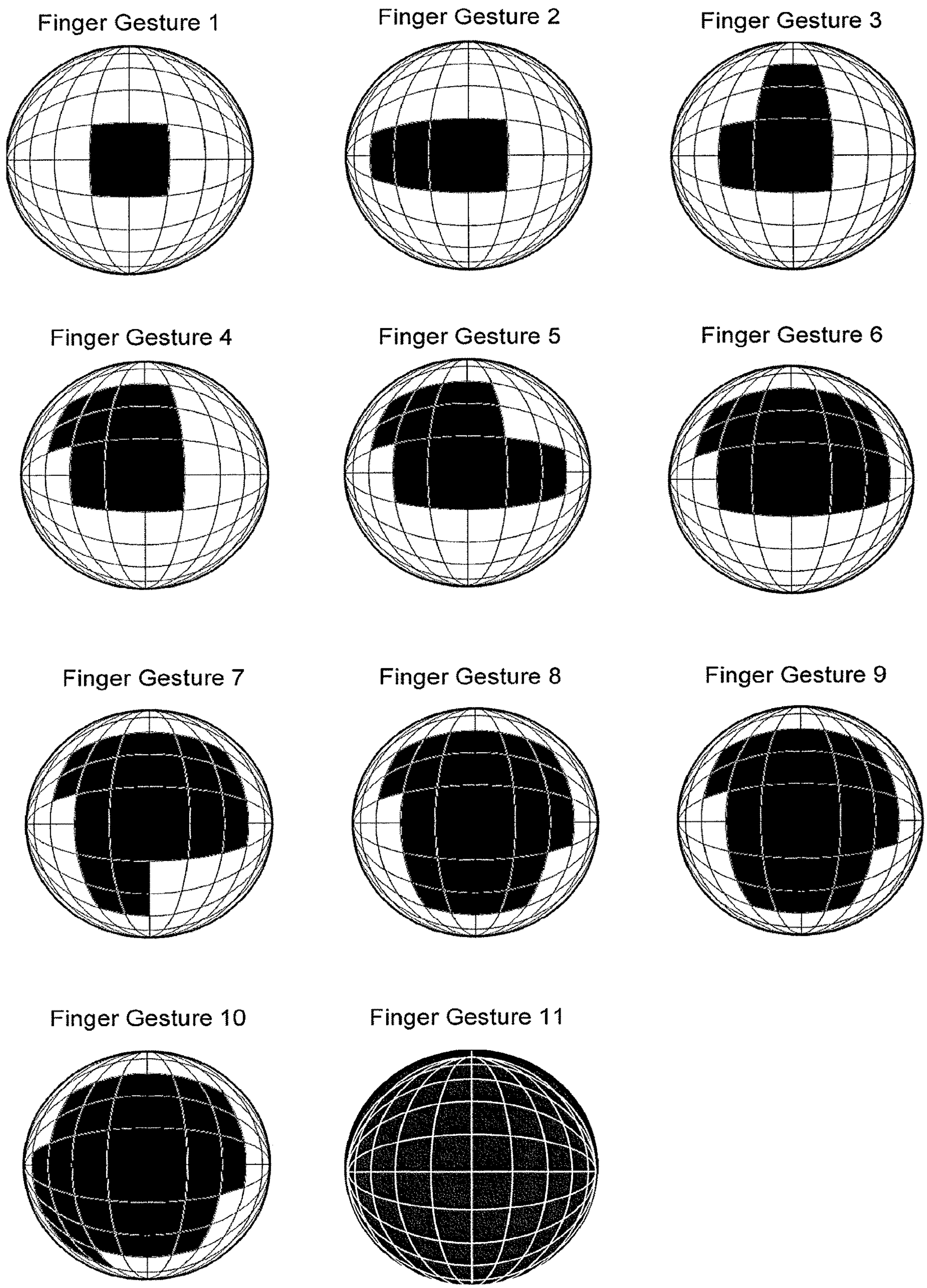
Figure 6A:
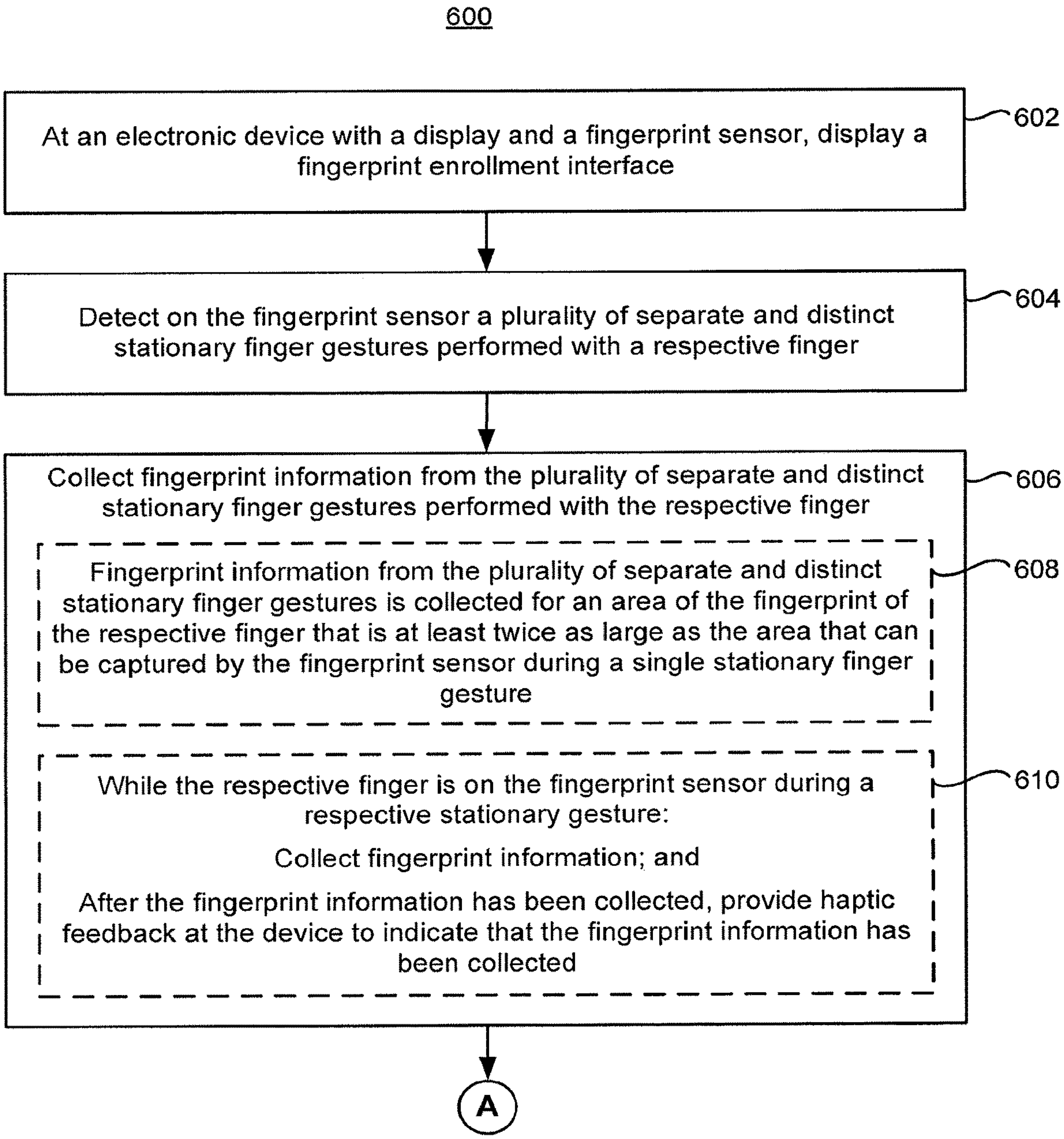
FIGS. 6A-6D are flow diagrams illustrating a method of enrolling fingerprints with a device in accordance with some embodiments.
Figure 6B:
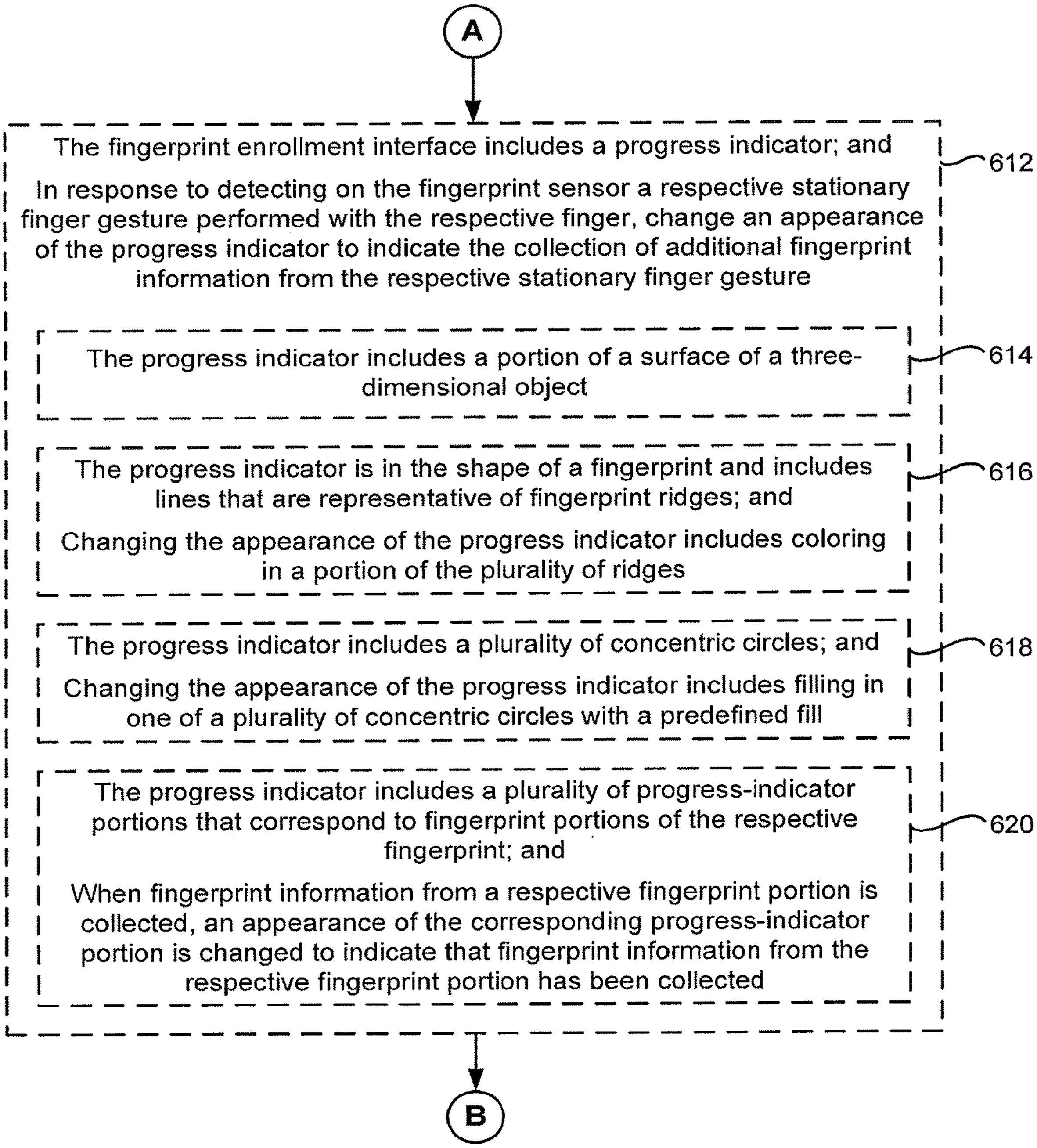
Figure 6C:
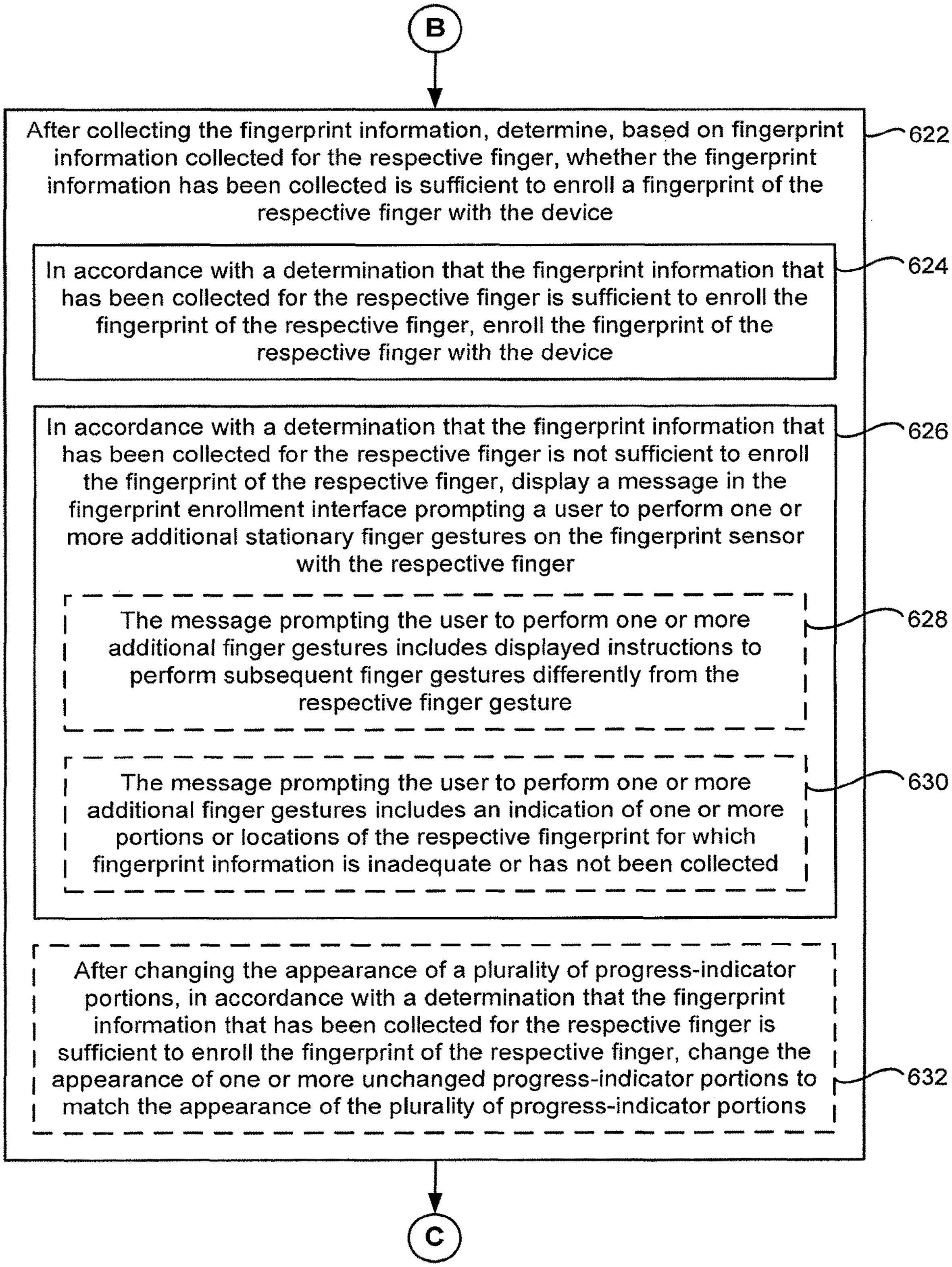
Figure 6D:
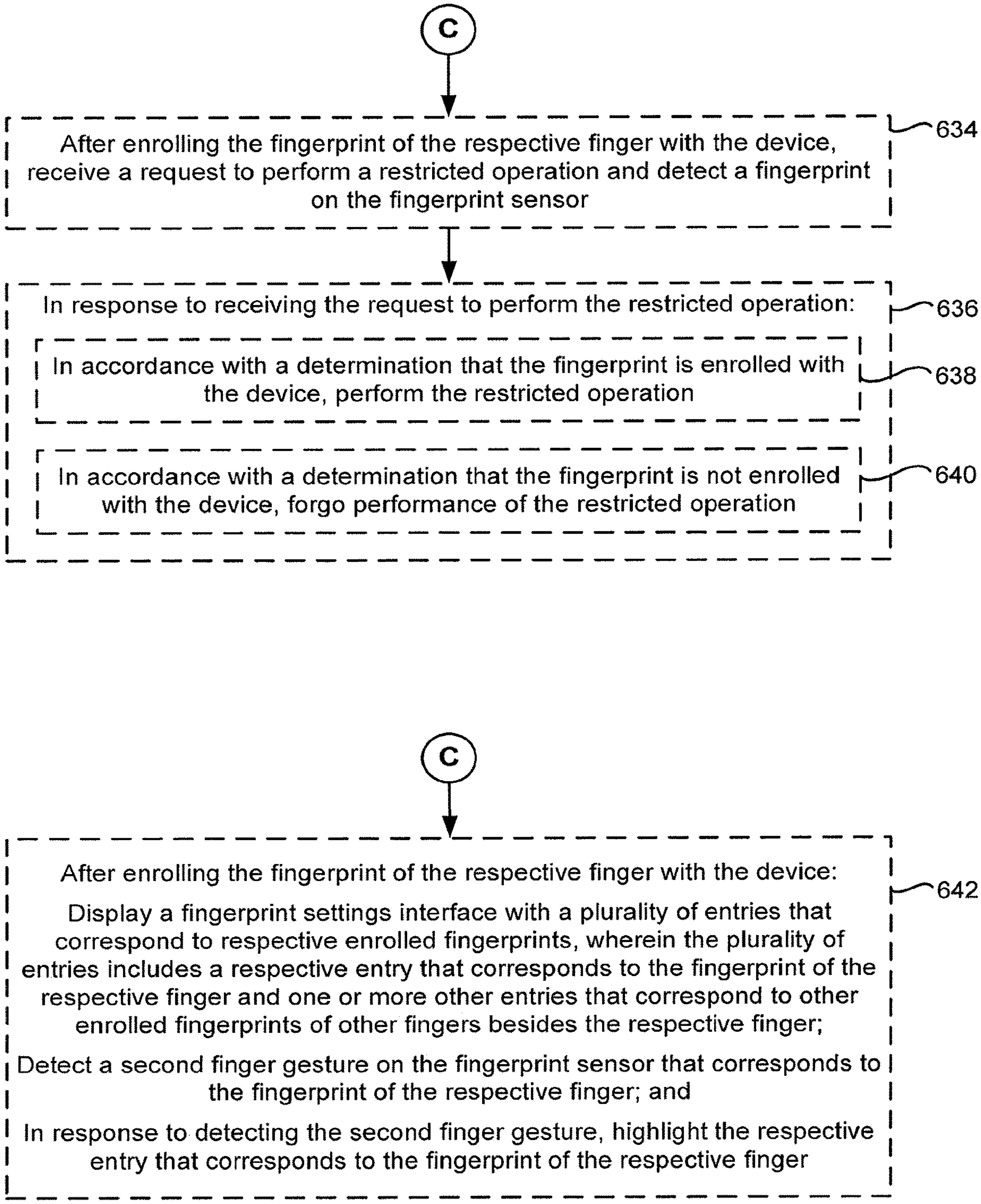

FIG. 5Z illustrates device 100 displaying a lock screen on touch screen 112. In FIG. 5Z, for example, device 100 is in a locked or restricted access mode. FIG. 5Z also illustrates device 100 detecting fingerprint 584 (e.g., corresponding to the user's right thumb) on fingerprint sensor 169.

FIG. 5AA illustrates device 100 maintaining display of the lock screen on touch screen 112 in response to detecting fingerprint 584 in FIG. 5Z and in accordance with a determination that fingerprint 584 does not correspond to an enrolled fingerprint. In FIG. 5AA, for example, device 100 is in the locked or restricted access mode.

FIGS. 5BB-5EE illustrate changing an appearance of a progress indicator in response to a series of separate and distinct stationary finger gestures.

FIG. 5BB illustrates the appearance of a progress indicator following a plurality of separate and distinct stationary finger gestures (e.g., touch and rest gestures). In FIG. 5BB, the progress indicator resembles a faux fingerprint with a plurality of ridges. In FIG. 5BB, the ridges of the progress indicator are thickened (or darkened) as fingerprint information is collected from the finger gestures. In some embodiments, the ridges of the progress indicator are thickened in accordance with a predefined pattern. In FIG. 5BB, for example, the appearance of the progress indicator is the same after finger gesture 5 as it was after finger gesture 4 because fingerprint information was not collected during finger gesture 5. In this example, fingerprint information was not collected during finger gesture 5 due to the user not resting their finger on the fingerprint sensor for long enough (e.g., message 522 in FIG. 5F), the user clicking the home button (e.g., message 564 in FIG. 5Q), or the user failing to move their finger between finger gestures (e.g., message 516 in FIG. 5D). In FIG. 5BB, the progress indicator expands after finger gesture 7 to indicate that additional fingerprint information needs to be collected for the edges of the fingerprint to enroll the fingerprint.

FIG. 5CC illustrates the appearance of a progress indicator following a plurality of separate and distinct stationary finger gestures (e.g., touch and rest gestures). In FIG. 5CC, the progress indicator includes a plurality of concentric circles (e.g., resembling a bull's-eye). In FIG. 5CC, circles (or rings) of the progress indicator are filled in starting from the inner most circle as fingerprint information is collected from the finger gestures. In FIG. 5CC, for example, the appearance of the progress indicator is the same after finger gesture 5 as it was after finger gesture 4 because fingerprint information was not collected during finger gesture 5. In this example, fingerprint information was not collected during finger gesture 5 due to the user not resting their finger on the fingerprint sensor for long enough (e.g., message 522 in FIG. 5F), the user clicking the home button (e.g., message 564 in FIG. 5Q), or the user failing to move their finger between finger gestures (e.g., message 516 in FIG. 5D). In FIG. 5CC, the progress indicator expands after finger gesture 7 to indicate that additional fingerprint information needs to be collected to enroll the fingerprint.

FIG. 5DD illustrates the appearance of a progress indicator following a plurality of separate and distinct stationary finger gestures (e.g., touch and rest gestures). In FIG. 5DD, the progress indicator includes a plurality of progress-indicator portions (e.g., hexagonal geometric shapes in a honeycomb layout). In FIG. 5DD, progress-indicator portions (e.g., hexagons) of the progress indicator are filled in relative to the location of the fingerprint information collected from the previous finger gesture. In FIG. 5DD, for example, after finger gesture 1 is performed, progress-indicator portions in the lower left region of the progress indicator are filled in to indicate that fingerprint information for the lower left region of the fingerprint was collected from finger gesture 1. In FIG. 5DD, the progress indicator expands after finger gesture 6 to indicate that additional fingerprint information needs to be collected for the edges of the fingerprint to enroll the fingerprint. In FIG. 5DD, for example, the appearance of the progress indicator is the same after finger gesture 10 as it was after finger gesture 9 because fingerprint information was not collected during finger gesture 10. In this example, fingerprint information was not collected during finger gesture 10 due to the user not resting their finger on the fingerprint sensor for long enough (e.g., message 522 in FIG. 5F), the user clicking the home button (e.g., message 564 in FIG. 5Q), or the user failing to move their finger between finger gestures (e.g., message 516 in FIG. 5D).

FIG. 5EE illustrates the appearance of a progress indicator following a plurality of separate and distinct stationary finger gestures (e.g., touch and rest gestures). In FIG. 5EE, the progress indicator (e.g., a partially displayed sphere) includes a plurality of progress-indicator portions (e.g., boxed regions on the partially displayed sphere). In FIG. 5EE, progress-indicator portions (e.g., boxed regions) of the progress indicator are filled in relative to the location of the fingerprint information collected from the previous finger gesture. In FIG. 5EE, for example, after finger gesture 1 is performed, progress-indicator portions near the origin of the equator of the progress indicator are filled in to indicate that fingerprint information for the middle of the fingerprint was collected from finger gesture 1. In FIG. 5EE, for example, the appearance of the progress indicator is the same after finger gesture 9 as it was after finger gesture 8 because fingerprint information was not collected during finger gesture 9. In this example, fingerprint information was not collected during finger gesture 9 due to the user not resting their finger on the fingerprint sensor for long enough (e.g., message 522 in FIG. 5F), the user clicking the home button (e.g., message 564 in FIG. 5Q), or the user failing to move their finger between finger gestures (e.g., message 516 in FIG. 5D).

FIGS. 6A-6D are flow diagrams illustrating a method 600 of enrolling fingerprints with a device in accordance with some embodiments. Method 600 is performed at an electronic device (e.g., device 300, FIG. 3, or portable multifunction device 100, FIG. 1A) with a display and a fingerprint sensor. In some embodiments, the display is a touch screen display and the fingerprint sensor is on the display. In some embodiments, the display is separate from the fingerprint sensor. Some operations in method 600 are, optionally, combined and/or the order of some operations is, optionally, changed.

As described below, method 600 provides an intuitive way to enroll fingerprints with a device. The method reduces the cognitive burden on a user when enrolling fingerprints with a device, thereby creating a more efficient human-machine interface. For battery-operated electronic devices, enabling a user to enroll fingerprints with a device faster and more efficiently conserves power and increases the time between battery charges.

The devices displays (602) a fingerprint enrollment interface. In some embodiments, the fingerprint enrollment interface is displayed as part of a device set up process. For example, FIGS. 5A-5M illustrate a device set up process including a fingerprint enrollment process in FIGS. 5B-5K, a purchase set up process in FIG. 5L, and a passcode set up process in FIG. 5M. In FIGS. 5B-5K, the fingerprint enrollment process includes a first enrollment interface in FIGS. 5B-5G with an un-expanded progress indicator, a second enrollment in FIGS. 5H-5J with an expanded progress indicator, and a third enrollment interface in FIG. 5K with text indicating that the fingerprint enrollment process was successful. In some embodiments, during the device setup process, the fingerprint enrollment interface is displayed before displaying a passcode set up interface. For example, the fingerprint enrollment process shown in FIGS. 5B-5K occurs prior to the display of the passcode set up interface in FIG. 5M in response to detecting contact 506 at a location corresponding to "Set up now" box 502 in FIG. 5A.

In some embodiments, if the fingerprint enrollment interface is dismissed without enrolling a fingerprint, a passcode set up interface is displayed. For example, in response to detecting a contact at a location corresponding to "Set up later" box 504 in FIG. 5A, the device displays the passcode set up interface in FIG. 5M.

In some embodiments, the fingerprint enrollment interface is displayed as part of a device settings user interface. For example, FIGS. 5O-5T illustrate a fingerprint enrollment process initiated in response to detecting contact 556 at a location corresponding to "Add Fingerprint" box 554 in the fingerprint settings interface in FIG. 5N. In FIGS. 5O-5T, the fingerprint enrollment process includes a first enrollment interface in FIGS. 5O-5Q with an un-expanded progress indicator, a second enrollment in FIGS. 5R-5S with an expanded progress indicator, and a third enrollment interface in FIG. 5T with text indicating that the fingerprint enrollment process was successful.

The device detects (604) on the fingerprint sensor a plurality of separate and distinct stationary finger gestures performed with a respective finger. For example, the plurality of separate and distinct stationary finger gestures are gestures in which the respective finger does not move laterally across the fingerprint sensor, such as tap and hold gestures on the fingerprint sensor. Thus, in some embodiments, the plurality of finger gestures are not swipe gestures over the fingerprint sensor. For example, device 100 detects seven separate and distinct finger gestures (e.g., touch and rest gestures) on fingerprint sensor 169 during the fingerprint enrollment process illustrated in FIGS. 5B-5K. As another example, device 100 detects five separate and distinct finger gestures (e.g., touch and rest gestures) on fingerprint sensor 169 during the fingerprint enrollment process illustrated in FIGS. 5N-5T.

The device collects (606) fingerprint information from the plurality of separate and distinct stationary finger gestures performed with the respective finger. For example, device 100 collects (or attempts to collect) fingerprint information from the fingerprint detected on fingerprint sensor 169 as part of each of the seven separate and distinct finger gestures (e.g., touch and rest gestures) during the fingerprint enrollment process illustrated in FIGS. 5B-5K. As another example, device 100 collects (or attempts to collect) fingerprint information from the fingerprint detected on fingerprint sensor 169 as part of each of the seven separate and distinct finger gestures (e.g., touch and rest gestures) during the fingerprint enrollment process illustrated in FIGS. 5N-5T.

In some embodiments, fingerprint information from the plurality of separate and distinct stationary finger gestures is collected (608) for an area of the fingerprint of the respective finger that is at least twice as large as the area that can be captured by the fingerprint sensor during a single stationary finger gesture. For example, the whole fingerprint cannot be captured based on a single stationary finger gesture because the fingerprint sensor is substantially smaller than the relevant area of the fingerprint. In some embodiments, the fingerprint information collected from the plurality of separate and distinct stationary finger gestures corresponds to more than a 100 $mm^2$ area of the fingerprint of the respective finger while the fingerprint sensor has smaller sensor area such as 50 $mm^2$ or 25 $mm^2$ or less.

In some embodiments, while the respective finger is on the fingerprint sensor during a respective stationary gesture, the device: collects (610) fingerprint information; and after the fingerprint information has been collected, provides haptic feedback at the device to indicate that the fingerprint information has been collected. For example, the device vibrates slightly to indicate to the user that fingerprint information for the current stationary finger gesture has been collected and that a next finger gesture can be performed. In some embodiments, it takes the device a respective amount of time to collect fingerprint information and the haptic feedback is provided after the finger has been on the fingerprint sensor for at least the respective amount of time. For example, message 522 in FIG. 5F indicates that device 100 was unable to collect fingerprint information from the fourth finger gesture detected in FIG. 5E because the user did not rest their finger on fingerprint sensor 169 for a time period long enough to collect fingerprint information. In some embodiments, message 522 includes instructions directing the user to rest their finger on fingerprint sensor 169 integrated in home button 204 until the user feels a slight vibration indicating that fingerprint was collected and that the user can lift their finger from fingerprint sensor 169. In some implementations, the respective amount of time to collect fingerprint information from each fingerprint gesture is less than one second. In some implementations, the respective amount of time to collect fingerprint information from each fingerprint gesture is less than one second and greater than 0.1 seconds. In some implementations, the respective amount of time to collect fingerprint information from each fingerprint gesture is at least 0.25 seconds and no greater the 0.75 seconds.

In some embodiments, the fingerprint enrollment interface includes (612) a progress indicator, and in response to detecting on the fingerprint sensor a respective stationary finger gesture performed with the respective finger, the device changes an appearance of the progress indicator to indicate the collection of additional fingerprint information from the respective stationary finger gesture. In FIGS. 5B-5K, the fingerprint enrollment process includes a first enrollment interface in FIGS. 5B-5G with an un-expanded progress indicator and a second enrollment in FIGS. 5H-5J with an expanded progress indicator. In this example, an appearance of the progress indicator is changed (e.g., ridges are thickened) as fingerprint information is collected from the plurality of separate and distinct finger gestures (e.g., touch and rest finger gestures).

In some embodiments, the fingerprint enrollment interface also includes a message prompting a user to rest their finger on the fingerprint sensor in a representative manner, and the progress indicator is a faux/stock fingerprint. For example, the first enrollment interface in FIGS. 5B-5G includes instructions directing the user to perform multiple finger gestures (e.g., touch and rest gestures) on fingerprint sensor 169 integrated in home button 204. In FIGS. 5B-5J, for example, progress indicator 510 resembles a faux fingerprint.

In some embodiments, the changes in the appearance of the progress indicator illustrate the amount of collected fingerprint information relative to an amount of fingerprint information necessary to enroll the fingerprint. FIGS. 5BB-5EE illustrate changes in the appearance of different progress indicators following a plurality of separate and distinct finger gestures (e.g., touch and rest gestures). Each of the progress indicators in FIGS. 5BB-5EE illustrate the amount of fingerprint information collected compared to the amount of fingerprint information necessary to enroll the fingerprint. In FIG. 5BB, for example, thick ridges indicate an amount of fingerprint information that has been collected and narrow ridges indicate an amount of fingerprint information that has not been collected. In FIG. 5CC, for example, filled (or shaded) circles/rings indicate fingerprint information that has been collected and the total number of circles/rings indicate the total amount of fingerprint information that is necessary to enroll the fingerprint. In FIG. 5DD, for example, filled (or shaded) hexagons indicate fingerprint information that has been collected and the total number of hexagons indicate the total amount of fingerprint information that is necessary to enroll the fingerprint. In FIG. 5EE, for example, filled (or shaded) boxed regions of the partially displayed sphere indicate fingerprint information that has been collected and the total number of boxed regions of the partially displayed sphere indicate the total amount of fingerprint information that is necessary to enroll the fingerprint.

In some embodiments, as additional fingerprint information is collected, portions of the progress indicator are filled in, in a predefined sequence, without regard to which fingerprint portion was detected. In FIGS. 5B-5J, for example, the ridges of progress indicator 510 are thickened in accordance with a predefined pattern without regard to which fingerprint portion was detected. In some embodiments, the portions of the progress indicator are filled in based on the portions of the fingerprint for which fingerprint information has been collected. In FIG. 5DD, for example, the progress indicator includes a plurality of progress-indicator portions (e.g., hexagonal geometric shapes in a honeycomb layout). In FIG. 5DD, progress-indicator portions (e.g., hexagons) of the progress indicator are filled in relative to the location of the fingerprint information collected from the previous finger gesture. In FIG. 5EE, the progress indicator (e.g., a partially displayed sphere) includes a plurality of progress-indicator portions (e.g., boxed regions on the partially displayed sphere). In FIG. 5EE, progress-indicator portions (e.g., boxed regions) of the progress indicator are filled in relative to the location of the fingerprint information collected from the previous finger gesture.

In some embodiments, the progress indicator includes (614) a portion of a surface of a three-dimensional object (e.g., a sphere or other ellipsoid). In FIG. 5EE, the progress indicator resembles a sphere where a portion of the sphere's surface is displayed.

In some embodiments, the progress indicator is (616) in the shape of a fingerprint (e.g., a stock or faux fingerprint) and includes lines that are representative of fingerprint ridges and changing the appearance of the progress indicator includes coloring in a portion of the plurality of ridges. In FIG. 5BB, for example, the progress indicator resembles a faux fingerprint with a plurality of ridges. In this example, ridges of the progress indicator are thickened or colored as fingerprint information is collected from the plurality of finger gestures.

In some embodiments, the progress indicator includes (618) a plurality of concentric circles and changing the appearance of the progress indicator includes filling in one of a plurality of concentric circles with a predefined fill (e.g., a predefined color and/or pattern). In FIG. 5CC, the progress indicator includes a plurality of concentric circles (e.g., resembling a bull's-eye). In some embodiments, the concentric circles are filled with the predefined fill starting from the innermost circle to the outermost circle. In FIG. 5CC, circles (or rings) of the progress indicator are filled in starting from the inner most circle as fingerprint information is collected from the finger gestures. In some embodiments, the concentric circles are filled with the predefined fill starting from the outermost circle to the innermost circle.

In some embodiments, the progress indicator includes (620) a plurality of progress-indicator portions that correspond to fingerprint portions of the respective fingerprint, and when fingerprint information from a respective fingerprint portion is collected, the device changes an appearance of the corresponding progress-indicator portion to indicate that fingerprint information from the respective fingerprint portion has been collected. In some embodiments, the progress-indicator portions are representations of fingerprint ridges. For example, after each finger gesture, a region of the user's fingerprint corresponding to the fingerprint information collected from the previous finger gesture is presented in the progress indicator. In this example, the progress indicator resembles a representative image of the user's fingerprint that is built-up from the plurality finger gestures (e.g., a patchwork of images or scans of the user's fingerprint). In this example, once a complete representative image of the user's fingerprint is presented, the user's fingerprint is enrolled with the device. In some embodiments, the representative image of the user's fingerprint is deleted from the device upon enrollment of the fingerprint. In some embodiments, the progress-indicator portions are geometric shapes (e.g., hexagons in a honeycomb layout). In FIG. 5DD, the progress indicator resembles a honeycomb layout with a plurality of progress-indicator portions where each progress-indicator portion is a hexagonal geometric shape. In FIG. 5DD, the hexagons of the progress indicator are filled in relative to the location of the fingerprint information collected from the previous finger gesture. In FIG. 5EE, the progress indicator resembles a partially displayed sphere with a plurality of progress-indicator portions where each progress-indicator portion is a boxed regions on the partially displayed sphere. In FIG. 5EE, the boxed regions of the progress indicator are filled in relative to the location of the fingerprint information collected from the previous finger gesture.

After collecting the fingerprint information, the device determines (622), based on fingerprint information collected for the respective finger, whether the fingerprint information that has been collected is sufficient to enroll a fingerprint of the respective finger with the device. In some embodiments, a maximum number of images captured from each finger gesture are able to be combined to produce the necessary fingerprint information. For example, in some implementations, a maximum of 15 images from each of 15 finger gestures may be combined to produce the necessary fingerprint information.

In some embodiments, the collected fingerprint information is sufficient to enroll the fingerprint of the respective finger when the collected fingerprint information satisfies predefined criteria. In some embodiments, the predefined criteria include a threshold amount of fingerprint information (e.g., a threshold amount of surface area). In some embodiments, the threshold amount of fingerprint information is a predefined minimum amount of non-overlapping fingerprint area. For example, 15 images collected from each of 15 finger gestures are combined to produce at least 200 $mm^2$ of non-overlapping area of a fingerprint, where 200 $mm^2$ is the predefined minimum amount of area necessary to enroll a fingerprint. In some embodiments, the threshold amount of fingerprint information is a multiple of the surface area of the fingerprint sensor. For example, when the fingerprint sensor is 25 $mm^2$, a sufficient amount of fingerprint information is an amount of non-overlapping fingerprint area that is 8 times the surface area of the fingerprint sensor (e.g., 200 $mm^2$). In some embodiments, the predefined criteria include a predetermined quality of images collected from the plurality of finger gestures. For example, if the user's fingerprint from a respective finger gesture is too dirty, too faint, or otherwise fails to meet some other predetermined standard, the quality of the image collected from that finger gesture will not satisfy the quality criterion. In some embodiments, the predefined criteria require a predefined degree of contiguousness between images collected from the plurality of finger gestures. In some embodiments, the predefined criteria require that the fingerprint information collected be from a same finger.

In accordance with a determination that the fingerprint information that has been collected for the respective finger is sufficient to enroll the fingerprint of the respective finger, the device enrolls (624) the fingerprint of the respective finger with the device. In FIG. 5K, for example, device 100 determines that the first fingerprint (e.g., the fingerprint corresponding to the user's right index finger) has been successfully enrolled with device 100 after detecting the seventh finger gesture in FIG. 5I. In FIG. 5T, for example, device 100 determines that the second fingerprint (e.g., the fingerprint corresponding to the user's left index finger) has been successfully enrolled with device 100 after detecting the fifth finger gesture in FIG. 5S.

In accordance with a determination that the fingerprint information that has been collected for the respective finger is not sufficient to enroll the fingerprint of the respective finger, the device displays (626) a message in the fingerprint enrollment interface prompting a user to perform one or more additional stationary finger gestures on the fingerprint sensor with the respective finger. In FIGS. 5C-5I, for example, device 100 determines that the fingerprint information collected for the respective finger is not sufficient to enroll the fingerprint of the respective finger. In FIGS. 5C-5G, for example, device 100 displays instructions in a first fingerprint enrollment interface directing the user to perform one or more additional finger gestures on fingerprint sensor 169, which is integrated in home button 204, and, in FIGS. 5H-5I, for example, device 100 displays instructions in a second fingerprint enrollment interface directing the user to adjust their grip when performing one or more additional finger gestures on fingerprint sensor 169 integrated in home button 204 so as to capture the edges of the fingerprint.

In some embodiments, the message prompting the user to perform one or more additional finger gestures includes (628) displayed instructions to perform subsequent finger gestures differently from the respective finger gesture. In some embodiments, device 100 displays one of a plurality of predefined messages or warning notifications so as to encourage the user to perform subsequent finger gestures in a manner in which fingerprint information can be properly collected.

In some embodiments, the displayed message (628) includes displayed instructions to move the finger more between each finger gesture on the fingerprint sensor to collect information from the fingerprint with fewer finger gestures (e.g., "Move finger. Move your finger slightly between scans."). For example, message 516 in FIG. 5D indicates that device 100 was unable to collect fingerprint information from the second finger gesture detected in FIG. 5C because the user did not move their finger slightly as compared to the location of the first finger gesture. In some embodiments, while displaying the instructions to move the user's finger more between each finger gesture on the fingerprint sensor, device 100 provides negative haptic feedback (e.g., two consecutive vibrations) to get the user's attention and inform the user that device 100 was unable to collect fingerprint information from the previous finger gesture.

In some embodiments, the message includes displayed instructions to leave the finger on the fingerprint sensor for a longer period of time (e.g., "Please keep your finger on sensor."). For example, message 522 in FIG. 5F indicates that device 100 was unable to collect fingerprint information from the fourth finger gesture detected in FIG. 5E because the user did not rest their finger on fingerprint sensor 169 for a time period long enough to collect fingerprint information. In some embodiments, while displaying the message that includes displayed instructions to leave the user's finger on fingerprint sensor 169 for a longer period of time, device 100 provides negative haptic feedback (e.g., two consecutive vibrations) to get the user's attention and inform the user that device 100 was unable to collect fingerprint information from the previous finger gesture.

In some embodiments, the message includes displayed instructions to apply less pressure on the fingerprint sensor (e.g., "Oops. You clicked. Rest your finger on the home button until you feel a vibration without clicking it."). For example, message 564 in FIG. 5Q indicates that device 100 was unable to collect fingerprint information from the second finger gesture detected in FIG. 5P because the user clicked home button 204 instead of resting their finger on fingerprint sensor 169, integrated in home button 204. In some embodiments, while displaying the instructions to apply less pressure on fingerprint sensor 169, device 100 provides negative haptic feedback (e.g., two consecutive vibrations) to get the user's attention and to inform the user that the user needs to rest their finger on fingerprint sensor 169 without clicking or depressing home button 204.

In some embodiments, in which the fingerprint enrollment process is alignment dependent, the message includes displayed instructions to properly align the finger on fingerprint sensor 169 with a representation of proper finger alignment. In some such embodiments, while displaying the instructions to properly align the finger on fingerprint sensor 169, device 100 provides negative haptic feedback (e.g., two consecutive vibrations). However, in some other embodiments, the enrollment process is alignment independent.

In some embodiments, the message prompting the user to perform one or more additional finger gestures includes (630) an indication of one or more portions or locations of the respective fingerprint for which fingerprint information is inadequate or has not been collected (e.g., the message indicates that edges of the fingerprint are missing from the collected fingerprint information). In some embodiments, the message includes displayed instructions to change the part of the fingerprint that is in contact with the fingerprint sensor so that the device is able to capture a particular part of a fingerprint (e.g., instructions to place an edge of the finger on the fingerprint sensor), so that the device is able to capture a larger variety of fingerprint information (e.g., instructions to move the finger around more in between finger gestures). In FIGS. 5H-5I and 5R-5S, for example, device 100 displays instructions in a second fingerprint enrollment interface directing the user to adjust their grip when performing one or more additional finger gestures on fingerprint sensor 169 integrated in home button 204 so as to capture the edges of the fingerprint. In some embodiments, the message includes displayed instructions to change the part of the fingerprint that is in contact with the fingerprint sensor so that the device is better able to combine the information from the plurality of stationary finger gestures (e.g., instructions to move the finger around less in between finger gestures).

In some embodiments, after changing the appearance of a plurality of progress-indicator portions (e.g., by coloring in the plurality of progress-indicator portions with a respective color) and in accordance with a determination that the fingerprint information that has been collected for the respective finger is sufficient to enroll the fingerprint of the respective finger, the device changes (632) the appearance of one or more unchanged progress-indicator portions to match the appearance of the plurality of progress-indicator portions (e.g., by coloring in the entirety of the fingerprint shape in the progress indicator with the respective color). In FIG. 5J, for example, device 100 darkens or thickens all of the ridges of progress indicator 510 (in comparison to FIG. 5I) in accordance with the determination that the fingerprint information collected after detecting the seventh finger gesture in FIG. 5I is sufficient to enroll the fingerprint. In FIG. 5CC, for example, device 100 flood fills the progress indicator after detecting finger gesture 12 in accordance with the determination that the fingerprint information collected after detecting finger gesture 12 is sufficient to enroll the fingerprint.

In some embodiments, after enrolling fingerprint of the respective finger with the device, the device receives (634) a request to perform a restricted operation (e.g., unlocking the device, purchasing content or applications for the device, or displaying private information on the device), and the device detects a fingerprint on the fingerprint sensor. In FIG. 5X, for example, after enrolling the first fingerprint (e.g., corresponding to the user's right index finger) in FIGS. 5B-5K and the second fingerprint (e.g., corresponding to the user's left index finger) in FIGS. 5N-5T, device 100 receives a request to perform a restricted operation (e.g., unlock device 100) while the lock screen is displayed on touch screen 112. In this example, the request to perform the restricted operation includes a fingerprint 582 (e.g., corresponding to the user's right index finger) on fingerprint sensor 169. In FIG. 5Z, for example, after enrolling the first fingerprint (e.g., corresponding to the user's right index finger) in FIGS. 5B-5K and the second fingerprint (e.g., corresponding to the user's left index finger) in FIGS. 5N-5T, device 100 receives a request to perform a restricted operation (e.g., unlock device 100) while the lock screen is displayed on touch screen 112. In this example, the request includes fingerprint 584 (e.g., corresponding to the user's right thumb) on fingerprint sensor 169.

In some embodiments, in response to receiving (636) the request to perform the restricted operation and in accordance with a determination that the fingerprint is enrolled with the device, the device performs (638) the restricted operation. In FIG. 5Y, for example, in response to receiving the request to unlock device 100 in FIG. 5X and in accordance with a determination that fingerprint 582 is an enrolled fingerprint, device 100 unlocks (e.g., the restricted operation) and displays the home screen with a plurality of application icons on touch screen 112.

In some embodiments, in response to receiving (636) the request to perform the restricted operation and in accordance with a determination that the fingerprint is not enrolled with the device, the device forgoes (640) performance of the restricted operation. In FIG. 5AA, for example, in response to receiving the request to unlock device 100 in FIG. 5Z and in accordance with a determination that fingerprint 584 is not an enrolled fingerprint, device 100 maintains display of the lock screen on touch screen 112 and forgoes unlocking (e.g., the restricted operation).

In some embodiments, after enrolling the fingerprint of the respective finger with the device, the device: displays (642) a fingerprint settings interface with a plurality of entries (e.g., a plurality of entries in a list) that correspond to respective enrolled fingerprints, where the plurality of entries includes a respective entry that corresponds to the fingerprint of the respective finger and one or more other entries that correspond to other enrolled fingerprints of other fingers besides the respective finger; detecting a second finger gesture on the fingerprint sensor that corresponds to the fingerprint of the respective finger; and in response to detecting the second finger gesture, highlighting the respective entry that corresponds to the fingerprint of the respective finger (e.g., displaying a frame around the entry, increasing the line thickness of the entry, changing a text or fill color of the entry, etc.). In FIGS. 5U-5W, for example, device 100 displays a fingerprint settings interface on touch screen 112 with a list of enrolled fingerprints. In this example, the list of enrolled fingerprints include "Fingerprint 1" box 552 associated with the first fingerprint enrolled in FIGS. 5N-5T (e.g., corresponding to the user's right index finger) and "Fingerprint 2" box 574 associated with the second fingerprint enrolled in FIGS. 5B-5K (e.g., corresponding to the user's left index finger). In FIG. 5U, for example, in response to detecting fingerprint 576 (e.g., corresponding to the user's left index finger) on fingerprint sensor 169, device 100 increases the line thickness of (or otherwise highlights) "Fingerprint 2" box 574 to indicate that detected fingerprint 576 corresponds to the enrolled "Fingerprint 2." In FIG. 5V, for example, in response to detecting fingerprint 578 (e.g., corresponding to the user's right index finger) on fingerprint sensor 169, device 100 increases the line thickness of (or otherwise highlights) "Fingerprint 1" box 552 to indicate that detected fingerprint 578 corresponds to the enrolled "Fingerprint 1." In FIG. 5W, for example, in response to detecting fingerprint 580 (e.g., corresponding to the user's left thumb) on fingerprint sensor 169, device 100 maintains display of the fingerprint settings interface to indicate that detected fingerprint 580 does not correspond to any of the enrolled fingerprints.

In some embodiments, a given entry can be renamed (e.g., by typing in a new name for the entry while the fingerprint settings interface is in an edit mode) and/or deleted (e.g., by swiping across the entry and selecting a delete affordance that is displayed in response to detecting the swiping across the entry). In FIG. 5N, for example, device 100 displays a fingerprint settings interface on touch screen 112 with "Edit" affordance 546. "Edit" affordance 546, which, when activated, causes device 100 to change an appearance of the fingerprint settings interface (e.g., displaying a delete affordance next to each of the enrolled fingerprints) and causes device 100 to enter an edit mode whereby a user is enabled to delete or edit the names of enrolled fingerprints. In some embodiments, a limited number of fingerprints (e.g., 3, 5, 10 or other reasonable number) are allowed to be enrolled at a time so as to limit the amount of time that it takes to determine whether a fingerprint detected on the fingerprint sensor matches an enrolled fingerprint. For example, in some implementations, the number of enrolled fingerprints is limited such that a determination of whether a fingerprint detected on the fingerprint sensor matches an enrolled fingerprint can be completed within 0.5 seconds.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the "Description of Embodiments" section above) are also applicable in an analogous manner to method 600 described above with respect to FIGS. 6A-6D. For example, the fingerprints and gestures described above with reference to method 600 optionally have one or more of the characteristics of the fingerprints and gestures described herein with reference to other methods described herein (e.g., those listed in the "Description of Embodiments" section above). For brevity, these details are not repeated here.

Figure 7:
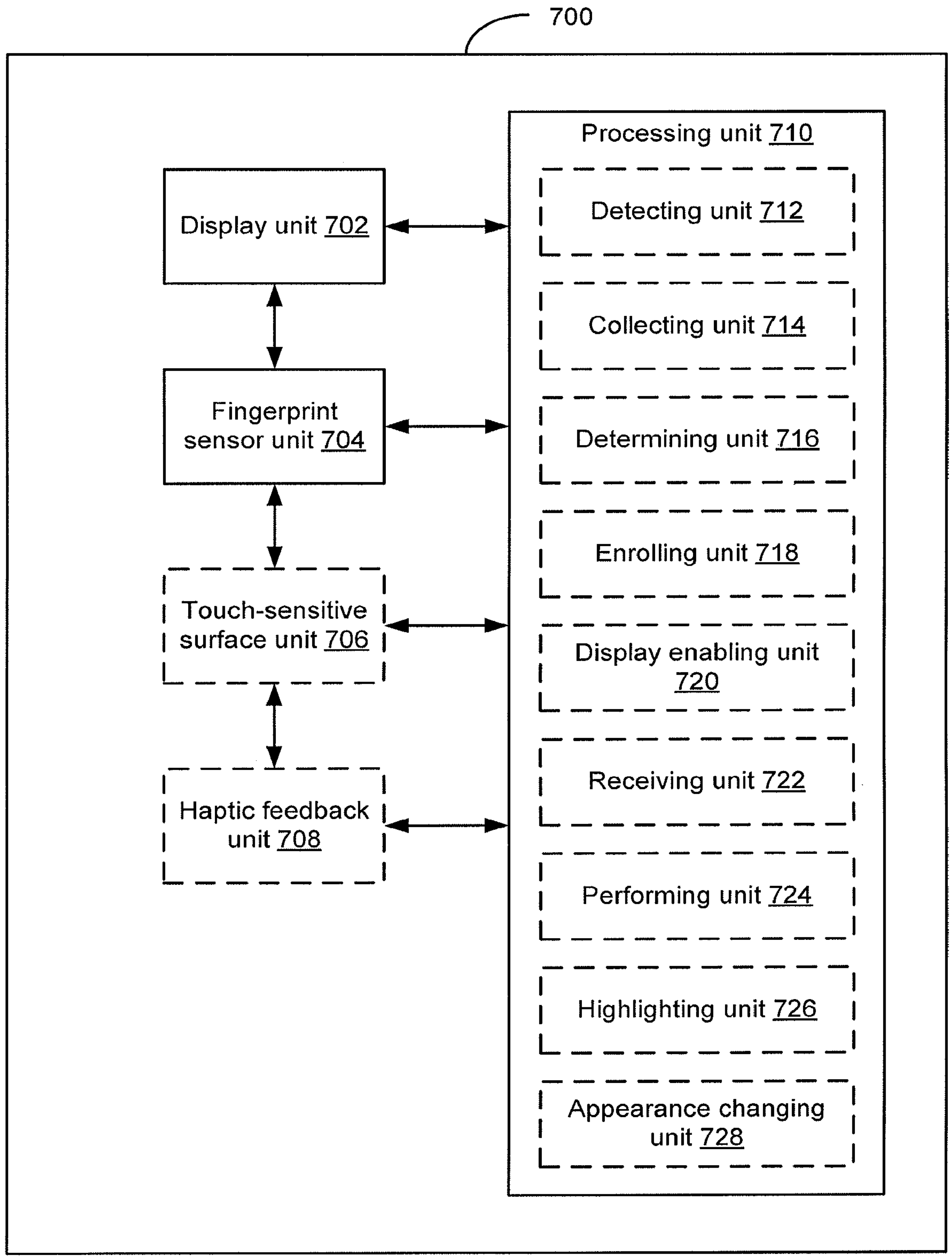
FIG. 7 is a functional block diagram of an electronic device in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, electronic device 700 includes a display unit 702 configured to display a fingerprint enrollment interface and a fingerprint sensor unit 704. In some embodiments, electronic device 700, optionally, includes a touch-sensitive surface unit 706 configured to receive one or more touch inputs and a haptic feedback unit configured to provide haptic feedback. Electronic device 700 also includes a processing unit 710 coupled to display unit 702 and fingerprint sensor unit 704, and, optionally, coupled to touch-sensitive surface unit 706 and haptic feedback unit 708. In some embodiments, processing unit 710 includes a detecting unit 712, a collecting unit 714, a determining unit 716, an enrolling unit 718, a display enabling unit 720, a receiving unit 722, a performing unit 724, a highlighting unit 726, and an appearance changing unit 728.

Processing unit 710 is configured to: detect (e.g., with detecting unit 712) on fingerprint sensor unit 704 a plurality of separate and distinct stationary finger gestures performed with a respective finger; and collect (e.g., with collecting unit 714) fingerprint information from the plurality of separate and distinct stationary finger gestures performed with the respective finger. After collecting the fingerprint information, processing unit 710 is configured to determine (e.g., with determining unit 716), based on the fingerprint information collected for the respective finger, whether the fingerprint information that has been collected is sufficient to enroll a fingerprint of the respective finger with the device. In accordance with a determination that the fingerprint information that has been collected for the respective finger is sufficient to enroll the fingerprint of the respective finger, processing unit 710 is configured to enroll (e.g., with enrolling unit 718) the fingerprint of the respective finger with electronic device 700. In accordance with a determination that the fingerprint information that has been collected for the respective finger is not sufficient to enroll the fingerprint of the respective finger, processing unit 710 is configured to enable display of (e.g., with the display enabling unit 720) a message in the fingerprint enrollment interface prompting a user to perform one or more additional stationary finger gestures on fingerprint sensor unit 704 with the respective finger.

In some embodiments, fingerprint information from the plurality of separate and distinct stationary finger gestures is collected for an area of the fingerprint of the respective finger that is at least twice as large as the area that can be captured by fingerprint sensor unit 704.

In some embodiments, processing unit 710 is configured to receive (e.g., with receiving unit 722) a request to perform a restricted operation and detect (e.g., with detecting unit 712) a fingerprint on fingerprint sensor 704. In response to receiving the request to perform the restricted operation, processing unit 710 is configured to: in accordance with a determination that the fingerprint is enrolled with the device, perform (e.g., with the performing unit 724) the restricted operation; and in accordance with a determination that the fingerprint is not enrolled with the device, forgo performance of the restricted operation.

In some embodiments, the message prompting the user to perform one or more additional finger gestures includes displayed instructions to perform subsequent finger gestures differently from the respective finger gesture.

In some embodiments, the message prompting the user to perform one or more additional finger gestures includes an indication of one or more portions or locations of the respective fingerprint for which fingerprint information is inadequate or has not been collected.

In some embodiments, processing unit 710 is configured to collect (e.g., with collecting unit 714) fingerprint information while the respective finger is on fingerprint sensor unit 704 during a respective stationary gesture. Electronic device 700 includes a haptic feedback unit 708 configured to, after the fingerprint information has been collected, provide haptic feedback at electronic device 700 to indicate that the fingerprint information has been collected.

In some embodiments, after enrolling the fingerprint of the respective finger with electronic device 700, processing unit 710 is configured to: enable display of (e.g., with display enabling unit 720) a fingerprint settings interface with a plurality of entries that correspond to respective enrolled fingerprints, where the plurality of entries includes a respective entry that corresponds to the fingerprint of the respective finger and one or more other entries that correspond to other enrolled fingerprints of other fingers besides the respective finger; detect (e.g., with detecting unit 712) a second finger gesture on fingerprint sensor unit 704 that corresponds to the fingerprint of the respective finger; and in response to detecting the second finger gesture, highlight (e.g., with highlighting unit 726) the respective entry that corresponds to the fingerprint of the respective finger.

In some embodiments, the fingerprint enrollment interface includes a progress indicator, and, in response to detecting on fingerprint sensor unit 704, processing unit 710 is configured to change (e.g., with appearance changing unit 728) an appearance of the progress indicator to indicate the collection of additional fingerprint information from the respective stationary finger gesture.

In some embodiments, the progress indicator includes a portion of a surface of a three-dimensional object.

In some embodiments, the progress indicator is in the shape of a fingerprint and includes lines that are representative of fingerprint ridges, and changing the appearance of the progress indicator includes coloring (e.g., with appearance changing unit 728) in a portion of the plurality of ridges.

In some embodiments, the progress indicator includes a plurality of concentric circles, and changing the appearance of the progress indicator includes filling (e.g., with appearance changing unit 728) in one of a plurality of concentric circles with a predefined fill.

In some embodiments, the progress indicator includes a plurality of progress-indicator portions that correspond to fingerprint portions of the respective fingerprint, and when fingerprint information from a respective fingerprint portion is collected, processing unit 710 is configured to change (e.g., with appearance changing unit 728) an appearance of the corresponding progress-indicator portion to indicate that fingerprint information from the respective fingerprint portion has been collected.

In some embodiments, processing unit 710 is configured, after changing the appearance of a plurality of progress-indicator portions and in accordance with a determination that the fingerprint information that has been collected for the respective finger is sufficient to enroll the fingerprint of the respective finger, to change (e.g., with appearance changing unit 728) the appearance of one or more unchanged progress-indicator portions to match the (already changed) appearance of the plurality of progress-indicator portions.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6D are, optionally, implemented by components depicted in FIGS. 1A-1B or FIG. 7. For example, detecting operation 602, collecting operation 606, determining operation 622, and enrolling operation 624 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Performing Operations Based on Fingerprints

Many electronic devices are configured to perform various operations. Existing methods for performing operations typically require performing a respective operation in response to a respective input. For example, with existing methods, a user typically provides an input to perform a single operation. When the user wants to perform a different operation, the user needs to navigate through menus, or to provide a different input, to perform a different operation. In addition, certain secure operations involve private information (e.g., credit card information, passwords, etc.) or restricted features. Such secure operations typically require authentication of the user (e.g., using a passcode). Thus, it is cumbersome and inefficient to perform multiple operations, including secure operations. In the embodiments described below, an improved method for performing operations is achieved by performing multiple operations in response to a single input. Non-secure operations (e.g., resetting a display dim timer) are performed in response to a fingerprint input regardless of an identity of the fingerprint (e.g., regardless of whether the fingerprint belongs to an authorized user), whereas secure operations (e.g., revealing private information) are performed in response to the fingerprint input when the fingerprint input includes a fingerprint that matches a pre-registered (e.g., enrolled) fingerprint. This method streamlines performing multiple operations in response to a fingerprint input, thereby eliminating the need for extra, separate steps to perform the multiple operations.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 8A-8W and 9A-9B includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 8A-8W and 9A-9B will be discussed with reference to display 450, a separate touch-sensitive surface 451 and a separate fingerprint sensor 359-2, however analogous operations are, optionally, performed on a device with an integrated fingerprint sensor 359-1 in response to detecting the inputs described in FIGS. 8A-8W on the integrated fingerprint sensor 359-1 while displaying the user interfaces shown in FIGS. 8A-8B on the display 450. Additionally, analogous operations are, optionally, performed on a device with a touch screen 112 in response to detecting the contacts described in FIGS. 8A-8W on a fingerprint sensor 169 (e.g., an integrated fingerprint sensor 359-1 or a separate fingerprint sensor 359-2) while displaying the user interfaces shown in FIGS. 8A-8W on the touch screen 112.

FIGS. 8A-8W illustrate exemplary user interfaces for performing operations based on fingerprints in accordance with some embodiments.

FIG. 8A illustrates an exemplary user interface for a shopping web page. The exemplary user interface includes a plurality of input fields (e.g., 802-1 through 802-8) and representations of information in respective input fields (e.g., 804). The representations of information in the respective input fields are distinct from the information in the respective input fields. These representations are sometimes called redacted representations, and the information in these input fields is sometimes called redacted information. For example, as illustrated, the redacted representations of information in the respective input fields indicate that the respective input fields contain information, but do not reveal the information in the respective input fields. Although redacted information in the respective input fields are represented with solid dots (e.g., a single solid dot representing a respective character in the respective input fields) in FIG. 8A, redacted information in the respective input fields may be represented using any other characters, shapes, or visual representations that do not directly convey the information in the respective input fields. In some implementations, one or more of the input fields in a respective user interface contain non-redacted information, and those input fields show the information in those input fields, while others of the input fields contain redacted information, as represented by redacted representations.

FIG. 8A also illustrates a display dim timer 896-1 and a credential-authorization timer 898-1. The display dim timer 896-1 and the credential-authorization timer 898-1 in FIG. 8A indicate that the display dim timer 896-1 and the credential-authorization timer 898-1 are in respective reset positions. In some embodiments, the display dim timer 896-1 is a timer that is used to determine when to dim the display of the device 100. In some embodiments, the credential-authorization timer 898-1 is a timer that is used to determine when enrolled fingerprints are no longer authorized to authenticate a user of the device 100. Although the display dim timer 896-1 and the credential-authorization timer 898-1 are illustrated in FIG. 8A to describe certain operations of the device 100, the display dim timer 896-1 and the credential-authorization timer 898-1 are not necessarily shown on the touch screen 112. In some embodiments, the display dim timer 896-1 is shown on the touch screen 112. In other embodiments, the display dim timer 896-1 is not shown on the touch screen 112. In some embodiments, the credential-authorization timer 898-1 is shown on the touch screen 112. In other embodiments, the credential-authorization timer 898-1 is not shown on the touch screen 112.

Figure 8B:
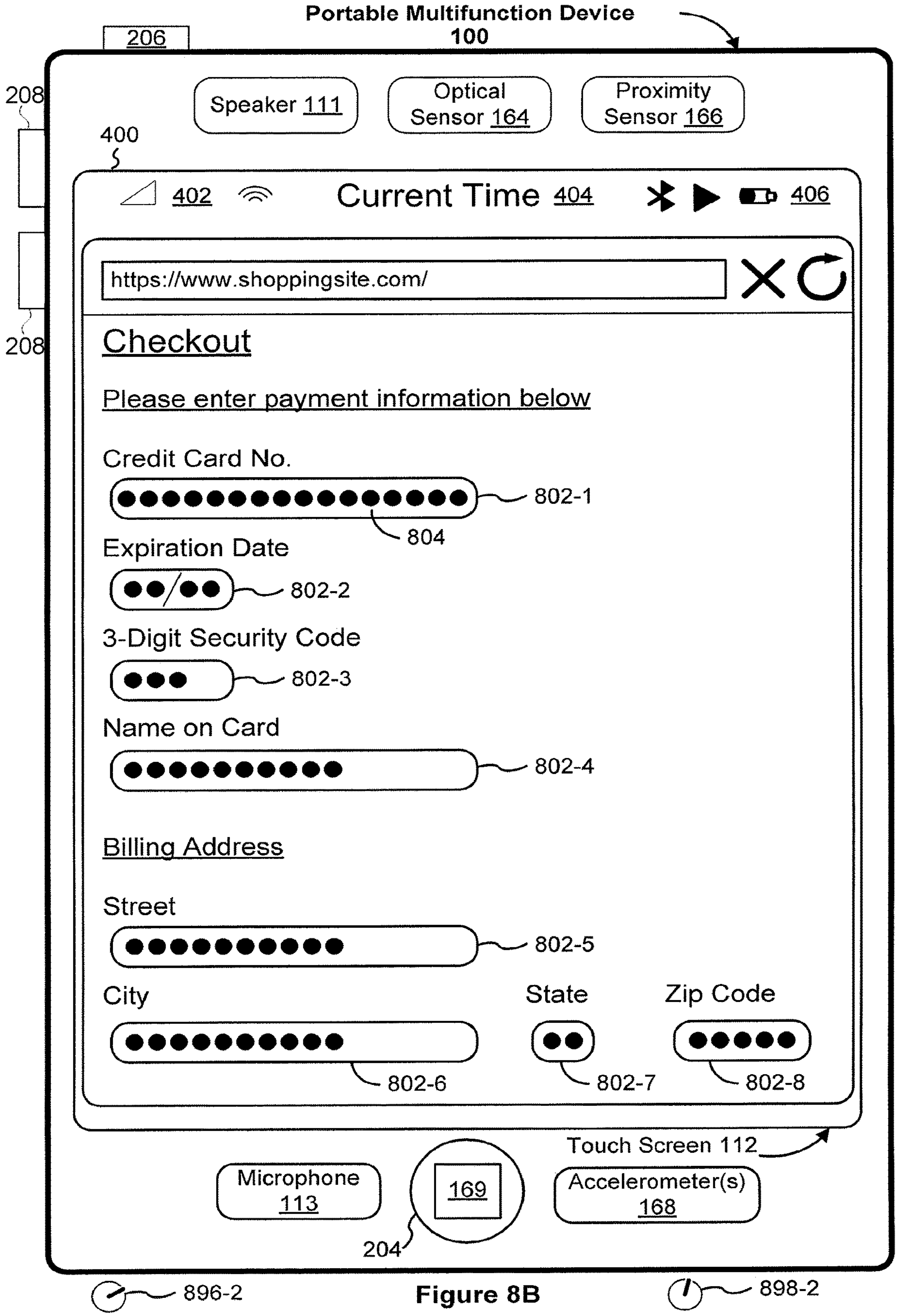

FIG. 8B illustrates the display dim timer 896-2 and the credential-authorization timer 898-2 that indicate that time has elapsed. As illustrated in FIG. 8B, in some embodiments, the display dim timer 896-1 expires faster than the credential-authorization timer 898-1. For example, in some embodiments, the display dim timer 896-1 expires within a minute, and the credential-authorization timer 898-1 expires in 24 or 48 hours. In some implementations, the dim timer has an expiration period that is user selectable, for example, to any of a set of predefined dim timer expiration periods, such as 1 minute, 2 minutes, 5 minutes and 10 minutes. In some implementations, the credential-authorization timer has a default expiration period (e.g., 48 hours) that can be overridden by the user or by a corporate policy that includes one or more default setting value overrides. If overridden, the authorization timer expiration period is set to a shorter period (e.g., 24 hours, 12 hours, 6 hours, 4 hours, or 2 hours) than the default expiration period.

Figure 8C:
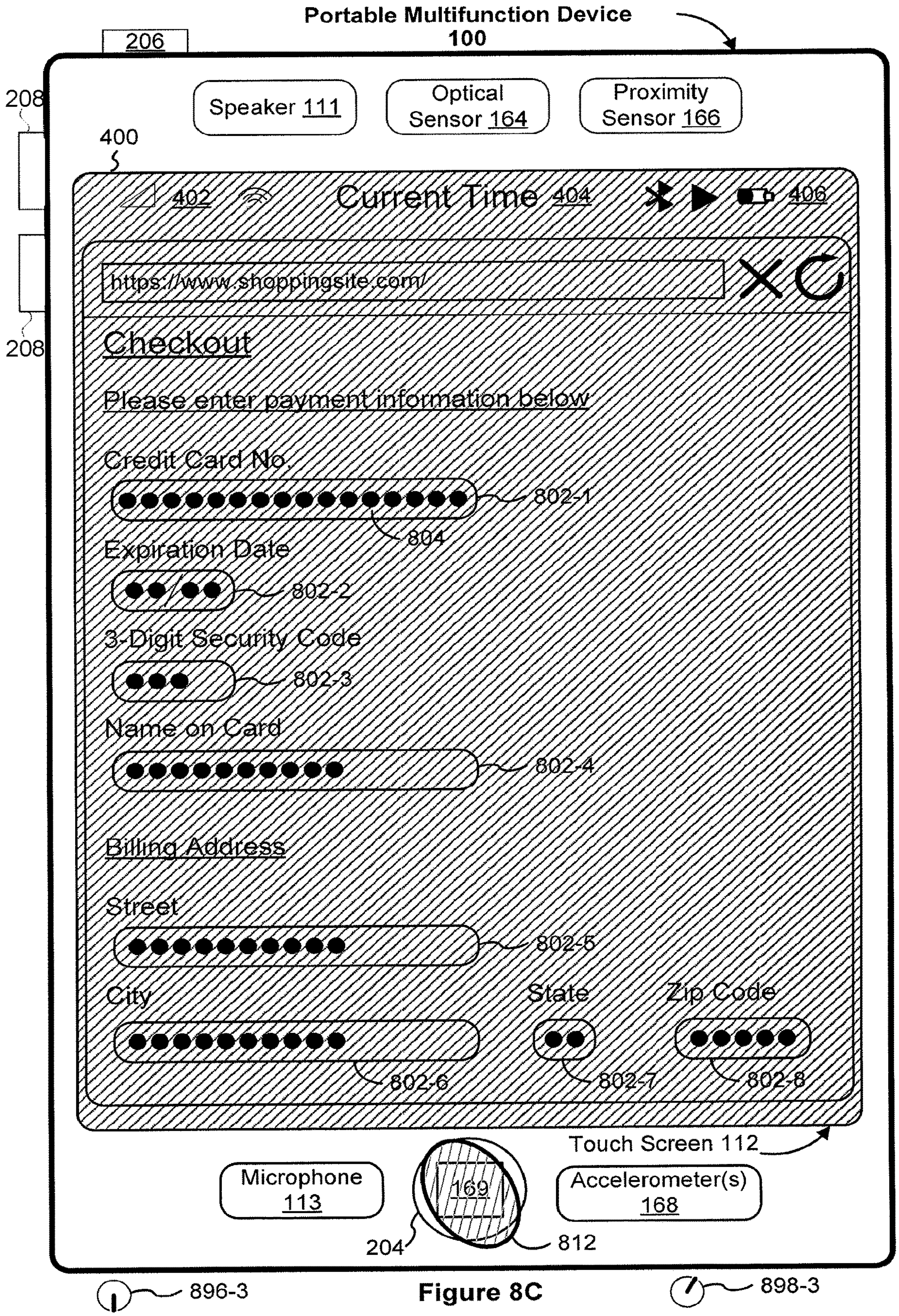

FIG. 8C illustrates that further time has elapsed, and the display dim timer 896-3 has expired. In accordance with a determination that the display dim timer has expired, the touch screen 112 is automatically dimmed (e.g., a brightness of the touch screen 112 is reduced).

FIG. 8C also illustrates that, while the touch screen 112 is dimmed, an input 812 (e.g., a finger contact or a contact with an object) is detected on the fingerprint sensor 169. In some embodiments, in accordance with a determination that the input 812 does not include a fingerprint (e.g., a contact with an object such as a pen), the input 812 is ignored (e.g., no operation is performed in response to the input 812). In some embodiments, in accordance with a determination that the input 812 includes a fingerprint, one or more operations are performed.

Figure 8D:
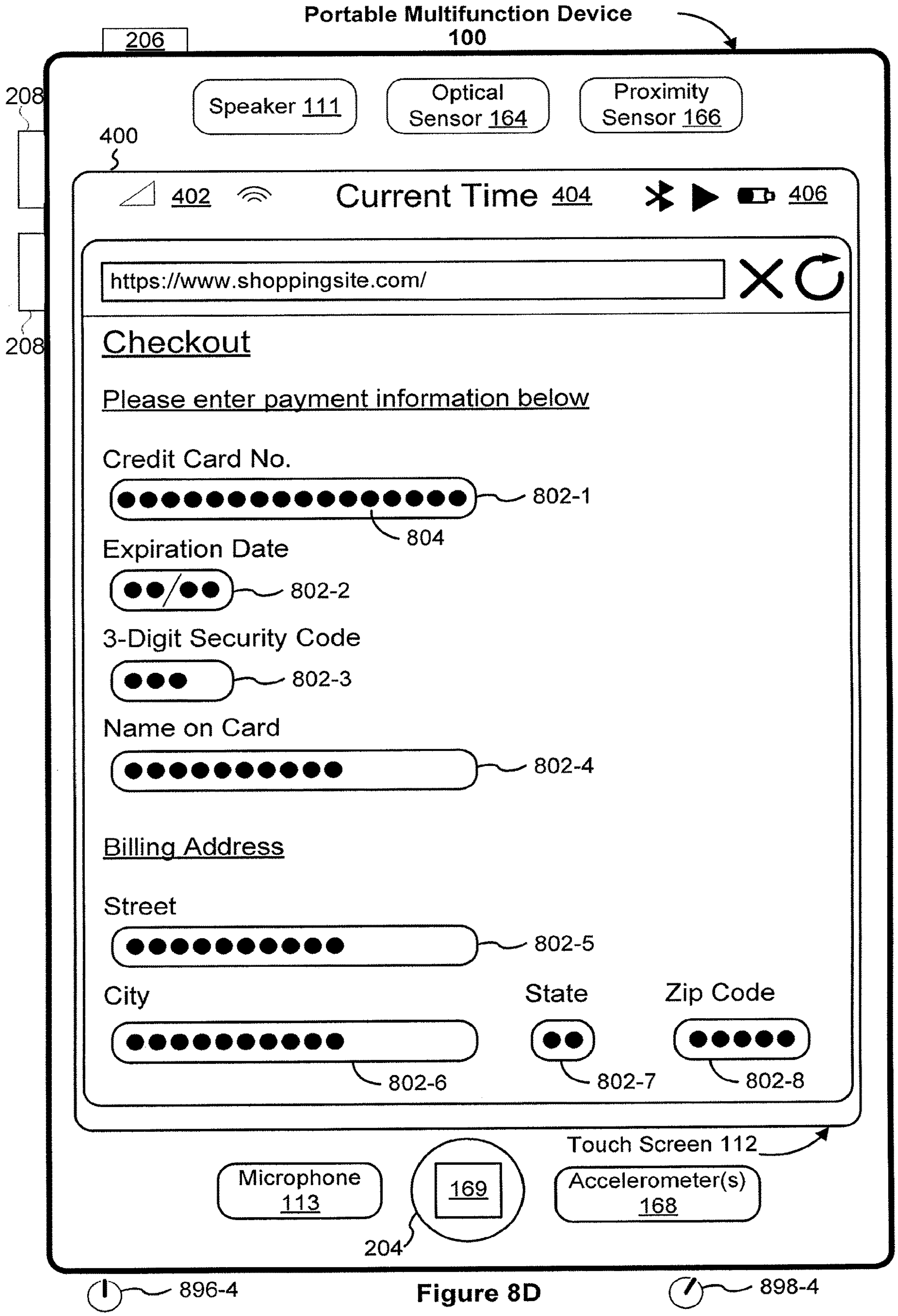
Figure 8E:
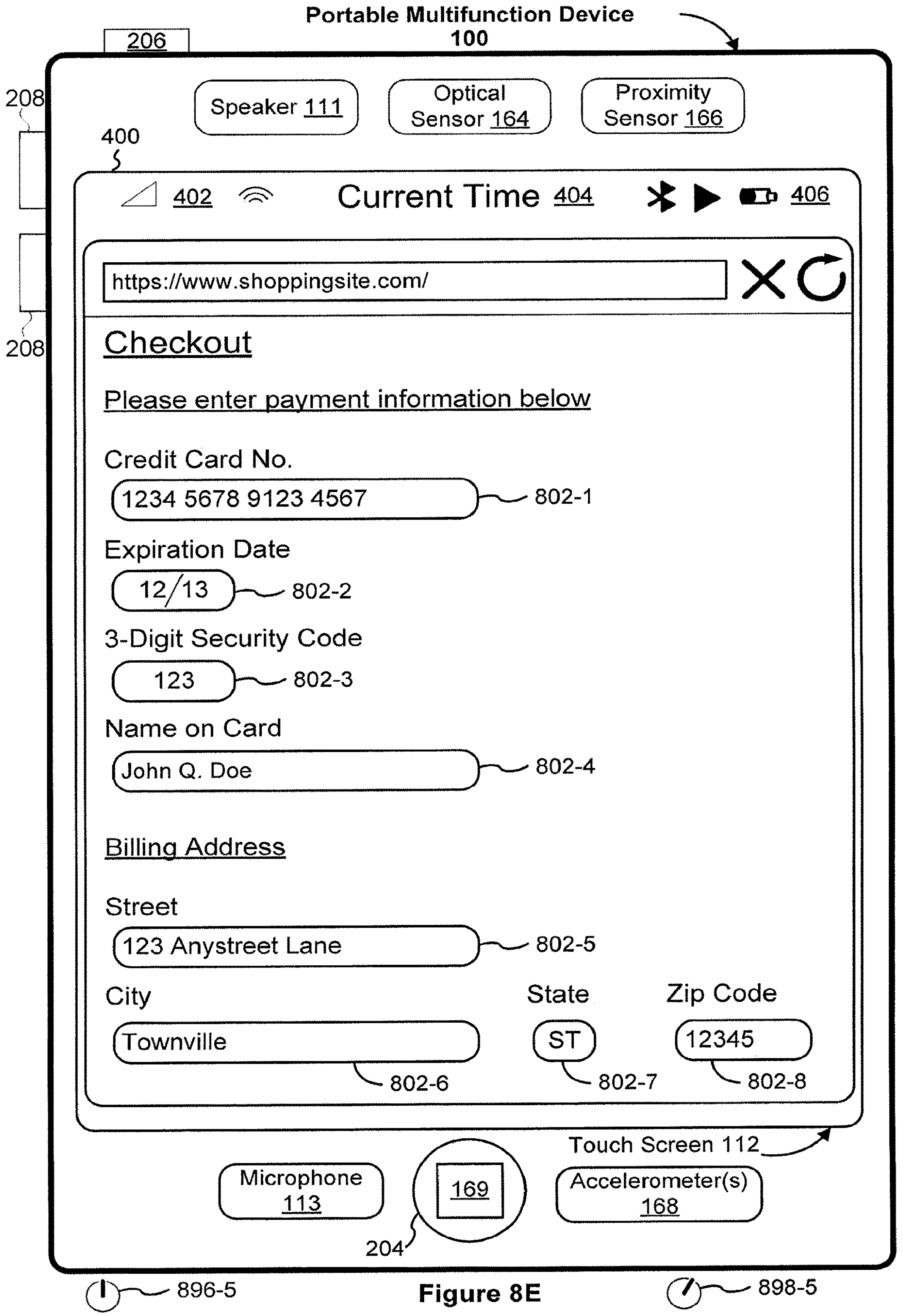
Figure 8F:
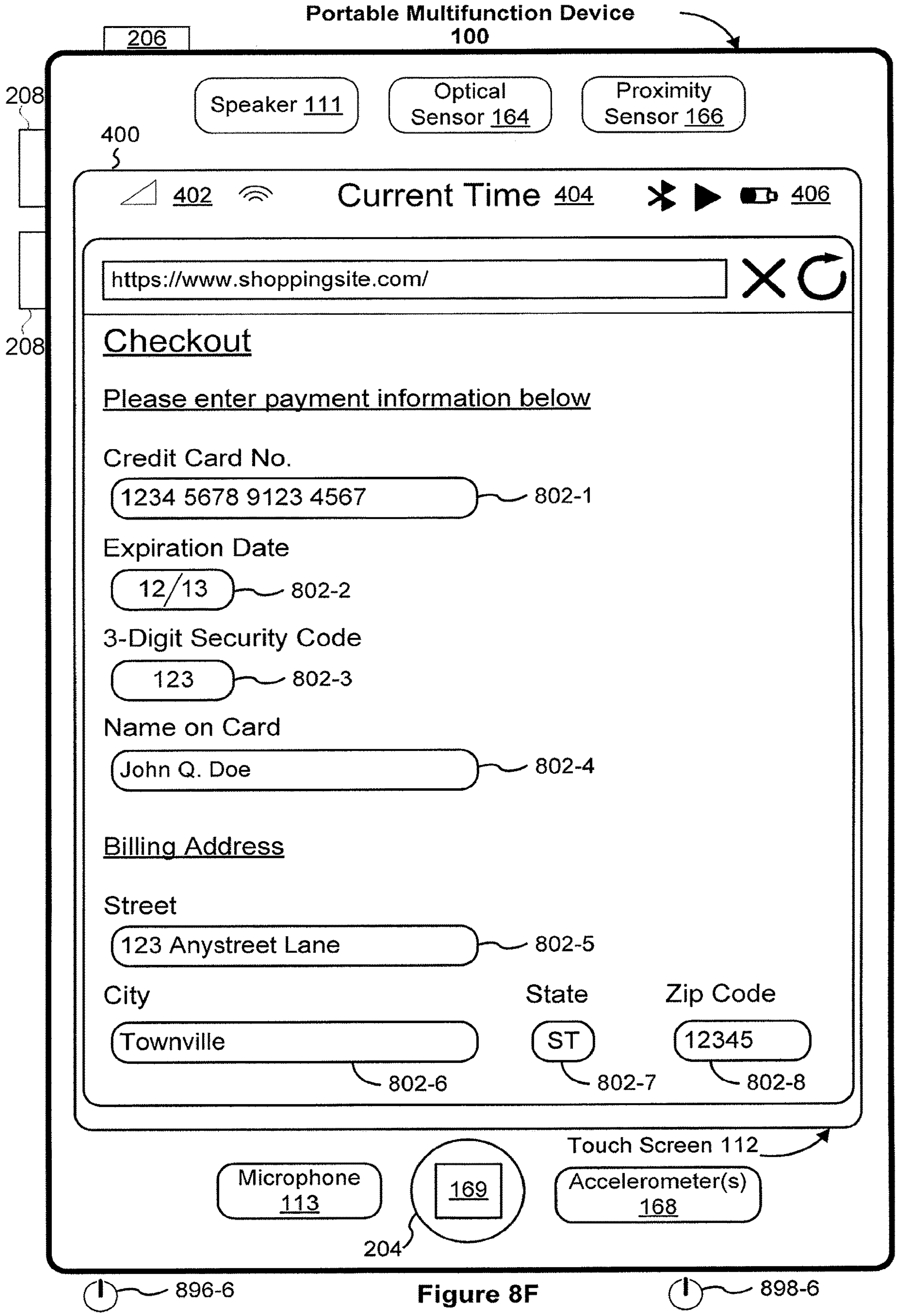

FIGS. 8D-8F illustrate three respective sets of operations that may be performed in response to the input 812 in accordance with a determination that the input 812 includes a fingerprint, in accordance with some embodiments.

FIG. 8D illustrates an exemplary set of operations that are performed in response to the input 812 (FIG. 8C) that includes a fingerprint, in accordance with some embodiments. In FIG. 8D, the display dim timer 896-4 is reset and the touch screen 112 ceases to be dimmed (e.g., the brightness of the touch screen 112 increases to the brightness of the touch screen 112 before dimming). In FIG. 8D, the credential-authorization timer 898-4 is not reset. Also in FIG. 8D, the representations of information (e.g., 804) in respective input fields (e.g., 802-1 through 802-8) remain on the touch screen 112.

FIG. 8E illustrates an alternative set of operations that are performed in response to the input 812 (FIG. 8C) that includes a fingerprint, in accordance with some embodiments. In FIG. 8E, the display dim timer 896-5 is reset and the touch screen 112 ceases to be dimmer. In addition, the representations (sometimes called redacted representations) of information (e.g., 804 in FIG. 8C) in respective input fields (e.g., 802-1 through 802-8) are replaced with the information (sometimes called non-redacted information) in the respective input fields. For example, in FIG. 8E, the representations of information in respective input fields are replaced with the payment information (e.g., credit card number, expiration date, security code, name on the card, billing address, etc.). In FIG. 8F, the credential-authorization timer 898-5 is not reset.

FIG. 8F illustrates yet another alternative set of operations that are performed in response to the input 812 (FIG. 8C) that includes a fingerprint, in accordance with some embodiments. In FIG. 8F, the display dim timer 896-6 is reset and the touch screen 112 ceases to be dimmer. In addition, the representations (sometimes called redacted representations) of information (e.g., 804 in FIG. 8C) in respective input fields (e.g., 802-1 through 802-8) are replaced with the information (sometimes called non-redacted information) in the respective input fields. Furthermore, the credential-authorization timer 898-6 is reset.

In some embodiments, the respective sets of operations illustrated in FIGS. 8E-8F are performed in accordance with a determination that the fingerprint in the input 812 matches an enrolled fingerprint. However, in some embodiments, the operations illustrated in FIG. 8D is performed regardless of whether the fingerprint in the input 812 matches an enrolled fingerprint (e.g., in some embodiments, the operations illustrated in FIG. 8D is performed even when the fingerprint in the input 812 does not match an enrolled fingerprint).

Figure 8G:
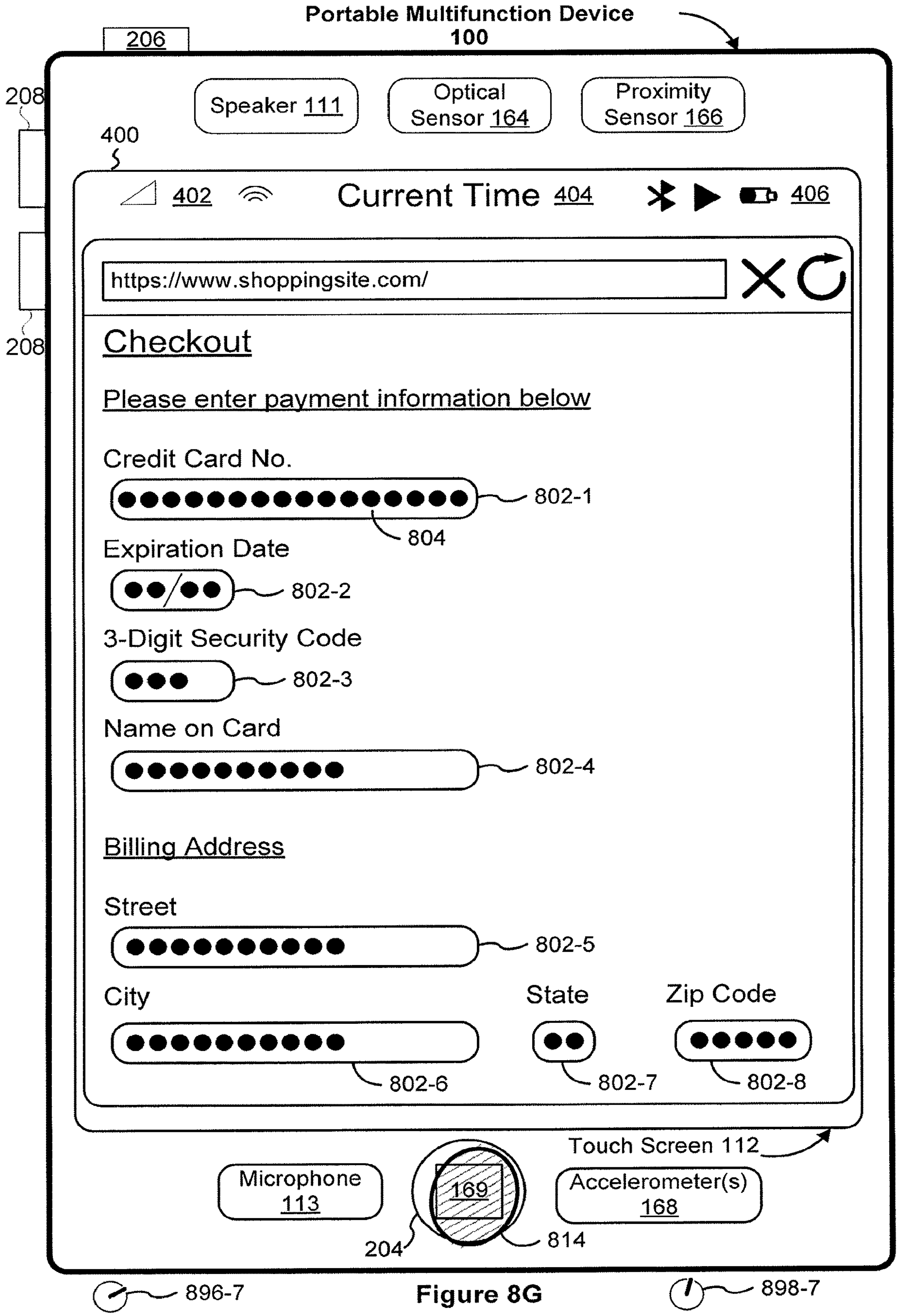
Figure 8H:
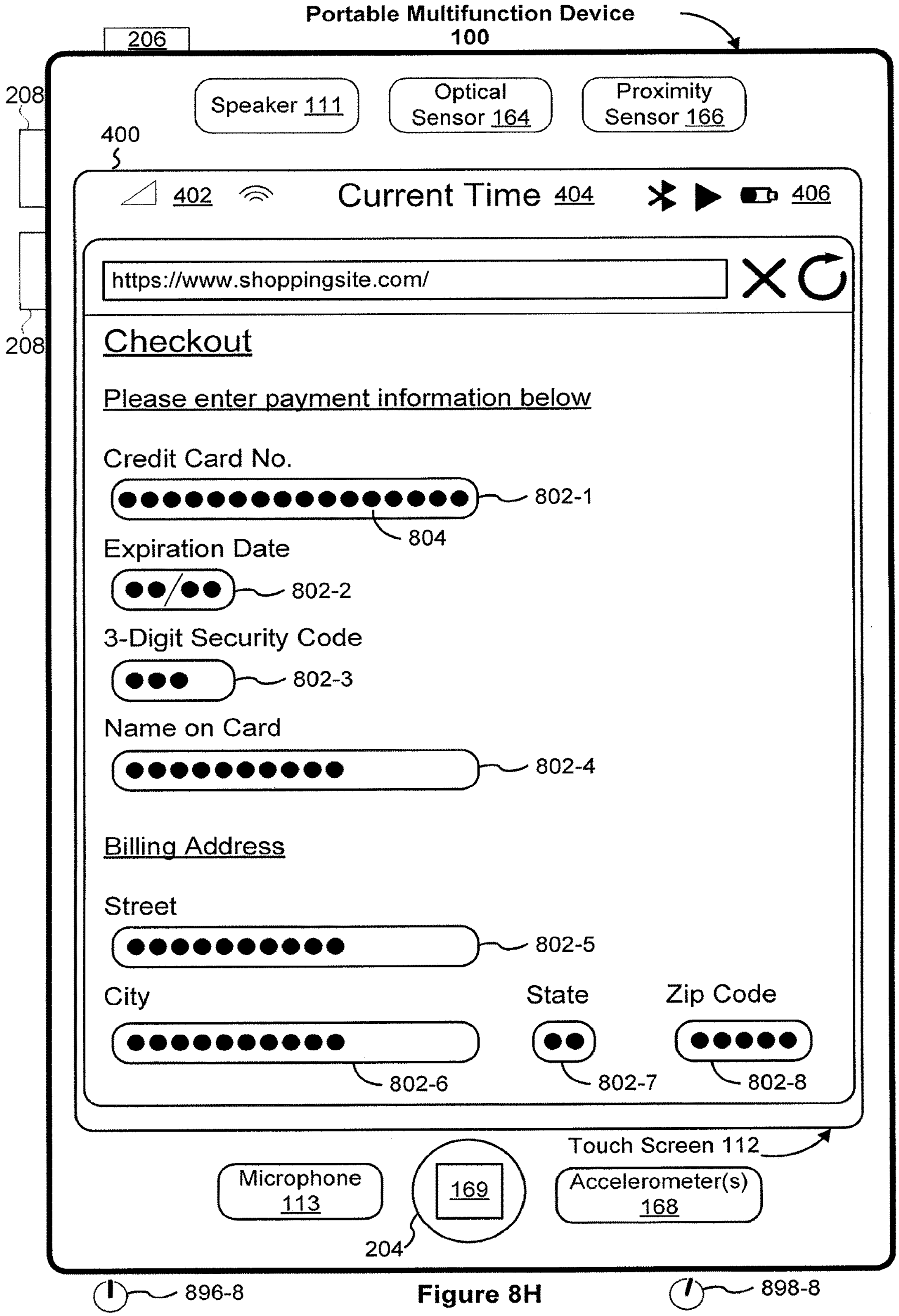

FIGS. 8G-8H illustrate operations that are performed while the touch screen 112 is not dimmed, in accordance with some embodiments.

FIG. 8G illustrates a user interface that is similar to the user interface shown in FIG. 8B. In FIG. 8G, the display dim timer 896-7 and the credential-authorization timer 898-7 have not expired. FIG. 8G also illustrates that an input 814 is detected on the fingerprint sensor 169. In some embodiments, in accordance with a determination that the input 814 does not include a fingerprint (e.g., a contact with an object such as a pen), the input 814 is ignored (e.g., no operation is performed in response to the input 814). In some embodiments, in accordance with a determination that the input 814 includes a fingerprint, one or more operations are performed.

FIG. 8H illustrates that in response to the input 814 that includes a fingerprint, the display dim timer 896-8 is reset. In FIG. 8H, the credential-authorization timer 898-4 is not reset. Also in FIG. 8H, the representations of information (e.g., 804) in respective input fields (e.g., 802-1 through 802-8) remain on the touch screen 112.

Figure 8I:
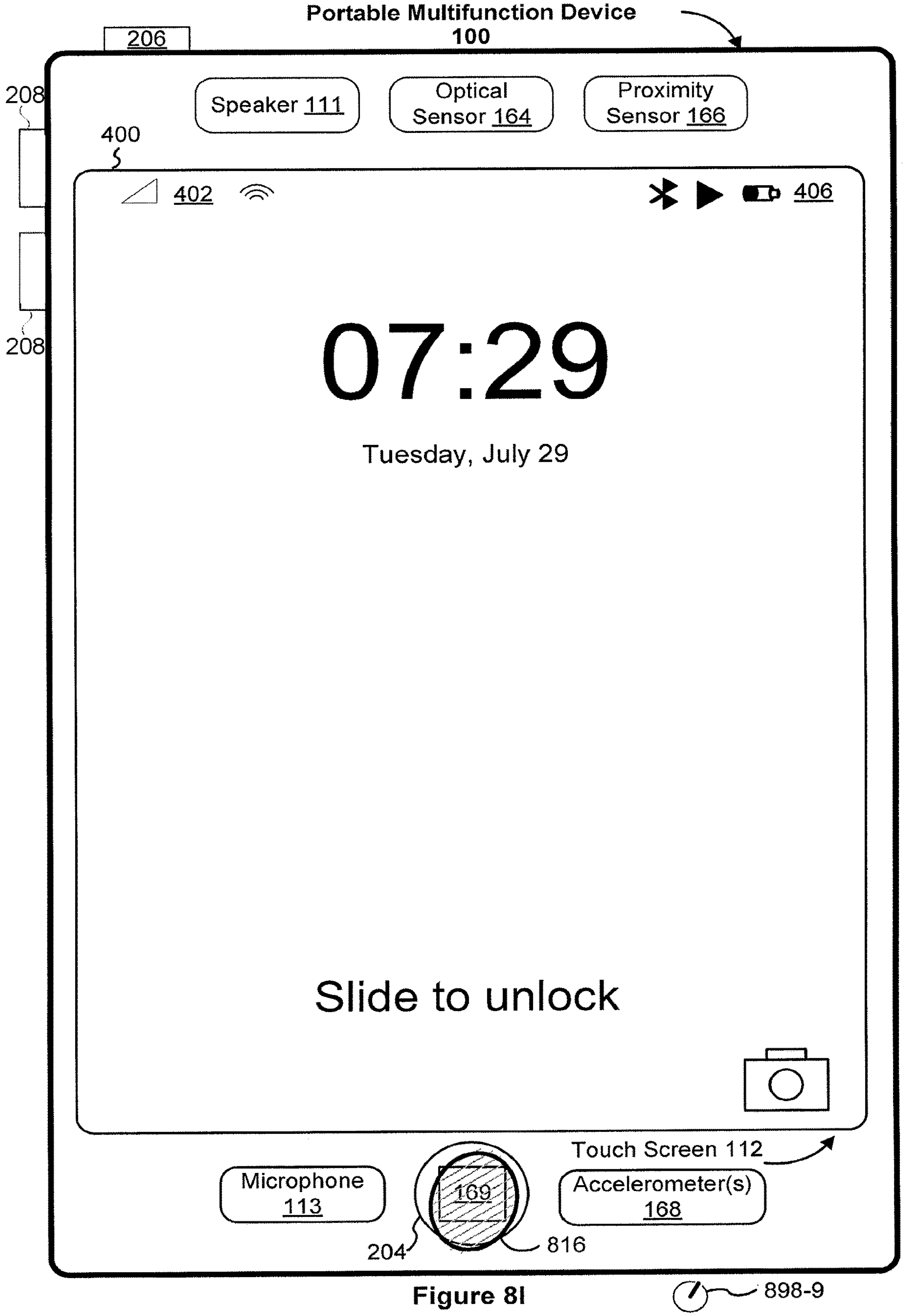
Figure 8J:
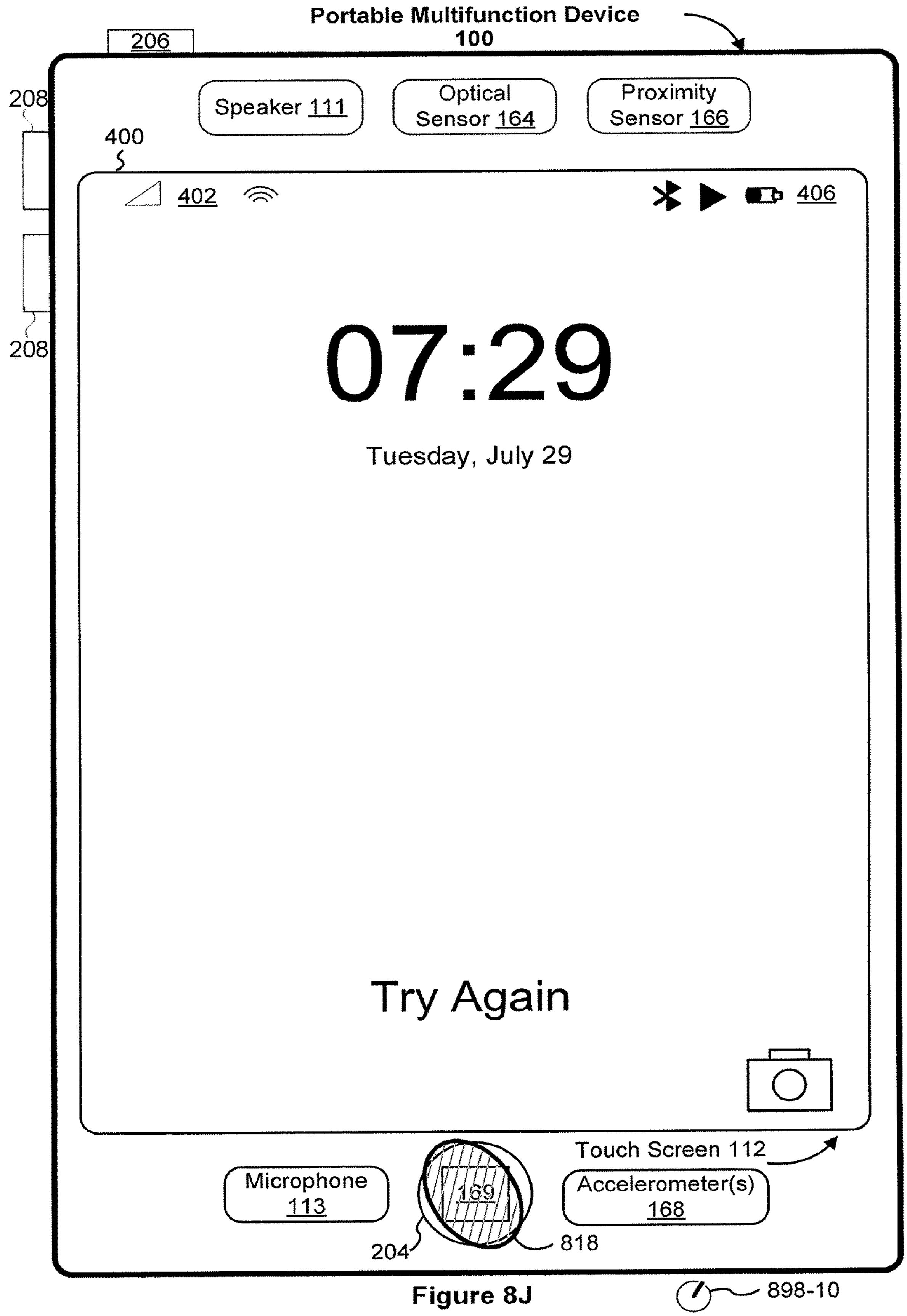
Figure 8K:
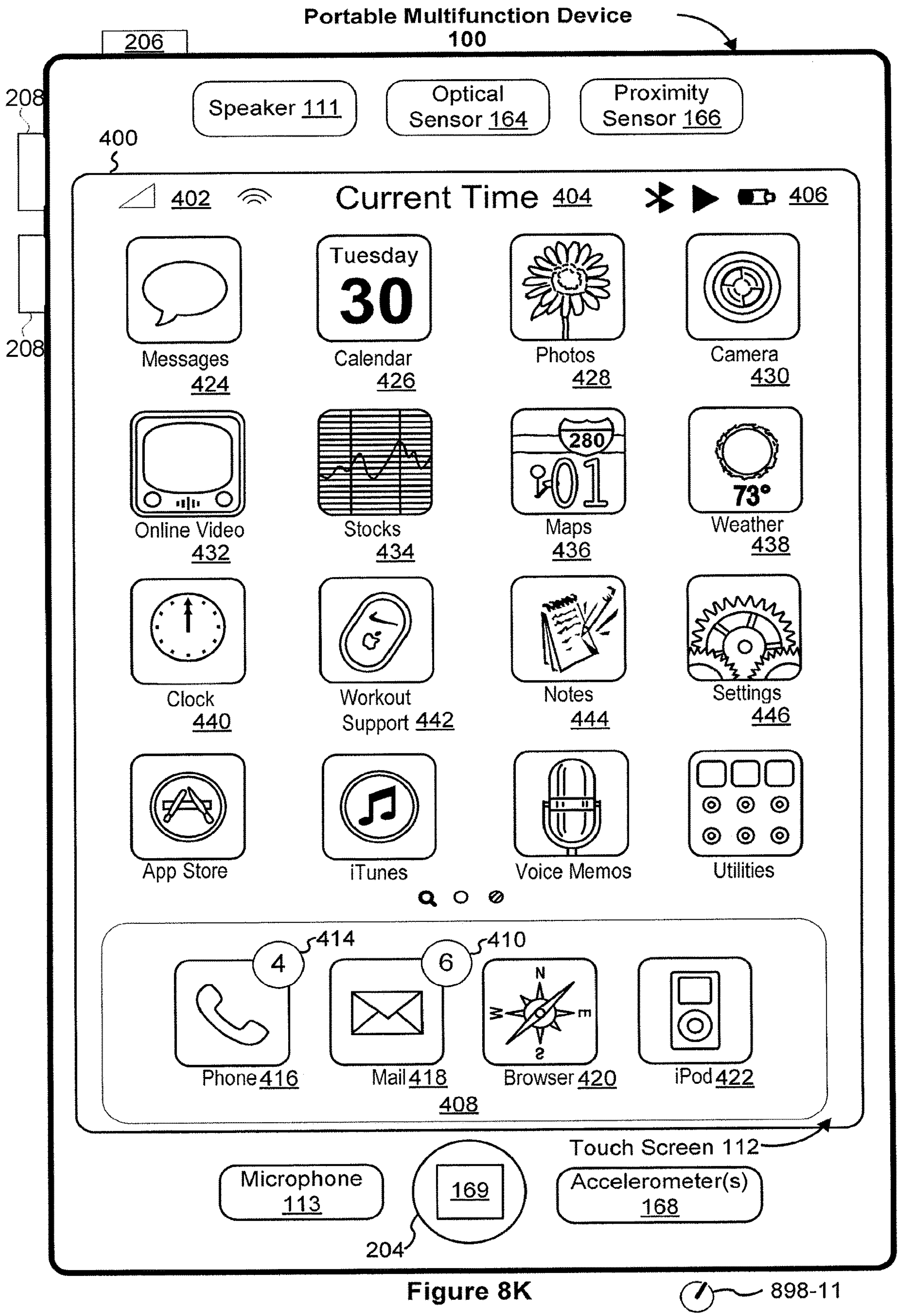

FIGS. 8I-8K illustrate operations that are performed before the credential-adjustment timer 898 expires, in accordance with some embodiments.

FIG. 8I illustrates a lock screen displayed on the touch screen 112. In FIG. 8I, the credential-adjustment timer 898-9 has not expired. A display dim timer (e.g., 896-8 in FIG. 8G) is not illustrated in FIG. 8I for brevity. However, a person having ordinary skill in the art would understand that, in some implementations, display dim-timer 896 related operations can be performed from the lock screen. For example, in some embodiments, in accordance with a determination that the display dim timer 896 has expired while the touch screen 112 displays a lock screen, the device 100 automatically dims the touch screen 112 while displaying the lock screen on the touch screen 112. In some embodiments, in accordance with a determination that an input that includes a fingerprint is detected on the fingerprint sensor 169, the display dim timer 896 is reset.

In FIG. 8I, an input 816 is detected on the fingerprint sensor 169. In some embodiments, in accordance with a determination that the input 816 does not include a fingerprint (e.g., a contact with an object such as a pen), the input 816 is ignored (e.g., no operation is performed in response to the input 816). In some embodiments, in accordance with a determination that the input 816 includes a fingerprint, one or more operations are performed.

FIG. 8J illustrates an exemplary user interface that is displayed in response to determining that the fingerprint in the input 816 does not match an enrolled fingerprint. FIG. 8J also illustrates that an input 818, distinct from the input 816, is detected on the fingerprint sensor 169. In some embodiments, in accordance with a determination that the input 818 does not include a fingerprint (e.g., a contact with an object such as a pen), the input 818 is ignored (e.g., no operation is performed in response to the input 818). In some embodiments, in accordance with a determination that the input 818 includes a fingerprint, one or more operations are performed.

FIG. 8K illustrates that, in some embodiments, in accordance with a determination that the fingerprint in the input 818 matches an enrolled fingerprint, the device 100 is unlocked. In some embodiments, unlocking the device 100 includes displaying a home screen.

Figure 8L:
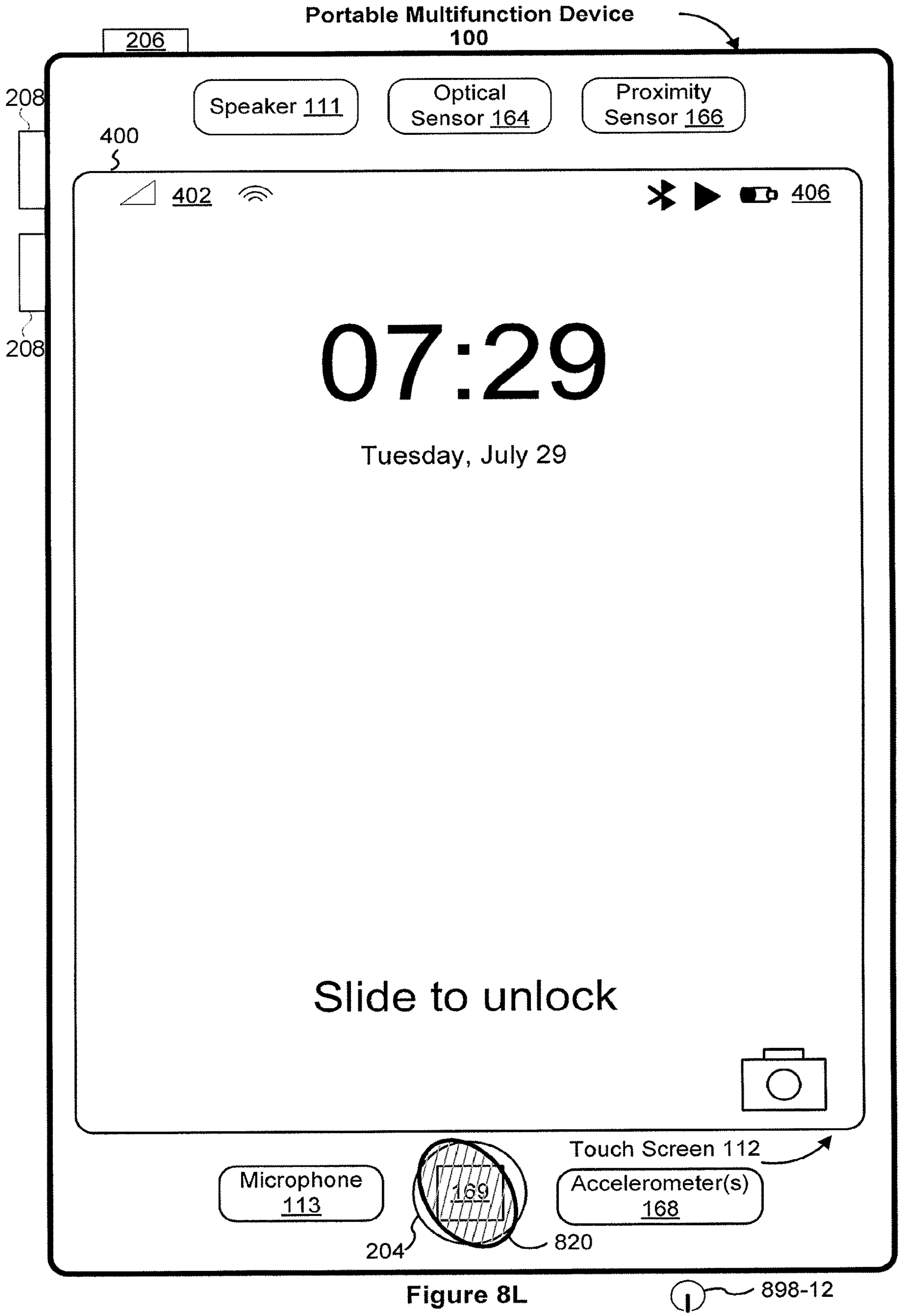
Figure 8M:
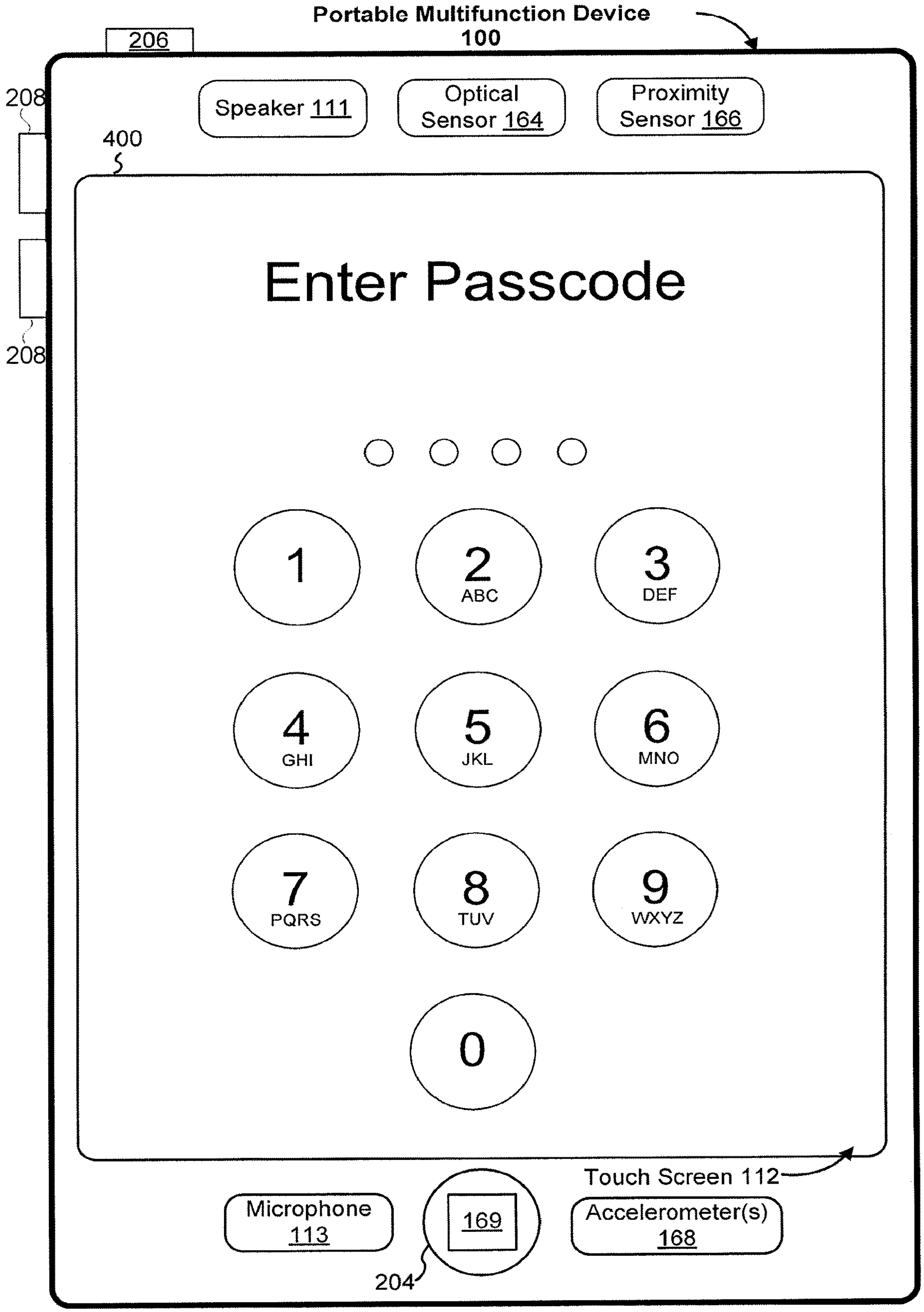

FIGS. 8L-8M illustrate operations that are performed while the credential-authorization timer 898 is expired.

FIG. 8L illustrates a lock screen displayed on the touch screen 112. In FIG. 8L, the credential-adjustment timer 898-9 is expired. FIG. 8L also illustrates that an input 820 is detected on the fingerprint sensor 169. In some embodiments, in accordance with a determination that the input 820 does not include a fingerprint (e.g., a contact with an object such as a pen), the input 820 is ignored (e.g., no operation is performed in response to the input 820). In some embodiments, in accordance with a determination that the input 820 includes a fingerprint, one or more operations are performed.

FIG. 8M illustrates that a passcode screen (shown in FIG. 8M) is displayed on the touch screen 112 in response to the input 820 (FIG. 8L), in accordance with some embodiments. In some embodiments, even if the fingerprint in the input 820 (FIG. 8L) matches an enrolled fingerprint, the passcode screen is displayed in accordance with a determination that the input 820 (FIG. 8L) has been received while the credential-authorization timer 898 is expired.

In some embodiments, the passcode screen is displayed in accordance with a determination that an input that includes a fingerprint has been received while the credential-authorization timer 898 is expired, regardless of whether the fingerprint in the input matches an enrolled fingerprint.

Figure 8N:
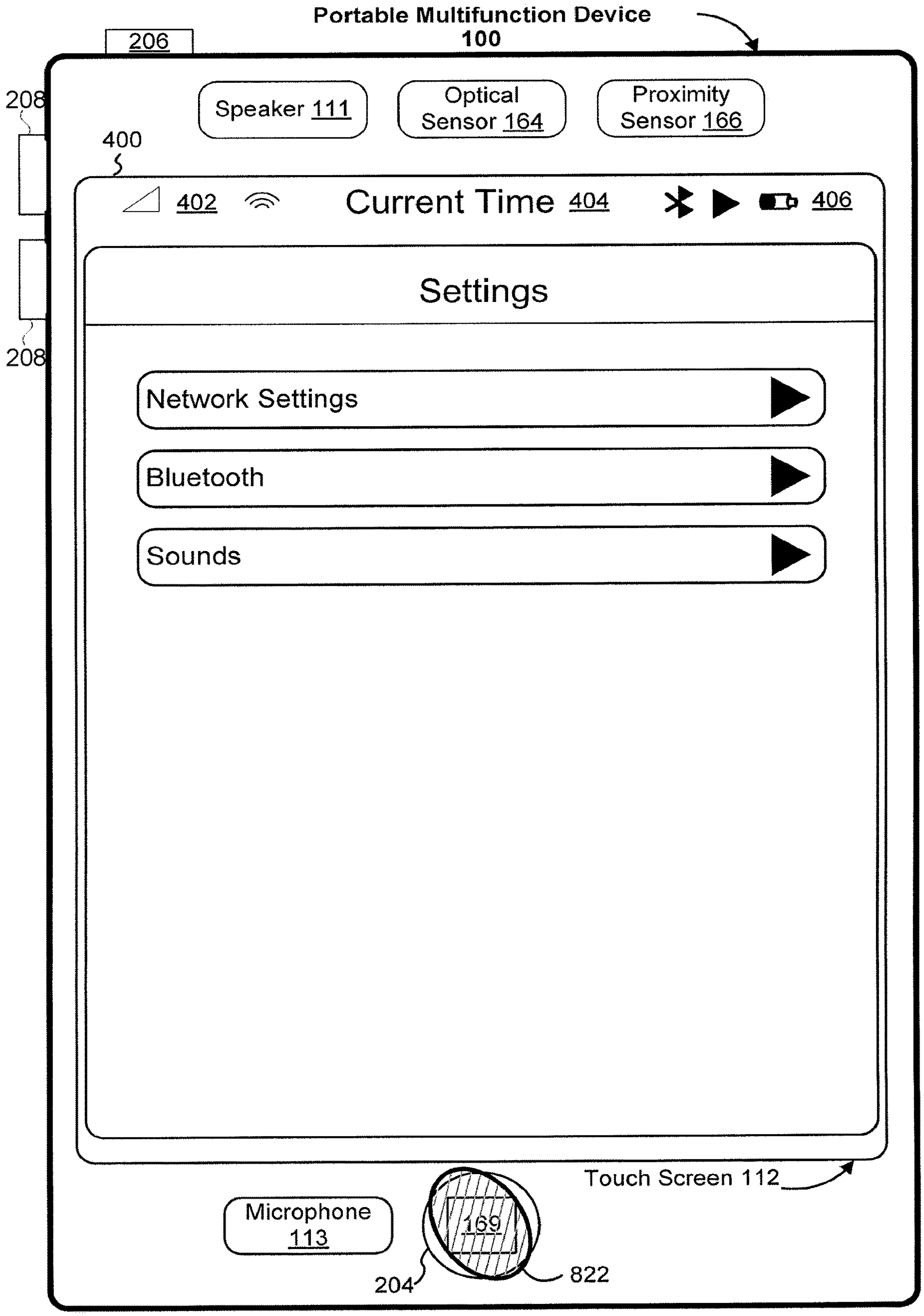
Figure 8O:
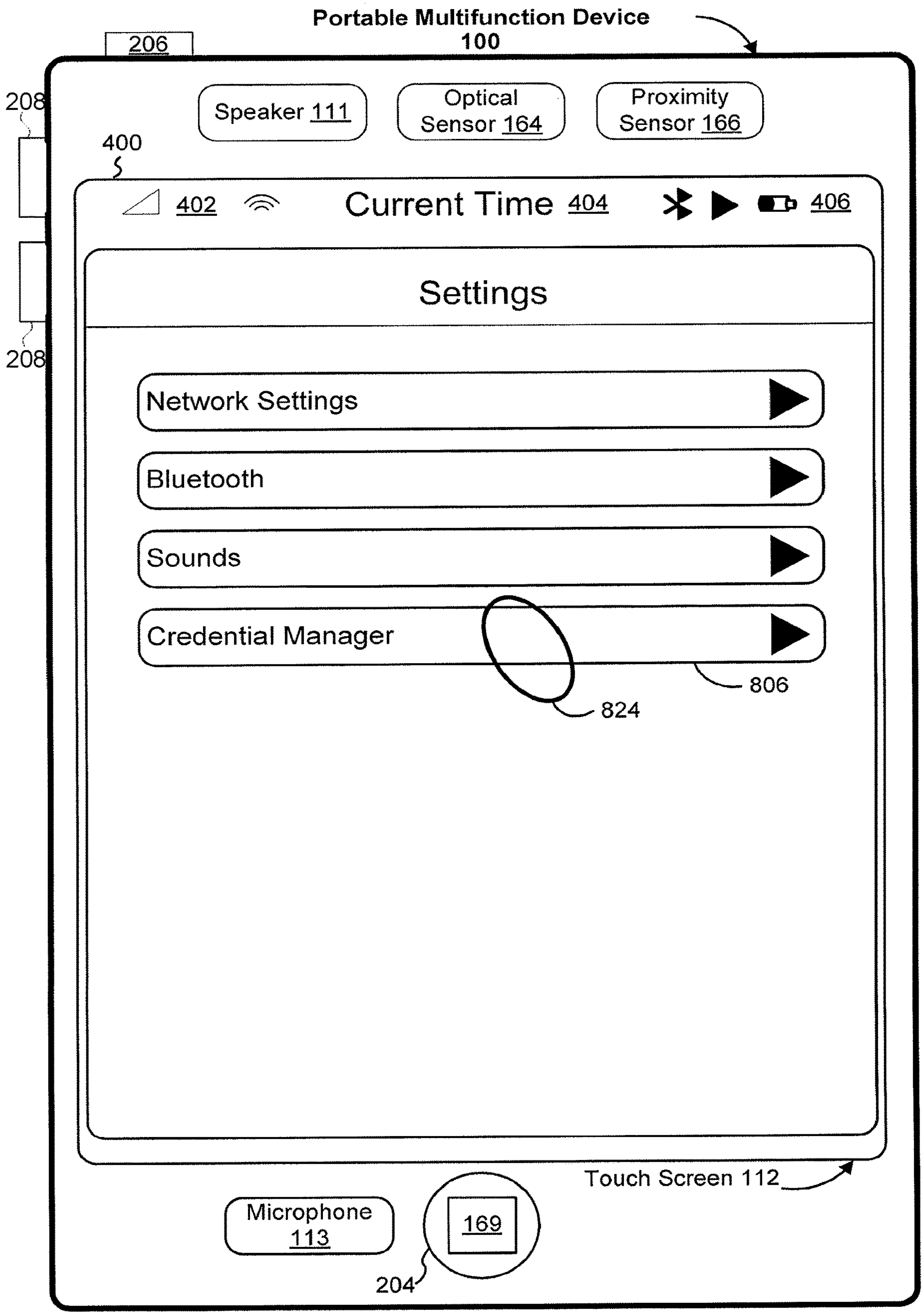

FIGS. 8N-8O illustrate exemplary operations for providing access to restricted features, in accordance with some embodiments.

FIG. 8N illustrates a user interface that includes one or more selectable user interface objects (e.g., buttons labeled "Network Settings," "Bluetooth," and "Sounds"). Compared to FIG. 8O, one or more selectable user interface objects (e.g., a button labeled "Credential Manager" 806, FIG. 8O) are not displayed on the touch screen 112. FIG. 8N also illustrates that an input 822 is detected on the fingerprint sensor 169. In some embodiments, in accordance with a determination that the input 822 does not include a fingerprint (e.g., a contact with an object such as a pen), the input 822 is ignored (e.g., no operation is performed in response to the input 822). In some embodiments, in accordance with a determination that the input 822 includes a fingerprint, one or more operations are performed.

FIG. 8O illustrates that in accordance with a determination that the fingerprint in the input 822 matches an enrolled fingerprint, a selectable user interface object 806 is displayed on the touch screen 112. FIG. 8O also illustrates that a touch input 824 is detected on the touch screen 112 at a location that corresponds to the selectable user interface object 806.

Figure 8P:
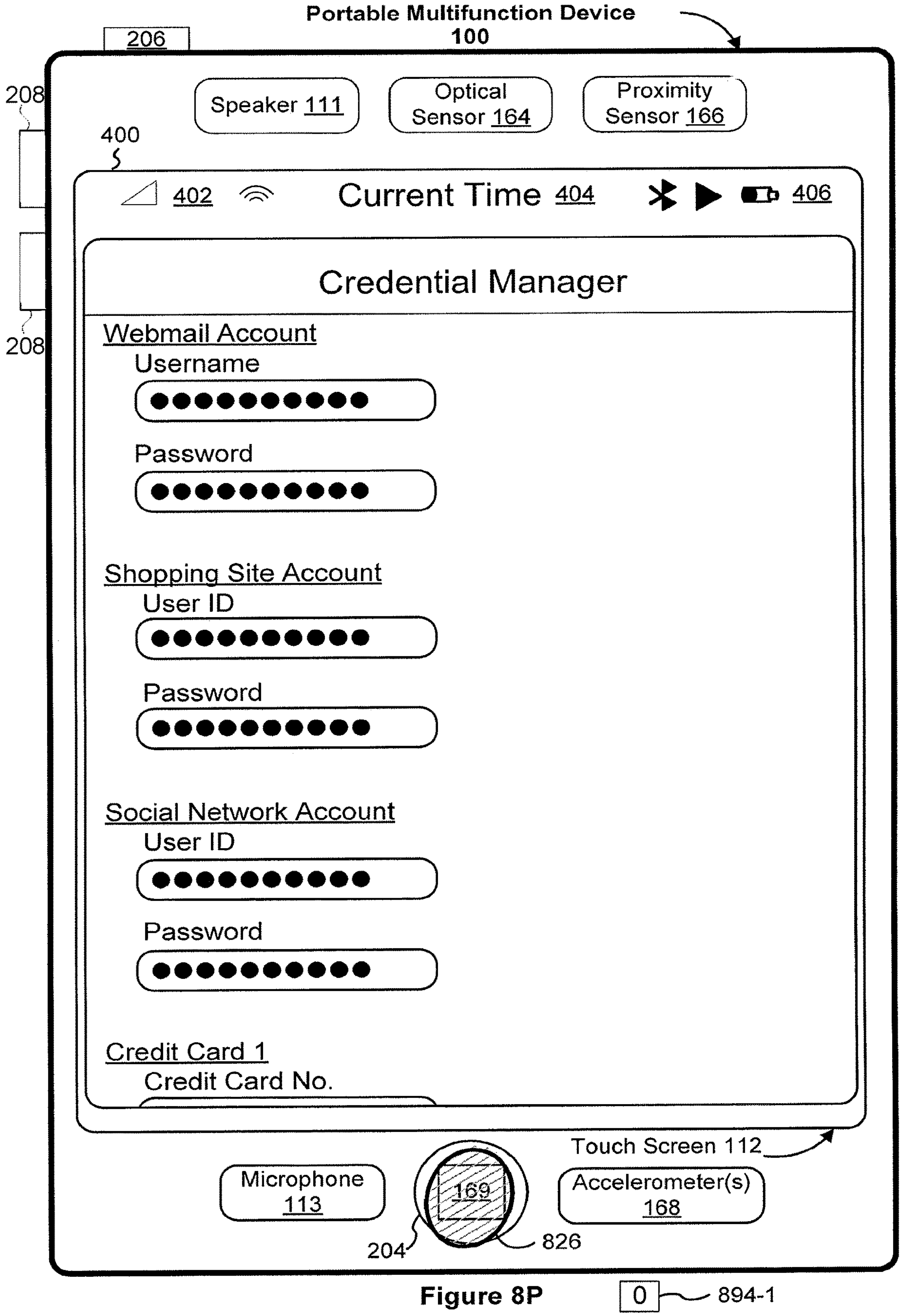

FIG. 8P illustrates an exemplary user interface (e.g., a credential manager user interface) that is displayed in response to detecting the touch input 824 (FIG. 8O) at a location that corresponds to the selectable user interface object 806. The exemplary user interface in FIG. 8P includes a plurality of fields and representations of information in the respective fields.

FIG. 8P also illustrates a unauthorized-attempt counter 894-1 that counts a number of unauthorized attempts to perform one or more predefined secure operations (e.g., revealing private information or providing access to restricted features).

Although the unauthorized-attempt counter 894-1 is illustrated in FIGS. 8P-8V to describe certain operations of the device 100, the unauthorized-attempt counter 894-1 is not necessarily shown on the touch screen 112. In some embodiments, the unauthorized-attempt counter 894-1 is shown on the touch screen 112. In other embodiments, the unauthorized-attempt counter 894-1 is not shown on the touch screen 112.

FIG. 8P illustrates that an input 826 is detected on the fingerprint sensor 169. In some embodiments, in accordance with a determination that the input 826 does not include a fingerprint (e.g., a contact with an object such as a pen), the input 826 is ignored (e.g., no operation is performed in response to the input 826). In some embodiments, in accordance with a determination that the input 826 includes a fingerprint, one or more operations are performed. In some embodiments, in accordance with a determination that the fingerprint in the input 826 does not match an enrolled fingerprint, no operation is performed.

Figure 8Q:
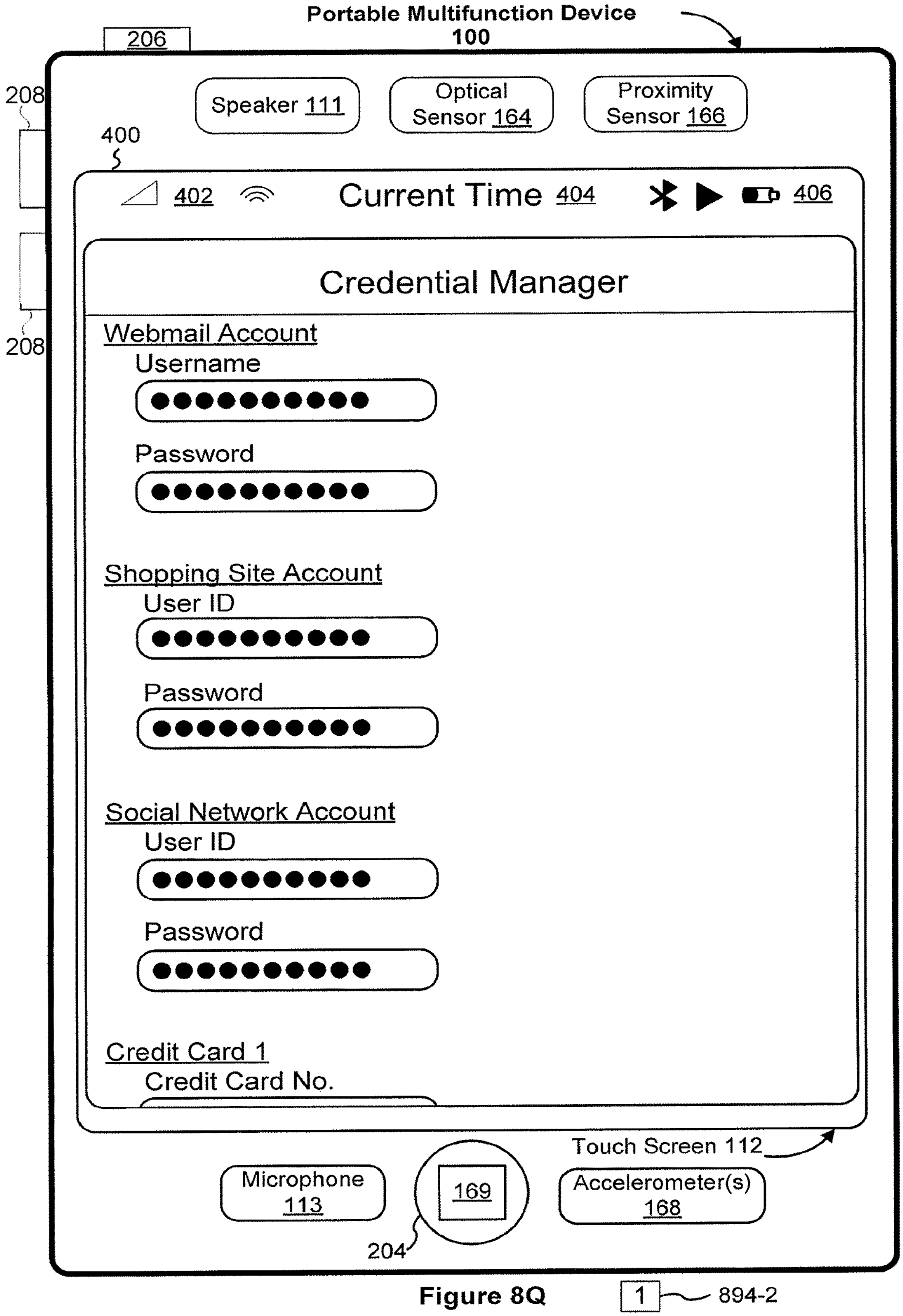

FIG. 8Q illustrates that, in accordance with a determination that the fingerprint in the input 826 does not match an enrolled fingerprint, the number of unauthorized attempts to perform one or more predefined secure operations in the unauthorized-attempt counter 894-1 increases (e.g., from zero to one), in some embodiments. In some embodiments, as shown in FIG. 8Q, the representations (sometimes called redacted representations) of information in the respective fields remain on the touch screen 112. FIG. 8Q illustrates that the input 826 (FIG. 8P) is no longer detected on the fingerprint sensor 169. In some embodiments, the number of unauthorized attempts to perform one or more predefined secure operations in the unauthorized-attempt counter 894-1 increases in response to detecting liftoff of the input 826 (FIG. 8P) from the fingerprint sensor 169 and in accordance with a determination that the fingerprint in the input 826 (FIG. 8P) does not match an enrolled fingerprint.

Figure 8R:
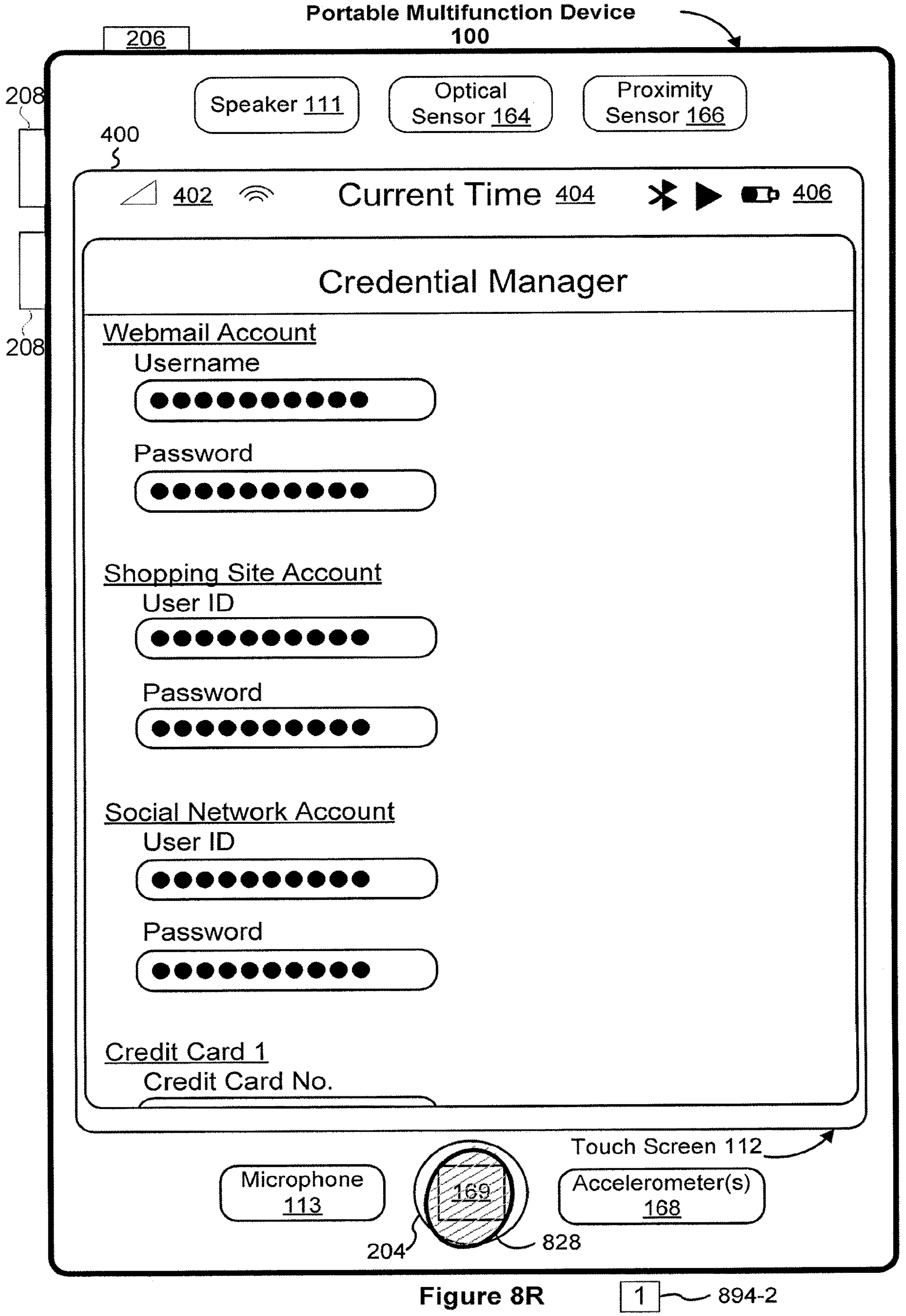

FIG. 8R illustrates that an input 828 is detected on the fingerprint sensor 169. In some embodiments, in accordance with a determination that the input 828 does not include a fingerprint (e.g., a contact with an object such as a pen), the input 828 is ignored (e.g., no operation is performed in response to the input 828). In some embodiments, in accordance with a determination that the input 828 includes a fingerprint, one or more operations are performed. In some embodiments, in accordance with a determination that the fingerprint in the input 828 does not match an enrolled fingerprint, no operation is performed.

Figure 8S:
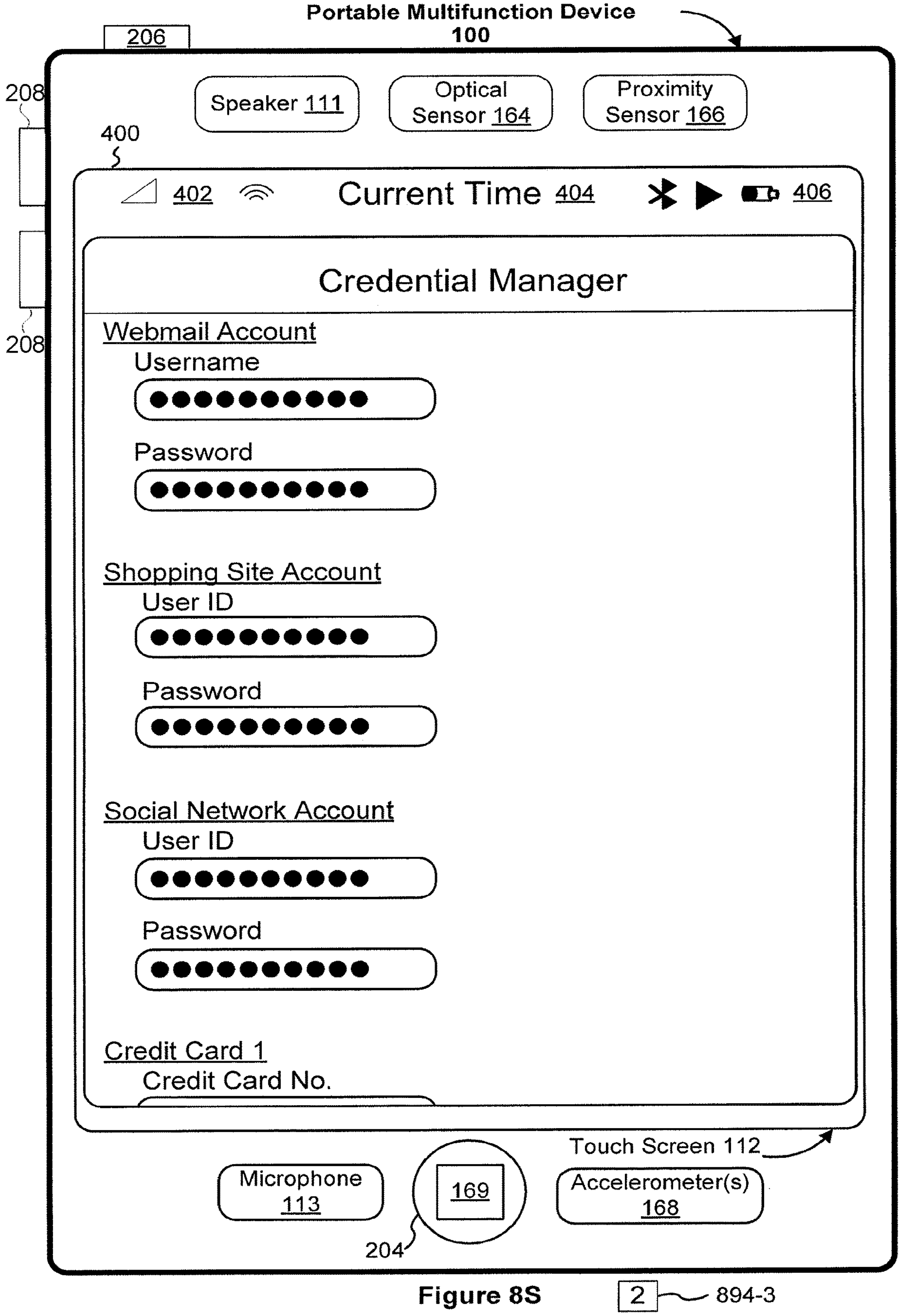
Figure 8T:
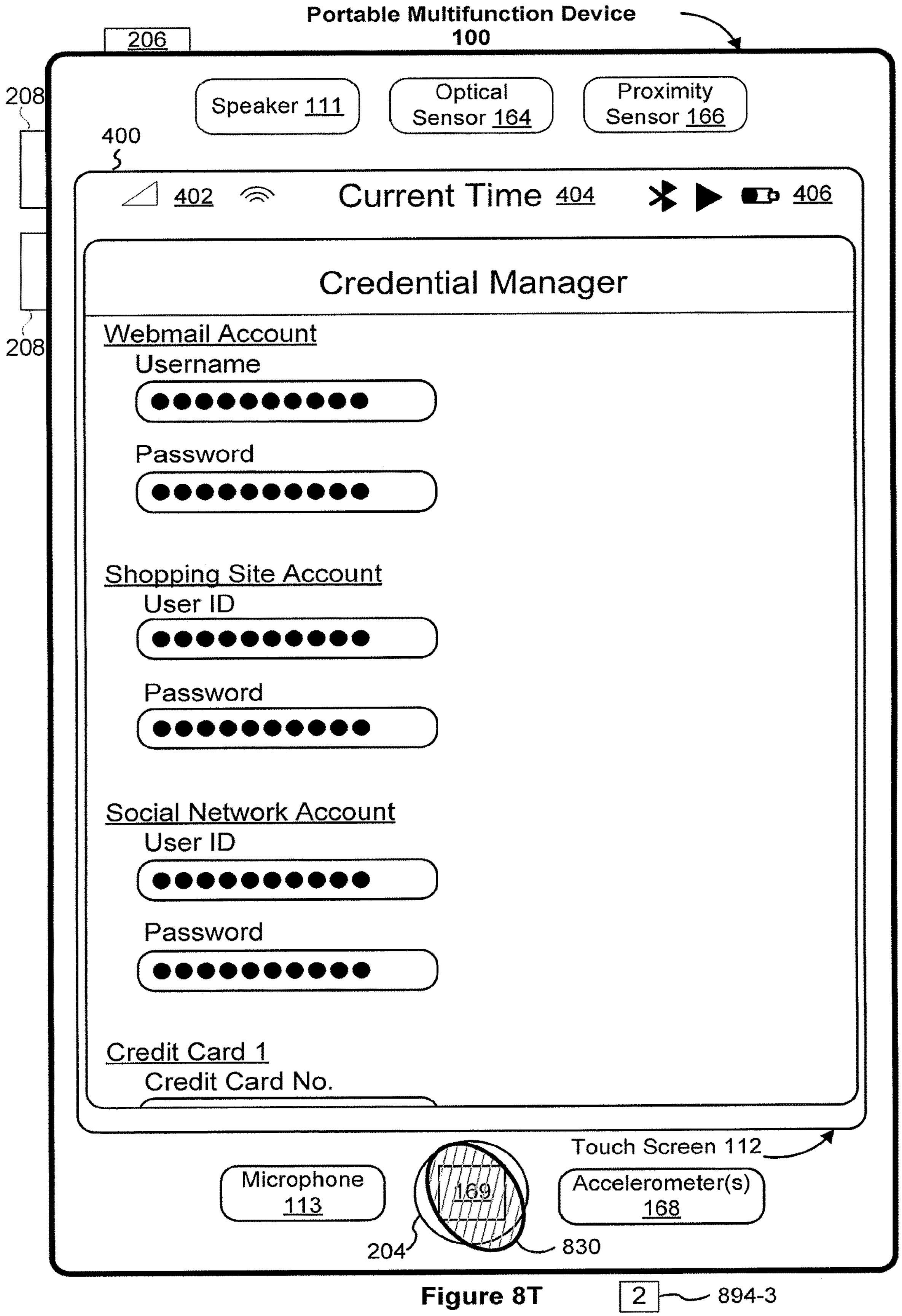
Figure 8U:
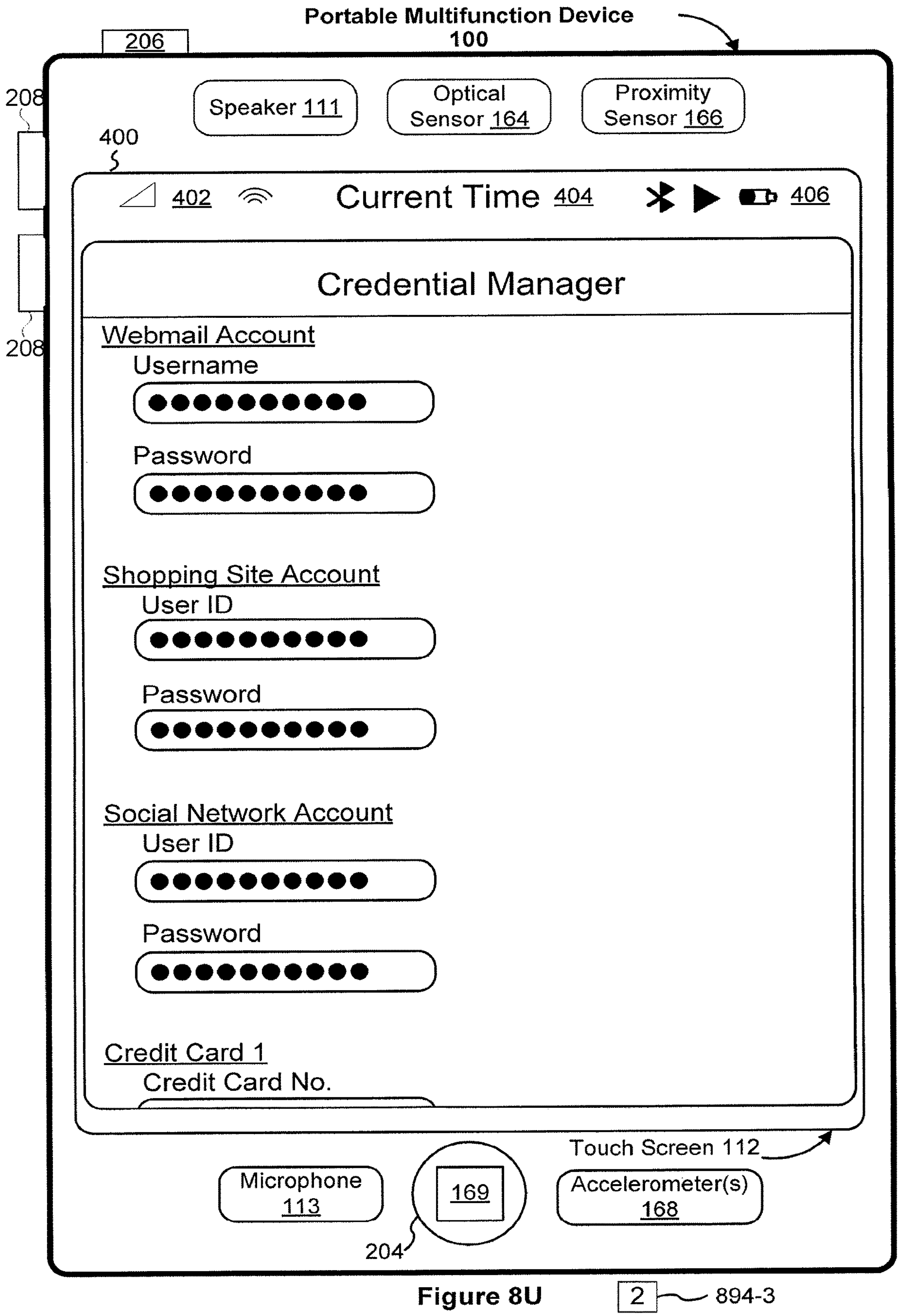

FIG. 8S illustrates that, in accordance with a determination that the fingerprint in the input 828 does not match an enrolled fingerprint, the number of unauthorized attempts to perform one or more predefined secure operations in the unauthorized-attempt counter 894-3 increases (e.g., from one to two), in some embodiments. In some embodiments, as shown in FIG. 8S, the representations of information in the respective fields remain on the touch screen 112. In FIGS. 8S-8U, we will assume that the number of unauthorized attempts in the unauthorized-attempt counter 894-3 satisfies (e.g., matches or exceeds) a predefined number of unauthorized attempts (e.g., two, three, four or five).

FIG. 8S also illustrates that the input 828 (FIG. 8R) is no longer detected on the fingerprint sensor 169. In some embodiments, the number of unauthorized attempts to perform one or more predefined secure operations in the unauthorized-attempt counter 894-3 increases in response to detecting liftoff of the input 828 (FIG. 8R) from the fingerprint sensor 169 and in accordance with a determination that the fingerprint in the input 828 (FIG. 8R) does not match an enrolled fingerprint.

FIG. 8T illustrates that an input 830 is detected on the fingerprint sensor 169. In some embodiments, in accordance with a determination that the input 830 does not include a fingerprint (e.g., a contact with an object such as a pen), the input 830 is ignored (e.g., no operation is performed in response to the input 830). In some embodiments, in accordance with a determination that the input 830 includes a fingerprint, one or more operations are performed. In some embodiments, in accordance with a determination that the fingerprint in the input 830 does not match an enrolled fingerprint, no operation is performed.

FIG. 8U illustrates that even if the fingerprint in the input 830 matches an enrolled fingerprint, the representations (sometimes called redacted representations) of information in the respective fields remain on the touch screen 112 (e.g., the information in the respective fields is not revealed). In some embodiments, the number of unauthorized attempts in the unauthorized-attempt counter 894-3 does not increase once the number of unauthorized attempts in the unauthorized-attempt counter 894-3 satisfies the predefined number of unauthorized attempts (e.g., two) as illustrated in FIG. 8U. In some embodiments, the number of unauthorized attempts in the unauthorized-attempt counter 894-3 increases for a fingerprint in a respective input that does not match an enrolled fingerprint regardless of whether the number of unauthorized attempts in the unauthorized-attempt counter 894-3 satisfies the predefined number of unauthorized attempts.

In some embodiments, once the number of unauthorized attempts in the unauthorized-attempt counter 894-3 satisfies the predefined number of unauthorized attempts, the unauthorized-attempt counter 894-3 is reset by providing a correct passcode on a passcode screen (e.g., FIG. 8M).

Figure 8V:
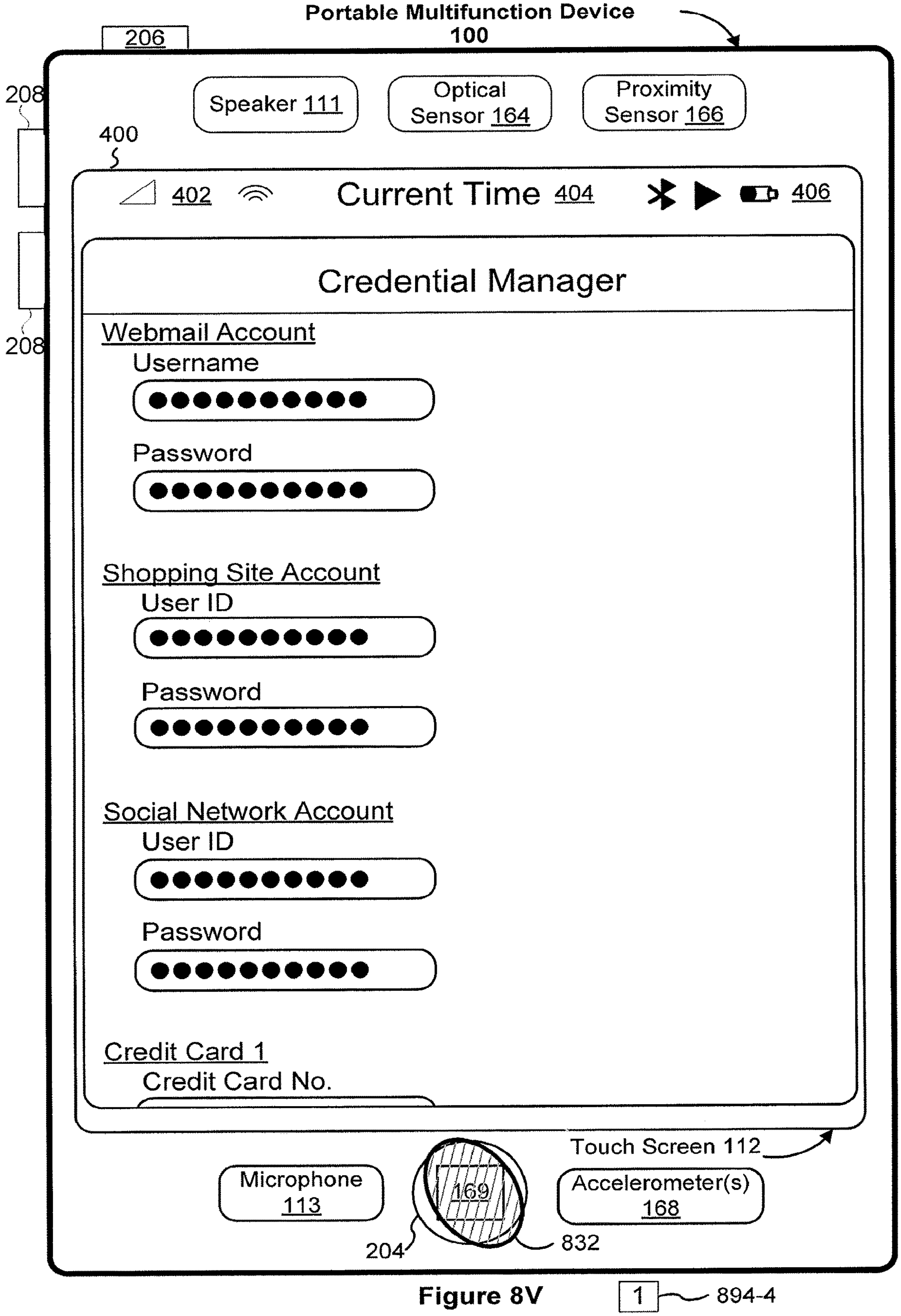
Figure 8W:
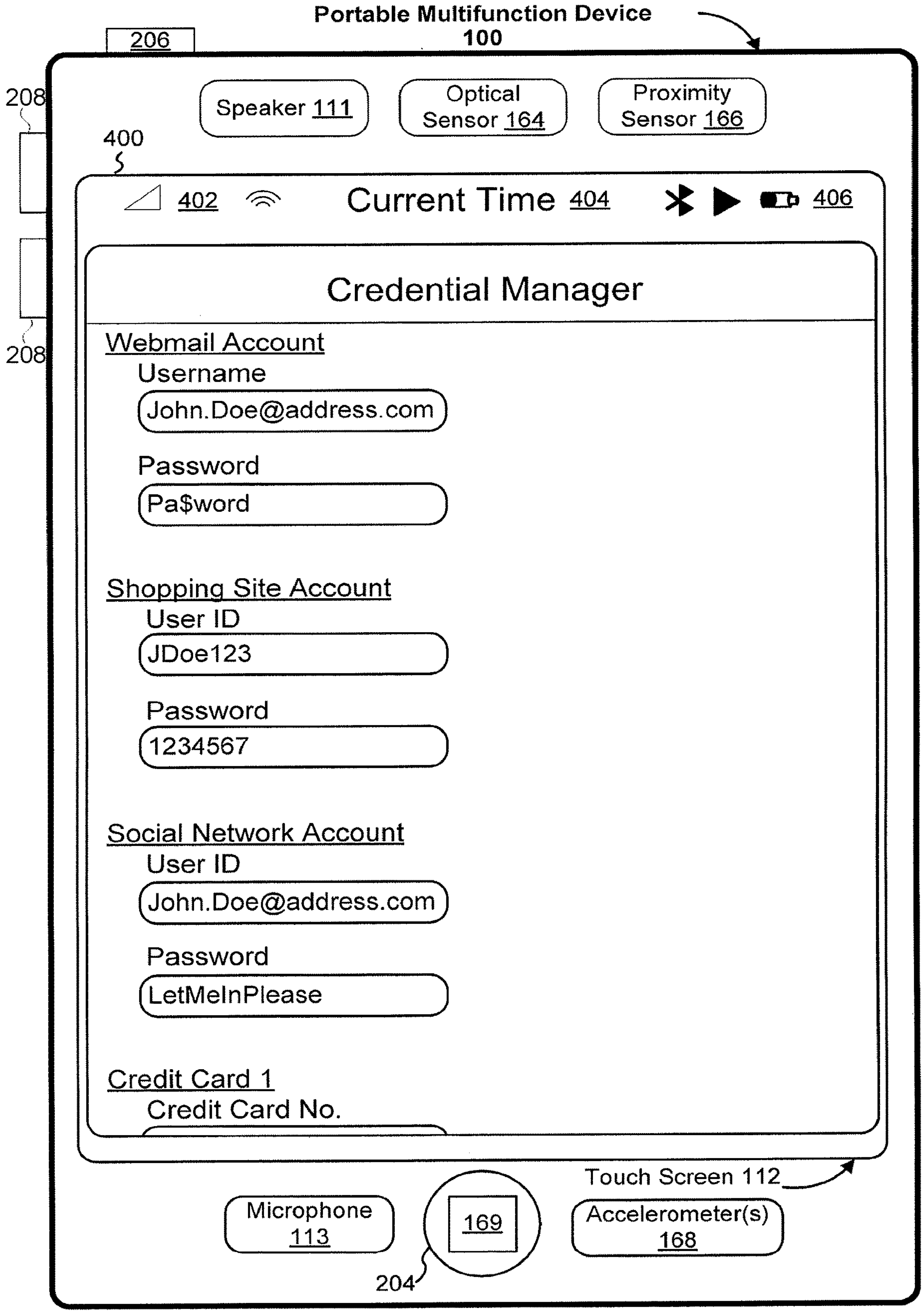
Figure 9A:
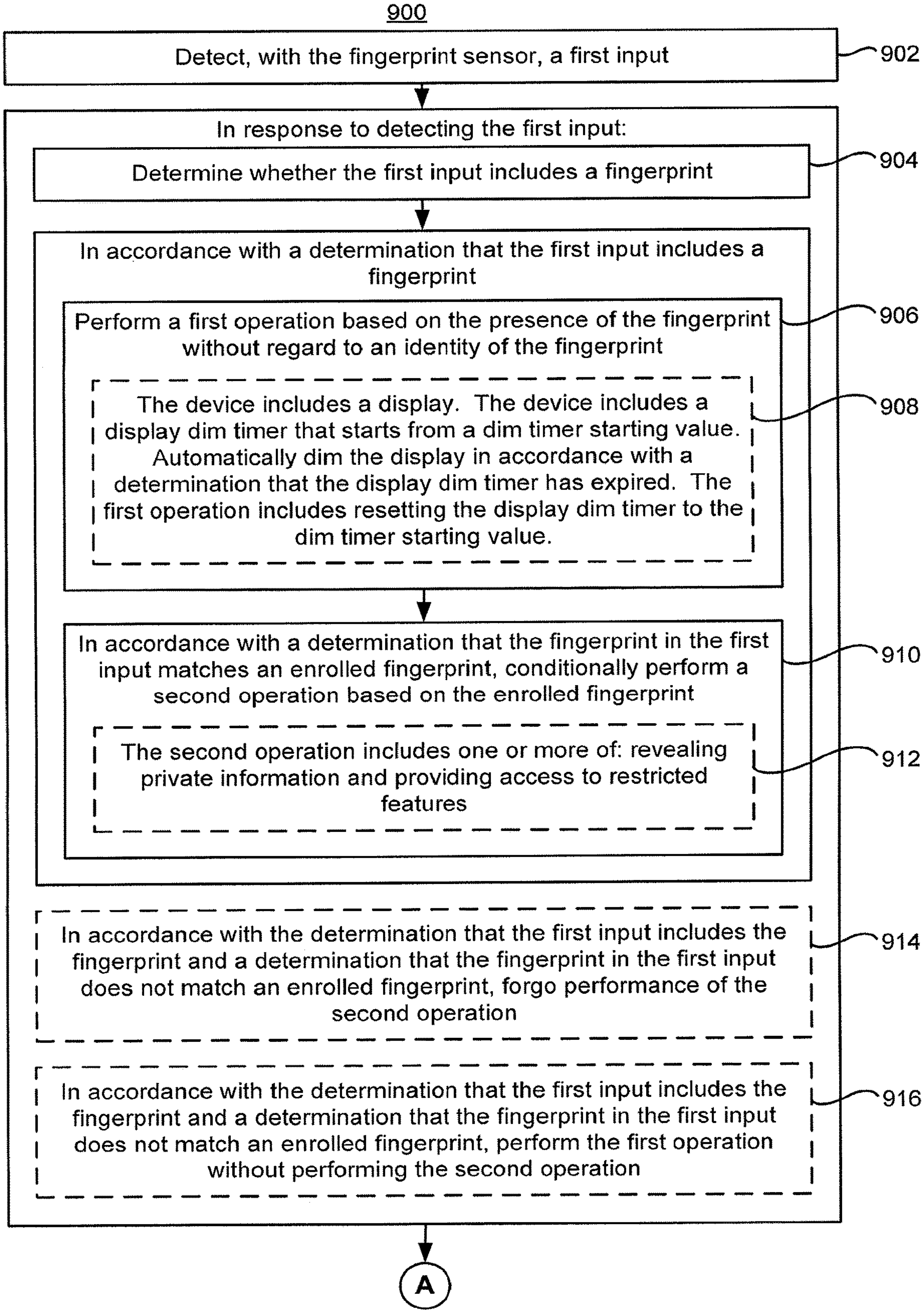

FIGS. 8V-8W illustrate operations performed while the number of unauthorized attempts in the unauthorized-attempt counter 894-3 does not satisfy the predefined number of unauthorized attempts.

FIG. 8V illustrates that an input 832 is detected on the fingerprint sensor 169. In some embodiments, in accordance with a determination that the input 832 does not include a fingerprint (e.g., a contact with an object such as a pen), the input 832 is ignored (e.g., no operation is performed in response to the input 832). In some embodiments, in accordance with a determination that the input 832 includes a fingerprint, one or more operations are performed. In some embodiments, in accordance with a determination that the fingerprint in the input 832 does not match an enrolled fingerprint, no operation is performed.

FIG. 8W illustrates that in accordance with a determination that the fingerprint in the input 832 matches an enrolled fingerprint, the representations (sometimes called redacted representations) of information in the respective fields are replaced with the information (sometimes called non-redacted or unredacted information) in the respective fields. For example, as shown in FIG. 8W, the representations of information in the respective fields are replaced with one or more sets of usernames and passwords (sometimes called non-redacted or unredacted usernames and passwords). In some embodiments, while the number of unauthorized attempts in the unauthorized-attempt counter 894-4 (FIG. 8V) does not satisfy the predefined number of unauthorized attempts, in accordance with a determination that the fingerprint in the input 832 matches an enrolled fingerprint, the unauthorized-attempt counter 894-4 (FIG. 8V) is reset.

FIGS. 9A-9B are flow diagrams illustrating a method 900 of performing operations based on fingerprints in accordance with some embodiments. The method 900 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 900 are, optionally, combined and/or the order of some operations is, optionally, changed.

As described below, the method 900 provides an intuitive way to perform operations based on fingerprints. The method reduces the cognitive burden on a user when performing operations based on fingerprints, thereby creating a more efficient human-machine interface. For battery-operated electronic devices, enabling a user to perform operations based on fingerprints faster and more efficiently conserves power and increases the time between battery charges.

The device detects (902), with the fingerprint sensor, a first input. For example, as illustrated in FIG. 8C, an input 812 is detected on the fingerprint sensor 169.

In response to detecting the first input, the device determines (904) whether the first input includes a fingerprint.

In accordance with a determination that the first input includes a fingerprint, the device performs (906) a first operation based on the presence of the fingerprint without regard to an identity of the fingerprint. In some embodiments, the first operation includes resetting a display dim timer. For example, as illustrated in FIG. 8E, in accordance with a determination that the first input includes a fingerprint, the display dim timer 896-5 is reset. Typically, resetting the display dim timer has an effect that the brightness of the display is not automatically dimmed, because the dim timer has not expired (is not in an expired state). Typically, as long as the fingerprint continues to be detected on the fingerprint sensor, the brightness of the display is not automatically dimmed.

In some embodiments, the device includes (908) a display. The device also includes a display dim timer (e.g., 896-1 in FIG. 8A) that starts from a dim timer starting value (e.g., zero seconds). The device automatically dims the display in accordance with a determination that the display dim timer has expired (e.g., the display dim timer reaches a predefined expiration value, such as 60 seconds, 120 seconds, etc.) In some embodiments, the display dim timer stores time elapsed since the display dim timer was reset. For example, when one second has elapsed since the display dim timer was reset, the display dim timer stores one second. When two seconds have elapsed since the display dim timer was reset, the display dim timer stores two seconds. In some embodiments, the first operation includes resetting the display dim timer to the dim timer starting value. In another example, the dim timer is a count down timer, the dim timer expiration value is zero seconds, and the dim starting value is value such as 60 seconds, 120 second, 300 seconds, etc. In this example, the display is not dimmed so long as the dim timer has a non-zero value.

In some embodiments, the device collects information about a fingerprint in contact with the fingerprint sensor at predetermined intervals that are shorter than the amount of time that it takes for the dim timer to expire, so that while the fingerprint is maintained on the fingerprint sensor, the device will repeatedly detect the fingerprint and reset the dim timer and as a result, in such a situation, the brightness of the display is not automatically dimmed as long as the fingerprint continues to be detected on the fingerprint sensor.

In accordance with a determination that the fingerprint in the first input matches an enrolled fingerprint, the device conditionally performs (910) a second operation based on the enrolled fingerprint. For example, as illustrated in FIG. 8E, the device reveals private information (e.g., credit card information) in accordance with a determination that the fingerprint in the input 812 (FIG. 8C) matches an enrolled fingerprint. In some embodiments, conditionally performing the second operation includes performing the second operation in accordance with a determination that the second operation is not prevented. In some embodiments, conditionally performing the second operation includes forgoing the second operation in accordance with a determination that the second operation is prevented. In some implementations, the second operation is prevented in accordance with a determination that a credential-authorization timer 898 has expired.

In some embodiments, the second operation includes (912) one or more of: revealing private information (e.g., revealing the credit card information as illustrated in FIG. 8E) and providing access to restricted features (e.g., as illustrated in FIG. 8O, displaying a selectable user interface object 806, which, when selected, initiates a display of a user interface with restricted features, such as a credential manager features).

In some embodiments, in response to detecting the first input, in accordance with the determination that the first input includes the fingerprint and a determination that the fingerprint in the first input does not match an enrolled fingerprint, the device forgoes (914) performance of the second operation. For example, as illustrated in FIGS. 8G-8H, in response to detecting the input 814 (FIG. 8G) and in accordance with a determination that the input 814 includes a fingerprint and a determination that the fingerprint in the input 814 does not match an enrolled fingerprint, the device forgoes performance of the second operation (e.g., private information, such as credit card information, is not revealed in FIG. 8H).

In some embodiments, in response to detecting the first input, in accordance with the determination that the first input includes the fingerprint and a determination that the fingerprint in the first input does not match an enrolled fingerprint, the device performs (916) the first operation without performing the second operation. For example, as illustrated in FIGS. 8G-8H, in response to detecting the input 814 (FIG. 8G) and in accordance with a determination that the input 814 includes a fingerprint and a determination that the fingerprint in the input 814 does not match an enrolled fingerprint, the device performs the first operation (e.g., resetting the display dim timer 896-8 in FIG. 8H) without performing the second operation (e.g., private information, such as credit card information, is not revealed in FIG. 8H).

In some embodiments, the first operation and the second operation are both performed (918) in accordance with a determination that the first input includes a fingerprint that matches an enrolled fingerprint. For example, as illustrated in FIGS. 8C and 8E, in accordance with a determination that the input 812 (FIG. 8C) includes a fingerprint that matches an enrolled fingerprint, the first operation (e.g., resetting the display dim timer 896-5) and the second operation (e.g., revealing private information, such as credit card information, as shown in FIG. 8E) are both performed.

In some embodiments, in accordance with a determination that the first input includes a fingerprint that matches an enrolled fingerprint, the device also performs (920) a third operation, distinct from the second operation, based on the enrolled fingerprint. For example, as illustrated in FIGS. 8C and 8F, in accordance with a determination that the input 812 (FIG. 8C) includes a fingerprint that matches an enrolled fingerprint, the device performs a third operation (e.g., resetting the credential-authorization timer 898-6 in FIG. 8F).

In some embodiments, the device includes (922) a credential-authorization timer (e.g., a timer that measures an amount of time that enrolled fingerprints authorized to use: a device unlock credential such as a passcode, or a purchasing credential such as a credit card number or a password for a store account that is linked to a credit card number or other payment source) that starts from an authorization timer starting value (e.g., zero). In some embodiments, the credential-authorization timer stores time elapsed since the credential-authorization timer was reset. For example, when one hour has elapsed since the credential-authorization timer was reset, the credential-authorization timer stores one hour. When two hours have elapsed since the credential-authorization timer was reset, the credential-authorization timer stores two hours.

In some embodiments, the device prevents unlocking the device with a fingerprint (with a fingerprint matching an enrolled fingerprint) after the credential-authorization timer expires (e.g., reaches a predefined expiration value, such as 12 hours, 24 hours, or 48 hours). In another example, the credential-authorization timer is a count down timer, the credential-authorization timer expiration value is zero seconds, and the credential-authorization timer starting value is (or corresponds to) the authorization timer expiration period, such as any of the authorization timer expiration periods listed elsewhere in this document. In this example, the device does not prevent unlocking the device (with a fingerprint matching an enrolled fingerprint) so long as the credential-authorization timer has a non-zero value.

In some embodiments, preventing the unlocking of the device with a fingerprint includes disabling the unlocking of the device with a fingerprint. For example, as illustrated in FIGS. 8L-8M, in accordance with a determination that the credential-authorized timer 898-12 (FIG. 8L) has expired, the device prevents unlocking the device even though a fingerprint in the input 820 matches an enrolled fingerprint. In some embodiments, in response to the input 820, the device displays a passcode screen (FIG. 8M) instead of unlocking the device. In comparison, in some embodiments, as illustrated in FIGS. 8J-8K, in accordance with a determination that the credential-authorization timer 898-10 (FIG. 8J) has not expired, the device unlocks in response to a fingerprint in the input 818 that matches an enrolled fingerprint (e.g., ceases to display an unlock screen illustrated in FIG. 8J and displays a home screen illustrated in FIG. 8K).

In some embodiments, the third operation includes resetting the credential-authorization timer to the authorization timer starting value. For example, as illustrated in FIGS. 8C and 8F, in accordance with a determination that the input 812 (FIG. 8C) includes a fingerprint that matches an enrolled fingerprint, the device performs a third operation (e.g., resetting the credential-authorization timer 898-5 in FIG. 8F).

In some embodiments, the first input includes (924) a respective fingerprint on the fingerprint sensor. The device detects liftoff of the respective fingerprint from the fingerprint sensor. In response to detecting liftoff of the fingerprint from the fingerprint sensor and in accordance with a determination that the respective fingerprint does not match an enrolled fingerprint, the device increments a count of unauthorized attempts to perform the second operation (e.g., unauthorized attempts to unlock the device). For example, as illustrated in FIGS. 8P and 8Q, in response to detecting liftoff of the input 826 (FIG. 8P) from the fingerprint sensor 169 (FIG. 8Q) and in accordance with a determination that a fingerprint in the input 826 does not match an enrolled fingerprint, the device increases a count of unauthorized attempts to perform the second operation (e.g., the count in the unauthorized-attempt counter 894-2) from zero to one. In some embodiments, the count of unauthorized attempts is only incremented upon detecting a distinct fingerprint gesture that includes touchdown and liftoff of a fingerprint from the fingerprint sensor. As a result, a long continuous fingerprint gesture is only counted as a single attempt to perform the second operation.

In some embodiments, subsequent to incrementing the count of unauthorized attempts to perform the second operation, the device determines (926) whether fingerprint-disable criteria have been met. The fingerprint-disable criteria include a criterion that is met when the count of unauthorized attempts to perform the second operation satisfies a predefined number of unauthorized attempts to perform the second operation. In some embodiments, the count of unauthorized attempts to perform in the second operation is deemed to satisfy a predefined number of unauthorized attempts to perform the second operation when the count of unauthorized attempts to perform the second operation matches the predefined number of unauthorized attempts to perform the second operation. For example, when the predefined number of unauthorized attempts to perform the second operation is set to two, and the count of unauthorized attempts to perform the second operation in the unauthorized-attempt counter 894-3 (FIG. 8T) is two, the count of unauthorized attempts satisfies the predefined number of unauthorized attempts to perform the second operation. In some embodiments, the count of unauthorized attempts to perform the second operation is deemed to satisfy a predefined number of unauthorized attempts to perform the second operation when the count of unauthorized attempts to perform the second operation exceeds the predefined number of unauthorized attempts to perform the second operation.

In some embodiments, in accordance with a determination that the fingerprint-disable criteria have been met, the device prevents the second operation from being performed based on a fingerprint (e.g., by disabling the fingerprint sensor or by ignoring a fingerprint detected by the fingerprint sensor that matches a previously enrolled fingerprint). For example, as illustrated in FIGS. 8T-8U, in accordance with a determination that the fingerprint-disable criteria have been met (e.g., the count of unauthorized attempts to perform the second operation satisfies a predefined number of unauthorized attempts to perform the second operation), the device prevents the second operation (e.g., revealing private information such as usernames and passwords) from being performed in response to a fingerprint in an input 830 that matches an enrolled fingerprint (e.g., the representations of private information are maintained on the touch screen 112 in FIG. 8U and private information is not displayed on the touch screen 112 in FIG. 8U).

In some embodiments, the first operation is performed (928) while detecting the presence of a fingerprint on the fingerprint sensor, and the second operation is performed in response to detecting liftoff of a fingerprint that matches a previously enrolled fingerprint from the fingerprint sensor. For example, in some embodiments, the first operation (e.g., resetting the display dim timer 896-3 in FIG. 8C) is performed while detecting the input 812 (FIG. 8C) that includes a fingerprint on the fingerprint sensor 169 (FIG. 8C). In comparison, in some embodiments, the second operation (e.g., revealing private information such as credit card information) is performed only after detecting liftoff of the input 812 (FIG. 8C) from the fingerprint sensor 169 (FIG. 8E).

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. For example, in some embodiments, the device detects, with the fingerprint sensor, a first input. In response to detecting the first input, the device determines whether the first input includes a fingerprint; and, in accordance with a determination that the first input includes a fingerprint, performs a first operation based on the presence of the fingerprint without regard to an identity of the fingerprint; and, in accordance with a determination that the fingerprint in the first input matches an enrolled fingerprint, performs a second operation based on the enrolled fingerprint.

Additionally, it should be noted that details of other processes described herein with respect to other methods described herein (e.g., those listed in the "Description of Embodiments" section above) are also applicable in an analogous manner to method 900 described above with respect to FIGS. 9A-9B. For example, the inputs, operations, and credentials described above with reference to method 900 optionally have one or more of the characteristics of the inputs, operations, and credentials described herein with reference to other methods described herein (e.g., those listed in the "Description of Embodiments" section above). For brevity, these details are not repeated here.

Figure 10:
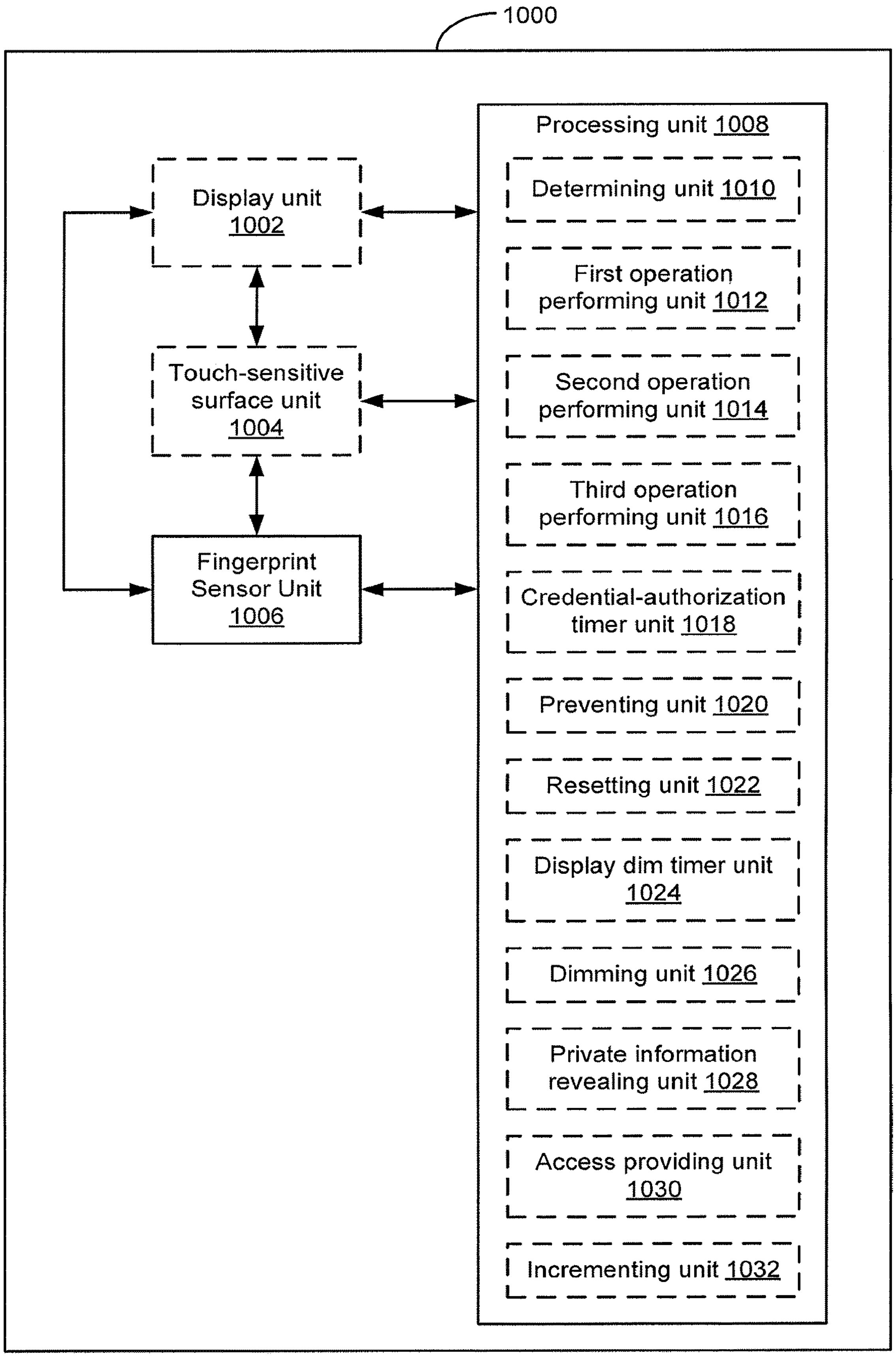
FIG. 10 is a functional block diagram of an electronic device in accordance with some embodiments.

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 includes a fingerprint sensor unit 1006 configured to detect a first input; and a processing unit 1008 coupled to the fingerprint sensor unit 1006. In some embodiments, the electronic device 1000 includes a display unit 1002 coupled to the processing unit 1008 and configured to display a graphical user interface. In some embodiments, the display unit 1002 is coupled to the fingerprint sensor unit 1006. In some embodiments, the electronic device 1000 includes a touch-sensitive surface unit 1004 coupled to the processing unit 1008 and configured to receive touch inputs. In some embodiments, the processing unit 1008 includes a determining unit 1010, a first operation performing unit 1012, a second operation performing unit 1014, a third operation performing unit 1016, a credential-authorization timer unit 1018, a preventing unit 1020, a resetting unit 1022, a display dim timer unit 1024, a dimming unit 1026, a private information revealing unit 1028, an access providing unit 1030, and an incrementing unit 1032.

The processing unit 1008 is configured to, in response to detecting the first input, determine whether the first input includes a fingerprint (e.g., with the determining unit 1010). The processing unit 1008 is also configured to, in accordance with a determination that the first input includes a fingerprint, perform a first operation based on the presence of the fingerprint without regard to an identity of the fingerprint (e.g., with the first operation performing unit 1012). The processing unit 1008 is further configured to, in accordance with a determination that the fingerprint in the first input matches an enrolled fingerprint (e.g., with the determining unit 1010), conditionally perform a second operation based on the enrolled fingerprint (e.g., with the second operation performing unit 1014).

In some embodiments, the processing unit 1008 is configured to, in response to detecting the first input, in accordance with the determination that the first input includes the fingerprint and a determination that the fingerprint in the first input does not match an enrolled fingerprint, forgo performance of the second operation (e.g., with the preventing unit 1020).

In some embodiments, the processing unit 1008 is configured to, in response to detecting the first input, in accordance with the determination that the first input includes the fingerprint and a determination that the fingerprint in the first input does not match an enrolled fingerprint (e.g., with the determining unit 1010), perform the first operation (e.g., with the first operation performing unit 1012) without performing the second operation.

In some embodiments, the first operation and the second operation are both performed (e.g., with the first operation performing unit 1012 and the second operation performing unit 1014) in accordance with a determination that the first input includes a fingerprint that matches an enrolled fingerprint (e.g., with the determining unit 1010).

In some embodiments, the processing unit 1008 is configured to, in accordance with a determination that the first input includes a fingerprint that matches an enrolled fingerprint, perform a third operation, distinct from the second operation, based on the enrolled fingerprint (e.g., with the third operation performing unit 1016).

In some embodiments, the device includes a credential-authorization timer unit 1018 that starts from an authorization timer starting value. The processing unit 1008 is configured to prevent unlocking the device with a fingerprint (e.g., with the preventing unit 1020) after the credential-authorization timer unit 1018 expires. The third operation includes resetting the credential-authorization timer unit 1018 to the authorization timer starting value (e.g., with the resetting unit 1022).

In some embodiments, the device includes the display unit 1002 coupled to the processing unit 1008. The device includes a display dim timer unit 1024 that starts from a dim timer starting value. The processing unit 1008 is configured to automatically enable dimming of the display unit 1002 (e.g., with the dimming unit 1026) in accordance with a determination that the display dim timer unit 1024 has expired (e.g., with the determining unit 1010). The first operation includes resetting the display dim timer unit 1024 to the dim timer starting value (e.g., with the resetting unit 1022).

In some embodiments, the second operation includes one or more of: revealing private information (e.g., with the private information revealing unit 1028) and providing access to restricted features (e.g., with the access providing unit 1030).

In some embodiments, the first input includes a respective fingerprint on the fingerprint sensor unit 1006. The fingerprint sensor unit 1006 is configured to detect liftoff of the respective fingerprint from the fingerprint sensor unit 1006 and the processing unit 1008 is configured to, in response to detecting liftoff of the fingerprint from the fingerprint sensor unit 1006 and in accordance with a determination that the respective fingerprint does not match an enrolled fingerprint (e.g., with the determining unit 1010), increment a count of unauthorized attempts to perform the second operation (e.g., with the incrementing unit 1032).

In some embodiments, the processing unit 1008 is configured to, subsequent to incrementing the count of unauthorized attempts to perform the second operation, determine whether fingerprint-disable criteria have been met (e.g., with the determining unit 1010). The fingerprint-disable criteria includes a criterion that is met when the count of unauthorized attempts to perform the second operation satisfies a predefined number of unauthorized attempts to perform the second operation. In accordance with a determination that fingerprint-disable criteria have been met (e.g., with the determining unit 1010), the processing unit 1008 is configured to prevent the second operation from being performed based on a fingerprint (e.g., with the preventing unit 1020 and/or the second operation performing unit 1014).

In some embodiments, the first operation is performed (e.g., with the first operation performing unit 1012) while detecting the presence of a fingerprint on the fingerprint sensor unit 1006; and the second operation is performed (e.g., with the second operation performing unit 1014) in response to detecting liftoff of a fingerprint that matches a previously enrolled fingerprint from the fingerprint sensor unit 1006.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9B are, optionally, implemented by components depicted in FIGS. 1A-1B or FIG. 10. For example, detection operation 902, first operation performing operation 906, and second operation performing operation 910 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Automatically Populating Credential Fields and Revealing Redacted Credentials Many uses of modern electronic devices require users to provide credentials in order to access certain information and/or services. For example, e-commerce websites or applications often require a user to enter a credit card number, billing address, and shipping address in order to make a purchase. As another example, users are often required to enter a user ID and/or password before access to a secure service or other secure information is granted (e.g., an email website or application, a social network, etc.). Because users are required to provide credentials so frequently when using electronic devices, it is possible to store credentials in memory of such devices so that they can be inserted into credential fields without requiring manual entry by the user. However, this presents several security and privacy risks. For example, an unauthorized user may be able pick up a device that does not belong to them and make purchases using stored credit card information, or gain access to personal and/or sensitive data, applications, websites, or the like.

Moreover, in order to protect the privacy and/or security of credentials, they may be displayed in redacted form so that they cannot be read or copied. However, this makes it difficult for users to review the credentials to confirm that they were entered correctly, or to review and/or edit stored credentials that are typically only displayed in redacted form (e.g., as may be the case in a credential manager interface with which a user can enter, edit, and otherwise manage credentials stored on a device).

In embodiments described below, fingerprint recognition is used to provide authorization to access credentials, and, more particularly, to provide authorization to populate credential fields and/or display non-redacted versions of credentials to a user. For example, if a user navigates to a form with credential fields (e.g., for a credit card number, a billing address, etc.), the user can provide a fingerprint input by placing a finger on a fingerprint sensor. If the fingerprint detected on the fingerprint sensor matches a previously registered fingerprint of the user (and, optionally, if other conditions are satisfied) the credential fields will be automatically populated with stored credentials associated with the user. This way, manual entry of credentials, which is time consuming and can be prone to text input errors, is avoided. As another example, if redacted credentials are displayed (e.g., in a webpage or a credential manager interface), the user can provide a fingerprint input in order to cause the credentials to be displayed in a non-redacted (i.e., human readable) form. Accordingly, credentials can be accessed for viewing and/or input into credential fields quickly and intuitively, while also preventing unauthorized access to such credentials.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 11A-11D, 14A-14C, 12A-12B, and 15A-15B includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 11A-11D, 14A-14C, 12A-12B, and 15A-15B will be discussed with reference to a device with a touch screen 112 and a separate fingerprint sensor 359-2, however analogous operations are, optionally, performed on a device with an integrated fingerprint sensor 359-1 in response to detecting the inputs described in FIGS. 11A-11D and 14A-14C on the integrated fingerprint sensor 359-1 while displaying the user interfaces shown in FIGS. 11A-11D and 14A-14C on the display 450. Additionally, analogous operations are, optionally, performed on a device with a display 450 and a separate touch-sensitive surface 451 instead of a touch screen 112 in response to detecting the contacts described in FIGS. 11A-11D and 14A-14C on a fingerprint sensor 169 (e.g., an integrated fingerprint sensor 359-1 or a separate fingerprint sensor 359-2) and/or the separate touch-sensitive surface 451 while displaying the user interfaces shown in FIGS. 11A-11D and 14A-14C on the display 450; in such embodiments, the contacts shown in FIGS. 11A-11D and 14A-14C optionally represent both a focus selector that corresponds to a location on the display 450, and a contact that corresponds to a location of a contact or gesture performed on the separate touch-sensitive surface (e.g., touch-sensitive surface 451), where the focus selector is, optionally: a respective contact, a representative point corresponding to a contact (e.g., a centroid of a respective contact or a point associated with a respective contact), or a centroid of two or more contacts detected on the touch screen 112 and is, optionally, replaced with a displayed cursor.

Figure 11A:
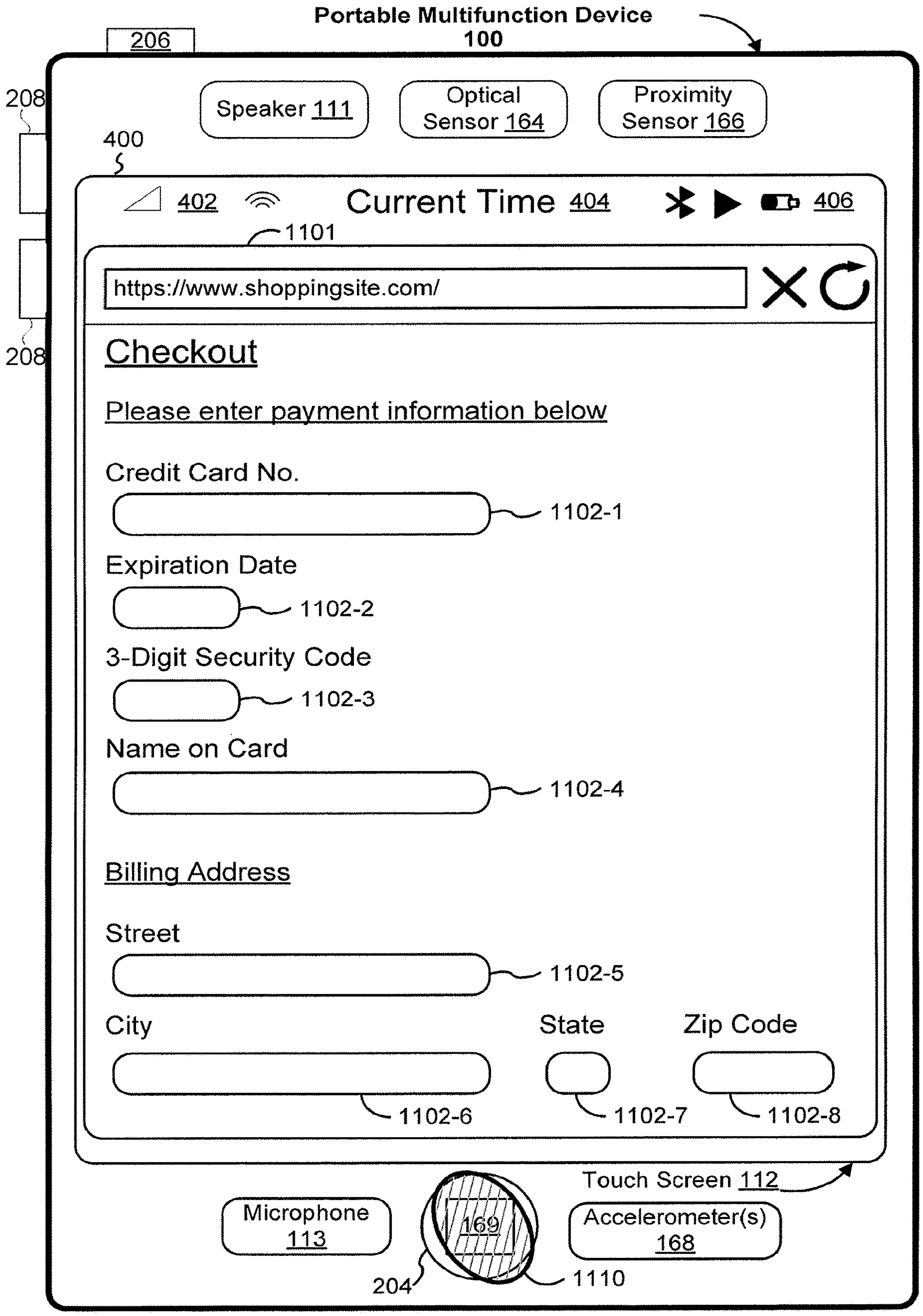
FIGS. 11A-11D illustrate exemplary user interfaces for populating credential fields with credentials, and for displaying non-redacted versions of credentials, in response to fingerprint-based authentication of a user, in accordance with some embodiments.

FIG. 11A illustrates an exemplary user interface that is displayed on a display of a portable multi-function device 100, where the user interface displays a form 1101 with fields 1102 (1102-1, . . . , 1102-8) corresponding to a plurality of credentials. The fields 1102 illustrated in FIG. 11A correspond to the types of fields that are sometimes present in a "checkout" form of an e-commerce website or application, including credit card information fields (e.g., credit card number field 1102-1, expiration date field 1102-2, etc.) and billing address information fields (e.g., street field 1102-5, city field 1102-6, etc.). The fields 1102 displayed in form 1101 are merely exemplary, and more or fewer fields may be displayed in various embodiments. Moreover, other fields, including other types of fields that are not shown in FIG. 11A, may be included instead of or in addition to those shown.

As shown in FIG. 11A, device 100 detects a finger input 1110 on fingerprint sensor 169 while displaying form 1101. In some embodiments, finger input 1110 corresponds to a request to automatically fill in the fields in form 1101. For example, in some embodiments, when a form with credential fields is displayed by device 100, detection of an authorized fingerprint on fingerprint sensor 169 will cause the device 100 to populate the fields with stored credentials. On the other hand, as described below, if an unauthorized fingerprint is detected on fingerprint sensor 169, the fields will not be populated with stored credentials.

Figure 11B:
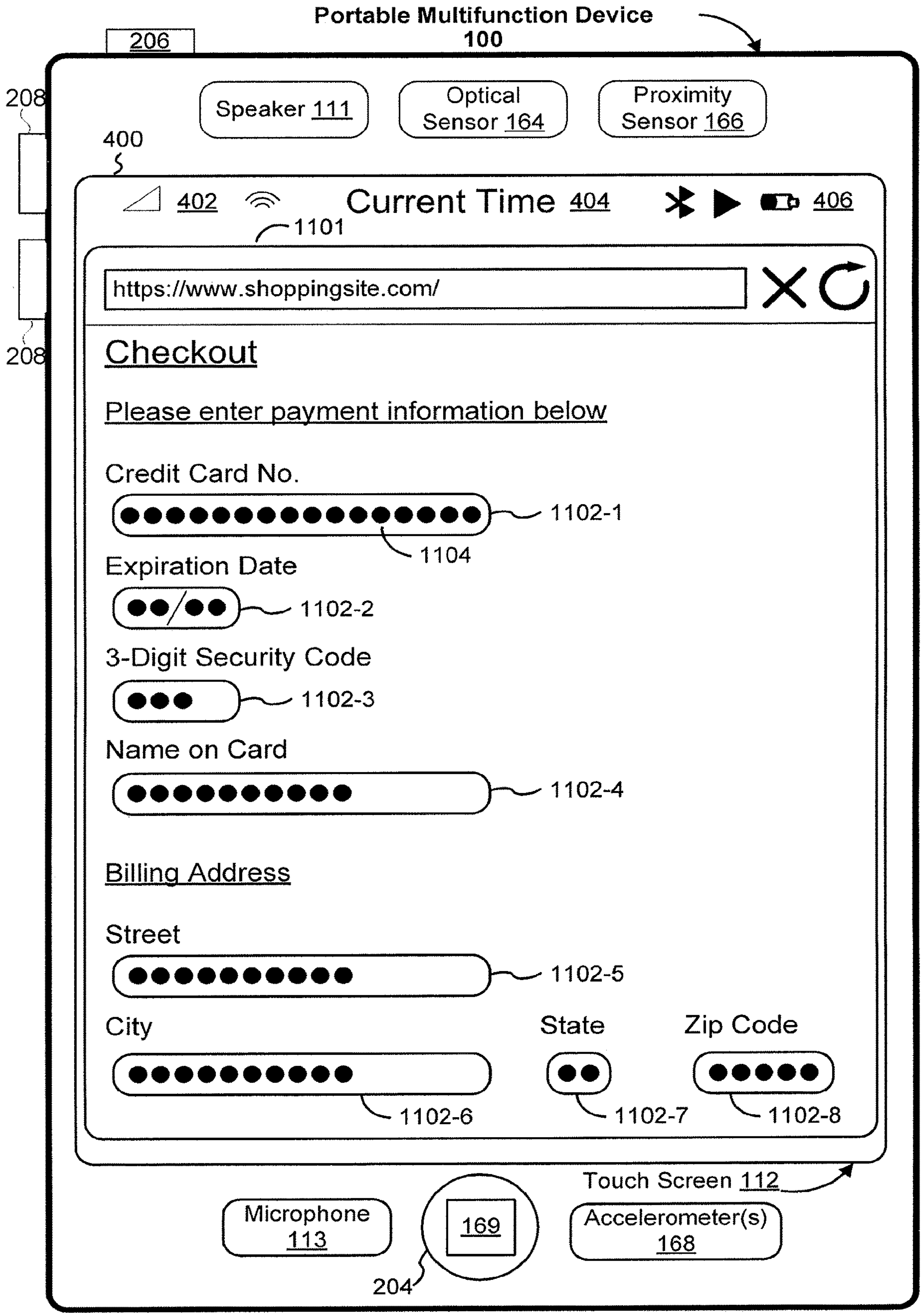

FIG. 11B illustrates form 1101 after fields 1102 have been populated with credentials (e.g., after it has been determined that the fingerprint 1110 is associated with a user who is authorized to use the credentials). As shown in FIG. 11B, the credentials are displayed in redacted form so that they are unreadable to a user of the device. In this example, the redacted credentials are represented as sequences of dots. However, one of ordinary skill in the art would recognize that other redaction techniques may also be implemented in various embodiments (e.g., any removal, replacement or obscuration of the characters so that the credentials are unreadable by a user of the device).

In some embodiments, credentials that are automatically populated into credential fields are redacted by default. In some embodiments, one or more of the automatically inserted credentials are displayed in non-redacted or partially redacted form (i.e., including redacted and non-redacted portions), instead of the redacted form illustrated in FIG. 11B. For example, in some embodiments, the last four digits of the credit card credential 1104 are displayed in human readable form (not shown). In some embodiments, other credentials are displayed in partially redacted or non-redacted form, such as a billing address, a name on a credit card, etc. In some embodiments where multiple credential fields are displayed, any combination of redacted, partially redacted, and non-redacted credentials may be displayed. For example, in some embodiments, a credit card number credential is displayed in partially redacted form, an expiration date and credit card security code are displayed in redacted form, and a billing address is displayed in non-redacted form. In some embodiments, whether a credential is displayed in redacted, partially redacted, or non-redacted form is based on a sensitivity and/or security level associated with that credential. For example, credit card numbers, bank account numbers, and the like may be associated with a higher sensitivity and/or security level than usernames and mailing addresses.

As described above, FIG. 11B illustrates form 1101 after it has been determined that the fingerprint 1110 is associated with a user who is authorized to use the credentials, and after device 100 has filled in form 1101 with the credentials (e.g., the fields 1102 have been populated with the credentials). If, on the other hand, it is determined that fingerprint 1110 is not associated with a user who is authorized to use the credentials, the device forgoes filling in the form 1101 with the credentials (not shown). In some embodiments, if a finger input (e.g., finger input 1110) is detected, but the fingerprint does not match those of an authorized user, device 100 issues a prompt indicating that the request to automatically populate the credential fields is denied.

Figure 11C:
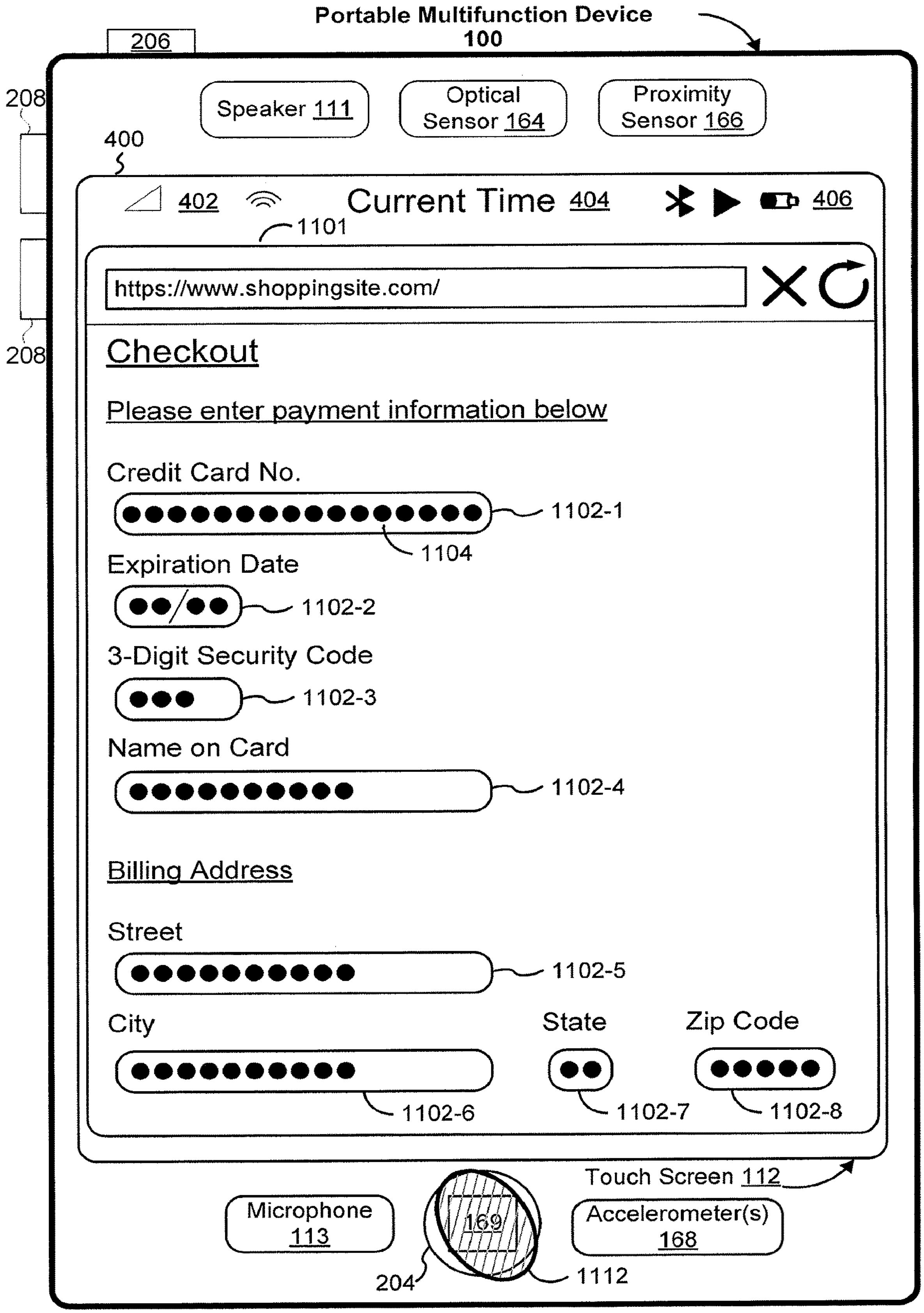
Figure 11D:
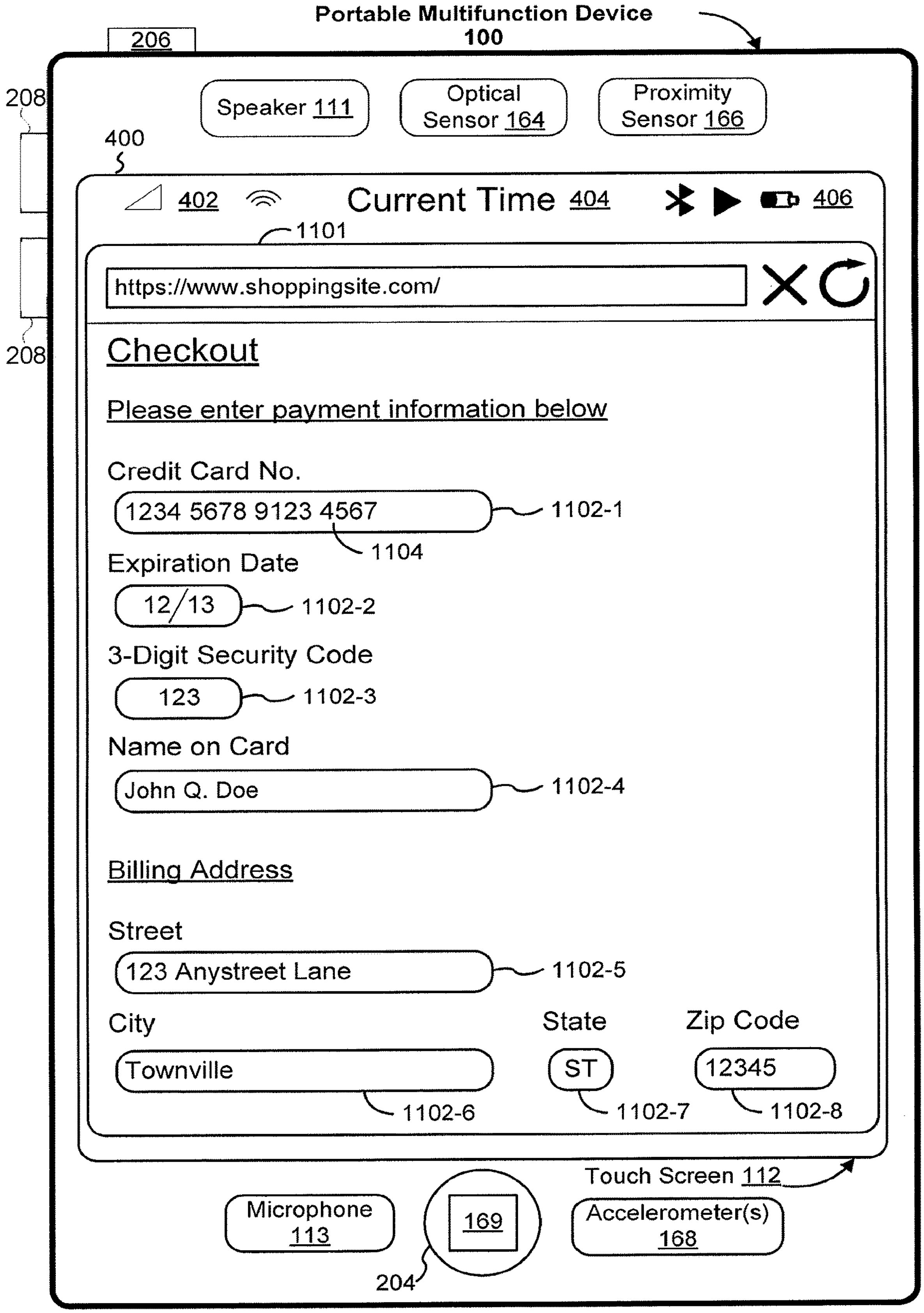

In some embodiments, once the form 1101 has been filled in, an additional finger input can be used to cause the credentials to be displayed in non-redacted form, as described with respect to FIGS. 11C-11D. This way, a user can review the credentials to make sure that they are correct and/or correspond to the particular credentials that the user wished to use. In some implementations, the additional finger input is accomplished by the user lifting their finger off fingerprint sensor 169 to end the initial fingerprint 1110, and putting their finger back down on fingerprint sensor 169. Upon authentication of the second fingerprint, e.g., as matching an enrolled fingerprint of a user who is authorized to reveal the one or more credentials, the one or more credentials of the user previously displayed in redacted form are displayed in non-redacted form. Finger input 1112 shown in FIG. 11C is an example of the aforementioned second fingerprint.

As shown in FIG. 11C, device 100 detects a finger input 1112 on fingerprint sensor 169 while displaying form 1101 with redacted credentials displayed in credential fields 1102.

In response to finger input 1112, and in accordance with a determination that the fingerprint corresponding to finger input 1112 is associated with a user who is authorized to reveal the one or more credentials, non-redacted versions of the one or more credentials are displayed in the fields 1102 of form 1101, as shown in FIG. 11D. For example, FIG. 11D illustrates all of the credentials in form 1101 in plaintext.

In the process shown and described with respect to FIGS. 11A-11D, a first finger input (e.g., finger input 1110) causes a form to be filled in with redacted credentials, and a second finger input (e.g., finger input 1112) causes non-redacted versions of the credentials to be displayed in place of the redacted versions. In some embodiments, sequential finger inputs cause increasing amounts of one or more credentials to be displayed in non-redacted form. For example, after a first finger input is received (and after it is determined that the fingerprint of the input is associated with an authorized user), credential fields in a form are populated with redacted credentials. After a second finger input from an authorized user is received, a subset of the redacted credentials are replaced with non-redacted versions of the credentials, while others of the redacted credentials remain unchanged (e.g., remain in redacted form). Alternatively, after the second finger input, all or some of the redacted credentials are replaced with partially redacted versions of the credentials. Finally, after a third finger input, all of the credentials are displayed in non-redacted form. Accordingly, each sequential finger input of an authorized user causes redacted credentials to be replaced with less redacted (i.e., more readable) versions. This way, users can easily scale the degree to which their sensitive information is revealed in plaintext, while also allowing them to review the credentials that are automatically filled in to ensure that they are the correct and/or intended credentials.

In some embodiments, the sequential inputs described above must be received and/or detected without intervening inputs (e.g., finger inputs, touch events, etc.). In some embodiments, the sequential inputs need not be received and/or detected without intervening inputs.

In some embodiments, the order in which credentials are displayed in non-redacted form in response to a sequence of finger inputs depends on the relative security level of the credential. For example, in some embodiments, a non-redacted version of a shipping address is displayed in response to an earlier finger input in a sequence of finger inputs (e.g., because it is associated with a lower security and/or privacy level), and a non-redacted version of a credit card number is displayed in response to a later finger input in the sequence of finger inputs (e.g., because it is associated with a higher security and/or privacy level).

Figure 12A:
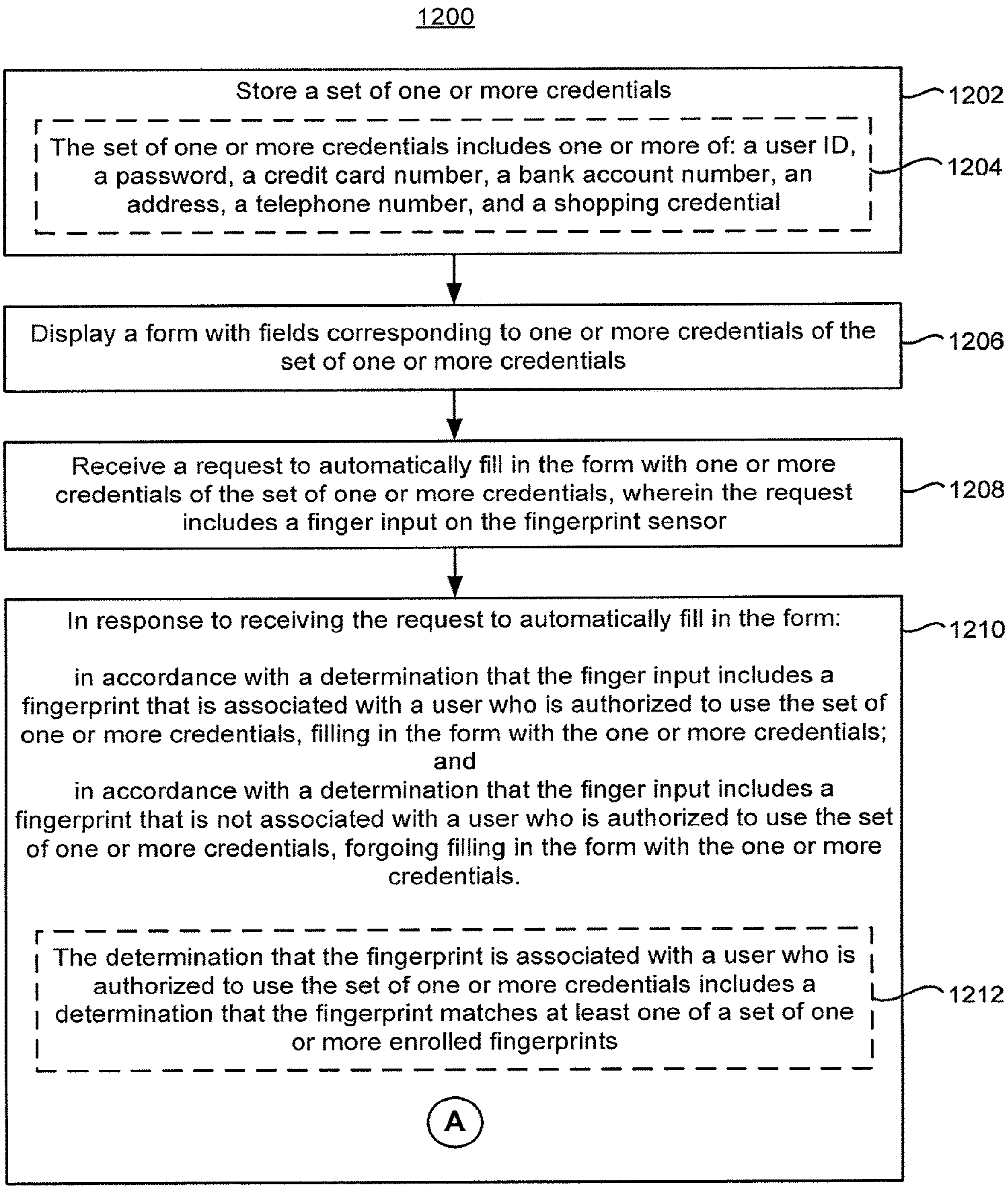
FIGS. 12A-12B are flow diagrams illustrating methods for using fingerprint-based authentication of a user to authorize automatic population of credential fields and to authorize display of non-redacted versions of credentials, in accordance with some embodiments.
Figure 12B:
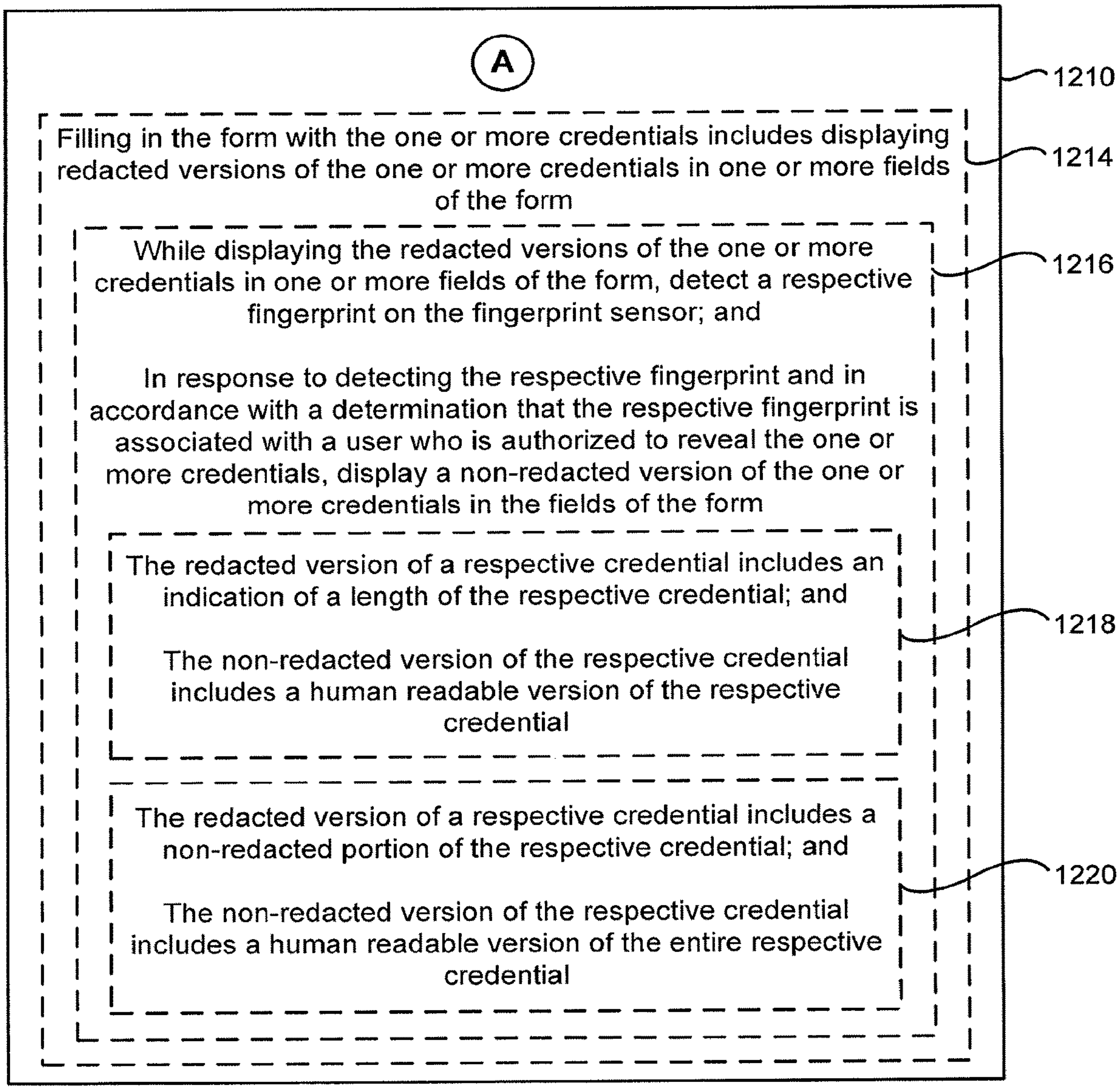

FIGS. 12A-12B are flow diagrams illustrating a method 1200 of populating credential fields with credentials, in accordance with some embodiments. The method 1200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 1200 are, optionally, combined and/or the order of some operations is, optionally, changed.

As described below, the method 1200 provides an intuitive way to enter credentials into credential fields that are displayed in a form, and display non-redacted versions of the credentials after redacted versions are initially displayed. The method reduces the cognitive burden on a user when presented with credential fields that need to be populated, thereby creating a more efficient human-machine interface. For battery-operated electronic devices, enabling a user to populate credential fields and enable display of non-redacted versions of credentials faster and more efficiently conserves power and increases the time between battery charges.

The device stores a set of one or more credentials (1202). In some embodiments, credentials are secured credentials that are associated with a user of the device. In some embodiments, the set of one or more credentials is stored in memory of the device (e.g., memory 102, FIG. 1A). In some embodiments, the credentials are stored in a secure area of memory 102, and/or are encrypted to prevent unauthorized access thereto.

In some embodiments, the set of one or more credentials includes one or more of: a user ID, a password, a credit card number, a bank account number, an address, a telephone number, and/or a shopping credential (1204). In some implementations, the set of credentials includes a plurality of subsets of credentials, each subset corresponding to or associated with a distinct application, payment method, user, shipping address, online resource, set of online resources, or the like. In one example, the set of credentials include: for a first particular online resource (e.g., an email website), a user ID and a password; for a second particular online resource, a user ID, a password, a shipping address, a billing address, and a telephone number; and for shopping, a user ID, a credit card number, a shipping address, a billing address, and a telephone number.

The device displays a form with fields corresponding to one or more credentials of the set of one or more credentials (1206). In some embodiments, the form is a webpage, such as a checkout page of an e-commerce website, a login page to a secure webpage (e.g., a social network, email provider, etc.), or the like. In some embodiments, the form is associated with a user interface of an application, such as a login screen of an application (or operating system). One exemplary form 1101, shown in FIGS. 11A-11D, illustrates an example of a "checkout" page of an e-commerce website, and includes fields for credentials that are typical of a "checkout" or purchase authorization page (e.g., credit card information fields, billing address information fields, etc.).

The device receives a request to automatically fill in the form with one or more credentials of the set of one or more credentials, wherein the request includes a finger input on the fingerprint sensor (1208). For example, when a form with credential fields is displayed, a user requests that the form be automatically filled with the appropriate credentials by placing a finger on the fingerprint sensor 169, as shown in FIG. 11A. In some embodiments, the request to auto-fill the form corresponds to a request to populate all displayed fields of a form with credentials (or all fields for which credentials have been stored). In some embodiments, the request to auto-fill the form corresponds to a request to populate all fields of the form with credentials, regardless of whether they are displayed when the request is received (e.g., undisplayed fields of the form, such as those that are "off screen," are also populated in response to the request).

In some embodiments, when the device detects that a form having appropriate credential fields is displayed or to be displayed, the device prompts the user to provide an input in order to request automatic filling ("auto-fill") of a form, such as by presenting the text "Scan your fingerprint to automatically fill in this form."

In response to receiving the request to automatically fill in the form: in accordance with a determination that the finger input includes a fingerprint that is associated with a user who is authorized to use the set of one or more credentials, the device fills in the form with the one or more credentials; and in accordance with a determination that the finger input includes a fingerprint that is not associated with a user who is authorized to use the set of one or more credentials, the device forgoes filling in the form with the one or more credentials (1210).

In some embodiments, the determination that the fingerprint is associated with a user who is authorized to use the set of one or more credentials includes a determination that the fingerprint matches at least one of a set of one or more enrolled fingerprints (1212). For example, if the fingerprint corresponding to finger input 1110 (FIG. 11A) matches an enrolled fingerprint, the device fills in the form (i.e., the fields of the form) with the stored credentials, as shown in FIG. 11B. If, on the other hand, the fingerprint corresponding to finger input 1110 does not match an enrolled fingerprint, the device will not fill in the form. In some embodiments, the device will provide an indication that the fingerprint did not match an enrolled fingerprint, such as an audible or visible alert. For example, the device will display a prompt with the text "Auto-fill authorization denied—please try again."

In some implementations, one or more enrolled fingerprints are associated with a user who is authorized to use the set of one or more credentials, while one or more other enrolled fingerprints are not associated with a user who is authorized to use the set of one or more credentials. In such implementations, the determination that the fingerprint is associated with a user who is authorized to use the set of one or more credentials includes a determination that the fingerprint matches at least one enrolled fingerprint that is associated with a user who is authorized to use the set of one or more credentials.

In some implementations, different enrolled fingerprints are associated with different sets of credentials or different subsets of the set of credentials stored in the device. In one example, one or more enrolled fingerprints are associated with a user who is authorized to use all of the credentials, or a first subset of the credentials that is less than all the credentials, in the set of one or more credentials, while one or more other enrolled fingerprints are associated with another user who is authorized to use only a second subset of the credentials that is less than all the credentials and that is different from the first subset of the credentials. Other examples of associating different enrolled fingerprints with different sets or subsets of credentials are possible. In some such implementations, the determination that a fingerprint in a finger input is associated with a user who is authorized to use the set of one or more credentials includes both a determination that the fingerprint matches at least one of a set of one or more enrolled fingerprints, and if so, a determination of whether the use one or more respective credentials in the set of one or more credentials is authorized by the fingerprint.

In some embodiments, the determination that the fingerprint is associated with a user who is authorized to use the set of one or more credentials and/or the determination that the fingerprint matches at least one of a set of one or more enrolled fingerprints is performed by the device (e.g., with fingerprint analysis module 131 of device 100). In some embodiments, the determinations are performed by one or more additional devices instead of or in addition to the device.

In some embodiments, if a predetermined number of consecutive requests to auto-fill a form are denied (e.g., 2, 3, 4, 5, or more denials), the device performs one or more actions. For example, in order to protect sensitive information from unauthorized access and/or use, the device disables an auto-fill functionality (e.g., for a predetermined time, or until a valid override password is input by a user), or deletes stored credentials from memory.

With reference to FIG. 12B, in some embodiments, filling in the form with the one or more credentials includes displaying redacted versions of the one or more credentials in one or more fields of the form (1214). In some embodiments, a respective credential is redacted when at least a portion of the respective credential is rendered unreadable to a user of the device (e.g., by removing, replacing or obscuring characters, or by blocking out all or a portion of the characters in the respective credential). For example, the credentials in FIG. 11B (e.g., credit card credential 1104) are illustrated as a series of dots.

In some embodiments, while displaying the redacted versions of the one or more credentials in one or more fields of the form, the device detects a respective fingerprint on the fingerprint sensor; and in response to detecting the respective fingerprint and in accordance with a determination that the respective fingerprint is associated with a user who is authorized to reveal the one or more credentials, displays a non-redacted version of the one or more credentials in the fields of the form (1216). For example, FIG. 11D illustrates the device displaying non-redacted versions of credentials in response to a finger input 1112 (shown in FIG. 11C) corresponding to a fingerprint of an authorized user.

In some embodiments, the same fingerprints that are authorized to use the set of credentials are also authorized to reveal the set of one or more credentials. In some embodiments, one or more fingerprints that are authorized to use the credentials are not authorized to reveal the credentials.

As shown in FIGS. 11A-11D, the device initially displays credentials in redacted form, and, if certain conditions are met, subsequently displays non-redacted versions of the credentials. In some embodiments, the redacted version of a respective credential includes an indication of a length of the respective credential; and the non-redacted version of the respective credential includes a human readable version of the respective credential (1218). A redacted credential can indicate the length of the underlying credential in several ways. For example, in some embodiments, the redacted version of a respective credential includes a symbol (e.g., a dot, asterisk, letter, etc.) for each character in the respective credential. Credential 1104 in FIGS. 11B-11D illustrates an example of this, where one dot is displayed for each number in the credit card number. In some embodiments, the redacted version of a respective credential includes a symbol or graphic whose length is proportional to the length of the respective credential (e.g., a black bar, a horizontal line, etc.). In some embodiments, a human readable version of the respective credential is a plaintext version of the credential (i.e., the actual text, symbols, numbers, characters, etc., of the credential).

In some embodiments, or in some circumstances, the redacted version of a respective credential includes a non-redacted portion of the respective credential; and the non-redacted version of the respective credential includes a human readable version of the entire respective credential (1220). In some embodiments, the particular portion of the redacted credential that is non-redacted depends on the credential. For example, in the case of a credit card number, the last four digits are displayed in plaintext in the redacted version. In the case of an address credential, the house number (and/or the city or state) is displayed in plaintext in the redacted version, and the rest of the address (e.g., the street name and zip code) is redacted. Other portions of these credentials are displayed in non-redacted form in various embodiments.

Devices are sometimes used by multiple, different users, each having a different set of credentials that they are likely to use. For example, each user may have a unique username and password for an email account, a unique credit card number. unique login credentials for social networking services, and the like. Moreover, in some embodiments, a device can register fingerprints for multiple users, such that the device can identify a user making a request by comparing a received fingerprint to the registered fingerprints of the multiple users. Accordingly, in some embodiments, in response to receiving the request to automatically fill in the form, the device identifies which user has issued the request (e.g., by comparing the fingerprint of the finger input 1110 to the registered fingerprints), and automatically fills in the form with credentials corresponding to the identified user. Thus, personalized auto-fill based on fingerprint recognition is provided for multiple different users of a single device.

Similarly, a user of a device may have multiple different instances of a particular type of credential. For example, a user may have multiple email accounts, each with its own unique email address and password. A user may also have multiple credit cards, each associated with unique credit card information. Further, a user may have multiple different mailing addresses (e.g., a home address and a business address). In some embodiments, respective sets of one or more credentials of a user are associated with different respective fingerprints of the user. For example, credentials of a first credit card and billing address are associated with a fingerprint of a right thumb (RT) of the user, and a second credit card and billing address are associated with a fingerprint of a right index (RI) finger. As another example, credentials for a credit card are associated with a fingerprint of a right thumb (RT) of the user, and login credentials for a social networking service are associated with a fingerprint of a right index (RI) finger. Accordingly, in some embodiments, the device selects a set of one or more credentials (from among multiple sets) that correspond to the particular fingerprint detected by the fingerprint sensor, and auto-fills the form with the selected set of one or more credentials. Other associations between fingers and sets of credentials than those described above are also possible. For example, any credential or set of credentials described herein can be associated with any unique fingerprint, whether it is a different finger of the same user, or a finger of a different user.

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the "Description of Embodiments" section above) are also applicable in an analogous manner to method 1200 described above with respect to FIGS. 12A-12B. For example, the fingerprints, contacts, and user interface objects described above with reference to method 1200 optionally have one or more of the characteristics of the fingerprints, contacts, and user interface objects described herein with reference to other methods described herein (e.g., those listed in the "Description of Embodiments" section above). For brevity, these details are not repeated here.

Figure 13:
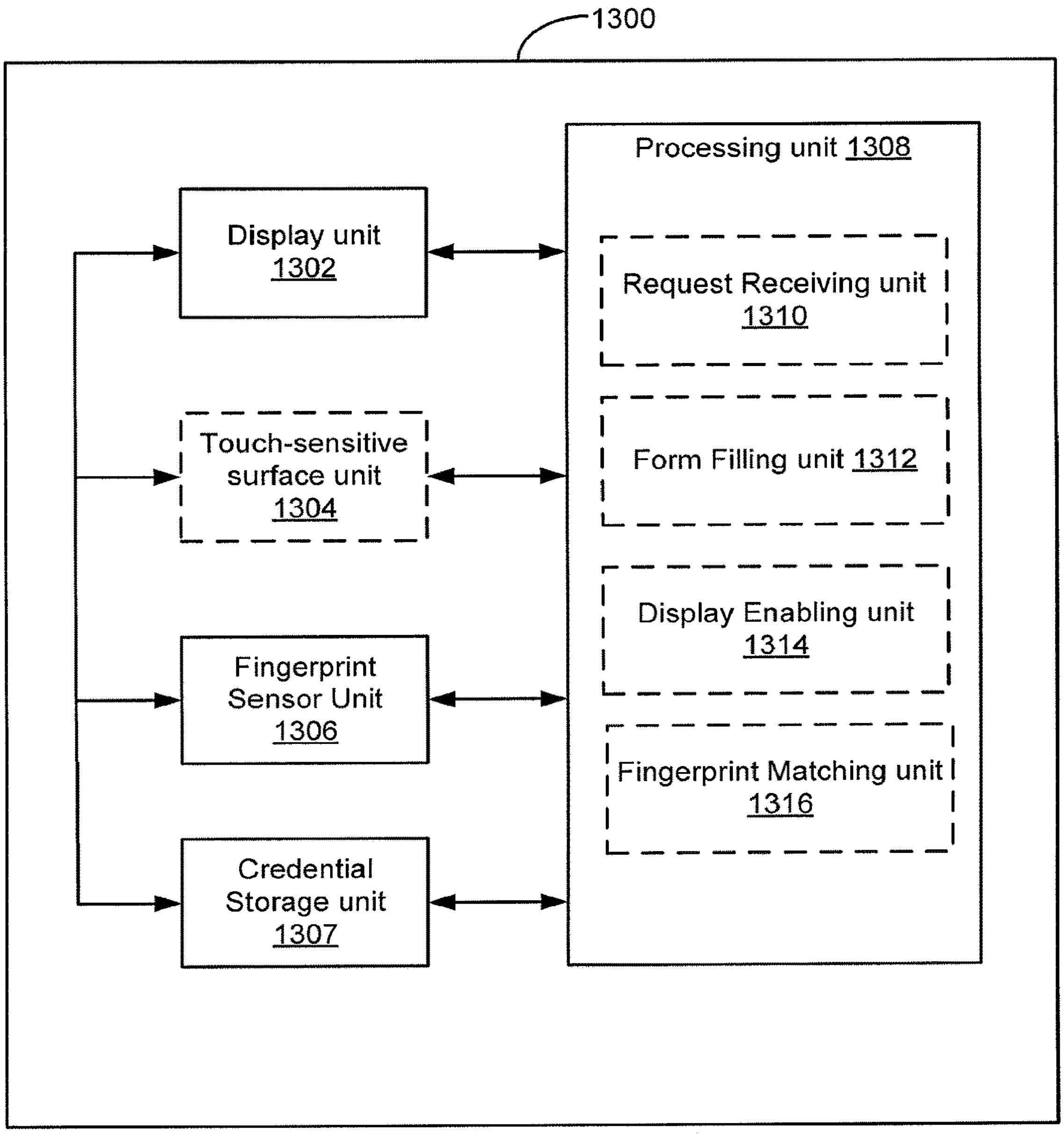
FIG. 13 is a functional block diagram of an electronic device, in accordance with some embodiments.

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a form with fields corresponding to one or more credentials of the set of one or more credentials, an optional touch-sensitive surface unit 1304 configured to receive contacts, a fingerprint sensor unit 1306; a credential storage unit 1307 configured to store a set of one or more credentials, and a processing unit 1308 coupled to the display unit 1302, the optional touch-sensitive surface unit 1304, the credential storage unit 1307, and the fingerprint sensor unit 1306. In some embodiments, the processing unit 1308 includes a request receiving unit 1310, a form filling unit 1312, a display enabling unit 1314, and a fingerprint matching unit 1316.

Processing unit 1308 is configured to: receive a request to automatically fill in the form with one or more credentials of the set of one or more credentials (e.g., with request receiving unit 1310), wherein the request includes a finger input on the fingerprint sensor (e.g., fingerprint sensor unit 1306); and in response to receiving the request to automatically fill in the form: in accordance with a determination that the finger input includes a fingerprint that is associated with a user who is authorized to use the set of one or more credentials, fill in the form with the one or more credentials (e.g., with form filling unit 1312); and in accordance with a determination that the finger input includes a fingerprint that is not associated with a user who is authorized to use the set of one or more credentials, forgo filling in the form with the one or more credentials (e.g., with form filling unit 1312).

In some embodiments, the set of one or more credentials includes one or more of: a user ID, a password, a credit card number, a bank account number, an address, a telephone number, and a shopping credential.

In some embodiments, filling in the form with the one or more credentials includes enabling display of redacted versions of the one or more credentials in one or more fields of the form (e.g., with display enabling unit 1314).

In some embodiments, the fingerprint sensor unit 1306 is configured to, while the redacted versions of the one or more credentials are displayed in one or more fields of the form, detect a respective fingerprint on the fingerprint sensor; and the processing unit 1308 is further configured to, in response to detection of the respective fingerprint and in accordance with a determination that the respective fingerprint is associated with a user who is authorized to reveal the one or more credentials (e.g., with fingerprint matching unit 1316), enable display of a non-redacted version of the one or more credentials in the fields of the form (e.g., with display enabling unit 1314).

In some embodiments, the redacted version of a respective credential includes an indication of a length of the respective credential; and the non-redacted version of the respective credential includes a human readable version of the respective credential.

In some embodiments, the redacted version of a respective credential includes a non-redacted portion of the respective credential; and the non-redacted version of the respective credential includes a human readable version of the entire respective credential.

In some embodiments, the determination that the fingerprint is associated with a user who is authorized to use the set of one or more credentials includes a determination that the fingerprint matches at least one of a set of one or more enrolled fingerprints. In some embodiments, the device 1300 determines that the fingerprint matches at least one of a set of one or more enrolled fingerprints (e.g., with fingerprint matching unit 1316).

Figure 14A:
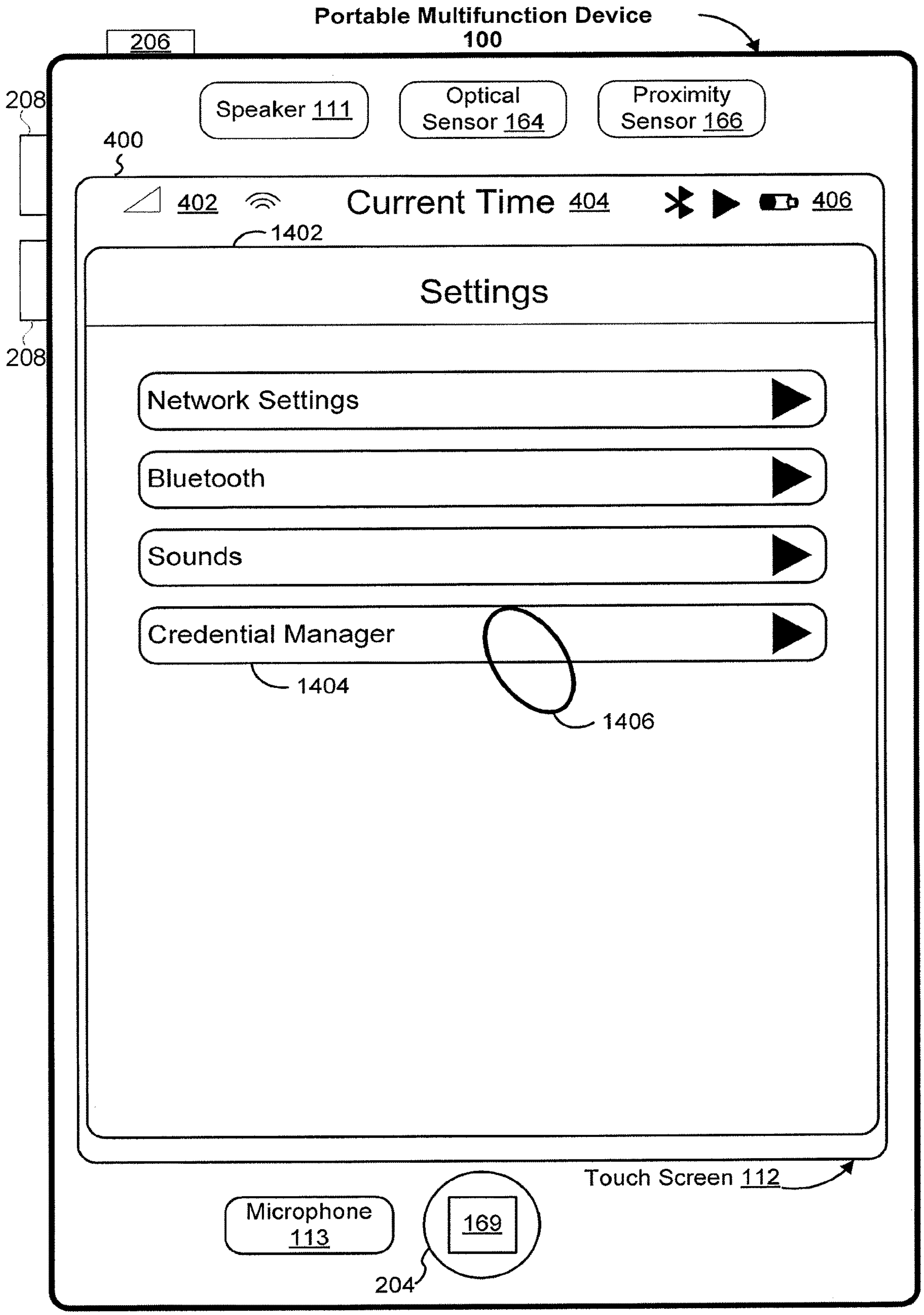
FIGS. 14A-14C illustrate exemplary user interfaces for displaying non-redacted versions of credentials in response to fingerprint-based authentication of a user, in accordance with some embodiments.

FIG. 14A illustrates an exemplary user interface that is displayed on a display of a portable multi-function device 100. The user interface displays a selection page 1402 that includes one or more selectable user interface objects, including a credential manager icon 1404. The page selection 1402 illustrates one possible example of an interface in which a user can request the display of stored credentials (e.g., by requesting activation and/or display of a credential manager interface).

As shown in FIG. 14A, device 100 receives a request to display the set of one or more credentials (e.g., contact 1406, indicating a user selection of credential manager icon 1404).

Figure 14B:
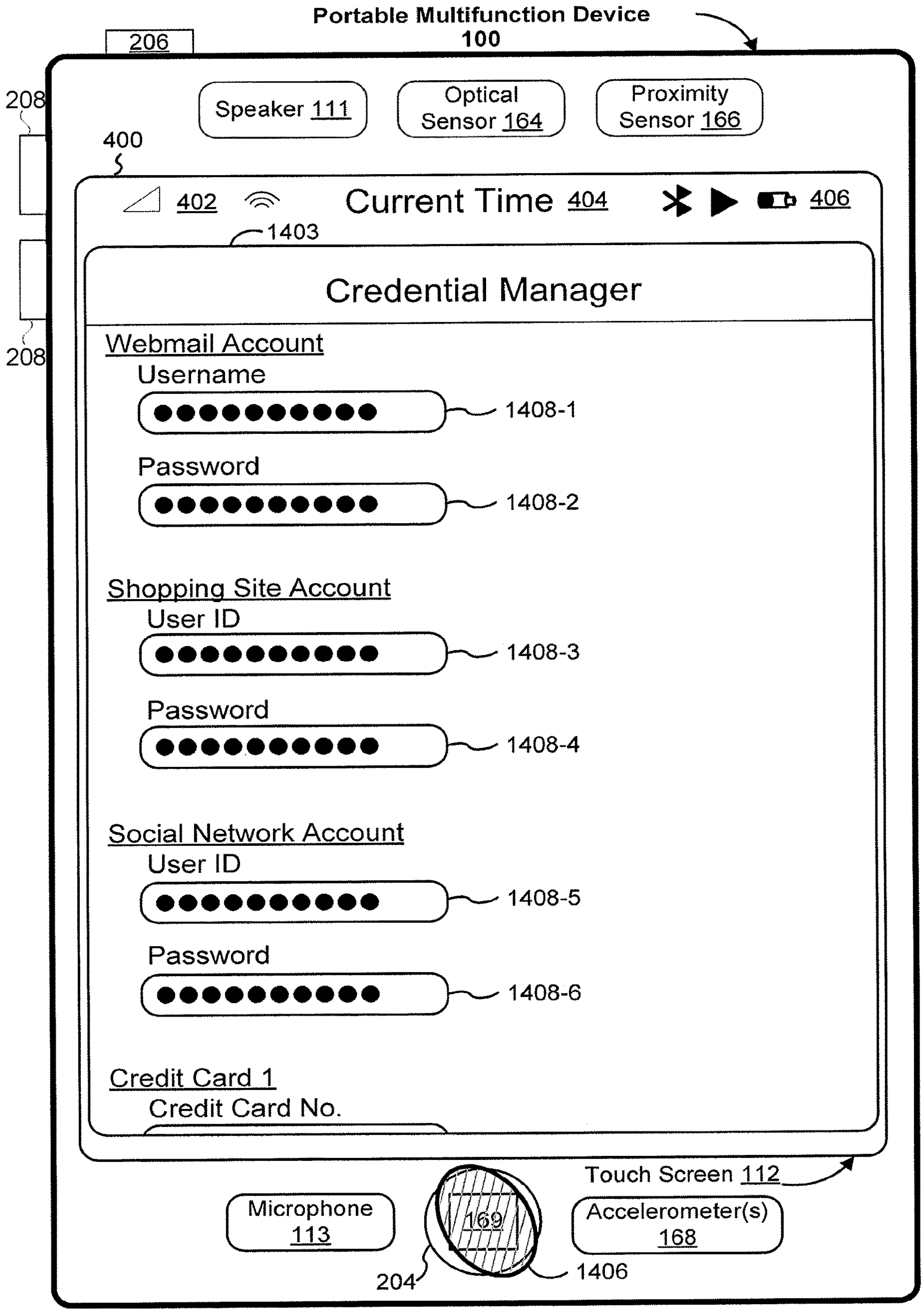

FIG. 14B illustrates an exemplary settings manager interface 1403 that is displayed in response to the contact 1406. The settings manager interface 1403 includes fields 1408 (1408-1, . . . , 1408-6) corresponding to one or more credentials. Fields 1408 correspond to examples of credentials that are stored by the device 100, according to some embodiments. For example, fields 1408 include a username field 1408-1 and a password field 1408-2 associated with an email account, a user ID field 1408-3 and a password field 1408-4 associated with an account for a shopping website/application, and a user ID field 1408-5 and a password field 1408-6 associated with a social network account. Other credential fields are possible, including credit card information fields, and the like.

The device 100 displays redacted versions of the credentials in each of the fields 1408. In this example, the redacted credentials are represented as sequences of dots. However, other redaction techniques are also contemplated (e.g., any removal, replacement or obscuration of the characters such that the credentials are unreadable by a user of the device).

Figure 14C:
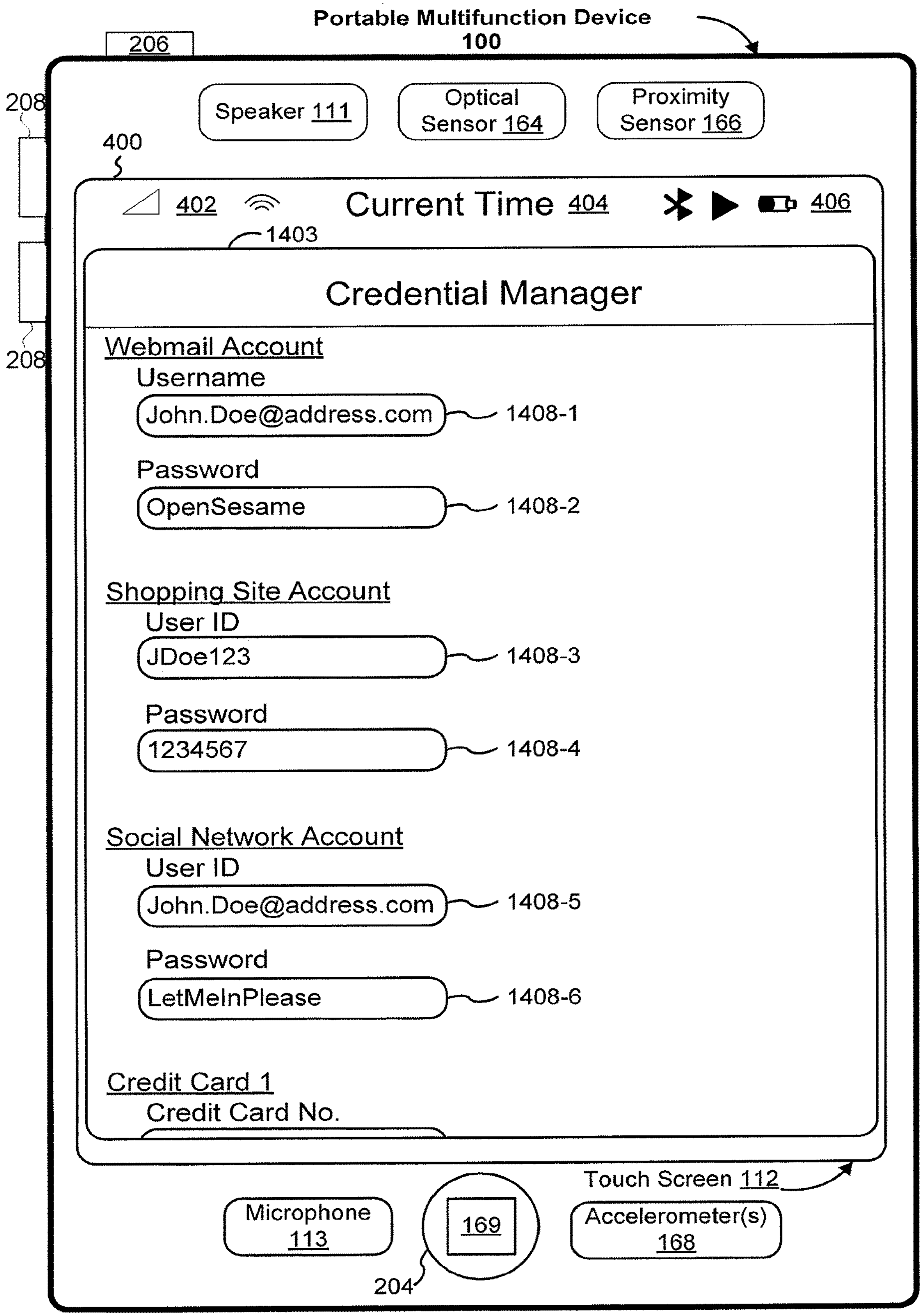

As shown in FIG. 14B, device 100 detects a finger input 1406 on fingerprint sensor 169 while displaying redacted credentials in credential fields 1408 of settings manager interface 1403. Device 100 detects a fingerprint included with finger input 1406, and, in response to detecting the fingerprint and if the fingerprint is associated with an authorized user, device 100 displays the credentials in fields 1406 in non-redacted form, as shown in FIG. 14C. Specifically, FIG. 14C illustrates the settings manager interface 1403 with the credentials displayed in plaintext so that they are readable (and/or editable) by a user of the device.

Figure 15A:
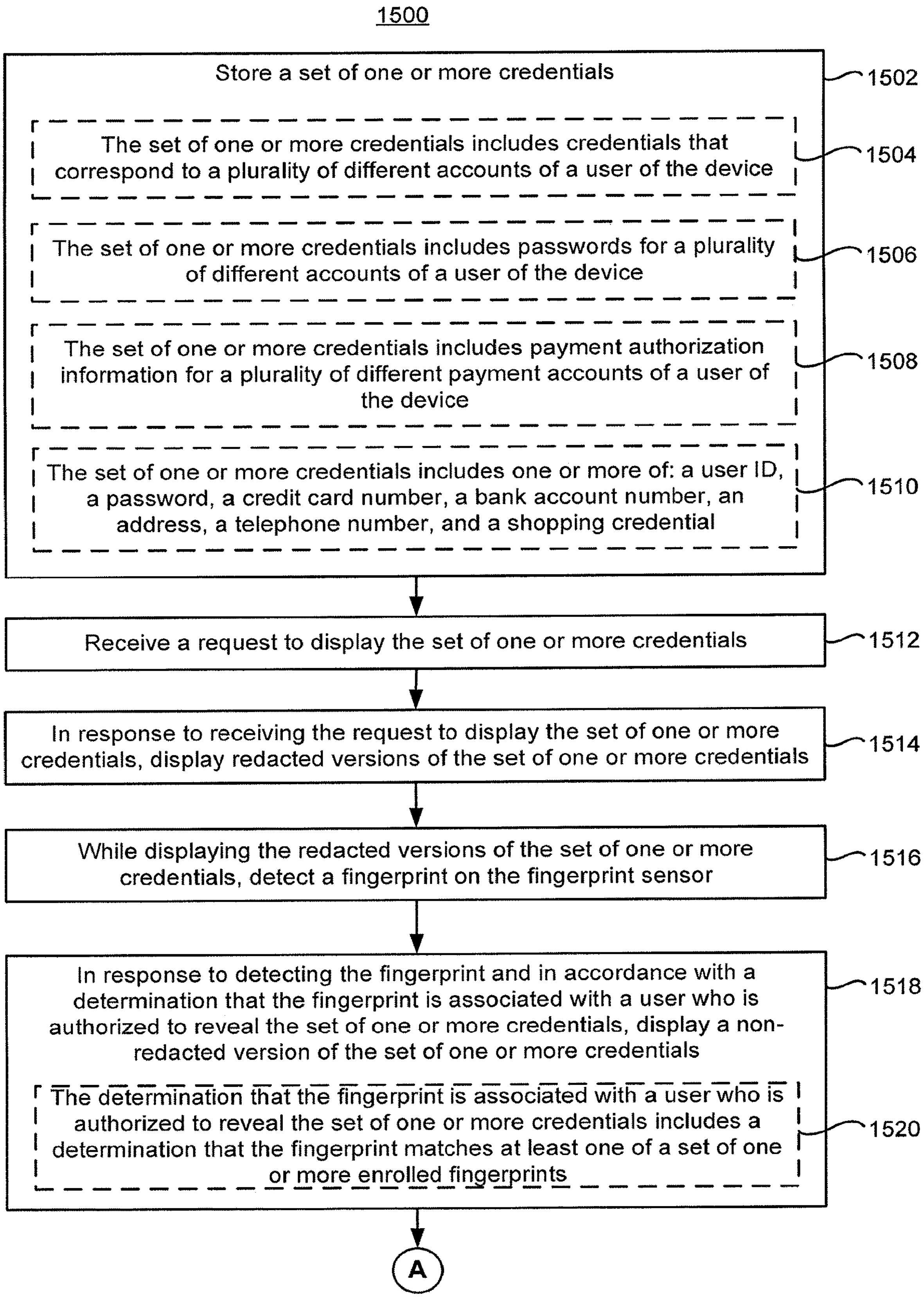
FIGS. 15A-15B are flow diagrams illustrating methods for using fingerprint-based authentication of a user to authorize display of non-redacted versions of credentials, in accordance with some embodiments.
Figure 15B:
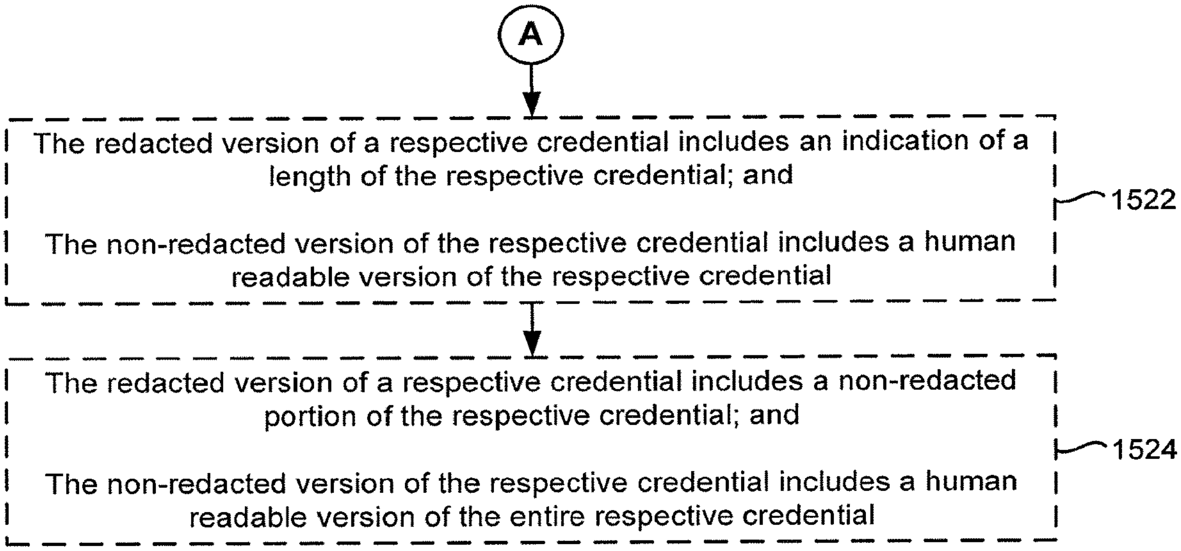

FIGS. 15A-15B are flow diagrams illustrating a method 1500 of revealing redacted credentials, in accordance with some embodiments. The method 1500 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 1500 are, optionally, combined and/or the order of some operations is, optionally, changed.

As described below, the method 1500 provides an intuitive way to reveal redacted credentials. The method reduces the cognitive burden on a user when attempting to review or edit credentials that are displayed in redacted form, thereby creating a more efficient human-machine interface. For battery-operated electronic devices, enabling a user to reveal redacted credentials faster and more efficiently conserves power and increases the time between battery charges.

The device stores a set of one or more credentials (1502). As described above, in some embodiments, credentials are secured credentials that are associated with a user of the device, and are stored in memory of the device (e.g., memory 102, FIG. 1A). In some embodiments, the credentials are stored in a secure area of memory, and/or are encrypted to prevent unauthorized access to the credentials.

In some embodiments, the set of one or more credentials includes credentials that correspond to a plurality of different accounts of a user of the device (1504). For example, a user may store on the device credentials for multiple different accounts, such as one or more email accounts, one or more payment accounts (e.g., credit cards, bank accounts, online payment accounts, and the like), shopping credentials (e.g., usernames and passwords for e-commerce websites and/or applications), credentials for social network accounts, and the like. FIG. 14B illustrates examples of credentials corresponding to a plurality of different accounts of a user of a device.

In some embodiments, the set of one or more credentials includes passwords for a plurality of different accounts of a user of the device (1506). For example, as shown in FIG. 14B, the set of one or more credentials includes a password for a webmail account (e.g., credential field 1408-2), a password for a shopping site (e.g., credential field 1408-4), and a password for a social network account (e.g., credential field 1408-6).

In some embodiments, the set of one or more credentials includes payment authorization information for a plurality of different payment accounts of a user of the device (1508). Payment authorization information includes, for example, credit card information (e.g., credit card numbers, expiration dates, security codes, billing addresses, etc.), online payment account information (e.g., account numbers, user identifiers, passwords, etc.), bank account information (e.g., bank account numbers, routing numbers, user identifiers, passwords, etc.), and the like.

In some embodiments, the set of one or more credentials includes one or more of: a user ID, a password, a credit card number, a bank account number, an address, a telephone number, and/or a shopping credential (1510). Examples of these credentials are described above, and are illustrated in FIGS. 11A-11D and 14B-14C.

The device receives a request to display the set of one or more credentials (1512). In some embodiments, the request includes a user selection of a selectable user interface object (e.g., an icon). For example, FIG. 14A illustrates contact 1406 indicating a user selection of credential manager icon 1404. In response to receiving the request to display the set of one or more credentials (e.g., contact 1406), the device displays redacted versions of the set of one or more credentials (1514). In some embodiments, the redacted versions of the set of one or more credentials are displayed in a "credential manager" interface, as illustrated in FIG. 14B.

In some embodiments, the redacted versions of the credentials are identified with (e.g., displayed near or otherwise in association with) non-redacted human readable text (i.e., a label) that indicates the type of credential. Non-limiting examples of credential labels include username; user identifier; email address; password; credit card number; expiration date; etc. In some embodiments, the redacted versions of the credentials are identified with non-redacted human readable text (i.e., a label) that indicates which account a particular redacted credential is associated with. For example, FIG. 14B illustrates webmail credentials displayed in association with text indicating the account ("Webmail Account"), as well as text indicating the type of each credential ("Username" and "Password").

While displaying the redacted versions of the set of one or more credentials, the device detects a fingerprint on the fingerprint sensor (1516). For example, FIG. 14B illustrates finger input 1406 (including a fingerprint) on fingerprint sensor 169 while the redacted versions of the credentials are displayed in the credential manager 1403.

In response to detecting the fingerprint and in accordance with a determination that the fingerprint is associated with a user who is authorized to reveal the set of one or more credentials, the device displays a non-redacted version of the set of one or more credentials (1518). FIG. 14C illustrates the device 100 displaying plaintext versions of the credentials that were redacted in FIG. 14B, in response to detection of a fingerprint (e.g., finger input 1406) and a determination that the fingerprint is associated with an authorized user. In some embodiments, the determination that the fingerprint is associated with a user who is authorized to reveal the set of one or more credentials includes a determination that the fingerprint matches at least one of a set of one or more enrolled fingerprints (1520).

In some embodiments, the determination that the fingerprint is associated with a user who is authorized to reveal the set of one or more credentials and/or the determination that the fingerprint matches at least one of a set of one or more enrolled fingerprints is performed by the device (e.g., with fingerprint analysis module 131 of device 100). In some embodiments, the determinations are performed by one or more additional devices instead of or in addition to the device.

With reference to FIG. 15B, in some embodiments, the redacted version of a respective credential includes an indication of a length of the respective credential; and the non-redacted version of the respective credential includes a human readable version of the respective credential (1522). For example, in some implementations, the redacted version of a respective credential includes a symbol (e.g., a dot, asterisk, letter, etc.) for each character in the respective credential. Credential 1104 in FIGS. 11B-11D illustrates an example of this, where one dot is displayed for each number in the credit card number. In some embodiments, the redacted version of a respective credential includes a symbol or graphic whose length is proportional to the length of the respective credential (e.g., a black bar, a horizontal line, etc.). In some embodiments, a human readable version of the respective credential is a plaintext version of the credential (i.e., the actual text, symbols, numbers, characters, etc., of the credential).

In some embodiments, the redacted version of a respective credential includes a non-redacted portion of the respective credential; and the non-redacted version of the respective credential includes a human readable version of the entire respective credential (1524). In some embodiments, the particular portion of the redacted credential that is non-redacted depends on the credential. For example, in the case of a credit card number, the last four digits are displayed in plaintext in the redacted version. In the case of an address credential, the house number (and/or the city or state) is displayed in plaintext in the redacted version, and the rest of the address (e.g., the street name and zip code) is redacted. Other portions of these credentials are displayed in non-redacted form in various embodiments.

It should be understood that the particular order in which the operations in FIGS. 15A-15B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the "Description of Embodiments" section above) are also applicable in an analogous manner to method 1500 described above with respect to FIGS. 15A-15B. For example, the fingerprints, contacts, and user interface objects described above with reference to method 1500 optionally have one or more of the characteristics of the fingerprints, contacts, and user interface objects described herein with reference to other methods described herein (e.g., those listed in the "Description of Embodiments" section above). For brevity, these details are not repeated here.

Figure 16:
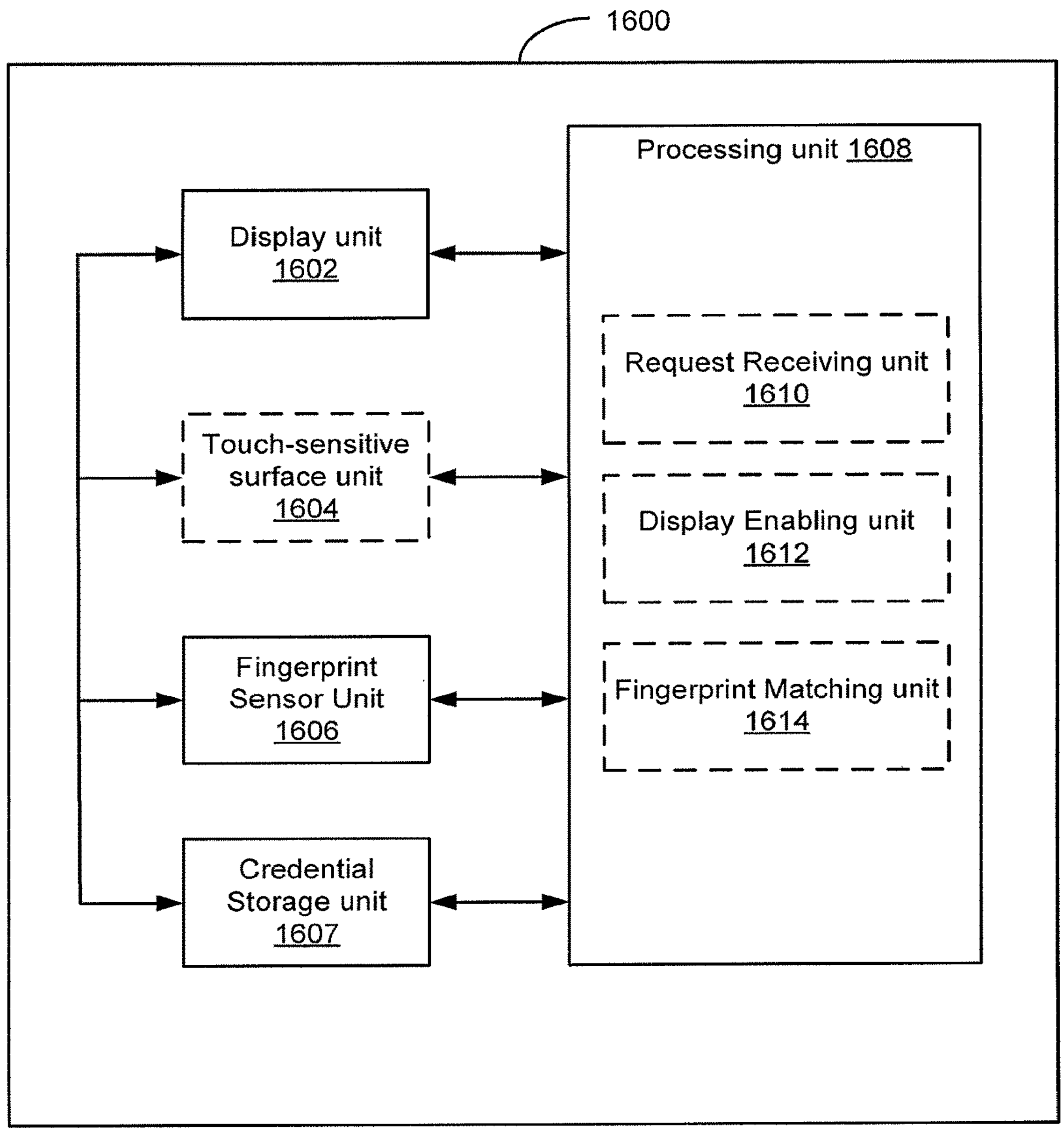
FIG. 16 is a functional block diagram of an electronic device, in accordance with some embodiments.

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 includes a display unit 1602, an optional touch-sensitive surface unit 1604 configured to receive contacts, a fingerprint sensor unit 1606; a credential storage unit 1607 configured to store a set of one or more credentials, and a processing unit 1608 coupled to the display unit 1602, the optional touch-sensitive surface unit 1604, the credential storage unit 1607, and the fingerprint sensor unit 1606. In some embodiments, the processing unit 1608 includes a request receiving unit 1610, a display enabling unit 1612, and a fingerprint matching unit 1614.

Processing unit 1608 is configured to: receive a request to display the set of one or more credentials (e.g., with request receiving unit 1610); in response to receiving the request to display the set of one or more credentials, enable display of redacted versions of the set of one or more credentials (e.g., with display enabling unit 1612); and in response to detection of a fingerprint on the fingerprint sensor while the redacted versions of the set of one or more credentials are displayed, and in accordance with a determination that the fingerprint is associated with a user who is authorized to reveal the set of one or more credentials (e.g., with fingerprint matching unit 1614), enable display of a non-redacted version of the set of one or more credentials (e.g., with display enabling unit 1612).

In some embodiments, the set of one or more credentials includes credentials that correspond to a plurality of different accounts of a user of the device.

In some embodiments, the set of one or more credentials includes passwords for a plurality of different accounts of a user of the device.

In some embodiments, the set of one or more credentials includes payment authorization information for a plurality of different payment accounts of a user of the device.

In some embodiments, the set of one or more credentials includes one or more of: a user ID, a password, a credit card number, a bank account number, an address, a telephone number, and a shopping credential.

In some embodiments, the redacted version of a respective credential includes an indication of a length of the respective credential; and the non-redacted version of the respective credential includes a human readable version of the respective credential.

In some embodiments, the redacted version of a respective credential includes a non-redacted portion of the respective credential; and the non-redacted version of the respective credential includes a human readable version of the entire respective credential.

In some embodiments, the determination that the fingerprint is associated with a user who is authorized to reveal the set of one or more credentials includes a determination that the fingerprint matches at least one of a set of one or more enrolled fingerprints. In some embodiments, the device 1600 determines that the fingerprint matches at least one of a set of one or more enrolled fingerprints (e.g., with fingerprint matching unit 1614).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12B and 15A-15B are, optionally, implemented by components depicted in FIGS. 1A-1B or FIG. 13 or 16. For example, display operation 1206, request receiving operation 1208, and form filling operation 1210 (FIG. 12A) and request receiving operation 1512, credential display operation 1514, fingerprint detection operation 1516, and credential revealing operation 1518 (FIG. 15A) are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Managing Usage of Saved Credentials

Many electronic devices provide services that require particular credentials that are used by the devices or service providers to determine a user's eligibility for receiving the services. Such credentials frequently comprise information that is not easily accessible to people other than the particular user(s) associated with the credentials. Examples of a credential include a passcode, a registered username-password combination, a stored answer to a security question, credit card information, a social security number, and so on. Although requiring the user to input the correct credential each time the user wishes to access a particular service may promote security, such requirement is also cumbersome and time consuming. As described herein, automatically saving a credential that was previously provided on the device for accessing a function or service and subsequently allowing the user to access the function or service again through an enrolled fingerprint help to streamline the user's access to the function or service without significantly compromising the required level of access security. In addition, as described herein, in some embodiments, it is possible for a device to have multiple enrolled fingerprints at any given time, and a user may enroll one or more additional fingerprints while the device is in an unlocked state. It is therefore important to have a method to securely manage the automatic usage of saved credentials when one or more additional fingerprints are enrolled since the credential was last used.

As described herein, in some embodiments, after a fingerprint enrollment process is successfully completed and one or more fingerprints are enrolled, the device automatically saves each credential manually entered by the user. When any of the saved credentials is subsequently required on the device (e.g., by a software application or online service provider), the device automatically prompts the user to provide an enrolled fingerprint in lieu of requesting the user to manually input the required credential. When the user provides a valid fingerprint, the device automatically retrieves and uses an appropriate saved credential on behalf of the user. In the event that one or more additional fingerprints have been enrolled subsequently (or, in some embodiments, in the event that an attempt has been made to add an additional fingerprint), automatic usage of the previously saved credentials is automatically disabled (e.g., by discarding the previously saved credentials, or changing a predefined usage setting). As such, when a credential is subsequently required on the device, the device prompts the user to manually enter the credential rather than accepting any fingerprint input. After the user provides the correct credential, the device saves the credential and re-enables automatic usage of the saved credential through enrolled fingerprints. Such automatic management of saved credentials improves access security on the device. For example, if a second user adds (or, in some embodiments, attempts to add) his or her fingerprint to the set of enrolled fingerprints, the enrolled fingerprints cannot be used authorize usage of the previously saved credential until after the credential has been reentered.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 17A-17J and 18A-18C includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 17A-17J and 18A-18C will be discussed with reference to a device with a touch screen 112 and a separate fingerprint sensor 359-2, however analogous operations are, optionally, performed on a device with an integrated fingerprint sensor 359-1 in response to detecting the inputs described in FIGS. 17A-17J on the integrated fingerprint sensor 359-1 while displaying the user interfaces shown in FIGS. 17A-17J on the display 450. Additionally, analogous operations are, optionally, performed on a device with a display 450 and a separate touch-sensitive surface 451 instead of a touch screen 112 in response to detecting the contacts described in FIGS. 17A-17J on a fingerprint sensor 169 (e.g., an integrated fingerprint sensor 359-1 or a separate fingerprint sensor 359-2) and/or the separate touch-sensitive surface 451 while displaying the user interfaces shown in FIGS. 17A-17J on the display 450; in such embodiments, the contacts shown in FIGS. 17A-17J optionally represent both a focus selector that corresponds to a location on the display 450, and a contact that corresponds to a location of a contact or gesture performed on the separate touch-sensitive surface (e.g., touch-sensitive surface 451), where the focus selector is, optionally: a respective contact, a representative point corresponding to a contact (e.g., a centroid of a respective contact or a point associated with a respective contact), or a centroid of two or more contacts detected on the touch screen 112 and is, optionally, replaced with a displayed cursor.

FIGS. 17A-17J illustrate an exemplary process that occurs on an electronic device (e.g., device 100) and demonstrate how the automatic usage of saved credentials through enrolled fingerprints are managed (e.g., allowed and prevented) in accordance with some embodiments. FIGS. 17A-17D illustrate the automatic retrieval and usage of a saved credential through a previously enrolled fingerprint. FIGS. 5E-5H illustrate subsequent enrollment of an additional fingerprint and the resulting disablement of the saved credential. FIGS. 5H-5J illustrates manual entry of the credential by the user, and the automatic saving and re-enablement of the credential, where the re-enabled credential is made available for subsequent retrieval and use through enrolled fingerprints.

The exemplary scenario shown in FIGS. 17A-17D occurs after a user of the electronic device (e.g., device 100) has already registered a set of one or more fingerprints (e.g., through the processes described in method 600), and enabled automatic usage of saved credentials through enrolled fingerprints (e.g., through a fingerprint usage setting described in method 600). In addition, during the first occasion after the enrollment of the set of fingerprints that a particular credential (e.g., a passcode of a registered online shopping account) is required on the device, the user is prompted to manually enter the credential. In response to receiving the manual entry of the credential, the device uses the credential to provide access to the function or service (e.g., making a purchase at an online store), and automatically saves a copy of the credential for future use through the set of enrolled fingerprints.

Figure 17A:
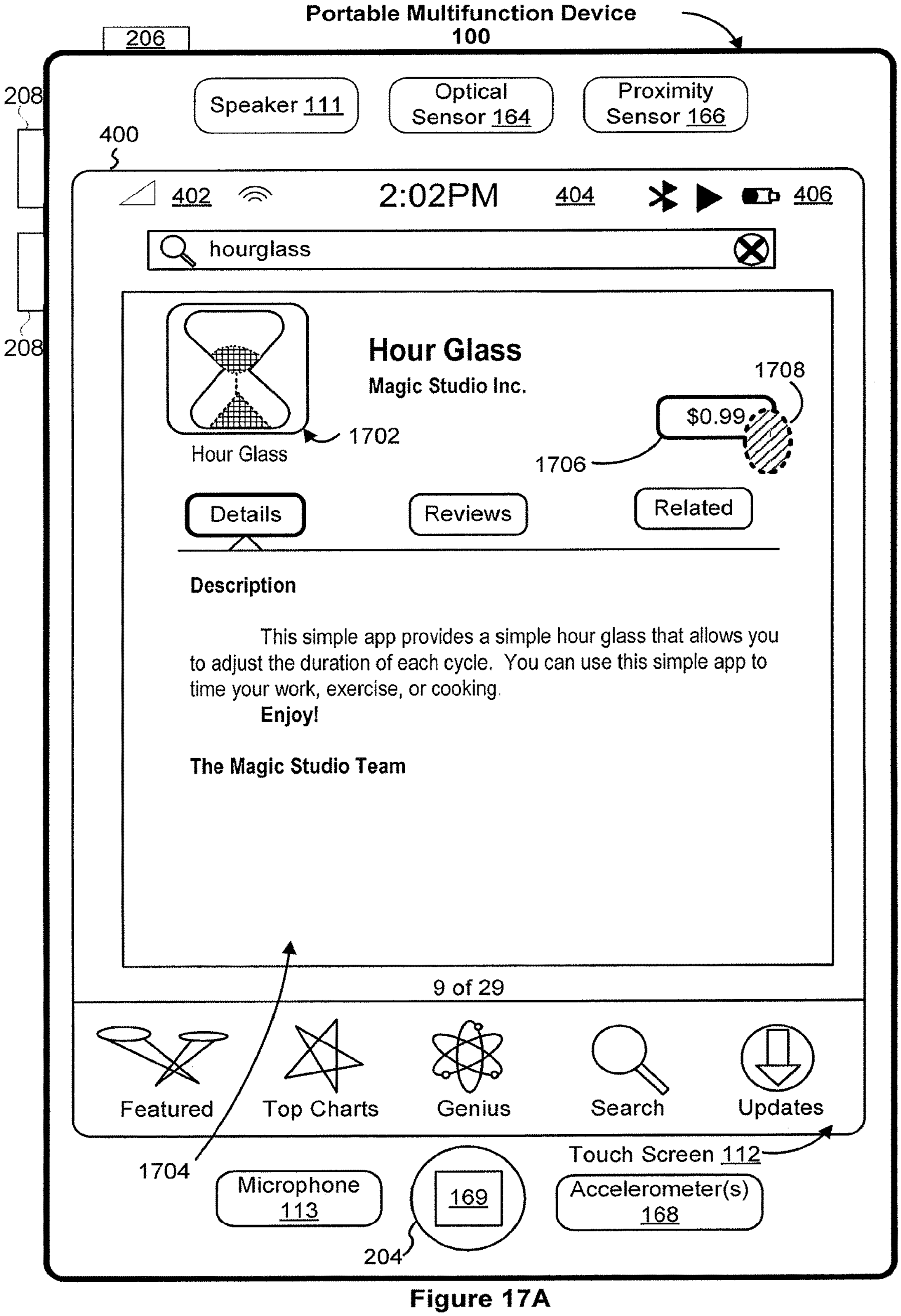
FIGS. 17A-17J illustrate exemplary user interfaces for managing the automatic usage of a saved credential through enrolled fingerprints in accordance with some embodiments.
Figure 18A:
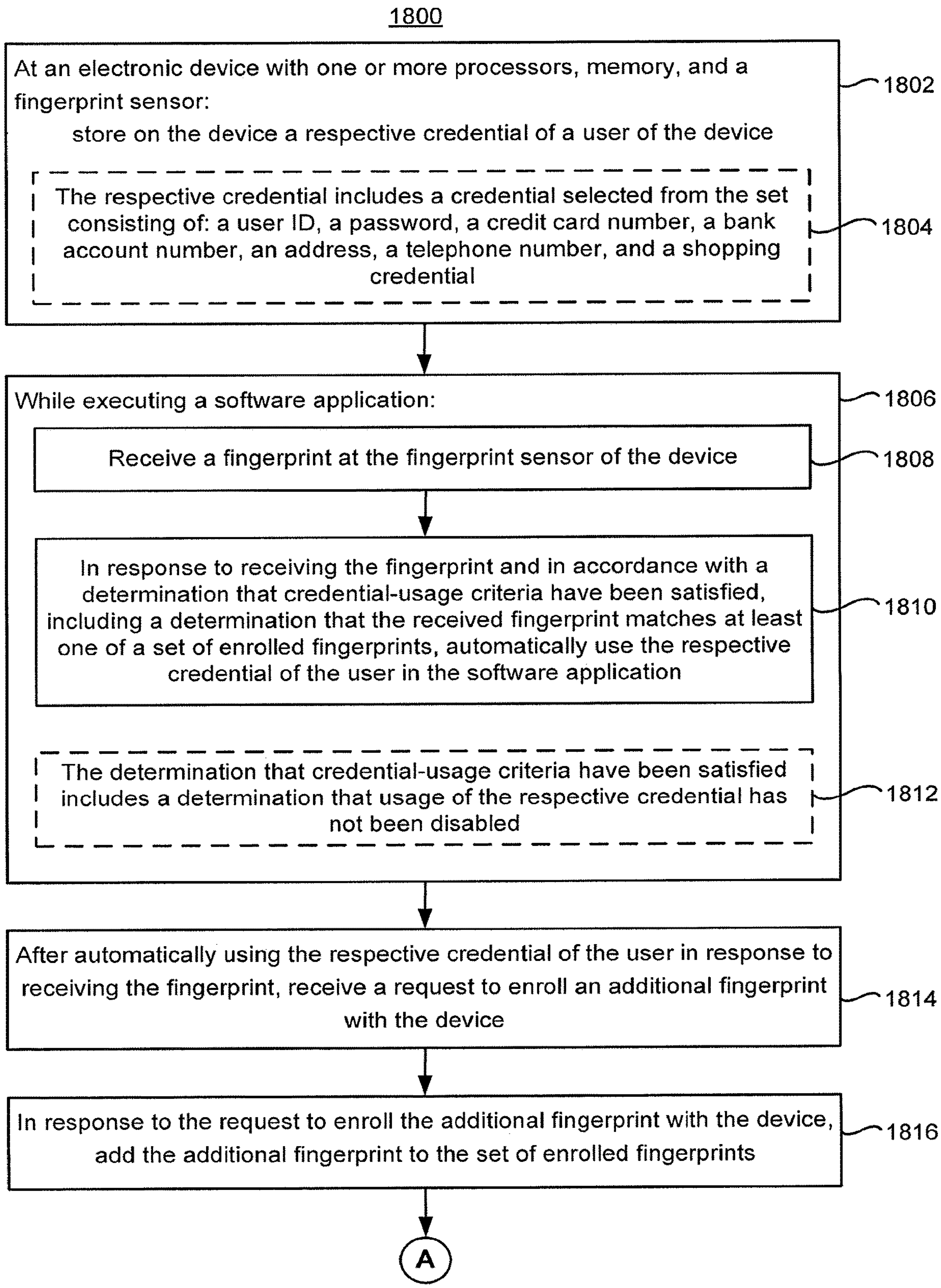
FIGS. 18A-18C are flow diagrams illustrating a method of managing the automatic usage of a saved credential through enrolled fingerprints in accordance with some embodiments.
Figure 18B:
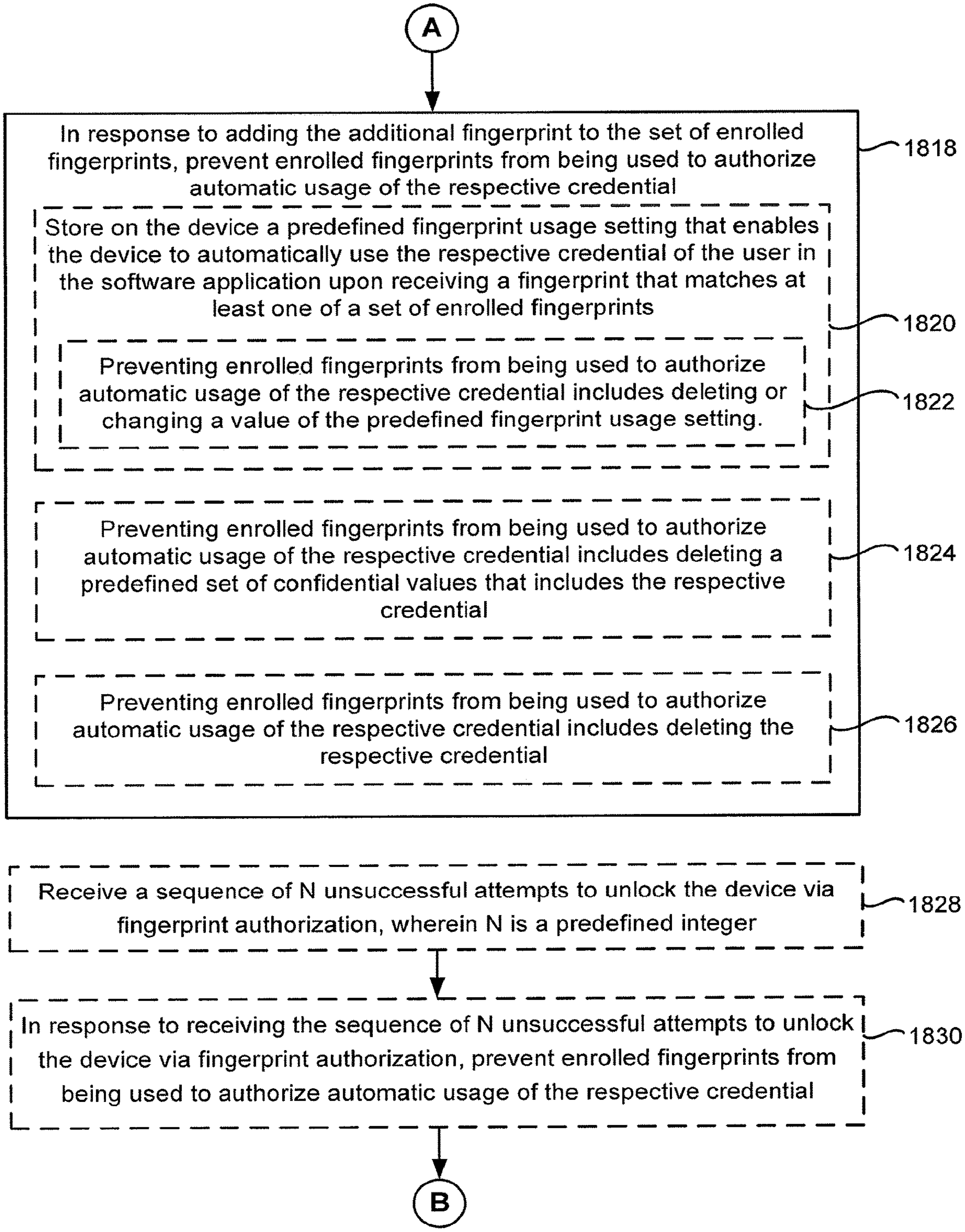
Figure 18C:
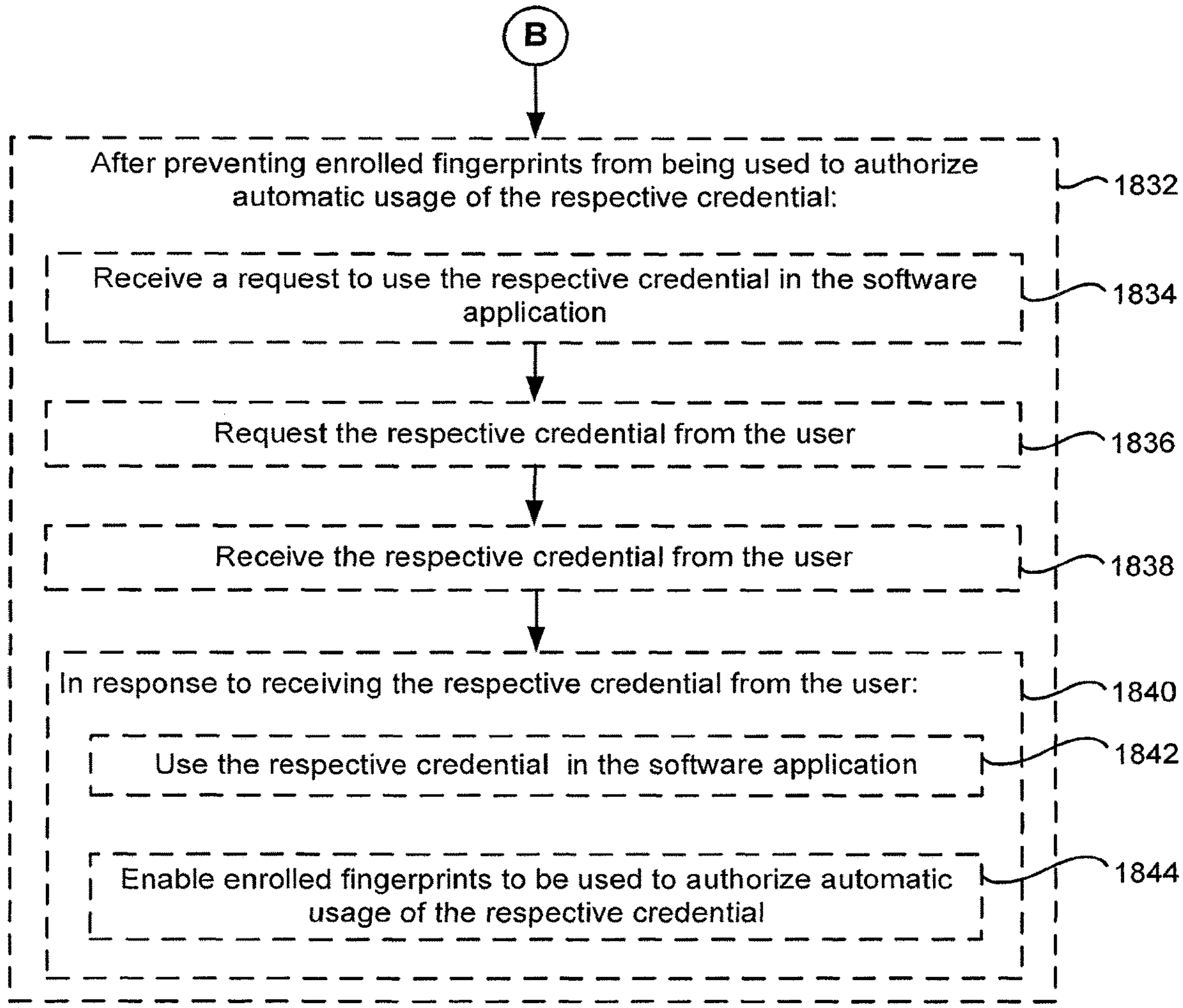

Before the start of the exemplary scenario shown in FIG. 17A, a copy of the credential (e.g., the passcode of the online shopping account) has been saved on the device 100, and the user has returned again to the same online store after the previous shopping session had been terminated (e.g., through timeout or formal exit).

As shown in FIG. 17A, the user has identified an item (e.g., a software application 1702) for purchase in the online store (e.g., an app store), and is presented with a user interface 1704 showing the detailed description of the item. The user interface 1704 includes a user interface element 1706 for purchasing the item using a registered online shopping account. In some embodiments, the online store has stored the necessary payment information (e.g., shipping address, billing address, credit card information, store credit, etc.) in association with the registered shopping account, and will apply the stored payment information when the passcode associated with the registered shopping account is received from the user at the time of the purchase.

Figure 17B:
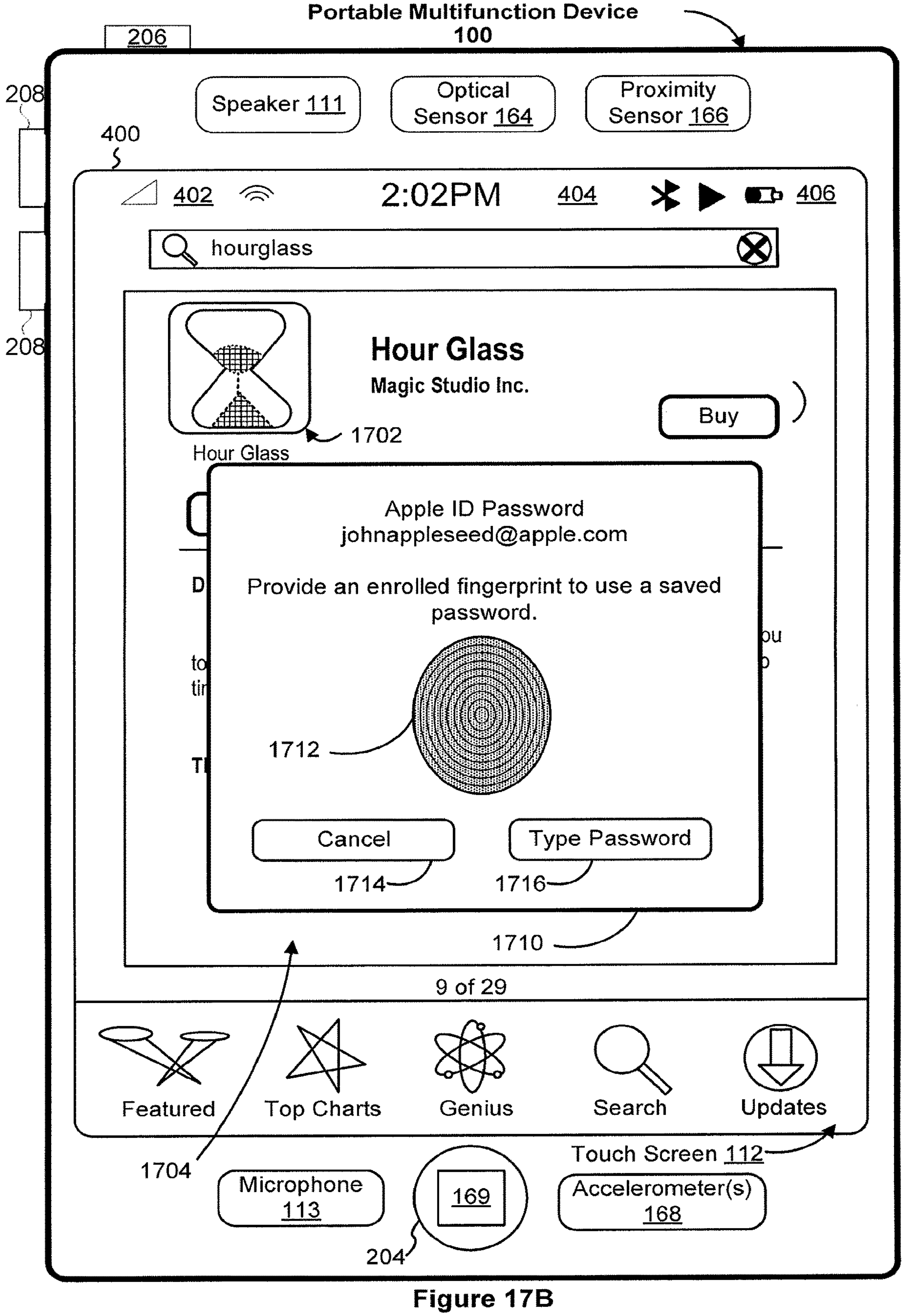

As shown in FIGS. 17A-17B, when the user selects (e.g., using a touch input 1708) the user interface element 1706 to proceed with the purchase of the software application 1702, the device 100 determines (e.g., through a notification received from the online store) that a particular registered account passcode is required by the online store for completing the purchase. The device 100 further determines that the registered account passcode has been previously entered and saved on the device. In accordance with such determinations, the device 100 presents a prompt (e.g., a pop-up window 1710) instructing the user to provide an enrolled fingerprint to use the saved passcode to proceed with the purchase. In some embodiments, the device 100 activates the fingerprint sensor 169 separate from the touch screen 112 to detect and capture any fingerprint input provided on the home button 204. In some embodiments, the device selectively activates a high-resolution region 1712 on the touch-screen 112 within the pop-up window 1710 to serve as a fingerprint sensor. In some embodiments, the device displays an animation (e.g., a glowing fingerprint graphic) to visually indicate the activated high-resolution region 1712 to the user.

In some embodiments, as shown in FIG. 17B, the pop-up window 1710 further displays a user interface element 1714 for canceling the current operation and returning to the user interface 1704 shown in FIG. 17A. In some embodiments, as shown in FIG. 17B, the pop-up window 1710 also displays a user interface element 1716 for manually entering the required account passcode using a keypad. Although not shown in this exemplary interaction scenario, a person of ordinary skill in the art would understand that, if the user selects the user interface element 1716, instead of providing an enrolled fingerprint, the device will present an alternate user interface that allows the user to type in the required passcode or to switch to a different online shopping account.

Figure 17C:
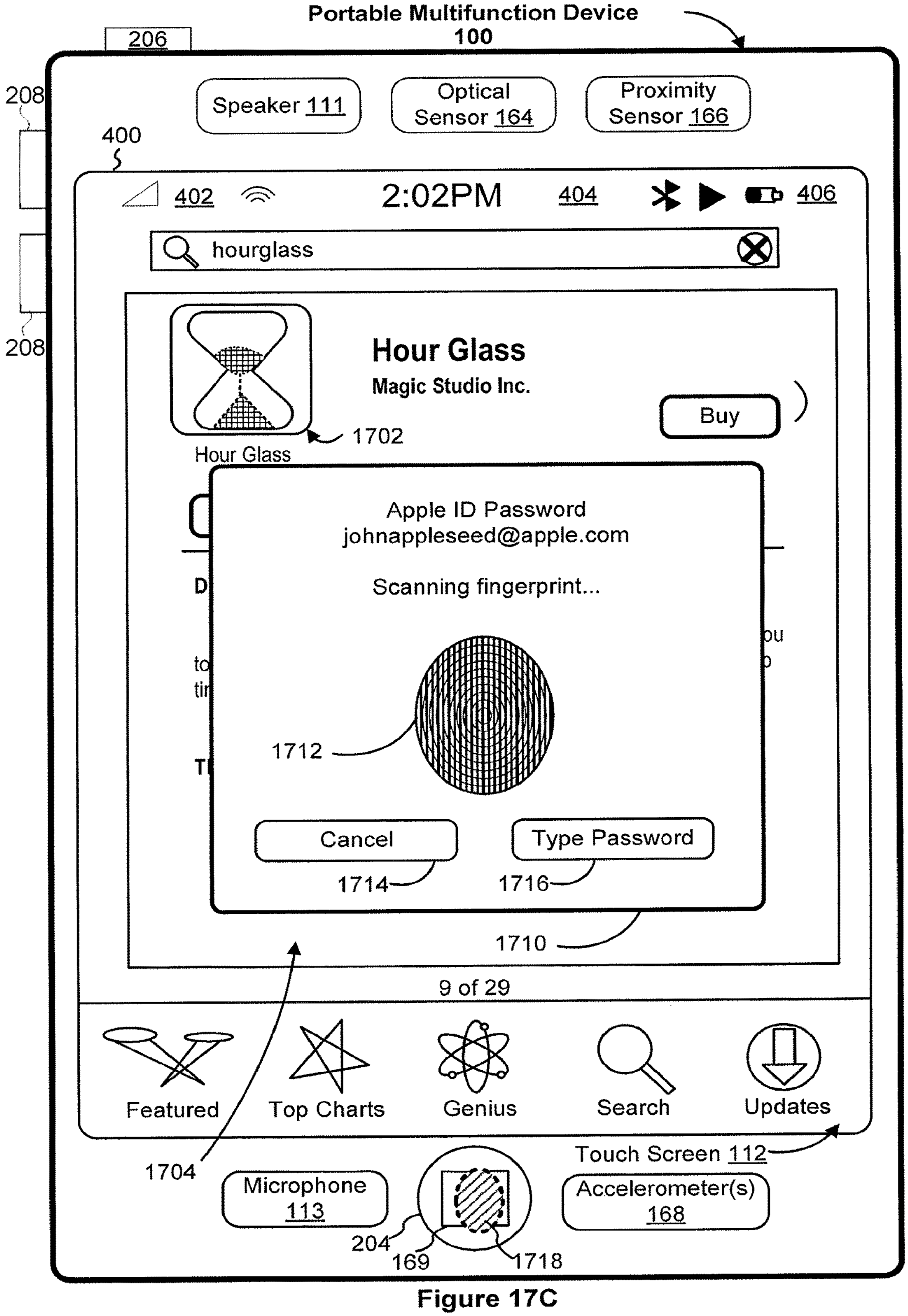
Figure 17D:
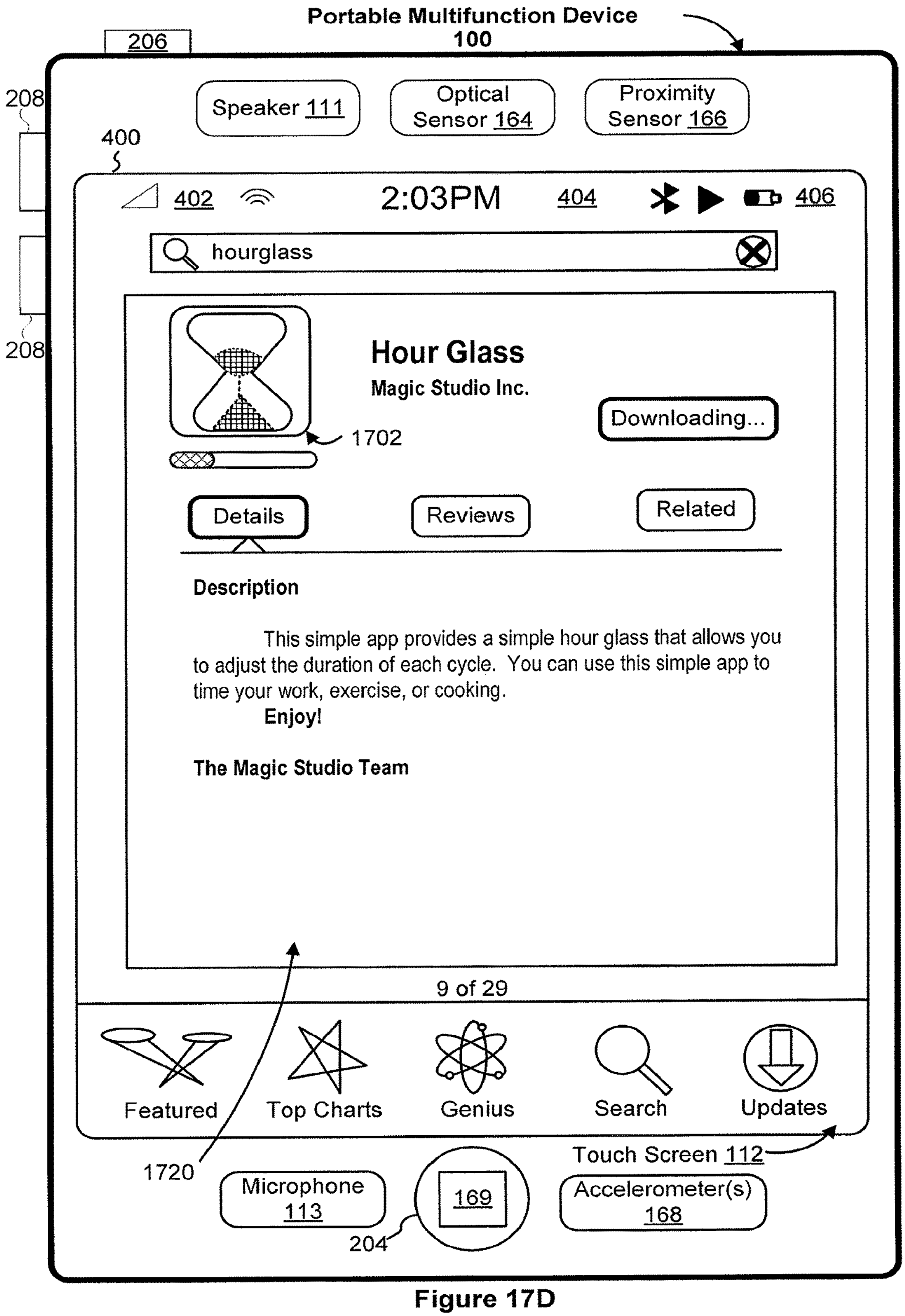

As shown in FIG. 17C, the user has provided a fingerprint input 1718 through the fingerprint sensor 169 on the home button 204. The device 100 captures the fingerprint input 1718 and determines that the received fingerprint matches one of the set of fingerprints currently enrolled on the device 100. The device 100 further determines that the required account passcode is currently stored on the device 100 and is not currently disabled (e.g., an exemplary scenario illustrating disablement of a saved passcode is shown later in FIGS. 17E-17H). In accordance with such determinations, the device retrieves the saved account passcode, and provides the saved account passcode to the online store on behalf of the user. In some embodiments, automatic population of the saved account passcode into the online store's passcode interface is presented to the user through an animation. In some embodiments, as shown in FIG. 17D, the saved passcode is provided to the online store in the background, and the user is presented with a user interface 1720 indicating transaction success after the saved passcode has been accepted by the online store. In this example, the purchase of the selected item has been confirmed, and download of the purchased application has been started.

FIGS. 17A-17D illustrate how a saved credential (e.g., an account passcode) can be used on behalf of the user through an enrolled fingerprint provided by the user. FIGS. 17E-17H illustrate how use of a saved credential can be disabled after an additional fingerprint has been enrolled after the credential is saved. Disabling automatic usage of a saved credential after enrollment of one or more additional fingerprints provides an alert to the user (either implicitly or explicitly) that additional fingerprints have been enrolled. If the enrollment of the additional fingerprints is not objectionable to the user, the user can manually provide the required credential to re-enable the automatic usage of the credential through any of the set of fingerprints currently enrolled on the device 100.

Figure 17E:
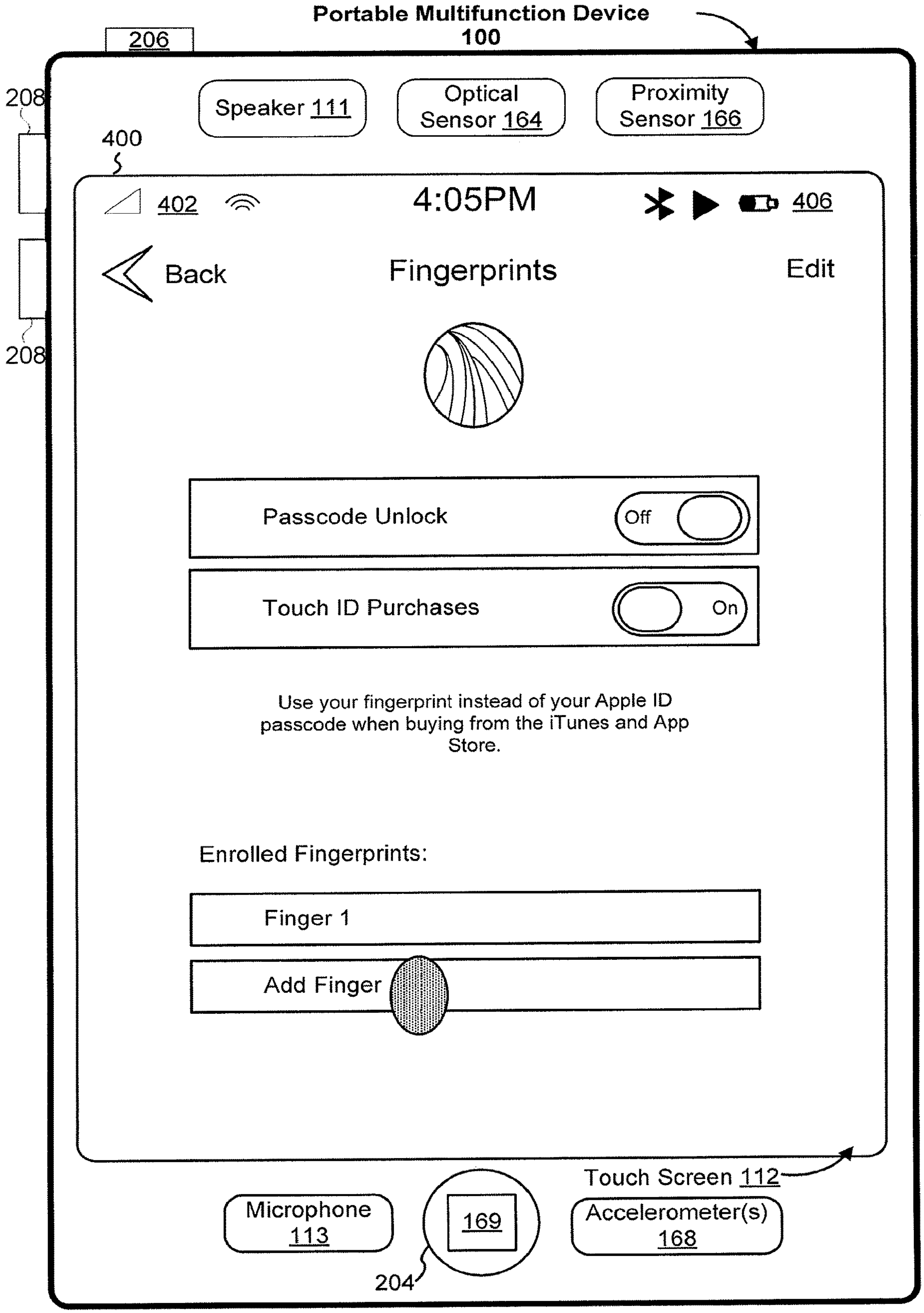
Figure 17F:
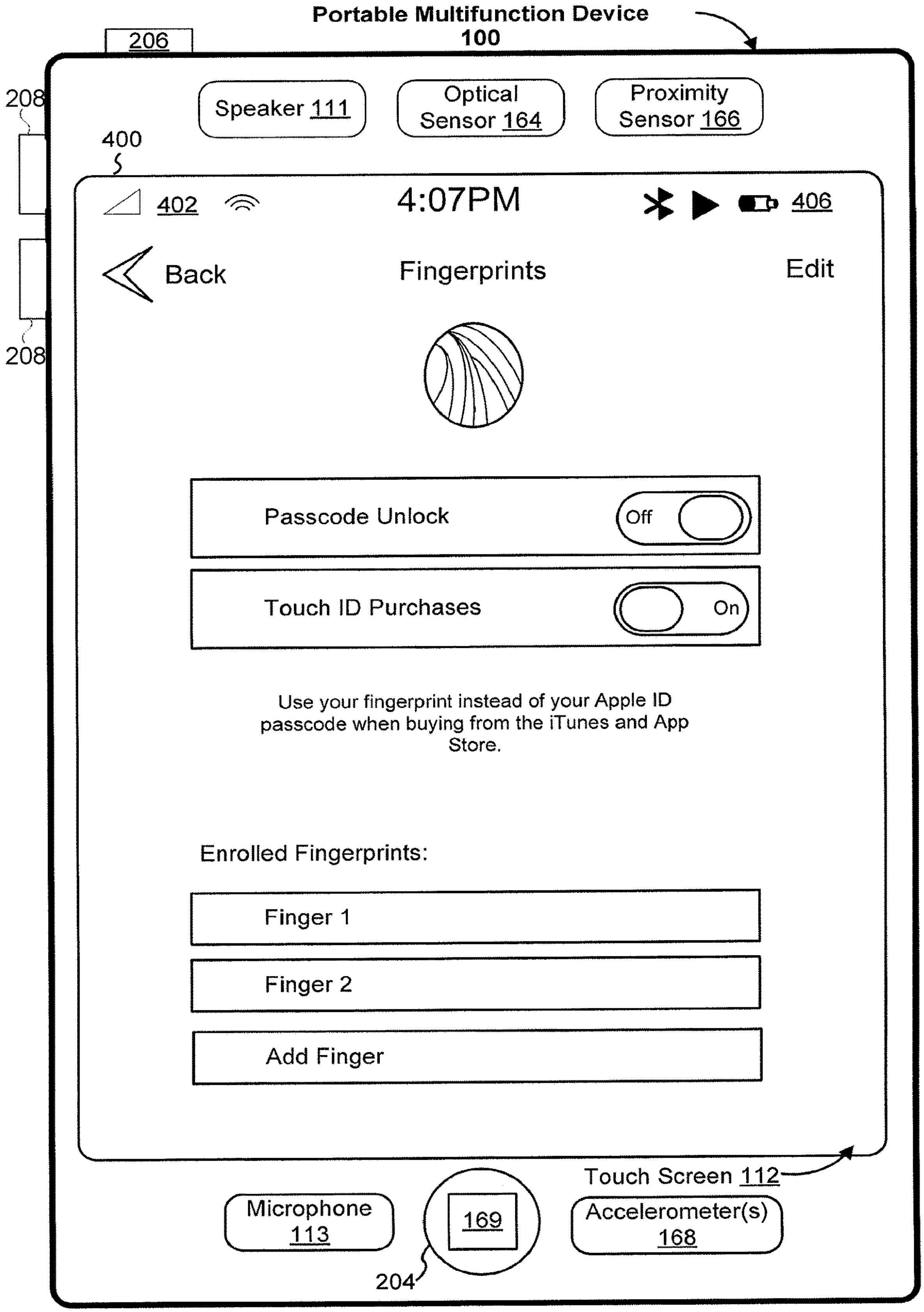

As shown in FIGS. 17E-17F, after the user has exited the shopping interface of the online store, and while the account passcode for the online store remains a saved credential on the device 100, a new fingerprint has been successfully registered on the device 100. A detailed description of an exemplary process for enrolling an additional fingerprint is described with reference to method 600. As a result of the enrollment of the new fingerprint, the device 100 determines that, at least one fingerprint (e.g., the new fingerprint) in the set of currently enrolled fingerprints on device 100 is registered after the saved account passcode was last used. According to this determination, the device 100 disables the automatic usage of the saved account passcode.

In other words, in some embodiments, even if a user were to provide the same fingerprint that he or she had previously used to apply the saved account passcode to the online store, this fingerprint will no longer achieve the same result because the automatic usage of the saved account passcode has been disabled. In some embodiments, the automatic usage of the saved account passcode (or other credential) is not disabled for the previously enrolled fingerprints, but is disabled for the newly enrolled fingerprint until the user has manually entered the account passcode to associate/connect the account passcode with the newly enrolled fingerprint.

Figure 17G:
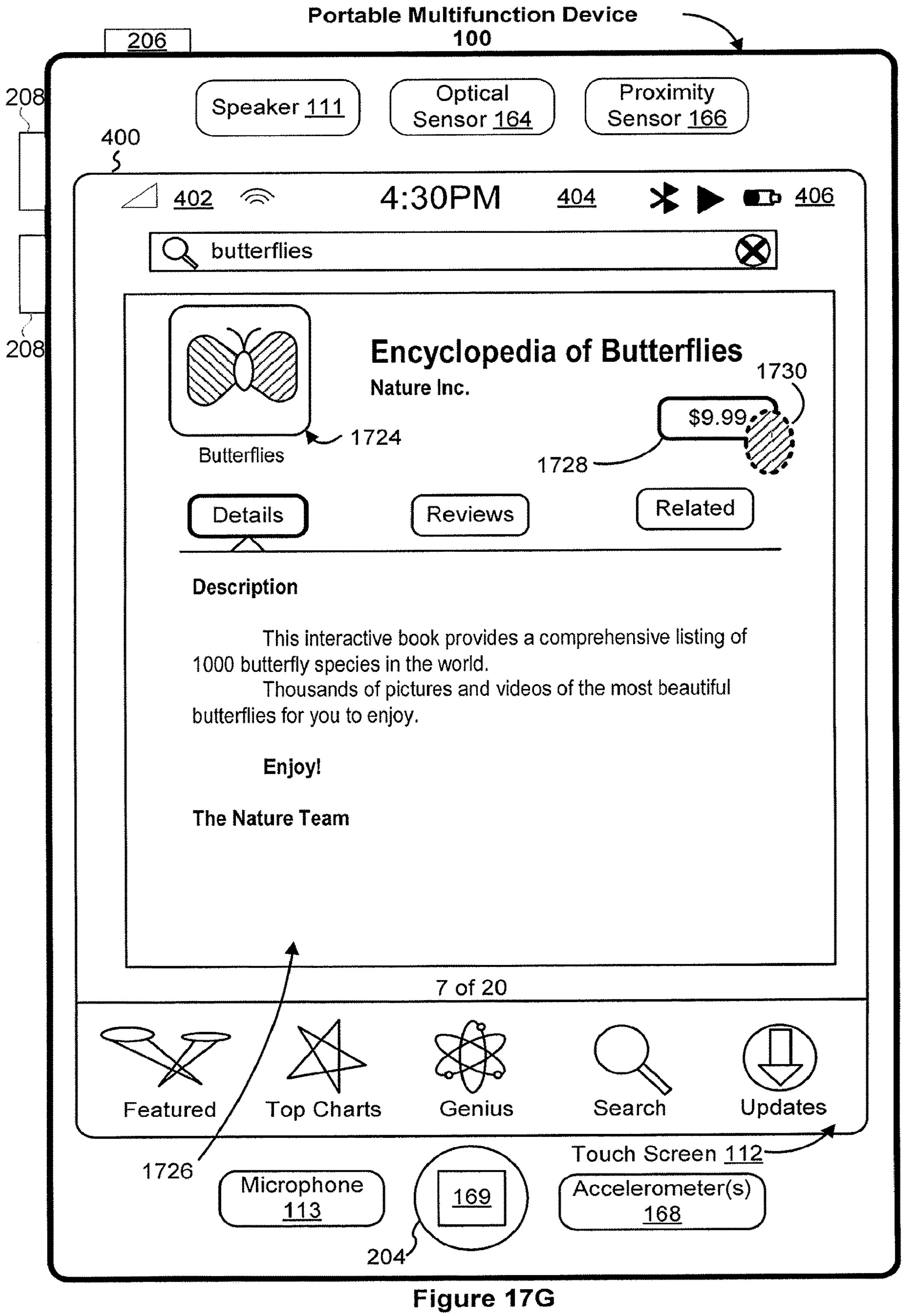
Figure 17H:
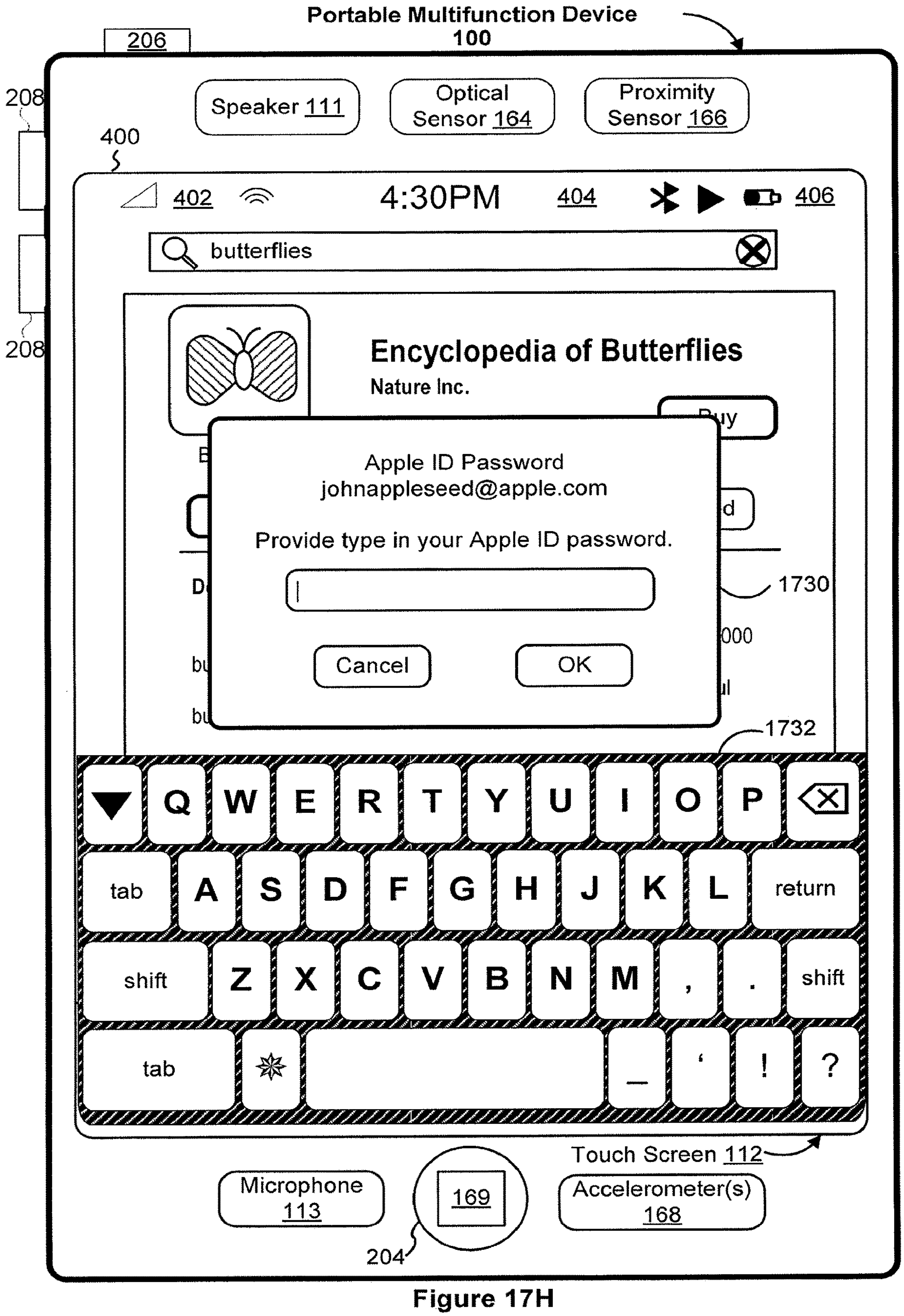

As shown in FIGS. 17G-17H, when the user returns to the same online store at a later time and wishes to make another purchase using the same online shopping account, instead of prompting the user to provide an enrolled fingerprint, the device 100 provides a prompt for the user to manually enter the required passcode.

As shown in FIG. 17G, the user has identified an item (e.g., an interactive book 1724) for purchase in the same online store, and is presented with a user interface 1726 showing the detailed descriptions of the item. The user interface 1726 includes a user interface element 1728 for purchasing the item using a registered online shopping account. When the user selects (e.g., using a touch input 1730) the user interface element 1728 to proceed with the purchase of the interactive book 1724, the device 100 determines again (e.g., through a notification received from the online store) that a particular registered account passcode is required by the online store for completing the purchase. The device 100 further determines that automatic usage of the previously saved account passcode has been disabled on the device (e.g., due to the enrollment of the additional fingerprint as shown in FIGS. 17E-17F). In some embodiments, the previously saved account passcode has been deleted from the device 100 through disablement, and the device 100 simply determines that no saved account passcode is available at this time. In accordance with either of these determinations, as shown in FIG. 17H, the device 100 presents a prompt (e.g., a pop-up window 1730) for the user to manually enter the required account passcode to proceed with the purchase.

Figure 17I:
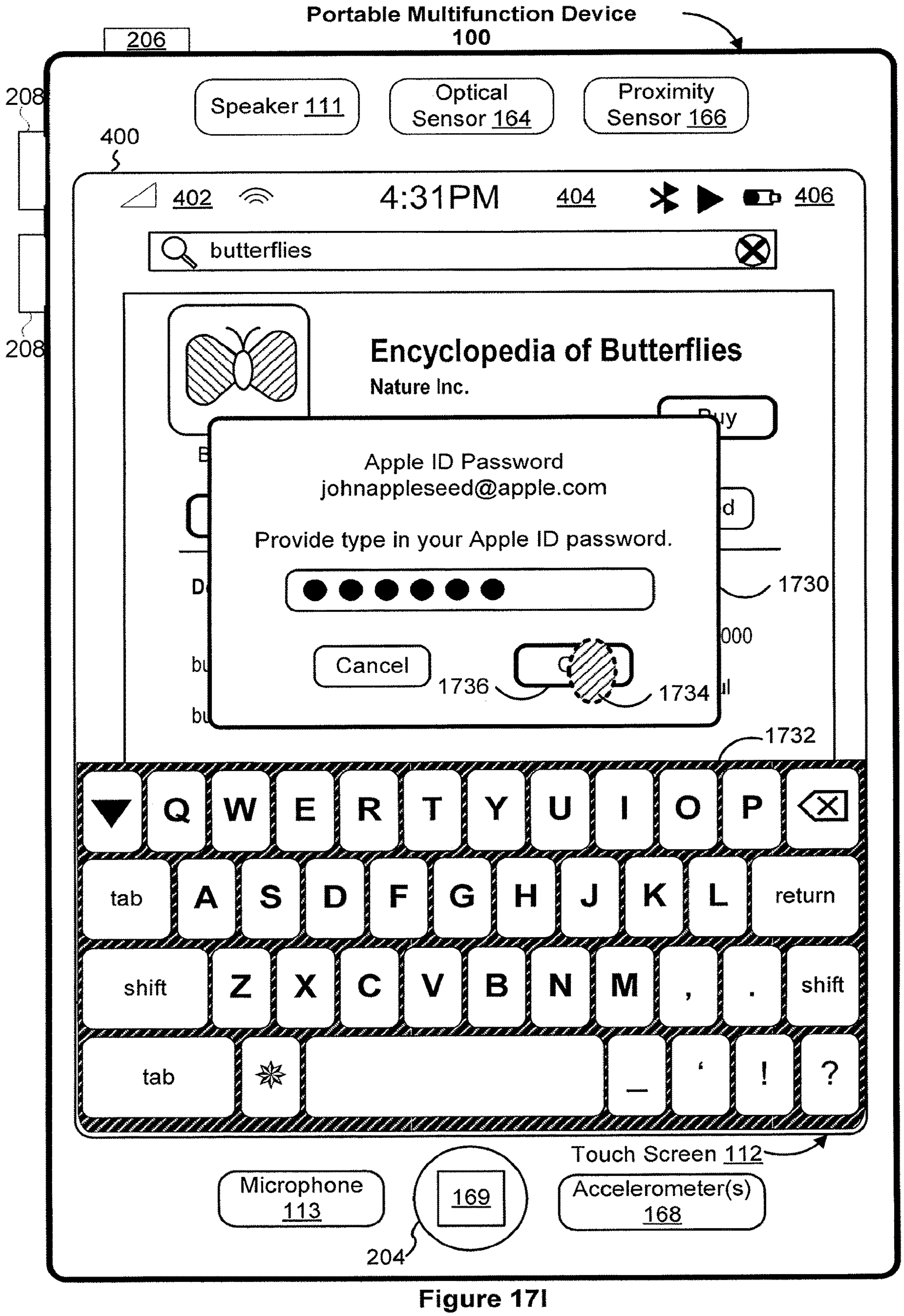
Figure 17J:
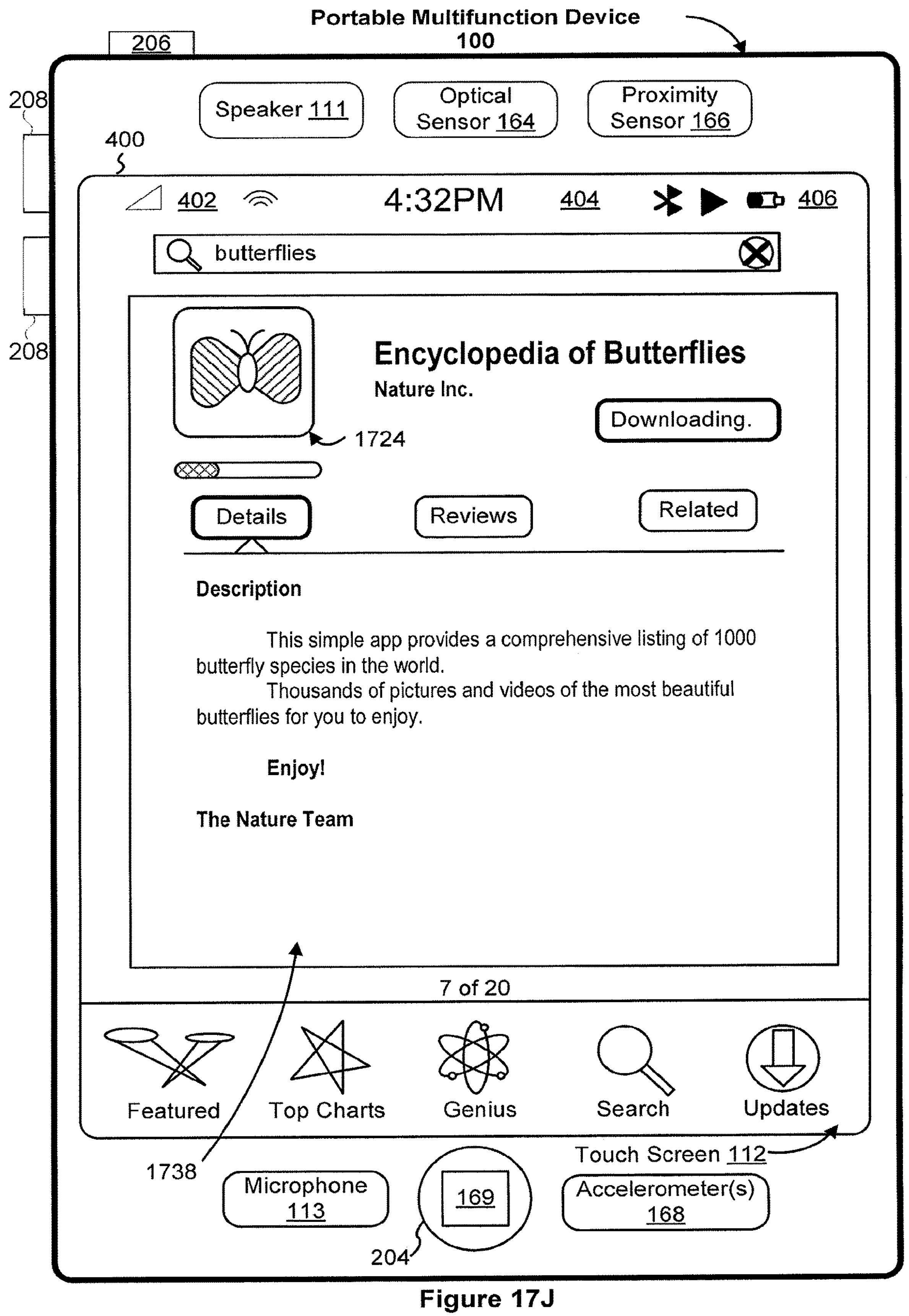

FIG. 17I illustrates that the user has provided the required passcode in the pop-up window 1730 (e.g., using the soft keypad 1732 provided along with the pop-up window 1730). The device 100 transmits the received passcode to the online store in the usual manner (e.g., in an encrypted form). When the online store verifies and accepts the user-entered passcode, the device 100 presents a user interface 1738 indicating that the purchase has been confirmed and download of the purchased interactive book has been started, as shown in FIG. 17J.

At this point, once the manually entered passcode has been accepted by the online store, the device 100 automatically saves the account passcode, and once again enables automatic retrieval and usage of the saved account passcode through enrolled fingerprints (e.g., any of the set of currently enrolled fingerprints) in the next transaction in which the account passcode is required. For example, the next purchase transaction can proceed in a manner analogous to that shown in FIGS. 17A-17D.

FIGS. 18A-18C are flow diagrams illustrating a method 1800 of managing automatic usage of a saved credential through enrolled fingerprints in accordance with some embodiments. The method 1800 is performed at an electronic device (e.g., device 300 of FIG. 3, or portable multifunction device 100 of FIG. 1A) with a display, a fingerprint sensor, and optionally, a touch-sensitive surface. In some embodiments, the display is a touch screen display and the touch-sensitive surface is on the display. In some embodiments, the display is separate from the touch-sensitive surface. In some embodiments, the fingerprint sensor is integrated with the touch-sensitive surface (e.g., the touch screen or the touch-sensitive surface separate from the display). In some embodiments the fingerprint sensor is separate from the touch-sensitive surface. Some operations in method 1800 are, optionally, combined and/or the order of some operations is, optionally, changed.

As described below, the method 1800 provides an efficient and intuitive way of providing automatic usage of saved credentials through enrolled fingerprints while also providing security in light of possible unauthorized enrollment of new fingerprints. The method increases the security of using saved credentials, while permitting concurrent enrollment of multiple fingerprints on the device.

As shown in FIG. 18A, at an electronic device with one or more processors, memory, and a fingerprint sensor: the electronic device stores (1802) on the device a respective credential of a user of the device.

In some embodiments, the respective credential includes (1804) a credential selected from the set consisting of: a user ID, a password, a credit card number, a bank account number, an address, a telephone number, and a shopping credential. For example, in some embodiments, as illustrated in FIGS. 17A-17G, the respective credential is an account passcode for a registered shopping account at an online store (e.g., an app store or an e-commerce store). The online store uses the account passcode to identify and/or authenticate a shopper and/or retrieve previously stored customer information associated with the shopper. In some embodiments, the respective credential is a user ID associated with the device, a user ID associated with an email account, or a user ID associated with an online service account (e.g., online gaming account, a document storage account, etc.). In some embodiments, the respective credential includes a set of user information that is frequently used during online shopping, including a credit card number, a shipping address, a billing address, a credit card expiration date, a telephone number, and/or a credit card security code, etc. In some embodiments, the respective credential includes private authentication information used to verify the user's identity. In some embodiments, the respective credential further includes other user data (e.g., address, birthday, age, preferences, etc.) associated with the authentication information.

In some embodiments, the respective credential is associated with a respective context (e.g., making a purchase using a shopping application, unlocking a locked screen, completing a credit card transaction on an e-commerce website, etc.) for which it is applicable. In some embodiments, the device stores the respective credential in association with the respective context for which it is applicable, such that the device is able to retrieve and use the correct credential under a given context. In some embodiments, the device stores the respective credential in a secured form, e.g., an encrypted form.

In some embodiments, the device automatically stores the respective credential entered by the user, when the user successfully uses the respective credential in context (e.g., using the account passcode for a registered online shopping account to complete a purchase transaction at an online store). In some embodiments, the device stores the respective credential through a respective credential set-up process initiated by the user.

In some embodiments, the context for using the respective credential is associated with a software application executing on the electronic device (e.g., a shopping application, a browser application presenting an online shopping portal, a device operating system, a security application, an email application, a banking application, etc.).

While executing a software application (1806) (e.g., while executing the software application with fingerprint authorization of automatic usage of the respective credential currently enabled on the device): the device receives (1808) a fingerprint at the fingerprint sensor of the device. In response to receiving the fingerprint and in accordance with a determination that credential-usage criteria have been satisfied, including a determination that the received fingerprint matches at least one of a set of enrolled fingerprints, the device automatically uses (1810) the respective credential of the user in the software application (e.g., without the user entering additional authorizing information other than the fingerprint). For example, in some embodiments, the user requests performance of a particular operation that is secured by the credential (e.g., logging in to a secured user interface of the application or making a purchase) and the credential is automatically provided to the application for use in performing the particular requested operation).

For example, as illustrated in FIGS. 17A-17D, in some embodiments, while executing a software application of an online store, the device determines that a respective credential (e.g., an account passcode) associated with the user is requested by the software application. The device determines whether the required credential is currently stored on the device, and if so, whether automatic usage of the stored credential through at least one of a set of enrolled fingerprints is currently enabled. As described with reference to method 600, automatic usage of saved credentials through enrolled fingerprints can be enabled by the user using a predefined fingerprint usage setting. If automatic usage of saved credentials through enrolled fingerprints is enabled, and the appropriate credential (e.g., the account passcode) is already stored on the device, the device prompts (e.g., using pop-up window 1710 in FIG. 17B) the user to provide an enrolled fingerprint input, in lieu of providing the required credential itself. In some embodiments, the device temporarily activates the fingerprint sensor (e.g., fingerprint sensor 169 or 1712 in FIG. 17C) to capture the fingerprint input provided by the user. The device receives a fingerprint input (e.g., fingerprint 1718 in FIG. 17C) at the fingerprint sensor and checks whether the received fingerprint matches one of a set of fingerprints currently enrolled on the device.

In some embodiments, the device presents a pop-up window that prompts the user to either provide a fingerprint input at the fingerprint sensor (i.e., to automatically use the saved credential) or to manually enter a credential that the user wishes to use for the current secured operation. For example, in some embodiments, activation of the fingerprint sensor is performed concurrently with presenting a soft keypad with a text input field for the user to enter the required credential directly. Providing these two choices concurrently to the user allows the user to easily enter a credential other than the one that has been saved on the device.

In some embodiments, the determination that credential-usage criteria have been satisfied includes (1812) a determination that usage of the respective credential has not been disabled. For example, in some embodiments, automatic usage of the respective credential is optionally disabled when the total number of unsuccessful attempts to enter an enrolled fingerprint has exceeded a predetermined threshold number. In some embodiments, automatic usage of the respective credential is optionally disabled when an additional fingerprint has been enrolled since the respective credential was last used. In some embodiments, the device also maintains a cumulative counter for unmatched fingerprint inputs that have been provided thus far. In some embodiments, if the number of unmatched fingerprints exceeds a predetermined threshold number, the device disables automatic usage of saved credentials through fingerprints. For example, if the user provided more than a threshold number of unmatched fingerprints in response to the prompt for an enrolled fingerprint (e.g., the pop-up window 1710 in FIG. 17C), automatic usage of the saved credential (e.g., the account passcode) will be disabled. In response, the device will present a different prompt asking the user to manually enter the required credential.

In some embodiments, a determination that the received fingerprint matches at least one of a set of enrolled fingerprints further includes a determination that the received fingerprint matches any one of all fingerprints currently enrolled on the device. In some embodiments, a determination that the received fingerprint matches at least one of a set of enrolled fingerprints further includes a determination that the received fingerprint matches one of a subset of all fingerprints currently enrolled on the device, where the subset of enrolled fingerprints are one or more fingerprints specifically associated with the software application and/or the respective credential.

In some embodiments, automatically using the respective credential in the software application includes automatically populating one or more text input fields provided in the software application using the respective credential. In some embodiments, automatically using the respective credential in the software application includes automatically sending the respective credential in a plain or encrypted form to the software application or to a remote server through the software application. For example, as illustrated in FIGS. 17C-17D, the device provides the saved credential (e.g., the saved account passcode) to the online store through an app store application to complete a purchase transaction at the online store.

After automatically using the respective credential of the user in response to receiving the fingerprint, the device receives (1814) a request to enroll an additional fingerprint with the device. In response to the request to enroll the additional fingerprint with the device, the device adds (1816) the additional fingerprint to the set of enrolled fingerprints. For example, as illustrated in FIGS. 17D-17F, after the user had finished the shopping transaction using an enrolled fingerprint in lieu of manually entering the required account passcode, the user requested to register a new fingerprint on the device 100 and has enrolled an additional fingerprint (e.g., Finger 2 in FIG. 17F) to the set of fingerprints currently enrolled on the device.

In some embodiments, in response to adding the additional fingerprint to the set of enrolled fingerprints, the device prevents (1818) enrolled fingerprints from being used to authorize automatic usage of the respective credential. In some other embodiments, for enhanced security, the device prevents enrolled fingerprints from being used to authorize automatic usage of the respective credential in response to detecting a request to enroll an additional fingerprint with the device, independent of whether or not an additional fingerprint is actually enrolled. Thus, in some other embodiments, the mere request to enroll an additional fingerprint (e.g., activating "Add Finger" in FIG. 17E) causes the device to prevent enrolled fingerprints from being used to authorize automatic usage of the respective credential (e.g., at least until the respective credential is subsequently entered manually). Disabling automatic usage of a saved credential after an attempt to enroll an additional fingerprint provides an alert to the user (either implicitly or explicitly) of the attempted enrollment.

In some embodiments, the device stores (1820) on the device a predefined fingerprint usage setting that enables the device to automatically use the respective credential of the user in a software application upon receiving a fingerprint that matches at least one of a set of enrolled fingerprints. For example, exemplary embodiments of the predefined fingerprint usage setting for enabling automatic usage of saved credentials are described with reference to method 600.

In some embodiments, preventing enrolled fingerprints from being used to authorize automatic usage of the respective credential includes (1822) deleting or changing a value of the predefined fingerprint usage setting. In some embodiments, deleting or changing a value of the predefined fingerprint usage setting includes deleting a previous authorization from the user to enable automatic usage of saved credentials through an enrolled fingerprint, or changing the fingerprint usage setting (e.g., Touch ID Purchase setting 550 in FIG. 5U) from enabled to disabled.

In some embodiments, preventing enrolled fingerprints from being used to authorize automatic usage of the respective credential includes (1824) deleting a predefined set of confidential values that includes the respective credential. For example, in some embodiments, the device deletes all saved credentials currently stored on the device, such that no saved credential is available for automatic use through enrolled fingerprints. In such embodiments, in the event that the user manually enters a credential in context, the device will automatically save the manually entered credential, and re-enable the automatic usage of the credential through enrolled fingerprints. In some embodiments, if the device supports different sets of enrolled fingerprints for usage of different sets of saved credentials, the device deletes all saved credentials associated with the respective set of enrolled fingerprints to which the additional fingerprint was added.

In some embodiments, preventing enrolled fingerprints from being used to authorize automatic usage of the respective credential includes (1826) deleting the respective credential (e.g., deleting the Apple ID password in the example shown in FIGS. 5A-5J). In some embodiments, the device deletes the respective credential along with one or more other saved credentials having the same level of security on the device.

In some embodiments, the device keeps track of the number of unsuccessful attempts to provide an enrolled fingerprint to unlock the device. In some embodiments, if the device has registered too many failed attempts to unlock the device using an enrolled fingerprint, the device continues to keep the device locked, and also disables automatic usage of saved credentials through enrolled fingerprints. In such embodiments, even if the device is subsequently unlocked (e.g., through the use of an unlock passcode), the user is required to re-enable the automatic usage of save credentials by manually entering the saved credentials and/or reconfiguring the predefined fingerprint usage setting. In some embodiments, the device receives (1828) a sequence of N unsuccessful attempts to unlock the device via fingerprint authorization, wherein N is a predefined integer greater a predetermined threshold number (e.g., 1, 2, 3, 4, 5 or any reasonable number of unsuccessful attempts). In response to receiving the sequence of N unsuccessful attempts to unlock the device via fingerprint authorization, the device prevents (1830) enrolled fingerprints from being used to authorize automatic usage of the respective credential.

In some embodiments, the device provides a way to reauthorize or re-enable the automatic usage of saved credentials through enrolled fingerprints, after the automatic usage has been prevented or disabled (e.g., through any of the methods described above). In some embodiments, after preventing enrolled fingerprints from being used to authorize automatic usage of the respective credential (1832): the device receives (1834) a request to use the respective credential in the software application (e.g., as shown in FIG. 17G, the device receives a request from the app store application to use the account passcode to complete a purchase transaction). In the event that the automatic usage of the saved credential has been disabled, the device requests (1836) the respective credential from the user (e.g., by presenting the pop-up window 1730 and the soft keypad 1732, as shown in FIG. 17H). The device receives (1838) the respective credential (e.g., the account passcode) from the user (e.g., through the text input field shown in the pop-up window 1730 in FIG. 17I). In some embodiments, in response to receiving the respective credential from the user (1740): the device uses (1742) the respective credential in the software application (e.g., as illustrated in FIGS. 17I-17J); and enables (1744) enrolled fingerprints to be used to authorize automatic usage of the respective credential. For example, in some embodiments, once the automatic usage of the respective credential is re-enabled, if the user returns to the same software application (e.g., the app store application), and tries to activate the same secured operation (e.g., making another purchase), the operation can proceed in a manner analogous to that shown in FIGS. 17A-17D (i.e., the user can provide an enrolled fingerprint in lieu of the credential to complete the purchase).

It should be understood that the particular order in which the operations in FIGS. 18A-18C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the "Description of Embodiments" section above) are also applicable in an analogous manner to method 1800 described above with respect to FIGS. 18A-18C. For example, the finger inputs (e.g., including fingerprints), requests, operations, credentials, and requests described above with reference to method 1800 optionally have one or more of the characteristics of the finger inputs (e.g., including fingerprints), requests, operations, credentials, and requests described herein with reference to other methods described herein (e.g., those listed in the "Description of Embodiments" section above). For brevity, these details are not repeated here.

Figure 19:
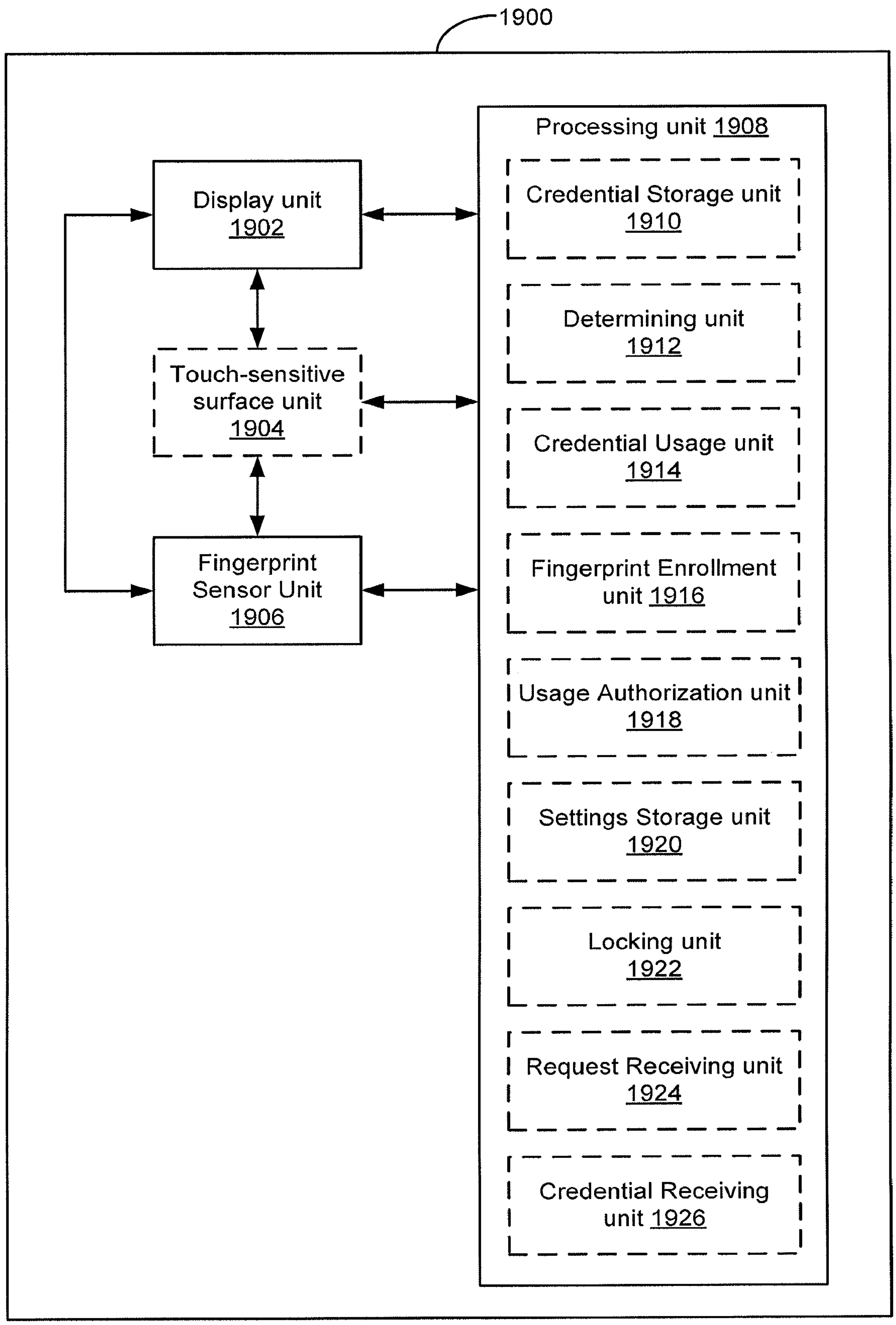
FIG. 19 is a functional block diagram of an electronic device in accordance with some embodiments.

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902 configured to display a graphic user interface, a touch-sensitive surface unit 1904 configured to receive contacts, a fingerprint sensor unit 1906 configured to receive a fingerprint input; and a processing unit 1908 coupled to the display unit 1902, the touch-sensitive surface unit 1904, and the fingerprint sensor unit 1906. In some embodiments, the processing unit 1908 includes a credential storage unit 1910, a determining unit 1912, a credential usage unit 1914, a fingerprint enrollment unit 1916, a usage authorization unit 1918, a settings storage unit 1920, a locking unit 1922, a request receiving unit 1924, and a credential receiving unit 1926.

In some embodiments, the credential storage unit 1910 is configured to store on the device a respective credential of a user of the device. While a software application is being executed on the device: the fingerprint sensor unit 1906 is configured to receive a fingerprint at the fingerprint sensor of the device. The determining unit 1912 is configured to: while the software application is being executed on the device, determine that credential-usage criteria have been satisfied, including determining that the received fingerprint matches at least one of a set of enrolled fingerprints. The credential usage unit 1914 is configured to: while the software application is being executed on the device, in response to the receipt of the fingerprint by the fingerprint sensor unit 1906 and in accordance with a determination by the determining unit 1912 that credential-usage criteria have been satisfied, including a determination that the received fingerprint matches at least one of a set of enrolled fingerprints, automatically use the respective credential of the user in the software application. The fingerprint enrollment unit 1916 is configured to: after the credential usage unit 1914 has automatically used the respective credential of the user in response to the fingerprint sensor unit 1906 receiving the fingerprint, receive a request to enroll an additional fingerprint with the device. The fingerprint enrollment unit 1916 is further configured to: in response to the request to enroll the additional fingerprint with the device, add the additional fingerprint to the set of enrolled fingerprints. The usage authorization unit 1718 is configured to: in response to the addition of the additional fingerprint to the set of enrolled fingerprints by the fingerprint enrollment unit 1916, prevent enrolled fingerprints from being used to authorize automatic usage of the respective credential.

In some embodiments, the determination that credential-usage criteria have been satisfied includes a determination that usage of the respective credential has not been disabled.

In some embodiments, the respective credential includes a credential selected from the set consisting of: a user ID, a password, a credit card number, a bank account number, an address, a telephone number, and a shopping credential.

In some embodiments, the settings storage unit 1920 is configured to store on the device a predefined fingerprint usage setting that enables the device to automatically use the respective credential of the user in the software application upon receiving a fingerprint that matches at least one of a set of enrolled fingerprints.

In some embodiments, the usage authorization unit 1918 is configured to prevent enrolled fingerprints from being used to authorize automatic usage of the respective credential by deleting or changing a value of the predefined fingerprint usage setting.

In some embodiments, the usage authorization unit 1918 is configured to prevent enrolled fingerprints from being used to authorize automatic usage of the respective credential by deleting a predefined set of confidential values that includes the respective credential.

In some embodiments, the usage authorization unit 1918 is configured to prevent enrolled fingerprints from being used to authorize automatic usage of the respective credential by deleting the respective credential.

In some embodiments, the locking unit 1922 is configured to: receive a sequence of N unsuccessful attempts to unlock the device via fingerprint authorization, wherein N is a predefined integer; and in response to receiving the sequence of N unsuccessful attempts to unlock the device via fingerprint authorization, prevent enrolled fingerprints from being used to authorize automatic usage of the respective credential.

In some embodiments, the request receiving unit 1924 is configured to receive a request to use the respective credential in the software application, after enrolled fingerprints are prevented from being used to authorize automatic usage of the respective credential. The credential receiving unit 1926 is configured to requesting the respective credential from the user (e.g., after the request receiving unit 1924 receives the request and enrolled fingerprints are prevented from being used to authorize automatic usage of the respective credential). In some embodiments, the credential usage unit 1914 is further configured to: in response to the credential receiving unit receiving the respective credential from the user, use the respective credential in the software application. In addition, in some embodiments, the usage authorization unit 1918 is further configured to: in response to the credential receiving unit receiving the respective credential from the user, enable enrolled fingerprints to be used to authorize automatic usage of the respective credential.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 18A-18J are, optionally, implemented by components depicted in FIGS. 1A-1B or FIG. 19. For example, storing operation 1802, receiving operation 1808, using operation 1810, adding operation 1816, preventing operation 1818 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Revealing Redacted Information

Many electronic devices have graphical user interfaces that contain private information (e.g., information that a user of the device may not want to be viewed by others). Redacting private information prevents other people from viewing the private information; however, redacting private information also prevents the user of the device from viewing the private information. Some methods require a user to perform a complicated sequence of steps (e.g., navigating to a settings menu and/or entering a pass code or password) to reveal redacted information (e.g., by unlocking the device or changing redaction settings). This makes it difficult and time consuming for the user to quickly review an unredacted version of the information. Thus, it would be advantageous to provide a way for a user to quickly and intuitively remove redaction from information displayed by the device so that the private information is hidden from other people but is still readily accessible to the user of the device. In some embodiments described below, an improved method for revealing redacted information is achieved by using a fingerprint sensor to determine whether or not to reveal redacted information. In particular, while the device is displaying information with a redacted portion, the device determines whether or not to display an unredacted version of the redacted portion of the information based on whether the device detects a fingerprint that matches a previously enrolled fingerprint on a fingerprint sensor of the device. This method streamlines the process of revealing redacted information by enabling a user to reveal redacted information simply by placing a finger on a fingerprint sensor of the device, thereby eliminating the need for extra, separate, steps to reveal redacted information.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 20A-20T and 21A-21C includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 20A-20T and 21A-21C will be discussed with reference to a device with a touch screen 112 and a separate fingerprint sensor 359-2, however analogous operations are, optionally, performed on a device with an integrated fingerprint sensor 359-1 in response to detecting the inputs described in FIGS. 20A-20T on the integrated fingerprint sensor 359-1 while displaying the user interfaces shown in FIGS. 20A-20T on the display 450. Additionally, analogous operations are, optionally, performed on a device with a display 450 and a separate touch-sensitive surface 451 instead of a touch screen 112 in response to detecting the contacts described in FIGS. 20A-20T on a fingerprint sensor 169 (e.g., an integrated fingerprint sensor 359-1 or a separate fingerprint sensor 359-2) and/or the separate touch-sensitive surface 451 while displaying the user interfaces shown in FIGS. 20A-20T on the display 450; in such embodiments, the contacts shown in FIGS. 20A-20T optionally represent both a focus selector that corresponds to a location on the display 450, and a contact that corresponds to a location of a contact or gesture performed on the separate touch-sensitive surface (e.g., touch-sensitive surface 451), where the focus selector is, optionally: a respective contact, a representative point corresponding to a contact (e.g., a centroid of a respective contact or a point associated with a respective contact), or a centroid of two or more contacts detected on the touch screen 112 and is, optionally, replaced with a displayed cursor.

FIG. 20A illustrates a locked-device user interface displayed on touch screen 112 of device 100 while the device is in a locked mode of operation. In some embodiments, locked-device user interface is displayed while one or more functions of device 100 are locked (e.g., access to personal data and applications is limited compared to when the device is in an unlocked mode of operation). In some embodiments, when the device detects a swipe gesture including movement of a contact from left to right across touch screen 112, the device is unlocked or an unlock sequence is initiated (e.g., a user is prompted to enter a pass code, as shown in FIG. 20G). In some embodiments, the device is unlocked when the swipe gesture is detected over an unlock image 2001 (e.g., the text ">slide to unlock" in FIG. 20A).

Figure 20B:
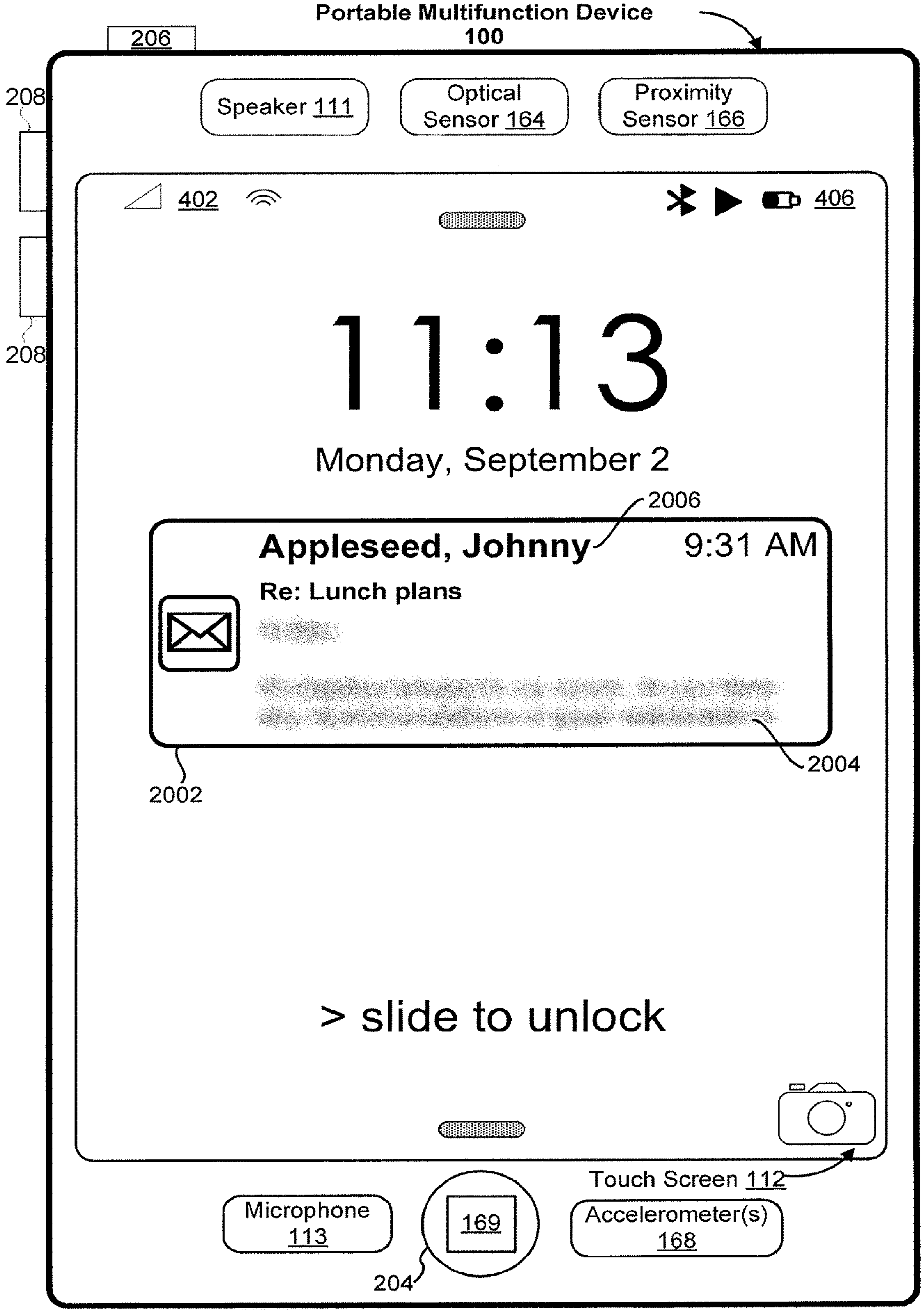

In FIG. 20B, while the device is in the locked mode of operation, the device receives an email and generates notification 2002 that includes redacted portion 2004 that corresponds to a snippet of content of the email and unredacted portion 2006 that includes a sender, title, and time of the email.

Figure 20C:
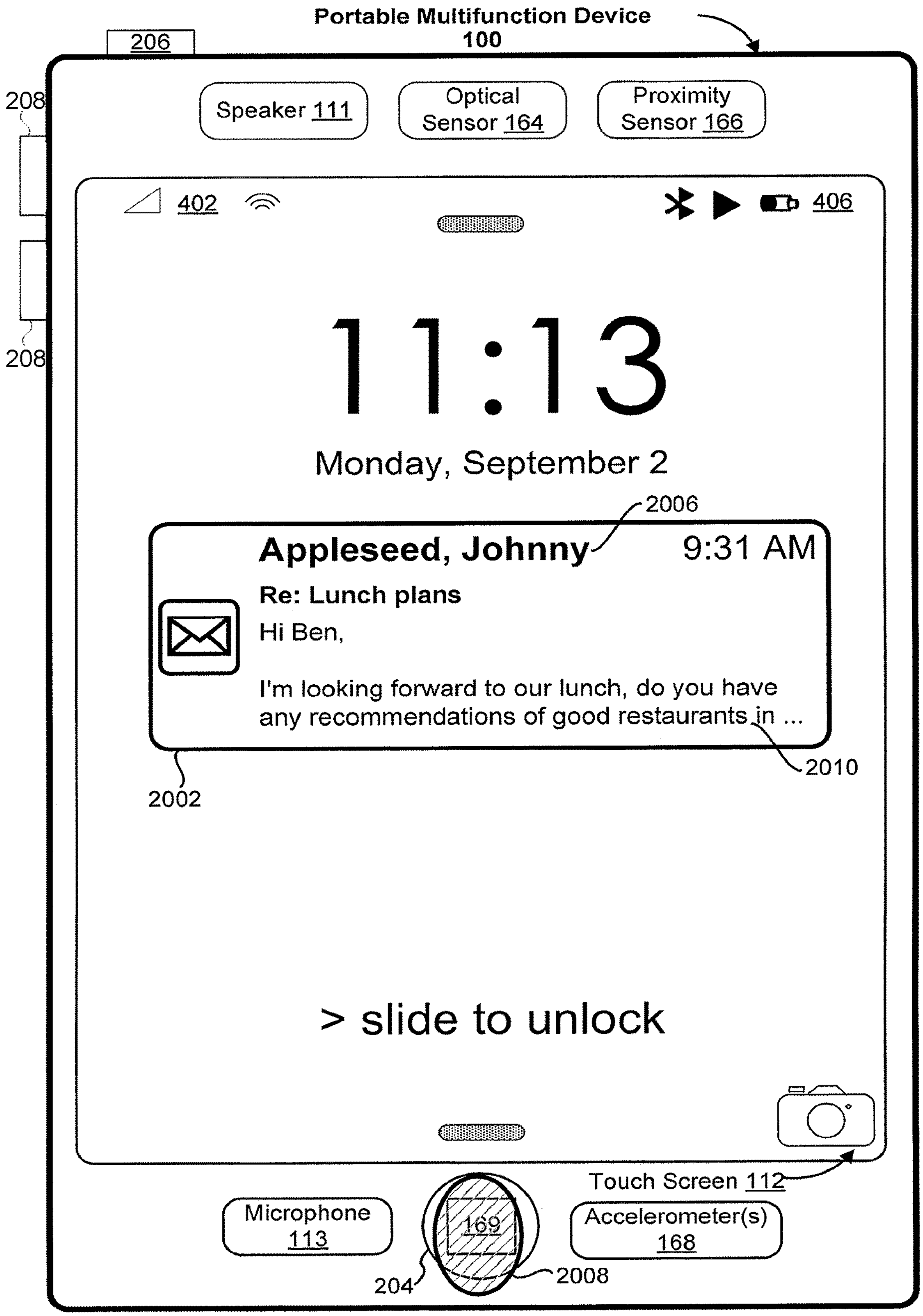

In FIG. 20C, the device detects a finger gesture that includes finger contact 2008 on fingerprint sensor 169. Finger contact 2008 includes a fingerprint that matches a previously enrolled fingerprint and, in response to detecting finger contact 2008, the device displays unredacted version 2010 of the content of the email. In this example, the device continues to display unredacted portion 2006 of notification 2002 while displaying unredacted version 2010 of the content.

Figure 20D:
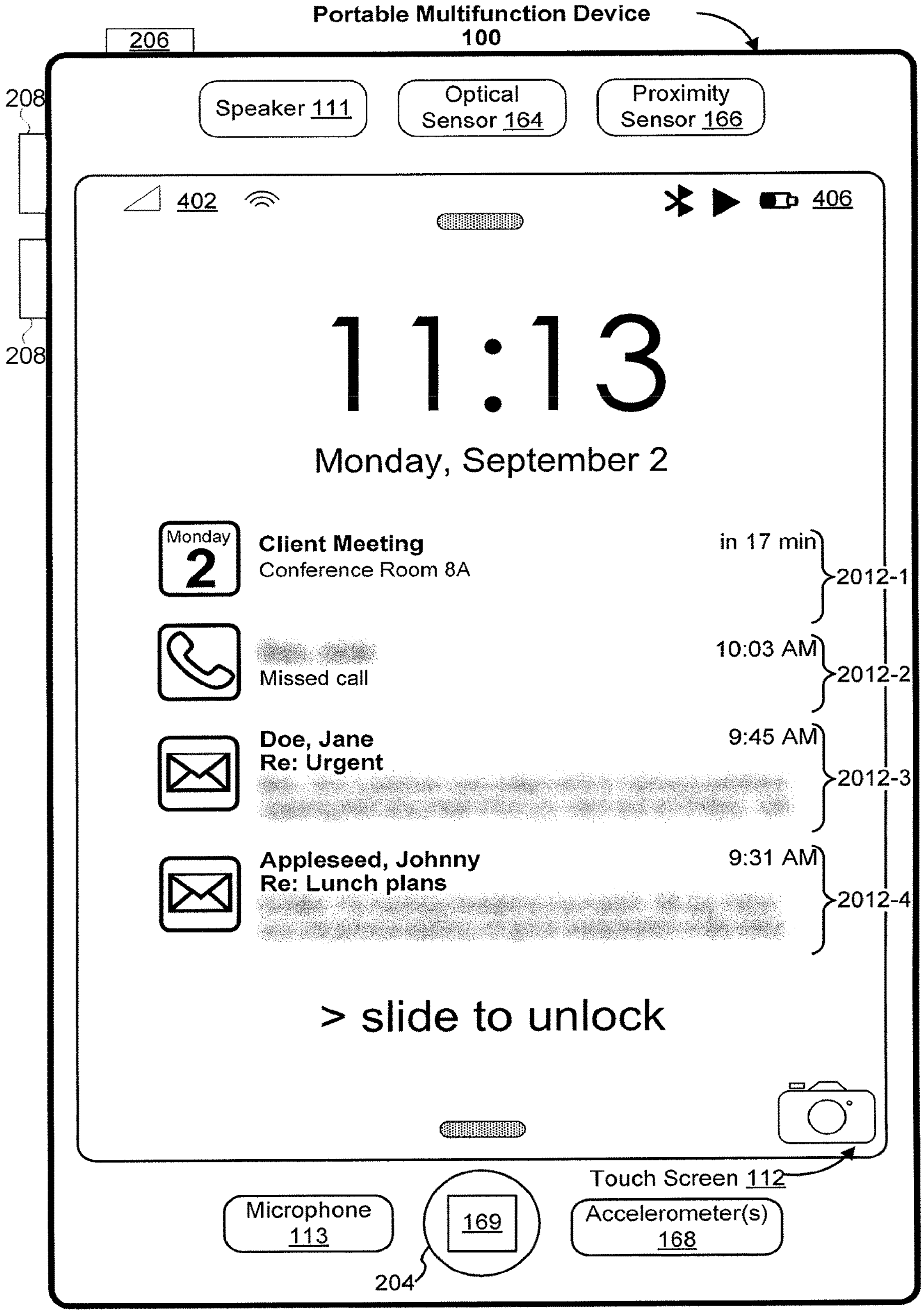

FIG. 20D illustrates a locked-device user interface displayed on touch screen 112 of device 100 while the device is in a locked mode of operation after the device has generated multiple notifications that correspond to different received communications or events, including a compressed version 2012-4 of email notification 2002 shown in FIGS. 20B-20C, calendar notification 2012-1, phone call notification 2012-2, and email notification 2012-3. In FIG. 20D, the content of email notifications 2012-3 and 2012-4 is redacted and the name of the caller in phone call notification 2012-2 is redacted, while none of the information in calendar notification 2012-1 is redacted. In some embodiments a name or location of the calendar notification is redacted. In some embodiments, none of the information in phone call notification 2012-2 is redacted. In some embodiments, one or more of these notifications 2012 in FIG. 20D includes only redacted information.

Figure 20E:
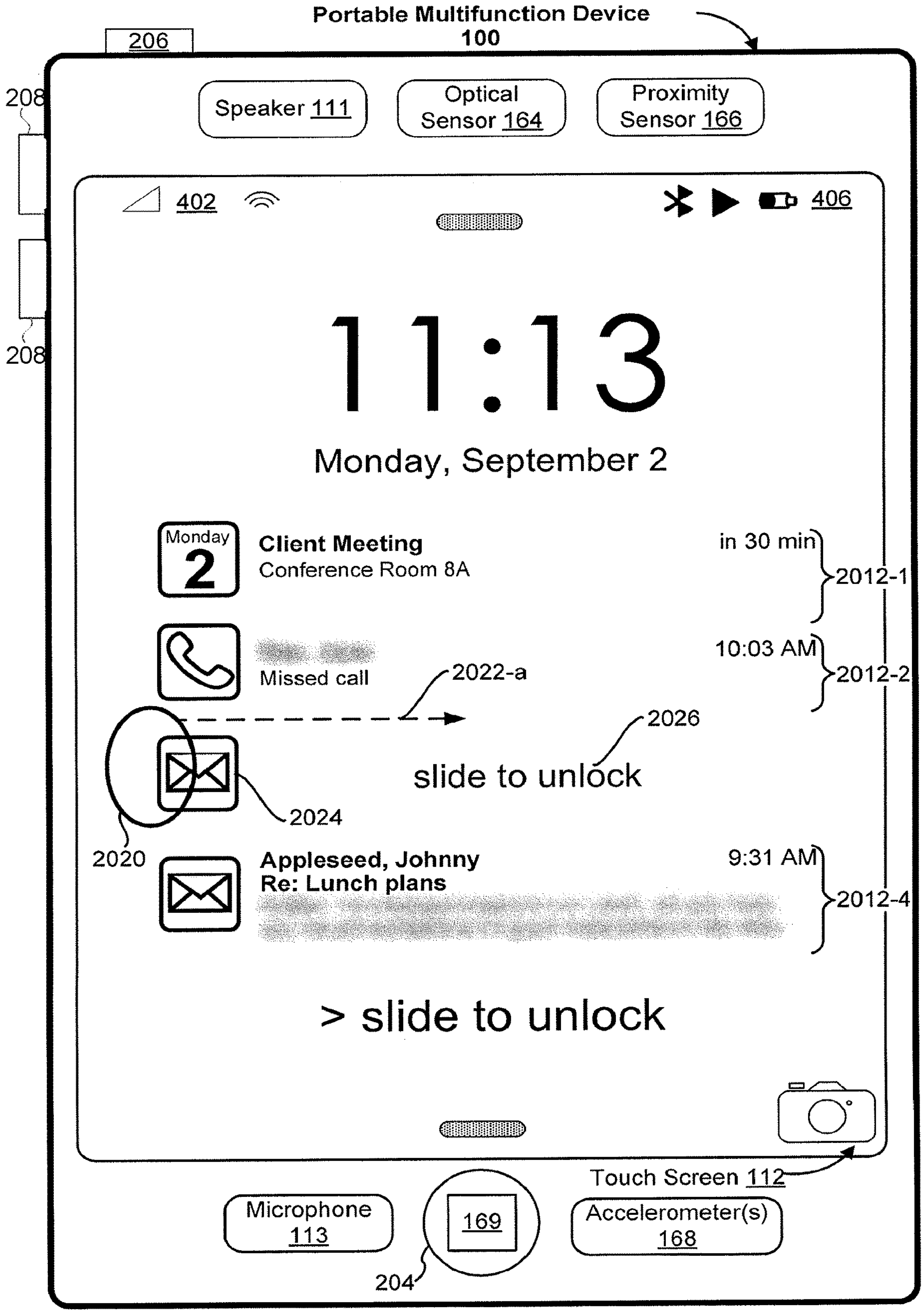
Figure 20F:
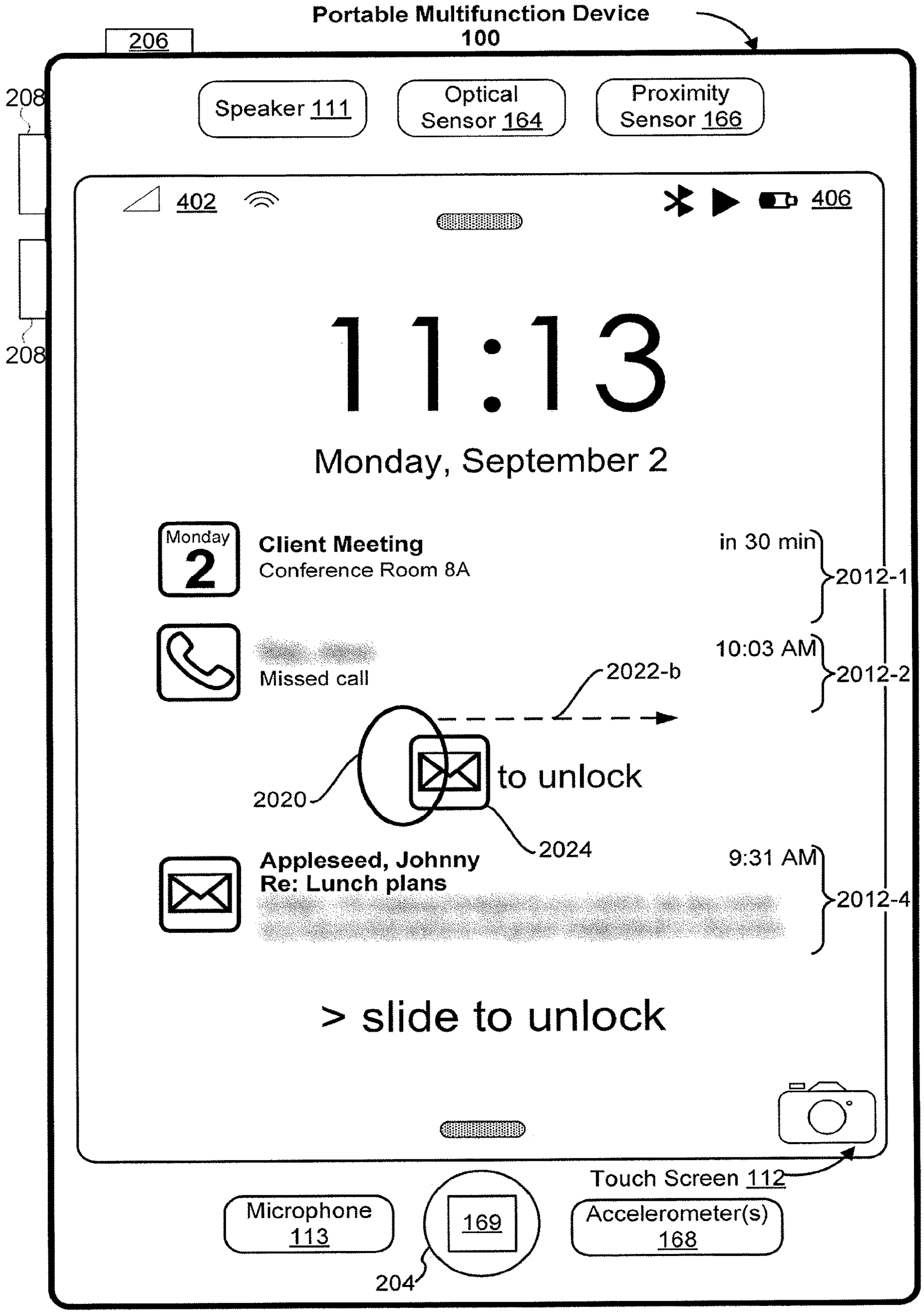
Figure 20G:
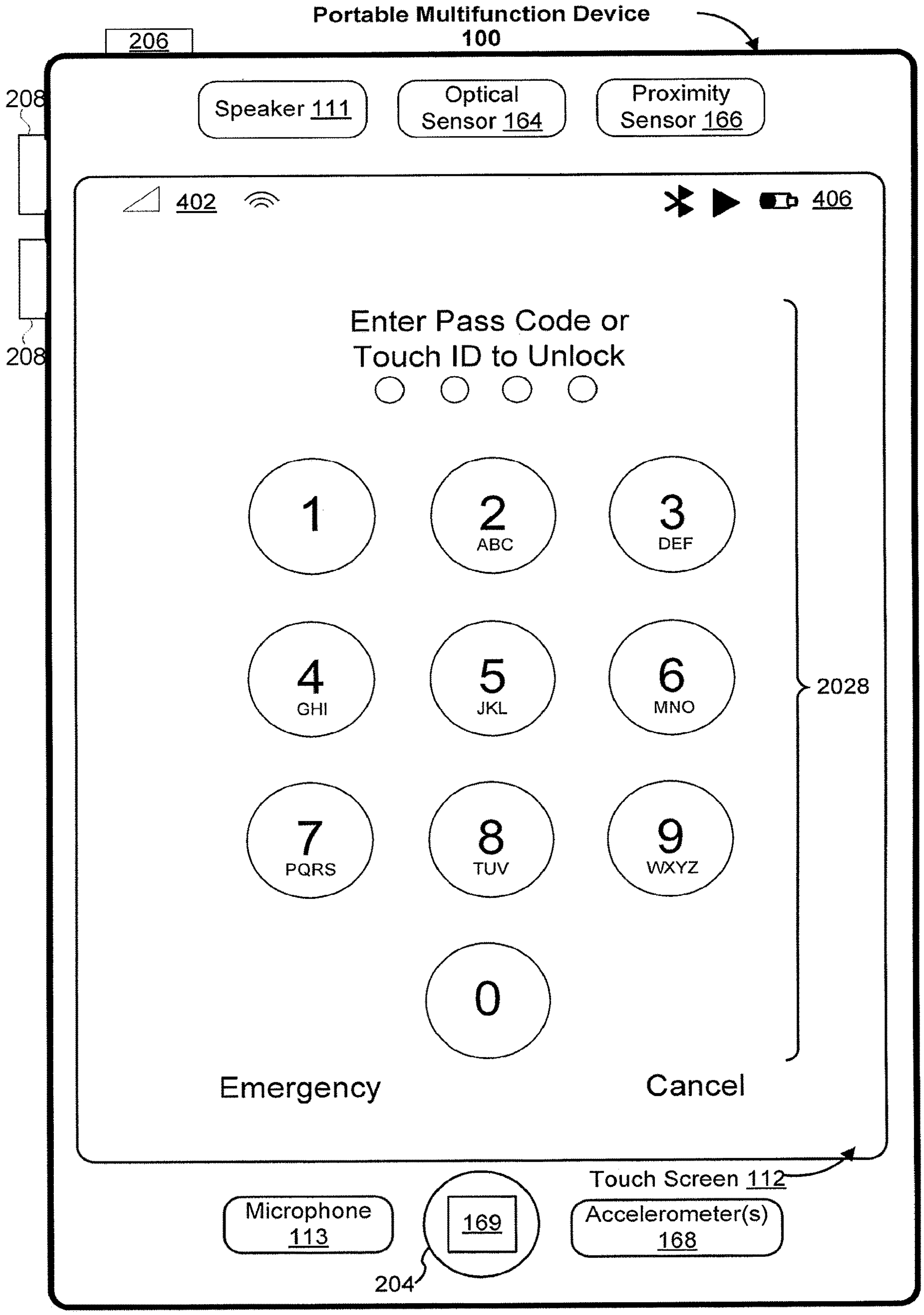

In FIGS. 20E-20F, the device detects contact 2020 on touch screen 112 and detects movement 2022-*a* and 2022-*b* of contact 2020 across touch screen 112. In response to detecting contact 2020 at or near a location of icon 2024 that corresponds to email notification 2012-3, the device ceases to display descriptive information about email notification 2012-3 (e.g., the redacted and unredacted information that correspond to the notification) and instead displays an instruction for accessing the email corresponding to the notification (e.g., "slide to unlock" 2026). In response to detecting movement of contact 2020, the device moves icon 2024 across the display (e.g., so as provide visual confirmation that the notification that corresponds to icon 2024 has been selected and/or to indicate progress toward unlocking the device and displaying the email corresponding to email notification 2012-3). In some embodiments, when at least a portion of a respective notification is redacted, the device responds to an attempt to unlock the device to access additional information related to the respective notification (e.g., swipe gesture at a location that corresponds to the respective notification, as shown in FIGS. 20E-20F) by requesting additional authentication from the user (e.g., as shown in FIG. 20G). In some embodiments, when a respective notification is not redacted, the device responds to an attempt to unlock the device to access additional information related to the respective notification (e.g., swipe gesture at a location that corresponds to the respective notification, as shown in FIGS. 20J-20K) by displaying the additional information related to the respective notification (e.g., as shown in FIG. 20L).

In FIG. 20G, the device displays an unlock user interface for unlocking the device. In FIG. 20G, the device will unlock the device in response to detecting entry of a pass code for the device or in response to detecting a fingerprint on fingerprint sensor 169 that matches a previously enrolled fingerprint. For example, if a correct pass code is entered in pass code entry user interface 2028 (e.g., by detecting tap gestures on the numbers that correspond to entry of the correct pass code) and/or a fingerprint matching a previously enrolled fingerprint is detected on fingerprint sensor 169, the device will display a copy of the email that corresponds to the activated notification 2012-3 in FIG. 20D in an email application (e.g., as shown in FIG. 20L).

Figure 20H:
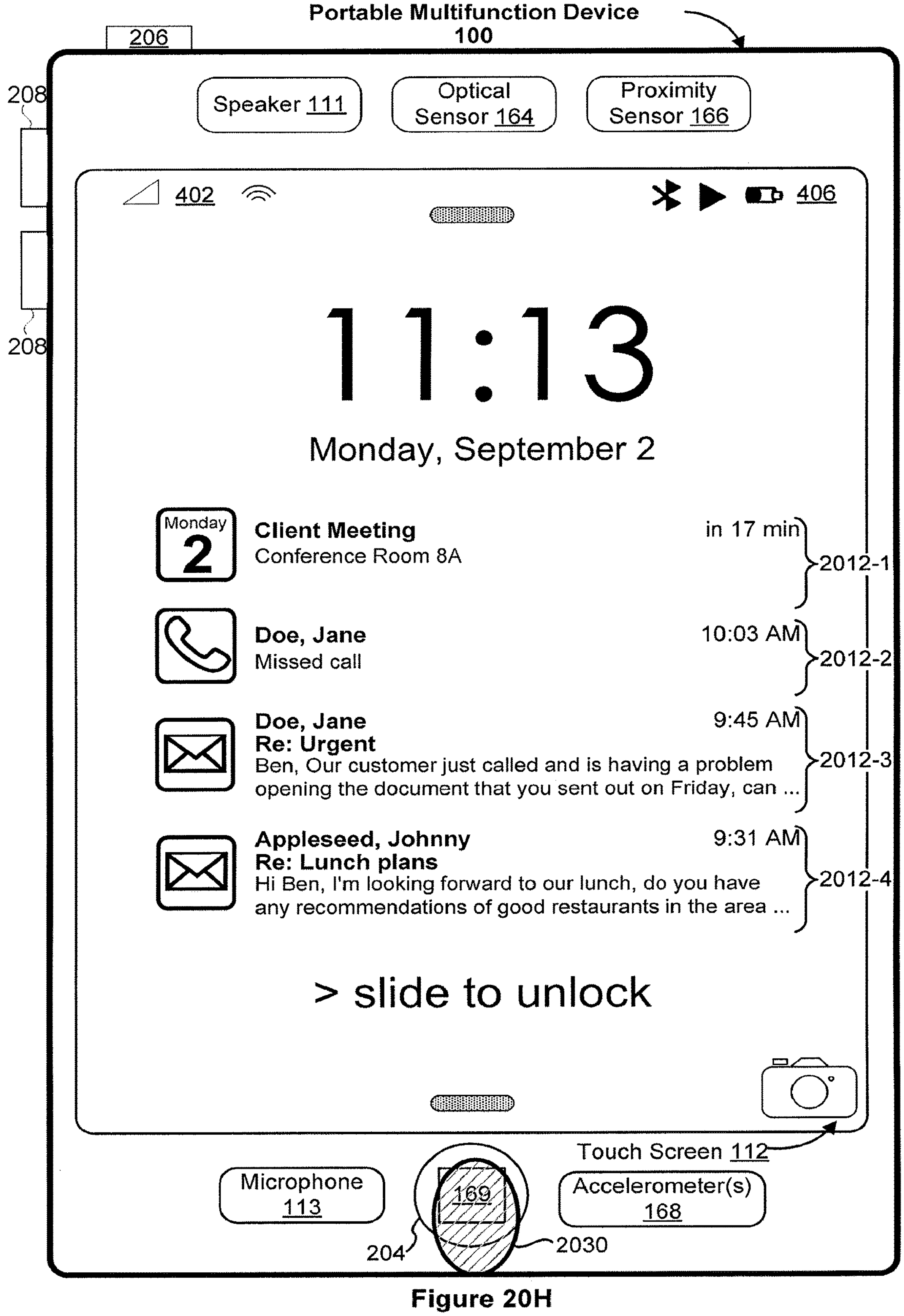
Figure 20I:
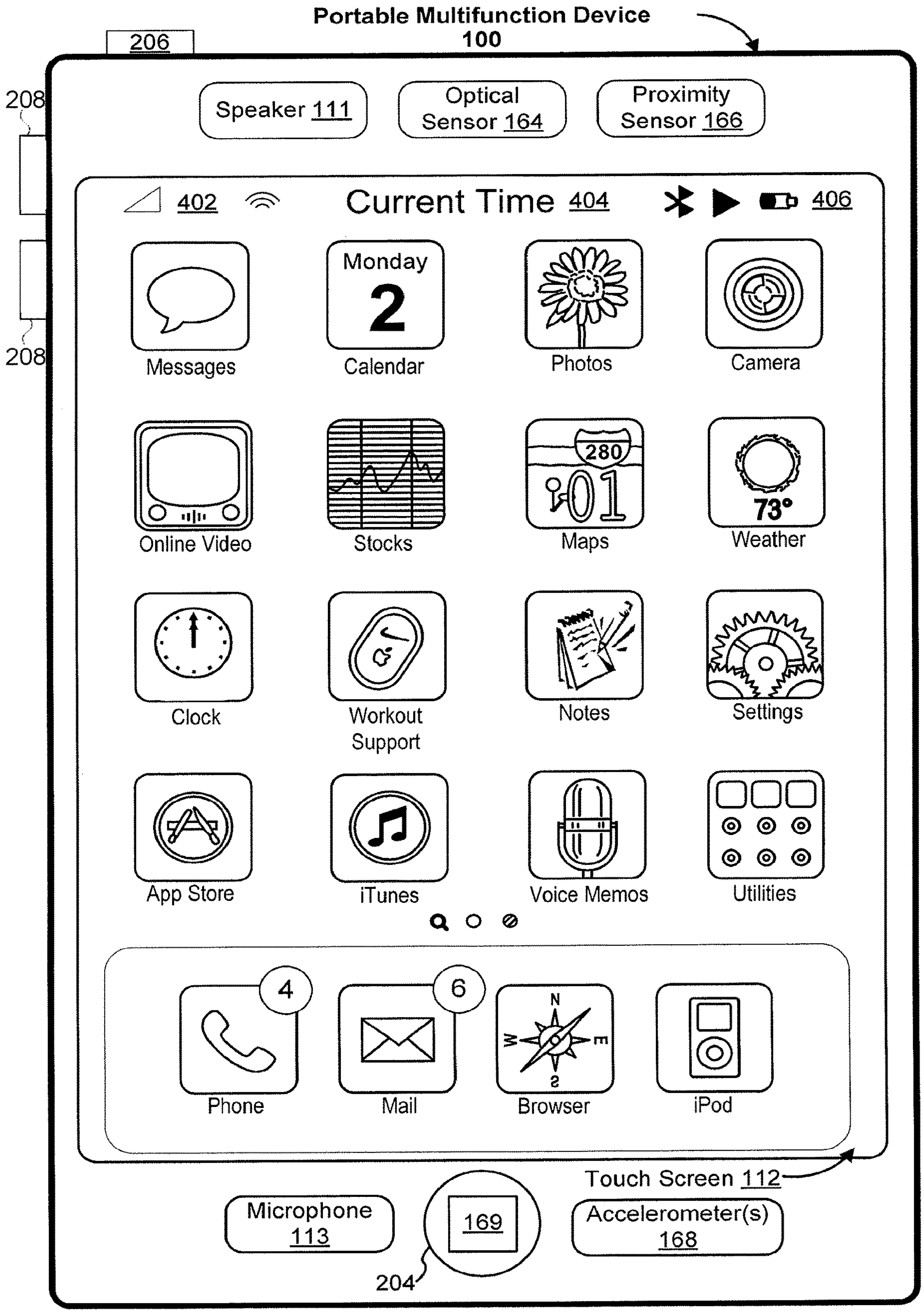
Figure 20J:
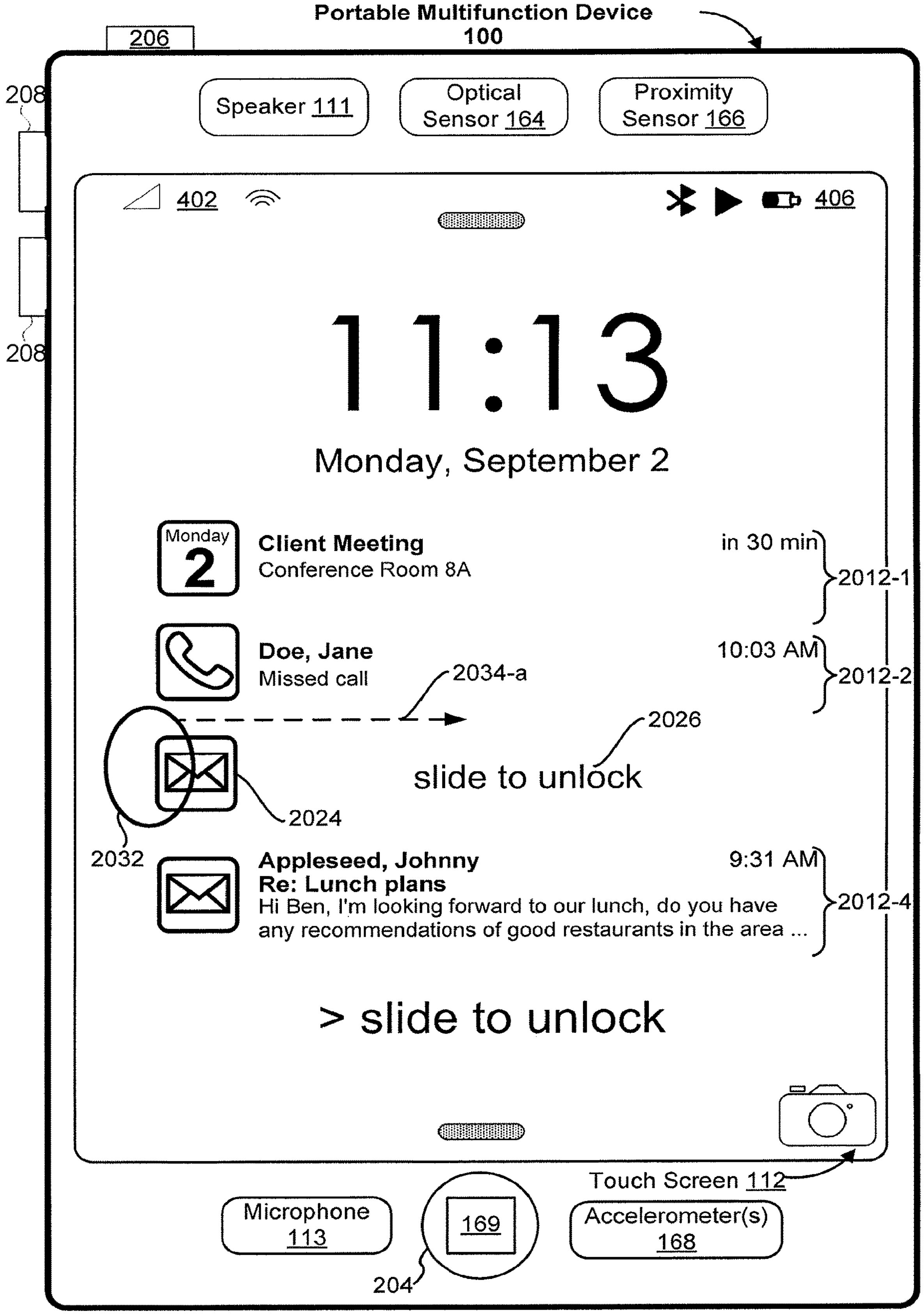
Figure 20K:
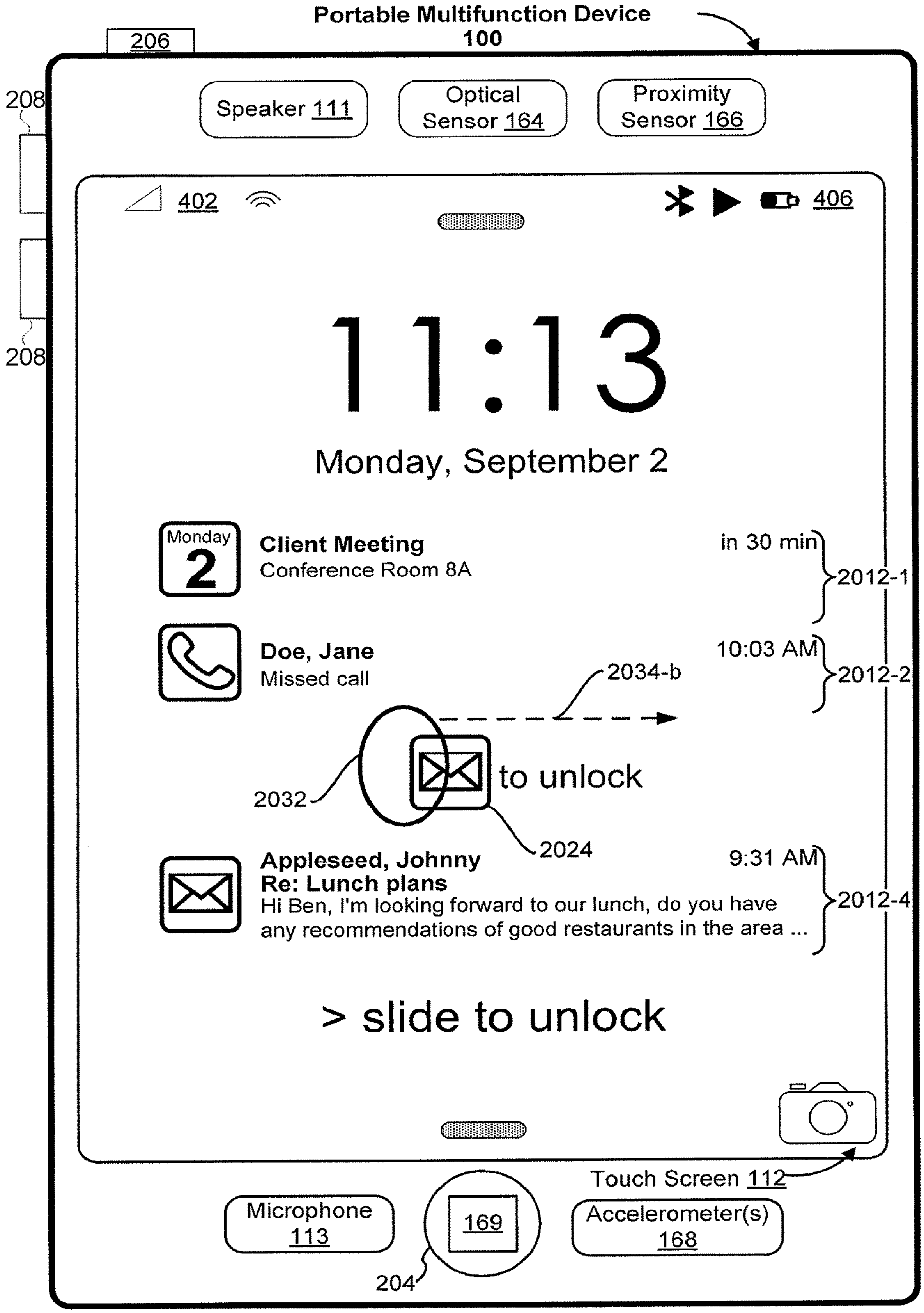
Figure 20L:
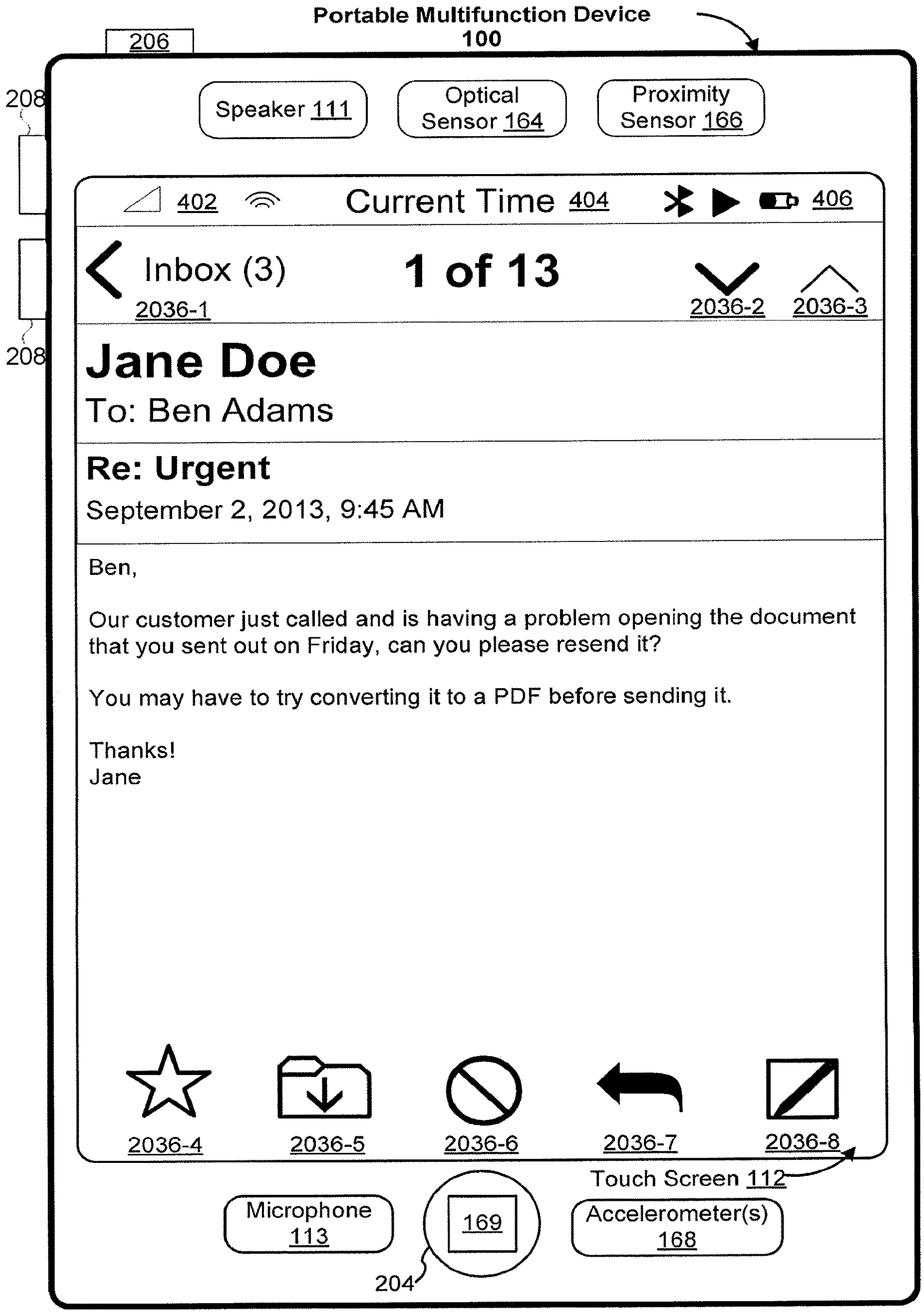

In FIG. 20H, the device displays unredacted versions of previously redacted notifications in response to detecting finger contact 2030 on fingerprint sensor 169 that includes a fingerprint that matches a previously enrolled fingerprint while displaying multiple notifications 2012, a plurality of which included both redacted and unredacted information (e.g., as shown in FIG. 20D). In this example, the device continues to display the unredacted portions of notifications 2012 while displaying unredacted portions of a plurality of notifications that previously included redacted portions (e.g., notifications 2012-2, 2012-3, and 2012-4 previously included redacted portions in FIG. 20D and do not include redacted portions in FIG. 20H after finger contact 2030 has been detected). In some embodiments, in response to detecting liftoff of finger contact 2030, redacted versions of the notifications are redisplayed (e.g., returning to the user interface shown in FIG. 20D). In some embodiments, in response to detecting liftoff of finger contact 2030, the device is unlocked (e.g., as shown in FIG. 20I). In some embodiments, after detecting liftoff of the finger contact 2030, the unredacted versions of the notifications continue to be displayed for a predefined time period (e.g., for 5, 10, 15, 30, 60 seconds or some other reasonable time period) or until a predetermined criteria has been met (e.g., the display of the device has turned off either due to a screen-dim timer or due to a screen-dim input from a user such as activating a sleep/power button of the device), as shown in FIG. 20J, where unredacted versions of notifications 2012-2 and 2012-4 are displayed even though the device is not currently detecting a fingerprint on fingerprint sensor 169.

In FIG. 20I, in response to detecting a liftoff of finger contact 2030 (FIG. 20H) from fingerprint sensor 169, the device transitions from operating in a locked mode to operating in an unlocked mode and displays an application launch interface for launching a plurality of different applications (e.g., in response to detecting a tap gesture on a respective icon of the icons displayed on touch screen 112 in FIG. 20I, the device would open an application corresponding to the respective icon as described in greater detail above with reference to FIG. 4A). In some embodiments, when the device is unlocked, a most recently open application (e.g., an application that was open at the time when the device was locked) is displayed instead of displaying the application launch user interface (e.g., if a mail application was open when the device was last locked, a mail application user interface such as the interface shown in FIG. 20L is shown on the display).

In FIGS. 20J-20K, while unredacted versions of notifications 2012 are displayed (e.g., as shown in FIG. 20H), the device detects contact 2032 on touch screen 112 and movement 2034-*a* and 2034-*b* of contact 2032 across touch screen 112. In response to detecting contact 2032 at or near a location of an icon 2024 that corresponds to email notification 2012-3, the device ceases to display descriptive information about email notification 2012-3 (e.g., the redacted and unredacted information that correspond to the notification) and instead displays an instruction for accessing the email corresponding to the notification (e.g., "slide to unlock" 2026). In response to detecting movement of contact 2032, the device moves icon 2024 across the display (e.g., so as provide visual confirmation that the notification that corresponds to icon 2024 has been selected and/or to indicate progress toward unlocking the device and displaying the email corresponding to email notification 2012-3).

In FIG. 20L, the device displays an email received at the device that corresponds to notification 2012-3 in FIGS. 20D and 20H. As shown in FIG. 20L, the full version of the email includes additional content that is not included in the snippet shown in the notification that corresponds to the email. The email interface in FIG. 20L also includes a plurality of controls 2036 that enable the user to perform or initiate performance of different operations, such as: navigate to different emails (e.g., by tapping on control 2036-1 to display an inbox view that includes representations of a plurality of emails, by tapping on control 2036-3 to navigate to a previous email in the current folder or tapping on control 2036-2 to navigate to a next email in the current folder), flag/star the displayed email (e.g., by tapping on control 2036-4), file the displayed email in a folder (e.g., by tapping on control 2036-5), delete/archive the displayed email (e.g., by tapping on control 2036-6), reply/forward the displayed email (e.g., by tapping on control 2036-7), and draft a new email (e.g., by tapping on control 2036-8).

Figure 20M:
Figure 20N:
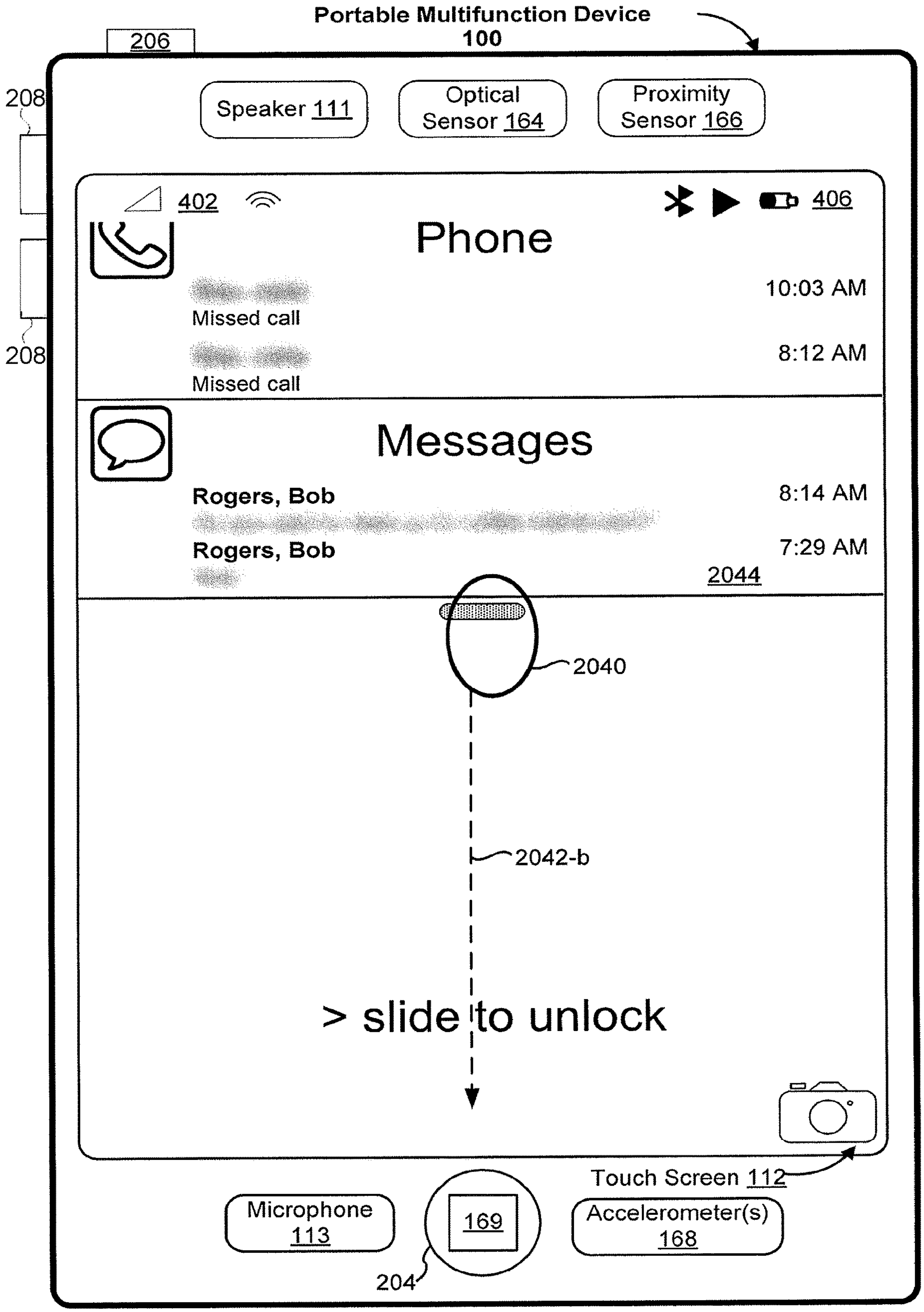
Figure 20O:
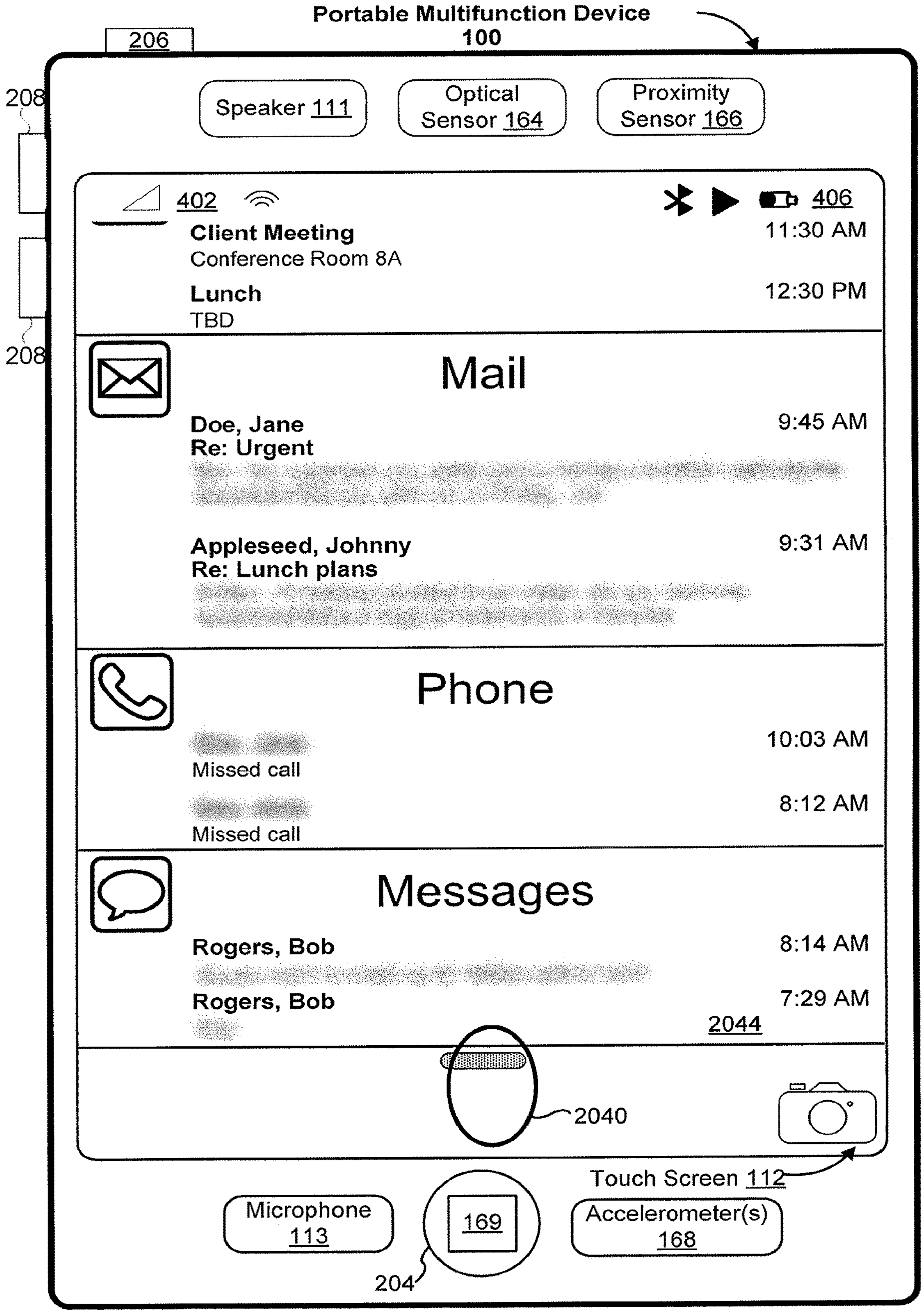
Figure 20P:
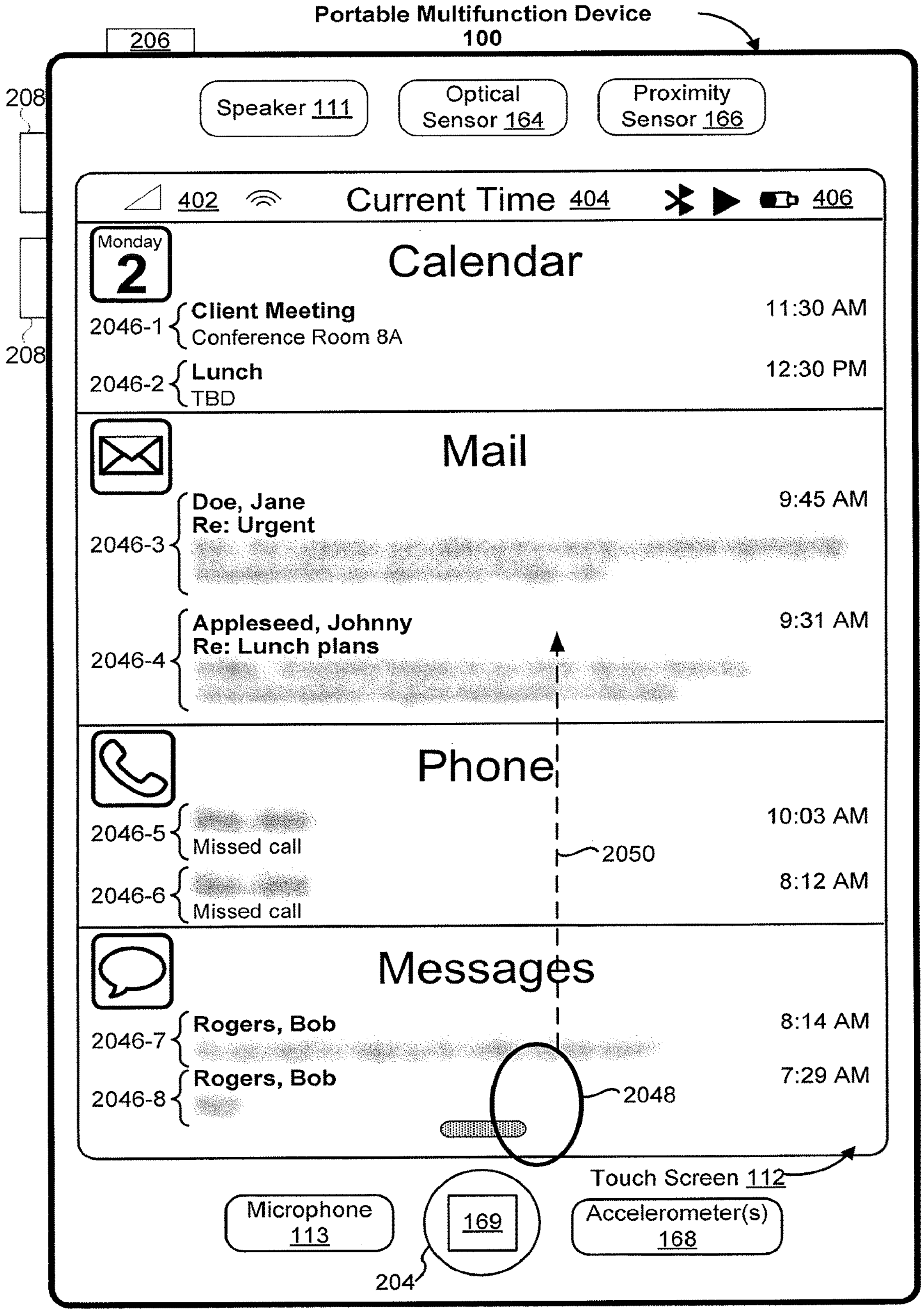

In FIGS. 20M-20O, the device detects contact 2040 on touch screen 112 and movement 2042-*a* and 2042-*b* across touch screen 112. In response to detecting movement of contact 2040 downward from a top edge of touch screen 112, the device gradually displays notification interface 2044 sliding down touch screen 112, e.g., in accordance with movement 2042 of contact 2040. As shown in FIG. 20P, notification interface 2044 includes a plurality of notifications that include redacted information and unredacted information and a plurality of notifications that include only unredacted information.

In FIG. 20P, calendar notifications 2046-1 and 2046-2 are unredacted; email notifications 2046-3 and 2046-4 include unredacted senders, subjects and times and redacted content; phone message notifications 2046-5 and 2046-6 include redacted callers and unredacted times; and message notifications 2046-7 and 2046-8 include unredacted senders and times and redacted content. In FIG. 20P, in response to detecting an upward swipe gesture including detecting contact 2048 near a lower edge of touch screen 112 and movement 2050 of contact 2048 upward on touch screen 112 while the redacted version of some of the notifications is displayed (e.g., as shown in FIG. 20P), the device returns to displaying a locked-device user interface such as the user interface shown in FIG. 20M.

Figure 20Q:
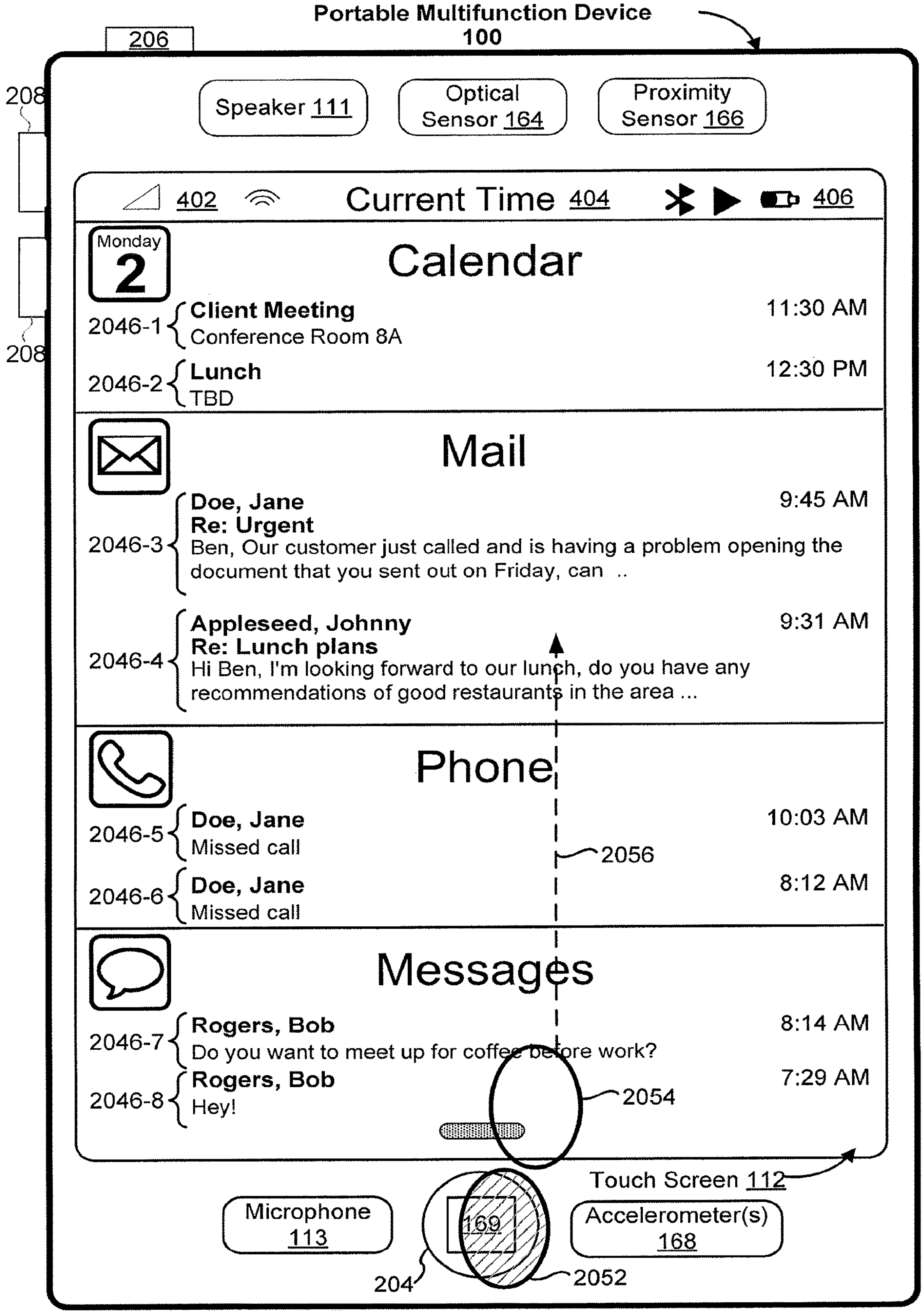

In FIG. 20Q, in response to detecting finger contact 2052 on fingerprint sensor 169 that includes a fingerprint that matches a previously enrolled fingerprint, the device displays unredacted versions of multiple, previously redacted notifications 2046, a plurality of which include both redacted and unredacted information (e.g., as shown in FIG. 20P). In this example, the device continues to display the unredacted portions of notifications 2046 while displaying unredacted portions of a plurality of notifications that previously included redacted portions (e.g., notifications 2046-3, 2046-4, 2046-5, 2046-6, 2046-7, and 2046-8 previously included redacted portions in FIG. 20P and do not include redacted portions in FIG. 20Q after finger contact 2052 has been detected). In some embodiments, in response to detecting liftoff of finger contact 2052, redacted versions of the notifications are redisplayed (e.g., returning to the user interface shown in FIG. 20P). In some embodiments, in response to detecting liftoff of finger contact 2052, the device is unlocked (e.g., as shown in FIG. 20I). In some embodiments, after detecting liftoff of the finger contact 2030, the unredacted versions of the notifications continue to be displayed for a predefined time period (e.g., for 5, 10, 15, 30, 60 seconds or some other reasonable time period) or until a predetermined criteria has been met (e.g., the display of the device has turned off either due to a screen-dim timer or due to a screen-dim input from a user such as activating a sleep/power button of the device). In FIG. 20Q, in response to detecting an upward swipe gesture including detecting contact 2054 near a lower edge of touch screen 112 and movement 2056 upward on touch screen 112 as shown in FIG. 20Q while the unredacted versions the notifications are displayed, the device displays an unlocked-device user interface (e.g., an application launch user interface such as the application launch user interface shown in FIG. 20I or a user interface for a recently opened application such as the email user interface shown in FIG. 20L).

Figure 20R:
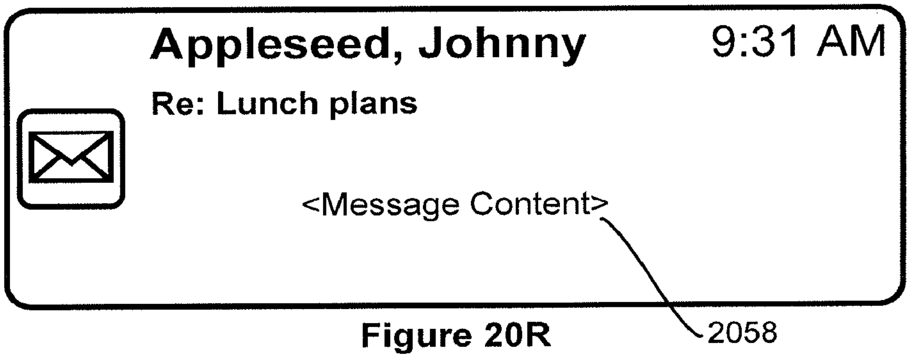
Figure 20S:
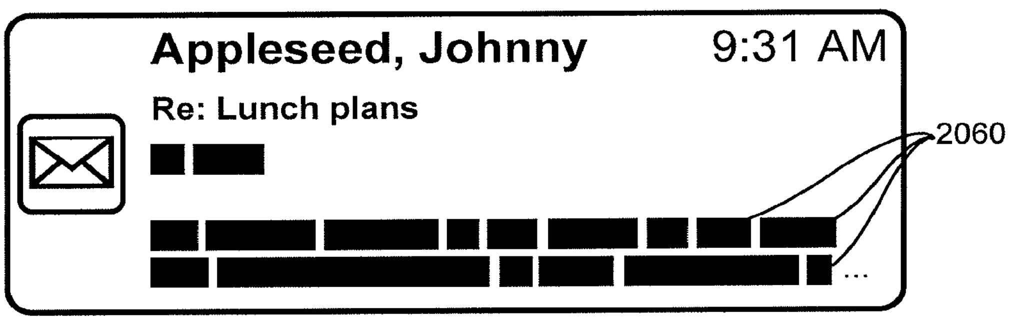
Figure 20T:
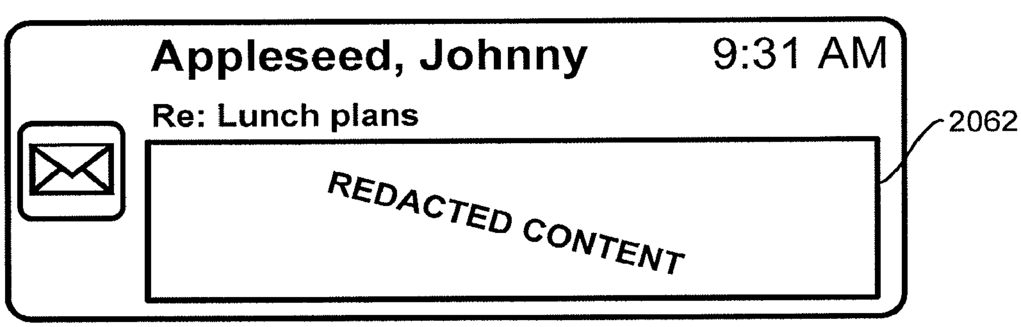
Figure 21A:
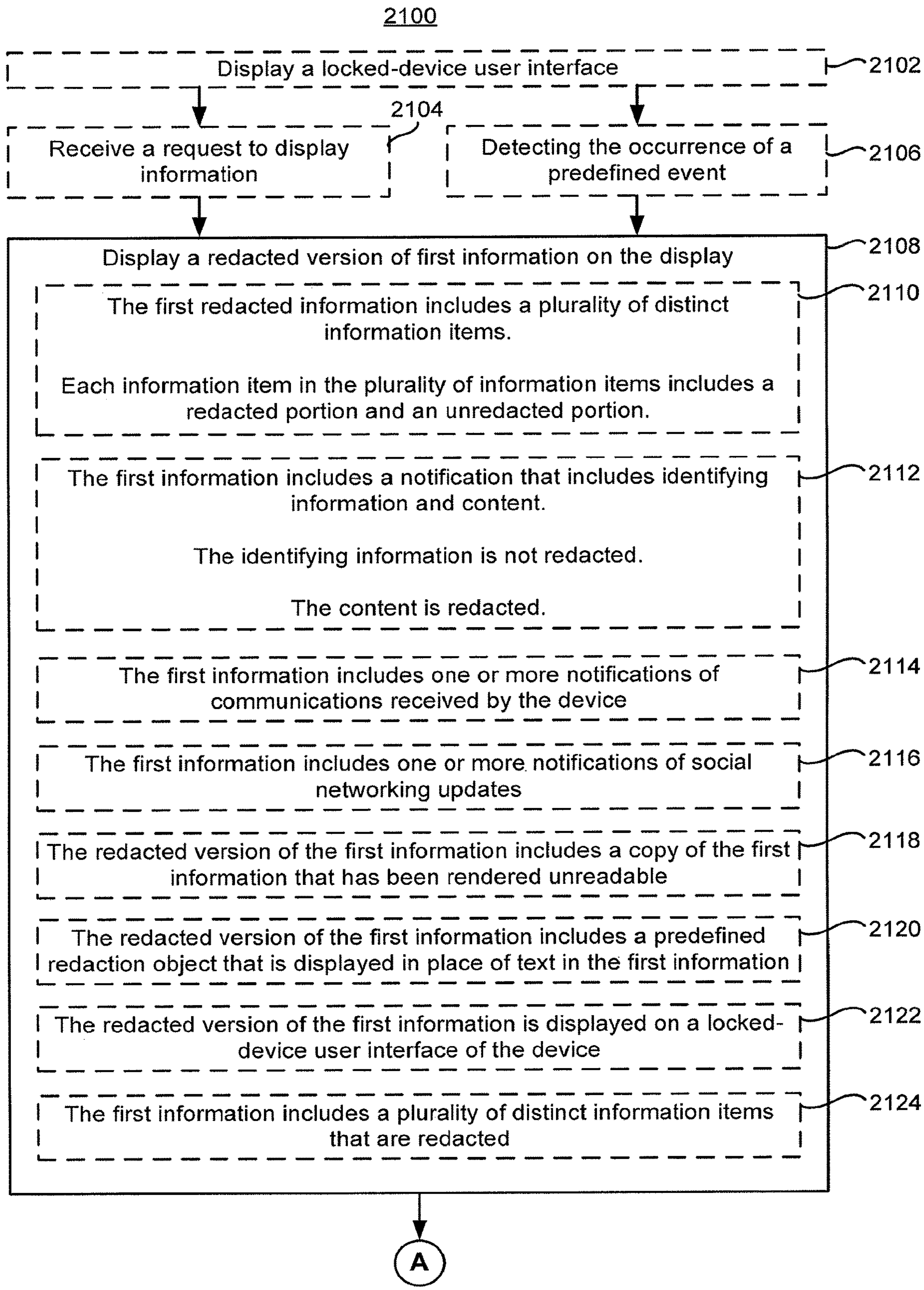
FIGS. 21A-21C are flow diagrams illustrating a method of revealing redacted information in accordance with some embodiments.
Figure 21B:
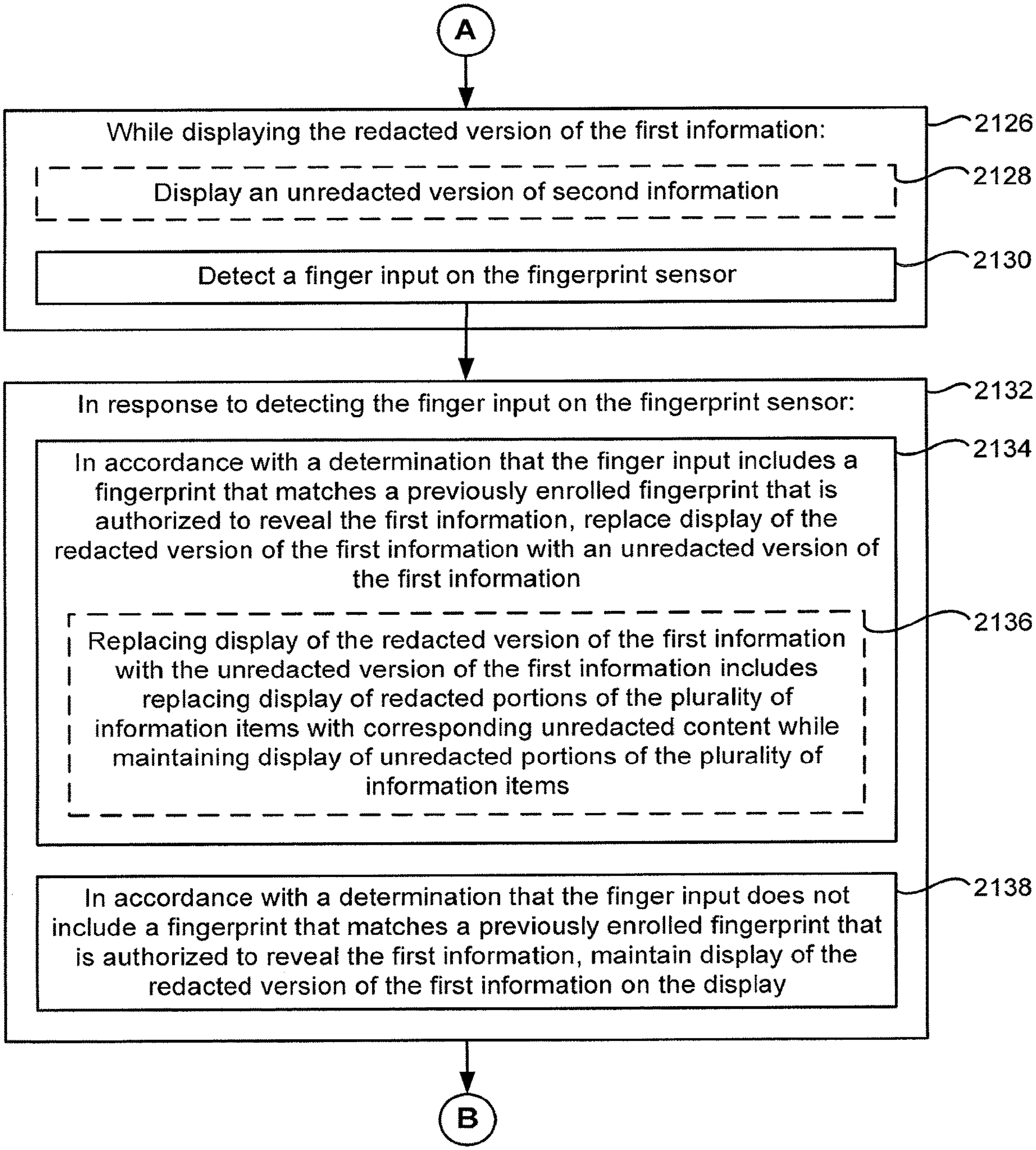
Figure 21C:
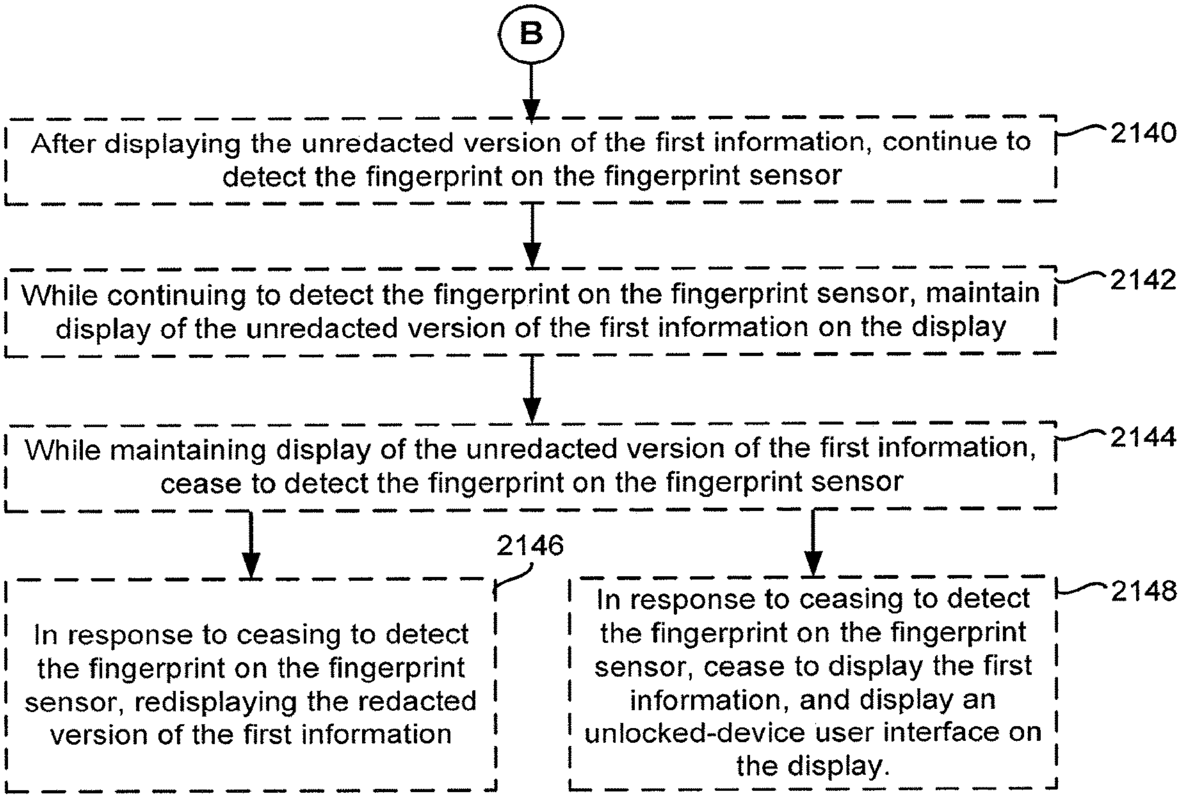

FIGS. 20R-20T illustrate alternative ways to redact a notification. In FIG. 20R, a snippet of content is replaced with redaction text string 2058 (e.g., <Message Content>) that indicates that the snippet of content of the email has been redacted. In FIG. 20S, a snippet of content of the email is obscured by placing black boxes 2060 over individual words to indicate that the snippet of content of the email has been redacted. In FIG. 20T, predefined redaction object 2062 has been placed over the snippet of content to indicate that the snippet of content of the email has been redacted. While the redaction shown in FIGS. 20A-20Q included blurring redacted text, any suitable method of rendering the redacted content unreadable, including those shown in FIGS. 20R-20T, could be used instead of or in addition to the blurring shown in FIGS. 20A-20Q.

FIGS. 21A-21C are flow diagrams illustrating a method 2100 of revealing redacted information in accordance with some embodiments. The method 2100 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 2100 are, optionally, combined and/or the order of some operations is, optionally, changed.

As described below, the method 2100 provides an intuitive way to reveal redacted information. The method reduces the cognitive burden on a user when revealing redacted information, thereby creating a more efficient human-machine interface. For battery-operated electronic devices, enabling a user to revealing redacted information faster and more efficiently conserves power and increases the time between battery charges.

In some embodiments, the device displays (2102) a locked-device user interface. In some embodiments, the device receives (2104) a request to display information (e.g., detecting the activation of a button that corresponds to a request to turn on a display of the device, or detecting a request to display a notification user interface as shown in FIGS. 20M-20P). In some embodiments, the device detects (2106) the occurrence of a predefined event (e.g., the device receives a new communication and generates a notification of the new communication as described above with reference to FIGS. 20A-20B).

The device displays (2108) a redacted version of first information on the display (e.g., notification 2002 in FIG. 20B, notifications 2012-2, 2012-3, 2012-4 in FIG. 20D, or notifications 2046-3, 2046-4, 2046-5, 2046-6, 2046-7, 2046-8 in FIG. 20P). In some embodiments, the redacted version of the first information is displayed in response to receiving the request to display information and/or in response to detecting the occurrence of the predefined event.

In some embodiments, the first redacted information includes (2110) a plurality of distinct information items (e.g., notifications 2012-2, 2012-3, 2012-4 in FIG. 20D, or notifications 2046-3, 2046-4, 2046-5, 2046-6, 2046-7, 2046-8 in FIG. 20P), and each information item in the plurality of information items includes a redacted portion and an unredacted portion (e.g., in FIG. 20D, the time and description of phone call notification 2012-2 are not redacted, while the name of the caller is redacted, and the subject, sender and time of email notifications 2012-3 and 2012-4 are not redacted while the content of the emails is redacted). In some embodiments, an information item is a set of related information (e.g., information related to a single event or communication). For example, an information item for an electronic message includes two or more of: a name of a sender, a subject line, a time at which the message was received, and content of the message. As another example, an information item for a calendar event includes two or more of a name of an event, a list of participants, a location, a time of the event, and a description of the event. As another example, an information item for a phone call includes two or more of a name of a caller, a phone number from which the phone call was received, and a time of the call.

In some embodiments, the first information includes (2112) a notification that includes identifying information (e.g., a sender of a message and a time) and content (e.g., a subject line and/or a snippet or portion of a body of a message), the identifying information is not redacted and the content is redacted (e.g., as shown with notification 2002 in FIG. 20B and notifications 2012-3 and 2014 in FIG. 20D). In some embodiments, the first information includes (2114) one or more notifications of communications received by the device (e.g., notifications of missed messages, emails, phone calls and the like). For example, in FIG. 20D, the first information includes phone call notification 2012-2 and email notifications 2012-3 and 2012-4. In some embodiments, the first information includes (2116) one or more notifications of social networking updates. (e.g., notifications of messages and events generated by users who are friends or are followed by a user of the device).

In some embodiments, the redacted version of the first information includes (2118) a copy of the first information that has been rendered unreadable (e.g., by blurring words as shown in FIGS. 20B, 20D and 20P, by blacking out words as shown in FIG. 20S, or by otherwise obscuring text). In some embodiments, the redacted version of the first information includes (2120) a predefined redaction object (e.g., a string that says <message content> as shown in FIG. 20R or <redacted content> or a predefined shape as shown in FIG. 20T) that is displayed in place of text in the first information.

In some embodiments, the redacted version of the first information is displayed (2122) on a locked-device user interface (e.g., a lock screen) of the device (e.g., as shown in FIGS. 20B and 20D). In some embodiments, the first information includes (2124) a plurality of distinct information items that are redacted (e.g., a plurality of notifications for different messages or events that occurred on the device). In some embodiments, information items in a plurality of information items in the first information each include a redacted portion (e.g., content) and an unredacted portion (e.g., an identifier). For example in FIG. 20D, notifications 2012-2, 2012-3, and 2012-4 each include a redacted portion and an unredacted portion and in FIG. 20P, notifications 2046-3, 2046-4, 2046-5, 2046-6, 2046-7, 2046-8 each include a redacted portion and an unredacted portion. In some embodiments, while displaying the redacted version of the first information, the device displays (2128) an unredacted version of second information (e.g., in FIG. 20D, notification 2012-1 is unredacted and in FIG. 20P, notifications 2046-1 and 2046-2 are unredacted). In some embodiments, the device displays a plurality of notifications including one or more redacted notifications and one or more unredacted notifications (e.g., notifications of email messages are redacted, while notifications from a game are not redacted). Providing a plurality of notifications that each include a redacted portion and an unredacted portion provides the user with the ability to quickly view at least some information about multiple different events or communications and determine whether or not it is necessary to view the unredacted versions of the notifications and/or unlock the device to display additional information that corresponds to the notifications. Thus, providing a plurality of notifications with both redacted and unredacted content maintains the ease of use of the device for the user while improving the security of private information (e.g., content of email messages, content of text messages, and/or the identity of callers).

While displaying the redacted version of the first information on the display, the device detects (2130) a finger input (e.g., finger contact 2008 in FIG. 20C, finger contact 2030 in FIG. 20H, or finger contact 2052 in FIG. 20Q) on the fingerprint sensor (e.g., fingerprint sensor 169 in FIGS. 20A-20T).

In response (2132) to detecting the finger input on the fingerprint sensor, in accordance with a determination that the finger input includes a fingerprint that matches a previously enrolled fingerprint that is authorized to reveal the first information, the device replaces (2134) display of the redacted version of the first information with an unredacted version of the first information (e.g., as shown in FIGS. 20B-20C, FIGS. 20D and 20H, and FIGS. 20P-20Q the device removes redaction from one or more notifications in response to detecting an enrolled fingerprint on fingerprint sensor 169).

In some embodiments, when the first redacted information includes a plurality of distinct information items; and each information item in the plurality of information items includes a redacted portion and an unredacted portion, replacing display of the redacted version of the first information with the unredacted version of the first information includes (2136) replacing display of redacted portions of the plurality of information items with corresponding unredacted content while maintaining display of unredacted portions of the plurality of information items. For example in FIG. 20D, notifications 2012-2, 2012-3, and 2012-4 each include a redacted portion and an unredacted portion and in FIG. 20H, after detecting finger contact 2030 on fingerprint sensor 169, the redacted portions of these notifications are replaced with unredacted portions while the previously unredacted portions continue to be displayed. Similarly, in FIG. 20P, notifications 2046-3, 2046-4, 2046-5, 2046-6, 2046-7, 2046-8 each include a redacted portion, and in FIG. 20Q, after detecting finger contact 2052 on fingerprint sensor 169, the redacted portions of these notifications are replaced with unredacted portions while the previously unredacted portions continue to be displayed.

In response to detecting the finger input on the fingerprint sensor, in accordance with a determination that the finger input does not include a fingerprint that matches a previously enrolled fingerprint that is authorized to reveal the first information, the device maintains (2138) display of the redacted version of the first information on the display. For example, if finger contact 2008 (FIG. 20C) did not include a fingerprint that matched a previously enrolled fingerprint, the device would continue to display the user interface shown in FIG. 20B (rather than the user interface shown in FIG. 20C) or display a fingerprint match error user interface indicating to the user that a non-matching fingerprint was detected. As another example, if finger contact 2030 (FIG. 20H) did not include a fingerprint that matched a previously enrolled fingerprint, the device would continue to display the user interface shown in FIG. 20D (rather than the user interface shown in FIG. 20H) or display a fingerprint match error user interface indicating to the user that a non-matching fingerprint was detected. As another example, if finger contact 2052 (FIG. 20Q) did not include a fingerprint that matched a previously enrolled fingerprint, the device would continue to display the user interface shown in FIG. 20P (rather than the user interface shown in FIG. 20Q) or display a fingerprint match error user interface indicating to the user that a non-matching fingerprint was detected. Maintaining display of the redacted version of information when non-enrolled fingerprint is detected on the fingerprint sensor prevents unauthorized users from viewing private information that is redacted.

In some embodiments, after displaying the unredacted version of the first information, the device continues (2140) to detect the fingerprint on the fingerprint sensor. In some embodiments, while continuing to detect the fingerprint on the fingerprint sensor, the device maintains (2142) display of the unredacted version of the first information on the display. In some embodiments, while maintaining display of the unredacted version of the first information, the device ceases (2144) to detect the fingerprint on the fingerprint sensor (e.g., detecting liftoff of the fingerprint from the fingerprint sensor). In some embodiments, in response to ceasing to detect the fingerprint on the fingerprint sensor, the device redisplays (2146) the redacted version of the first information. For example, in FIG. 20C, if the device detected liftoff of contact 2008, the device would redisplay the user interface shown in FIG. 20B. As another example, in FIG. 20H, if the device detected liftoff of contact 2030, the device would redisplay the user interface shown in FIG. 20D. As another example, in FIG. 20Q, if the device detected liftoff of contact 2052, the device would redisplay the user interface shown in FIG. 20P.

In some embodiments, prior to detecting the first input, the device displays (2102) a locked-device user interface on the display (e.g., a user interface that corresponds to a locked mode of operation of the device as shown in FIG. 20D). In some embodiments, after displaying the unredacted version of the first information, the device continues (2140) to detect the fingerprint on the fingerprint sensor (e.g., as shown in FIG. 20H). In some embodiments, while continuing to detect the fingerprint on the fingerprint sensor, the device maintains (2142) display of the unredacted version of the first information on the display (e.g., as shown in FIG. 20H). In some embodiments, while maintaining display of the unredacted version of the first information, the device ceases (2144) to detect the fingerprint on the fingerprint sensor (e.g., detecting liftoff of the fingerprint from the fingerprint sensor as shown in FIG. 20I). In some embodiments, in response to ceasing to detect the fingerprint on the fingerprint sensor, the device ceases (2148) to display the first information; and displays an unlocked-device user interface on the display (e.g., displaying a user interface that corresponds to an unlocked mode of operation of the device such as the application launch user interface shown in FIG. 20I or a user interface for a last-used application such as the mail application user interface shown in FIG. 20L). Thus, in some embodiments, in response to detecting a finger-down portion of the first input, the device reveals redacted content (e.g., by replacing a redacted version of the content with an unredacted version of the content) and in response to detecting a finger-up portion of the first input, the device displays an unlocked-device user interface. Revealing redacted information in response to detecting a finger-down portion of a finger input and displaying an unlocked-device user interface in response to a finger-up portion of the finger input provides the user with a quick way to view the redacted content and then transition to the unlocked-device user interface.

In some embodiments, the unlocked-device user interface is displayed in response to detecting liftoff of the finger contact if the time between the finger-down portion of the finger input (e.g., the time at which the finger was detected on the fingerprint sensor) and the finger-up portion of the finger input (e.g., the time at which the finger ceased to be detected on the fingerprint sensor) is greater than a first time threshold (e.g., 0.05, 0.1, 0.2, 0.5, 1 second, or some other reasonable time threshold); and the locked-device user interface continues to be displayed in response to detecting liftoff of the finger contact if the time between the finger-down portion of the finger input and the finger-up portion of the finger input is less than the first time threshold (e.g., the user can cancel the device unlock operation by removing the finger contact on the fingerprint sensor before the first time threshold amount of time has elapsed).

In some embodiments, the unlocked-device user interface is displayed in response to detecting liftoff of the finger contact if the time between the finger-down portion of the finger input (e.g., the time at which the finger was detected on the fingerprint sensor) and the finger-up portion of the finger input (e.g., the time at which the finger ceased to be detected on the fingerprint sensor) is less than a second time threshold (e.g., 0.05, 0.1, 0.2, 0.5, 1 second, or some other reasonable time threshold); and the locked-device user interface continues to be displayed in response to detecting liftoff of the finger contact if the time between the finger-down portion of the finger input and the finger-up portion of the finger input is greater than the second time threshold (e.g., the user can cancel the device unlock operation by maintaining the finger contact on the fingerprint sensor for more than the second time threshold amount of time).

In some embodiments, prior to displaying the redacted version of the first information, the device receives (2104) a request to display the first information. For example, the device detects a swipe gesture in a first direction (e.g., downward) starting at or near a first (e.g., top) edge of the display (e.g., as shown in FIGS. 20M-20O, where contact 2040 is detected near a top edge of touch screen 112 and moves 2042 downward) or detects a predefined input (e.g., activation of a button of the device that corresponds to a request to wake the device from a low power mode, a request to turn the display of the device on, and/or a request to display a locked-device user interface). In some embodiments, in response to receiving the request to display the first information, the device displays (2108) the redacted version of the first information on the display. For example, in FIG. 20P, the device displays notification user interface 2044 with a plurality of notifications 2046-3, 2046-4, 2046-5, 2046-6, 2046-7, 2046-8 that each include a redacted portion in response to detecting the swipe gesture in the first direction. In some embodiments, after displaying the first information, the device detects a swipe gesture (e.g., movement 2050 of contact 2048 in FIG. 20P or movement 2056 of contact 2054 in FIG. 20Q) in a second direction (e.g., upward) that is different from the first direction and starts at or near a different (e.g., bottom) edge of the display. In response to detecting the swipe gesture in the second direction, the device ceases to display the redacted version of the first information on the display. In some embodiments, whether or not the first information (e.g., the notifications in notification user interface 2044) is redacted depends on whether the device is in a locked mode of operation or an unlocked mode of operation (e.g., in response to detecting a request to display the first information while the device is a locked mode of operation), the device displays a redacted version of the first information such as the redacted notifications 2046-3, 2046-4, 2046-5, 2046-6, 2046-7, 2046-8 shown in FIG. 20P, whereas in response to detecting a request to display the first information while the device is in an unlocked mode of operation, the device displays an unredacted version of the first information such as the unredacted notifications 2046-3, 2046-4, 2046-5, 2046-6, 2046-7, 2046-8 shown in FIG. 20Q).

In some embodiments, prior to displaying the redacted version of the first information, the device detects (2106) the occurrence of a predefined event and in response to detecting the occurrence of the predefined event, the device displays (2108) the redacted version of the first information on the display (e.g., in response to receiving a communication such as an email or a phone call, detecting that a reminder time for a calendar appointment has been reached, or receiving a notification from a third party application, the device displays a pop-up notification that corresponds to the event). For example, in FIG. 20B, the device receives an email from Johnny Appleseed, generates a notification including information from the email and displays a redacted version of notification 2002 on touch screen 112. In some embodiments, whether or not the first information is redacted depends on whether the device is in a locked mode of operation or an unlocked mode of operation (e.g., in response to detecting the occurrence of the predefined event while the device is a locked mode of operation, the device displays a redacted version of the first information as shown in FIG. 20B and in response to detecting the occurrence of the predefined event while the device is in an unlocked mode of operation, the device displays an unredacted version of the first information). In some embodiments, the redacted version of the first information is displayed in a predefined location on the display (e.g., in a center of the display) when it is first received and is later displayed in a list of notifications with one or more other notifications (e.g., one or more unredacted notifications and/or one or more redacted notifications). For example, in FIG. 20B a notification 2002 for an email from Johnny Appleseed is initially displayed in a center of touch screen 112 in FIG. 20B after it is received and notification 2012-4 for the same email from Johnny Appleseed is later displayed in FIG. 20D in a list of other notifications generated by the device (e.g., notifications that correspond to communications received or events that occurred since the last time the device was unlocked) on touch screen 112.

It should be understood that the particular order in which the operations in FIGS. 21A-21C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the "Description of Embodiments" section above) are also applicable in an analogous manner to method 2100 described above with respect to FIGS. 21A-21C. For example, the fingerprints, contacts, gestures, redaction, and animations described above with reference to method 2100 optionally have one or more of the characteristics of the fingerprints, contacts, gestures, redaction, and animations described herein with reference to other methods described herein (e.g., those listed in the "Description of Embodiments" section above). For brevity, these details are not repeated here.

Figure 22:
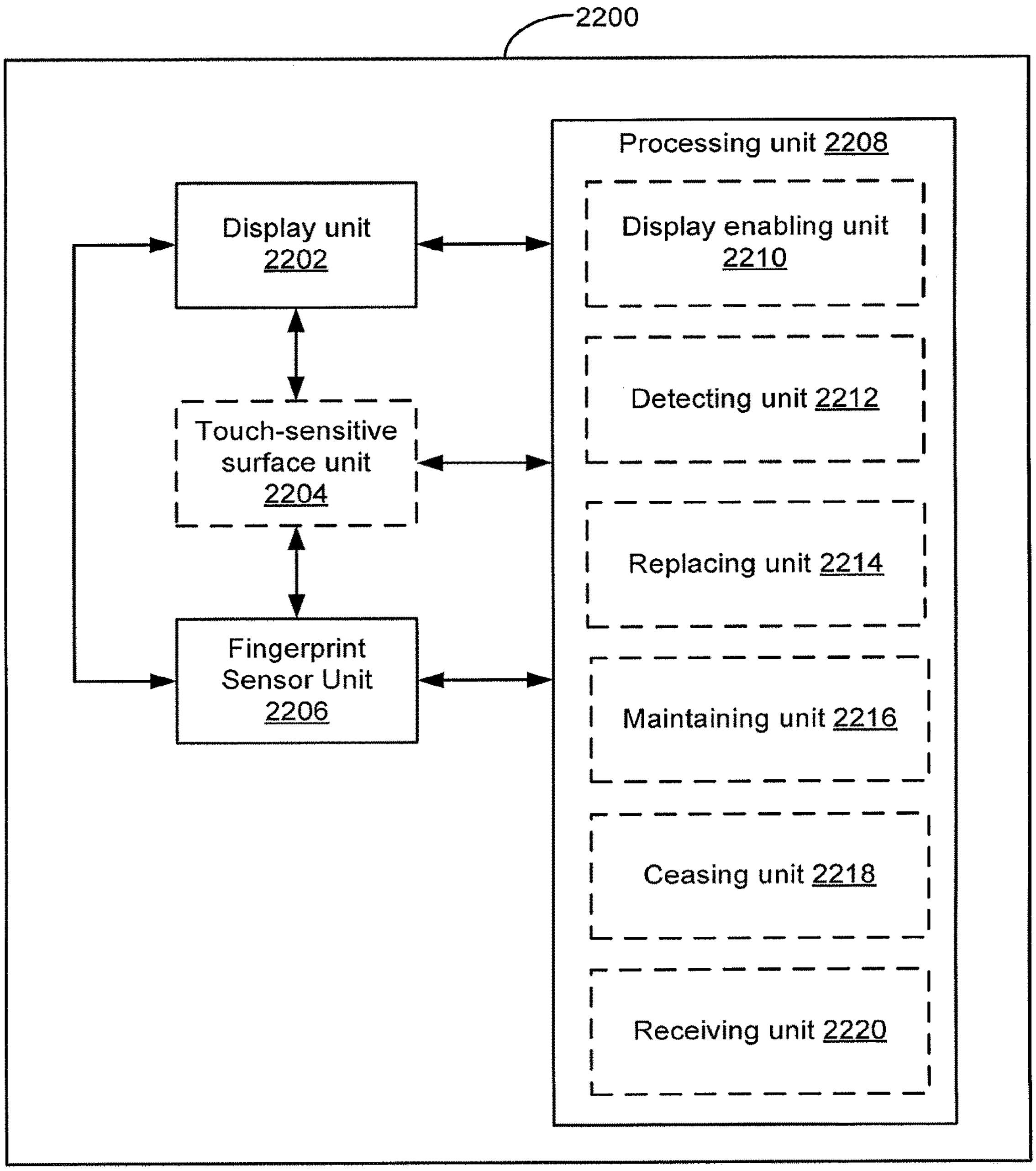
FIG. 22 is a functional block diagram of an electronic device in accordance with some embodiments.

In accordance with some embodiments, FIG. 22 shows a functional block diagram of an electronic device 2200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 22 are, optionally, combined or separated into sub-blocks to implement the principles of the various described embodiments. Therefore, the description herein optionally supports any possible combination or separation or further definition of the functional blocks described herein.

As shown in FIG. 22, an electronic device 2200 includes a display unit 2202 configured to display a redacted version of first information, optionally a touch-sensitive surface unit 2204, a fingerprint sensor unit 2206, and a processing unit 2208 coupled to the display unit 2202, optionally the touch-sensitive surface unit 2204, and the fingerprint sensor unit 2206. In some embodiments, the processing unit 2208 includes a display enabling unit 2210, a detecting unit 2212, a replacing unit 2214, a maintaining unit 2216, a ceasing unit 2218, and a receiving unit 2220.

The processing unit 2208 is configured to, while enabling display (e.g., with the display enabling unit 2210) of the redacted version of the first information on the display unit 2202, detect (e.g., with the detecting unit 2212) a finger input on the fingerprint sensor. The processing unit 2208 is configured to, in response to detecting the finger input on the fingerprint sensor: in accordance with a determination that the finger input includes a fingerprint that matches a previously enrolled fingerprint that is authorized to reveal the first information, replace display (e.g., with replacing unit 2214) of the redacted version of the first information with an unredacted version of the first information; and in accordance with a determination that the finger input does not include a fingerprint that matches a previously enrolled fingerprint that is authorized to reveal the first information, maintain display (e.g., with maintaining unit 2216) of the redacted version of the first information on the display unit 2202.

In some embodiments, the first redacted information includes a plurality of distinct information items and each information item in the plurality of information items includes a redacted portion and an unredacted portion.

In some embodiments, replacing display of the redacted version of the first information with the unredacted version of the first information includes replacing display of the redacted portions of the plurality of information items with corresponding unredacted content while maintaining display of the unredacted portions of the plurality of information items.

In some embodiments, the first information includes a notification that includes identifying information and content, the identifying information is not redacted, and the content is redacted.

In some embodiments, the first information includes one or more notifications of communications received by the device.

In some embodiments, the first information includes one or more notifications of social networking updates.

In some embodiments, the redacted version of the first information includes a copy of the first information that has been rendered unreadable.

In some embodiments, the redacted version of the first information includes a predefined redaction object that is displayed in place of text in the first information.

In some embodiments, the redacted version of the first information is displayed on a locked-device user interface of the device.

In some embodiments, the first information includes a plurality of distinct information items that are redacted.

In some embodiments, the processing unit 2208 is configured to, while enabling display of the redacted version of the first information, enable display (e.g., with the display enabling unit 2210) of an unredacted version of second information.

In some embodiments, the processing unit 2208 is configured to: after enabling display of the unredacted version of the first information, continue to detect (e.g., with the detecting unit 2212) the fingerprint on the fingerprint sensor; while continuing to detect the fingerprint on the fingerprint sensor, maintain display (e.g., with the maintaining unit 2216) of the unredacted version of the first information on the display unit 2202; while maintaining display of the unredacted version of the first information, cease to detect (e.g., with the detecting unit 2212) the fingerprint on the fingerprint sensor; and in response to ceasing to detect the fingerprint on the fingerprint sensor, enable redisplay (e.g., with the display enabling unit 2210) of the redacted version of the first information.

In some embodiments, the processing unit 2208 is configured to: prior to detecting the first input, enable display (e.g., with the display enabling unit 2210) of a locked-device user interface on the display unit 2202; after displaying the unredacted version of the first information, continue to detect (e.g., with the detecting unit 2212) the fingerprint on the fingerprint sensor; while continuing to detect the fingerprint on the fingerprint sensor, maintain display (e.g., with the maintaining unit 2216) of the unredacted version of the first information on the display unit 2202; while maintaining display of the unredacted version of the first information, cease to detect (e.g., with the detecting unit 2212) the fingerprint on the fingerprint sensor; and in response to ceasing to detect the fingerprint on the fingerprint sensor: cease to display (e.g., with the ceasing unit 2218) the first information; and enable display (e.g., with the display enabling unit 2210) of an unlocked-device user interface on the display unit 2202.

In some embodiments, the processing unit 2208 is configured to: prior to displaying the redacted version of the first information, receive (e.g., with the receiving unit 2220) a request to display the first information; and in response to receiving the request to display the first information, enable display (e.g., with the display enabling unit 2210) of the redacted version of the first information on the display unit 2202.

In some embodiments, the processing unit 2208 is configured to: prior to displaying the redacted version of the first information, detect (e.g., with the detecting unit 2212) the occurrence of a predefined event; and in response to detecting the occurrence of the predefined event, enable display (e.g., with the display enabling unit 2210) of the redacted version of the first information on the display unit 2202.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 21A-21C are, optionally, implemented by components depicted in FIGS. 1A-1B or FIG. 22. For example, display operations 2102 and 2108, receiving operation 2104, detecting operations 2106 and 2130, replacing operation 2134 and maintaining operation 2138 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Different Unlock Modes

Many electronic devices have a locked mode, where the locked mode has a different set of enabled features than the unlocked mode on the corresponding device. Because many users wish to keep the contents of their electronic devices private, a locked mode allows for a level of security against unauthorized access to an electronic device. A user may wish to have more than one way to unlock an electronic device while it is in a locked state. The device described below improves on existing methods by providing different unlock modes to unlock a device while it is in a locked mode of operation, including one or more unlock modes associated with a fingerprint sensor.

While the device is in a locked mode of operation in which access to a respective set of features of the electronic device is locked, the device detects, with the fingerprint sensor, a first input that corresponds to a request to initiate unlocking the device. In response to detecting the first input with the fingerprint sensor the device determines whether the first input meets one of unlock criteria, first unlock-failure criteria, or second unlock-failure criteria. In accordance with a determination that the first input meets the unlock criteria, the device transitions the device from the locked mode to an unlocked mode in which the respective set of features of the electronic device is unlocked. In accordance with a determination that the first input meets the first unlock-failure criteria, the device maintains the device in the locked mode and adjusts unlock settings so that the device is enabled to be unlocked via an unlock operation in a first set of one or more unlock operations. Finally, in accordance with a determination that the first input meets the second unlock-failure criteria, the device maintains the device in the locked mode and adjusts unlock settings so that the device is enabled to be unlocked via an unlock operation in a second set of one or more unlock operations that is different from the first set of unlock operations.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 23A-23FF and 24A-24D includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 23A-23FF and 24A-24D will be discussed with reference to a device with a touch screen 112 and a separate fingerprint sensor 359-2, however analogous operations are, optionally, performed on a device with an integrated fingerprint sensor 359-1 in response to detecting the inputs described in FIGS. 23A-23FF on the integrated fingerprint sensor 359-1 while displaying the user interfaces shown in FIGS. 23A-23FF on the display 450. Additionally, analogous operations are, optionally, performed on a device with a display 450 and a separate touch-sensitive surface 451 instead of a touch screen 112 in response to detecting the contacts described in FIGS. 23A-23FF on a fingerprint sensor 169 (e.g., an integrated fingerprint sensor 359-1 or a separate fingerprint sensor 359-2) and/or the separate touch-sensitive surface 451 while displaying the user interfaces shown in FIGS. 23A-23FF on the display 450; in such embodiments, the contacts shown in FIGS. 23A-23FF optionally represent both a focus selector that corresponds to a location on the display 450, and a contact that corresponds to a location of a contact or gesture performed on the separate touch-sensitive surface (e.g., touch-sensitive surface 451), where the focus selector is, optionally: a respective contact, a representative point corresponding to a contact (e.g., a centroid of a respective contact or a point associated with a respective contact), or a centroid of two or more contacts detected on the touch screen 112 and is, optionally, replaced with a displayed cursor.

FIGS. 23A-23FF illustrate a portable multifunction device 100 providing different unlock modes, and responding to various successful and unsuccessful unlock operations. While in a locked mode, portable multifunction device 100 provides different operations associated with unlock modes, represented by various user interfaces in FIGS. 23A-23FF.

Figure 23A:
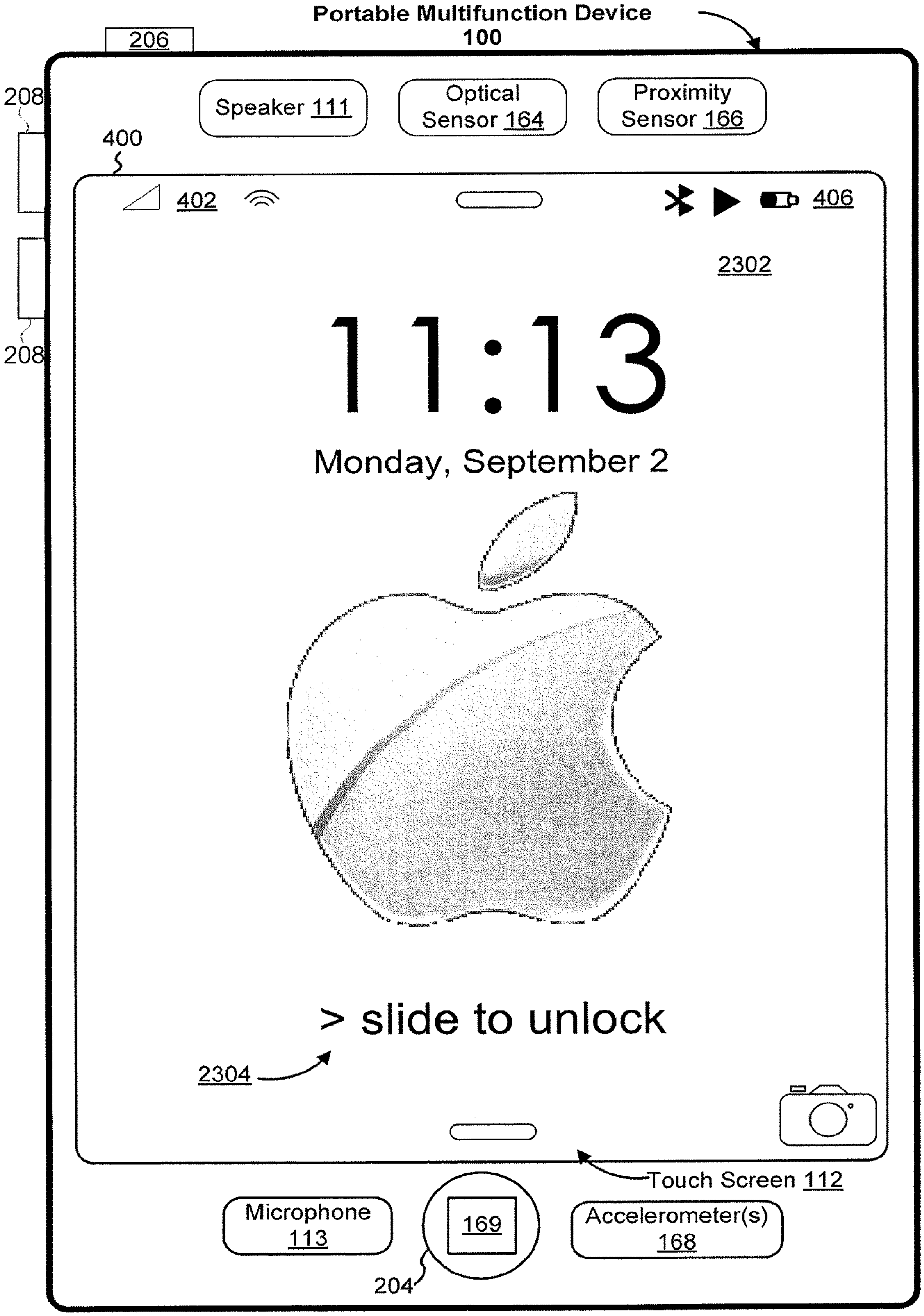
FIGS. 23A-23FF illustrate exemplary user interfaces for providing different unlock modes in accordance with some embodiments.
Figure 23B:
Figure 23C:
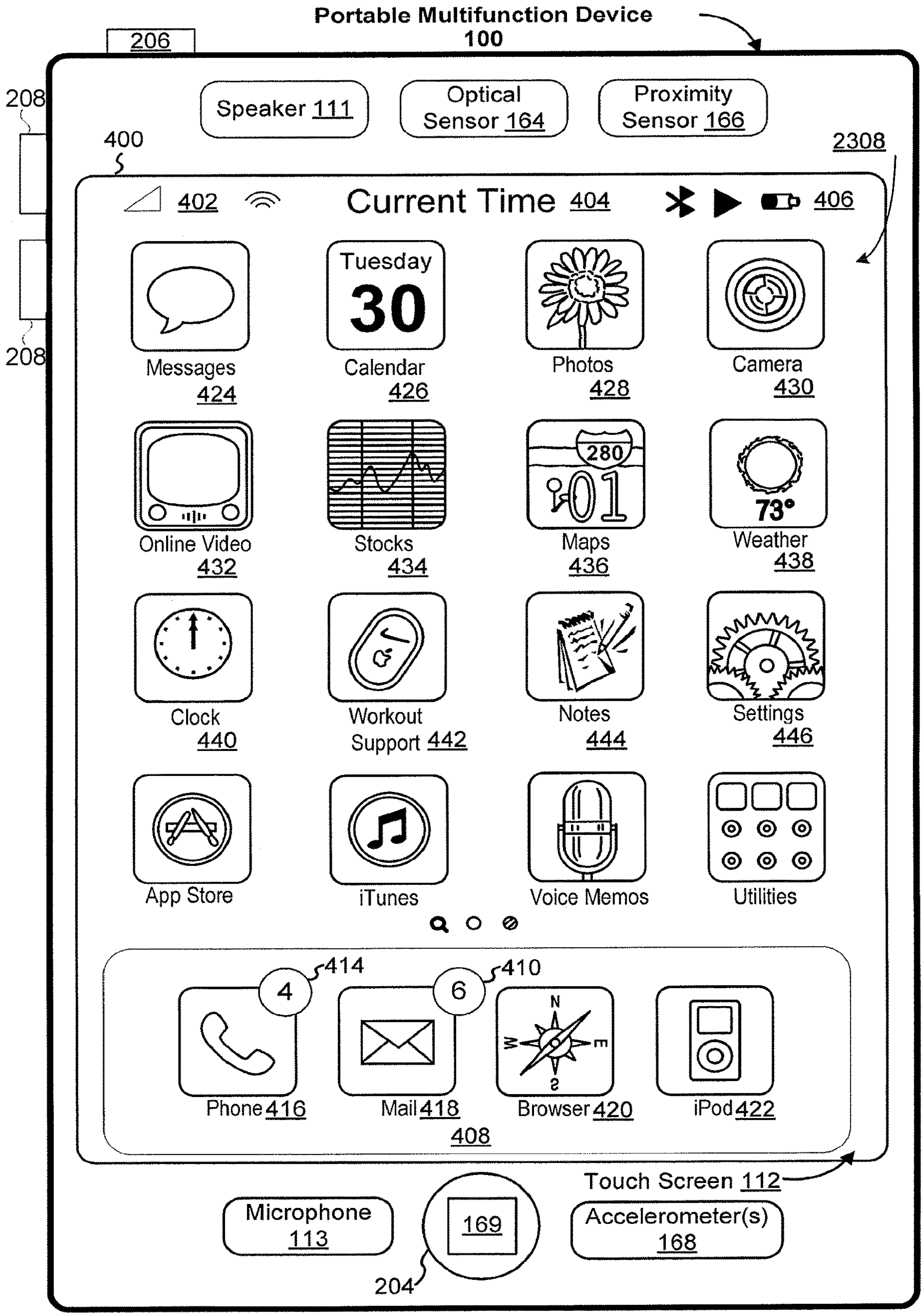

FIGS. 23A-23C illustrate a portable multifunction device 100 being successfully unlocked. FIG. 23A illustrates an exemplary unlock-initiation user interface 2302 displayed on touch screen 112 of a device (e.g. device 100). In some embodiments, unlock-initiation user interface 2302 is a user interface of an operating system running on device 100. In some embodiments unlock-initiation user interface 2302 is displayed by device 100 in response to device 100 detecting a user input, such as a click of menu button 204. This exemplary unlock-initiation user interface 2302 displays a first visual cue 2304 for one unlock mode. In some embodiments, unlock-initiation user interface 2302 displays more than one visual cue, where each visual cue corresponds to a different unlock mode. In some embodiments, device 100 is capable of providing more than one unlock mode, even when only one visual cue for one unlock mode is displayed, as in unlock-initiation user interface 2302. In some embodiments, first visual cue 2304 is textual, graphical or any combination thereof. In FIG. 23A, first visual cue 2304 is displayed to instruct the user to make a sliding gesture on touch screen 112 from left to right, to unlock device 100.

FIG. 23B illustrates a fingerprint 2306-1 being detected by fingerprint sensor 169. In this example, detected fingerprint 2306-1 matches an enrolled fingerprint of device 100. In some embodiments in which device 100 has more than one fingerprint sensor 169, fingerprint 2306-1 is detected by any one of the device's fingerprint sensors.

FIG. 23C illustrates an unlocked-mode user interface 2308. In some embodiments, the unlocked-mode user interface 2308 is displayed by device 100 in response to detecting a user input that meets one or more unlock criteria, while the device 100 is in a locked mode. In some embodiments, unlocked-mode user interface 2308 is displayed in response to the device 100 detecting a fingerprint 2306-1 that matches an enrolled fingerprint of device 100, as in FIG. 23B. In some embodiments, device 100 does not have security measures enabled to lock the phone, or disables one or more security measures to lock the phone for a predetermined amount of time after a successful attempt to unlock the phone. In such embodiments, unlocked-mode user interface 2308 is displayed by the device 100 without a user input fulfilling one or more unlock criteria.

Figure 23D:

FIGS. 23D-23K illustrate device 100 being unsuccessfully unlocked by repeated attempts. FIG. 23D illustrates the same unlock-initiation user interface 2302 and first visual cue 2304, as shown in FIG. 23B. In exemplary FIG. 23D however, fingerprint 2310-1, detected by fingerprint sensor 169, does not match any enrolled fingerprint of device 100.

Throughout this document, the term "any enrolled fingerprint of device 100" means any enrolled fingerprint of device 100 that can be used to unlock device 100. In some implementations, all enrolled fingerprints of device 100 can be used to unlock device 100. However, in some other implementations, or in some circumstances, one of more of the enrolled fingerprints of device 100 are configured so that they cannot be used to unlock device 100. For ease of discussion, such enrolled fingerprints are said to be "fingerprints not authorized to unlock device 100," while the enrolled fingerprints that can be used to unlock device are said to be "fingerprints authorized to unlock device 100."

Figure 23E:

FIG. 23E illustrates an exemplary response by device 100 to detection of fingerprint 2310-1, which does not match any enrolled fingerprint of device 100. In FIG. 23E, first visual cue 2304 is displayed as shaking from side to side for a predetermined amount of time, for a predetermined number of times and/or at a predetermined speed. In some embodiments, device 100 uses another technique to alert the user that the detected fingerprint is not recognized to be an enrolled fingerprint, such as playing an audio message, displaying a different visual cue, or any combination of audio and visual feedback.

Figure 23F:

FIG. 23F illustrates an exemplary response by device 100 to detection of one or more fingerprints 2310-1 that do not match any enrolled fingerprint of device 100. FIG. 23F illustrates the device displaying a second visual cue 2312 on unlock-initiation user interface 2302, instructing the user, in this example, to try to unlock the device by a fingerprint detection again, and an arrow pointing to the right to indicate that the user can alternatively make a sliding gesture on touch screen 112 from left to right, to unlock device 100. In some embodiments, second visual cue 2312 is the same as first visual cue 2304. In some embodiments, device 100 maintains a counter of failed attempts to unlock the device by a particular type of unlock-operation or by any type of unlock operation. In some embodiments, second visual cue 2312 indicates how many times the device 100 has detected failed attempts by passcode entry, failed attempts by fingerprint sensing, or failed attempts by any type of unlock-operation. In some embodiments, second visual cue 2312 indicates how many attempts to unlock the device by a particular means or by any means are permissible before the device precludes any more attempts for an undefined or predefined length of time. In some embodiments, second visual cue 2312 indicates information associated with the last failed attempt to unlock device 100, such as a time stamp.

Figure 23G:
Figure 23H:
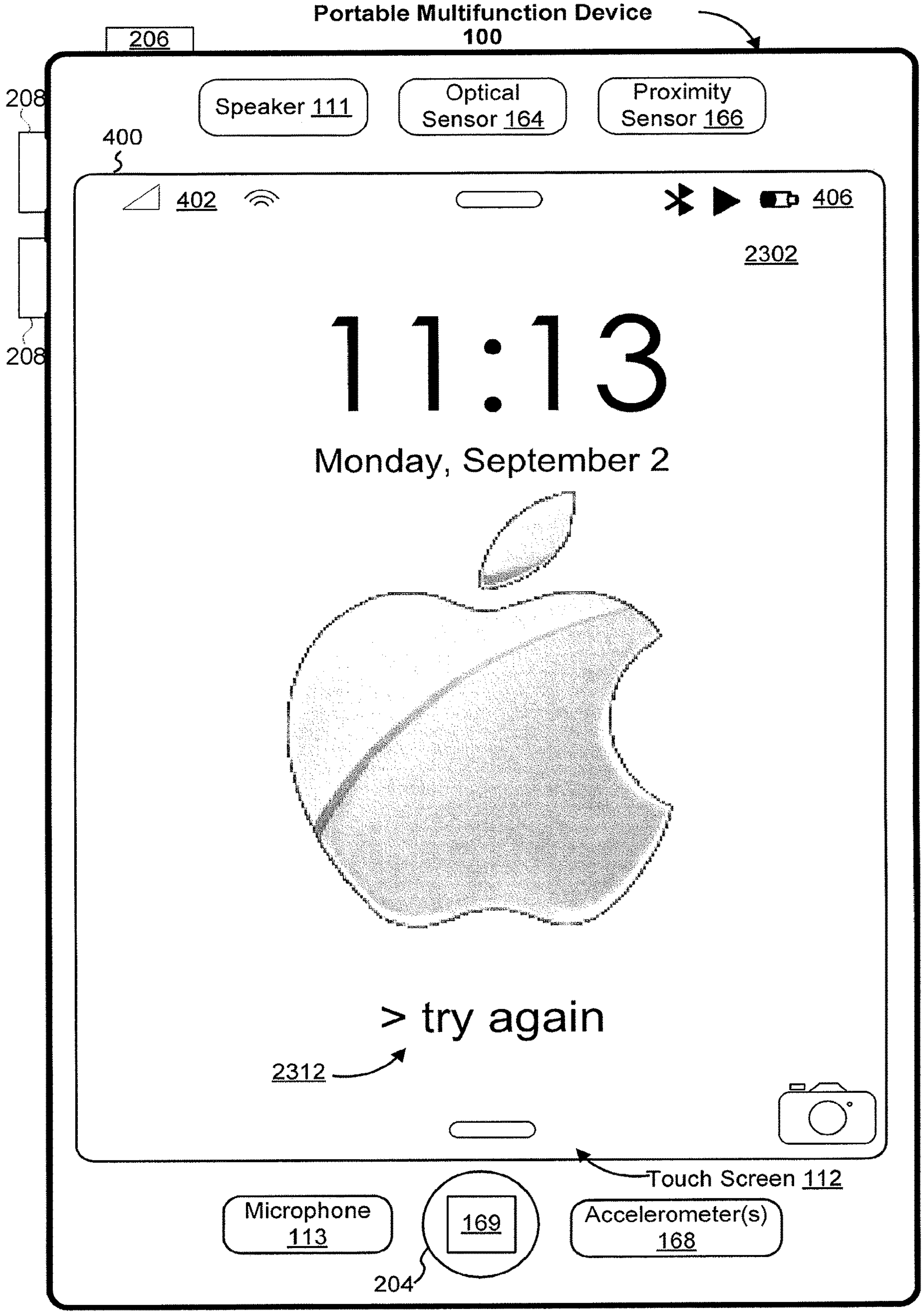

FIGS. 23G-23H illustrate an exemplary response by device 100 to detection of a fingerprint 2310-2 that does not match any enrolled fingerprint of device 100, after displaying second visual cue 2312. In FIG. 23G, second visual cue 2312 is displayed as shaking (or, equivalently, as being shaken) from side to side for a predetermined amount of time, for a predetermined number of times and/or at a predetermined speed. In some embodiments, device 100 uses another technique to alert the user that the detected fingerprint is not recognized as an enrolled fingerprint, such as playing an audio message, displaying a different visual cue, or any combination of audio and visual feedback. In some embodiments, device 100 displays another visual cue distinct from the first visual cue 2304 and second visual cue 2312, in response to detecting two or more failed attempts to unlock device 100 by fingerprint detection. In some embodiments, after displaying second visual cue 2312 as shaking, the device displays unlock-initiation user interface 2302 with second visual cue 2312 as stationary, as shown in FIG. 23H.

Figure 23I:

FIG. 23I illustrates a third attempt to unlock device 100, when fingerprint 2310-3 is detected by device, in the sequence of unlock attempts shown in FIGS. 23D to 23J. In this example, fingerprint 2310-3 does not match any enrolled fingerprint of device 100.

Figure 23J:
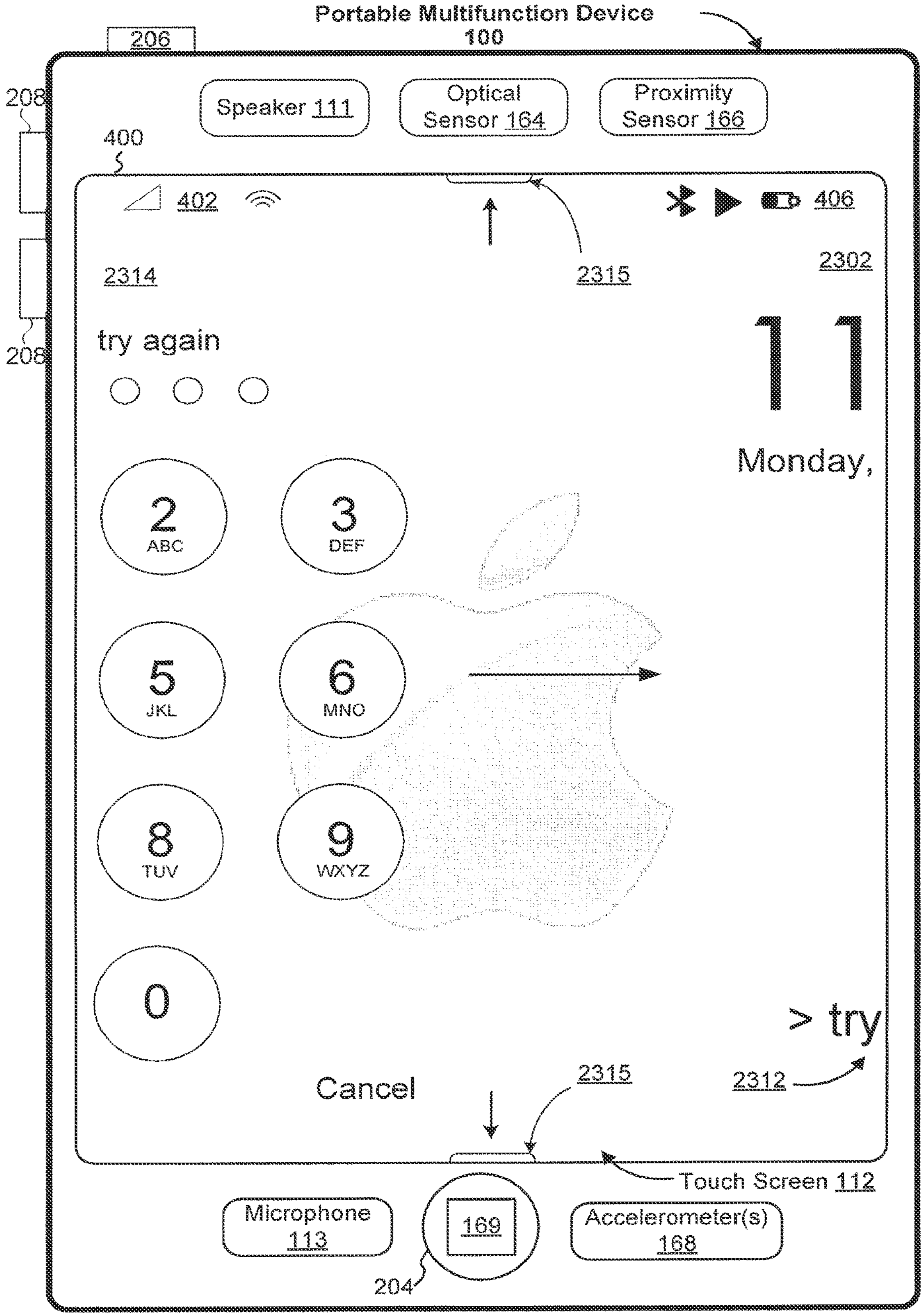
Figure 23K:
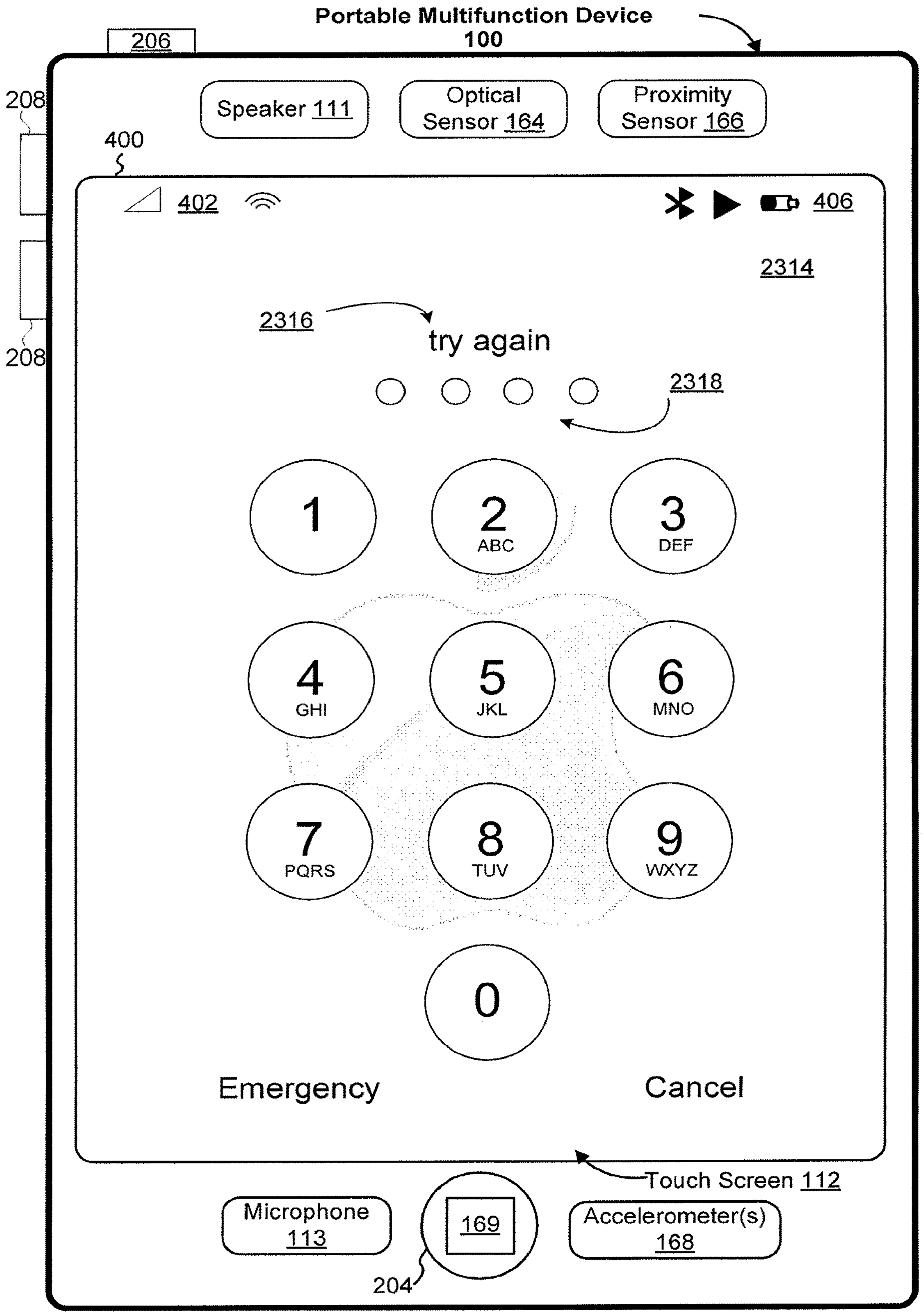

FIGS. 23J-23K illustrate an exemplary response by device 100 to detection of a first predefined number of unsuccessful attempts to unlock device 100. In some embodiments, the first predefined number of unsuccessful attempts (e.g., three attempts) corresponds solely to unsuccessful attempts to unlock the device with unrecognized fingerprints. For example, FIGS. 23J-23K illustrate the response of device 100 to detection of a third attempt to unlock device 100 with an unrecognized fingerprint 2310-3, shown in FIG. 23I. FIG. 23J shows a transitional display on touch screen 112, where device 100 is switching from displaying unlock-initiation user interface 2302 to displaying passcode entry user interface 2314, shown in FIG. 23K. In some embodiments, device 100 transitions from unlock-initiation user interface 2302 to passcode entry user interface 2314 through a lateral sliding motion, as shown in FIGS. 23J and 23K. In some embodiments, while device 100 transitions from unlock-initiation user interface 2302 to passcode entry user interface 2314, other user interface objects that were displayed on unlock-initiation user interface 2302 such as overlay icons 2315 and second visual cue 2312 or first visual cue 2304 are also gradually removed from display on touch screen 112. FIG. 23K illustrates an exemplary passcode entry user interface 2314 that device 100 transitions to in response to detecting a first predefined number of unsuccessful attempts to unlock device 100. In some embodiments, passcode entry user interface 2314 comprises a third visual cue 2316 and a progress indicator 2318. In FIG. 23K, exemplary third visual cue 2316 comprises the same text as exemplary second visual cue 2312, however, in some embodiments, third visual cue 2316 comprises text distinct from text in any other visual cues. In some embodiments, third visual cue 2316 is textual, graphical or any combination thereof.

Figure 23L:
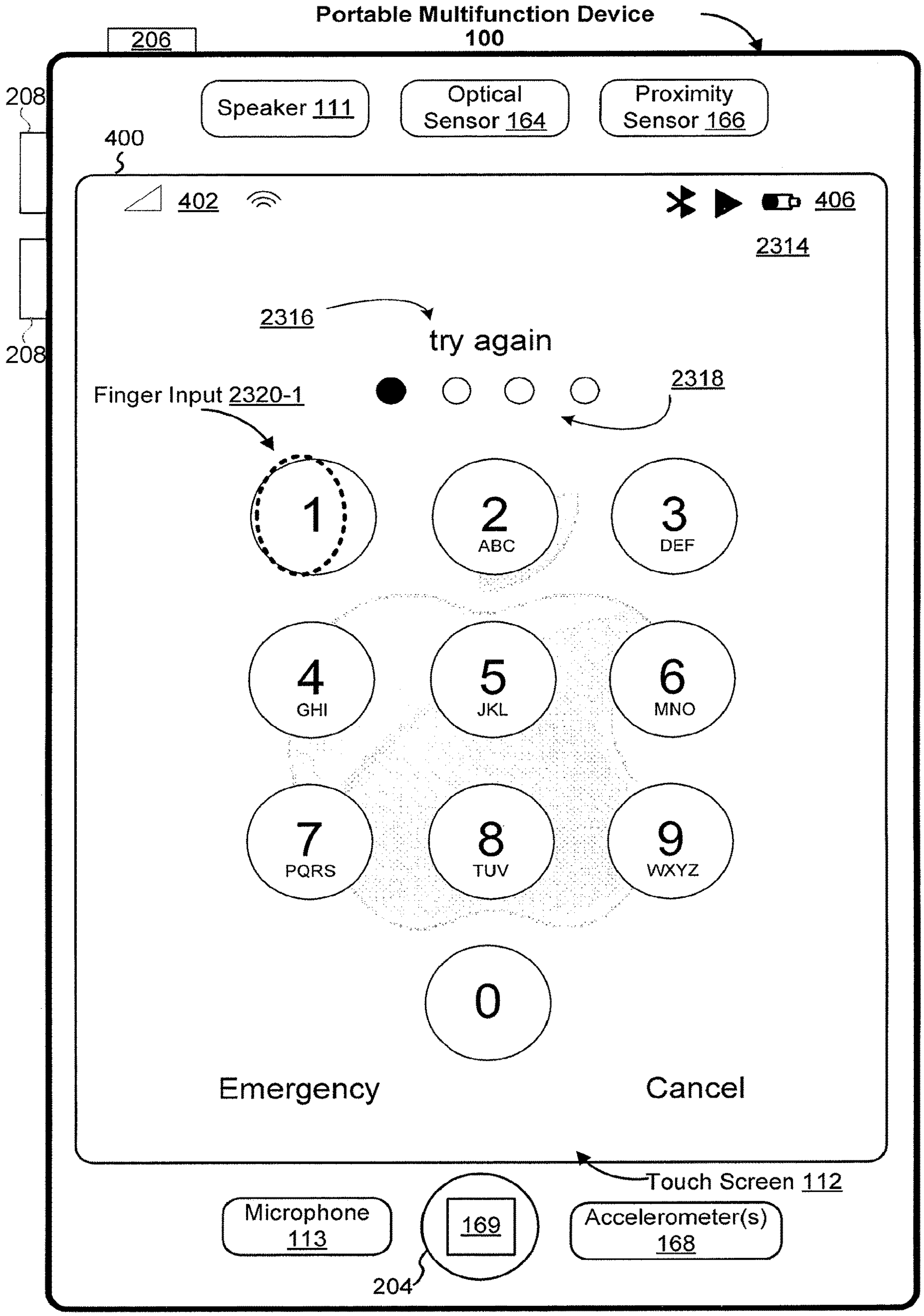
Figure 23M:
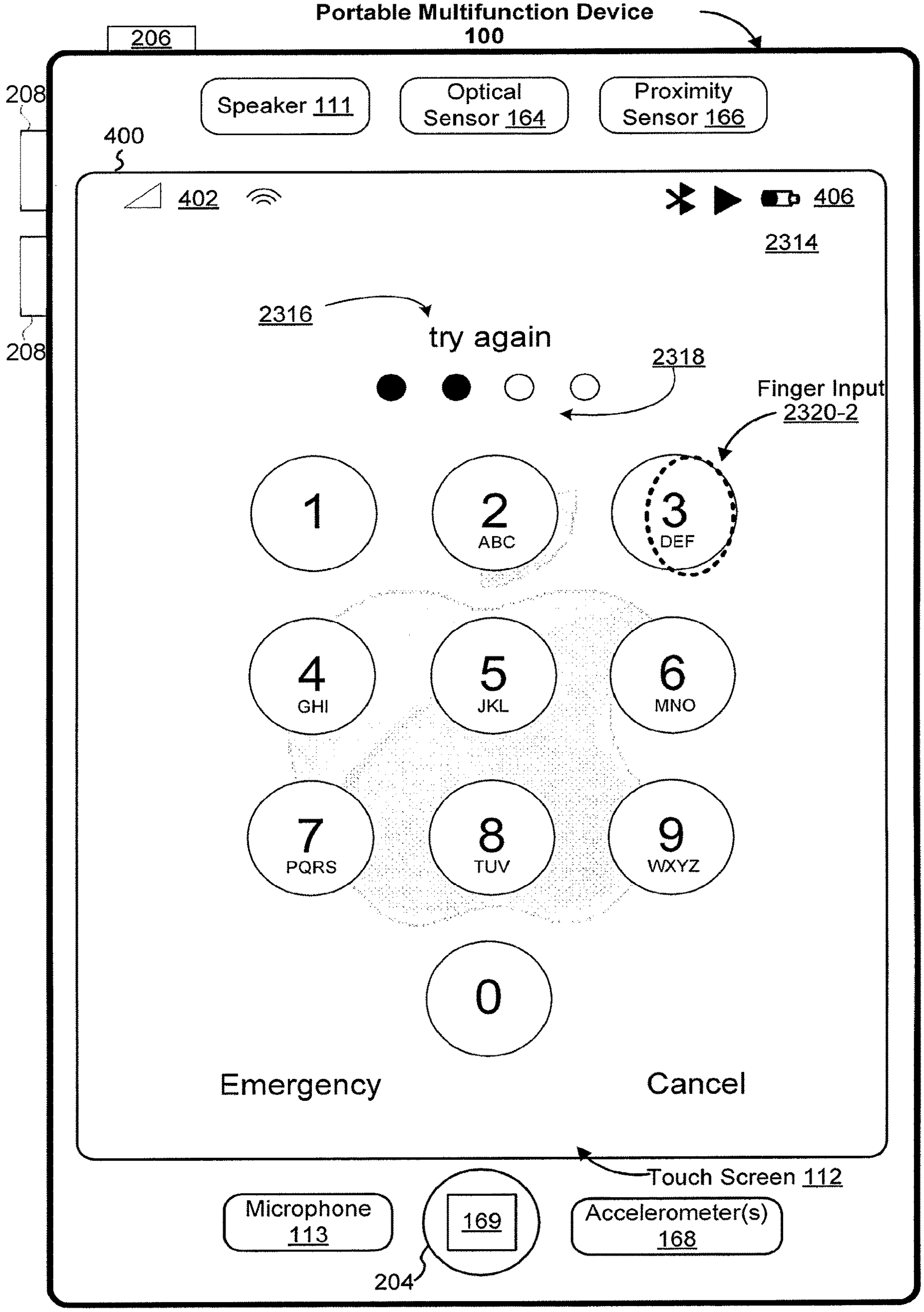
Figure 23N:
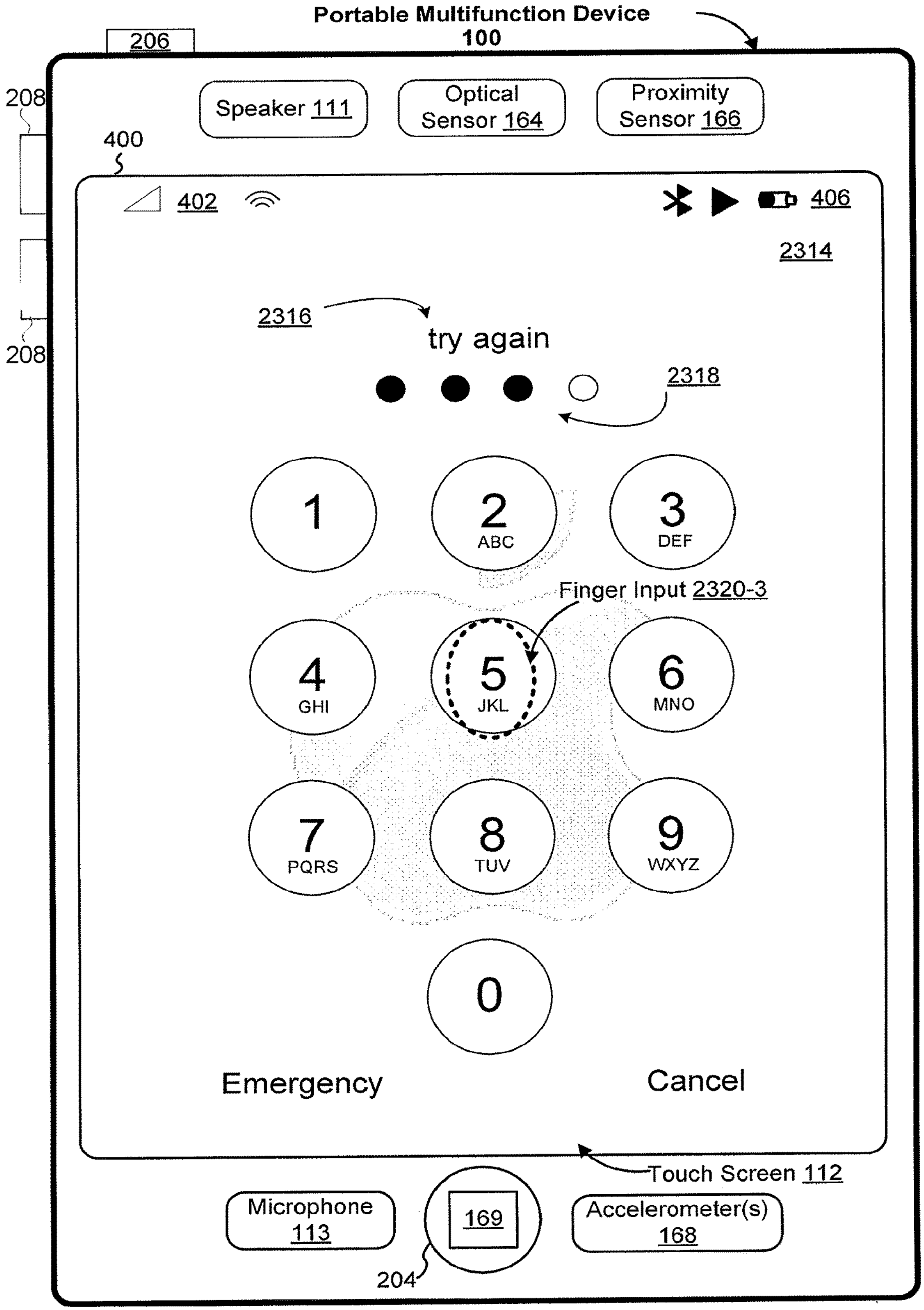
Figure 23O:
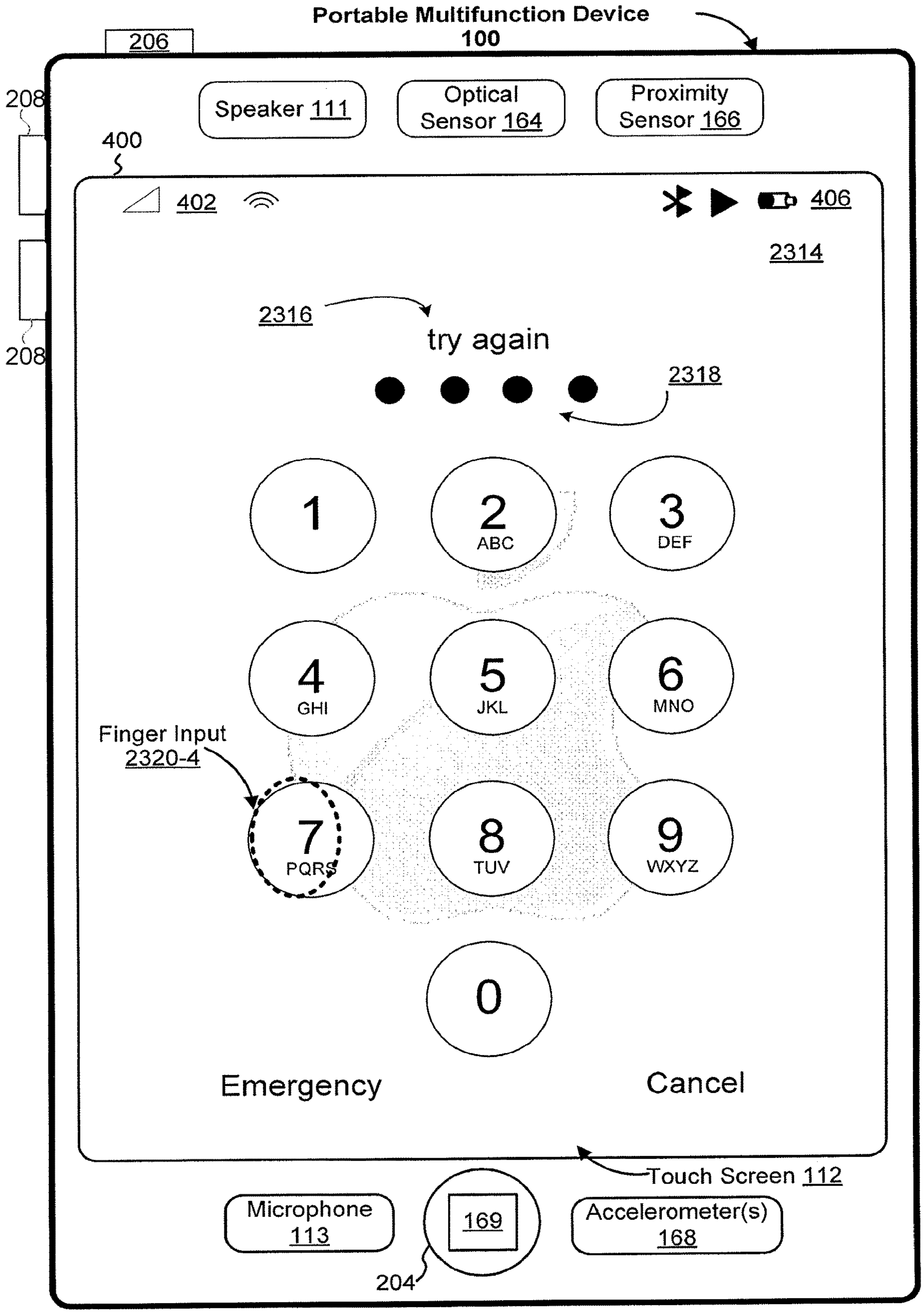
Figure 23P:
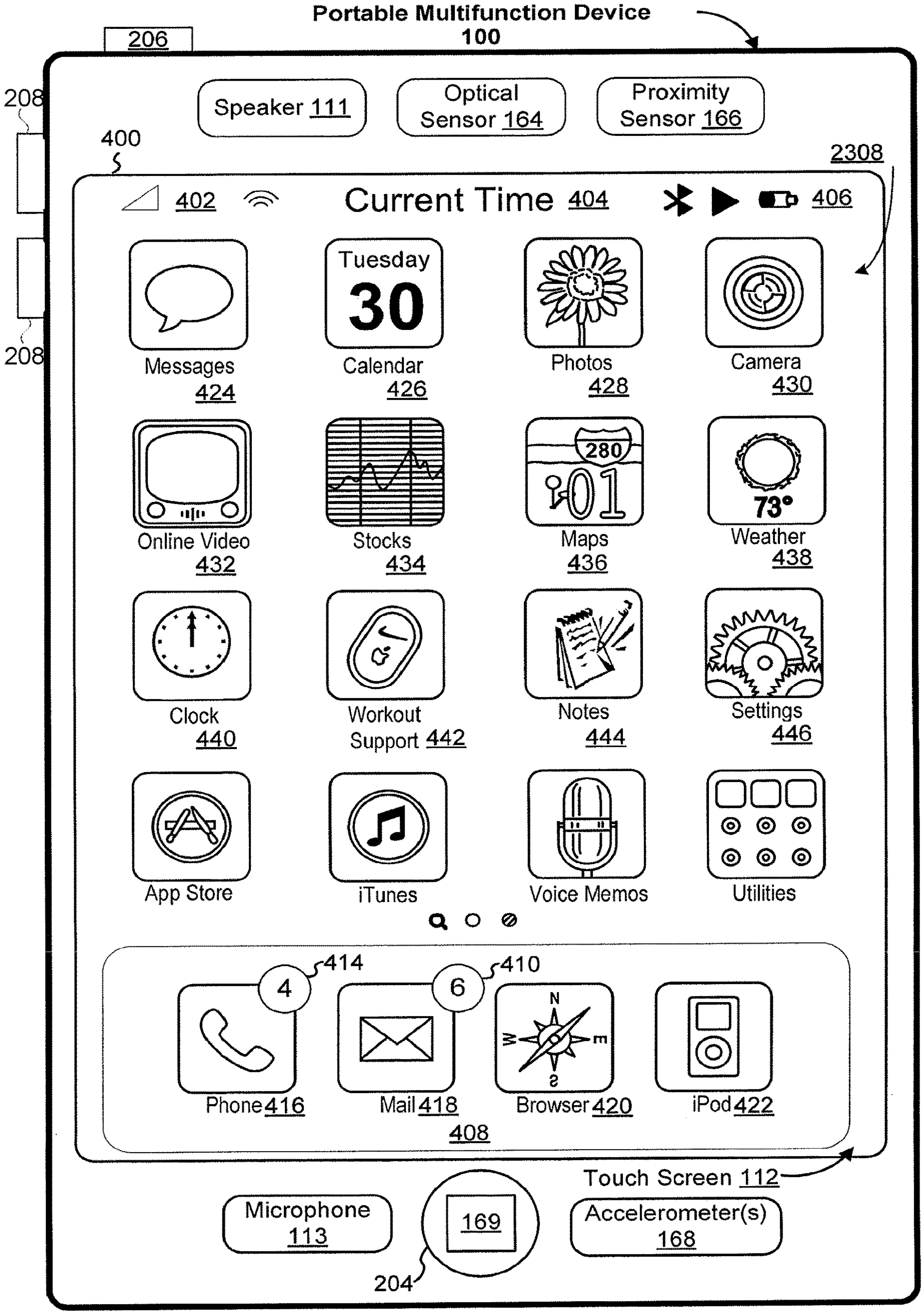

FIGS. 23L-23P illustrate an exemplary response of device 100 to user entry of a correct sequence of numbers (e.g., a passcode) to unlock the device, after device 100 has detected a first predefined number of unsuccessful attempts (e.g., by repeated detection of fingerprints that do not match any enrolled fingerprint of device 100) to unlock the device. In FIG. 23L, device 100 detects a finger input 2320-1 on touch screen 112 corresponding to entry of the number "1" on the keypad displayed on passcode entry user interface 2314. Progress indicator 2318 changes to show a first shape of a set of geometric shapes (e.g., circles) change from an "unfilled" to "filled" appearance. In FIG. 23L, progress indicator 2318 has 4 circles to indicate that the one or more passcodes to unlock the device comprise 4 digits. In some embodiments, progress indicator 2318 has more than 4 geometric shapes, to correspond to more than 4 digits in a valid passcode to unlock device 100, or less than 4 geometric shapes to correspond to less than 4 digits in a valid passcode to unlock device 100. In FIG. 23M, device 100 detects another finger input 2320-2, and progress indicator 2318 is correspondingly updated to indicate that two finger inputs have been detected. In FIG. 23N, device 100 detects another finger input 2320-3, and progress indicator 2318 is correspondingly updated to indicate that three finger inputs have been detected. In FIG. 23O, device 100 detects another finger input 2320-4, and progress indicator 2318 is correspondingly updated to indicate that four finger inputs have been detected. FIG. 23P illustrates an unlocked-mode user interface 2308, displayed in response to device 100 detecting a valid passcode entered in FIGS. 23L-23O.

Figure 23Q:
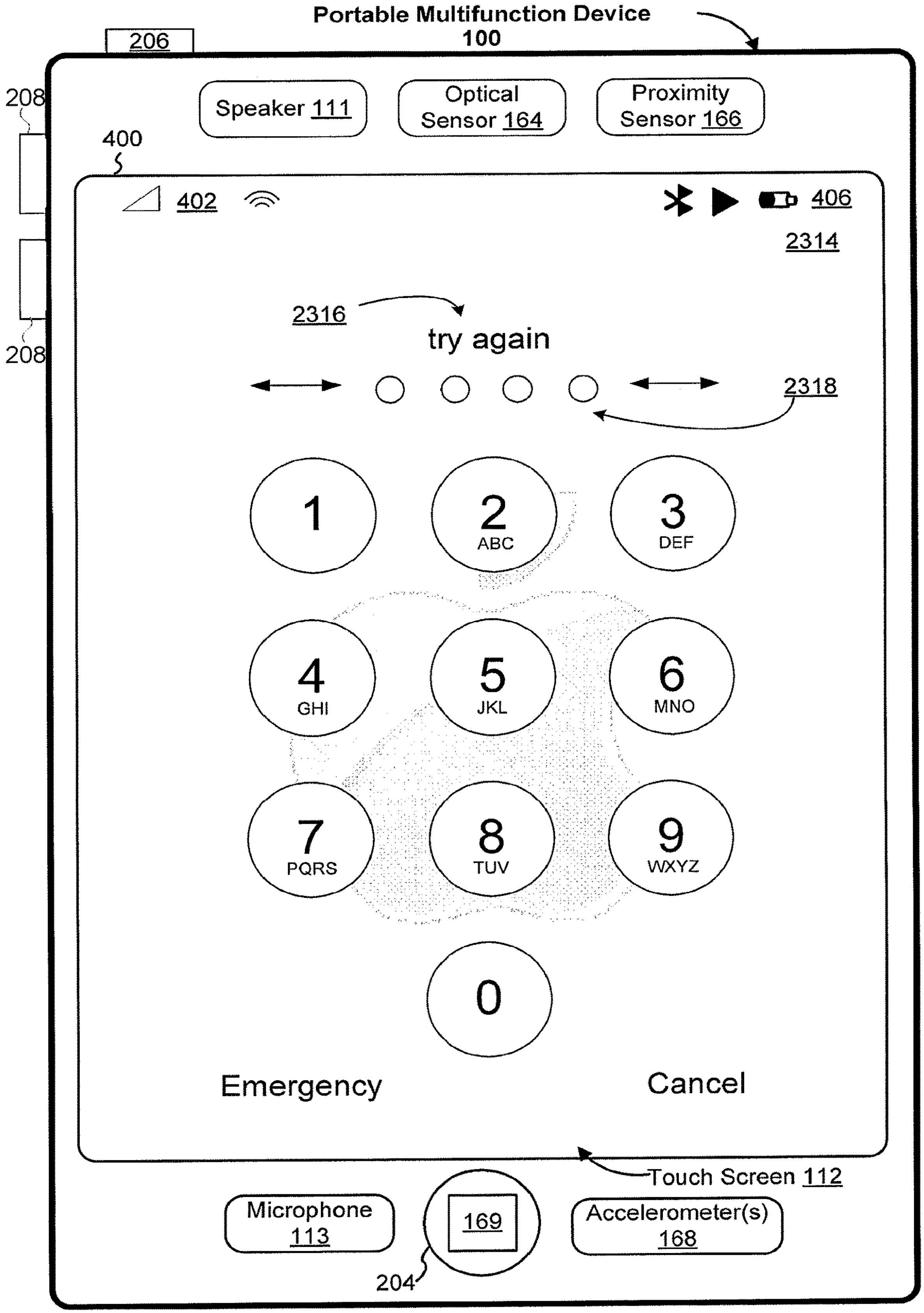

FIG. 23Q illustrates an exemplary response of device 100 to user entry of an incorrect sequence of numbers (e.g., an incorrect passcode) to unlock the device, after device 100 has detected a first predefined number of unsuccessful attempts to unlock the device (e.g., by repeated detection of fingerprints that do not match any enrolled fingerprints authorized to unlock the device). FIG. 23Q is displayed, for example, after FIGS. 23L-23O, if the passcode entered in FIGS. 23L-23O is determined to be invalid for unlocking device 100. In FIG. 23Q, progress indicator 2318 is displayed as being shaken from side to side for a predetermined amount of time, for a predetermined number of times and/or at a predetermined speed. In some embodiments, device 100 uses another technique to alert the user that the entered passcode is not recognized to be a passcode authorized to unlock device 100, such as playing an audio message, displaying a different visual cue, or any combination of audio and visual feedback. In some embodiments, device 100 displays third visual cue 2316 as being shaken from side to side for a predetermined amount of time, for a predetermined number of times and/or at a predetermined speed. In FIG. 23Q, the geometric shapes of progress indicator 2318 change from being filled, as shown in FIG. 23O, to being unfilled.

Figure 23R:
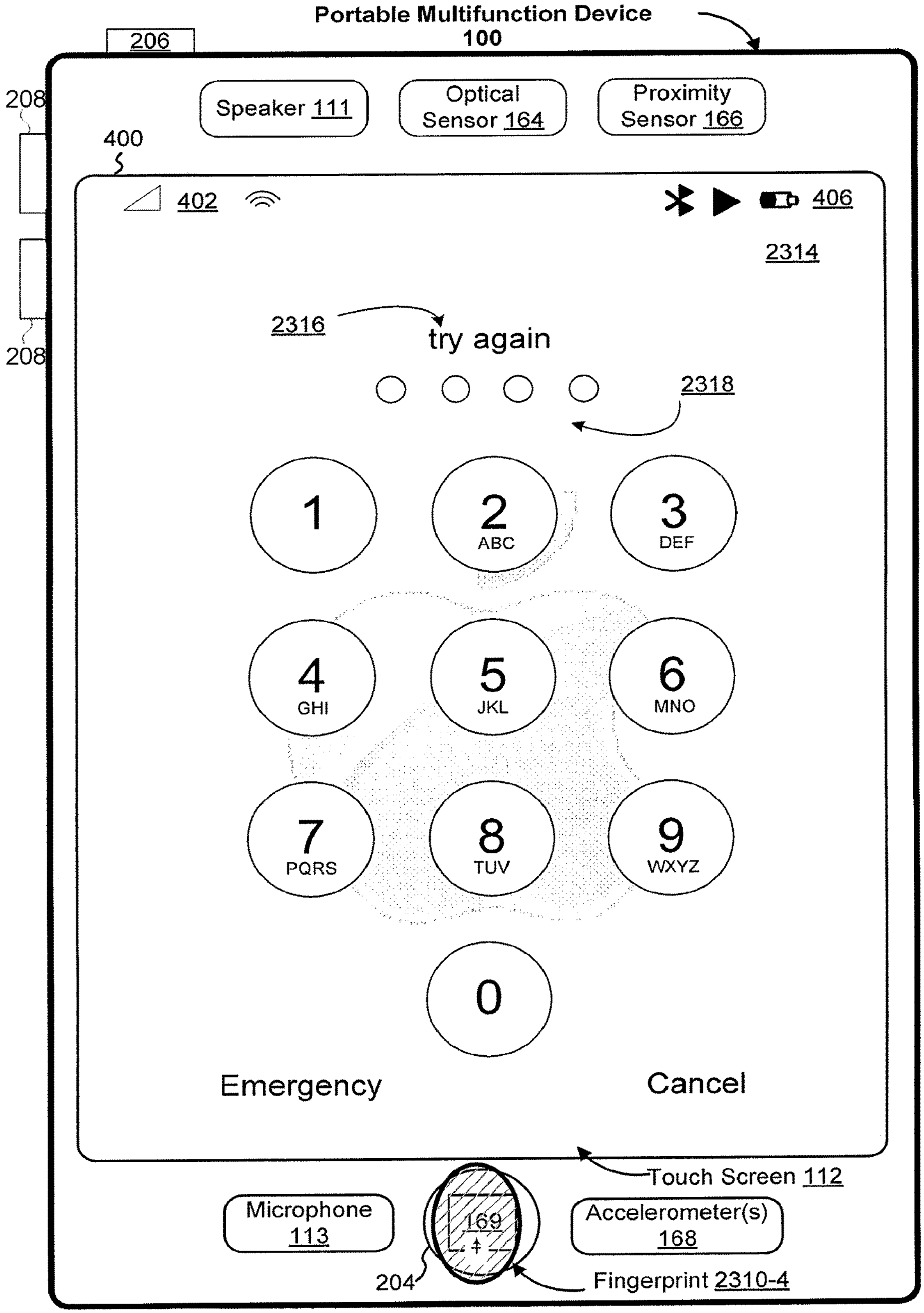
Figure 23S:
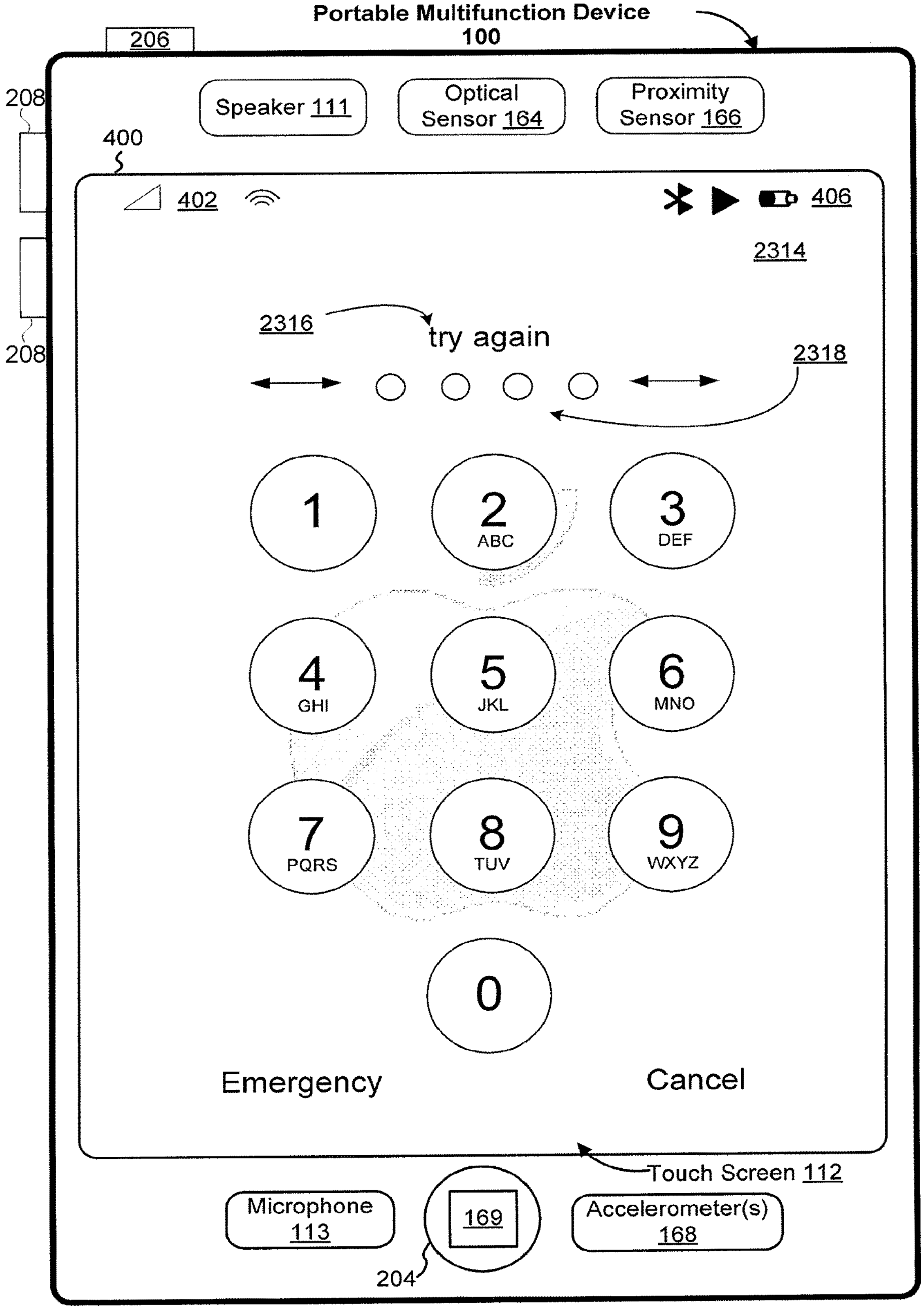
Figure 23T:
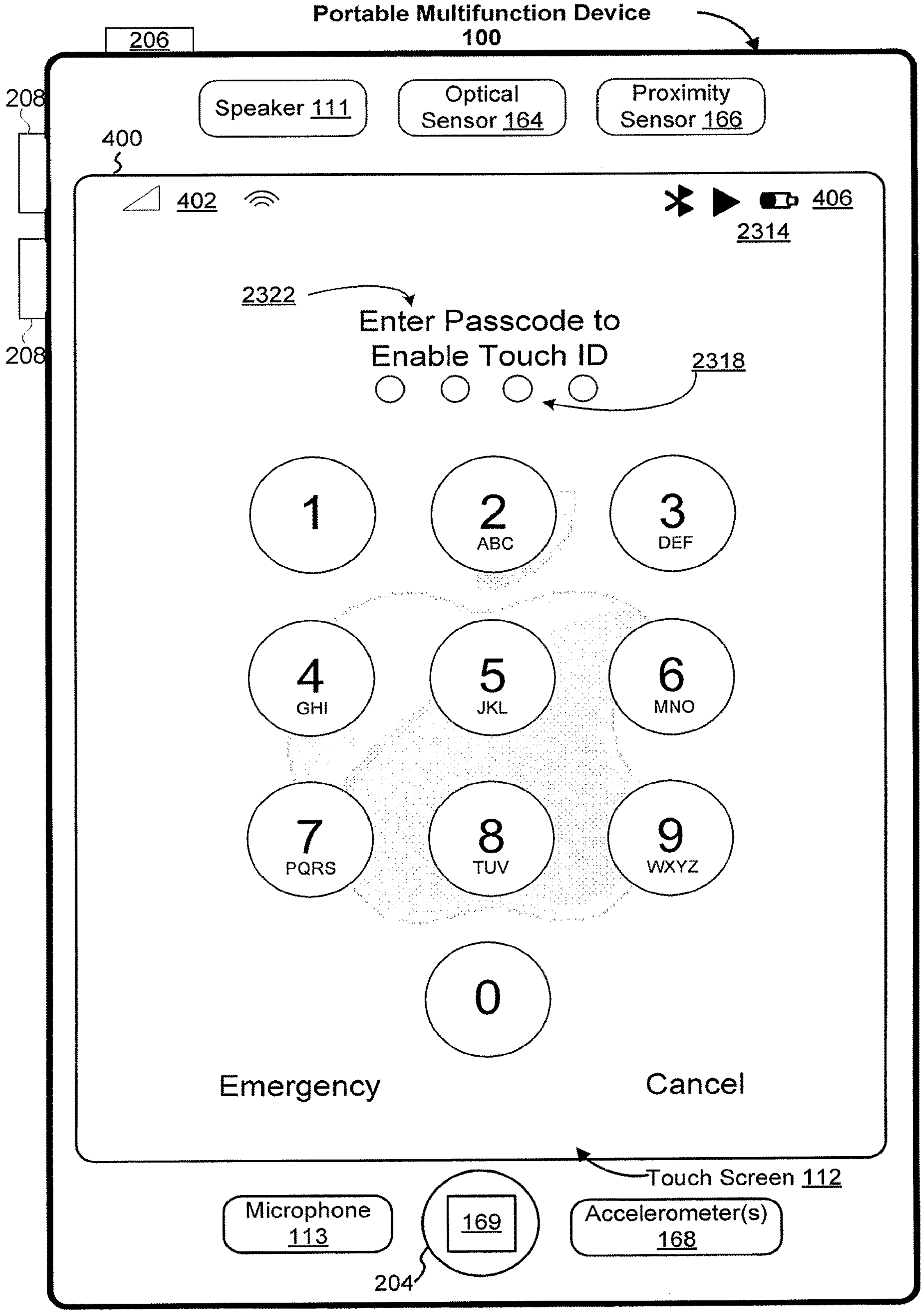

FIGS. 23R-23T illustrate further exemplary unsuccessful attempts to unlock device 100 by fingerprint detection, in the sequence of unlock attempts shown from FIG. 23D to FIG. 23J. In FIG. 23R, detected fingerprint 2310-4 does not match any enrolled fingerprint of device 100. In FIG. 23S, progress indicator 2318 is displayed as being shaken from side to side for a predetermined amount of time, for a predetermined number of times and/or at a predetermined speed. In some embodiments, device 100 uses another technique to alert the user that the detected fingerprint is not recognized to be an enrolled fingerprint authorized to unlock device 100, such as playing an audio message, displaying a different visual cue, or any combination of audio and visual feedback. In some embodiments, progress indicator 2318 remains stationary and third visual cue 2316 is displayed differently to indicate detection of fingerprint that does not match any enrolled fingerprint authorized to unlock device 100. For example, third visual cue 2316 is displayed as being shaken from side to side for a predetermined amount of time, for a predetermined number of times and/or at a predetermined speed. FIG. 23T illustrates an exemplary fourth visual cue 2322 displayed on passcode entry user interface 2314 in response to detecting a second predefined threshold of unsuccessful attempts to unlock device 100. In some embodiments, fourth visual cue 2322 is displayed to indicate that device 100 has disabled the ability to unlock the device through fingerprint detection. In some embodiments, the second predefined threshold of unsuccessful attempts to unlock corresponds solely to attempts by fingerprint detection.

Figure 23U:

FIG. 23U illustrates an exemplary unlock-initiation user interface 2302. In some embodiments, unlock-initiation user interface 2302 is displayed in response to detecting a predefined user action, such as pressing menu button 204, while the display of the device is in a low power mode (e.g., the display is off and/or the display backlight is off). In some embodiments, unlock-initiation user interface 2302 is also displayed by device 100 after a predefined period of time has elapsed, while the device is in a locked mode and an idleness condition is detected (e.g., no user input for the predefined period of time).

Figure 23V:
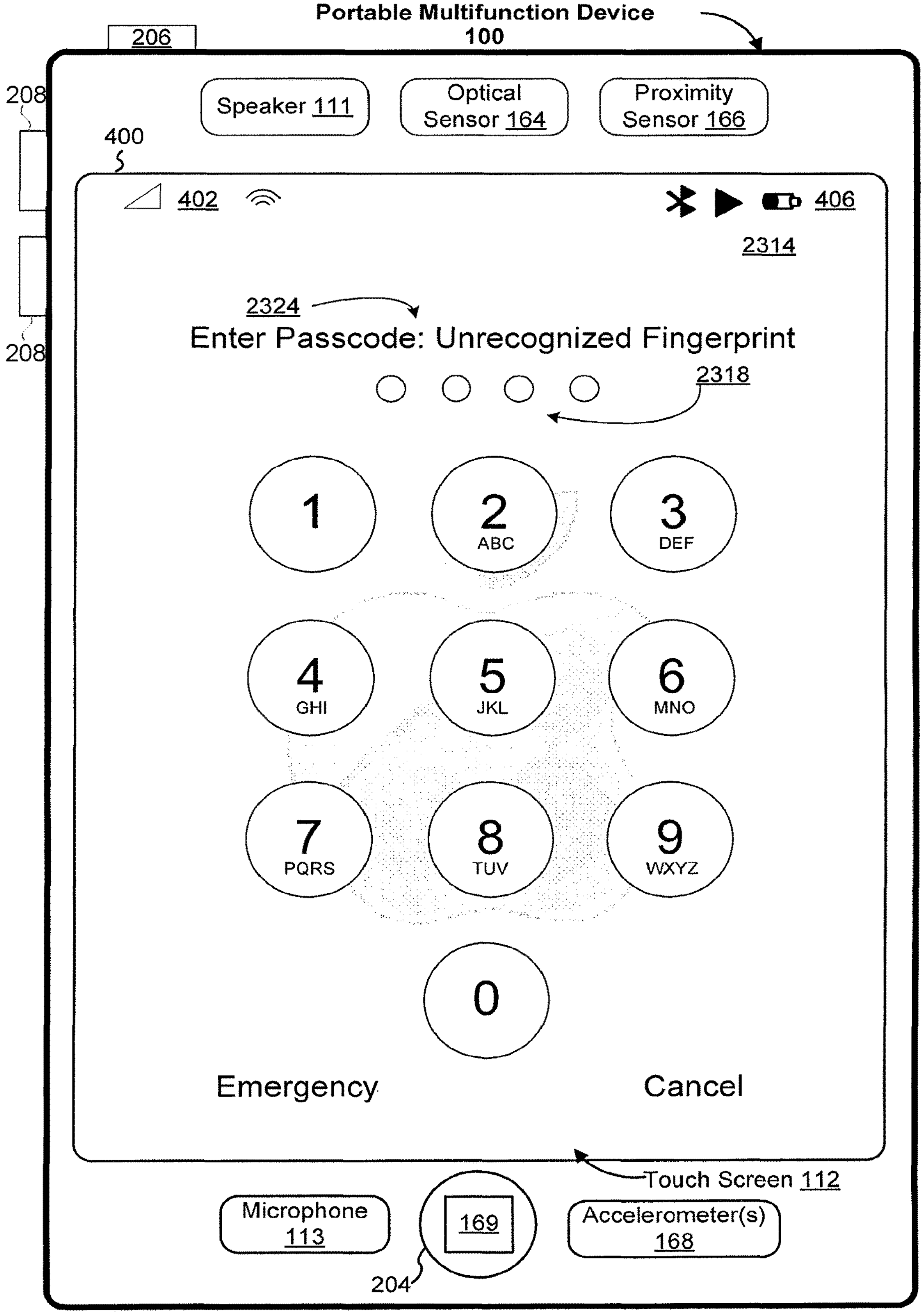

FIG. 23V illustrates an exemplary response of device 100 to detection of a fingerprint 2310-5, detected while displaying unlock-initiation user interface 2302 (FIG. 23U), where fingerprint 2310-5 does not match any enrolled fingerprint of device 100 authorized to unlock device 100. In this example, device 100 has previously detected at least one fingerprint 2310 that also did not match any enrolled fingerprint of device 100 authorized to unlock device 100 prior to detecting fingerprint 2310-5 in unlock-initiation user interface 2302, shown in FIG. 23U. FIG. 23V illustrates an exemplary response of device 100 to detection of fingerprint 2310-5 (which does not match any enrolled fingerprint of device 100 authorized to unlock device 100) in FIG. 23U. In FIG. 23V, device 100 displays the passcode entry user interface 2314, along with a fifth visual cue 2324 that alerts the user to its inability to recognize the detected fingerprint. In some embodiments, fifth visual cue 2324 alerts the user to at least one prior unsuccessful attempt to unlock device 100 by fingerprint detection, and in some embodiments fifth visual cue 2324 comprises information regarding the one or more prior unsuccessful attempts to unlock device 100.

Figure 23W:
Figure 23X:
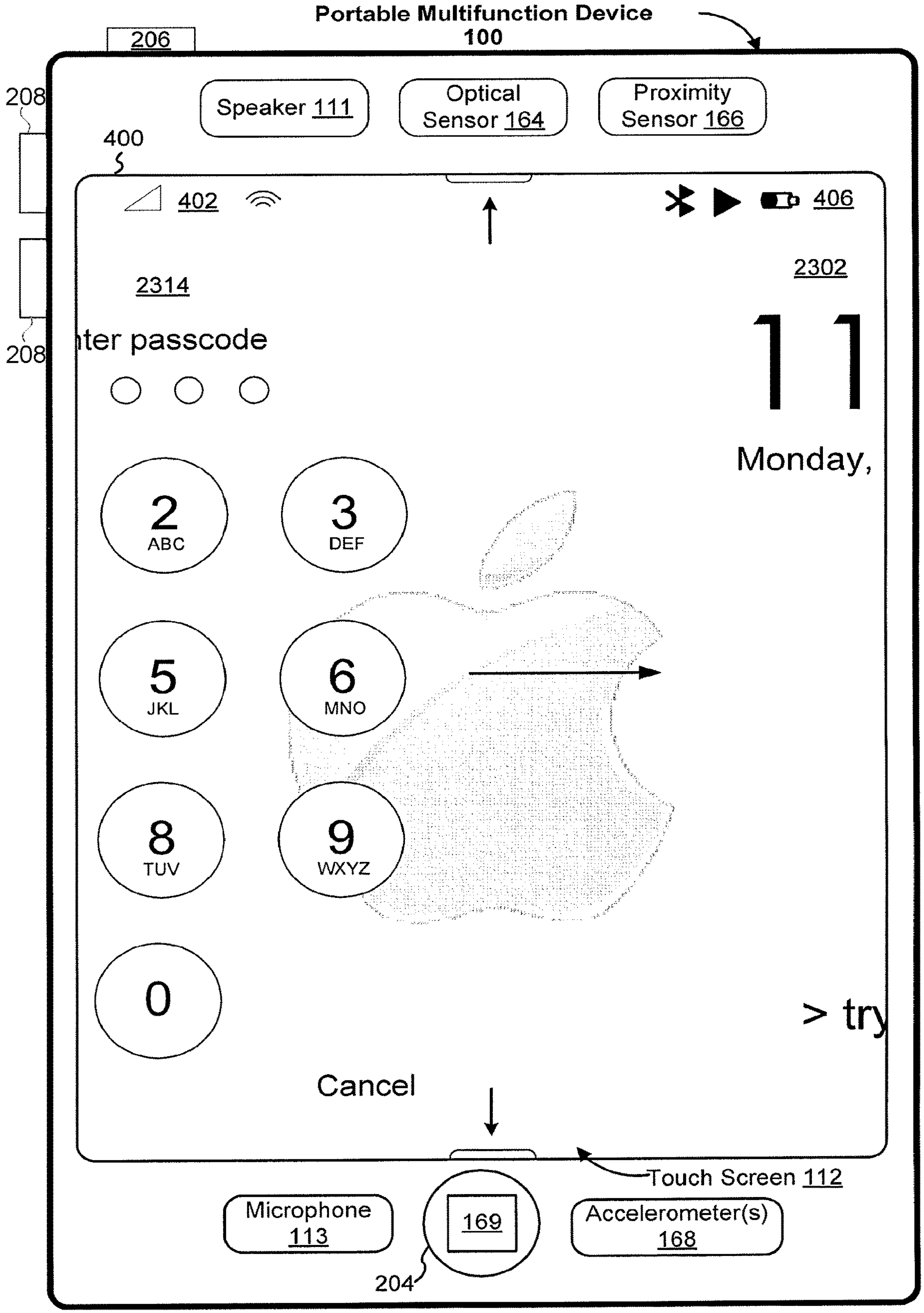

FIGS. 23W and 23X illustrate device 100 transitioning from display of unlock-initiation user interface 2302 to passcode entry user interface 2314, in response to detecting a device unlock finger gesture 2326 on touch screen 112. In this example, device unlock finger gesture 2326 is a lateral movement from left to right on unlock-initiation user interface 2302, for example from position 2326-1 to position 2326-2. In some embodiments the direction of device unlock finger gesture 2326 is from right to left. Exemplary finger gesture 2326 corresponds to the instructions displayed by first visual cue 2304. FIG. 23X illustrates the transition to passcode entry user interface 2314, shown in FIG. 23Y.

Figure 23Y:
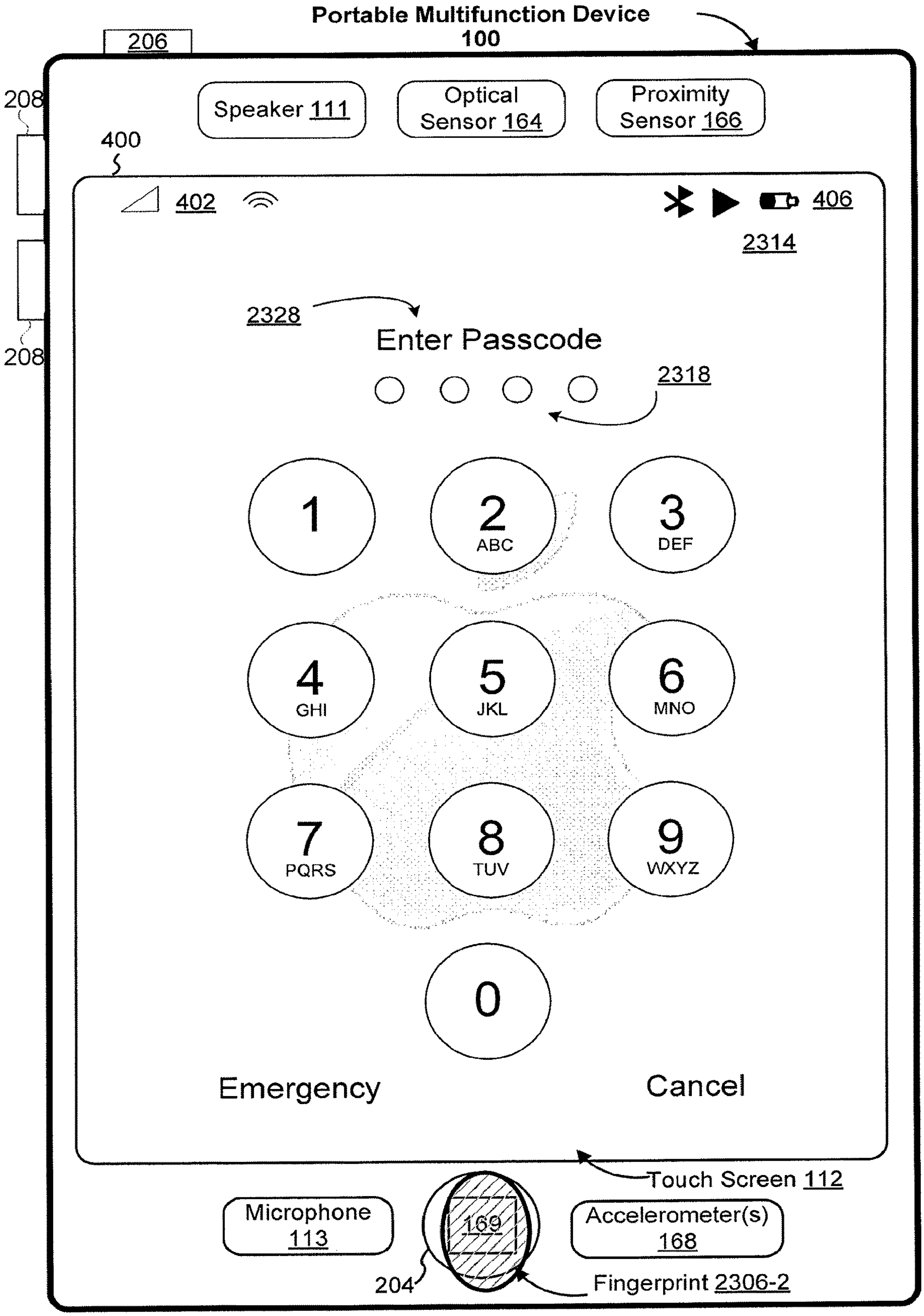

FIG. 23Y illustrates an exemplary passcode entry user interface 2314 displayed by device 100 in response to detecting device unlock finger gesture 2326 in FIG. 23W. FIG. 23W shows a sixth visual cue 2328 (e.g., "Enter Passcode"), and a progress indicator 2318. In some embodiments, sixth visual cue 2328 indicates to the user that the device may be unlocked by passcode entry. In some implementations, sixth visual cue 2328 indicates additional methodologies for unlocking the device, such as fingerprint detection, another technique, or a combination of techniques. In FIG. 23Y, a fingerprint 2306-2 is detected on fingerprint sensor 169. In this example, fingerprint 2306-2 matches an enrolled fingerprint authorized to unlock device 100.

Figure 23Z:
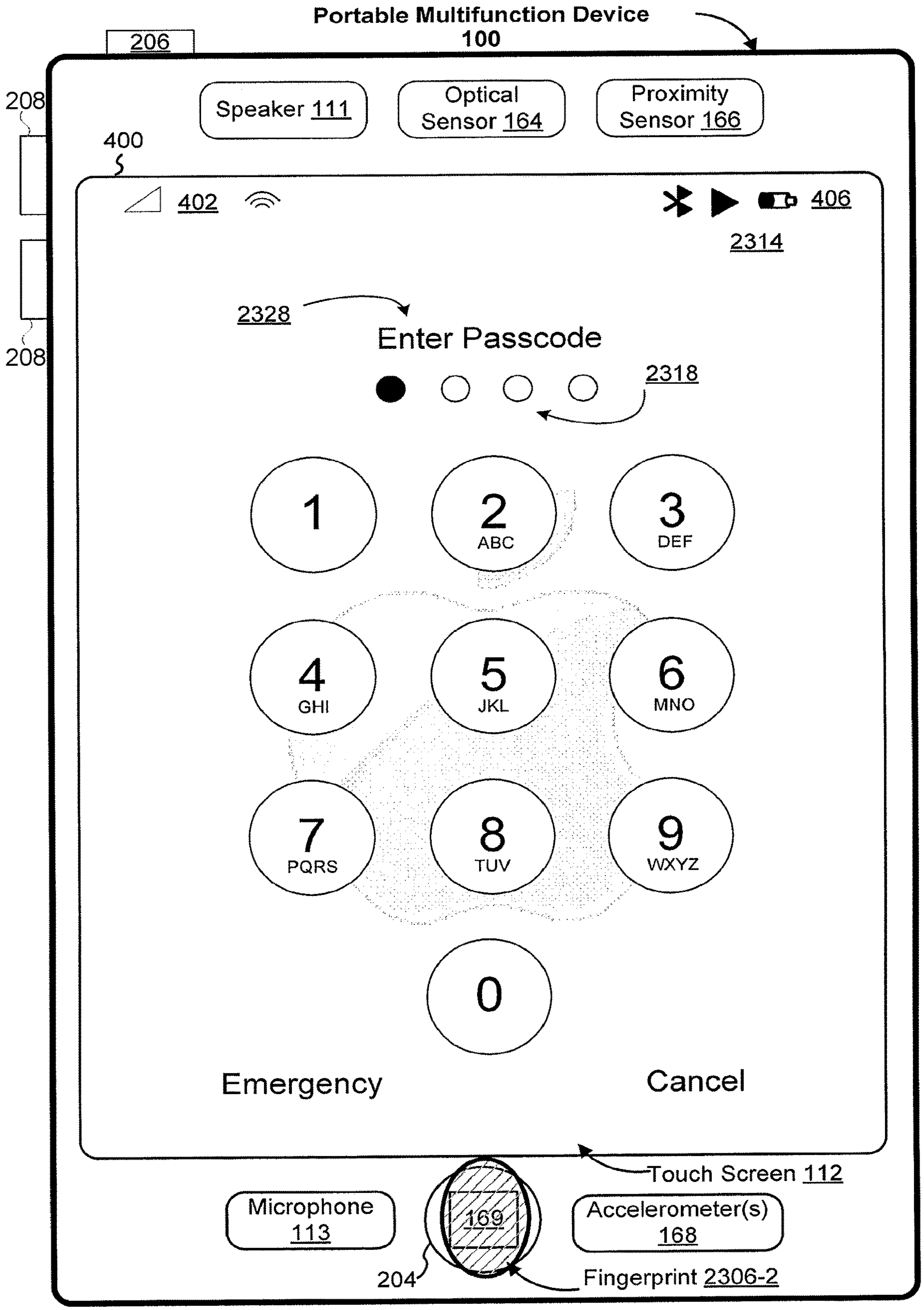
Figure 23A:
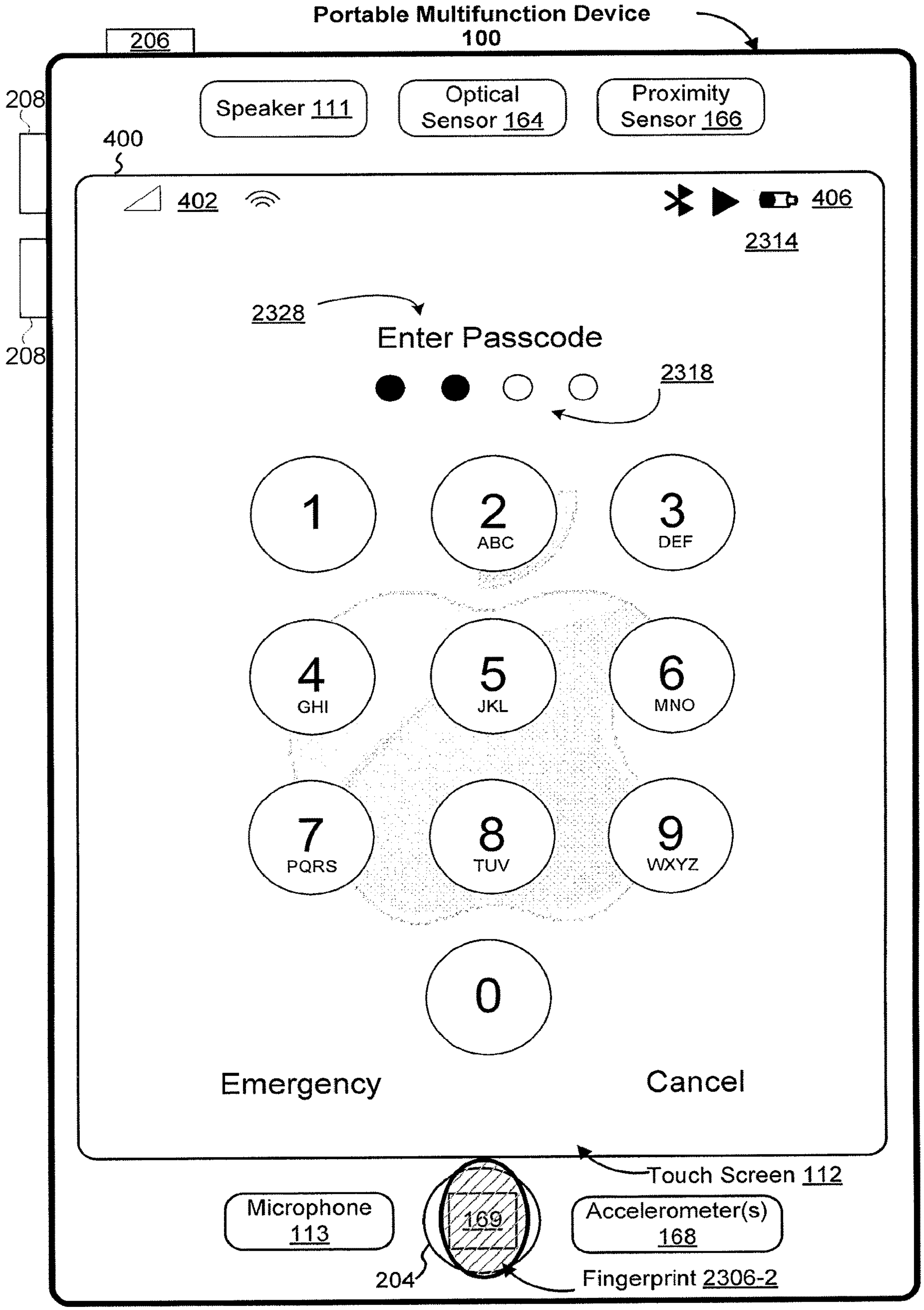
Figure 23B:
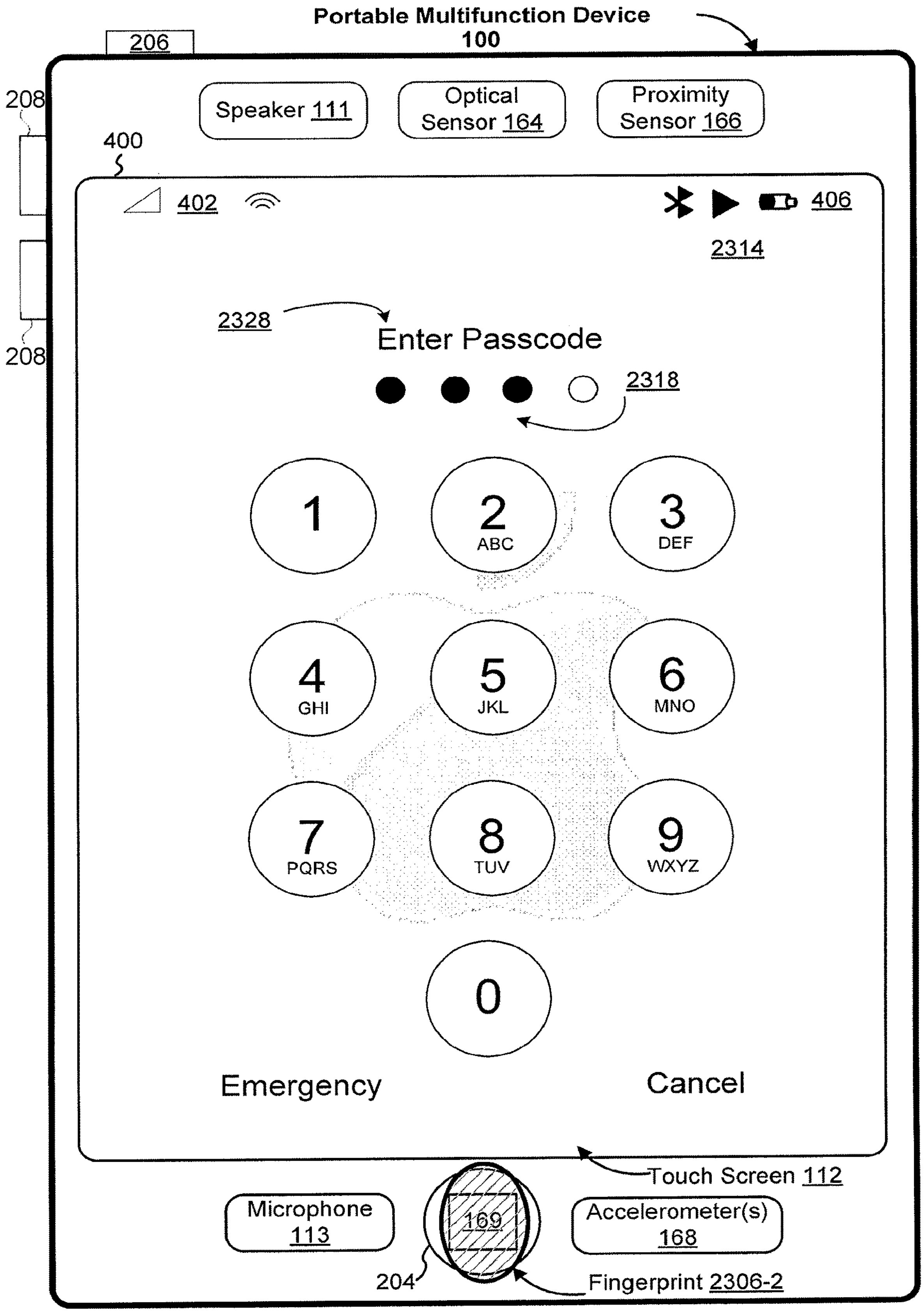
Figure 23C:
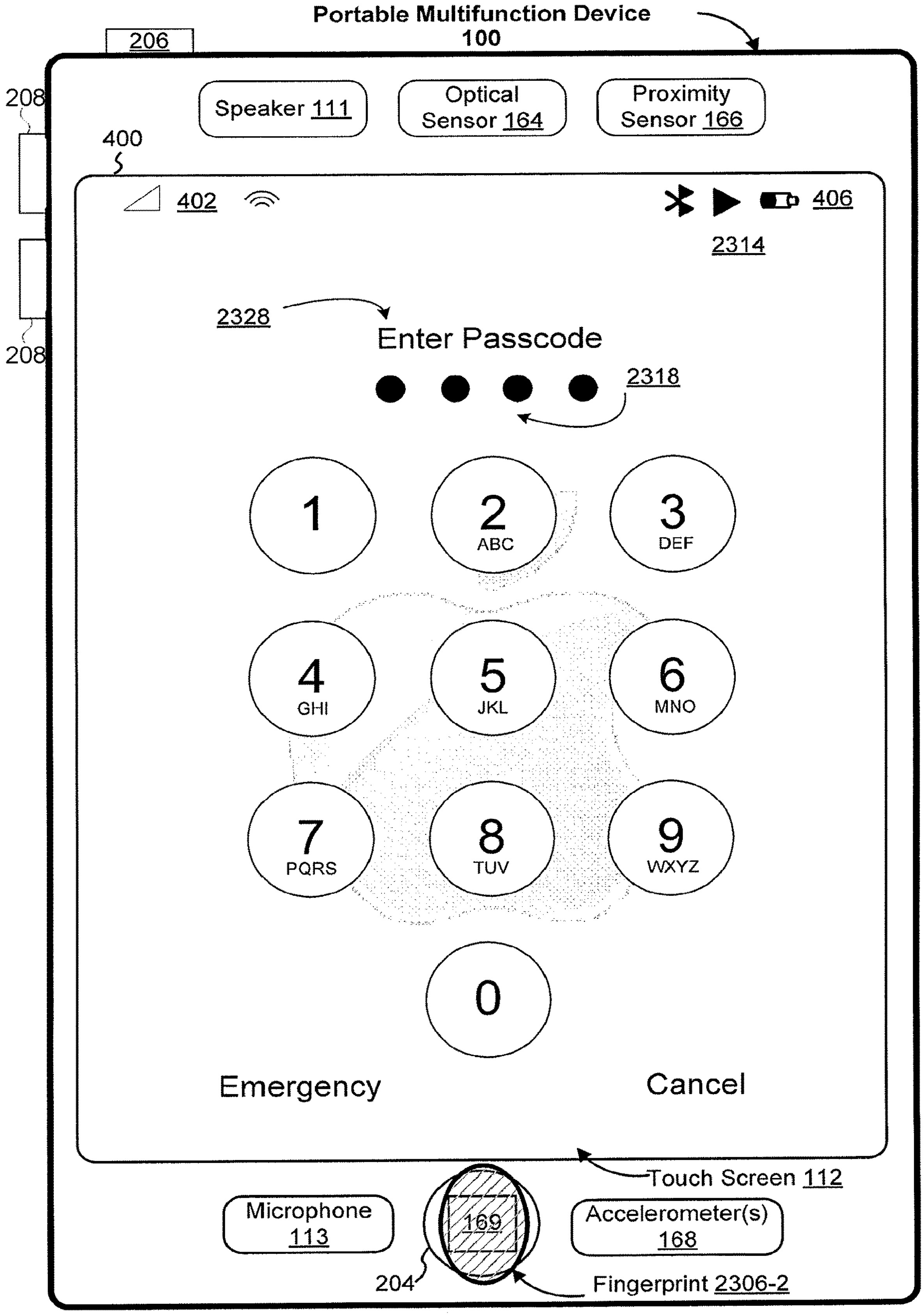
Figure 23D:
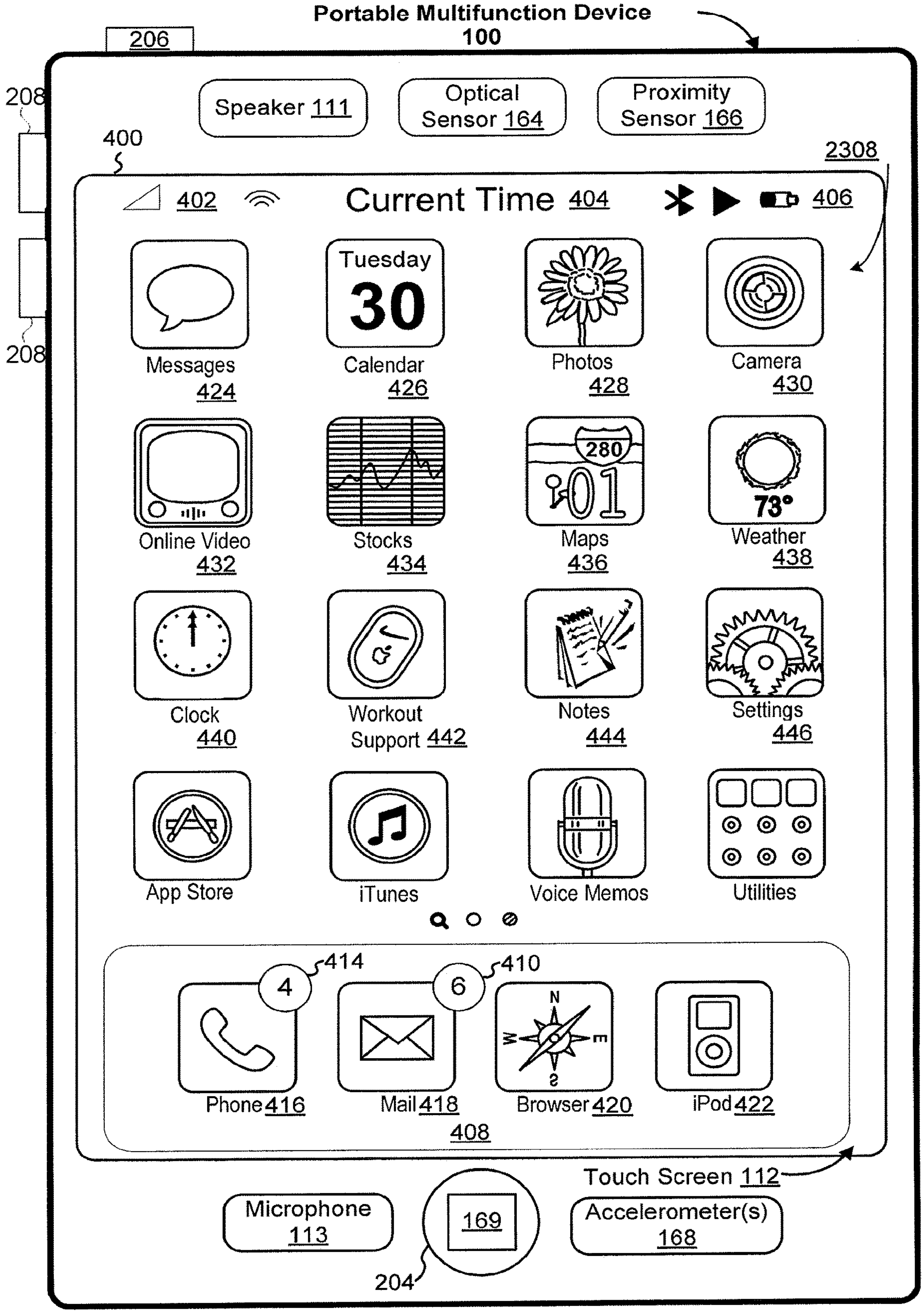
Figure 23E:
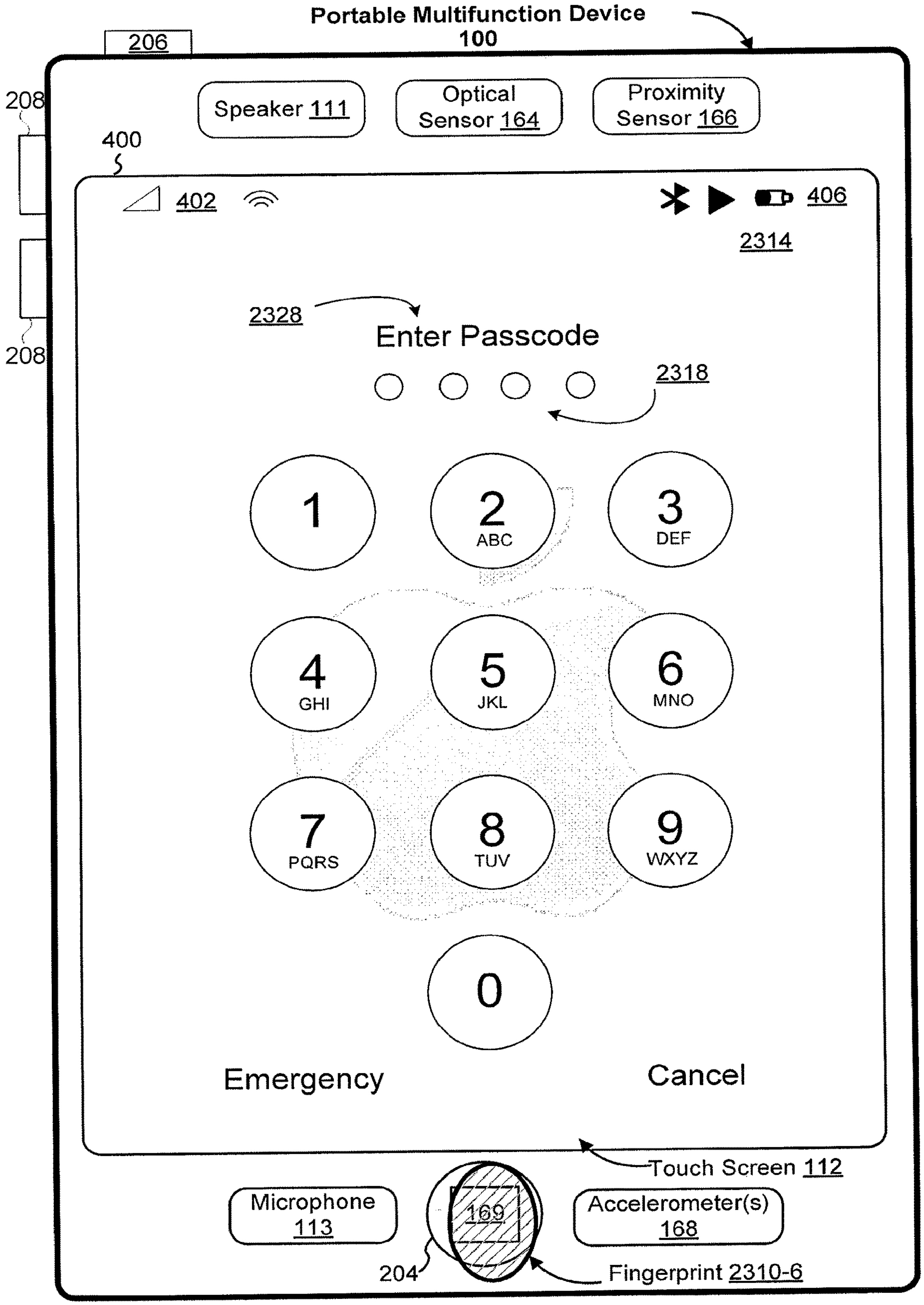
Figure 23F:
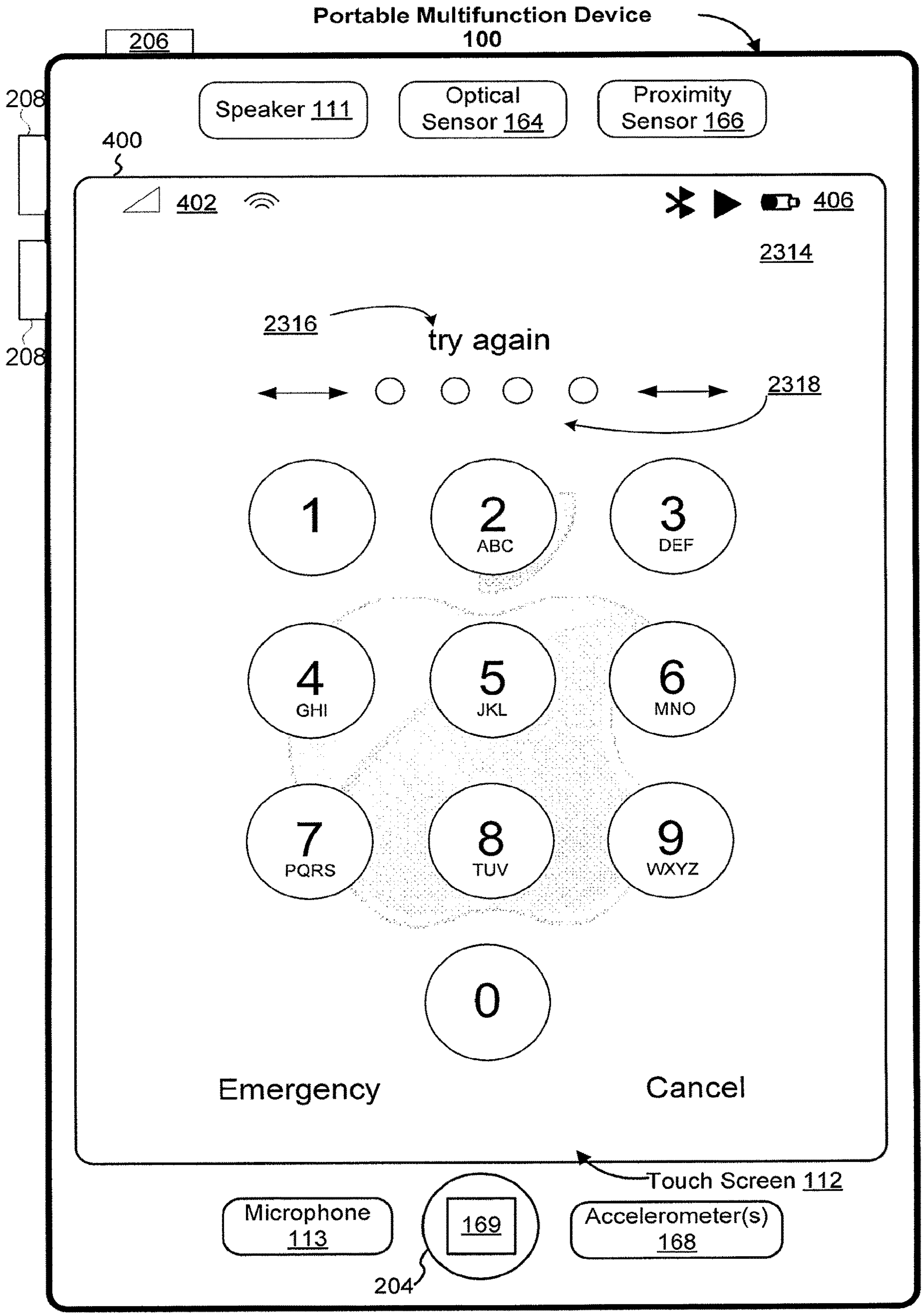
Figure 24A:
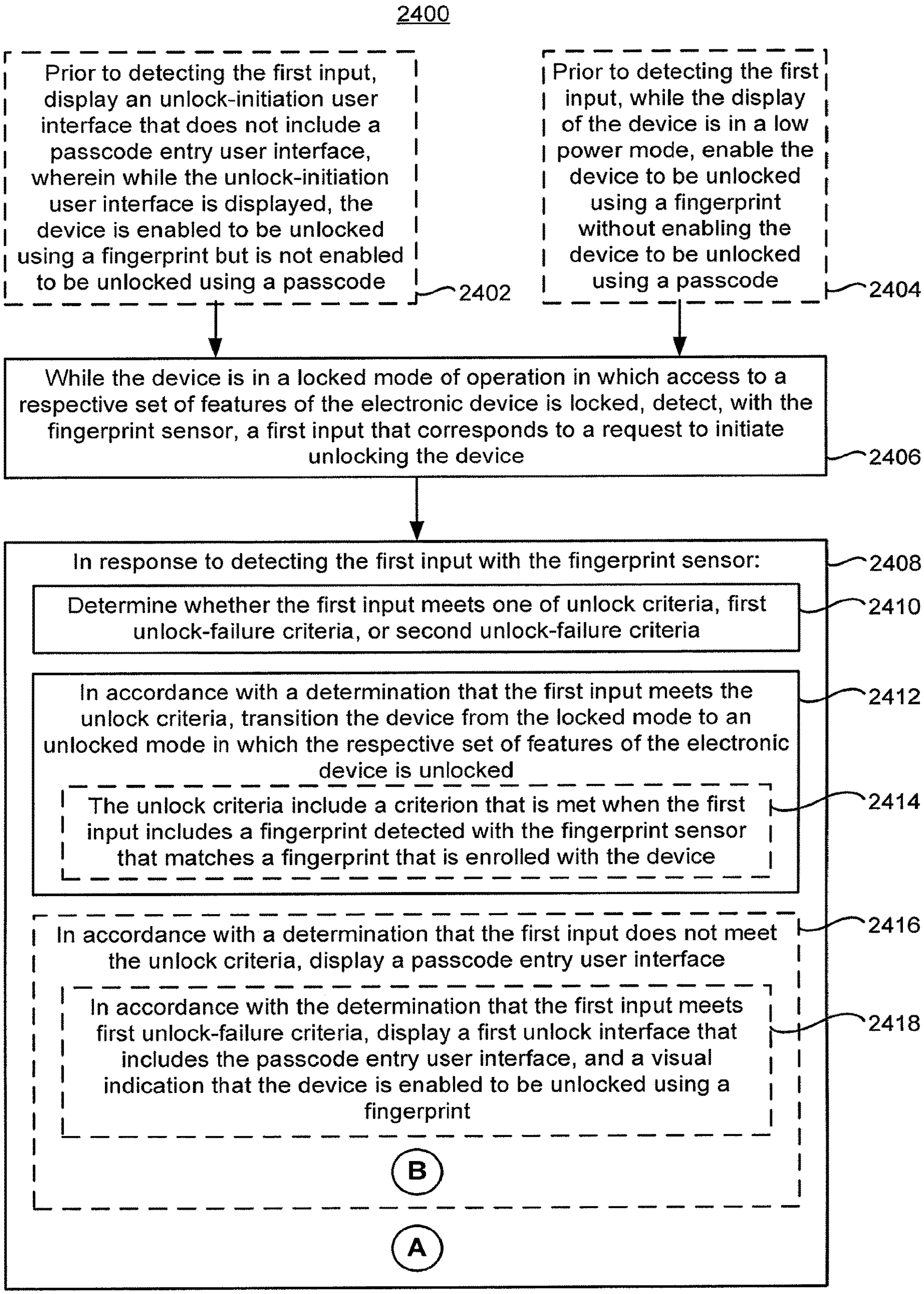
FIGS. 24A-24D are flow diagrams illustrating a method of providing different unlock modes in accordance with some embodiments.
Figure 24B:
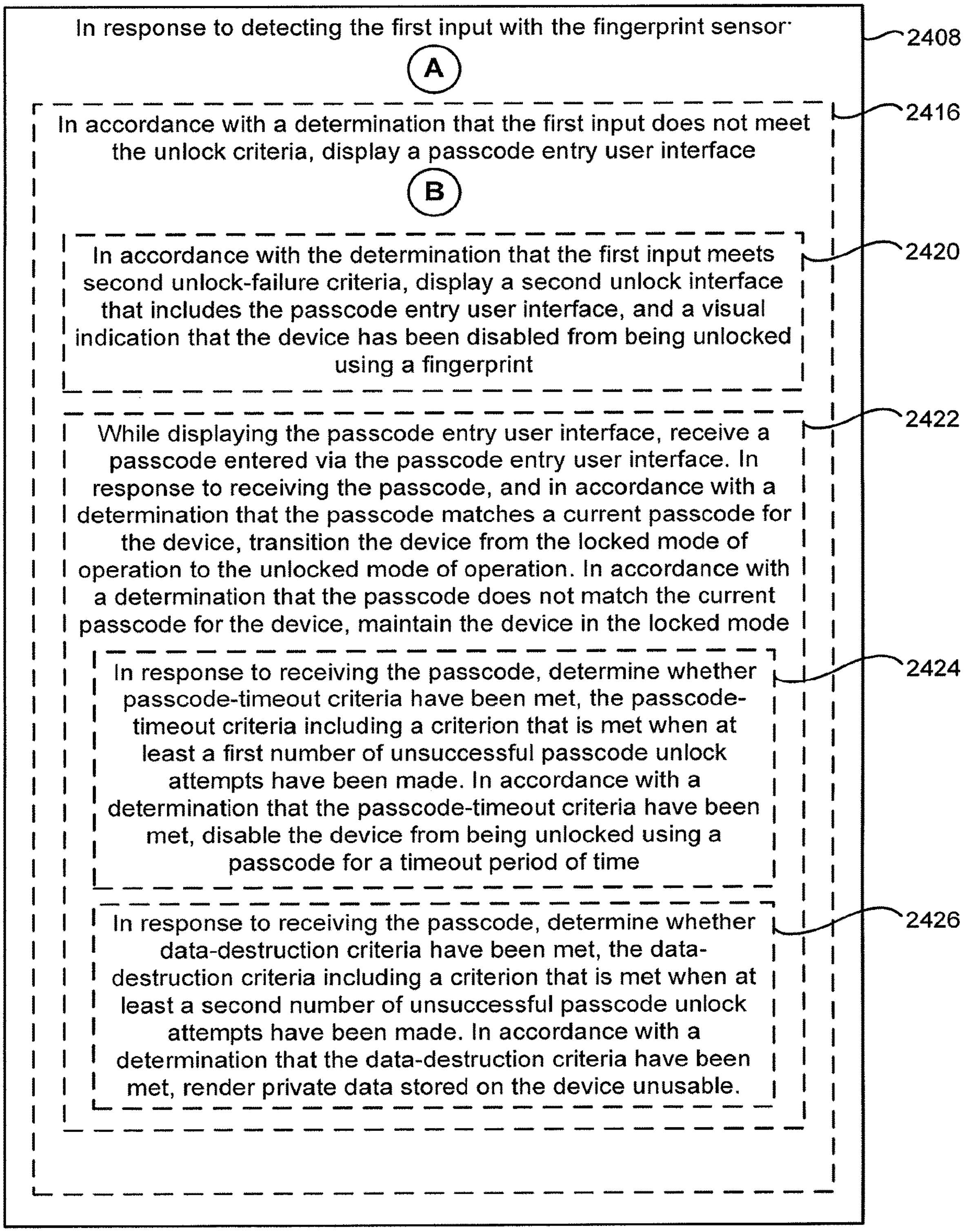
Figure 24C:
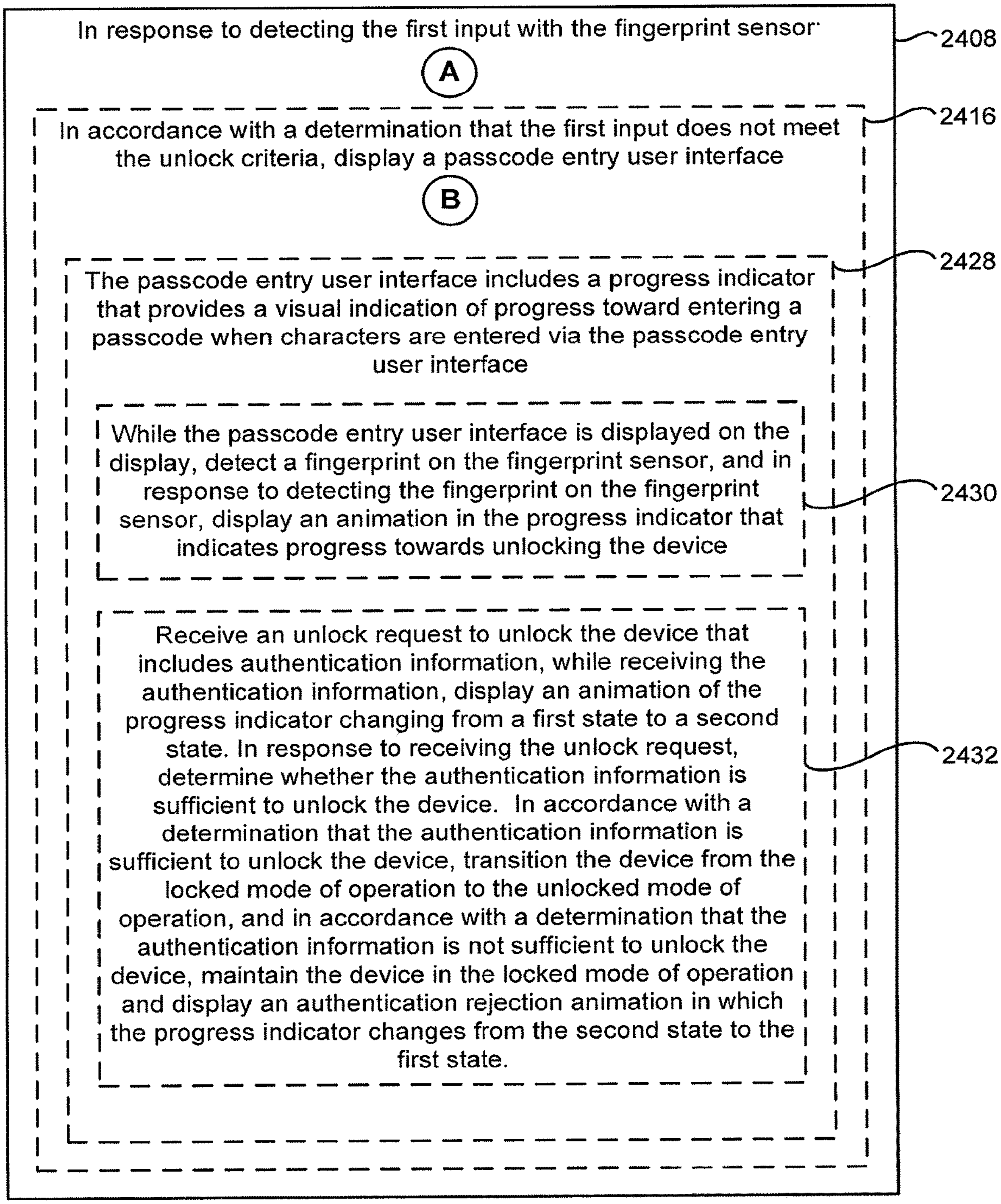
Figure 24D:
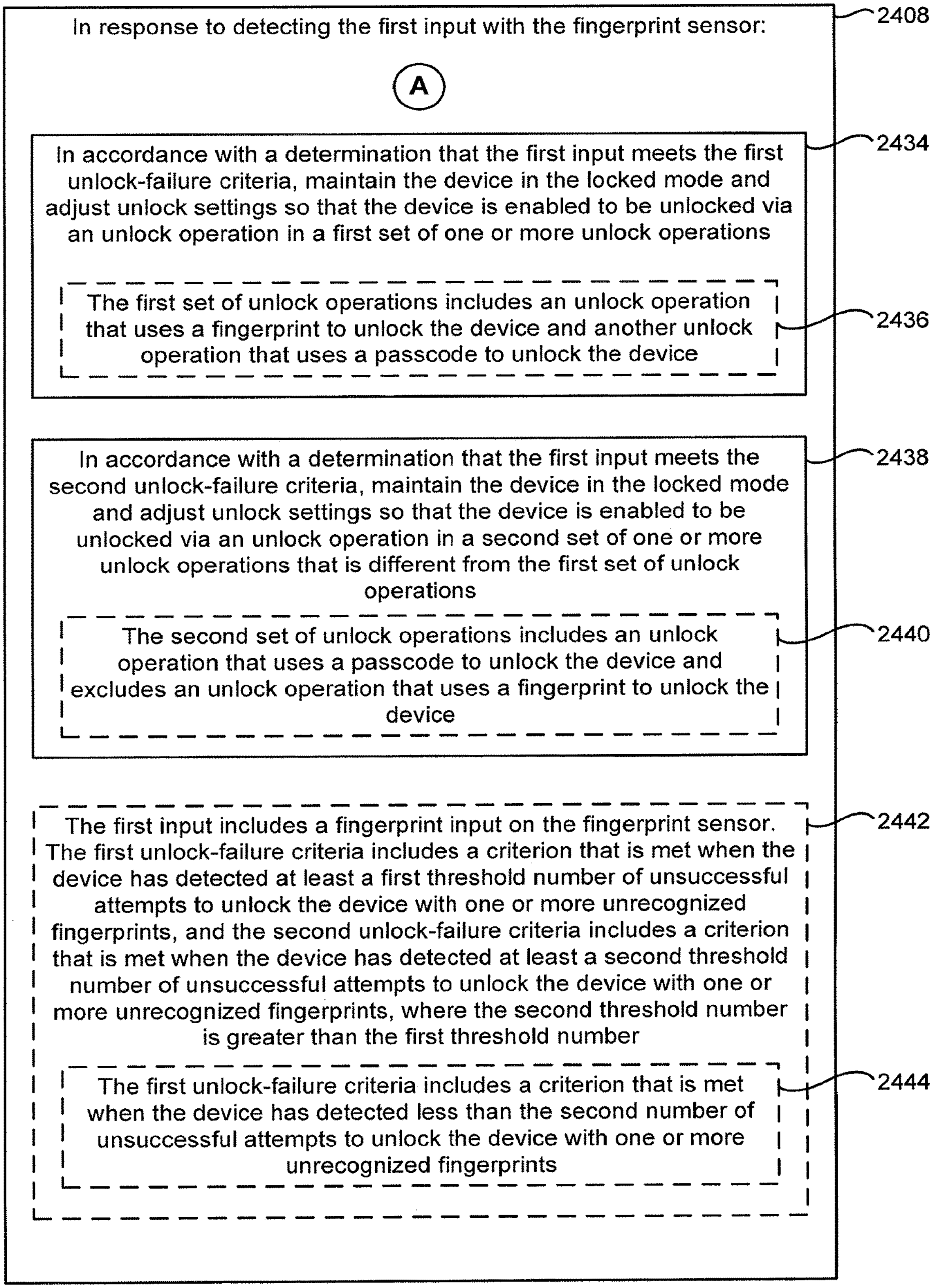

FIGS. 23Z-23DD illustrate an exemplary response by device 100 to detection of a fingerprint 2306-2 on fingerprint sensor 169, while displaying passcode entry user interface 2314. In FIGS. 23Z-23CC, progress indicator 2318 is progressively modified by filling in geometric shapes in progress indicator 2318, one at a time. In some embodiments, progress indicator 2318 is progressively modified while device 100 determines whether the detected fingerprint 2306-2 matches an enrolled fingerprint authorized to unlock device 100. In some embodiments, upon determining that a fingerprint 2306-2 received while displaying passcode entry user interface 2314 matches an enrolled fingerprint authorized to unlock device 100, progress indicator 2318 is instantly modified to display all the geometric shapes as being filled in. FIG. 23DD illustrates an unlocked-mode user interface 2308, displayed after device 100 displays the user interfaces shown in FIGS. 23Y-23CC and device 100 has made a determination that the detected fingerprint matches an enrolled fingerprint authorized to unlock device 100.

FIGS. 23EE and 23FF illustrate an exemplary response by device 100 to detection of a fingerprint 2310-6, by fingerprint sensor 169, while displaying passcode entry user interface 2314. For example, FIG. 23EE follows FIGS. 23W-23X, after device 100 detects finger gesture 2326 on touch screen 112. FIG. 23FF illustrates an exemplary response by device 100 to detection of a fingerprint 2310-6 (shown in FIG. 23EE) that does not match any enrolled fingerprint authorized to unlock device 100. In FIG. 23FF, a visual cue, such as third visual cue 2316 (e.g., "try again") is displayed, and progress indicator 2318 is displayed as being shaken from side to side for a predetermined amount of time, for a predetermined number of times and/or at a predetermined speed.

FIGS. 24A-24D are flow diagrams illustrating a method 2400 of providing different unlock modes in accordance with some embodiments. The method 2400 is performed at an electronic device (e.g., device 300, FIG. 3, or portable multifunction device 100, FIG. 1A) with a display and fingerprint sensor. In some embodiments, the display is a touch screen display and the touch-sensitive surface is on the display. In some embodiments, the display is separate from the touch-sensitive surface. Some operations in method 2400 are, optionally, combined and/or the order of some operations is, optionally, changed.

As described below, the method 2400 provides an intuitive way to provide different unlock modes. The method reduces the cognitive burden on a user when providing different unlock modes, thereby creating a more efficient human-machine interface. For battery-operated electronic devices, enabling a user to unlock an electronic device faster and more efficiently conserves power and increases the time between battery charges.

While the device is in a locked mode of operation in which access to a respective set of features of the electronic device is locked, the device detects (2406), with the fingerprint sensor, a first input that corresponds to a request to initiate unlocking the device. In some embodiments, prior to detecting the first input, the device displays (2402) an unlock-initiation user interface (e.g., a slide-to-unlock user interface, shown in FIG. 23U) that does not include a passcode entry user interface, wherein while the unlock-initiation user interface is displayed, the device is enabled to be unlocked using a fingerprint but is not enabled to be unlocked using a passcode. For example, in a slide-to-unlock user interface, a passcode entry user interface is not displayed and thus there is no way to enter a passcode to unlock the device. In some embodiments, prior to detecting the first input, while the display of the device is in a low power mode (e.g., the display is off and/or the display backlight is off), the device enables (2404) the device to be unlocked using a fingerprint without enabling the device to be unlocked using a passcode. For example, if the display is off and the display backlight is off, a passcode entry user interface is not displayed and thus there is no way to enter a passcode to unlock the device.

The device performs several operations in response to detecting (2408) the first input with the fingerprint sensor in method 2400. In response to detecting (2408) the first input with the fingerprint sensor, the device determines (2410) whether the first input meets one of unlock criteria, first unlock-failure criteria, or second unlock-failure criteria. In accordance with a determination that the first input meets the unlock criteria, the device transitions (2412) the device from the locked mode to an unlocked mode in which the respective set of features of the electronic device is unlocked. In some embodiments, the unlock criteria include (2414) a criterion that is met when the first input includes a fingerprint detected with the fingerprint sensor that matches a fingerprint that is enrolled with the device. For example, if the first input corresponds to an enrolled fingerprint authorized to unlock the device, the device transitions from a locked mode to an unlocked mode, as seen in FIGS. 23B and 23C.

In some embodiments, in accordance with a determination that the first input does not meet the unlock criteria, the device displays (2416) a passcode entry user interface. For example, if the first input is fingerprint 2310-3 in FIG. 23I, which the device determines does not match any enrolled fingerprint authorized to unlock device 100, the device displays exemplary passcode entry user interface 2314 in FIG. 23K. In some embodiments, in accordance with the determination that the first input meets first unlock-failure criteria, the device displays (2418) a first unlock interface that includes the passcode entry user interface, and a visual indication that the device is enabled to be unlocked using a fingerprint.

In some embodiments, in accordance with the determination that the first input meets second unlock-failure criteria, the device displays (2420) a second unlock interface that includes the passcode entry user interface, and a visual indication that the device has been disabled from being unlocked using a fingerprint. For example, FIG. 23T illustrates an exemplary second unlock interface that includes the passcode entry user interface 2314, and a visual indication that the device has been disabled from being unlocked using a fingerprint (e.g., fourth visual cue 2322).

In some circumstances, while the device displays (2422) the passcode entry user interface, the device receives a passcode entered via the passcode entry user interface. For example, FIG. 23K-FIG. 23O illustrate device 100 receiving a passcode entered via passcode entry user interface 2314. In response to receiving the passcode, and in accordance with a determination that the passcode matches a current passcode for the device, the device transitions the device from the locked mode of operation to the unlocked mode of operation (e.g., FIG. 23P). In accordance with a determination that the passcode does not match the current passcode for the device, the device maintains the device in the locked mode (e.g., FIG. 23Q).

In some embodiments, in response to receiving the passcode, the device determines (2424) whether passcode-timeout criteria have been met, the passcode-timeout criteria including a criterion that is met when at least a first number of unsuccessful passcode unlock attempts have been made (e.g., between one and four unsuccessful passcode unlock attempts). Alternatively, the passcode-timeout criteria includes a criterion that is met when at least a first number of unsuccessful passcode unlock attempts have been made within a predefined time period. In accordance with a determination that the passcode-timeout criteria have been met, the device disables the device from being unlocked using a passcode for a timeout period of time. For example, the device ceases to display the passcode entry user interface, ceases to accept input for the passcode entry user interface and/or disables unlocking via the passcode entry user interface even if the current passcode is entered in the passcode entry user interface.

In some embodiments, in response to receiving the passcode, the device determines (2426) whether data-preclusion criteria have been met, the data-preclusion criteria including a criterion that is met when at least a second number of unsuccessful passcode unlock attempts have been made (e.g., between 5 and 20 unsuccessful passcode unlock attempts). Alternatively, the data-preclusion criteria includes a criterion that is met when at least the second number of unsuccessful passcode unlock attempts have been made within a predefined time period. In accordance with a determination that the data-preclusion criteria have been met, the device renders private data stored on the device unusable. For example, the device deletes, encrypts or otherwise removes the ability to access private data such user communications, contact information, financial information, account information and optionally other data on the device. In some embodiments, when the data-preclusion criteria have been met, the device performs a device-disable operation that renders the device unusable.

In some embodiments, the passcode entry user interface includes (2428) a progress indicator that provides a visual indication of progress toward entering a passcode when characters are entered via the passcode entry user interface. For example, the progress indicator is a sequence of circles or other geometric shapes (e.g., as in FIGS. 23K to 23O) that each correspond to a character in the passcode, which are filled in or highlighted as characters are entered in the passcode entry user interface.

In some embodiments, while the passcode entry user interface is displayed on the display, the device detects (2430) a fingerprint on the fingerprint sensor, and in response to detecting the fingerprint on the fingerprint sensor, displays an animation in the progress indicator that indicates progress towards unlocking the device. For example, an animation that indicates that progress is being made toward unlocking the device (e.g., in FIGS. 23Y to 23CC) is provided in response to detecting the fingerprint, even though the user at the moment is not entering individual characters in the passcode with a keyboard.

In some embodiments, the device receives (2432) an unlock request to unlock the device that includes authentication information. For example, the device receives a passcode entered via the passcode entry user interface or a fingerprint detected on a fingerprint sensor. While receiving the authentication information, the device displays an animation of the progress indicator changing from a first state (e.g., the progress indicator comprising a sequence of empty circles or other geometric objects as in FIG. 23Y) to a second state (e.g., the progress indicator comprising a sequence of full circles or other geometric objects as in FIG. 23CC). In response to receiving the unlock request, the device determines whether the authentication information is sufficient to unlock the device. In accordance with a determination that the authentication information is sufficient to unlock the device (e.g., a passcode that matches a previously established passcode or a fingerprint that matches a previously enrolled fingerprint that is authorized to unlock the device), the device transitions the device from the locked mode of operation to the unlocked mode of operation, and in accordance with a determination that the authentication information is not sufficient to unlock the device (e.g., a passcode that does not match a previously established passcode or a fingerprint that does not match a previously enrolled fingerprint authorized to unlock the device), the device maintains the device in the locked mode of operation and displays an authentication rejection animation (e.g., shaking the progress indicator from side to side) in which the progress indicator changes (e.g., reverts or is reset) from the second state to the first state. In some embodiments, the same authentication rejection animation is displayed regardless of whether the authentication information is a passcode or a fingerprint.

The method 2400 further includes: in accordance with a determination that the first input meets the first unlock-failure criteria, the device maintains (2434) the device in the locked mode and adjusts unlock settings of the device so that the device is enabled to be unlocked via an unlock operation in a first set of one or more unlock operations. For example, the device enables passcode entry by displaying a passcode interface in addition to still permitting use of the fingerprint sensor to unlock in the first set of unlock operations. In some embodiments, the first set of unlock operations includes (2436) an unlock operation that uses a fingerprint to unlock the device and another unlock operation that uses a passcode to unlock the device. In some embodiments, the device is enabled to be unlocked using a fingerprint when the device is configured to transition from the locked mode of operation to the unlocked mode of operation in response to detecting a fingerprint on the fingerprint sensor that matches a previously enrolled fingerprint (e.g., an enrolled fingerprint authorized to unlock the device). In some embodiments, the device is enabled to be unlocked using a passcode when the device is configured to transition from the locked mode of operation to the unlocked mode of operation in response to detecting entry of a passcode that matches a previously established passcode.

In accordance with a determination that the first input meets the second unlock-failure criteria, the device maintains (2438) the device in the locked mode and adjusts unlock settings so that the device is enabled to be unlocked via an unlock operation in a second set of one or more unlock operations that is different from the first set of unlock operations. For example, the device enables the passcode entry but fingerprint authentication is disabled in the second set of unlock operations. In some embodiments, the second set of unlock operations includes (2440) an unlock operation that uses a passcode to unlock the device and excludes an unlock operation that uses a fingerprint to unlock the device. For example, FIG. 23T shows a user interface corresponding to a second set of unlock operations that includes an unlock operation that uses a passcode to unlock the device and excludes an unlock operation that uses a fingerprint to unlock the device.

In some embodiments, the first input includes a fingerprint input on the fingerprint sensor. The first unlock-failure criteria includes (2442) a criterion that is met when the device has detected at least a first threshold number of unsuccessful attempts to unlock the device with one or more unrecognized fingerprints (e.g., detected fingerprints that are not found to match any of the enrolled fingerprints), and the second unlock-failure criteria includes a criterion that is met when the device has detected at least a second threshold number of unsuccessful attempts to unlock the device with one or more unrecognized fingerprints, where the second threshold number is greater than the first threshold number. For example, the second unlock-failure criteria are met when the device has detected five unsuccessful fingerprint authorization attempts. In some embodiments, the device maintains a counter of the number of unsuccessful attempts to unlock the device, where such record is only reset after successfully unlocking the device. In some embodiments, the device maintains a counter of the number of unsuccessful attempts to unlock the device by fingerprint detection, where such record is only reset after successfully unlocking the device.

In some embodiments, the first unlock-failure criteria includes (2444) a criterion that is met when the device has detected less than the second number of unsuccessful attempts to unlock the device with one or more unrecognized fingerprints. For example, the first unlock-failure criteria are met when the device has detected one to four unsuccessful fingerprint authorization attempts.

It should be understood that the particular order in which the operations in FIGS. 24A-24D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the "Description of Embodiments" section above) are also applicable in an analogous manner to method 2400 described above with respect to FIGS. 24A-24D. For example, the fingerprints, contacts, gestures and user interface objects described above with reference to method 2400 optionally have one or more of the characteristics of the fingerprints, contacts, gestures and user interface objects described herein with reference to other methods described herein (e.g., those listed in the "Description of Embodiments" section above). For brevity, these details are not repeated here.

Figure 25:
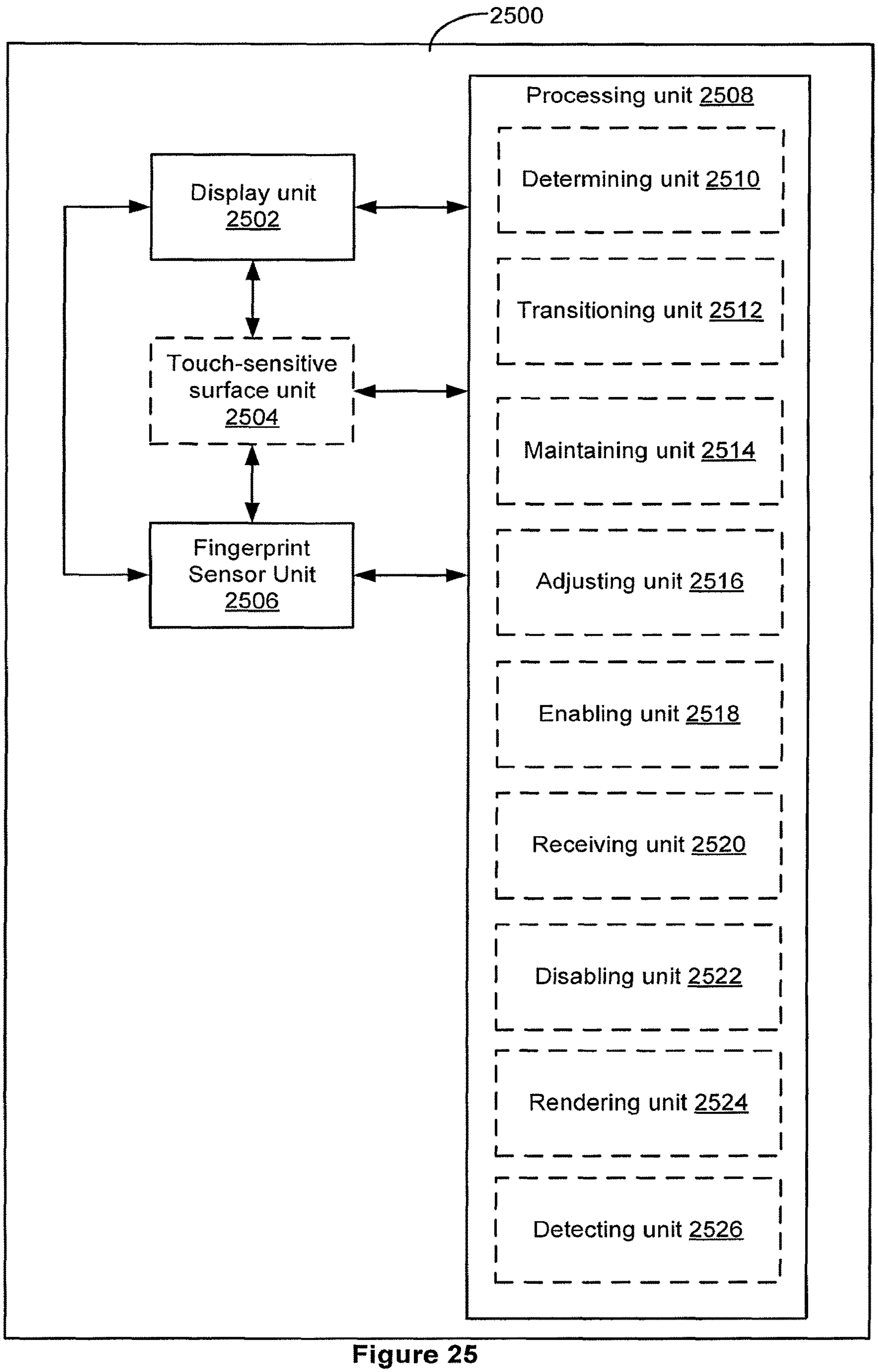
FIG. 25 is a functional block diagram of an electronic device in accordance with some embodiments.

In accordance with some embodiments, FIG. 25 shows a functional block diagram of an electronic device 2500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes a display unit 2502 configured to display a graphical user interface, a fingerprint sensor unit 2506; and a processing unit 2508 coupled to the display unit 2502 and the fingerprint sensor unit 2506. In some embodiments, the electronic device 2500 includes a touch-sensitive surface unit 2504 configured to receive contacts, coupled to the processing unit 2508, the fingerprint sensor unit 2506 and the display unit 2502. In some embodiments, the processing unit 2508 includes a determining unit 2510, a transitioning unit 2512, a maintaining unit 2514, an adjusting unit 2516, an enabling unit 2518, a receiving unit 2520, a disabling unit 2522, a rendering unit 2524 and a detecting unit 2526.

While the device is in a locked mode of operation in which access to a respective set of features of the electronic device is locked, the fingerprint sensor unit 2508, detects a first input that corresponds to a request to initiate unlocking the device. In response to detecting the first input with fingerprint sensor unit 2506, processing unit 2508 is configured to: determine whether the first input meets one of unlock criteria, first unlock-failure criteria, or second unlock-failure criteria (e.g., with determining unit 2510). Processing unit 2508 is further configured to: in accordance with a determination that the first input meets the unlock criteria, transition the device from the locked mode to an unlocked mode in which the respective set of features of the electronic device is unlocked (e.g., with transitioning unit 2512). Processing unit 2508 is further configured to: in accordance with a determination that the first input meets the first unlock-failure criteria, maintain (e.g., with maintaining unit 2514) the device in the locked mode and adjust (e.g., with adjusting unit 2516) unlock settings so that the device is enabled to be unlocked via an unlock operation in a first set of one or more unlock operations. Processing unit 2508 is further configured to: in accordance with a determination that the first input meets the second unlock-failure criteria, maintain (e.g., with maintaining unit 2514) the device in the locked mode and adjust (e.g., with adjusting unit 2516) unlock settings so that the device is enabled to be unlocked via an unlock operation in a second set of one or more unlock operations that is different from the first set of unlock operations.

In some embodiments, the first input includes a fingerprint input on fingerprint sensor unit 2506, the first unlock-failure criteria includes a criterion that is met when the device has detected at least a first threshold number of unsuccessful attempts to unlock the device with one or more unrecognized fingerprints, and the second unlock-failure criteria includes a criterion that is met when the device has detected at least a second threshold number of unsuccessful attempts to unlock the device with one or more unrecognized fingerprints, where the second threshold number is greater than the first threshold number.

In some embodiments, prior to detecting the first input, the device displays with display unit 2502, an unlock-initiation user interface that does not include a passcode entry user interface. Furthermore, while the unlock-initiation user interface is displayed, the device is enabled to be unlocked using a fingerprint but is not enabled to be unlocked using a passcode.

In some embodiments, the processing unit 2508 is further configured to enable (e.g., with enabling unit 2518) the device to be unlocked using a fingerprint, prior to detecting the first input, while the display of the device is in a low power mode, without enabling the device to be unlocked using a passcode.

In some embodiments, in response to detecting the first input and in accordance with a determination that the first input does not meet the unlock criteria, the device displays with display unit 2502 a passcode entry user interface.

In some embodiments, in accordance with the determination that the first input meets the first unlock-failure criteria, the device displays with display unit 2502 a first unlock interface that includes the passcode entry user interface, and a visual indication that the device is enabled to be unlocked using a fingerprint. In some embodiments, in accordance with the determination that the first input meets the second unlock-failure criteria, the device displays with display unit 2502 a second unlock interface that includes the passcode entry user interface, and a visual indication that the device has been disabled from being unlocked using a fingerprint.

In some embodiments, prior to detecting the first input, the device displays with display unit 2502 an unlock-initiation user interface that does not include a passcode entry user interface. Furthermore, while the unlock-initiation user interface is displayed, the device is enabled to be unlocked using a fingerprint but is not enabled to be unlocked using a passcode.

In some embodiments, the processing unit 2508 is further configured to enable (e.g., with enabling unit 2518) the device to be unlocked using a fingerprint, prior to detecting the first input, while the display of the device is in a low power mode, without enabling the device to be unlocked using a passcode.

In some embodiments, in response to detecting the first input and in accordance with a determination that the first input does not meet the unlock criteria, the device displays with display unit 2502 a passcode entry user interface.

In some embodiments, in accordance with the determination that the first input meets the first unlock-failure criteria, the device displays with display unit 2502 a first unlock interface that includes the passcode entry user interface and a visual indication that the device is enabled to be unlocked using a fingerprint.

In some embodiments, while the device displays with display unit 2502 the passcode entry user interface, the processing unit 2508 is further configured to: receive (e.g., with receiving unit 2520) a passcode entered via the passcode entry user interface; transition (e.g., with transitioning unit 2512) the device from the locked mode of operation to the unlocked mode of operation, in response to receiving the passcode and in accordance with a determination that the passcode matches a current passcode for the device; and maintain (e.g., with maintaining unit 2514) the device in the locked mode, in response to receiving the passcode and in accordance with a determination that the passcode does not match the current passcode for the device.

In some embodiments, the processing unit 2508 is further configured to: determine (e.g., with determining unit 2510), in response to receiving the passcode, whether passcode-timeout criteria have been met, the passcode-timeout criteria including a criterion that is met when at least a first number of unsuccessful passcode unlock attempts have been made, and disable (e.g., with disabling unit 2522) the device from being unlocked using a passcode for a timeout period of time, in accordance with a determination that the passcode-timeout criteria have been met.

In some embodiments, the processing unit 2508 is further configured to: determine (e.g., with determining unit 2510), in response to receiving the passcode, whether data-preclusion criteria have been met, the data-preclusion criteria including a criterion that is met when at least a second number of unsuccessful passcode unlock attempts have been made, and render (e.g., with rendering unit 2524), in response to receiving the passcode, private data stored on the device unusable, in accordance with a determination that the data-preclusion criteria have been met.

In some embodiments, while the passcode entry user interface is displayed on the display, the device detects, with the fingerprint sensor unit 2506, a fingerprint on fingerprint sensor unit 2506, and in response to detecting the fingerprint on fingerprint sensor unit 2506, displays with display unit 2502, an animation in the progress indicator that indicates progress towards unlocking the device (e.g., progress toward filling in the passcode).

In some embodiments, processing unit 2508 is further configured to: receive (e.g. with receiving unit 2520), an unlock request to unlock the device that includes authentication information. In such embodiments, display unit 2502 displays an animation of the progress indicator changing from a first state to a second state, while receiving the authentication information. Processing unit 2508 is further configured to determine (e.g., with determining unit 2510), in response to receiving the unlock request, whether the authentication information is sufficient to unlock the device, transition (e.g. with transitioning unit 2512) the device from the locked mode of operation to the unlocked mode of operation, in accordance with a determination that the authentication information is sufficient to unlock the device; and maintain (e.g., with maintaining unit 2514), the device in the locked mode of operation, in accordance with a determination that the authentication information is not sufficient to unlock the device, while display unit 2502 displays an authentication rejection animation in which the progress indicator changes from the second state to the first state.

The operations in the information processing methods described above are, optionally implemented by one or more functional modules in information processing apparatus such as general purpose processors (e.g., as described above with respect to FIGS. 1A and 3) or application specific chips.

The operations described above with reference to FIGS. 24A-24D are, optionally, implemented by components depicted in FIGS. 1A-1B or FIG. 25. For example, detection operation 2406, determination operation 2410, and enablement operation 2404 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Controlling Access to Device Information and Features and Unlocking the Device Many electronic devices have graphical user interfaces that are displayed while the device is locked. For example, notifications and settings user interfaces can be displayed while the device is locked. However, displaying notifications or settings while the device is locked can compromise the device and/or user data, as an unauthorized user who has the device in his possession can read notifications or change device settings despite being an unauthorized user. However, suppressing display of all notifications and control of settings while the device is locked inconveniences authorized users of the device.

The methods below describe an improved way to control access to device information and features and to unlock the device. While a device with a fingerprint sensor is locked, a user interface—such as one for viewing notifications, changing settings, or viewing photos—is brought up in a limited-access mode. In a limited-access mode, the notification, settings, or photo viewing user interface provides less than full access to device information and features. For example, notifications are partially or fully redacted, device settings that can be changed are restricted, or previously stored digital photographs are not viewable. While viewing the user interface in a limited access mode, the user attempts to authenticate himself or herself with a fingerprint on the device's fingerprint sensor. If authentication is successful, the user interface changes to a full-access mode and the device is unlocked. The device remains unlocked when the full-access user interface is dismissed. If authentication is not successful, the user interface remains in its limited-access mode and the device remains locked. The device remains locked when the limited-access user interface is dismissed. This method increases security by controlling access to device information and controls prior to fingerprint authentication, yet seamlessly provides immediate access to more device information and features and unlocks the device upon successful fingerprint authentication.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 26A-26X and 27A-27D includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 26A-26X and 27A-27D will be discussed with reference to a device with a touch screen 112 and a separate fingerprint sensor 359-2, however analogous operations are, optionally, performed on a device with an integrated fingerprint sensor 359-1 in response to detecting the inputs described in FIGS. 26A-26X on the integrated fingerprint sensor 359-1 while displaying the user interfaces shown in FIGS. 26A-26X on the display 450. Additionally, analogous operations are, optionally, performed on a device with a display 450 and a separate touch-sensitive surface 451 instead of a touch screen 112 in response to detecting the contacts described in FIGS. 26A-26X on a fingerprint sensor 169 (e.g., an integrated fingerprint sensor 359-1 or a separate fingerprint sensor 359-2) and/or the separate touch-sensitive surface 451 while displaying the user interfaces shown in FIGS. 26A-26X on the display 450; in such embodiments, the contacts shown in FIGS. 26A-26X optionally represent both a focus selector that corresponds to a location on the display 450, and a contact that corresponds to a location of a contact or gesture performed on the separate touch-sensitive surface (e.g., touch-sensitive surface 451), where the focus selector is, optionally: a respective contact, a representative point corresponding to a contact (e.g., a centroid of a respective contact or a point associated with a respective contact), or a centroid of two or more contacts detected on the touch screen 112 and is, optionally, replaced with a displayed cursor.

FIG. 26A illustrates locked device interface 2600 displayed on a display of a device (e.g., on touch screen 112 of device 100). Locked device interface 2600 is a user interface that indicates to users of device 100 that device 100 is in locked mode (i.e., device 100 is locked), and thus access to one or more features of device 100 is locked. For example, while device 100 is locked, user interface 400 is inaccessible (and thus the user is unable to launch at least some applications on device 100). In some embodiments, locked device interface 2600 provides limited information to users. For example, locked device interface 2600 includes current date and time 2602 and instructions or hints 2604 on how to unlock device 100.

Locked device interface 2600 also includes one or more user interface objects for displaying respective user interfaces or launching specific applications. For example, locked device interface 2600 includes handles 2606 and 2608, and icon 2610. Handle 2606 is adjacent to the top edge of touch screen 112, and 2608 is adjacent to the bottom edge of touch screen 112. A user performs a gesture (e.g., a swipe gesture) starting from handle 2606 to activate display of a notification interface (e.g., notification interface 2616, FIG. 26C). A user performs a gesture (e.g., a swipe gesture) starting from handle 2608 to activate display of settings-management interface (e.g., settings-management interface 2650, FIG. 26N). A user performs a gesture (e.g., a swipe gesture) on icon 2610 to activate display of a camera interface (e.g., camera interface 2678, FIG. 26U).

FIG. 26A illustrates a gesture detected on touch screen 112 while device 100 is in a locked mode. The gesture (e.g., a swipe gesture) includes contact 2612 detected on handle 2606, and contact 2612, while detected on handle 2606, moving in direction 2614. In response to detecting the gesture, device 100 displays notification interface 2616 on touch screen 112, as shown in FIG. 26C, and device 100 remains in locked mode.

Figure 26B:
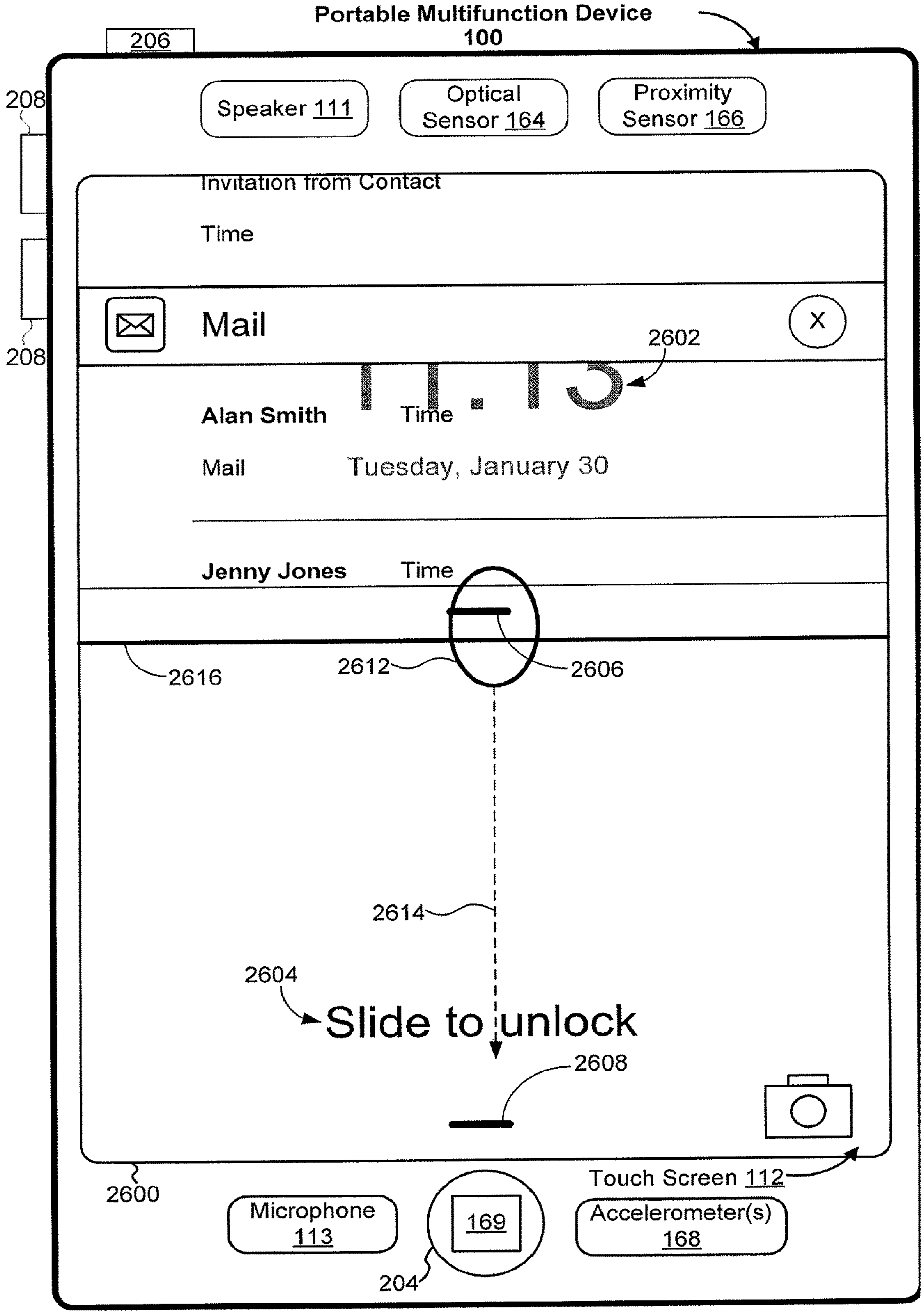
Figure 26C:
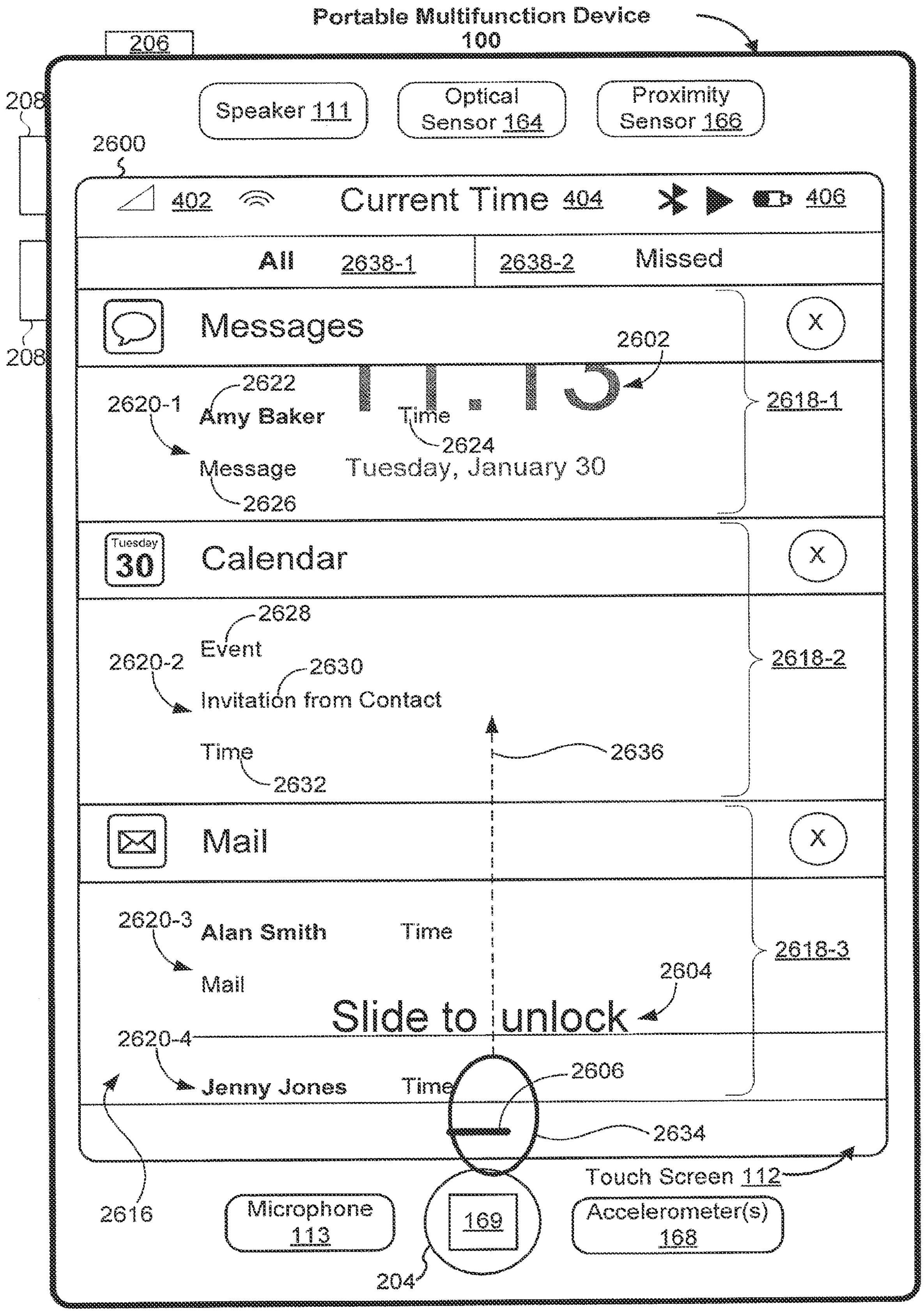

In some embodiments, the transition from displaying locked device interface 2600 to displaying notification interface 2616 includes an animation in which notification interface 2616 slides onto touch screen 112 in accordance with the movement of contact 2612, as shown in FIGS. 26A-26C; contact 2612 swipes notification interface 2616 onto touch screen 112.

In the animation, notification interface 2616 slides over locked screen interface 2600. In some embodiments, notification interface 2616 is translucent and locked device interface 2600 is partially visible (e.g., visible but blurred or faint) under notification interface 2616, as shown in FIG. 26C. For example, current date and time 2602 and unlock instructions 2604 are visible but faint under notification interface 2616. In some other embodiments, notification interface 2616 is opaque and locked device interface 2600 is not visible under notification interface 2616.

Notification interface 2616 is a user interface for displaying notifications 2620 associated with respective applications on device 100. In some embodiments, notification interface 2616 includes one or more sections 2618. Each respective section 2618 is associated with a respective application on device 100, and displays one or more notifications 2620 associated with that respective application. A respective notification 2620 includes one or more portions for displaying respective fields of information. For example, a notification for a message or email includes respective portions for a sender, a date/time, and an indicator of content (e.g., the subject, and/or a snippet of the message/email body). As another example, a notification for a calendar event invite includes respective portions for a name and/or description of the event, a source of the invite (e.g., a contact that sent the invite), and a date/time of the event. What portions and information a notification 2620 includes is typically determined by the respective associated application.

In some embodiments, notification interface 2616 also includes two or more view filters 2638. A respective view filter 2638 corresponds to a respective set of criteria for filtering notifications 2620 displayed in notification interface 2616; notifications 2620 that satisfy the criteria are displayed and the notifications 2620 that don't satisfy the criteria are hidden. For example, in FIG. 5C, view filter "All" 2638-1 is active; all outstanding notifications 2620 (other than notifications that are hidden in accordance with restrictions on access to notification interface 2616, as described below) are displayed. A non-active view filter 2638 is activated by a gesture performed on that view filter (e.g., a tap gesture). For example, in response to detecting a tap gesture performed on view filter "Missed" 2638-2, device 100 displays notifications 2620 that have not been addressed within a predetermined time period (e.g., the prior 24 hours) in notification interface 2616, and omits display of notifications 2620 that do not satisfy this not-addressed-within-time-period criterion.

Figure 26D:
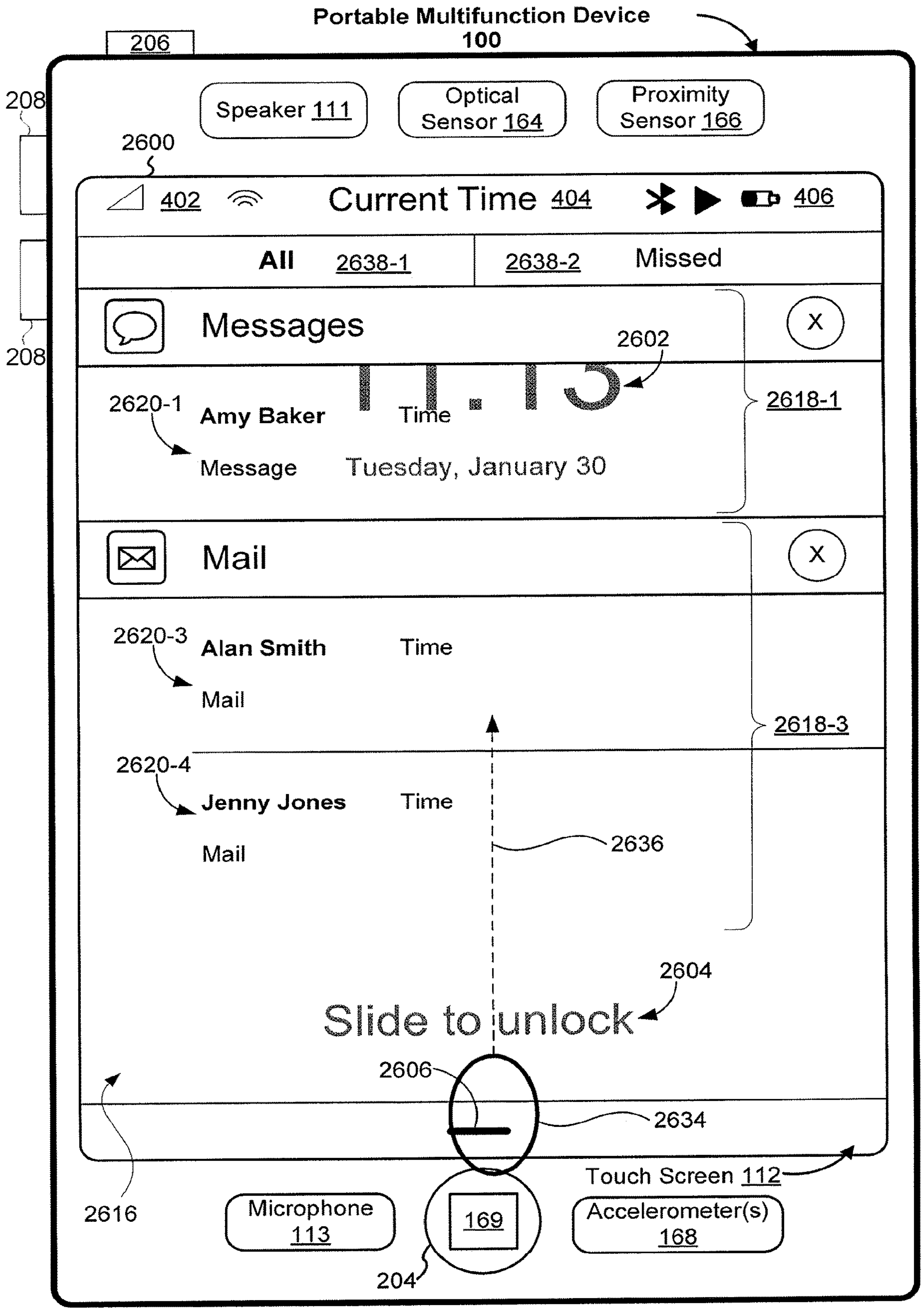

Because device 100 is locked when the gesture with contact 2612 is detected, notification interface 2616 is displayed in a limited-access mode. While notification interface 2616 is in the limited-access mode, access to notification interface 2616 is restricted. In some embodiments, restrictions on access to notification interface 2616 include one or more of the following: redaction of information in one or more of notifications 2620, omission from display (e.g., hiding from display) of one or more sections 2618 that otherwise have outstanding notifications, and omission from display of one or more view filters 2638. For example, FIG. 26C shows redacted notifications 2620 in notification interface 2616. As an alternative example. FIG. 26D shows redacted notifications 2620 and omission of section 2618-2 in notification interface 2616. Also, FIGS. 26C and 26D both show that view filter "Today" 2638-3 (FIG. 26H) is hidden.

In some embodiments, redaction of a notification 2620 includes replacement of all or some portions of the notification with generic, placeholder text. For example, in FIG. 5C, notification 2620-1 is a notification for a message received by a messaging application on device 100. Notification 2620-1 includes portion 2622 for identifying the sender of the message, portion 2624 for a timestamp of the message (e.g., date/time the message was sent or received), and portion 2626 for all or some (e.g., a snippet) of the contents of the message. When notification 2620-1 is not redacted, the portions 2622, 2624, and 2626 are filled with their actual respective contents (i.e., actual sender name, actual timestamp, and actual message contents, respectively). When notification 2620-1 is redacted, one or more of portions 2622, 2624, and 2626 are replaced with respective generic text. As shown in FIG. 26C, notification 2620-1 is partially redacted. Portion 2622 shows the actual sender name, but portion 2624 shows generic text "Time" instead of the actual timestamp, and portion 2626 shows generic text "Message" instead of a snippet of the actual message.

As another example, notification 2620-2 in FIG. 26C is a notification for a calendar event invite received by a calendar application on device 100. Notification 2620-2 includes portion 2628 for the name or description of the event, portion 2630 for a source of the invite (e.g., the inviter), and portion 2632 for the time of the event. In FIG. 26C, actual contents in portions 2628, 2630, and 2632 are replaced with generic text "Event," "Invitation from Contact," and "Time," respectively.

In some other embodiments, redaction of a notification 2620 includes visual obscuring of all or some portions of the notification 2620, as opposed to replacement of all or some portions of the notification 2620 with respective generic text. The visual obscuring includes, for example, blacking out (e.g., with censor bars), blurring, or pixelating (e.g., as described above with reference to method 2100).

In some embodiments, restrictions on access to notification interface 2616 further include an inability of users to open or otherwise access the underlying content or application corresponding to a notification. For example, while notification interface 2616 is displayed in full-access mode, a user can perform a gesture (e.g., a tap gesture) on notification 2620-1 to open a messages application and view the full message corresponding to notification 2620-1, perform a gesture on notification 2620-2 to open a calendar application and view the full event invite corresponding to notification 2620-2, and perform a gesture on notification 2620-3 or 2620-4 to open an email application and view the respective full message corresponding to notification 2620-3 or 2620-4, respectively. Conversely, while notification interface 2616 is displayed in limited-access mode, these full access features are disabled; gestures detected on notifications 2620 do not activate access to the full content or launch the corresponding application.

While notification interface 2616 is displayed in limited-access mode, a gesture can be performed by the user to dismiss notification interface 2616. For example, FIGS. 26C and 26D each show a gesture detected on touch screen 112. The gesture (e.g., a swipe gesture) includes contact 2634 detected on handle 2606, and contact 2634, while detected on handle 2606, moving in direction 2636. In response to detecting the gesture, device 100 displays locked device interface 2600 on touch screen 112, as shown in FIG. 26F. Because no user has been successfully authenticated since device 100 entered into locked mode, device 100 remains in locked mode (and thus displays locked device interface 2600 on touch screen 112).

Figure 26E:
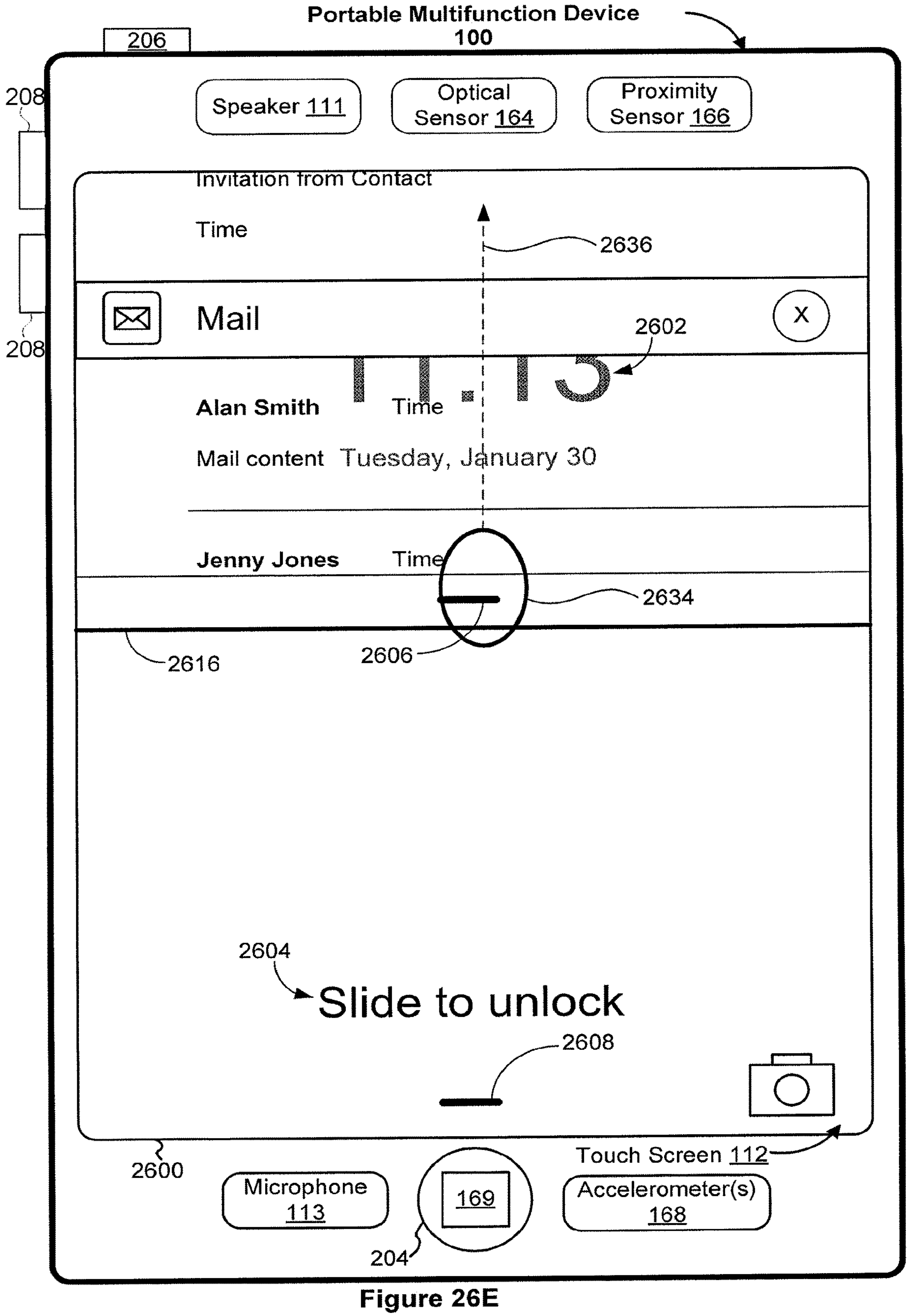
Figure 26F:

In some embodiments, the transition from displaying notification interface 2616 to displaying locked device interface 2600 includes an animation in which notification interface 2616 slides off touch screen 112, following the movement of contact 2634, revealing locked device interface 2600, as shown in FIGS. 26D-26F; contact 2634 swipes notification interface 2616 off touch screen 112.

Figure 26G:
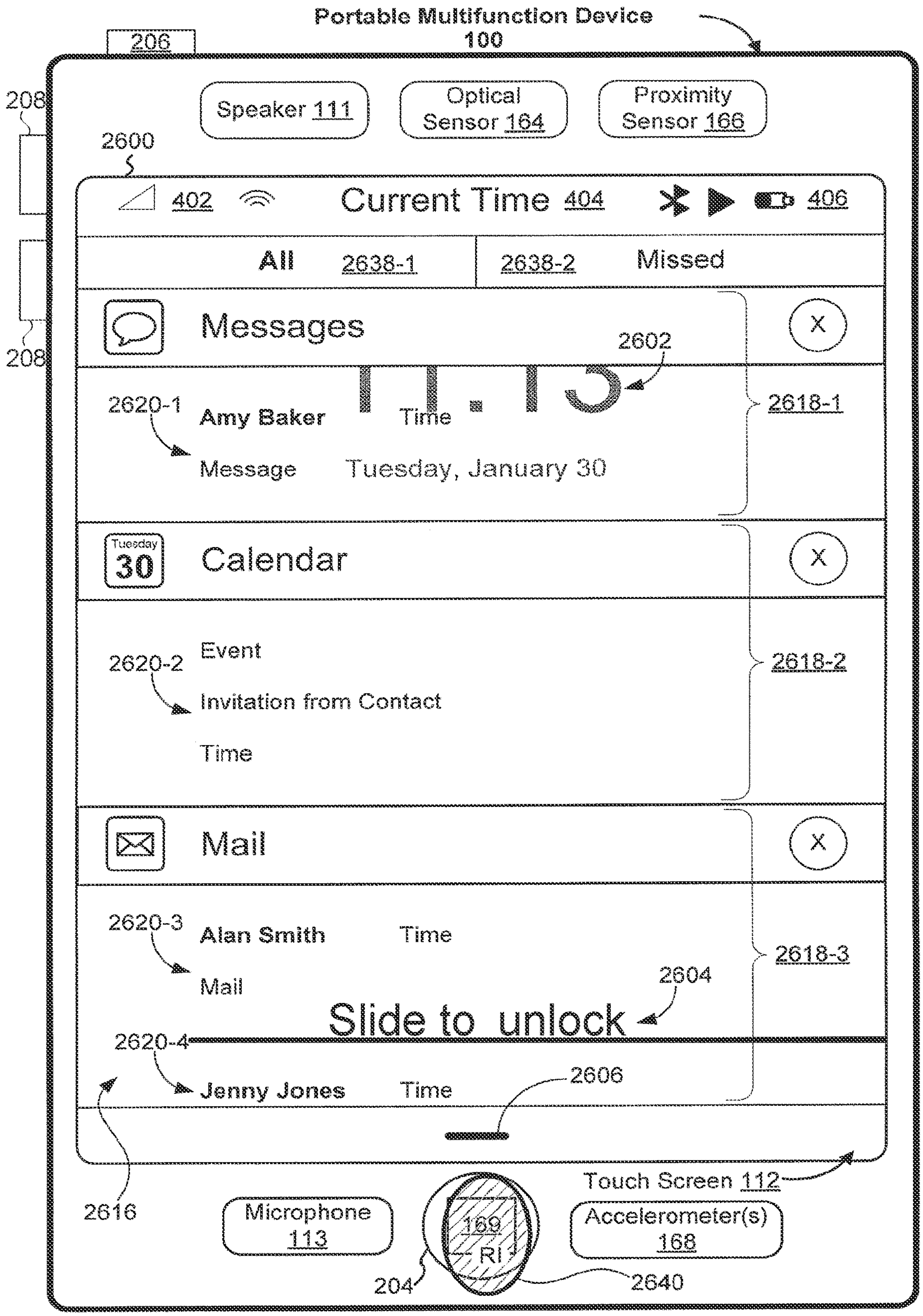

Continuing in FIG. 26G, which includes the user interface shown in FIG. 26C, fingerprint 2640 is detected on fingerprint sensor 169. Device 100 determines if fingerprint 2640 is one of one or more fingerprints enrolled with device 100. If device 100 determines that fingerprint 2640 is not one of the enrolled fingerprints (e.g., the user applying fingerprint 2640 has not been authenticated), then device 100 maintains display of notification interface 2616 in limited-access mode and device 100 maintains itself in locked mode.

Figure 26H:
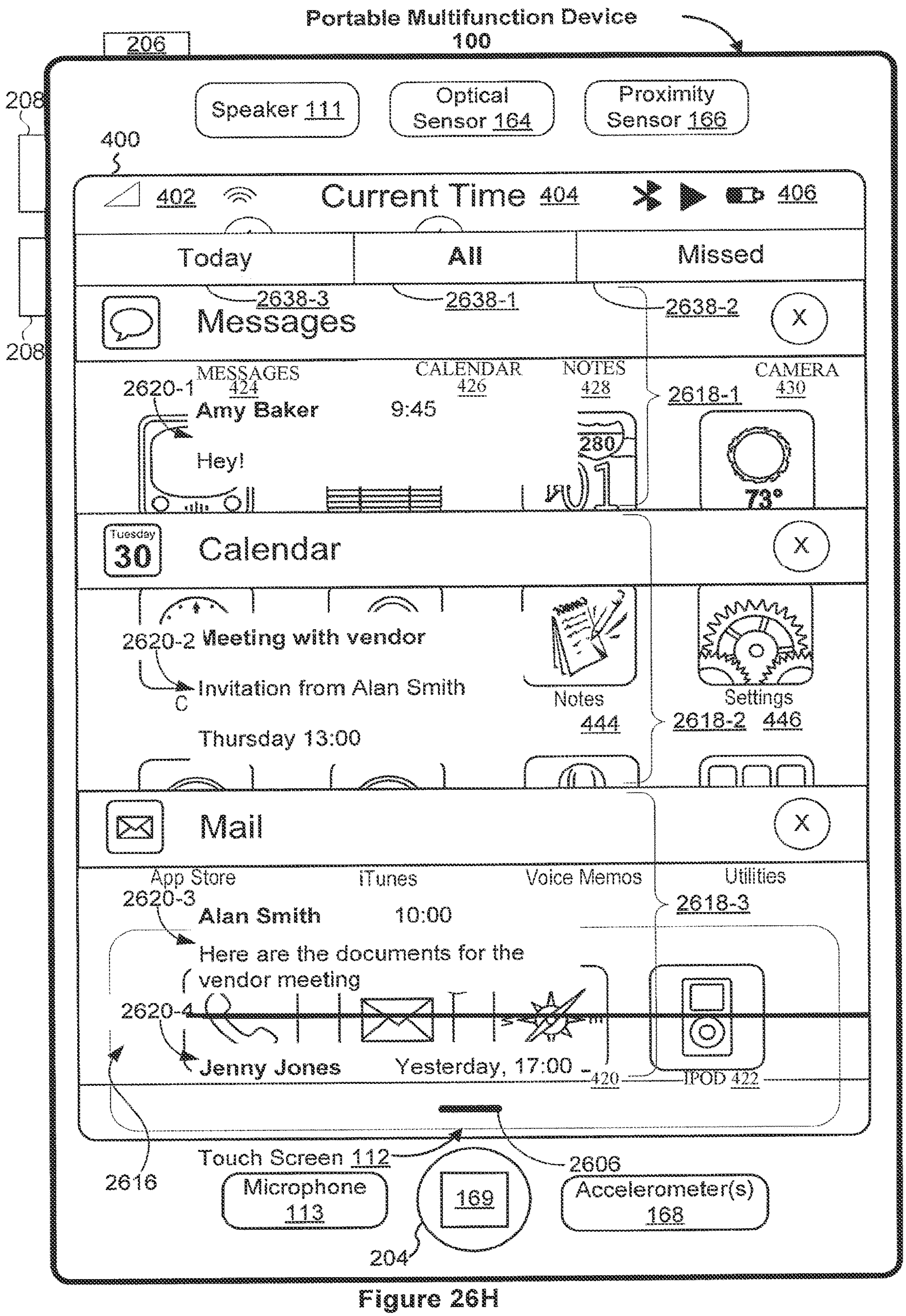

If device 100 determines that fingerprint 2640 is one of the enrolled fingerprints (e.g., the user applying fingerprint 2640 has been successfully authenticated), then device 100 displays notification interface 2616 in full-access mode and device 100 transitions itself from locked mode to unlocked mode, as shown in FIG. 26H. Display of notification interface 2616 in full-access mode includes one or more of the following: un-redacting notifications 2620 that were redacted while notification interface 2616 was displayed in limited-access mode, displaying any section 2618 that was omitted from display while notification interface 2616 was displayed in limited-access mode, and displaying (and making accessible) view filters 2638 that were omitted from display (and thus inaccessible) while notification interface 2616 was displayed in limited-access mode. Thus, for example, as shown in FIG. 26H, notifications 2620 are not redacted; the portions in the respective notifications 2620 display actual content. Also, section 2618-2 is displayed (compared to device 100 as depicted in FIG. 26D). Further, view filter "Today" 2638-3 is displayed; when view filter "Today" 2638-3 is activated, the notifications 2620 displayed in notification interface 2616 are notifications for the current day (e.g., messages or mails received on the current day, calendar events for the current day).

As described above, if fingerprint 2640 is one of the enrolled fingerprints, then device 100 transitions itself from locked mode to unlocked mode. The transition includes transitioning from locked device interface 2600 to user interface 400, which takes place below notification interface 2616 because notification interface 2616 is overlaid above locked device interface 2600 and user interface 400. In some embodiments, this transition is not visible to the user (e.g., because notification interface 2616 is opaque). In some embodiments, notification interface 2616 is translucent, and thus the transition is visible to the user (e.g., as an animation) but blurred or faint. As shown in FIGS. 26G-26H, when the transition to unlocked mode occurs, user interface elements in locked device interface 2600, such as date/time 2602 and instructions 2604, are no longer displayed below notification interface 2616, and application icons in user interface 400 are displayed below notification interface 2616 instead.

Figure 26I:
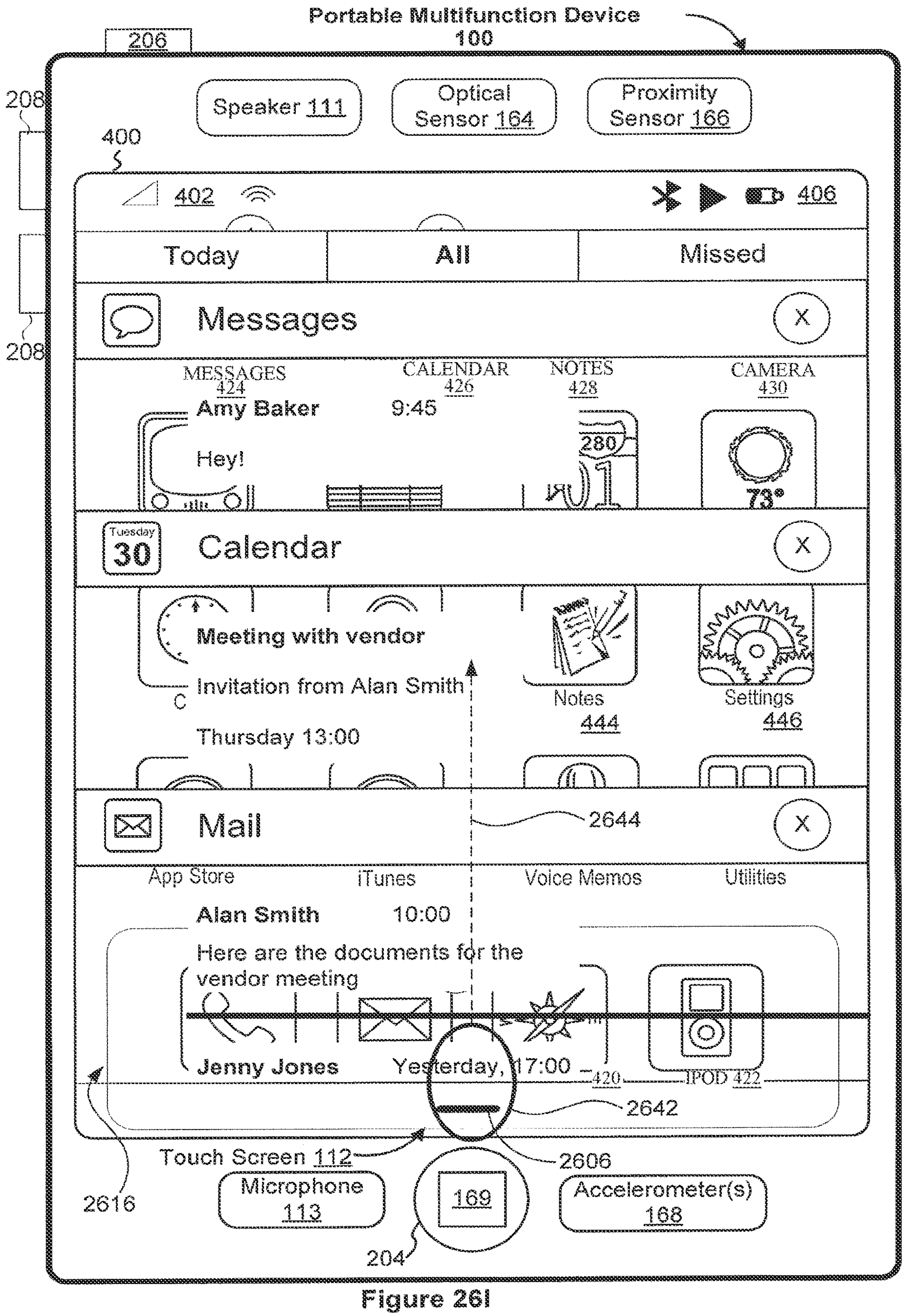
Figure 26J:
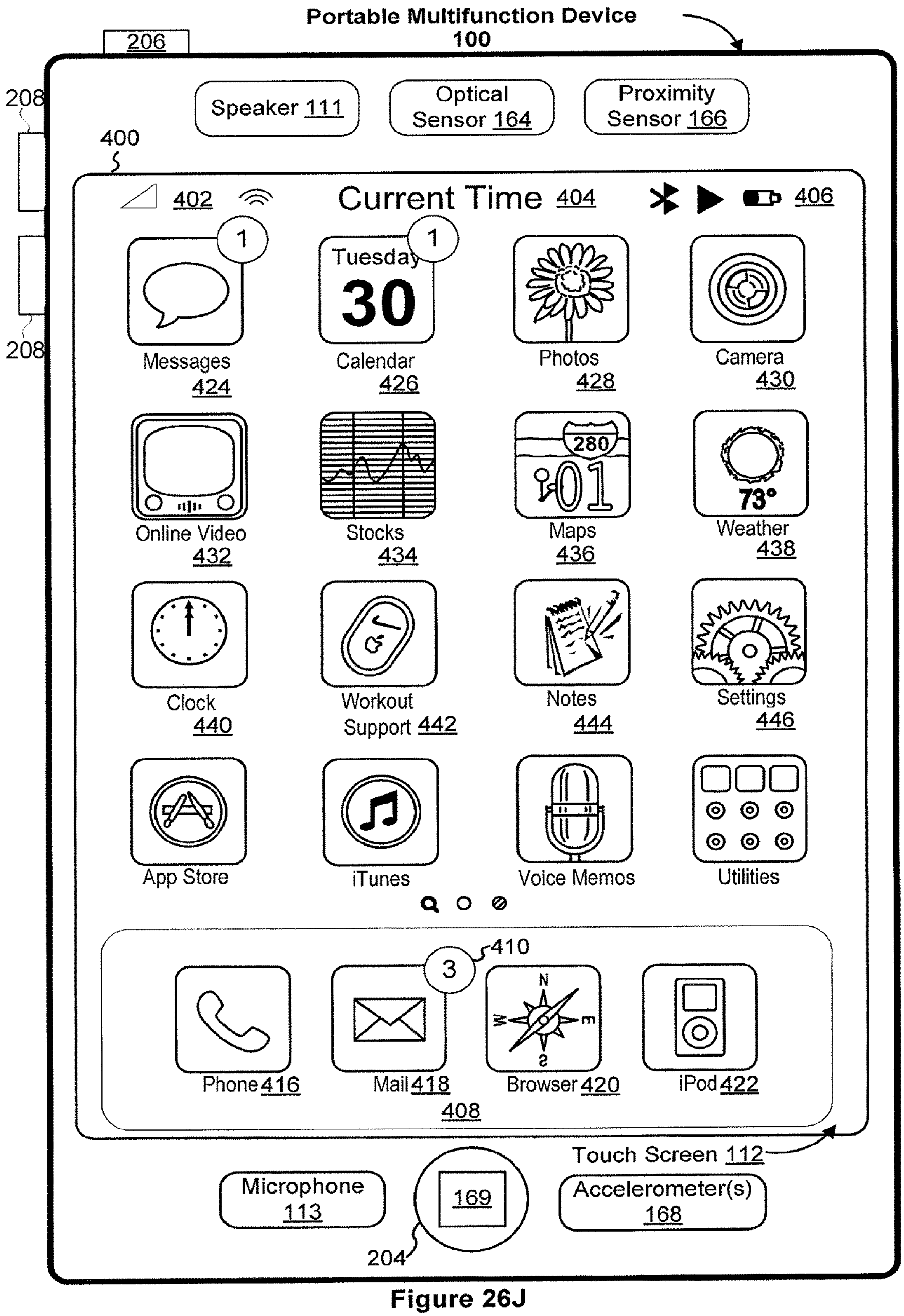

FIG. 26I shows notification interface 2616 displayed in full-access mode and device 100 in unlocked mode. While notification interface 2616 is displayed in full-access mode and device 100 is in unlocked mode, a gesture is detected on touch screen 112. The gesture (e.g., a swipe gesture) includes contact 2642 detected on handle 2606, and contact 2642, while detected on handle 2606, moving in direction 2644. In response to detecting the gesture, device 100 dismisses notification interface 2616 from touch screen 112, as shown in FIG. 26J. User interface 400 is displayed on touch screen 112, as device 100 remains in unlocked mode after dismissal of notification interface 2616; the user has access to applications that were previously inaccessible because user interface 400 was inaccessible.

Figure 26K:
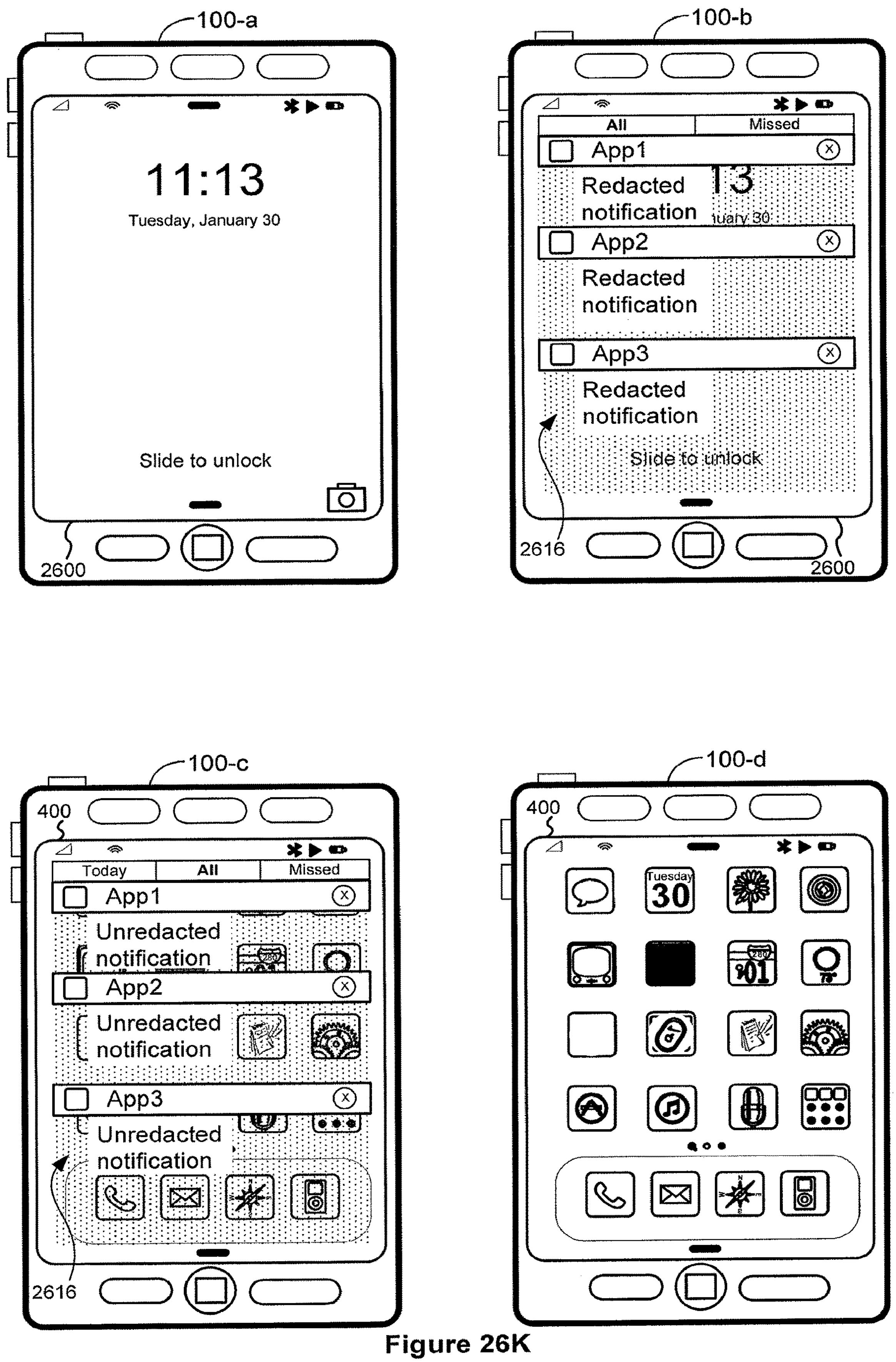

FIG. 26K summarizes the transition of device 100 (from device 100-*a* thru 100-*d*) from locked mode to unlocked mode when notification interface 2616 is displayed, as depicted in FIGS. 26A-26J. Device 100-*a* is in locked mode and locked device interface 2600 is displayed, and notification interface 2616 is not displayed. When display of notification interface 2616 is activated, as shown for device 100-*b*, locked device interface 2600 is partially visible under a translucent notification interface 2616 that is displayed in limited-access mode. When an enrolled fingerprint is detected, device 100 transitions from locked mode to unlocked mode and notification interface 2616 is displayed in full-access mode (device 100-*b* to device 100-*c*); locked device interface 2600 transitions to user interface 400. When notification interface 2616, displayed in full-access mode, is dismissed, user interface 400 is displayed on the display of device 100-*d*.

Figure 26L:
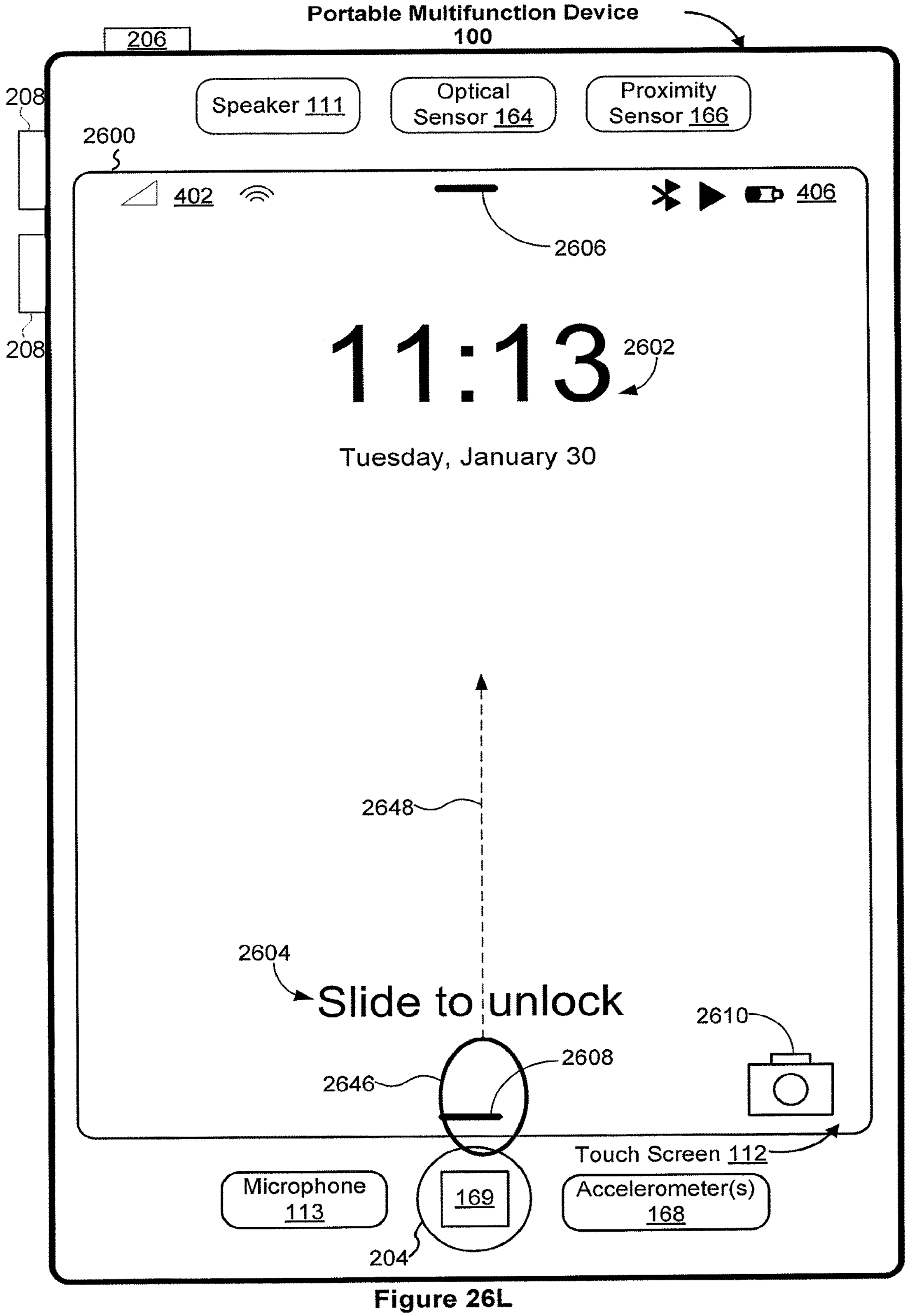

FIG. 26L illustrates locked device interface 2600 displayed on touch screen 112 of device 100; device 100 is in locked mode. FIG. 26L also illustrates a gesture detected on touch screen 112. The gesture (e.g., a swipe gesture) includes contact 2646 detected on handle 2608, and contact 2646, while detected on handle 2608, moving in direction 2648. In response to detecting the gesture, device 100 displays settings-management interface 2650 on touch screen 112, as shown in FIG. 26N, and device 100 remains in locked mode.

Figure 26M:
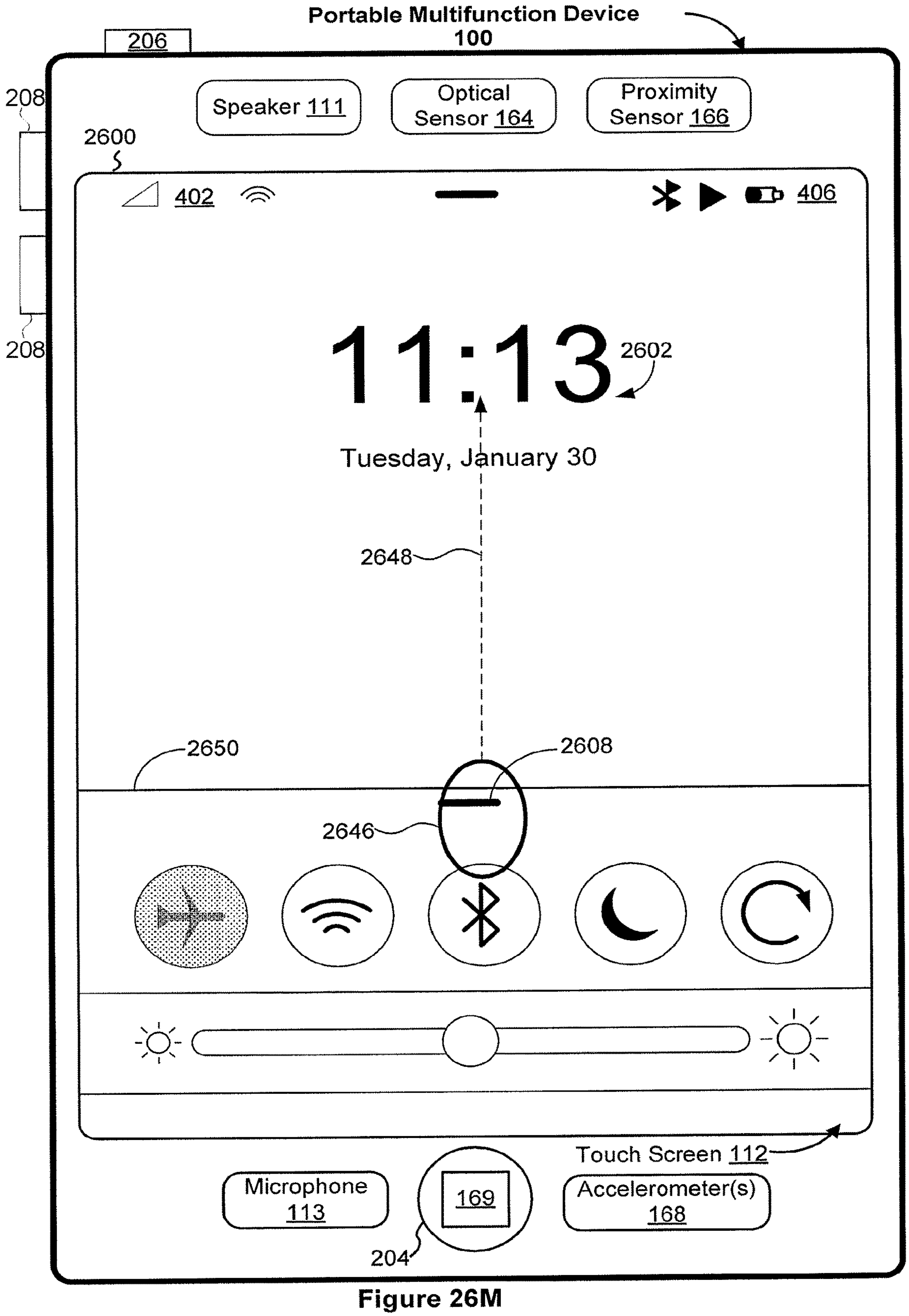
Figure 26N:
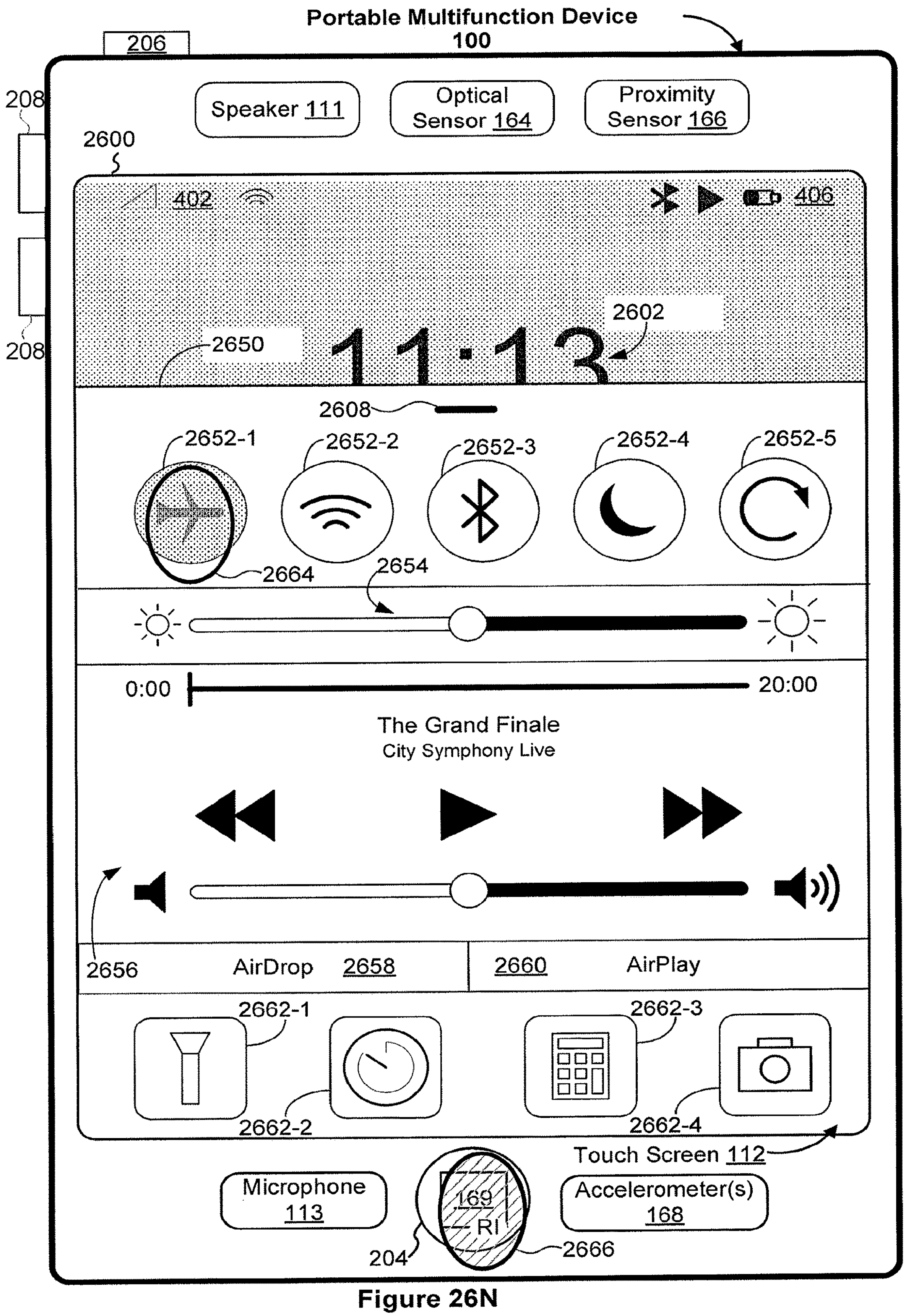

In some embodiments, the transition from displaying locked device interface 2600 to displaying settings-management interface 2650 includes an animation in which settings-management interface 2650 slides onto touch screen 112 in accordance with the movement of contact 2646, as shown in FIGS. 26L-26N; contact 2646 swipes settings-management interface 2650 onto touch screen 112.

In the animation, settings-management interface 2650 slides over locked screen interface 2600. In some embodiments, notification interface 2616 is opaque, and whatever portion of locked device interface 2600 that is overlaid by settings-management interface 2650 is not visible under settings-management interface 2650, and the portion of locked device interface 2600 not overlaid by settings-management interface 2650 is displayed in the clear or displayed as blurred or faint, as shown in FIG. 26N, for example. In some other embodiments, settings-management interface 2650 is translucent and locked device interface 2600 is visible but blurred or faint under settings-management interface 2650 (e.g., as with notification interface 2616 depicted in FIG. 26C).

Settings-management interface 2650 is a user interface associated with one or more device settings on device 100. Settings-management interface 2650 includes user interface objects 2652 for changing respective settings. For example, settings-management interface 2650 includes airplane mode icon 2652-1 for toggling airplane mode on/off (when airplane mode is on, device 100 does not transmit wireless signals), Wi-Fi icon 2652-2 for toggling Wi-Fi on or off, Bluetooth icon 2652-3 for toggling Bluetooth on or off, do-not-disturb icon 2652-4 for toggling a do-not-disturb mode on or off (when device 100 is in do-not-disturb mode, audible alerts for notifications 2620 are suppressed, but the notifications themselves are, optionally, still displayed on touch screen 112), and orientation lock icon 2652-5 for toggling an orientation lock on or off. A respective icon 2652 indicates the current status of the respective corresponding setting, and toggles the respective corresponding setting in response to activation of (e.g., by a tap gesture on) the respective icon 2652. Settings-management interface 2650 also optionally includes brightness control 2654 for controlling the brightness level of touch screen 112.

In some embodiments, settings-management interface 2650 also includes music playback controls 2656 for controlling music playback, icon 2658 for initiating a process for wirelessly sharing a file with another device, icon 2660 for initiating a process for wirelessly streaming media content to another device, and one or more icons 2662 for launching predetermined applications or activating predetermined functionality. For example, settings-management interface 2650 includes icon 2662-1 for launching a flashlight application or activating flashlight functionality, icon 2662-2 for launching a clock/timer application, icon 2662-3 for launching a calculator application, and icon 2662-4 for launching a camera application (e.g., camera module 143).

As device 100 was locked when the gesture with contact 2646 was performed, settings-management interface 2650 is displayed in a limited-access mode. While settings-management interface 2650 is in the limited-access mode, one or more of the icons, controls, etc. (e.g., any of icons 2652; brightness control 2654; music controls 2656; icons 2658, 2660, and 2662) for changing settings, launching applications, or activating functionality are disabled. For example, in FIG. 26N, icon 2652-1 is disabled. Tap gesture 2664 on icon 2652-1 does not toggle, and thus does not affect, the airplane mode. In some embodiments, the disablement of an icon 2652 is visually indicated by graying out or shading of the icon (e.g., as with icon 2652-1 in FIG. 26N).

While settings-management interface 2650 is displayed in limited-access mode, a gesture can be performed by the user to dismiss settings-management interface 2650, similar to the dismissal of notification interface 2616 as shown in FIGS. 26C-26F. For example, a gesture (e.g., a swipe gesture) on handle 2608 that is the reverse of the gesture with contact 2646 is detected (not shown) on touch screen 112 while settings-management interface 2650 is displayed in limited-access mode; the gesture is detected on handle 2608 and the corresponding contact moves in the direction opposite of direction 2648. In response to detecting the gesture, device 100 displays locked device interface 2600 on touch screen 112, as in FIG. 26L. Because no user has been successfully authenticated since device 100 entered into locked mode, device 100 remains in locked mode (and thus displays locked device interface 2600 on touch screen 112).

In some embodiments, the transition from displaying settings-management interface 2650 to displaying locked device interface 2600 includes an animation (not shown) in which settings-management interface 2650 slides off touch screen 112, following the movement of contact in the dismissal gesture, revealing locked device interface 2600, similar to the animation shown for the dismissal of notification interface 2616 shown in FIGS. 26D-26F; the dismissal gesture swipes settings-management interface 2650 off touch screen 112.

Returning to FIG. 26N, fingerprint 2666 is detected on fingerprint sensor 169. Device 100 determines if fingerprint 2666 is one of one or more fingerprints enrolled with device 100. If device 100 determines that fingerprint 2666 is not one of the enrolled fingerprints, then device 100 maintains display of settings-management interface 2650 in limited-access mode and device 100 maintains itself in locked mode.

Figure 26O:
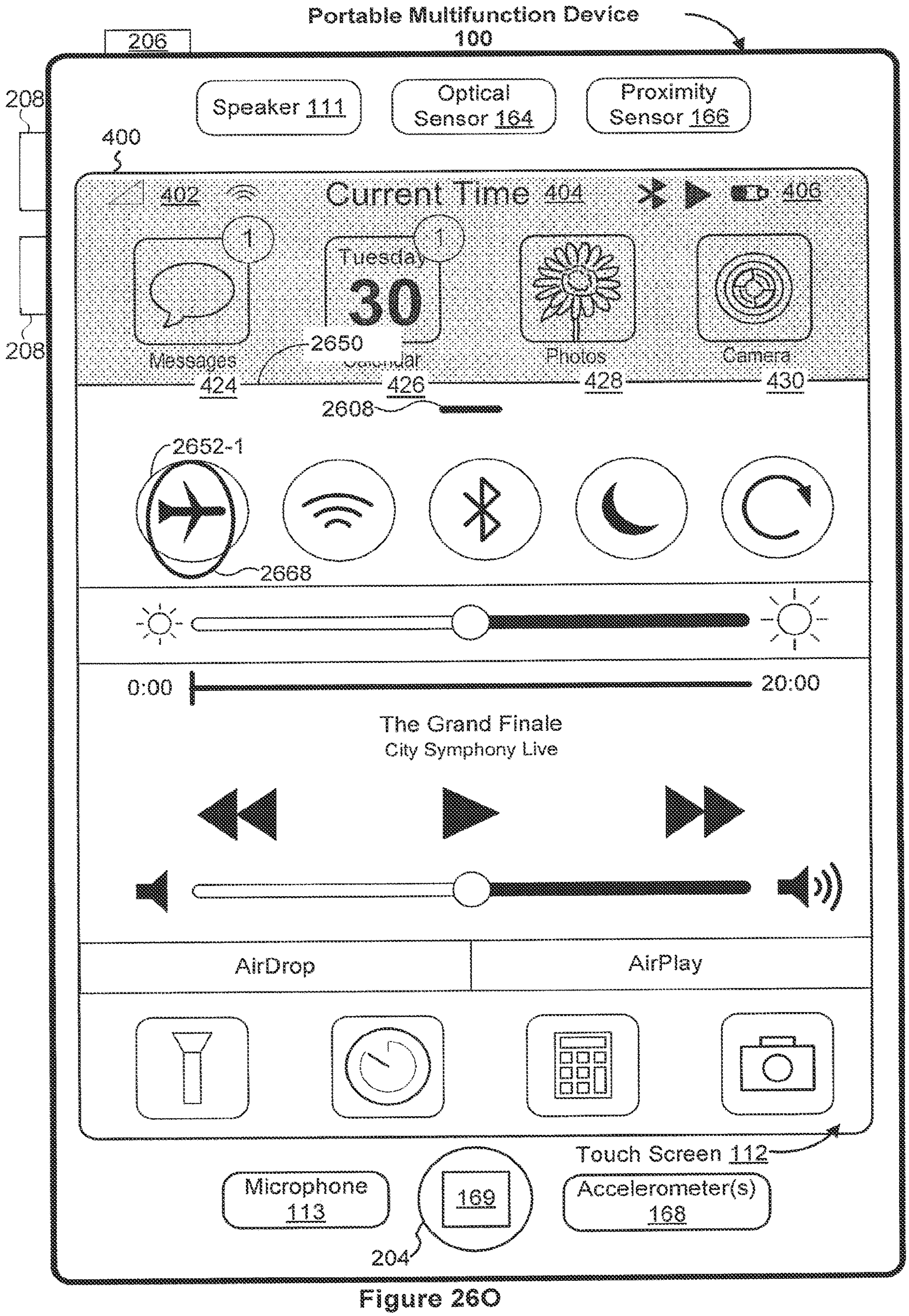
Figure 26P:
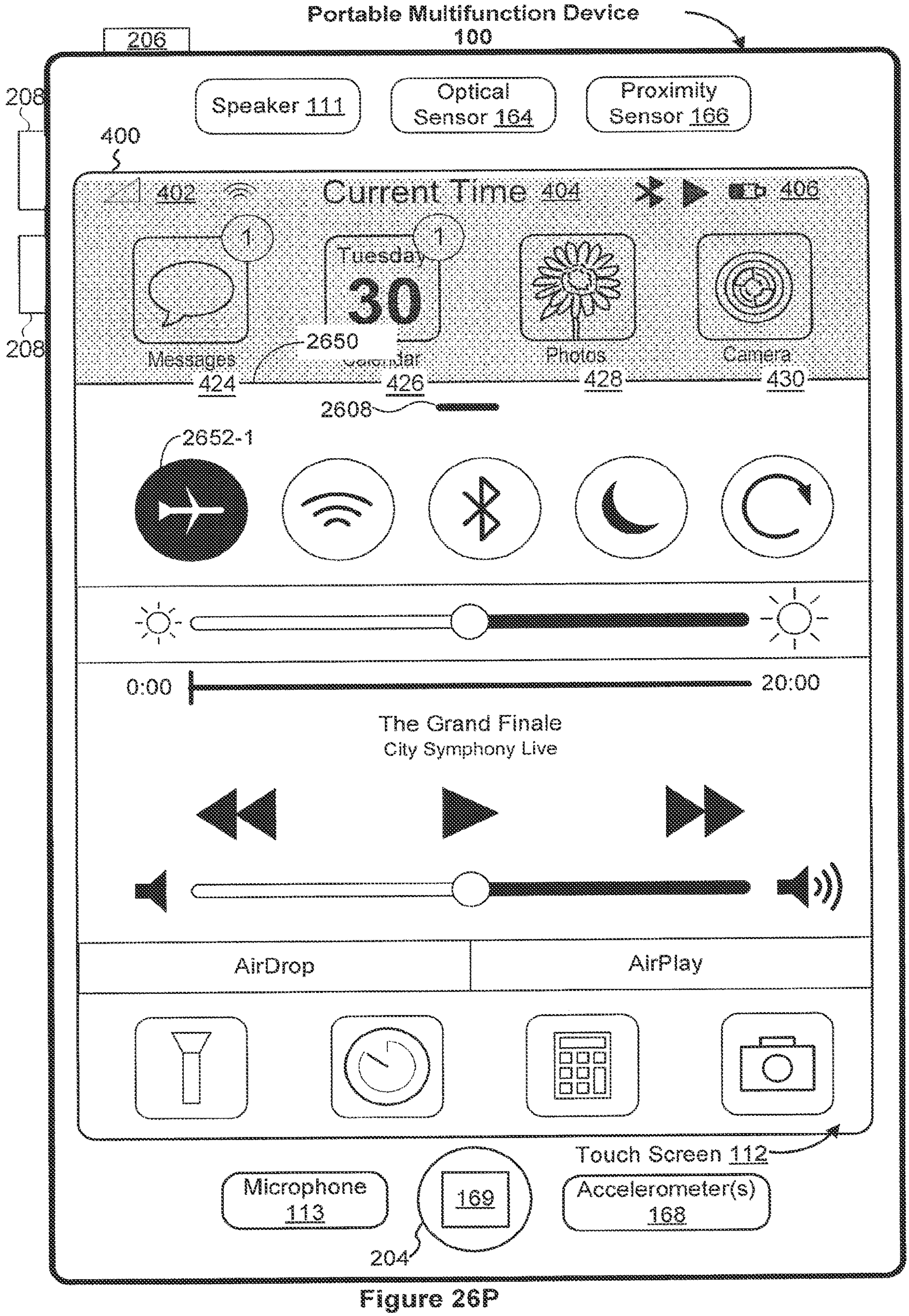

If device 100 determines that fingerprint 2666 is one of the enrolled fingerprints, then device 100 displays settings-management interface 2650 in full-access mode and device 100 transitions itself from locked mode to unlocked mode, as shown in FIG. 26O. Display of settings-management interface 2650 in full-access mode includes enabling any icons, controls, etc. (e.g., any of icons 2652; brightness control 2654; music controls 2656; icons 2658, 2660, and 2662) that were disabled while settings-management interface 2650 was displayed in limited-access mode. For example, in FIG. 26O, icon 2652-1 is enabled; icon 2652-1 is no longer grayed out. Tap gesture 2668 on icon 2652-1 toggles the airplane mode, as shown in FIG. 26P; in FIG. 26P, icon 2652-1 changes contrast (compare to icon 2652-1 in FIG. 26O), indicating that the airplane mode setting has been toggled from the setting in FIG. 26O.

As described above, if fingerprint 2666 is one of the enrolled fingerprints, then device 100 transitions itself from locked mode to unlocked mode. The transition optionally includes a transition from locked device interface 2600 to user interface 400, taking place below settings-management interface 2650 that is overlaid above locked device interface 2600 and user interface 400. In some embodiments, this transition is not visible to the user. In some embodiments, this transition is visible to the user, as an animation of locked device interface 2600 transitioning to user interface 400; settings-management interface 2650 is translucent and/or at most partially covers locked device interface 2600/user interface 400, and thus the animation and interfaces 2600 and 400 are visible, but optionally blurred or faint below settings-management interface 2650. As shown in FIGS. 26N-26O, when the transition to unlocked mode occurs, user interface elements in locked device interface 2600, such as date/time 2602, are no longer displayed, and application icons in user interface 400 are displayed. In some embodiments, user interface 400 is the user interface that was displayed immediately prior to the device entering the locked mode, which may be a different interface from the interface that displays application icons. In other words, the interface that displays application icons in FIGS. 26H-26K and 26O-26R is merely exemplary of an unlocked mode user interface.

Figure 26Q:
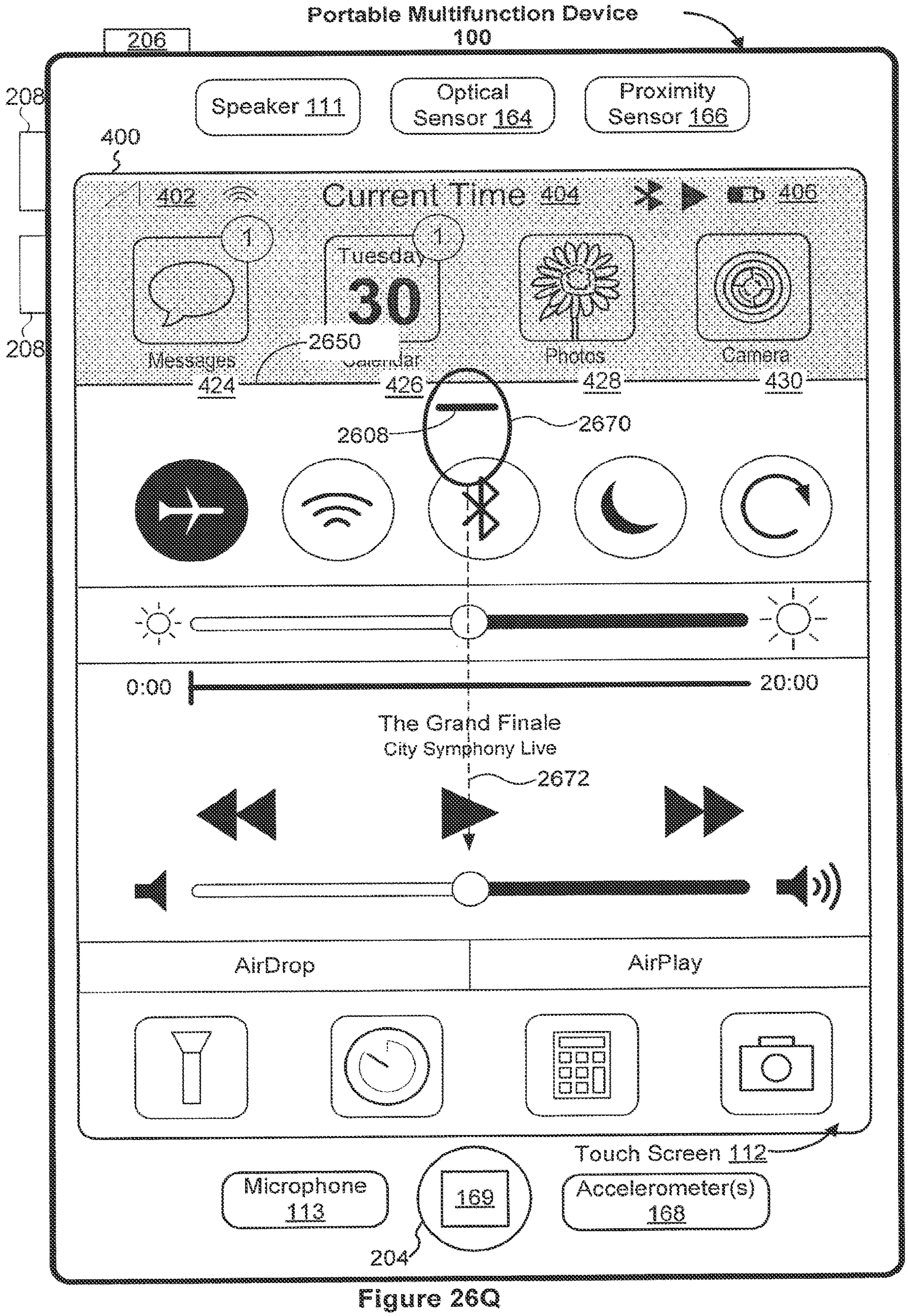
Figure 26R:
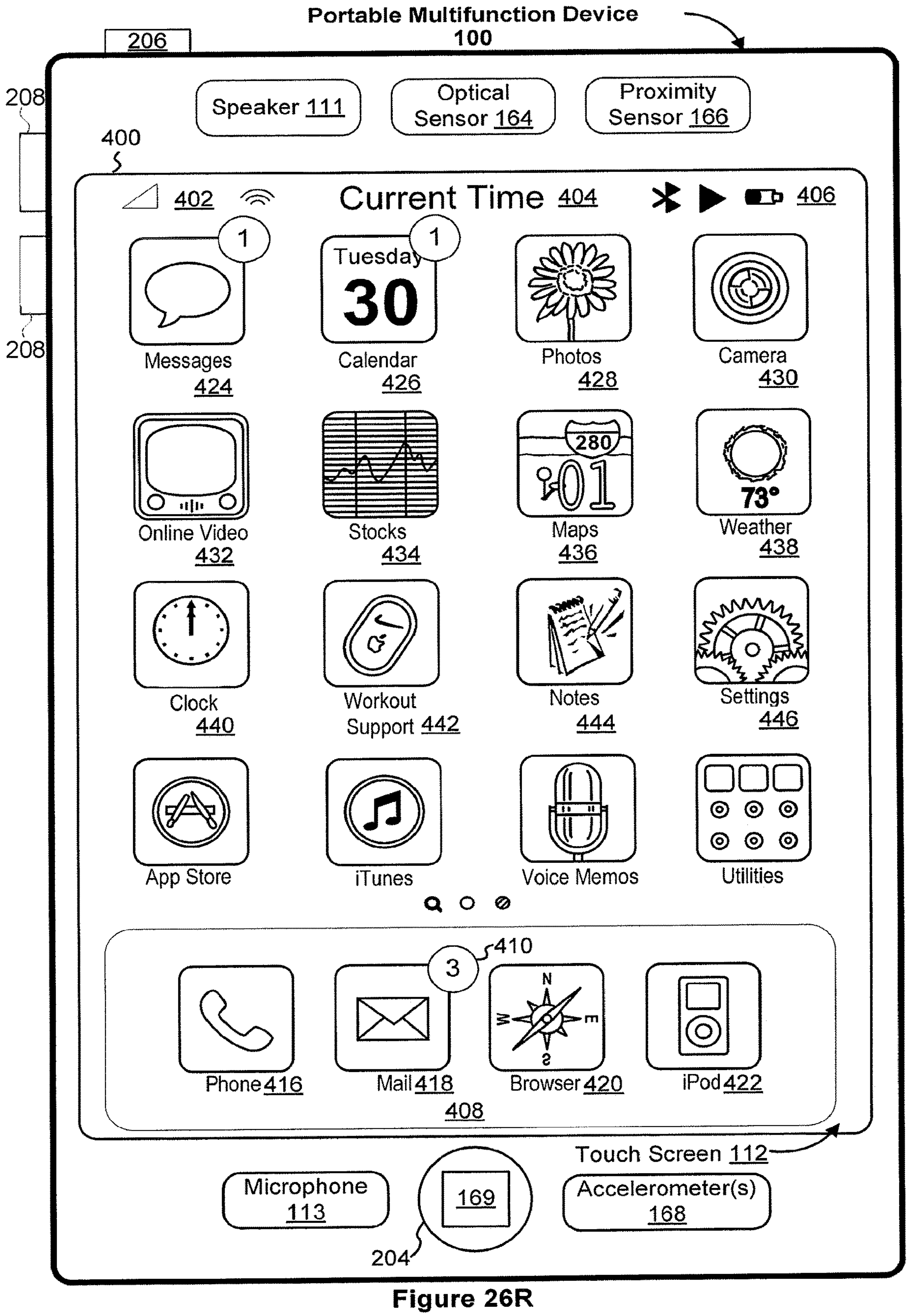

FIG. 26Q shows settings-management interface 2650 displayed in full-access mode and device 100 in unlocked mode. While settings-management interface 2650 is displayed in full-access mode and device 100 is in unlocked mode, a gesture is detected on touch screen 112. The gesture (e.g., a swipe gesture) includes contact 2670 detected on handle 2608, and contact 2670, while detected on handle 2608, moving in direction 2672. In response to detecting the gesture, device 100 dismisses settings-management interface 2650 from touch screen 112, as shown in FIG. 26R. User interface 400 is displayed on touch screen 112, as device 100 remains in unlocked mode after dismissal of settings-management interface 2650; the user has access to applications that were previously inaccessible because user interface 400 was inaccessible.

Figure 26S:
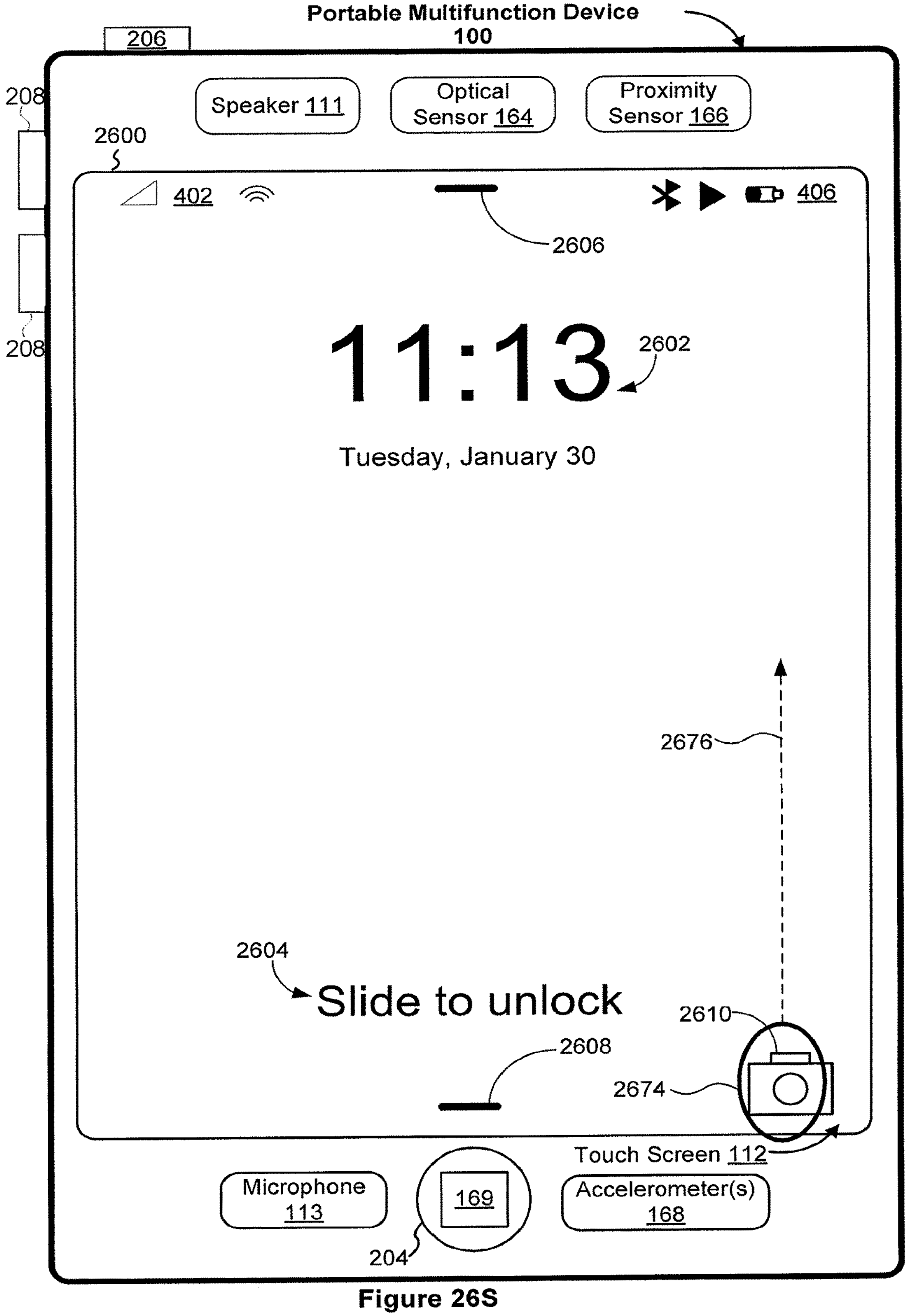

FIG. 26S illustrates locked device interface 2600 displayed on touch screen 112 of device 100; device 100 is in locked mode. FIG. 26S also illustrates a gesture detected on touch screen 112. The gesture (e.g., a swipe gesture) includes contact 2674 detected on icon 2610, and contact 2674, while detected on icon 2610, moving in direction 2676. In response to detecting the gesture, device 100 displays camera interface 2678 on touch screen 112, as shown in FIG. 26U, and device 100 remains in locked mode.

Figure 26T:
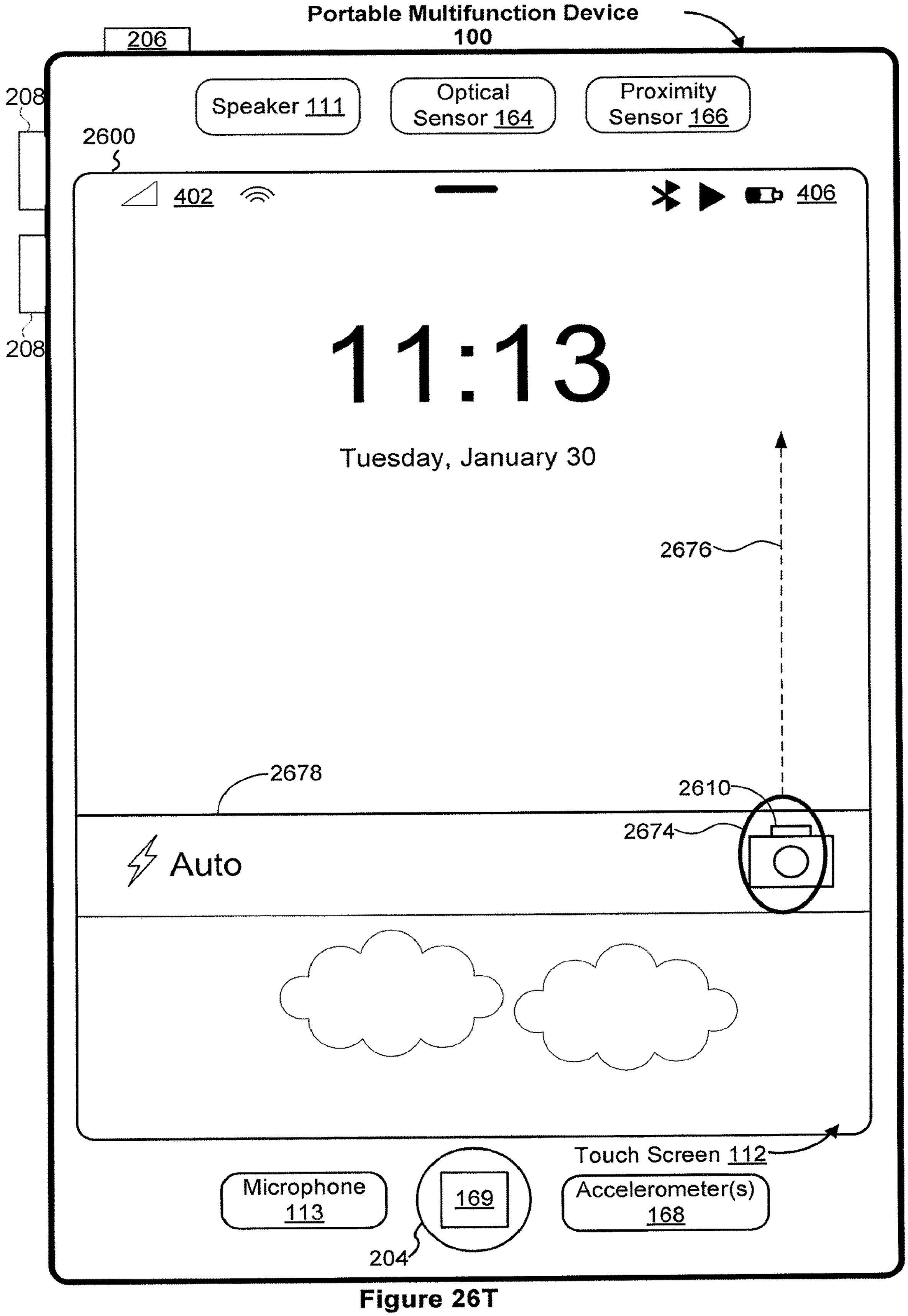
Figure 26U:
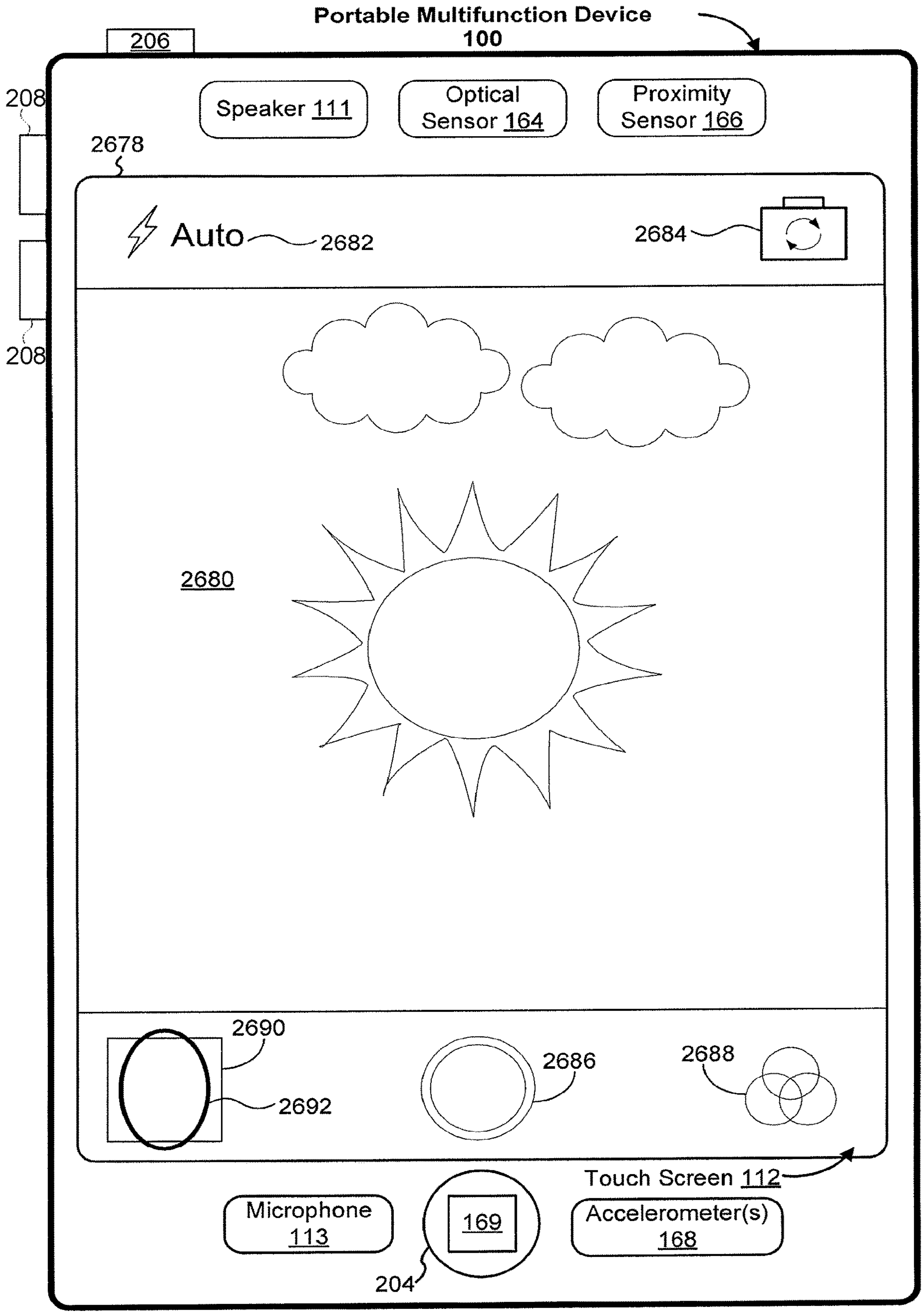

In some embodiments, the transition from displaying locked device interface 2600 to displaying camera interface 2678 includes an animation in which camera interface 2678 slides onto touch screen 112 in accordance with the movement of contact 2674, as shown in FIGS. 26S-26U; contact 2674 swipes camera interface 2678 onto touch screen 112.

In the animation, camera interface 2678 slides over locked screen interface 2600. In some embodiments, camera interface 2678 is opaque, and locked device interface 2600 is not visible under camera interface 2678, as shown in FIG. 26U, for example.

In some other embodiments, the transition from displaying locked device interface 2600 to displaying camera interface 2678 includes an animation in which locked device interface 2600 slides off of touch screen 112 in accordance with the movement of contact 2674 to reveal camera interface 2678.

Camera interface 2678 is an interface associated with a camera application (e.g., camera module 143) on device 100. Camera interface 2678 includes camera preview 2680, flash control 2682, front/back camera toggle 2684, shutter/capture button 2686, image effects control 2688, and camera roll icon 2690. Device 100 ceases to display camera interface 2678 and displays camera roll interface 2693 (FIG. 26V) in response to detection of gesture 2692 (e.g., a tap gesture) on camera roll icon 2690. Photos 2697 (FIG. 26W) captured or otherwise stored on device 100 are displayed in camera roll interface 2693. Camera roll interface 2693 also includes icon 2694. In response to activation of icon 2694 (e.g., by a tap gesture on camera icon 2694), device 100 displays camera interface 2678. Thus, camera icon 2694 and camera roll icon 2690 are analogous controls; activation of camera roll icon 2690 switches device 100 to displaying camera roll interface 2693, and activation of icon 2694 switches device 100 to displaying camera interface 2678.

As device 100 was locked when the gesture with contact 2674 was performed, camera interface 2678 is displayed in a limited-access mode. While camera interface 2678 is in limited-access mode, in response to detection of gesture 2692 on camera roll icon 2690, device 100 replaces display of camera interface 2678 in limited-access mode with display of camera roll interface 2693 in limited-access mode. While camera roll interface 2693 is displayed in limited-access mode, display of images captured or otherwise stored on device 100 is restricted. In some embodiments, the restrictions include device 100 preventing a user from viewing images that were captured and/or stored on device 100 prior to the device entering locked mode until the user is successfully authenticated; device 100 suppresses display, in camera roll interface 2693, of images captured or stored in the camera roll prior to device 100 entering locked mode. Thus, for example, in FIG. 26V, warning message 2695 is displayed alerting users that not all photos are displayed while camera roll interface 2693 is displayed in limited-access mode, and that the user should unlock device 100 (e.g., authenticate himself) in order to view the hidden photos.

While camera interface 2678 or camera roll interface 2693 is displayed in limited-access mode, either can be dismissed by a press of button 204 on device 100. In response to detection of a press of button 204 on device 100 while either camera interface 2678 or camera roll interface 2693 is displayed in limited-access mode, device 100 displays locked device interface 2600 on touch screen 112, as in FIG. 26S, or alternatively, a passcode entry interface (not shown), unless the finger performing the button press has an enrolled fingerprint that is detected by fingerprint sensor 169 during the button press. Because no user has been successfully authenticated since device 100 entered into locked mode, device 100 remains in locked mode (and thus displays locked device interface 2600 or a passcode entry interface on touch screen 112). If the finger performing the press has an enrolled fingerprint that is detected by fingerprint sensor 169 during the button press, then the user is authenticated, and device 100 displays user interface 400 instead of locked device interface 2600.

Figure 26V:
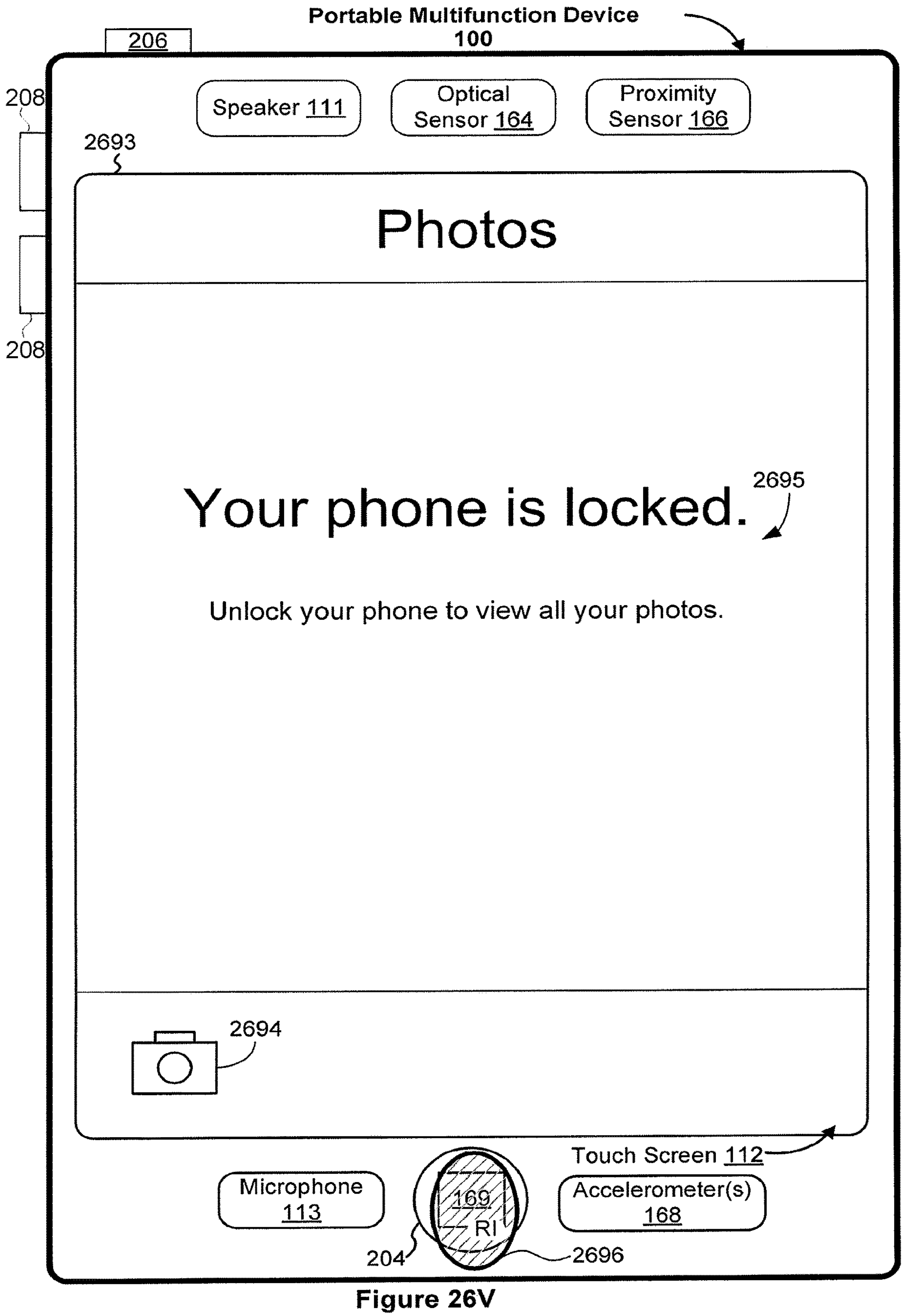

Returning to device 100 as depicted in FIG. 26V, fingerprint 2696 is detected on fingerprint sensor 169. Device 100 determines if fingerprint 2696 is one of one or more fingerprints enrolled with device 100. If device 100 determines that fingerprint 2696 is not one of the enrolled fingerprints, then device 100 maintains display of camera roll interface 2693 in limited-access mode and device 100 maintains itself in locked mode. Similarly, if a fingerprint is detected on fingerprint sensor 169 while camera interface 2678 is detected, device 100 determines if the fingerprint is one of the enrolled fingerprints. If the fingerprint is not one of the enrolled fingerprints, the device 100 maintains display of camera interface 2678 in limited-access mode and device 100 maintains itself in locked mode.

Figure 26W:
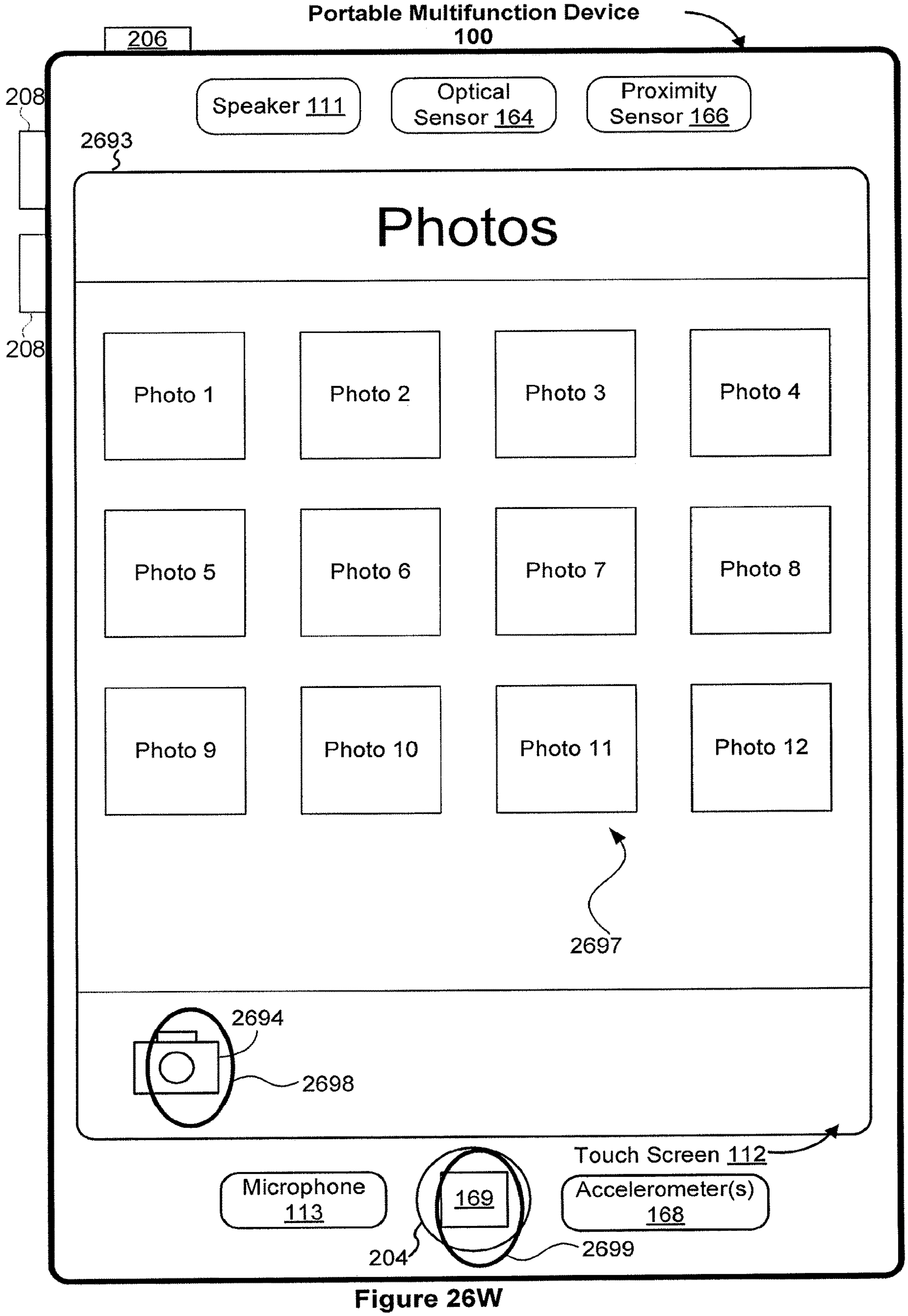
Figure 26X:
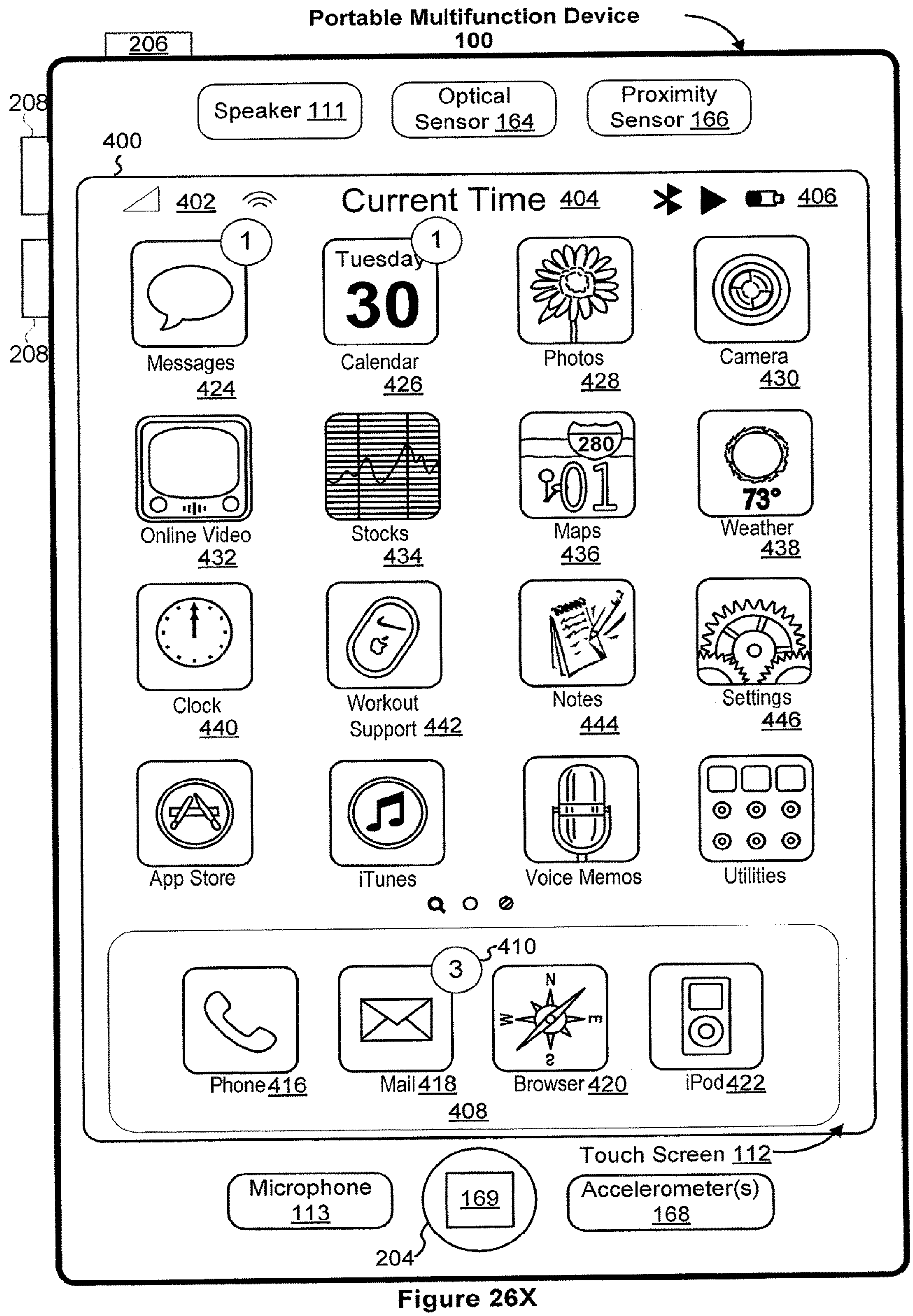
Figure 27A:
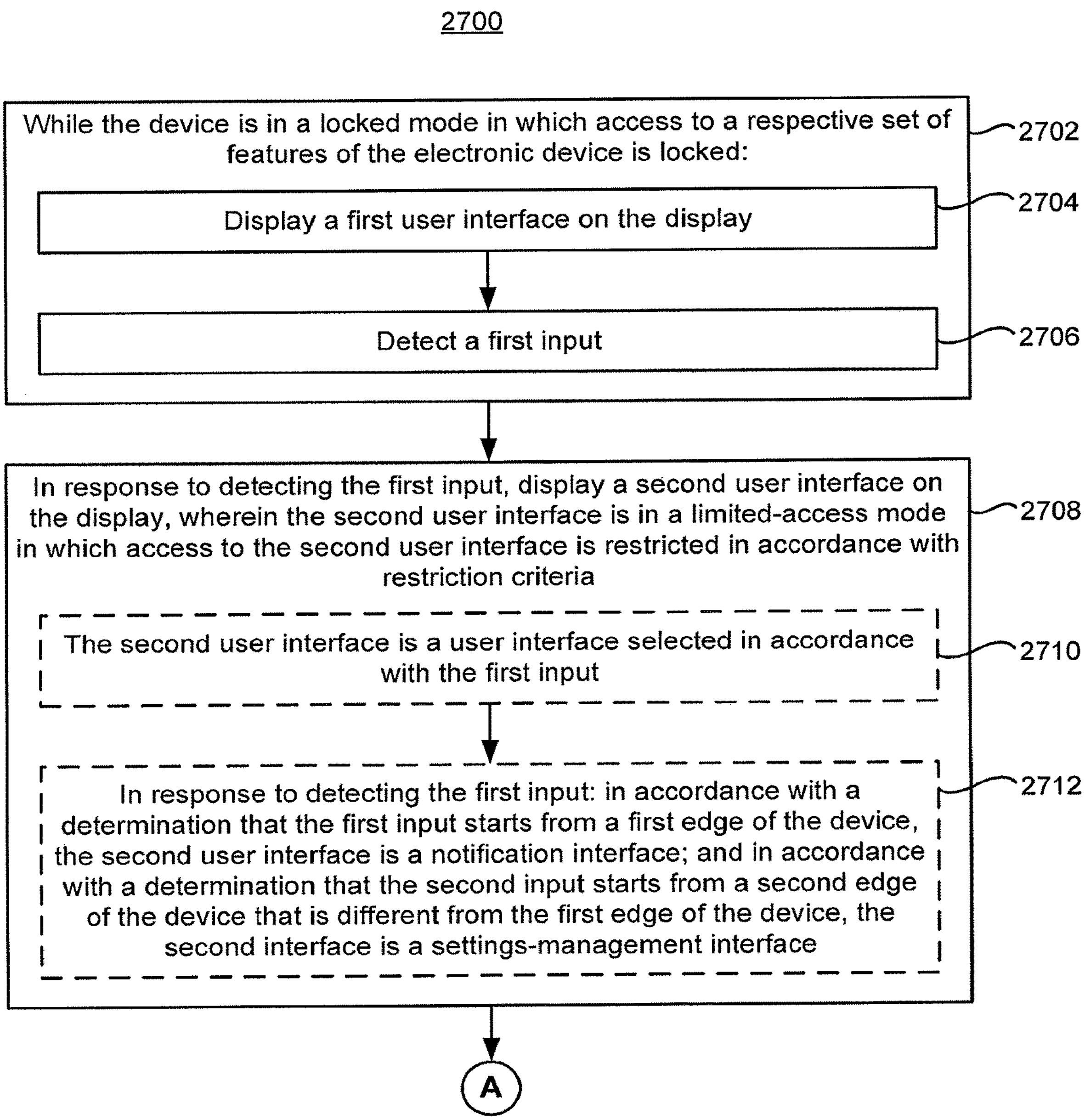
FIGS. 27A-27D are flow diagrams illustrating a method of controlling access to device information and features and unlocking the device in accordance with some embodiments.
Figure 27B:
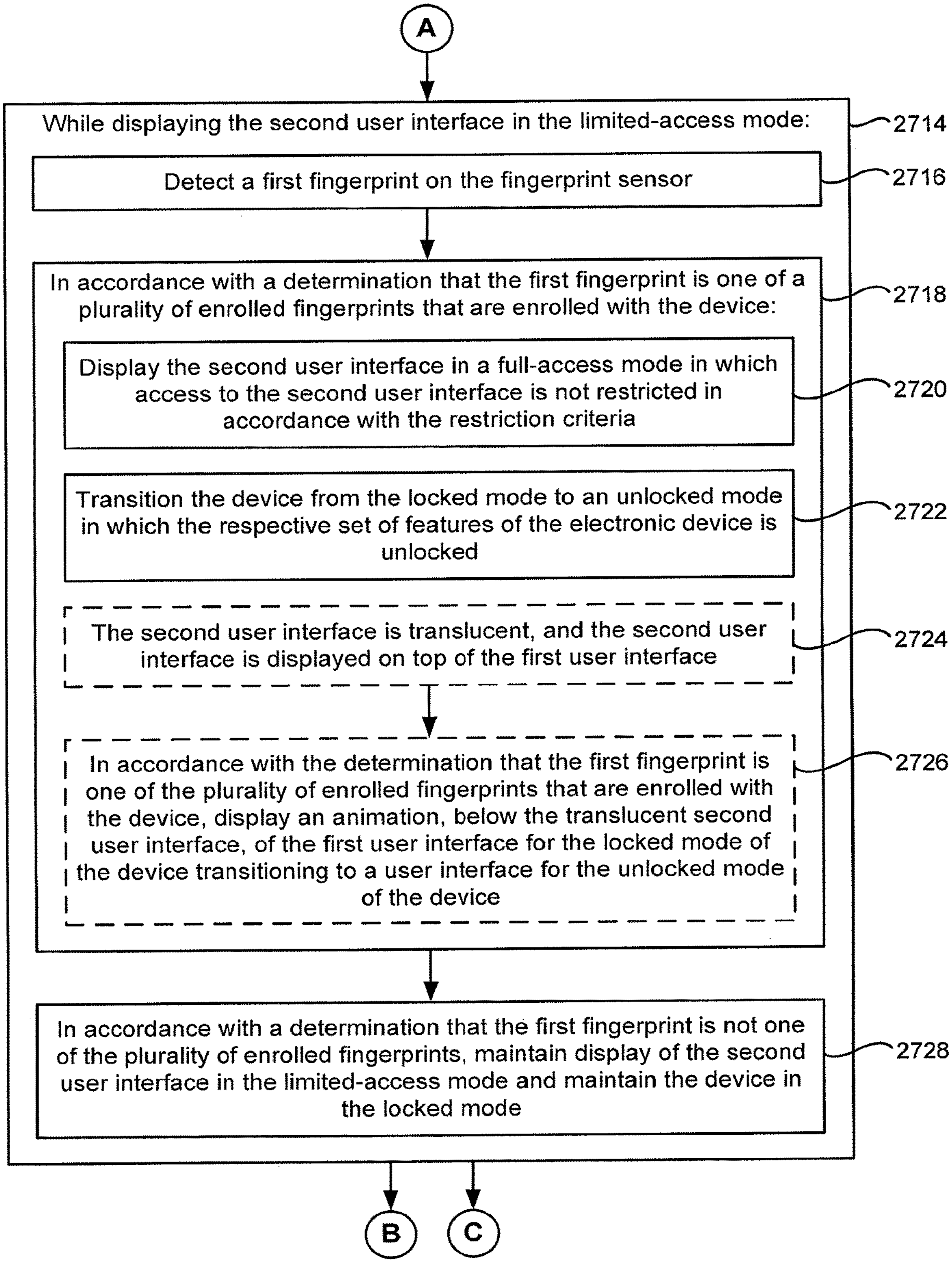
Figure 27C:
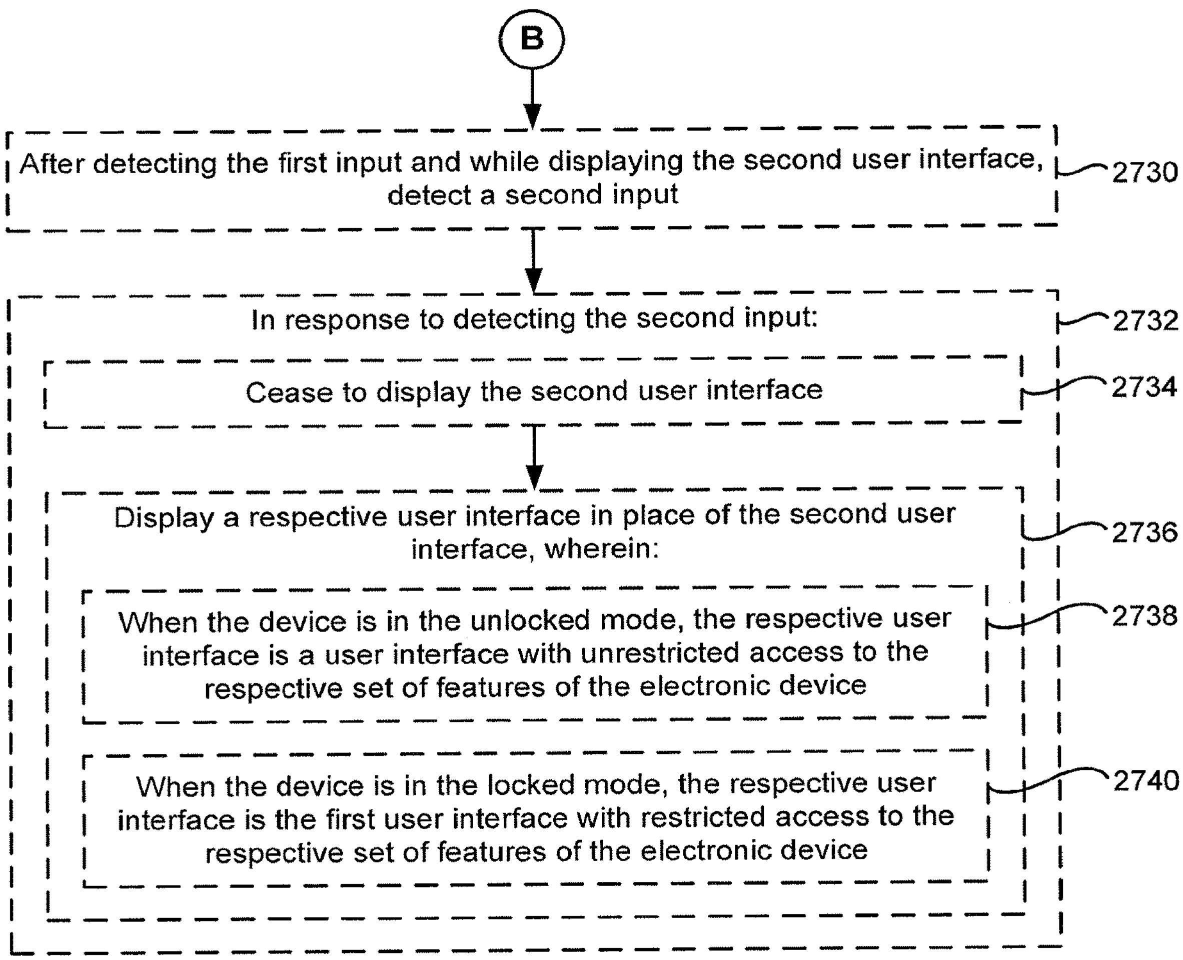
Figure 27D:
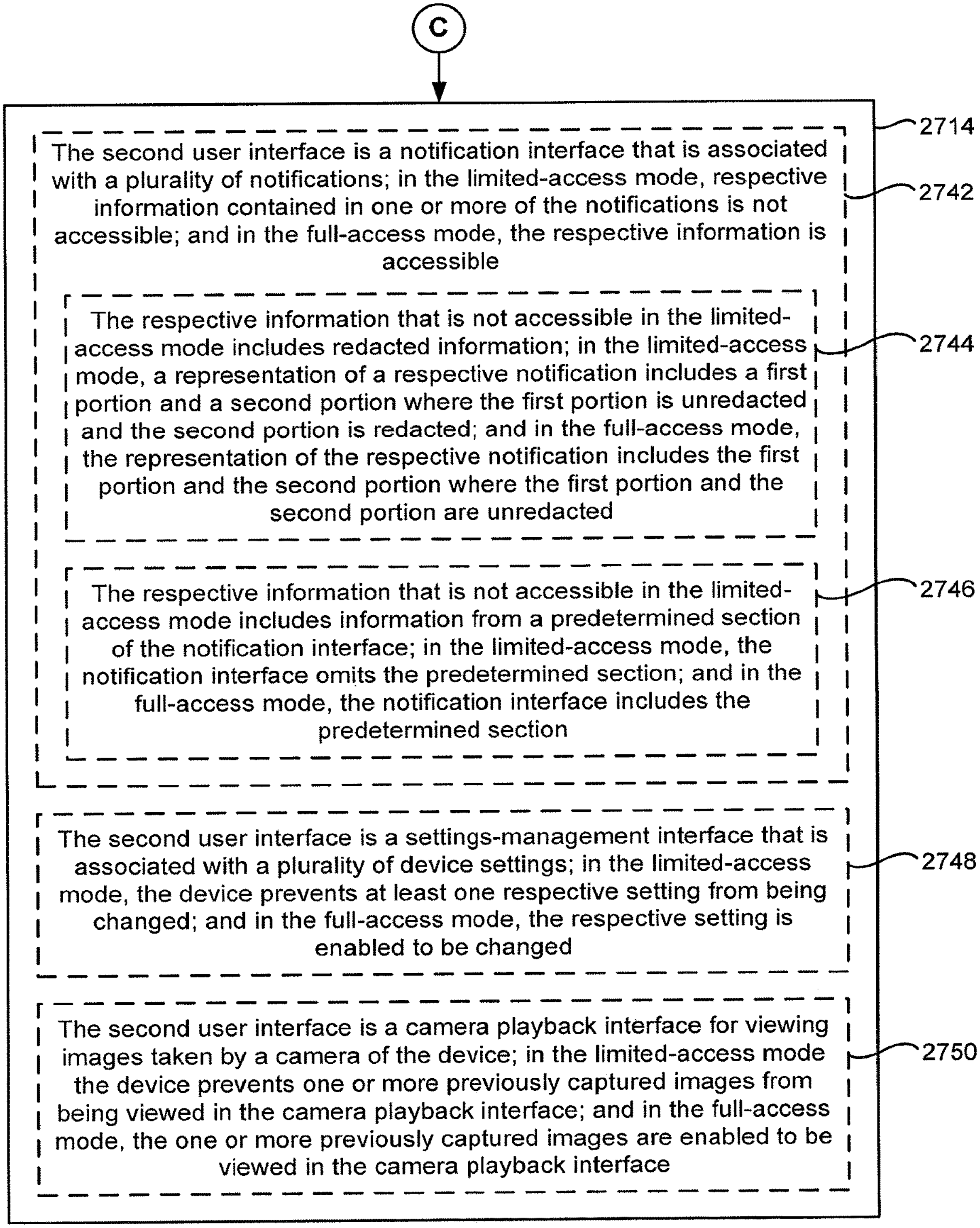

If device 100 determines that fingerprint 2696 is one of the enrolled fingerprints, then device 100 displays camera roll interface 2693 in full-access mode and device 100 transitions itself from locked mode to unlocked mode, as shown in FIG. 26W. Display of camera roll interface 2693 in full-access mode includes displaying images 2697 that were not displayed while camera roll interface 2693 was displayed in limited-access mode.

In response to activation of camera icon 2694 (e.g., by tap gesture 2698 on camera icon 2694) while camera roll interface 2693 is displayed in full-access mode, device 100 displays camera interface 2678 in full-access mode and device 100 continues in unlocked mode; switching to camera interface 2678 while camera roll interface 2693 is displayed in full-access mode puts camera interface 2678 in full-access mode.

While either camera interface 2678 or camera roll interface 2693 is displayed in full-access mode (and device 100 is in unlocked mode), either can be dismissed by a press of button 204 on device 100. In response to detection of a press 2699 of button 204 on device 100 while either camera interface 2678 or camera roll interface 2693 is displayed in full-access mode (e.g., as shown in FIG. 26W, with camera roll interface 2693 displayed in full-access mode), device 100 displays user interface 400 on touch screen 112, as shown in FIG. 26X, as device 100 remains in unlocked mode.

FIGS. 27A-27D are flow diagrams illustrating a method 2700 of controlling access to device information and features and unlocking the device in accordance with some embodiments. The method 2700 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 2700 are, optionally, combined and/or the order of some operations is, optionally, changed.

As described below, the method 2700 provides an intuitive and secure way to control access to device information and features and unlock the device. The method reduces the cognitive burden on a user when controlling access to device information and features and unlocking the device, thereby creating a more efficient human-machine interface.

While the device is in a locked mode in which access to a respective set of features of the electronic device is locked (2702), the device displays (2704) a first user interface on the display, and detects (2706) a first input (e.g., a first gesture in the first user interface such as a downward swipe gesture originating in the top region of the display or at or near an edge of the display). In FIG. 26A and FIG. 26L, for example, locked device interface 2600 is displayed while device 100 is in locked mode. A swipe gesture with contact 2612 and 2646, respectively, is detected on touch screen 112 starting from handle 2606 and 2608, respectively.

As another example, in FIG. 26U, camera interface 2678 is displayed while device 100 is in locked mode. Tap gesture 2692 is detected on touch screen 112, on camera roll icon 2692.

In response to detecting the first input, the device displays (2708) a second user interface on the display, where the second user interface is in a limited-access mode in which access to the second user interface is restricted in accordance with restriction criteria (e.g., at least a portion of the one or more notifications are redacted, the full messages corresponding to notifications can't be accessed without unlocking the device, and/or one or more displayed controls can't be changed). For example, in response to detecting the gesture with contact 2612, device 100 displays notification interface 2616 in limited-access mode (FIG. 26C or 26D); notifications 2620 are redacted. As another example, in response to detecting the gesture with contact 2646, device 100 displays settings-management interface 2650 in limited-access mode (FIG. 26N); airplane mode icon 2652-1 is disabled. As another example, in response to detecting gesture 2692, device 100 displays camera roll interface 2693 in limited-access mode (FIG. 26V); photos 2697 are hidden from display.

In some embodiments, the second user interface is a user interface selected in accordance with the first input (2710). In response to detecting the first input: in accordance with a determination that the first input starts from a first edge of the device, the second user interface is a notification interface; and in accordance with a determination that the second input starts from a second edge of the device that is different from (e.g., opposite to) the first edge of the device, the second interface is a settings-management interface (2712). For example, in response to detecting the gesture with contact 2612, which starts on handle 2606 (e.g., starts from the top edge of touch screen 112), notification interface 2616 is displayed in limited-access mode (FIGS. 26A-26D). Conversely, in response to detecting the gesture with contact 2646, which starts on handle 2608 (e.g., starts from the bottom edge of touch screen 112), settings-management interface 2650 is displayed in limited-access mode (FIGS. 26L-26N).

While displaying the second user interface in the limited-access mode (2714), the device detects (2716) a first fingerprint on the fingerprint sensor. For example, fingerprint 2640 (FIG. 26G), 2666 (FIG. 26N), or 2696 (FIG. 26V) is detected on fingerprint sensor 169.

In accordance with a determination that the first fingerprint is one of a plurality of enrolled fingerprints that are enrolled with the device (2718), the device displays (2720) the second user interface in a full-access mode in which access to the second user interface is not restricted in accordance with the restriction criteria (e.g., the one or more notifications are un-redacted), and transitions (2722) the device from the locked mode to an unlocked mode in which the respective set of features of the electronic device is unlocked. In some embodiments, a subject line and preview of the notifications are displayed in the un-redacted mode. For example, when fingerprint 2640 (FIG. 26G) is determined to be one of the enrolled fingerprints, notification interface 2616 is displayed in full-access mode and device 100 is unlocked (FIG. 26H); notifications 2620 are displayed as unredacted. As another example, when fingerprint 2666 (FIG. 26N) is determined to be one of the enrolled fingerprints, settings-management interface 2650 is displayed in full-access mode and device 100 is unlocked (FIG. 26O); airplane mode icon 2652-1 is enabled. As another example, when fingerprint 2696 (FIG. 26V) is determined to be one of the enrolled fingerprints, camera roll interface 2693 is displayed in full-access mode and device 100 is unlocked (FIG. 26W); photos 2697 are displayed.

In some embodiments, the second user interface is translucent, and the second user interface is displayed on top of the first user interface (2724). In accordance with the determination that the first fingerprint is one of the plurality of enrolled fingerprints that are enrolled with the device, the device displays (2726) an animation, below the translucent second user interface, of the first user interface for the locked mode of the device transitioning to a user interface for the unlocked mode of the device. For example, the first user interface is a lock screen for the device when the device is in a locked mode, and the first user interface transitions to a home screen, a screen with application icons for launching applications, or the last screen displayed by the device in the unlocked mode, just prior to the device going into the locked mode. This animated transition is typically blurred because this transition occurs underneath the translucent second user interface. This animated transition signals to a user that the device has been unlocked while maintaining display of the second user interface. As shown in FIG. 26C, for example, notification interface 2616 is translucent and displayed over locked device interface 2600. When fingerprint 2640 (FIG. 26G) is determined to be one of the enrolled fingerprints, an animation transitioning locked device interface 2600 to user interface 400 is displayed under notification interface 2616, as shown in FIGS. 26G-26H.

In accordance with a determination that the first fingerprint is not one of the plurality of enrolled fingerprints, the device maintains (2728) display of the second user interface in the limited-access mode and maintains the device in the locked mode. For example, when fingerprint 2640 (FIG. 26G) is determined to not be one of the enrolled fingerprints, device 100 maintains notification interface 2616 in limited-access mode and maintains itself in locked mode; notifications 2620 remain redacted. As another example, when fingerprint 2666 (FIG. 26N) is determined to not be one of the enrolled fingerprints, device 100 maintains settings-management interface 2650 in limited-access mode and maintains itself in locked mode; airplane mode icon 2652-1 remains disabled. As another example, when fingerprint 2696 (FIG. 26V) is determined to not be one of the enrolled fingerprints, device 100 maintains camera roll interface 2693 (and camera interface 2678) in limited-access mode and maintains itself in locked mode; photos 2697 remain hidden from display.

In some embodiments, after detecting the first input and while displaying the second user interface, the device detects (2730) a second input. In response to detecting the second input (2732), the device ceases (2734) to display the second user interface and displays (2736) a respective user interface in place of the second user interface. When the device is in the unlocked mode (e.g., in accordance with a determination that the first fingerprint is one of a plurality of enrolled fingerprints that are enrolled with the device), the respective user interface is (2738) a user interface with unrestricted access to the respective set of features of the electronic device (e.g., an application launch user interface for launching a plurality of different applications, or a most recently used application). When the device is in the locked mode (e.g., in accordance with a determination that the first fingerprint is not one of the plurality of enrolled fingerprints), the respective user interface is (2740) the first user interface with restricted access to the respective set of features of the electronic device. While device 100 is displaying notification interface 2616 or settings-management interface 2650, device 100 detects a respective input to dismiss the respective interface. When device 100 is in unlocked mode and the respective interface is dismissed, device 100 displays user interface 400. When device 100 is in locked mode and the respective interface is dismissed, device 100 displays locked device interface 2600.

For example, in response to detecting the gesture with contact 2634 to dismiss notification interface 2616 (FIG. 26C or 26D), device 100 maintains locked mode and displays locked device interface 100. However, in response to detecting the gesture with contact 2642 to dismiss notification interface 2616 (FIG. 26I), device 100 maintains unlocked mode and displays user interface 400 (FIG. 26J).

As another example, in response to detecting a gesture to dismiss settings-management interface 2650 while settings-management interface 2650 is displayed in limited-access mode and device 100 is in locked mode, device 100 maintains locked mode and displays locked device interface 2600. However, in response to detecting the gesture with contact 2670 to dismiss settings-management interface 2650 (FIG. 26Q), device 100 maintains unlocked mode and displays user interface 400 (FIG. 26R).

In some embodiments, the second user interface is (2742) a notification interface that is associated with a plurality of notifications; in the limited-access mode, respective information contained in one or more of the notifications is not accessible; and in the full-access mode, the respective information is accessible. As shown in FIGS. 26C and 26H, notification interface 2616 is displayed with notifications 2620. When notification 2616 is displayed in limited-access mode, as in FIG. 26C, the actual message or email contents (e.g., snippets of the message or email) are not accessible, and is replaced with generic text in the notifications 2620. However, when notification interface 2616 is displayed in full-access mode, as in FIG. 26H, the actual message or email contents are included in the notification 2620.

In some embodiments, the respective information that is not accessible in the limited-access mode includes redacted information (2744). In the limited-access mode, a representation of a respective notification includes a first portion (e.g., a sender identifier) and a second portion (e.g., a subject or content snippet) where the first portion is unredacted and the second portion is redacted. In the full-access mode, the representation of the respective notification includes the first portion and the second portion where the first portion and the second portion are unredacted. Notification 2620-1 in FIG. 26C, for example, is a redacted notification; portion 2622 (sender) is not redacted, but portion 2624 (message timestamp) and portion 2626 (message snippet) are redacted by replacement with generic placeholder text.

In some embodiments, a notification is not redacted, even in limited access mode, if the notification does not include or involve personal or private information. For example, sports updates or news updates notifications need not be redacted.

In some embodiments, the respective information that is not accessible in the limited-access mode includes information from a predetermined section of the notification interface (2746). In the limited-access mode, the notification interface omits the predetermined section, and in the full-access mode, the notification interface includes the predetermined section. For example, in FIG. 26D, section 2618-2 for calendar notifications is omitted while notification interface 2616 is in limited-access mode. In FIG. 26H, section 2618-2 for calendar notifications is displayed while notification interface 2616 in full-access mode.

In some embodiments, the second user interface is (2748) a settings-management interface that is associated with a plurality of device settings. In the limited-access mode, the device prevents at least one respective setting from being changed (e.g., the respective setting is fixed at a previously selected value such as "on" or "off" and the device will not respond to user inputs by changing the setting unless/until the second user interface is transitioned to the full-access mode). In the full-access mode, the respective setting is enabled to be changed (e.g., the setting is enabled to be changed in response to inputs from the user such as tapping on a setting toggle or sliding a setting slider). For example, settings-management interface 2650 is an interface associated with multiple settings (airplane mode on/off, Wi-Fi on/off, etc.). When settings-management interface 2650 is in limited-access mode, airplane mode icon 2652-1 is disabled (FIG. 26N); the current airplane mode setting is unchanged despite tap gesture 2664 on airplane mode icon 2652-1. However, when settings-management interface 2650 is in full-access mode, airplane mode icon 2652-1 is enabled; tap gesture 2668 on airplane mode icon 2652-1 changes the airplane mode setting (FIG. 26O).

In some embodiments, the second user interface is (2750) a camera playback interface for viewing images taken by a camera of the device. In the limited-access mode the device prevents one or more previously captured images from being viewed in the camera playback interface (e.g., the device prevents a user from viewing images that were captured and placed in a virtual "camera roll" prior to the device entering the locked mode of operation, until the user is successfully authenticated). However, in the full-access mode, the one or more previously captured images are enabled to be viewed in the camera playback interface (e.g., after the user has been successfully authenticated, the virtual "camera roll" is unlocked and the user is provided with access to images in the virtual "camera roll"). For example, FIGS. 26V-26W show camera roll interface 2693, for viewing photos captured or otherwise stored on device 100, displayed on touch screen 112. When camera roll interface 2693 is in full-access mode (FIG. 26W), photos 2697 are displayed. When camera roll interface 2693 is in limited-access mode (FIG. 26V), photos 2697 are not displayed.

It should be understood that the particular order in which the operations in FIGS. 27A-27D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the "Description of Embodiments" section above) are also applicable in an analogous manner to method 2700 described above with respect to FIGS. 27A-27D. For example, the inputs, user interfaces, user interface objects or elements, and animations described above with reference to method 2700 optionally have one or more of the characteristics of the inputs, user interfaces, user interface objects or elements, and animations described herein with reference to other methods described herein (e.g., those listed in the "Description of Embodiments" section above). For brevity, these details are not repeated here.

Figure 28:
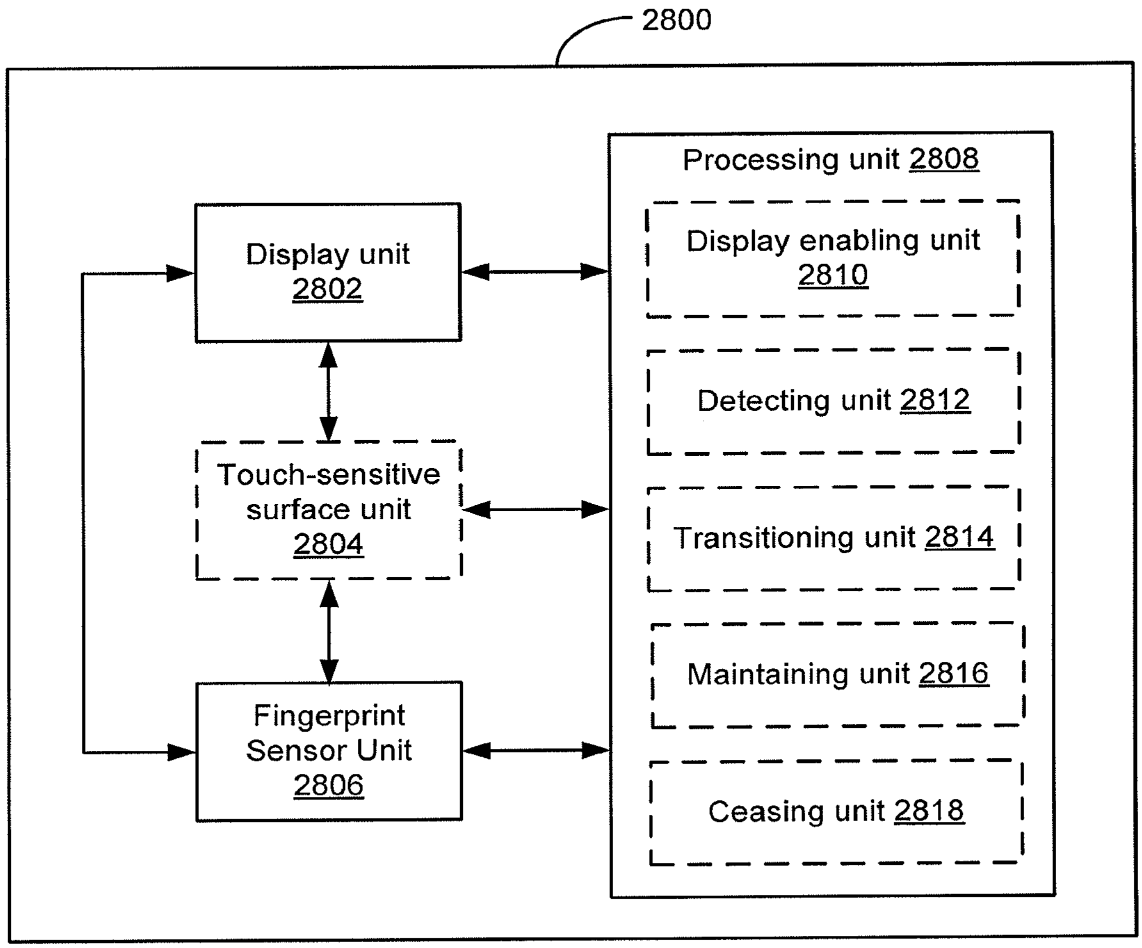
FIG. 28 is a functional block diagram of an electronic device in accordance with some embodiments.

In accordance with some embodiments, FIG. 28 shows a functional block diagram of an electronic device 2800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 28 are, optionally, combined or separated into sub-blocks to implement the principles of the various described embodiments. Therefore, the description herein optionally supports any possible combination or separation or further definition of the functional blocks described herein.

As shown in FIG. 28, an electronic device 2800 includes a display unit 2802, optionally a touch-sensitive surface unit 2804, a fingerprint sensor unit 2806; and a processing unit 2808 coupled to the display unit 2802, optionally touch-sensitive surface unit 2804, and the fingerprint sensor unit 2806. In some embodiments, the processing unit 2808 includes a display enabling unit 2810, a detecting unit 2812, a transitioning unit 2814, a maintaining unit 2816, and a ceasing unit 2818.

The processing unit 2808 is configured to: while the device is in a locked mode in which access to a respective set of features of the electronic device is locked, enable display of the first user interface on the display unit 2802 (e.g., with the display enabling unit 2810) and detect a first input (e.g., with the detecting unit 2812); in response to detecting the first input, enable display of a second user interface on the display unit 2802 (e.g., with the display enabling unit 2810), where the second user interface is in a limited-access mode in which access to the second user interface is restricted in accordance with restriction criteria; and while enabling display of the second user interface in the limited-access mode: detect a first fingerprint on the fingerprint sensor unit 2806 (e.g., with the detecting unit 2812); in accordance with a determination that the first fingerprint is one of a plurality of enrolled fingerprints that are enrolled with the device, enable display of the second user interface in a full-access mode in which access to the second user interface is not restricted in accordance with the restriction criteria (e.g., with the display enabling unit 2810), and transition the device from the locked mode to an unlocked mode in which the respective set of features of the electronic device is unlocked (e.g., with the transitioning unit 2814); and in accordance with a determination that the first fingerprint is not one of the plurality of enrolled fingerprints, maintain display of the second user interface in the limited-access mode and maintain the device in the locked mode (e.g., with the maintaining unit 2816).

In some embodiments, the second user interface is a notification interface that is associated with a plurality of notifications, in the limited-access mode, respective information contained in one or more of the notifications is not accessible, and in the full-access mode, the respective information is accessible.

In some embodiments, the respective information that is not accessible in the limited-access mode includes redacted information, in the limited-access mode, a representation of a respective notification includes a first portion and a second portion where the first portion is unredacted and the second portion is redacted, and in the full-access mode, the representation of the respective notification includes the first portion and the second portion where the first portion and the second portion are unredacted.

In some embodiments, the respective information that is not accessible in the limited-access mode includes information from a predetermined section of the notification interface, in the limited-access mode, the notification interface omits the predetermined section, and in the full-access mode, the notification interface includes the predetermined section.

In some embodiments, the second user interface is a settings-management interface that is associated with a plurality of device settings, in the limited-access mode, the device prevents at least one respective setting from being changed, and in the full-access mode, the respective setting is enabled to be changed.

In some embodiments, the second user interface is a camera playback interface for viewing images taken by a camera of the device, in the limited-access mode the device prevents one or more previously captured images from being viewed in the camera playback interface, and in the full-access mode, the one or more previously captured images are enabled to be viewed in the camera playback interface.

In some embodiments, the processing unit 2808 is configured to: after detecting the first input and while enabling display of the second user interface, detect a second input (e.g., with the detecting unit 2812); and in response to detecting the second input: cease to display the second user interface (e.g., with the ceasing unit 2818), and enable display of a respective user interface in place of the second user interface (e.g., with the display enabling unit 2810), wherein: when the device is in the unlocked mode, the respective user interface is a user interface with unrestricted access to the respective set of features of the electronic device, and when the device is in the locked mode, the respective user interface is the first user interface with restricted access to the respective set of features of the electronic device.

In some embodiments, the second user interface is a user interface selected in accordance with the first input, and in response to detecting the first input: in accordance with a determination that the first input starts from a first edge of the device, the second user interface is a notification interface; and in accordance with a determination that the second input starts from a second edge of the device that is different from the first edge of the device, the second interface is a settings-management interface.

In some embodiments, the second user interface is translucent, and the second user interface is displayed on top of the first user interface, and the processing unit 2808 is configured to: in accordance with the determination that the first fingerprint is one of the plurality of enrolled fingerprints that are enrolled with the device, enable display of an animation, below the translucent second user interface, of the first user interface for the locked mode of the device transitioning to a user interface for the unlocked mode of the device (e.g., with the display enabling unit 2810).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 27A-27D are, optionally, implemented by components depicted in FIGS. 1A-1B or FIG. 28. For example, detection operations 2706 and 2716, displaying operations 2704, 2708, and 2720, transitioning operation 2722, and maintaining operation 2728 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Unlocking an Application or a Device Depending on Context

Many electronic devices have a locked mode in which access to most applications on the device is prevented. While in a locked mode, such devices may still permit limited access to a particular application, even though most of the applications on the device are locked.

In some circumstances, in response to an unlock request, it may be more efficient to unlock the entire device so that a user can navigate to any application on the device. In other circumstances, in response to an unlock request, it may be more efficient to unlock just the particular application that is operating in a limited access mode, without unlocking the all of the applications on the device, to enable a user to access more features of the particular application. Thus, depending on context, it may be more efficient to unlock an application, rather than unlocking the entire device.

The methods described herein provide a way to unlock an application or a device, depending on the usage context, in response to detecting an authorized fingerprint on a fingerprint sensor.

When an authorized fingerprint is detected while a lock screen for the entire device is being displayed, the device transitions to an unlocked mode in which most, if not all, of the applications on the device are accessible. In this unlocked mode, the display optionally changes to a home screen, a screen with application icons for launching applications, or the last screen displayed by the device in the unlocked mode, just prior to the device going into the locked mode.

On the other hand, when an authorized fingerprint is detected while a user interface is being displayed for the particular application that is being used in a limited access mode, the device transitions from the locked mode to a single-application unlocked mode in which previously-locked features of the particular application are unlocked, while other applications on the device remain locked.

For example, without user authentication, the device may permit limited access to a camera application to enable a user to immediately take photographs. In response to fingerprint authentication of the user, the unlocked camera application may also be able to display photographs previously stored on the camera, send photographs to other devices, etc.

As another example, without user authentication, the device may permit a personal digital assistant (e.g., Siri personal digital assistant from Apple Inc. of Cupertino, Calif.) to answer questions that do not require access to private information for a particular user. In response to fingerprint authentication of the user, the personal digital assistant may also be able to answer questions that require access to private information for the particular user.

In some embodiments, the device is an electronic device with a separate display (e.g., display 450) and a separate touch-sensitive surface (e.g., touch-sensitive surface 451). In some embodiments, the device is portable multifunction device 100, the display is touch screen 112, and the touch-sensitive surface includes tactile output generators 167 on the display (FIG. 1A). The device described below with reference to 29A-29Y and 30A-30D includes one or more fingerprint sensors 169. In some embodiments, the one or more fingerprint sensors include one or more integrated fingerprint sensors 359-1 (FIG. 4B) that are integrated in to the touch-sensitive surface (e.g., separate touch-sensitive surface 451 or touch sensitive display system 112). In some embodiments, the one or more fingerprint sensors include separate fingerprint sensors 359-2 (FIG. 4B) that are separate from the touch-sensitive surface (e.g., separate touch-sensitive surface 451 or touch sensitive display system 112). Unless specified otherwise, a fingerprint sensor 169 described below is, optionally, either an integrated fingerprint sensor 359-1 or a separate fingerprint sensor 359-2, depending on the configuration of the hardware and software of the device that includes the fingerprint sensor 169. For convenience of explanation, the embodiments described with reference to FIGS. 29A-29Y and 30A-30D will be discussed with reference to a device with a touch screen 112 and a separate fingerprint sensor 359-2, however analogous operations are, optionally, performed on a device with an integrated fingerprint sensor 359-1 in response to detecting the inputs described in FIGS. 29A-29Y on the integrated fingerprint sensor 359-1 while displaying the user interfaces shown in FIGS. 29A-29Y on the display 450. Additionally, analogous operations are, optionally, performed on a device with a display 450 and a separate touch-sensitive surface 451 instead of a touch screen 112 in response to detecting the contacts described in FIGS. 29A-29Y on a fingerprint sensor 169 (e.g., an integrated fingerprint sensor 359-1 or a separate fingerprint sensor 359-2) and/or the separate touch-sensitive surface 451 while displaying the user interfaces shown in FIGS. 29A-29Y on the display 450; in such embodiments, the contacts shown in FIGS. 29A-29Y optionally represent both a focus selector that corresponds to a location on the display 450, and a contact that corresponds to a location of a contact or gesture performed on the separate touch-sensitive surface (e.g., touch-sensitive surface 451), where the focus selector is, optionally: a respective contact, a representative point corresponding to a contact (e.g., a centroid of a respective contact or a point associated with a respective contact), or a centroid of two or more contacts detected on the touch screen 112 and is, optionally, replaced with a displayed cursor.

FIG. 29A illustrates locked device interface 29000 displayed on a display of a device (e.g., on touch screen 112 of device 100). Locked device interface 29000 is a user interface that indicates to users of device 100 that device 100 is in locked mode (i.e., device 100 is locked), and thus access to features of multiple applications on device 100 is prevented. For example, while device 100 is locked, user interface 400 (FIG. 29B) is inaccessible. Thus, a user is unable to launch multiple some applications on device 100.

In some embodiments, locked device interface 29000 provides limited information to users. For example, locked device interface 29000 includes current date and time 29002 and instructions or hints 29004 on how to unlock device 100.

Locked device interface 29000 also includes one or more user interface objects for displaying respective user interfaces or launching specific applications. For example, locked device interface 29000 includes handles 29006 and 29008, and icon 29010. A user performs a gesture (e.g., a swipe gesture) starting from handle 29006 to activate display of a notification interface. A user performs a gesture (e.g., a swipe gesture) starting from handle 29008 to activate display of settings-management interface. A user performs a gesture (e.g., a swipe gesture) on icon 29010 to activate display of a camera interface.

FIG. 29A illustrates fingerprint 29012 detected on fingerprint sensor 169. In response to detecting fingerprint 29012 on fingerprint sensor 169, device 100 determines if fingerprint 29012 is one of one or more fingerprints enrolled with device 100. If fingerprint 29012 is not one of the enrolled fingerprints, device 100 remains in locked mode, and locked device interface 29000 remains displayed or a passcode entry interface (not shown) is displayed.

Figure 29B:
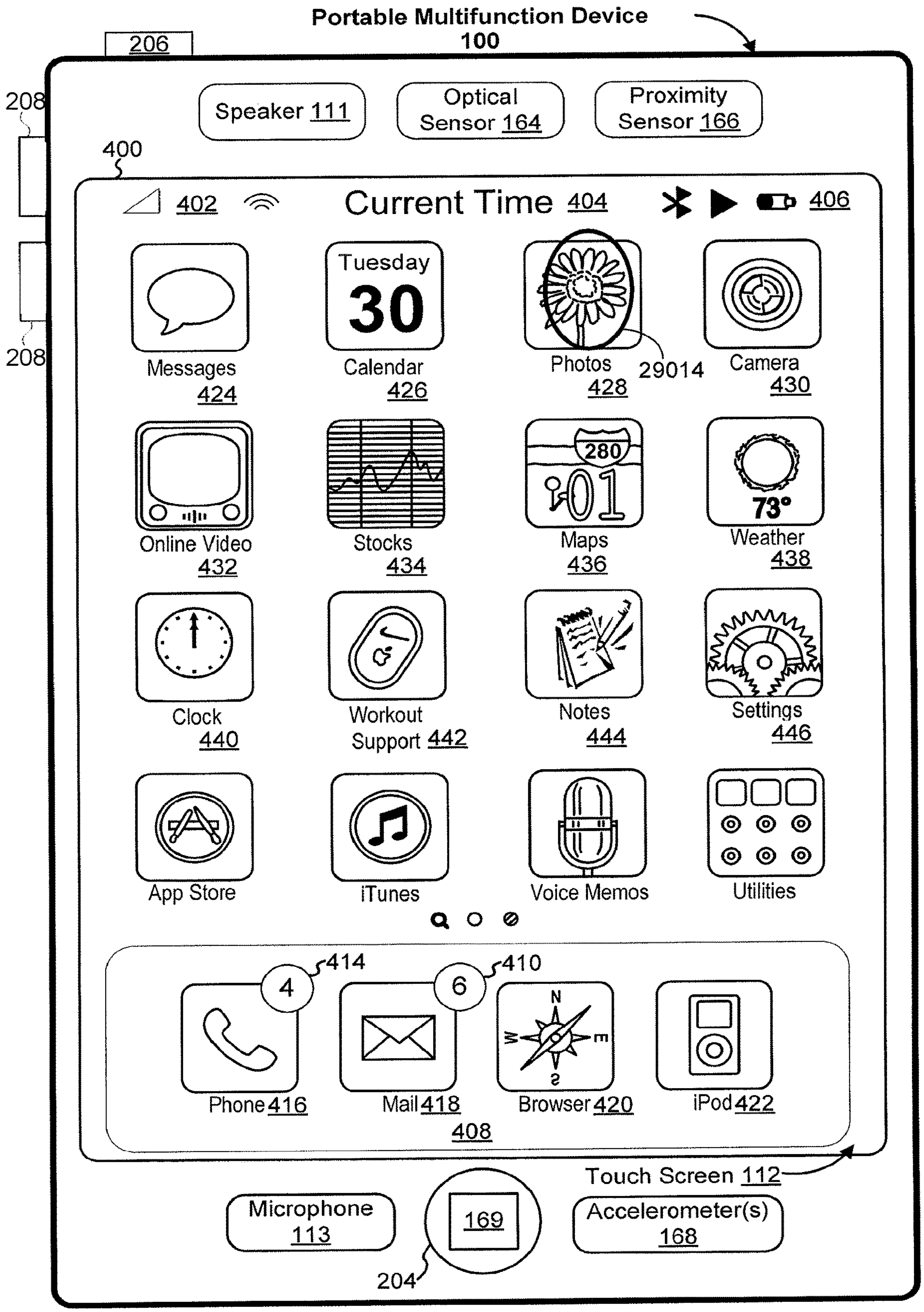
Figure 29C:
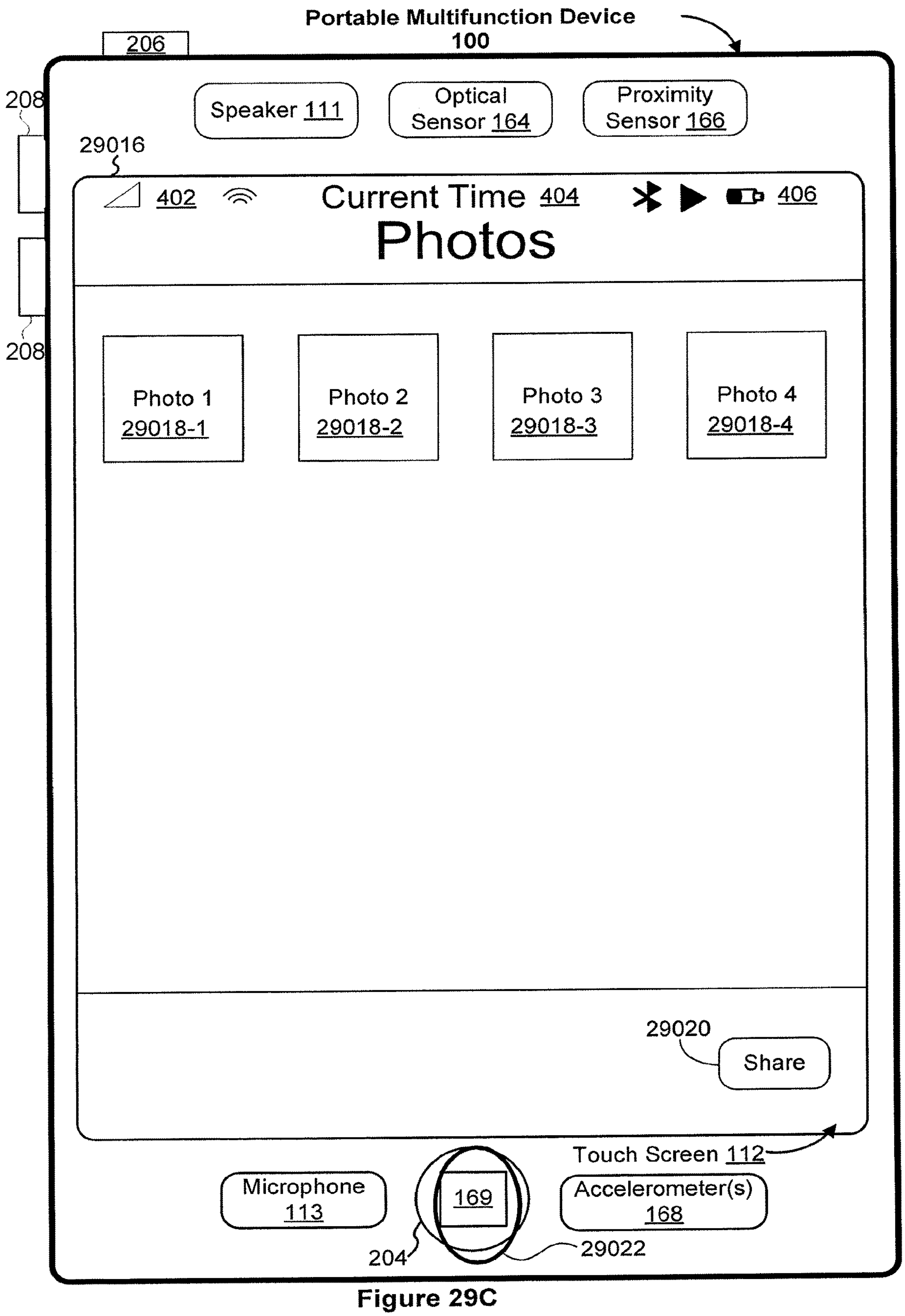

If fingerprint 29012 is one of the enrolled fingerprints, device 100 transitions to a multi-application unlocked mode, in which features of multiple applications are unlocked, and user interface 400 is displayed, as shown in FIG. 29B. With user interface 400 displayed and device 100 in multi-application unlocked mode, a user can launch and use any of multiple applications on device 100 with full access. For example, FIG. 29B shows gesture 29014 (e.g., a tap gesture) detected on "Photos" icon 428. In response to detecting gesture 29014, device 100 launches a content presentation application (e.g., a photo viewer application) with full access and displays a corresponding photo viewer interface 29016, as shown in FIG. 29C. In some embodiments, photo viewer interface 29016 corresponds to a camera application as well as, or instead of, a content presentation application.

In photo viewer interface 29016, photos 29018 stored on device 100 are displayed, including photos previously captured in past sessions of a camera application on device 100 and/or photos received by device 100. In some embodiments, photo viewer interface 29016 includes share icon 29020 for initiating a process for sharing any of photos 29018 by message, email, social network upload, or any other suitable method. Share icon 29020 is enabled, as device 100 is in the multi-application unlocked mode.

Figure 29D:
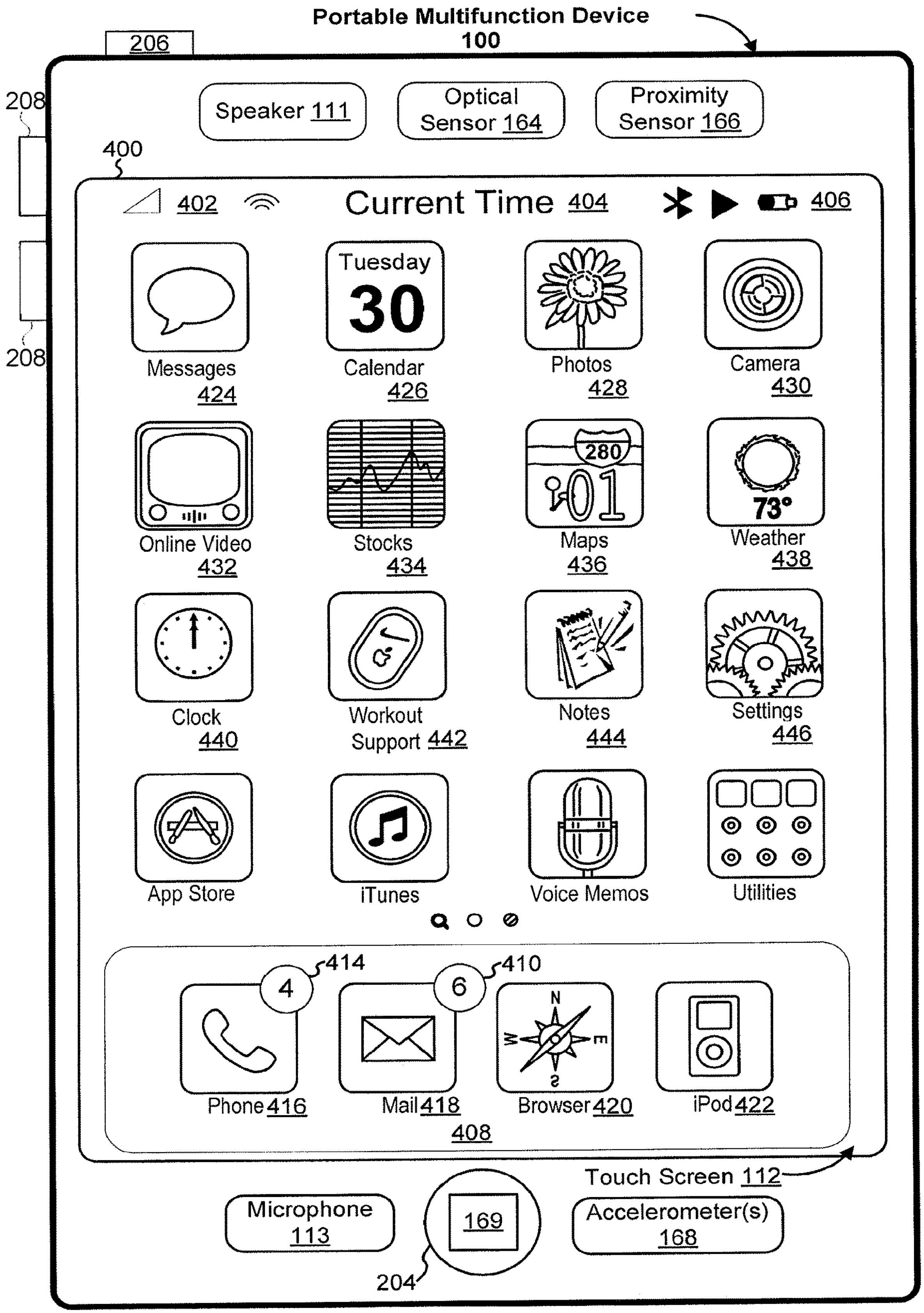

While photo viewer interface 29016 is displayed (i.e., the photo viewer application is open), button press 29022 on button 204 is detected by device 100. Button press 29022 includes a button-down (activation) of button 204 and a button-up (deactivation) of button 204. In response to detecting button press 29022, photo viewer interface 29016 ceases to be displayed (e.g., the photo viewer application is dismissed to the background) and user interface 400 is displayed, and device 100 remains in multi-application unlocked mode, as shown in FIG. 29D.

Figure 29E:
Figure 29F:
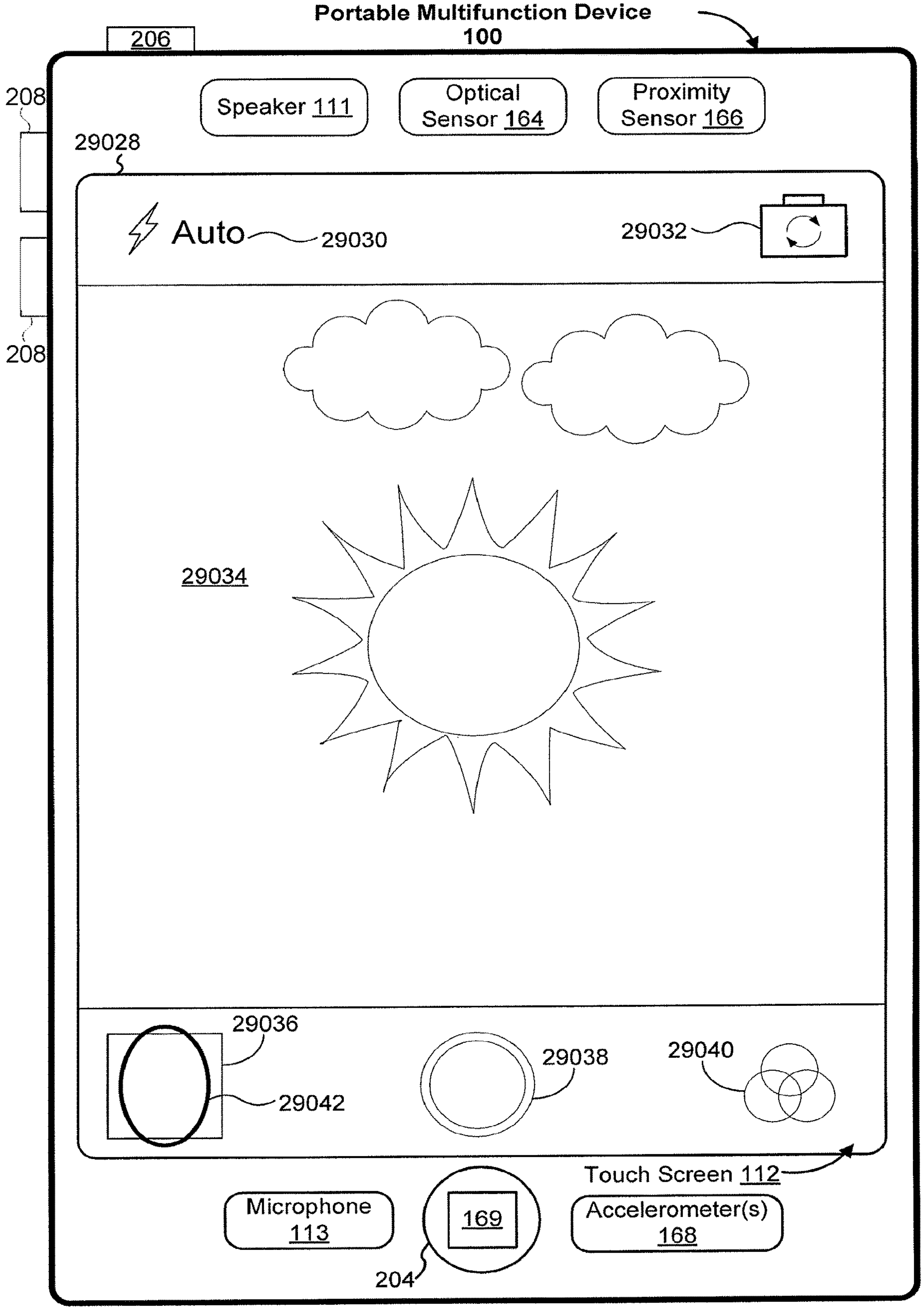

FIG. 29E illustrates device 100 in locked mode with locked device interface 29000 displayed on touch screen 112. A gesture is detected on touch screen 112. The gesture (e.g., a swipe gesture) includes contact 29024 detected on icon 29010, and while detected on icon 29010, moving in direction 29026. In response to detecting the gesture, device 100 displays camera interface 29028 in a limited-access mode on touch screen 112, as shown in FIG. 29F, and device 100 remains in locked mode.

Camera interface 29028 is an interface associated with a camera application (e.g., camera module 143) on device 100. Camera interface 29028 includes camera preview 29034, flash control 29030, front/back camera toggle 29032, shutter/capture button 29038, image effects control 29040, and camera roll icon 29036. Device 100 ceases to display camera interface 29028 and displays camera roll interface 29044 in a limited-access mode (FIG. 29G) in response to detection of gesture 29042 (e.g., a tap gesture) on camera roll icon 29036. While camera roll interface 29044 is displayed in limited-access mode, photos captured on device 100 in previous sessions of the camera application are not displayed in camera roll interface 29044. For example, in FIG. 29G, instead of photos displayed in camera roll interface 29044, message 29046 directing the user to unlock the device to view the captured photos is displayed.

Camera roll interface 29044 also includes share icon 29020 that is disabled and camera icon 29048. In some embodiments, share icon 29020 is grayed out or shaded when it is disabled. Device 100 ceases to display camera roll interface 29044 and displays camera interface 29028 in response to detection of a gesture (e.g., a tap gesture) on camera icon 29048, which is not disabled.

Figure 29G:
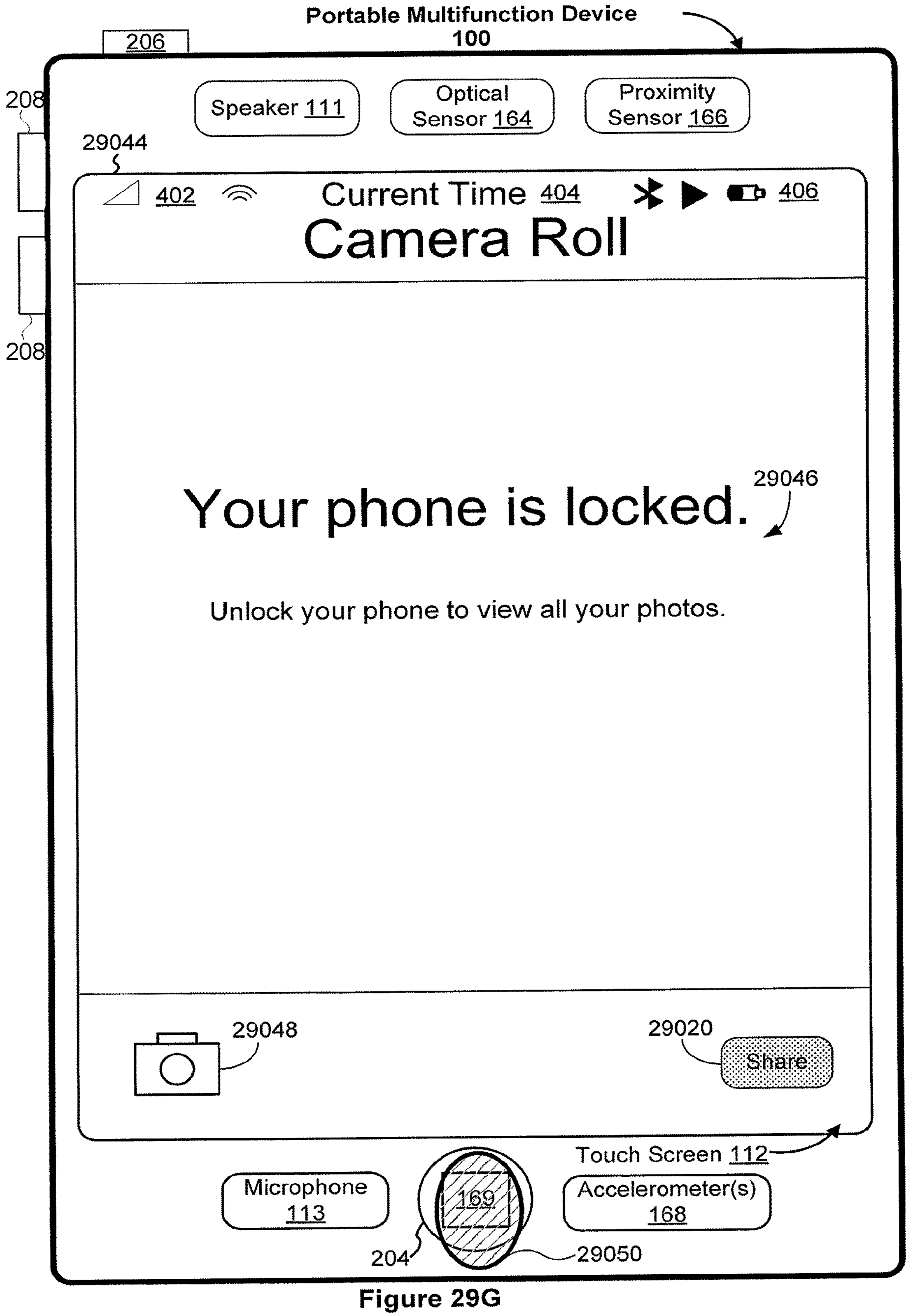
Figure 29H:
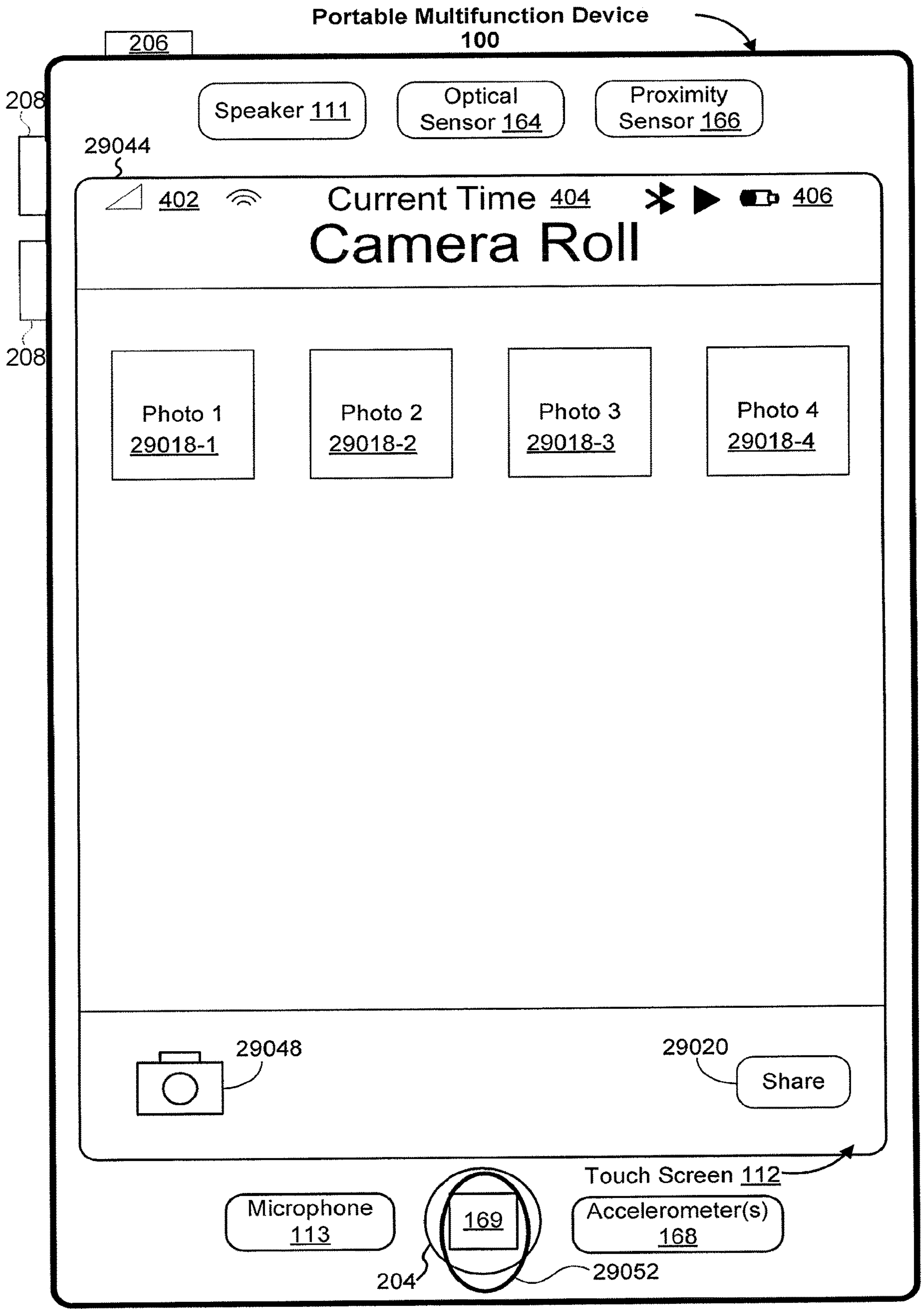

In FIG. 29G, fingerprint 29050 is detected on fingerprint sensor 169. If device 100 determines that fingerprint 29050 is one of the enrolled fingerprints, then device 100 transitions into a single-application unlock mode with respect to the application corresponding to camera roll interface 29044 and unlocks the features of camera roll interface 29044, including display of photos captured on device 100 in previous sessions of the camera application. As shown in FIG. 29H, photos 29018 are displayed in unlocked camera roll interface 29044. Also, share icon 29020 is enabled in the single-application unlock mode, as shown in FIG. 29H. If fingerprint 29050 is not one of the enrolled fingerprints, then the features of camera roll interface 29044 remain restricted.

In some embodiments, transitioning device 100 to the single-application unlocked mode with respect to camera roll interface 29044 includes device 100 unlocking just the camera application to which camera roll interface 29044 corresponds and making the features of that application unlocked and accessible, while leaving the other applications on device 100 locked and their features inaccessible.

In some other embodiments, transitioning device 100 to the single-application unlocked mode with respect to camera roll interface 29044 includes transitioning device 100 into an unlocked mode with respect to multiple applications (i.e., features of multiple applications are unlocked, including the camera application to which camera roll interface 29044 corresponds), but device 100 is also configured to transition back to locked mode (i.e., features of the multiple applications are locked and inaccessible) as soon as the camera application is closed. Thus, in these embodiments, even though multiple applications are unlocked, just the camera and the camera roll are accessible, which effectively makes this a single-application unlocked mode.

Figure 29I:

Returning to FIG. 29H, while the features of camera roll interface 29044 are unlocked, button press 29052 on button 204 is detected by device 100. Button press 29052 includes a button-down (activation) of button 204 and a button-up (deactivation) of button 204. In response to detecting button press 29052, camera roll interface 29044 ceases to be displayed (e.g., the camera application or the content presentation application is closed) and locked device interface 29000 is displayed, and device 100 returns to locked mode, as shown in FIG. 29I.

Figure 29J:
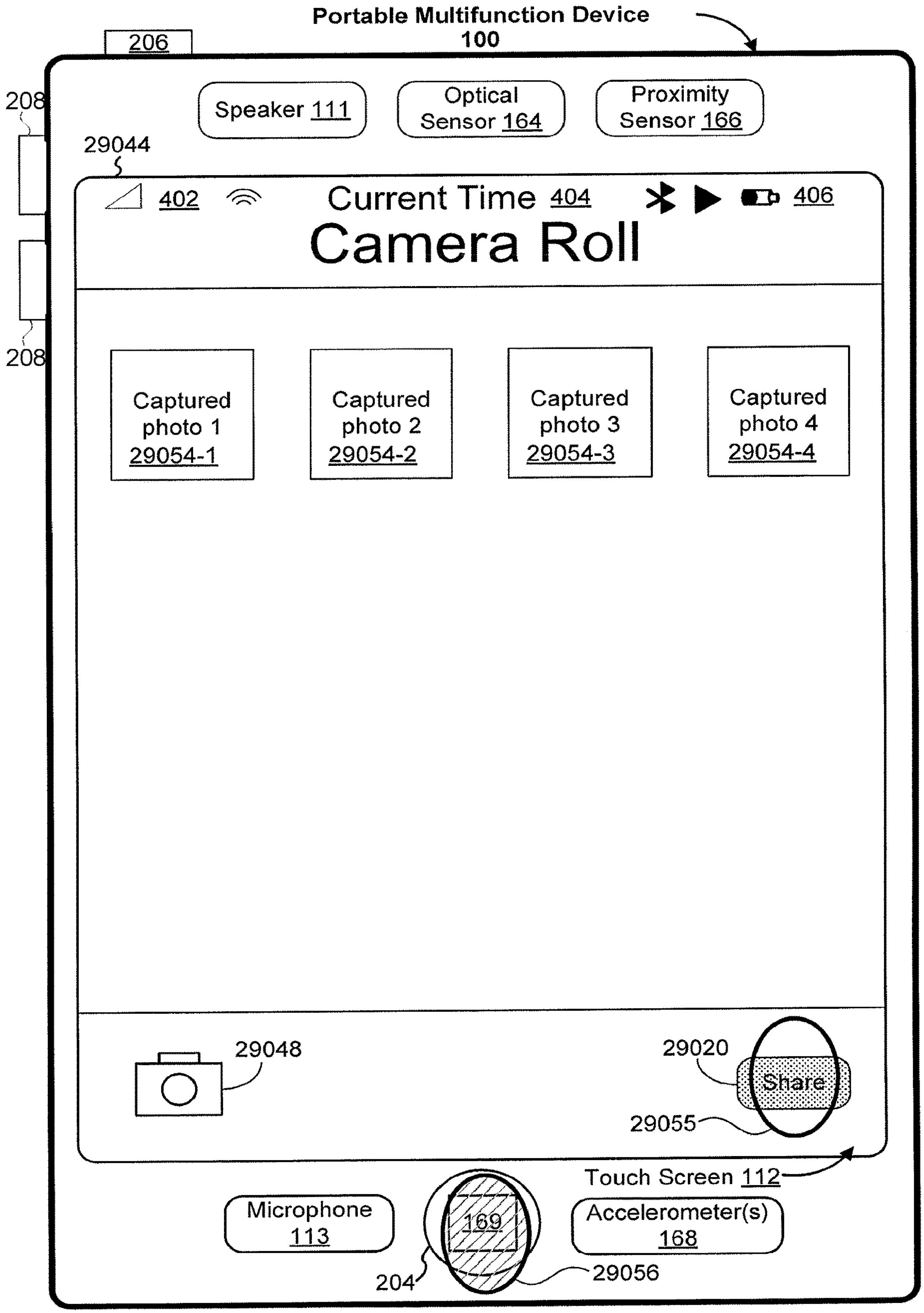

FIG. 29J illustrates another example of transitioning device 100 to a single-application unlocked mode with respect to camera roll interface 29044. In FIG. 29J, camera roll interface 29044 is in limited-access mode (i.e., its features are restricted), device 100 is in locked mode, and photos 29054 captured in a current session of the camera application are displayed in camera roll interface 29044. In FIG. 29J, other photos stored on device 100, besides the photos 29054 captured in a current session of the camera application, are not displayed. Also, share icon 29020 is disabled; gesture (e.g., a tap gesture) 29055 on share icon 29020 has no effect.

Figure 29K:
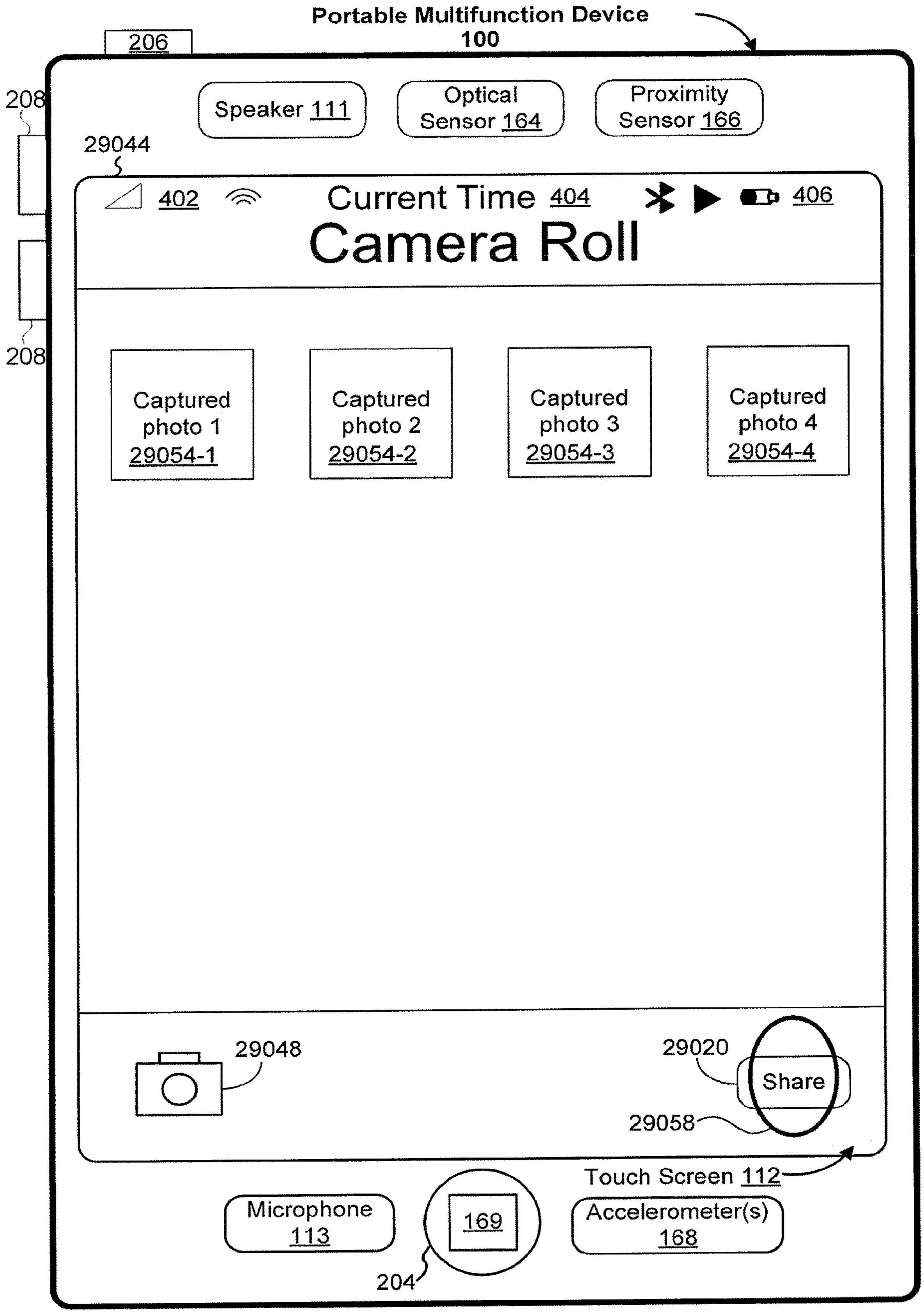
Figure 29L:
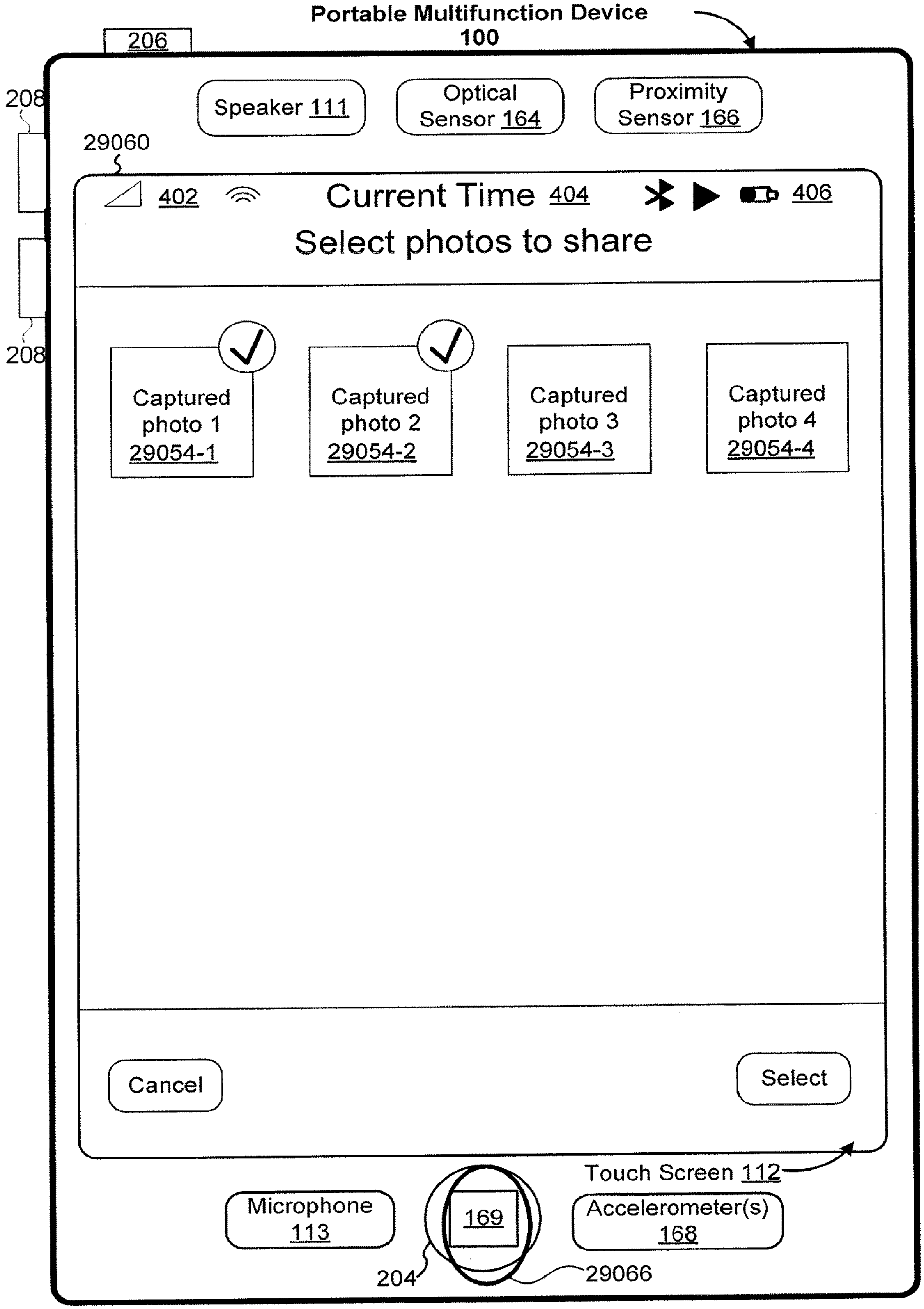

Fingerprint 29056 (FIG. 29J) is detected on fingerprint sensor 169. If device 100 determines that fingerprint 29056 is one of the enrolled fingerprints, then device 100 transitions to a single-application unlock mode and unlocks the features of camera roll interface 29044, including enabling share icon 29020. As shown in FIGS. 29K-29L, in response to detecting gesture (e.g., a tap gesture) 29058 on share icon 29020, device 100 initiates a process for sharing one or more of the photos displayed in camera roll interface 29044 (e.g., photos 29054). (For simplicity, this example assumes that captured photos 29054-1-29054-4 are all of the photos stored on the device.) The sharing process includes, for example, displaying photo selection interface 29060 (FIG. 29L), where the user selects the photos to share, and displaying an interface for the user to select a method of sharing (e.g., email, message, social network, microblog) (not shown). If fingerprint 29056 is not one of the enrolled fingerprints, then the features of camera roll interface 29044 remain restricted.

Figure 29M:

Before the sharing process is completed, the user can close the corresponding content presentation application or camera application, and thus cancel the sharing process. For example, in FIG. 29L, while photo selection interface 29060 is displayed, button press 29066 on button 204 is detected by device 100. Button press 29066 includes a button-down (activation) of button 204 and a button-up (deactivation) of button 204. In response to detecting button press 29066, photo selection interface 29060 ceases to be displayed (e.g., the camera application or the content presentation application is closed) and locked device interface 29000 is displayed, and device 100 is in locked mode, as shown in FIG. 29M.

Figure 29N:
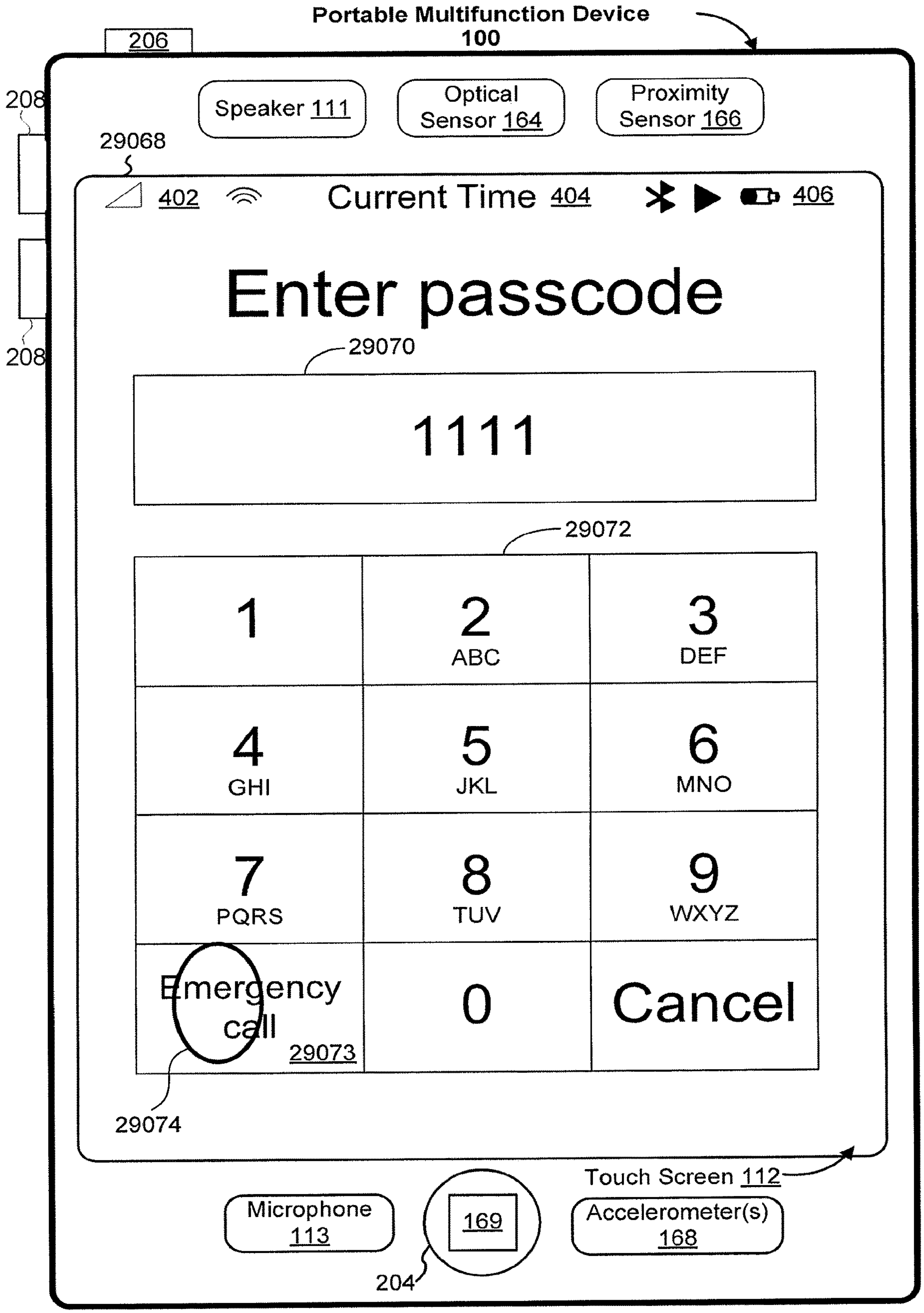
Figure 29O:
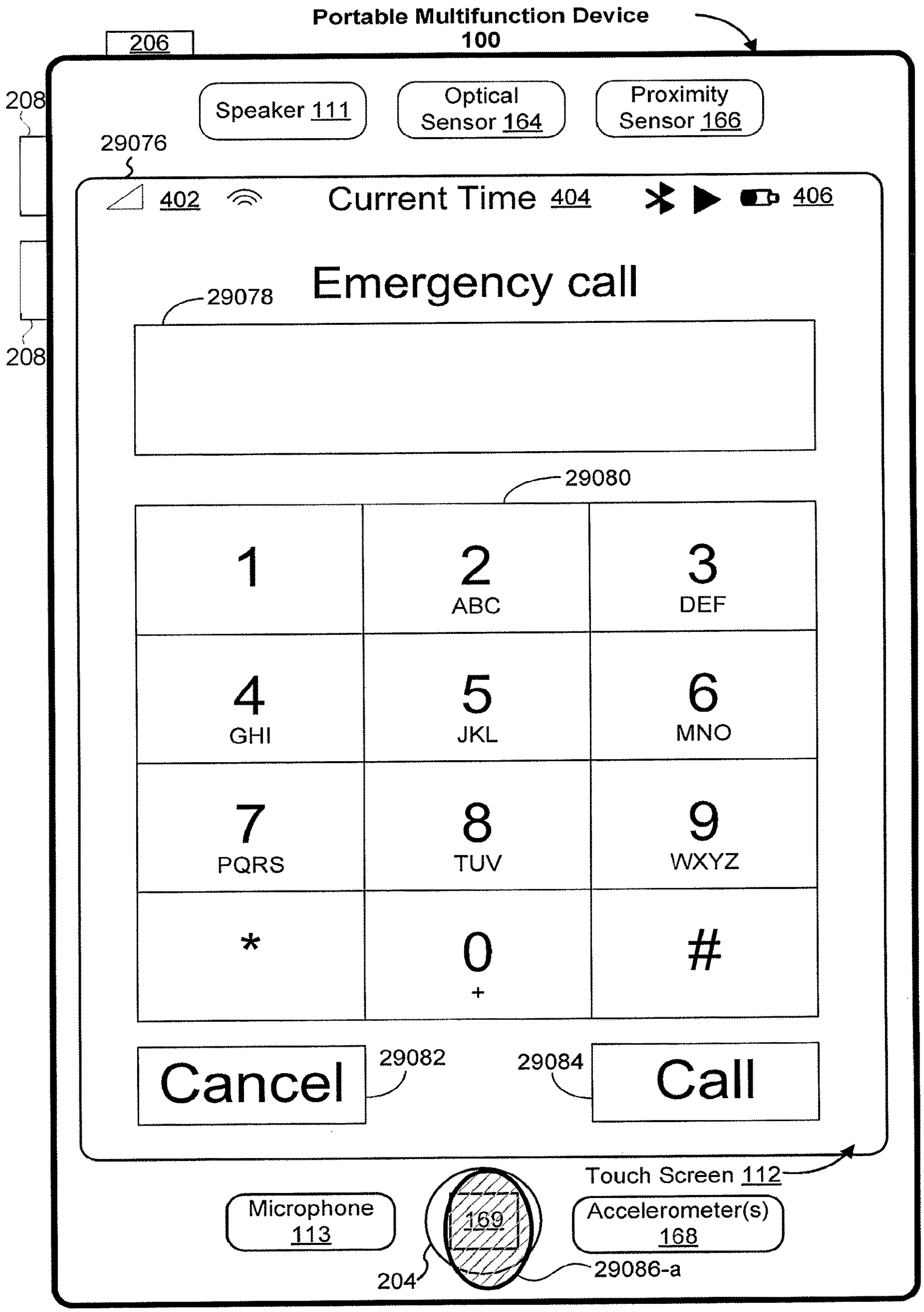

FIG. 29N illustrates passcode entry interface 29068 displayed on touch screen 112 while device 100 is in locked mode. In some embodiments, passcode entry interface 29068 is displayed in response to, for example, detection of a horizontal swipe gesture in proximity of unlock instructions 29004 while locked device interface 29000 is displayed. Passcode entry interface 29068 includes passcode field 29070 and keypad 29072. Keypad 29072 includes "Emergency call" key 29073. In response to detecting gesture (e.g., a tap gesture, a virtual-key press gesture) 29074 on "Emergency call" key 29073, device 100 displays emergency call interface 29076, and device 100 remains in locked mode, as shown in FIG. 29O.

Emergency call interface 29076 is an interface corresponding to a phone application on device 100. A user can make emergency calls (e.g., calls to recognized official emergency phone numbers, such as 911, 999, etc.; calls to contacts designated in device 100 as "in case of emergency" ("ICE") contacts) but not non-emergency calls (e.g., calls to non-emergency phone numbers) from emergency call interface 29076. Also, other features of the phone application (e.g., contacts, call history, voicemail, contact favorites or speed-dial) are not accessible from emergency call interface 29076. Emergency call interface 29076 includes, for example, phone number field 29078, keypad 29080, cancel icon 29082, and call icon 29084.

Figure 29P:
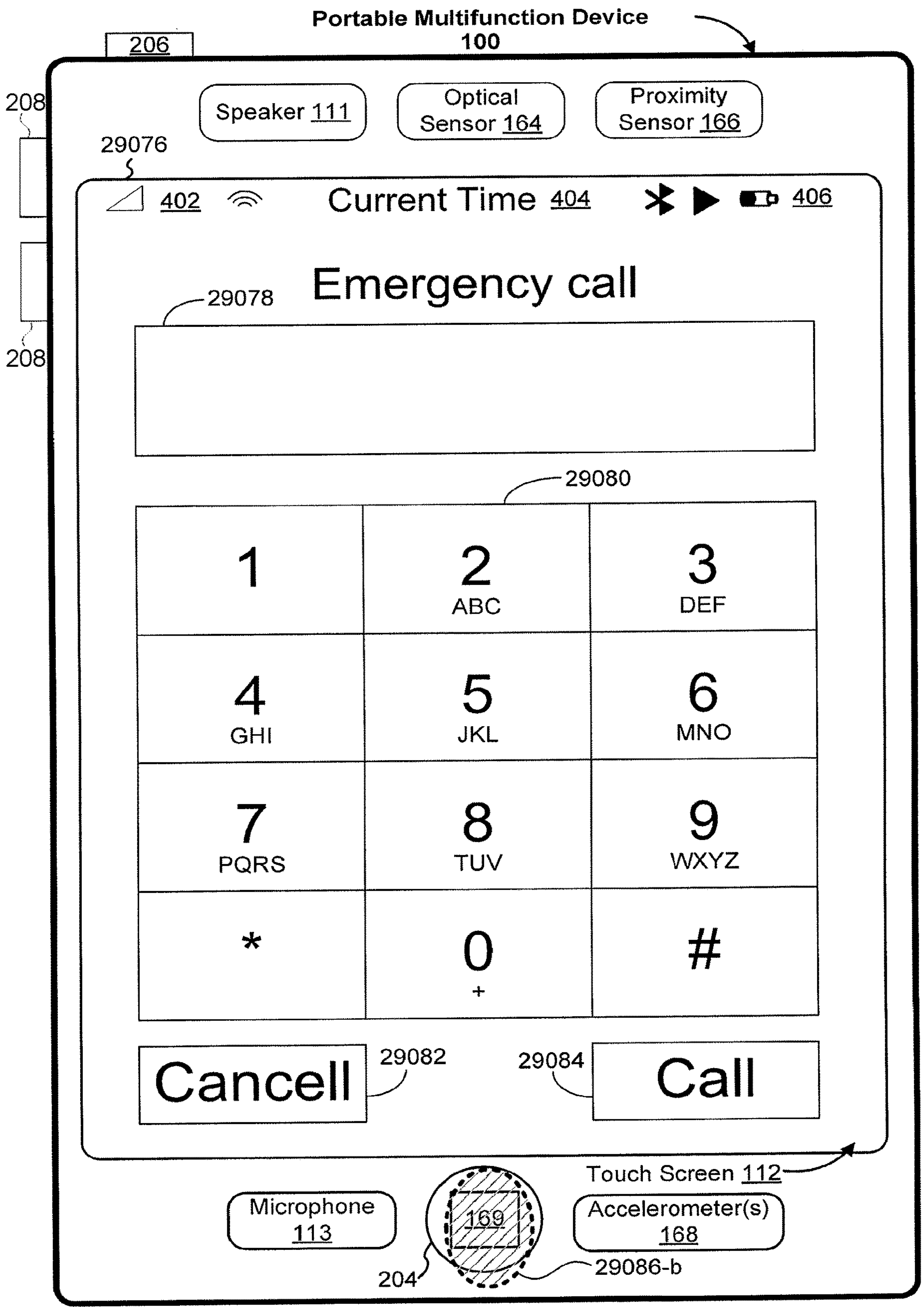
Figure 29Q:
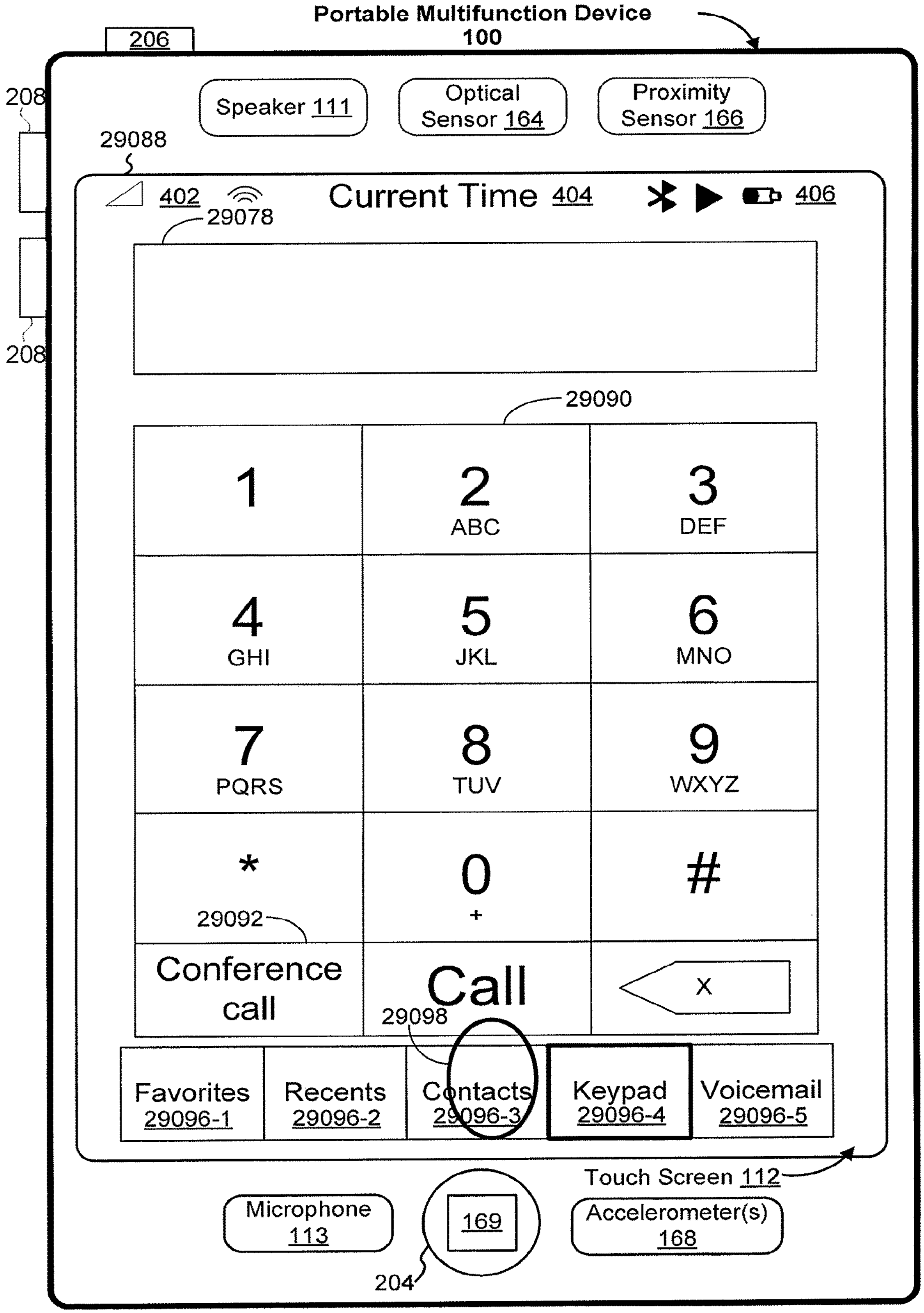

While emergency call interface 29076 is displayed, fingerprint 29086 is detected on fingerprint sensor 169. As depicted in FIGS. 29O-29P, fingerprint 29086 includes fingerprint-down 29086-*a* and fingerprint-liftoff 29086-*b*. If device 100 determines that fingerprint 29086 is one of the enrolled fingerprints, then in response to detecting fingerprint-liftoff 29086-*b*, device 100 transitions to a single-application unlock mode with respect to the phone application and unlocks the features of the phone application. As a result of unlocking the features of the phone application, emergency call interface 29076 ceases to be displayed, and instead interfaces for the full-access phone application (e.g., keypad interface 29088 with phone icons 29096) are displayed, as shown in FIG. 29Q. If fingerprint 29086 is not one of the enrolled fingerprints, then the features of the phone application remain locked and emergency call interface 29076 remains displayed.

Figure 29R:
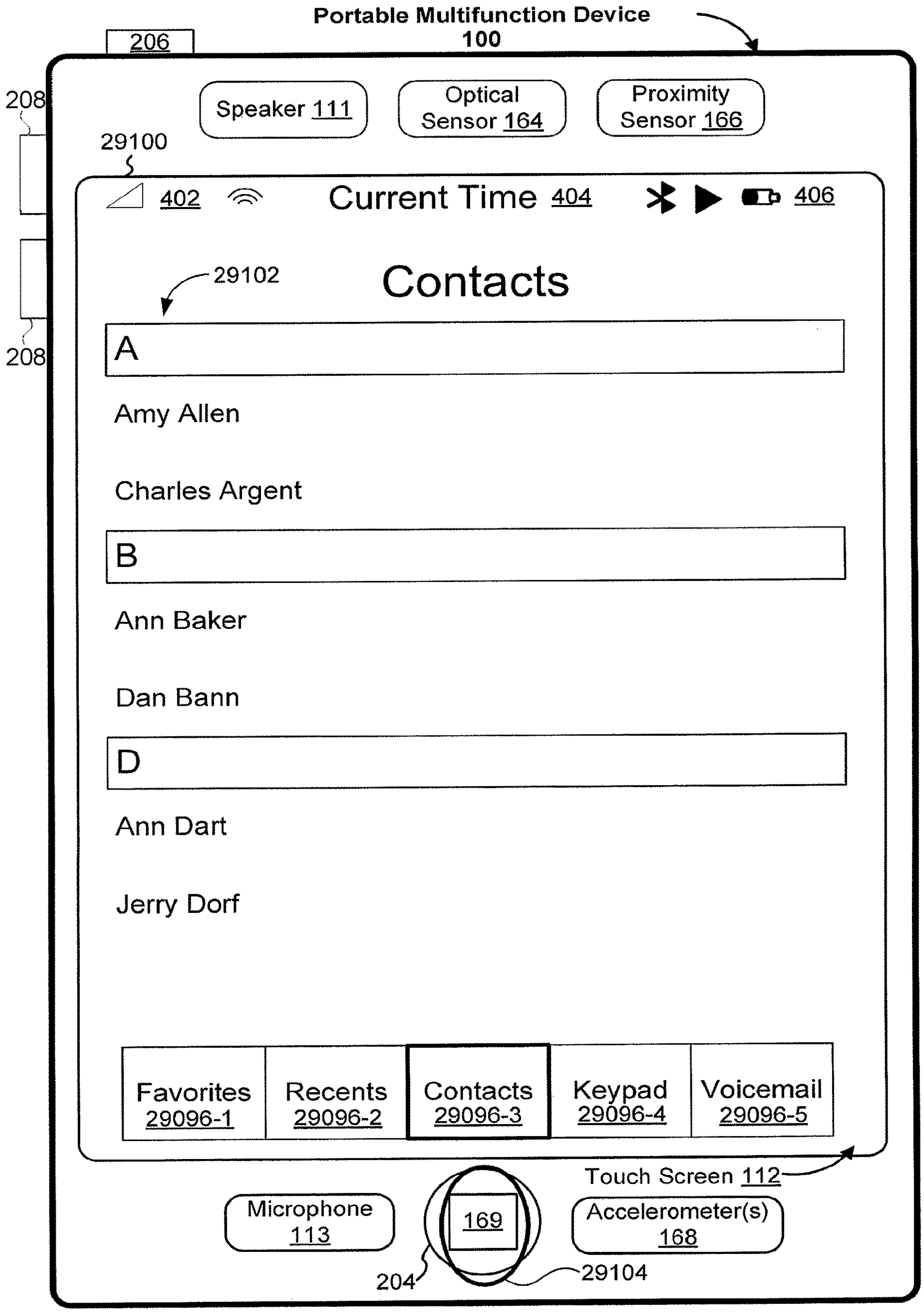

FIG. 29Q illustrates device 100 displaying keypad interface 29088 after the features of the phone application are unlocked. Keypad interface 29088 includes, for example, phone number field 29078, keypad 29090, and icons 29096 for accessing the features of the phone application. Keypad 29090 includes conference call key 29092, which was not present in keypad 29080 in emergency call interface 29076. Icons 29096 include, for example, favorites icon 29096-1, call history icon 29096-2, contacts icon 29096-3, keypad icon 29096-4, and voicemail icon 29096-5. In response to detecting gesture (e.g., a tap gesture) 29098 on contacts icon 29096-3, device 100 ceases to display keypad interface 29088 and displays contacts interface 29100, as shown in FIG. 29R. Contacts interface 29100 is accessible now that the features of the communication interface are unlocked. Contacts interface 29100 includes, for example, a list of contacts 29102 that the user can view and edit.

Figure 29S:

Continuing in FIG. 29R, while contacts interface 29100 is displayed, button press 29104 on button 204 is detected by device 100. Button press 29104 includes a button-down (activation) of button 204 and a button-up (deactivation) of button 204. In response to detecting button press 29104, contacts interface 29100 ceases to be displayed (i.e., the phone application is closed) and locked device interface 29000 is displayed, and device 100 is in locked mode, as shown in FIG. 29S.

Figure 29T:
Figure 29U:
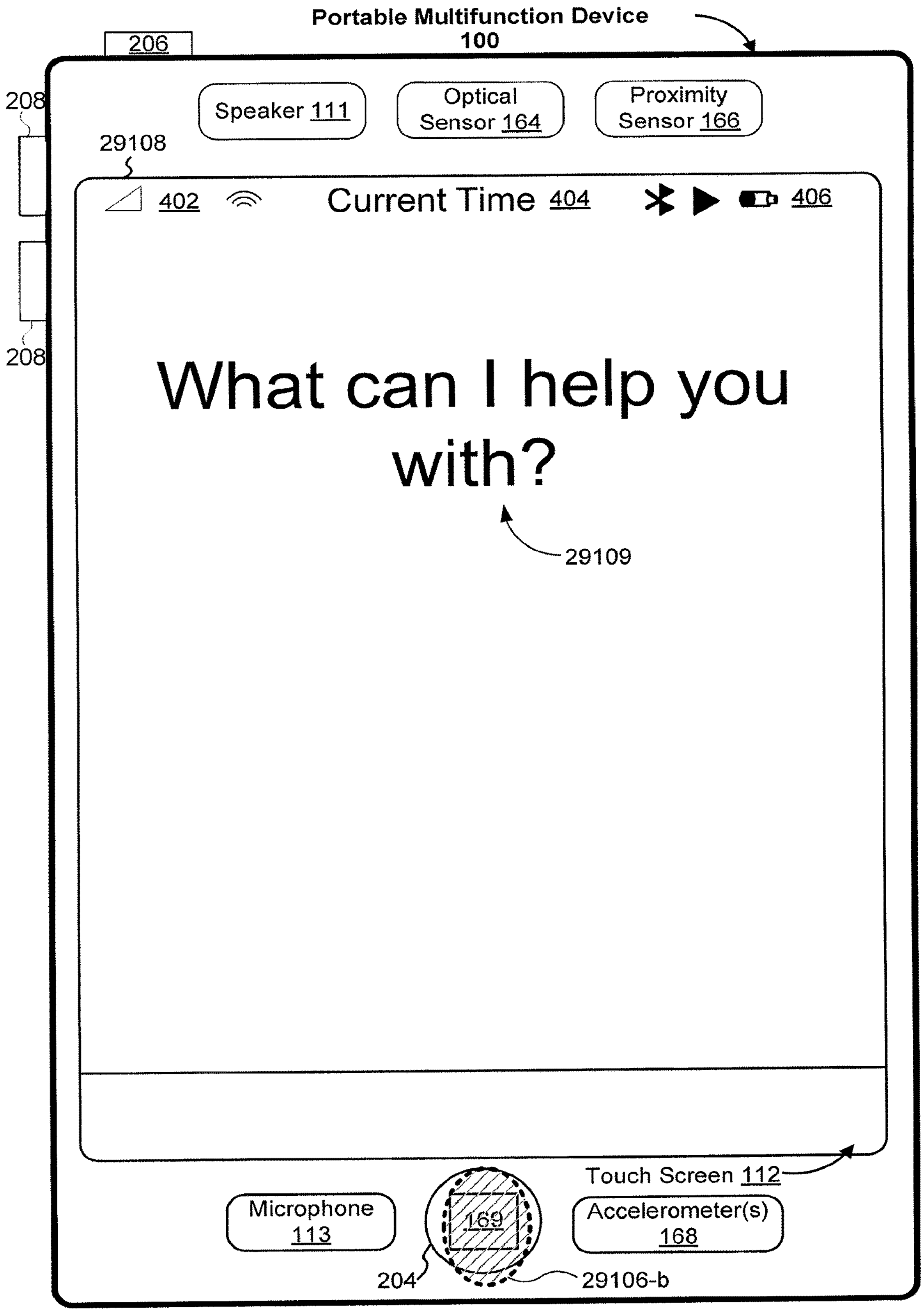
Figure 29V:
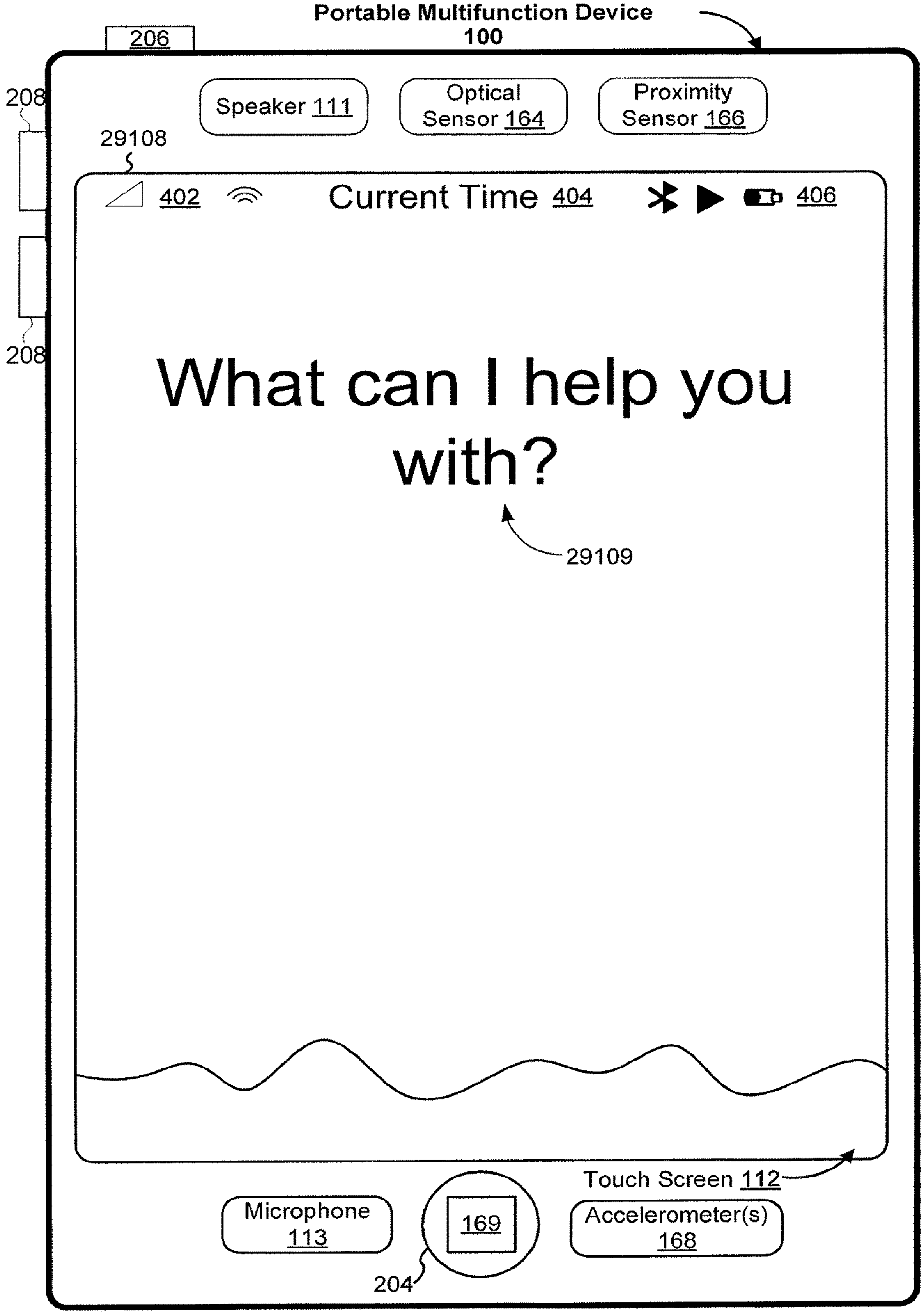
Figure 29W:
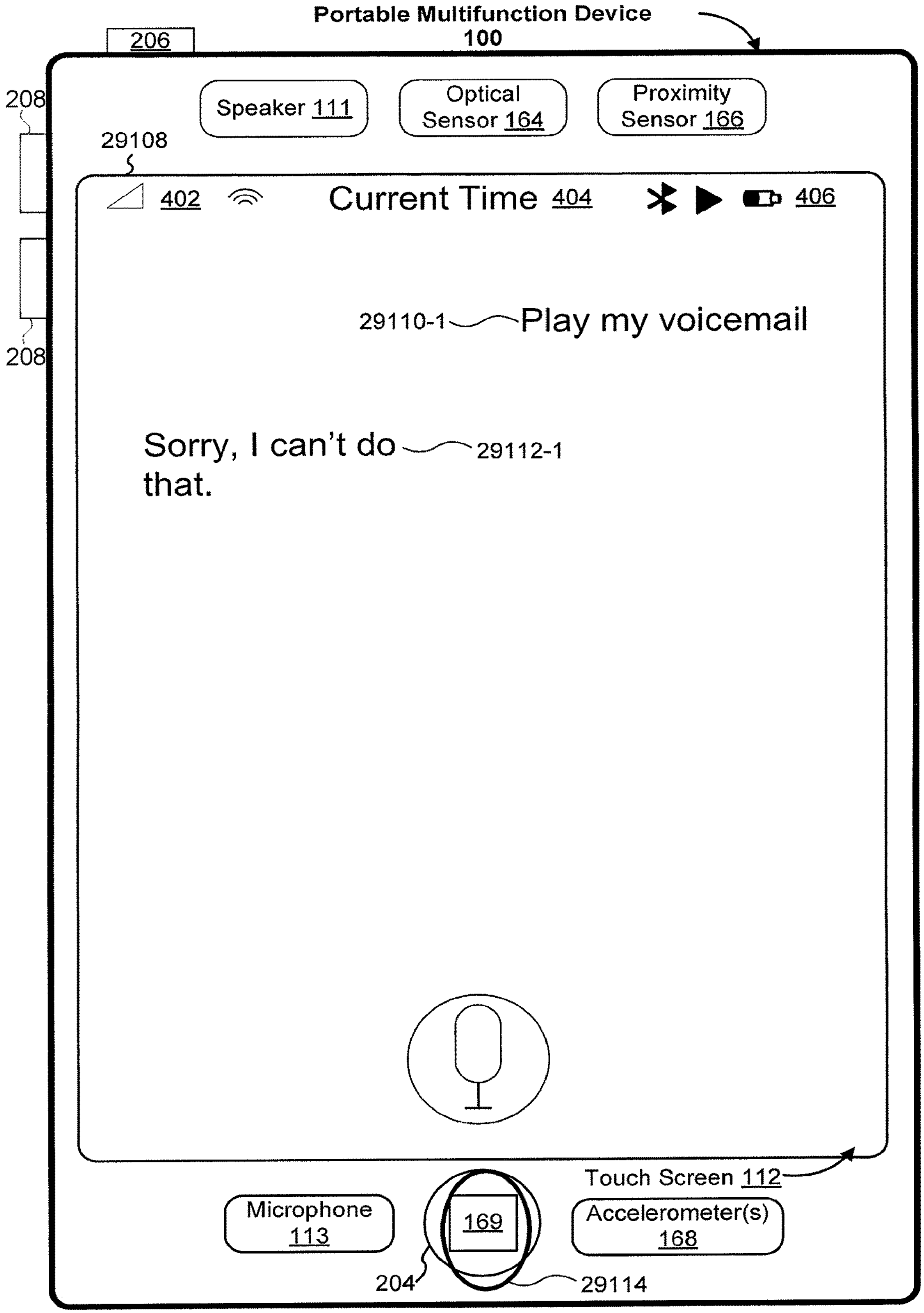

FIG. 29T illustrates device 100 in locked mode with locked device interface 29000 displayed on touch screen 112. Button press 29106 is detected on button 204, and a fingerprint corresponding to button press 29106 is detected on fingerprint sensor 169 integrated with button 204. The button press includes button-down 29106-*a* and button-up 29106-*b* (FIG. 29V). During button-down 29106-*a*, fingerprint sensor 169 detects the fingerprint corresponding to button press 29106 and determines if the fingerprint is one of the enrolled fingerprints. Also, in response to button-down 29106-*a* continuing and lasting for more than a predetermined amount of time (e.g., 2 seconds), personal assistant interface 29108 is displayed in limited-access mode, as shown in FIG. 29U; some features of the corresponding personal assistant application are locked.

Personal assistant interface 29108 corresponds to a personal assistant application. The personal assistant application is voice controlled, and can perform various operations in response to voice commands from the user. For example, the personal assistant application can perform web searches; display news, weather, and sports scores; read email and messages; inform the user of outstanding appointments or events, and compose email and messages in accordance with user dictation. Personal assistant interface 29108 optionally includes prompt 29109 to prompt the user to speak a command or request.

After personal assistant interface 29108 is displayed, button-up 29106-*b* is detected. In response to detecting button-up 29106-*b*, if the fingerprint corresponding to button press 29106 is determined by device 100 to be one of the enrolled fingerprints, device 100 transitions to a single-application unlocked mode with respect to the personal assistant application and the features of the personal assistant application are unlocked; and if the fingerprint corresponding to button press 29106 is determined by device 100 to not be one of the enrolled fingerprints, some features of the personal assistant application remain locked.

While personal assistant interface 29108 is displayed and after button-up 29106-*b*, the personal assistant application is standing by for commands or requests from the user, and the user speaks a command or request to device 100, as in FIG. 29V. Commands/requests 29110 from the user and responses 29112 from the personal assistant application are displayed in personal assistant interface 29108 for the user to view.

If some features of the personal assistant application remain locked in response to button-up 29106-*b*, then commands or requests involving personal or private information (e.g., play voicemail, compose a message, make a call) are not fulfilled by the personal assistant interface (because these features of the personal assistant application are locked). For example, in FIG. 29W, in response to command 29110-1 "Play my voicemail," response 29112-1 from the personal assistant application is "Sorry I can't do that." In some embodiments, if a command or request does not involve personal or private information (e.g., the command is to display a sports score), then the personal assistant interface answers the command or request.

If the features of the personal assistant application are unlocked in response to button-up 29106-*b*, then the personal assistant application fulfills commands or requests involving personal or private information (e.g., play voicemail, compose a message, make a call), as well as commands/request not involving personal or private information. For example, in FIG. 29X, in response to command 29110-2 "Play my voicemail," response 29112-2 from the personal assistant application is "You have two voicemails. Playing . . . " and playback of the voicemails by device 100.

The personal assistant application can be closed by a press of button 204. For example, in response to detecting button press 29114 (FIG. 29W) or button press 29116 (FIG. 29X), personal assistant interface 29108 cease to be displayed, and locked device interface 29000 is displayed, as shown in FIG. 29Y. In both FIG. 29W and FIG. 29X, device 100 is not fully unlocked (in FIG. 29W, features of multiple applications are still locked; in FIG. 29X, device 100 is in a single-application unlocked mode with respect to the personal assistant application), and thus locked device interface 29000 is displayed.

FIGS. 30A-30D are flow diagrams illustrating a method 3000 of unlocking an application or a device depending on context in accordance with some embodiments. The method 3000 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 3000 are, optionally, combined and/or the order of some operations is, optionally, changed.

As described below, the method 3000 provides an intuitive way to unlock an application or a device depending on context. The method reduces the cognitive burden on a user when unlocking, thereby creating a more efficient human-machine interface. For battery-operated electronic devices, enabling a user to unlock more efficiently conserves power and increases the time between battery charges.

While the electronic device is (3002) in a locked mode in which access to features of a plurality of different applications on the electronic device is prevented, the device displays (3004) a first user interface on the display. The first user interface is one of: a locked-device user interface for the electronic device, and a limited-access user interface for a respective application in the plurality of different applications. In some embodiments, the features of applications on the electronic device include features of a first application and features of a second application. In some embodiments, features of a respective application include one or more of: the ability to access and interact with content associated with the application (e.g., viewing photos in a camera roll of a camera application, viewing contacts in an address book application, viewing messages in a messaging application), the ability to instruct the application to perform application-specific operations on the device (e.g., taking pictures in a camera application, downloading content in a web browser or app store application, playing media in an media player application, sending and receiving messages in a messaging application). For example, device 100 displays locked device interface 29000 (FIG. 29A). Alternatively, the device displays a limited-access user interface for an application, such as camera roll interface 29044 (FIG. 29G or FIG. 29J), emergency call interface 29076 (FIGS. 29O-29P), or personal assistant interface 29108 (FIG. 29U). While these interfaces are displayed, an input (fingerprint 29012, FIG. 29A; fingerprint 29050, FIG. 29G; fingerprint 29056, FIG. 29J; fingerprint 29086, FIGS. 29O-29P; the fingerprint corresponding to button press 29106, FIG. 29U; respectively) to initiate unlocking features of the device is detected with fingerprint 169.

The device detects (3006), with the fingerprint sensor, a first input (e.g., fingerprint 29012, FIG. 29A; fingerprint 29050, FIG. 29G; fingerprint 29056, FIG. 29J; fingerprint 29086, FIGS. 29O-29P; or the fingerprint corresponding to button press 29106, FIG. 29U; respectively) that corresponds to a request to initiate unlocking one or more features of the device (and that meets unlock criteria). For example, the first input includes a fingerprint that matches an enrolled fingerprint that was previously enrolled with the device. In some embodiments, when the device detects an input that includes a fingerprint that does not match an enrolled fingerprint that was previously enrolled with the device, the device ignores the input (e.g., by maintaining the device in the locked mode of operation) and/or displays an alternative method of authorizing unlocking the device, such as a passcode entry user interface.

In response to detecting, with the fingerprint sensor, the first input that corresponds to the request to initiate unlocking one or more features of the device (3008), in accordance with a determination that the first user interface is the locked-device user interface for the electronic device, the device transitions (3010) the device from the locked mode to a multi-application unlocked mode in which the features of the plurality of different applications are unlocked. For example, in FIGS. 29A-29B, when the interface displayed is locked device interface 29000, in response to detecting fingerprint 29012 that is an enrolled fingerprint, device 100 transitions to a multi-application unlocked mode and user interface 400 is displayed; device 100 is fully unlocked.

However, in response to detecting, with the fingerprint sensor, the first input that corresponds to the request to initiate unlocking one or more features of the device (3008), in accordance with a determination that the first user interface is the limited-access user interface for the respective application, the device (3012) transitions the device from the locked mode to a single-application unlocked mode in which one or more previously-locked features of the respective application are unlocked, and continues to prevent access to one or more previously-locked features of other applications in the plurality of different applications (e.g., features of the other applications, besides the respective application, that are locked when the device is in the locked mode).

For example, in FIG. 29G, device 100 displays camera roll interface 29044 in limited-access mode, and in response to detecting fingerprint 29050 that is an enrolled fingerprint, features of camera roll interface 29044 are unlocked but access to features of other applications are prevented (FIG. 29H).

As another example, in FIG. 29J, device 100 displays camera roll interface 29044 in limited-access mode, and in response to detecting fingerprint 29056 that is an enrolled fingerprint, features of camera roll interface 29044 are unlocked but access to features of other applications are prevented (FIG. 29K).

As another example, in FIGS. 29O-29P, device 100 displays emergency call interface 29076 of a phone application in limited-access mode, and in response to detecting fingerprint 29050 that is an enrolled fingerprint, features of the phone application are unlocked (e.g., keypad interface 29088 is displayed; FIG. 29Q), but access to features of other applications are prevented.

Figure 29X:
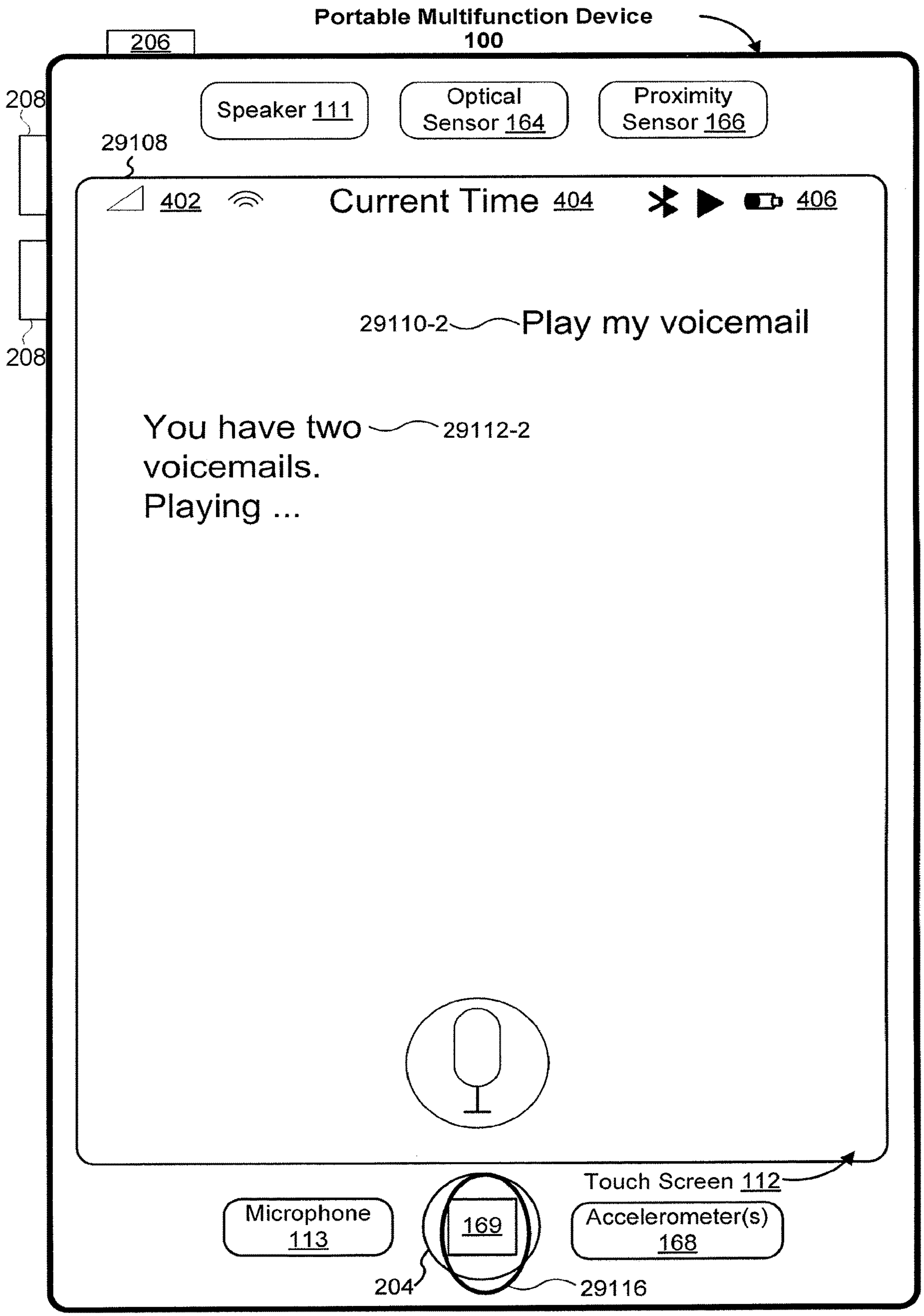
Figure 29Y:
Figure 30B:
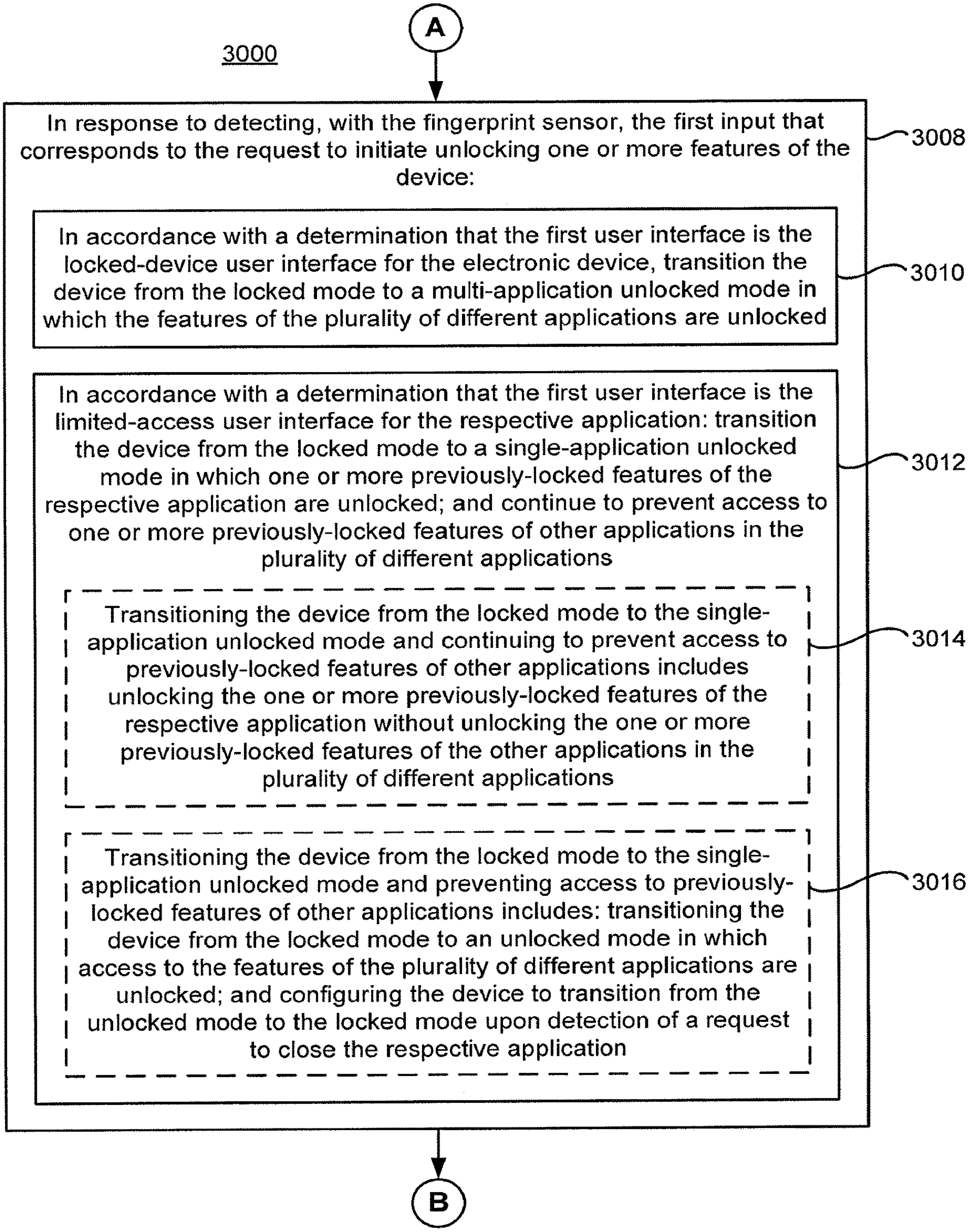
Figure 30C:
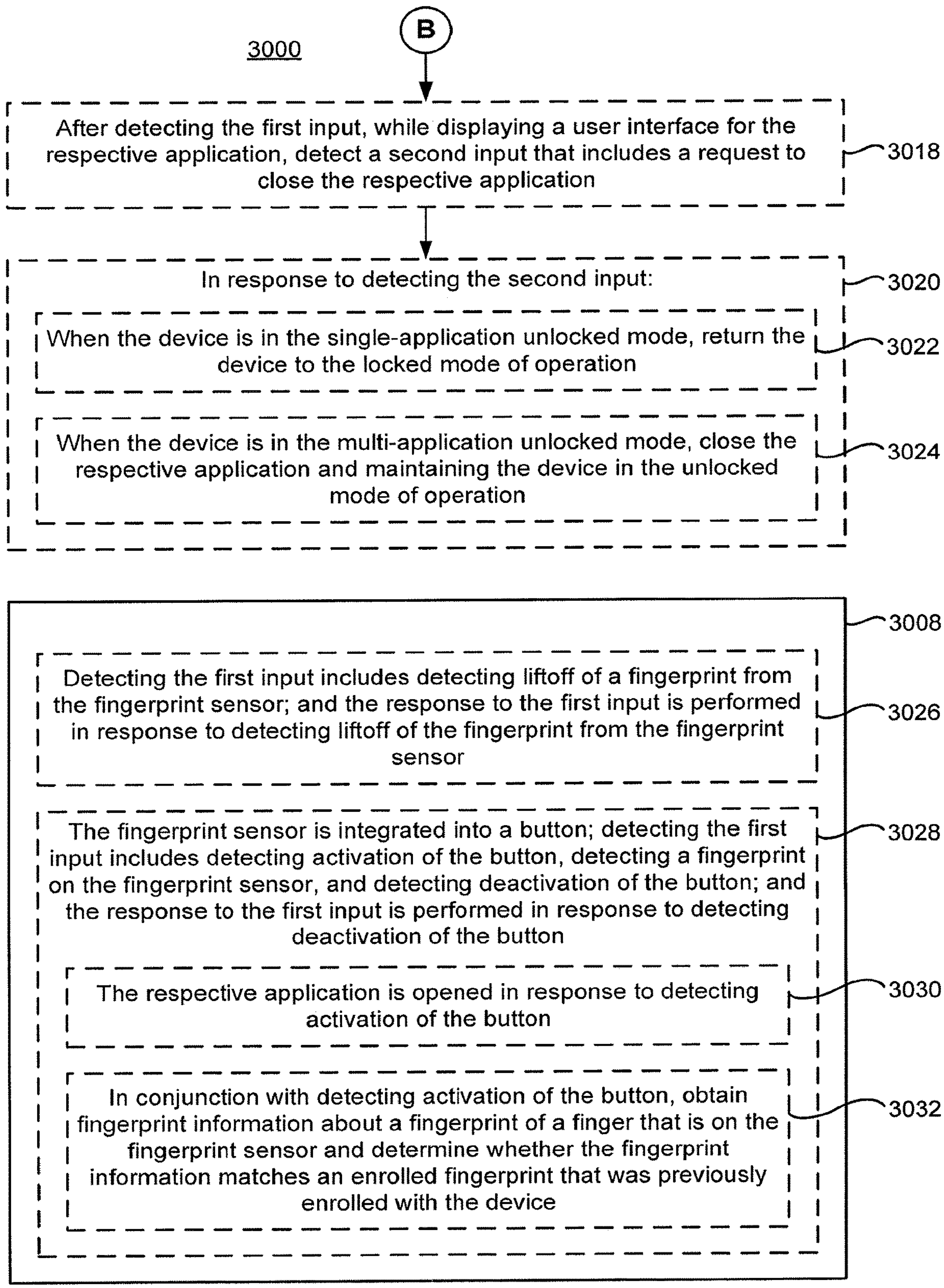
Figure 30D:
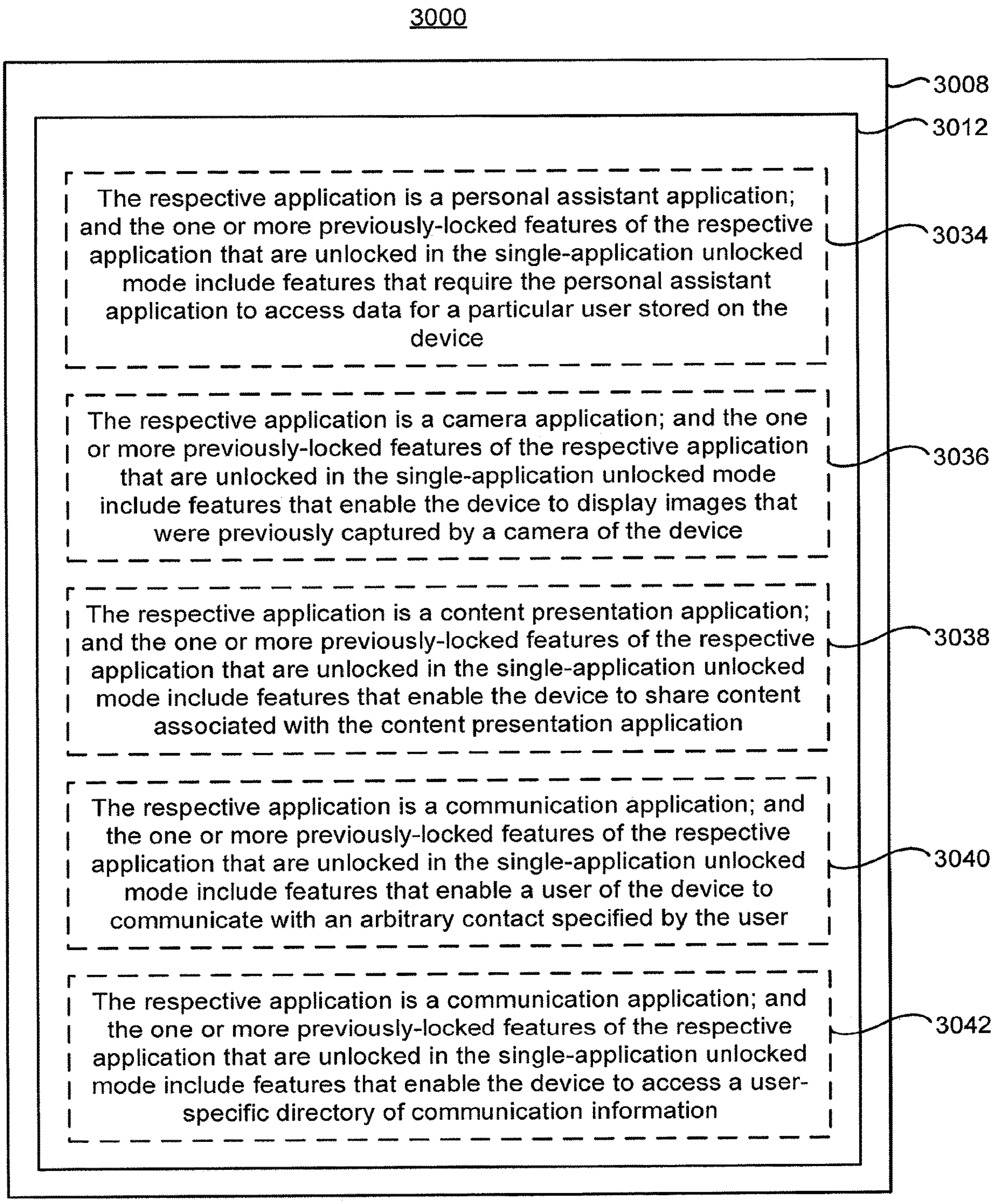

As another example, in FIG. 29U, device 100 displays personal assistant interface 29108 of a personal assistant application in limited-access mode, and in response to detecting the fingerprint, that is an enrolled fingerprint, corresponding to button press 29106, features of the personal assistant application are unlocked (e.g., access to private information is unlocked so that command 29110-2, which involves personal or private information, is fulfilled; FIG. 29X), but access to features of other applications are prevented.

In some embodiments, transitioning the device from the locked mode to the single-application unlocked mode and continuing to prevent access to previously-locked features of other applications includes (3014) unlocking the one or more previously-locked features of the respective application without unlocking the one or more previously-locked features of the other applications in the plurality of different applications (e.g., without unlocking all of the features of the plurality of different applications). For example, only features of the respective application are unlocked while features of other applications in the plurality of different applications are not unlocked. In FIGS. 29G-29H or FIGS. 29J-29K, for example, the features of the content presentation application or camera application are unlocked but features of other applications on device 100 are still locked. In FIGS. 29O-29Q, the features of the phone application are unlocked but features of other applications on device 100 are still locked. In FIGS. 29T-29V and 29X, the features of the personal assistant application are unlocked but features of other applications on device 100 are still locked.

In some embodiments, transitioning the device from the locked mode to the single-application unlocked mode and preventing access to previously-locked features of other applications includes (3016): transitioning the device from the locked mode to an unlocked mode in which access to the features of the plurality of different applications are unlocked, and configuring the device to transition from the unlocked mode to the locked mode upon detection of a request to close the respective application (e.g., when the device is in the single-application unlocked mode, the whole device is an unlocked mode, however if/when the user requests to exit the respective application, the device transitions back to the locked mode, so that the user is restricted to performing unlocked operations within the respective application). Thus, in FIGS. 29G-29H or FIGS. 29J-29K, alternatively, device 100 is unlocked in response to fingerprint 29050 and 29056, respectively, and device 100 is locked again when the content presentation application or camera application is closed. In FIGS. 29O-29Q, alternatively, device 100 is unlocked in response to fingerprint 29086, and device 100 is locked again when the phone application is closed. In FIGS. 29T-29V and 29X, alternatively, device 100 is unlocked in response to the fingerprint corresponding to button press 29106, and device 100 is locked again when the personal assistant application is closed.

In some embodiments, after detecting the first input, while displaying a user interface for the respective application, the device detects (3018) a second input that includes a request to close the respective application. In response to detecting the second input (3020), when the device is in the single-application unlocked mode, the device returns (3022) the device to the locked mode of operation; and when the device is in the multi-application unlocked mode, the device closes (3024) the respective application and maintains the device in the unlocked mode of operation. For example, while photo viewer interface 29016 is displayed in multi-application unlock mode, in response to detecting button press 29022, the corresponding content presentation application is closed and device 100 remains unlocked (FIGS. 29C-29D). On the other hand, while camera roll interface 29044 is displayed in single-application unlock mode, in response to detecting button press 29052, the corresponding content presentation application or camera application is closed and device 100 returns to locked mode (FIGS. 29H-29I). As another example, while photo selection interface 29060 is displayed in single-application unlock mode, in response to detecting button press 29066, the corresponding content presentation application or camera application is closed and device 100 returns to locked mode (FIGS. 29L-29M). As another example, while contacts interface 29100 is displayed in single-application unlock mode, in response to detecting button press 29104, the corresponding phone application is closed and device 100 returns to locked mode (FIGS. 29R-29S). As another example, while personal assistant interface 29108 is displayed in single-application unlock mode, in response to detecting button press 29114 or 29116, the corresponding personal assistant application or camera application is closed and device 100 returns to locked mode (FIGS. 29W-29Y).

In some embodiments, detecting the first input includes detecting liftoff of a fingerprint from the fingerprint sensor, and the response to the first input is performed in response to detecting liftoff of the fingerprint from the fingerprint sensor (3026). For example, in FIGS. 29O-29Q, the transition to the single-application unlock mode with respect to the phone application is performed in response to fingerprint-liftoff 29086-*b*.

In some embodiments, the fingerprint sensor is (3028) integrated into a button; detecting the first input includes detecting activation of the button (e.g., detecting a button-down signal), detecting a fingerprint on the fingerprint sensor, and detecting deactivation of the button (e.g., detecting a button-up signal) (e.g., while continuing to detect the fingerprint on the fingerprint sensor); and the response to the first input is performed in response to detecting deactivation of the button (e.g., the response to the first input is performed in response to detecting the button-up signal). For example, FIGS. 29T-29V depict fingerprint sensor 169 as integrated into button 204. In FIGS. 29T-29V, the input is button press 29106 that includes button-down 29106-*a* that activates button 204, detection of the fingerprint corresponding to button press 29106, and button-up 29106-*b* that deactivates the button. The transition to the single-application unlock mode (or not) is performed in response to detecting button-up 29106-*b*.

In some embodiments, the respective application is opened (3030) in response to detecting activation of the button (e.g., the device opens a personal digital assistant application in response to detecting a button down event, or in response to detecting a button down event and then continuing to detect the button down for more than a predetermined time threshold such as 0.2, 0.5, 1, 2 seconds, or some other reasonable time threshold). For example, device 100 opens the personal assistant application (e.g., displays personal assistant interface 29108) in response to detecting button-down 29106-*a* for at least a predetermined amount of time (FIGS. 29T-29U).

In some embodiments, in conjunction with detecting activation of the button (e.g., immediately before, during and/or immediately after detecting activation of the button), the device obtains (3032) fingerprint information about a fingerprint of a finger that is on the fingerprint sensor and determining whether the fingerprint information matches an enrolled fingerprint that was previously enrolled with the device. For example, in FIG. 29T, during button-down 29106-*a*, device 100 obtains information for the fingerprint corresponding to button press 29106 and determines if that fingerprint is an enrolled fingerprint.

In some embodiments, the respective application is (3034) a personal assistant application (e.g., a voice-controlled personal assistant application that is launched with a long press of a button in which the fingerprint sensor is integrated), and the one or more previously-locked features of the respective application that are unlocked in the single-application unlocked mode include features that require the personal assistant application to access data for a particular user stored on the device (e.g., while the device is in the locked mode, the personal assistant application can perform certain functions such as performing web searches or providing directions that do not require access to private information for a particular user but is prevented/disabled from performing other functions such as reading messages, accessing an address book, and/or accessing calendar information that require access to private information for the particular user). For example, in FIGS. 29T-29X, the application is a personal assistant application, and a feature that is unlocked in response to determining that the fingerprint corresponding to button press 29106 is an enrolled fingerprint is that the personal assistant application can access personal or private information (and therefore can fulfill requests and command such as playing voicemail).

In some embodiments, the respective application is (3036) a camera application, and the one or more previously-locked features of the respective application that are unlocked in the single-application unlocked mode include features that enable the device to display images that were previously captured by a camera of the device (e.g., photos in a "photo roll" of the camera of the device). For example, in FIGS. 29G-29H, the application is a camera application, and a feature that is unlocked in response to determining that fingerprint 29050 is an enrolled fingerprint is that previously captured or stored photos 29018 are displayed in camera roll interface 29044.

In some embodiments, the respective application is (3038) a content presentation application (e.g., a camera application with a media viewing feature such as a photo roll that displays photos that were previously captured by the camera), and the one or more previously-locked features of the respective application that are unlocked in the single-application unlocked mode include features that enable the device to share content associated with the content presentation application (e.g., sharing photos in a -photo roll" of a camera via email, a MMS message, or a message on a social networking service). For example, in FIGS. 29J-29K, the application is a content presentation application (or a camera application), and a feature that is unlocked in response to determining that fingerprint 29056 is an enrolled fingerprint is that share icon 29020 in camera roll interface 29044 is enabled.

In some embodiments, the respective application is (3040) a communication application (e.g., a phone application), the one or more previously-locked features of the respective application that are unlocked in the single-application unlocked mode include features that enable a user of the device to communicate with an arbitrary contact specified by the user (e.g., calling a non-emergency phone number). For example, in FIGS. 29O-29Q, the application is a phone application, and a feature that is unlocked in response to determining that fingerprint 29086 is an enrolled fingerprint is that keypad interface 29088, from which the user can call an arbitrary phone number, is accessible.

In some embodiments, the respective application is (3042) a communication application (e.g., a phone application), and the one or more previously-locked features of the respective application that are unlocked in the single-application unlocked mode include features that enable the device to access a user-specific directory of communication information (e.g., while the device is locked, access to the user's address book is disabled). For example, in FIGS. 29O-29R, the application is a phone application, and a feature that is unlocked in response to determining that fingerprint 29086 is an enrolled fingerprint is that contacts interface 29100 is accessible.

It should be understood that the particular order in which the operations in FIGS. 30A-30D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the "Description of Embodiments" section above) are also applicable in an analogous manner to method 3000 described above with respect to FIGS. 30A-30D. For example, the fingerprints, gestures, and user interface objects described above with reference to method 3000 optionally have one or more of the characteristics of the fingerprints, gestures, and user interface objects described herein with reference to other methods described herein (e.g., those listed in the "Description of Embodiments" section above). For brevity, these details are not repeated here.

Figure 31:
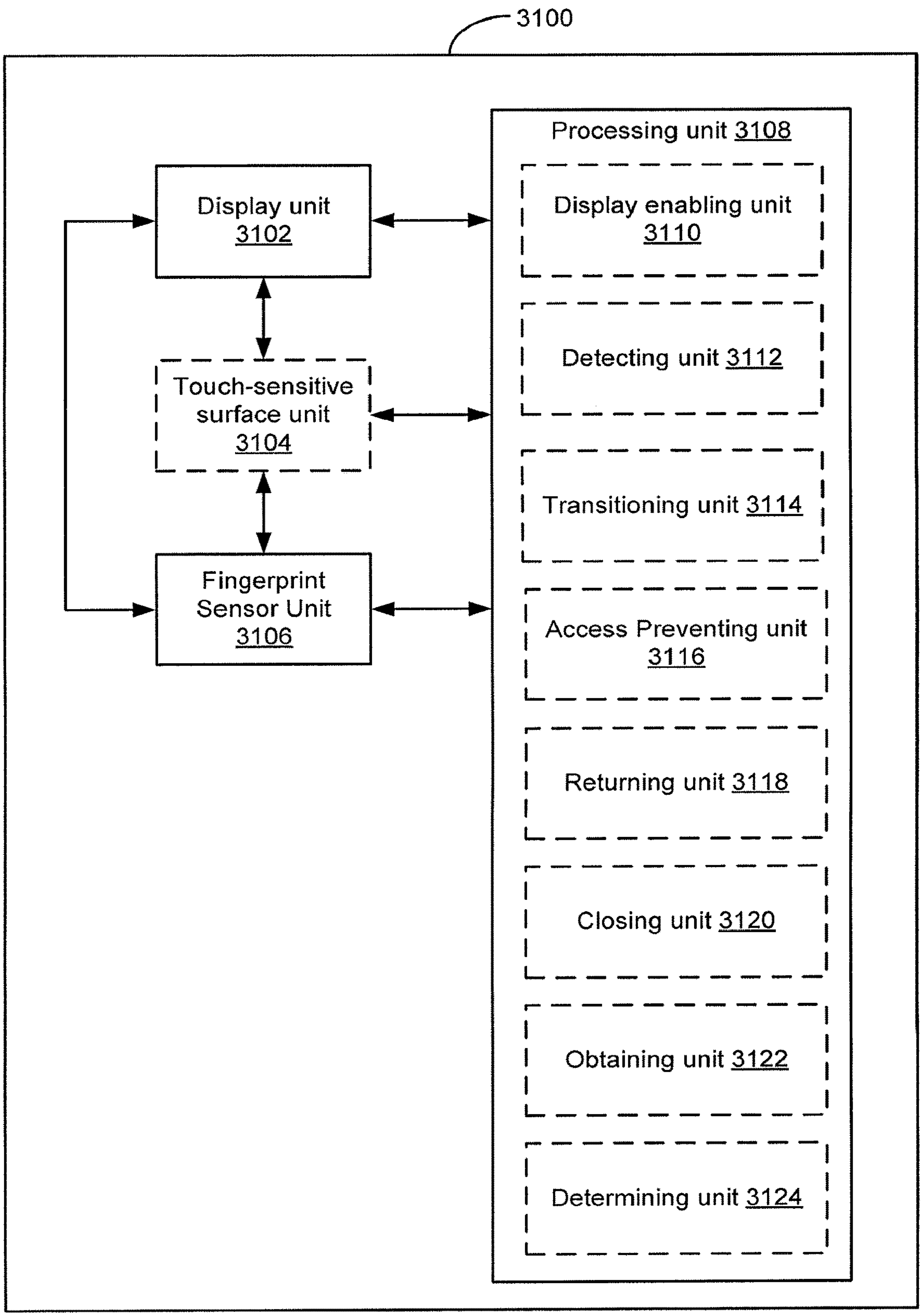
FIG. 31 is a functional block diagram of an electronic device in accordance with some embodiments.

In accordance with some embodiments, FIG. 31 shows a functional block diagram of an electronic device 3100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 31 are, optionally, combined or separated into sub-blocks to implement the principles of the various described embodiments. Therefore, the description herein optionally supports any possible combination or separation or further definition of the functional blocks described herein.

As shown in FIG. 31, an electronic device 3100 includes a display unit 3102 configured to display a first user interface, optionally a touch-sensitive surface unit 3104 configured to receive contacts, a fingerprint sensor unit 3106; and a processing unit 3108 coupled to the display unit 3102, optionally the touch-sensitive surface unit 3104, and the fingerprint sensor unit 3106. In some embodiments, the processing unit 3108 includes a display enabling unit 3110, a detecting unit 3112, a transitioning unit 3114, an access preventing unit 3116, a returning unit 3118, a closing unit 3120, an obtaining unit 3122, and a determining unit 3124.

The processing unit 3108 is configured to: while the electronic device is in a locked mode in which access to features of a plurality of different applications on the electronic device is prevented: enable display (e.g., with the display enabling unit 3110) of the first user interface on the display unit 3102, the first user interface being one of: a locked-device user interface for the electronic device, and a limited-access user interface for a respective application in the plurality of different applications; and detect (e.g., with the detecting unit 3112), with the fingerprint sensor, a first input that corresponds to a request to initiate unlocking one or more features of the device. The processing unit 3108 is further configured to, in response to detecting, with the fingerprint sensor, the first input that corresponds to the request to initiate unlocking one or more features of the device: in accordance with a determination that the first user interface is the locked-device user interface for the electronic device, transition (e.g., with the transitioning unit 3114) the device from the locked mode to a multi-application unlocked mode in which the features of the plurality of different applications are unlocked. The processing unit 3108 is also configured to, in accordance with a determination that the first user interface is the limited-access user interface for the respective application: transition (e.g., with the transitioning unit 3114) the device from the locked mode to a single-application unlocked mode in which one or more previously-locked features of the respective application are unlocked; and continue to prevent access (e.g., with the access preventing unit 3116) to one or more previously-locked features of other applications in the plurality of different applications.

In some embodiments, transitioning the device from the locked mode to the single-application unlocked mode and continuing to prevent access to previously-locked features of other applications includes unlocking the one or more previously-locked features of the respective application without unlocking the one or more previously-locked features of the other applications in the plurality of different applications.

In some embodiments, transitioning the device from the locked mode to the single-application unlocked mode and preventing access to previously-locked features of other applications includes: transitioning the device from the locked mode to an unlocked mode in which access to the features of the plurality of different applications are unlocked; and configuring the device to transition from the unlocked mode to the locked mode upon detection of a request to close the respective application.

In some embodiments, the processing unit 3108 is configured to: after detecting the first input, while enabling display of a user interface for the respective application, detect (e.g., with the detecting unit 3112) a second input that includes a request to close the respective application; and in response to detecting the second input: when the device is in the single-application unlocked mode, return (e.g., with the returning unit 3118) the device to the locked mode of operation; and when the device is in the multi-application unlocked mode, close (e.g., with the closing unit 3120) the respective application and maintaining the device in the unlocked mode of operation.

In some embodiments, detecting the first input includes detecting liftoff of a fingerprint from the fingerprint sensor; and the response to the first input is performed in response to detecting liftoff of the fingerprint from the fingerprint sensor.

In some embodiments, the fingerprint sensor is integrated into a button; detecting the first input includes detecting activation of the button, detecting a fingerprint on the fingerprint sensor, and detecting deactivation of the button; and the response to the first input is performed in response to detecting deactivation of the button.

In some embodiments, the respective application is opened in response to detecting activation of the button.

In some embodiments, the processing apparatus 3108 is configured to, in conjunction with detecting activation of the button, obtain (e.g., with the obtaining unit 3122) fingerprint information about a fingerprint of a finger that is on the fingerprint sensor and determine (e.g., with the determining unit 3124) whether the fingerprint information matches an enrolled fingerprint that was previously enrolled with the device.

In some embodiments, the respective application is a personal assistant application, and the one or more previously-locked features of the respective application that are unlocked in the single-application unlocked mode include features that require the personal assistant application to access data for a particular user stored on the device.

In some embodiments, the respective application is a camera application, and the one or more previously-locked features of the respective application that are unlocked in the single-application unlocked mode include features that enable the device to display images that were previously captured by a camera of the device.

In some embodiments, the respective application is a content presentation application, and the one or more previously-locked features of the respective application that are unlocked in the single-application unlocked mode include features that enable the device to share content associated with the content presentation application.

In some embodiments, the respective application is a communication application, and the one or more previously-locked features of the respective application that are unlocked in the single-application unlocked mode include features that enable a user of the device to communicate with an arbitrary contact specified by the user.

In some embodiments, the respective application is a communication application, and the one or more previously-locked features of the respective application that are unlocked in the single-application unlocked mode include features that enable the device to access a user-specific directory of communication information.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 30A-30D are, optionally, implemented by components depicted in FIGS. 1A-1B or FIG. 31. For example, displaying operation 3004, detection operation 3006, transitioning operation 3010, and transitioning and access preventing operations operation 3012 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

The invention claimed is:

1. An electronic device, comprising:

a display;

a biometric sensor;

one or more processors; and memory storing one or more programs configured to be executed by the one or more processors, the one or more programs including instructions for:

displaying, in a biometric enrollment interface on the display, a three-dimensional progress indicator;

collecting a first set of biometric information;

in response to collecting the first set of biometric information, updating appearance of the three-dimensional progress indicator based on the first set of biometric information;

after updating the appearance of the three-dimensional progress indicator based on the first set of biometric information, collecting a second set of biometric information; and in response to collecting the second set of biometric information, updating appearance of the three-dimensional progress indicator based on the second set of biometric information.

2. The electronic device of claim 1, the one or more programs further including instructions for:

after collecting the first set of biometric information and the second set of biometric information:

in accordance with a determination that the biometric information that has been collected is sufficient to enroll the biometric information associated with a user, enrolling the biometric information associated with the user with the electronic device; and in accordance with a determination that the biometric information that has been collected is insufficient to enroll the biometric information associated with the user, displaying a message in the biometric enrollment interface prompting collection of additional biometric information.

3. The electronic device of claim 2, the one or more programs further including instructions for:

after enrolling the biometric information associated with the user with the electronic device:

receiving a request to perform a restricted operation;

in response to receiving the request to perform the restricted operation, collecting a third set of biometric information:

in accordance with a determination that the third set of biometric information corresponds to enrolled biometric information associated with the user with the electronic device, performing the restricted operation; and in accordance with a determination that the third set of biometric information does not correspond to enrolled biometric information associated with the user with the electronic device, forgoing performance of the restricted operation.

4. The electronic device of claim 2, wherein the message for collecting additional biometric information includes displaying instructions for collecting additional biometric information in a manner differently from previous collected biometric information.

5. The electronic device of claim 1, wherein updating appearance of the three-dimensional progress indicator includes updating portions of the three-dimensional progress indicator in a predefined sequence.

6. The electronic device of claim 1, the one or more programs further including instructions for:

while collecting the first set of biometric information or collecting the second set of biometric information, providing haptic feedback at the electronic device to indicate that the biometric information is being collected.

7. The electronic device of claim 1, wherein the three-dimensional progress indicator resembles an ellipsoid or sphere; and wherein updating appearance of the three-dimensional progress indicator includes filling in a portion of the ellipsoid or the sphere.

8. The electronic device of claim 1, wherein the three-dimensional progress indicator includes a plurality of progress indicator portions that resemble boxes or hexagons; and wherein updating appearance of the three-dimensional progress indicator includes filling at least one of the boxes or the hexagons.

9. The electronic device of claim 1, wherein the three-dimensional progress indicator includes a plurality of progress indicator portions that resembles a plurality of concentric circles;

and wherein updating appearance of the three-dimensional progress indicator includes filling in at least one of the plurality of concentric circles.

10. A non-transitory computer-readable storage medium storing one or more programs configured to be executed by one or more processors of an electronic device with a display and a biometric sensor, the one or more programs comprising instructions for:

displaying, in a biometric enrollment interface on the display, a three-dimensional progress indicator;

collecting a first set of biometric information;

in response to collecting the first set of biometric information, updating appearance of the three-dimensional progress indicator based on the first set of biometric information;

after updating the appearance of the three-dimensional progress indicator based on the first set of biometric information, collecting a second set of biometric information; and in response to collecting the second set of biometric information, updating appearance of the three-dimensional progress indicator based on the second set of biometric information.

11. The non-transitory computer-readable storage medium of claim 10, the one or more programs further including instructions for:

after collecting the first set of biometric information and the second set of biometric information:

in accordance with a determination that the biometric information that has been collected is sufficient to enroll the biometric information associated with a user, enrolling the biometric information associated with the user with the electronic device; and in accordance with a determination that the biometric information that has been collected is insufficient to enroll the biometric information associated with the user, displaying a message in the biometric enrollment interface prompting collection of additional biometric information.

12. The non-transitory computer-readable storage medium of claim 11, the one or more programs further including instructions for:

after enrolling the biometric information associated with the user with the electronic device:

receiving a request to perform a restricted operation;

in response to receiving the request to perform the restricted operation, collecting a third set of biometric information:

in accordance with a determination that the third set of biometric information corresponds to enrolled biometric information associated with the user with the electronic device, performing the restricted operation; and in accordance with a determination that the third set of biometric information does not correspond to enrolled biometric information associated with the user with the electronic device, forgoing performance of the restricted operation.

13. The non-transitory computer-readable storage medium of claim 11, wherein the message for collecting additional biometric information includes displaying instructions for collecting additional biometric information in a manner differently from previous collected biometric information.

14. The non-transitory computer-readable storage medium of claim 10, wherein updating appearance of the three-dimensional progress indicator includes updating portions of the three-dimensional progress indicator in a predefined sequence.

15. The non-transitory computer-readable storage medium of claim 10, the one or more programs further including instructions for:

while collecting the first set of biometric information or collecting the second set of biometric information, providing haptic feedback at the electronic device to indicate that the biometric information is being collected.

16. The non-transitory computer-readable storage medium of claim 10, wherein the three-dimensional progress indicator resembles an ellipsoid or sphere; and wherein updating appearance of the three-dimensional progress indicator includes filling in a portion of the ellipsoid or the sphere.

17. The non-transitory computer-readable storage medium of claim 10, wherein the three-dimensional progress indicator includes a plurality of progress indicator portions that resemble boxes or hexagons; and wherein updating appearance of the three-dimensional progress indicator includes filling at least one of the boxes or the hexagons.

18. The non-transitory computer-readable storage medium of claim 10, wherein the three-dimensional progress indicator includes a plurality of progress indicator portions that resembles a plurality of concentric circles; and wherein updating appearance of the three-dimensional progress indicator includes filling in at least one of the plurality of concentric circles.

19. A method, comprising:

at an electronic device with a display:

displaying, in a biometric enrollment interface on the display, a three-dimensional progress indicator;

collecting a first set of biometric information;

in response to collecting the first set of biometric information, updating appearance of the three-dimensional progress indicator based on the first set of biometric information;

after updating the appearance of the three-dimensional progress indicator based on the first set of biometric information, collecting a second set of biometric information; and in response to collecting the second set of biometric information, updating appearance of the three-dimensional progress indicator based on the second set of biometric information.

20. The method of claim 19, further comprising:

after collecting the first set of biometric information and the second set of biometric information:

in accordance with a determination that the biometric information that has been collected is sufficient to enroll the biometric information associated with a user, enrolling the biometric information associated with the user with the electronic device; and in accordance with a determination that the biometric information that has been collected is insufficient to enroll the biometric information associated with the user, displaying a message in the biometric enrollment interface prompting collection of additional biometric information.

21. The method of claim 20, further comprising:

after enrolling the biometric information associated with the user with the electronic device:

receiving a request to perform a restricted operation;

in response to receiving the request to perform the restricted operation, collecting a third set of biometric information:

in accordance with a determination that the third set of biometric information corresponds to enrolled biometric information associated with the user with the electronic device, performing the restricted operation; and in accordance with a determination that the third set of biometric information does not correspond to enrolled biometric information associated with the user with the electronic device, forgoing performance of the restricted operation.

22. The method of claim 20, wherein the message for collecting additional biometric information includes displaying instructions for collecting additional biometric information in a manner differently from previous collected biometric information.

23. The method of claim 19, wherein updating appearance of the three-dimensional progress indicator includes updating portions of the three-dimensional progress indicator in a predefined sequence.

24. The method of claim 19, further comprising:

while collecting the first set of biometric information or collecting the second set of biometric information, providing haptic feedback at the electronic device to indicate that the biometric information is being collected.

25. The method of claim 19, wherein the three-dimensional progress indicator resembles an ellipsoid or sphere; and wherein updating appearance of the three-dimensional progress indicator includes filling in a portion of the ellipsoid or the sphere.

26. The method of claim 19, wherein the three-dimensional progress indicator includes a plurality of progress indicator portions that resemble boxes or hexagons; and wherein updating appearance of the three-dimensional progress indicator includes filling at least one of the boxes or the hexagons.

27. The method of claim 19, wherein the three-dimensional progress indicator includes a plurality of progress indicator portions that resembles a plurality of concentric circles; and wherein updating appearance of the three-dimensional progress indicator includes filling in at least one of the plurality of concentric circles.

* * * * *